(12) United States Patent
Martin et al.

(10) Patent No.: US 12,454,773 B2
(45) Date of Patent: *Oct. 28, 2025

(54) HOLLOW FIBRES

(71) Applicant: IP Ventures GmbH, Schattdorf (CH)

(72) Inventors: Risto John Martin, Isle of Wight (GB); Haydn Rhys Ingram, Swanley Kent (GB)

(73) Assignee: IP Ventures GmbH, Schattdorf (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/971,697

(22) Filed: Dec. 6, 2024

(65) Prior Publication Data
US 2025/0109529 A1    Apr. 3, 2025

Related U.S. Application Data

(63) Continuation of application No. PCT/GB2024/050902, filed on Apr. 2, 2024.

(30) Foreign Application Priority Data

Apr. 6, 2023   (GB) .................................. 2305209
Apr. 6, 2023   (GB) .................................. 2305210
Nov. 13, 2023  (GB) .................................. 2317377

(51) Int. Cl.
*D01F 4/00*       (2006.01)
*A23J 3/14*       (2006.01)
(Continued)

(52) U.S. Cl.
CPC ........ *D01F 4/00* (2013.01); *A23J 3/14* (2013.01); *A23J 3/16* (2013.01); *A23J 3/227* (2013.01);
(Continued)

(58) Field of Classification Search
CPC ........ D01F 4/00; A23J 3/14; A23J 3/16; A23J 3/227; B01D 63/02; B01D 63/033; B01D 69/08; B01D 69/081; C12M 25/10
See application file for complete search history.

(56) References Cited

U.S. PATENT DOCUMENTS

2006/0157400 A1 * 7/2006 Hashimoto ........ B01D 63/0233
                                                  210/636
2024/0344006 A1 * 10/2024 Dicker ............... B01D 67/0088
(Continued)

FOREIGN PATENT DOCUMENTS

| WO | WO-2010/016034 A2 | 2/2010 |
| WO | WO-2022/038240 A2 | 2/2022 |
| WO | WO-2023/021213 A1 | 2/2023 |

OTHER PUBLICATIONS

Wei, Z. et al. "Soy Protein Amyloid Fibril Scaffold for Cultivated Meat Application." Applied Materials and Interfaces. 15 (2023): 15108-15119. (Year: 2023).*

(Continued)

*Primary Examiner* — Jenna N Chandhok
(74) *Attorney, Agent, or Firm* — Foley & Lardner LLP

(57) ABSTRACT

The present disclosure provides extruded or spun, semipermeable, porous hollow fibres, comprising covalent ester, thioester and/or amide crosslinked polypeptides as well as processes for their production. The hollow fibres may be produced from protein, protein extracts, and/or protein isolates derived from plants, animals, bacteria, algae, archaea, and/or fungi, and in certain embodiments are intended to be suitable for human and/or animal ingestion. In some embodiments, the hollow fibres may be designed to be used in the production of cartridges that are compatible with existing and/or novel bioreactor platforms, for harbouring cell cultures in cultured meat production.

34 Claims, 38 Drawing Sheets

Specification includes a Sequence Listing.

(51) Int. Cl.

| | |
|---|---|
| *A23J 3/16* | (2006.01) |
| *A23J 3/22* | (2006.01) |
| *A23J 3/26* | (2006.01) |
| *A23L 13/00* | (2016.01) |
| *B01D 63/02* | (2006.01) |
| *B01D 67/00* | (2006.01) |
| *B01D 69/02* | (2006.01) |
| *B01D 69/08* | (2006.01) |
| *B01D 71/56* | (2006.01) |
| *C12M 1/12* | (2006.01) |
| *C12N 5/077* | (2010.01) |
| *D01D 1/02* | (2006.01) |
| *D01D 5/06* | (2006.01) |
| *D01D 5/24* | (2006.01) |
| *D01D 10/02* | (2006.01) |
| *D01F 1/08* | (2006.01) |
| *D01F 1/10* | (2006.01) |
| *D01F 11/02* | (2006.01) |
| *A23J 3/28* | (2006.01) |

(52) U.S. Cl.
CPC .............. *A23J 3/26* (2013.01); *A23L 13/00* (2016.08); *B01D 63/033* (2022.08); *B01D 67/00113* (2022.08); *B01D 67/00165* (2022.08); *B01D 67/0083* (2013.01); *B01D 67/0088* (2013.01); *B01D 67/0093* (2013.01); *B01D 67/0095* (2013.01); *B01D 69/02* (2013.01); *B01D 69/081* (2013.01); *B01D 69/087* (2013.01); *B01D 71/56* (2013.01); *C12M 25/10* (2013.01); *C12N 5/0658* (2013.01); *D01D 1/02* (2013.01); *D01D 5/06* (2013.01); *D01D 5/24* (2013.01); *D01D 10/02* (2013.01); *D01F 1/08* (2013.01); *D01F 1/10* (2013.01); *D01F 11/02* (2013.01); *A23J 3/28* (2013.01); *B01D 2323/081* (2022.08); *B01D 2323/21817* (2022.08); *B01D 2323/21826* (2022.08); *B01D 2323/21834* (2022.08); *B01D 2323/21837* (2022.08); *B01D 2323/30* (2013.01); *B01D 2325/02* (2013.01); *B01D 2325/04* (2013.01); *B01D 2325/06* (2013.01); *B01D 2325/20* (2013.01); *B01D 2325/24* (2013.01); *D10B 2211/20* (2013.01); *D10B 2401/063* (2013.01); *D10B 2401/10* (2013.01); *D10B 2505/00* (2013.01); *D10B 2505/04* (2013.01)

(56) References Cited

U.S. PATENT DOCUMENTS

| | | | |
|---|---|---|---|
| 2025/0122647 | A1 | 4/2025 | Martin et al. |
| 2025/0129521 | A1 | 4/2025 | Martin et al. |

OTHER PUBLICATIONS

Bonkamp et al., "Scaffolding Biomaterials for 3D Cultivated Meat: Prospects and Challenges," Advanced Science, Nov. 16, 2021, 9(3):2102908, 1-40.

"*Amorphous* vs. *Crystalline Polymers*," Mallard Creek Polymers (MCP), 2021, https://www.mcpolymers.com/library/amorphous-vs-crystalline-polymers, 7 pages.

Do Prado Silva et al., "Whey Protein Isolate Microgel Properties Tuned by Crosslinking with Organic Acids to Achieve Stabilization of Pickering Emulsions," Foods, 2021, 10:1296, 1-15.

Perticaroli et al., "Secondary structure and rigidity in model proteins," Soft Matter, 2013, 9548-9556.

\* cited by examiner

HOLLOW FIBRES

1.1 CROSS-REFERENCE TO RELATED APPLICATIONS

The present application is a Continuation of PCT/GB2024/050902, filed Apr. 2, 2024, which claims priority to GB 2305209.5, filed Apr. 6, 2023, GB 23050210.3, filed Apr. 6, 2023, and GB 2317377.6, filed Nov. 13, 2023.

1.2 SEQUENCE LISTING

The instant application contains a Sequence Listing which has been submitted in XML format and is hereby incorporated by reference in its entirety. Said XML copy, created on Dec. 3, 2024, is named pctgb2024050902-seql.xml and is 39,788 bytes.

1.3 FIELD

In certain aspects and embodiments, the instant disclosure relates in part to hollow fibres, as well as processes for their production and uses.

1.4 BACKGROUND

United States Patent Application Publication No. US 2013/0192459 discloses "hollow fibre membranes having a supporting layer and an inner (i.e. on the lumen-facing side of the supporting layer) or an outer separating layer and to a process for manufacturing such hollow fibre membranes."

PCT Application No. WO2019158494A1 discloses "an edible fiber comprising a biopolymer and a plasticiser; wherein the weight ratio of biopolymer to plasticiser is about 1:0.25 to about 1:3; and wherein the fiber has a diameter of about 0.5 μm to about 1 mm."

European Patent Application No EP0077098A2 discloses "hollow chitosan fibres for use in ultrafiltration and dialytic processes in general and renal dialysis in particular, and the process for their preparation."

WO 2016/007879A1 discloses "a bioprotein tube having an outer diameter of about 1 mm and an inner diameter of about 0.80 mm may be prepared by extruding a bioprotein precursor solution comprising 50 mg/ml of alginate and gelatin at a ratio of 3:1 through an orifice into a solution of about 5 mg/ml calcium chloride and exposing the tube to a wash solution within about 10 sec."

WO 2018/011805A2 discloses "a system for culturing cells which can be used, in some embodiments of the present invention, for generating edible meat". It also states, "the culturing is performed on an edible hollow fiber cartridge". Furthermore, "the vegetable—derived matrix is from a cereal family, legume (Fabaceae) family or a pseudocereal family". Further still, "the legume is soy or pea".

WO 2022/038241A1 discloses "a closed, continuous, semi-continuous or batch culture system for cell growth and differentiation followed by tissue growth for the production of, for example, clean meat."

WO 2009/035414A1 discloses "The present invention relates to a chitosan construct and a method of preparing the same. The chitosan construct may have a higher mechanical strength. In particular, the present invention relates to chitosan fibre or chitosan hollow fibres". It also states, "in particular, the construct may have a sponge-like porous structure. The porosity of the construct may be up to 80%. For example, the porosity may be about 20-80%".

WO 2022/038240A2 discloses "methods of production of structured clean meat products produced with the hollow fibers, cartridges and bioreactors".

WO 2023/021213A1 discloses "[a] method of manufacture of crosslinked, edible, porous hollow fibers and sheet membranes suitable for the manufacture of clean meat products, the hollow fibers and sheet membranes made therefrom and methods of use thereof." Wherein, "[t]he innovation of the present invention is to use physical crosslinking, said physical crosslinking being generated via an energy source such as one or more of heat, gamma, e-beam, beta, x-ray, or UV."

Modrzejewska and Eckstein, *Biopolymers,* 73:61-68 (2004) conclude "[i]t is possible to form chitosan hollow fibers by the wet weaving method using one water coagulant (sodium hydroxide)."

JP2022072917A discloses "a cultured meat complex comprising a hollow fiber membrane or a decomposition product or lysate thereof and a cultured meat containing a cell group of an animal existing along the hollow fiber membrane or the decomposition product or lysate thereof". Wherein, "[a] cultured meat complex obtained by using the hollow fiber membrane composed of collagen may be subjected to heat treatment to gelatinize the collagen".

WO 2023/152492A1 discloses "a substrate assembly for culturing cells, wherein the substrate assembly comprises: a plurality of edible fibres, wherein each fibre has an internal channel running along its length". Wherein, "[t]he plurality of fibres may comprise alginate". In which, "calcium chloride acts as a cross-linking agent for alginate".

WO 2023/152493A1 discloses "a plurality of edible fibres, wherein each fibre has an internal channel running along its length". Wherein, "calcium chloride acts as a cross-linking agent for alginate" and "[t]he freeze-drying step can also be used to adjust the porosity of the final fibre material". Moreover, "[t]he freeze-drying step has been found to be particularly useful when the fibres comprise alginate".

WO 2024/038281A1 discloses "a method of culturing muscles cells for a comestible product, the method seeding muscle cells onto the one or more porous hollow fibres".

1.5 SUMMARY

The instant disclosure is based, at least in part, on the realization that extruded or spun, semi-permeable, porous hollow fibres comprising polycarboxylic acid derived covalent ester, thioester and/or amide crosslinked polypeptides, could enable the production of an edible high-protein cultured meat food product.

The disclosure is also based, at least in part, on the realization that hollow fibres as disclosed herein can in some embodiments constitute a predominantly protein substrate, which eliminates the need to subsequently separate the cells from the substrate or scaffold on which they were grown. Consequently, the need for an additional seeding step into a tertiary scaffold, as typically required with traditional cultivation methods, could be negated.

The separation of cells from the extra-capillary space of existing semi-permeable hollow fibre bioreactors is a difficult step, and often requires the use of multiple enzyme washes. This separation step might not be necessary if the hollow fibres are themselves edible and could be consumed.

The disclosure is further based, at least in part, on the realization that extruded or spun, semi-permeable, porous hollow fibres comprising covalent ester, thioester and/or amide crosslinked polypeptides, may be used in the production of cartridges and modules that are compatible with existing and novel bioreactor platforms. The hollow fibres of this disclosure could enable the realisation of high-density cell culture and the reduction of costs associated with decreased growth factor use in hollow fibre bioreactors. Collectively, these benefits could significantly decrease the cost in the production of cultured meat.

The extruded or spun, semi-permeable, porous hollow fibres comprising covalent ester, thioester and/or amide crosslinked polypeptides, of this disclosure are in some aspects and/or embodiments edible, non-cytotoxic and/or biocompatible, and so they can be ingested and digested as food by humans and/or animals. Additionally, the hollow fibres of some aspects and embodiments of the disclosure can be formed and treated so as to enhance the texture and/or taste of the edible product.

Bioreactor platforms comprising cartridges and/or modules containing the hollow fibres of this disclosure may in many embodiments be used for the production of an edible food product comprising a mixture of the cultured cells and the hollow fibres of the disclosure. An edible food product produced in this way may in certain embodiments be ingested and digested as food by humans and/or animals, without the risk of the inclusion of inedible substrate contaminants.

However, one challenge for producing extruded or spun, semi-permeable, porous hollow fibres comprising covalent ester, thioester and/or amide crosslinked polypeptides, is that most edible materials are water soluble, swell significantly in an aqueous solution, and/or have a low protein content. Such materials do not have the necessary separation, mechanical and/or chemical properties for semi-permeable hollow fibre bioreactor operations. The hollow fibres of many embodiments of this disclosure overcome these shortcomings by additionally providing a process comprising a novel combination of process steps.

One challenge associated with ester, thioester and/or amide crosslinked polypeptide derived polymers, in general, is that ester, thioester and/or amide crosslinks can be broken by hydrolysis under certain conditions. Beta-sheets and beta-coil secondary structures in polypeptides may prevent the hydrolysis of ester, thioester and/or amide bonds. However, induced beta-sheets and beta-coils can revert to amorphous structures in water or upon hydration under certain conditions.

As used herein, the term 'beta-sheets' may collectively refer to both beta-sheets and beta-coil secondary structures.

The disclosure is also based, at least in part, on the realization that polymers comprising ester, thioester and/or amide crosslinked polypeptides with induced beta-sheet secondary structures may recrystalize upon being annealed, thereby relaxing the internal stresses within their crystal structures, such that the beta-sheet conformation becomes the stable micro-structure; a process by which is herein referred to as 'protein annealing'. Consequently, the beta-sheet secondary structure of the crosslinked polypeptide polymer may remain intact upon rehydration and resist hydrolysis of the constituent ester, thioester and/or amide crosslinks. Accordingly, it is one object of the disclosure to provide a polymer material which includes a regular semi-crystalline polymer that includes ester, thioester and/or amide crosslinked polypeptides with a beta-sheet secondary structure—which herein, is referred to as Prokitein.

As used herein, a 'semi-crystalline polymer' refers to a polymer that comprises molecular chains arranged in both crystalline and amorphous structures. In the crystalline regions, protein chains may be ordered in repeating patterns. In the amorphous regions, protein chains may be randomly orientated.

As used herein, a 'regular semi-crystalline polymer' refers to a semi-crystalline polymer that comprises uniformly distributed crystal grain sizes and shapes, and/or grains that are orientated consistently relative to each other, within the crystalline phase(s) of its molecular structure.

The disclosure is also based, at least in part, on the realization that the resistance to hydrolysis of Prokitein could facilitate its use as materials for a plethora of applications, including, for hollow fibre production for long-term cell culture, as necessary in the production of cultivated meat products. Additionally, the extruded or spun, semi-permeable, porous hollow fibres comprising covalent ester, thioester and/or amide crosslinked polypeptides, of this disclosure comprise, in some aspects and/or embodiments, Prokiteins.

One additional challenge for producing porous hollow fibres, in general, is pore formation. Process steps, such as freeze-drying, are sometimes required to adjust the porosity of hollow fibre materials. The hollow fibres of many embodiments of this disclosure may overcome this shortcoming by additionally providing a process by which hollow fibres with porous structures may be formed without the use of freeze-drying.

It is one object of the disclosure, therefore, to provide an extruded or spun, semi-permeable, porous hollow fibre, comprising covalent ester, thioester and/or amide crosslinked polypeptides, which is suitable for use as a cell growth substrate in a bioreactor and for use as an edible food product.

It is another object of the disclosure to provide a process for the production of an extruded or spun, semi-permeable, porous hollow fibre, comprising covalent ester, thioester and/or amide crosslinked polypeptides, which is suitable for use as a food product.

It is yet another object of the disclosure to provide a cartridge comprising a plurality of extruded or spun, semi-permeable, porous hollow fibres comprising covalent ester, thioester and/or amide crosslinked polypeptides.

It is yet another object of the disclosure to provide a bioreactor comprising one or more hollow fibre cartridges, which are themselves comprising a plurality of extruded or spun, semi-permeable, porous hollow fibres.

It is yet another object of the disclosure to provide a food product comprising a combination of cultured cells and extruded or spun, semi-permeable, porous hollow fibres comprising covalent ester, thioester and/or amide crosslinked polypeptides.

It is yet another object of the disclosure to provide a process for the production of a combination of cultured cells and extruded or spun, semi-permeable, porous hollow fibres comprising covalent ester, thioester and/or amide crosslinked polypeptides, which is suitable for use as a food product.

Accordingly, in one aspect, the disclosure provides an edible, semi-permeable, porous hollow fibre, comprising one more polycarboxylic acid derived covalent ester, thioester and/or amide bond crosslinked polypeptides, wherein:
 (a) the external diameter of the hollow fibre is 50-6600 µM;
 (b) the wall thickness of the hollow fibre is 20-800 µM;
 (c) the lumen diameter of hollow fibre is 20-5000 µM; and
 (d) the pore volume of the hollow fibre is 1-95%.

An edible, semi-permeable, porous hollow fibre, comprising one more polycarboxylic acid derived covalent ester, thioester and/or amide bond crosslinked polypeptides, wherein:
(a) the external diameter of the hollow fibre is 50-6600 µm;
(b) the wall thickness of the hollow fibre is 20-800 µm;
(c) the lumen diameter of hollow fibre is 20-5000 µm; and
(d) the porosity of the hollow fibre is 1-95%.

In another aspect, the disclosure also provides a semi-permeable, porous hollow fibre, comprising covalent ester, thioester and/or amide bond crosslinked polypeptides, wherein:
(a) the external diameter of the hollow fibre is 50-6600 µM;
(b) the wall thickness of the hollow fibre is 20-800 µM;
(c) the lumen diameter of hollow fibre is 20-5000 µM; and
(d) the pore volume of the hollow fibre is 1-95%.

In another aspect, the disclosure also provides a semi-permeable, porous hollow fibre, comprising covalent ester, thioester and/or amide bond crosslinked polypeptides, wherein:
(a) the external diameter of the hollow fibre is 50-6600 µm;
(b) the wall thickness of the hollow fibre is 20-800 µm;
(c) the lumen diameter of hollow fibre is 20-5000 µm; and
(d) the porosity of the hollow fibre is 1-95%.

In yet another aspect, the disclosure provides a process for the production of a plurality of semi-permeable, porous hollow fibres, comprising covalent ester, thioester and/or amide bond crosslinked polypeptides, the process comprising the steps:
a. combining:
  i. a first composition comprising polypeptides, with
  ii. a second composition comprising a solvent and one or more denaturing agents and/or reducing agents, to produce a third composition;
b. incubating the third composition under conditions sufficient to denature and/or reduce at least a fraction of the polypeptides, to produce a fourth composition;
c. extruding or spinning the fourth composition through a plurality of co-axial orifices, together with a bore solution comprising the coagulation bath solution, to produce a plurality of hollow fibres;
d. treating the plurality of hollow fibres with a polycarboxylic acid crosslinking reagent in order to form inter-polypeptide and/or intra-polypeptide polycarboxylic acid derived ester, thioester or amide covalent bond crosslinks within at least a fraction of the polypeptides in the hollow fibres, to produce a plurality of covalently-crosslinked, semi-permeable, porous hollow fibres;
e. treating the covalently-crosslinked, semi-permeable, porous hollow fibres with at least one post-production modification process selected from the group consisting of:
  i. treating the covalently-crosslinked, semi-permeable, porous hollow fibres with an organic solvent to increase the relative abundance of beta-sheets in the secondary structure of the polypeptides;
  ii. annealing the covalently-crosslinked, semi-permeable, porous hollow fibres;
  iii. treating the covalently-crosslinked semi-permeable, porous hollow fibres with a solvent to remove void inclusion elements in the hollow fibres;
  iv. washing the covalently-crosslinked semi-permeable, porous hollow fibres with one or more acid(s), alkali(s) and/or buffer solution(s) to decrease at least one of, the Young's modulus, ultimate tensile strength and/or ultimate tensile strain of the hollow fibres;
  v. coating the covalently-crosslinked semi-permeable, porous hollow fibres;
  vi. modifying the surface topography of the covalently-crosslinked, semi-permeable, porous hollow fibres to aid cell attachment and/or cell alignment;
  to produce a plurality of treated covalently-crosslinked, semi-permeable, porous hollow fibres hollow fibres; and
f. drying the treated covalently-crosslinked, semi-permeable, porous hollow fibres, to produce dried, treated covalently-crosslinked, semi-permeable, porous hollow fibres.

It is one object of the disclosure to provide a process for producing Prokitein, the process comprising the steps:
a. combining:
  i. a first composition comprising polypeptides, with
  ii. a second composition comprising a solvent and one or more denaturing agents and/or reducing agents, to produce a third composition;
b. incubating the third composition to produce a fourth composition;
c. treating the fourth composition with a polycarboxylic acid crosslinking reagent to produce covalently-crosslinked polypeptides;
d. treating the covalently-crosslinked polypeptides with an organic solvent;
e. annealing the covalently-crosslinked polypeptides; and
f. optionally, treating the covalently-crosslinked polypeptides with one of more post-production modification processes selected from the group consisting of:
  i. treating the covalently-crosslinked polypeptides with a solvent to remove void inclusion elements; and
  ii. drying the covalently-crosslinked polypeptides;
  to produce to produce Prokitein.

1.6 DETAILED DESCRIPTION OF THE DISCLOSURE

The terms 'cultured meat', 'cultivated meat', 'cellular agriculture', 'cell-based meat', 'lab-grown meat', 'clean meat', and 'cultivated animal cell food product' refer to the production of meat by culturing animal cells in vitro and are used interchangeably herein. There are three broad advantages of cultured meat: sustainability, public health and animal welfare.

As stated by the Intergovernmental Panel on Climate Change (IPCC), to decrease the worst effects of climate change, the consumption of conventional animal products must be decreased. However, most consumers are unwilling to do so. Current technologies for the production of cultured meat are energy intensive, so sustainable energy sources are necessary to ensure these benefits. The adoption of next-generation bioreactor platforms for the production of cultured meat will play an important role in this endeavour. It is currently estimated that up to 70% of arable land is utilised for the production of livestock feed, and it is anticipated that global meat demand is set to further increase by 70% by 2050. Hence there are currently insufficient planetary resources to meet these future demands (1).

Bioreactors, also referred to as 'fermenters' or 'cultivators', are devices or vessels that provide an environment for the growth and cultivation of cells, microorganisms, or biological molecules. Bioreactors are commonly used in biotechnology, pharmaceuticals, and biochemical engineering for the production of biological products such as cells, vaccines, enzymes and antibodies.

Traditional farm-based animal rearing methods for meat production and subsequent processes incur risks of introducing potentially fatal infections such as *Salmonella* and *Listeria* to the general public. Furthermore, antibiotic abuse is common in traditional animal rearing and contributes to the development of antibiotic-resistant bacteria. In contrast, processes for the production of cultured meat can guarantee the absence of these contaminants and do not require antibiotic use (1). 99% of animals reared for food are estimated by the Sentience Institute (SI) to be considered industrial products of factory farms rather than sentient beings. A reduction in the number of such animals would be highly desirable (1).

Traditional bioreactors, cultivators or fermenters, used interchangeably herein, commonly used for producing cultured cells commonly take the form of a continuously stirred tank reactor (CSTR). CSTRs may be fitted with various control systems to control an array of environmental conditions, such as temperature, pH, agitation speed, and the concentrations of dissolved metabolites (e.g., oxygen, carbon dioxide, glucose, lactic acid, etc.). Typically, CSTRs are fitted with an energy source and mixing system as a means to control the environmental conditions.

Many current methods used in cellular agriculture have several shortcomings, which include: (i) low cell concentrations in the surrounding media, causing the subsequent de-watering and recovery steps to be expensive; (ii) the inefficient use of nutrients and growth media by the cells; and/or (iii) the inability to readily form a palatable and attractive food product from the resulting cell slurry suspension.

The high cost of cell culture media has been identified as one of the major cost drivers of cultured meat production. Cell culture media typically contains foetal bovine serum (FBS), which contains hundreds of different proteins and metabolites. Currently, fully defined alternatives to FBS are generally more expensive and less effective. The high costs of both growth media and FBS can be attributed to the necessary growth factor components, which are also typically unstable and have short shelf lives (1).

CSTRs used for culturing cells in suspension or on micro-carriers are typically capable of producing cells at a density of $10^5$-$10^6$ cells/mL (2; 3).

Petrochemical polymeric semi-permeable hollow fibres have been used to produce bioreactors capable of achieving and sustaining cell densities that are up to 35 times higher than that achieved in traditional tissue culture techniques (4). Additionally, the concentration of growth factors required to differentiate stem cells into their terminally differentiated state has been demonstrated to be between 2 and 8 times lower in ceramic semi-permeable hollow fibre bioreactors than in traditional adherent methods (5; 6).

Scaffolding is paramount in the production of cultured meat as it provides the structural basis for thick tissue products (7). However, owing to oxygen and nutrient transport limitations, the growth of cells for cultured meat in traditional porous scaffolds is generally commercially unfeasible (8). Furthermore, as the cell slurry suspension produced from CSTRs is usually not readily palatable, it is necessary to carry out additional cell seeding steps into scaffolds. Therefore, the workflow typically adopted for cultured meat production is: (i) stem cell isolation, (ii) cultivation in suspension to a desired cell concentration; and (iii) seeding into scaffold(s). The de-watering of the cell slurry between steps (ii) and (iii) is both time and energy intensive. Additionally, the final seeding step is made difficult by the fact that the design of the scaffold greatly influences cell seeding efficiency and the mouthfeel of the final product (3).

Hollow fibres, such as those produced from petrochemical polymers, ceramics and cellulose acetate, have been used a substrate for culturing cells. Successful development and commercial use of such hollow fibres has faced challenges such as the difficult separation of cultured cells from the hollow fibre substrates post-cultivation.

Polypeptides solubilized with acid or alkali can be used to produce hollow fibres, but this process can disrupt the primary protein structure, resulting in shorter chain lengths, lower chain entanglement, and weaker materials when crosslinked. Furthermore, edible materials, such as polypeptides, even when crosslinked, are water soluble, and can swell significantly in an aqueous solution. Swelling may be undesirable, especially in bioreactor applications, as it can significantly disrupt the fluid and nutrient transport properties of these materials.

Certain embodiments of the compositions and methods provided herein attempt to address and overcome some or all of these challenges.

In certain aspects and embodiments, the disclosure provides processes for the production of a plurality of semi-permeable, porous hollow fibres, comprising covalent ester, thioester and/or amide crosslinked polypeptides.

Step (a) comprises combining:
  (i) a first composition comprising polypeptides, with
  (ii) a second composition comprising a solvent and one or more denaturing agents and/or reducing agents,
to produce a third composition.

The first composition may comprise one or more polypeptides.

The terms "polypeptide" and "protein" are used interchangeably herein. In some embodiments, the polypeptides of the hollow fibres and/or methods of the disclosure are obtained or derived from plants, animals, bacteria, algae, archaea, and/or fungi.

In some preferred embodiments, the polypeptides of the hollow fibres and/or methods of the disclosure are derived from one or more extracts and/or an isolates obtained from plants, animals, bacteria, algae, archaea, and/or fungi.

In some embodiments, the polypeptides are plant polypeptides, wherein the term 'plant' includes, but is not limited to, legumes, nuts, seeds, cereals and tubers. Examples of such plant sources include, but are not limited to:
  legumes: chickpeas, lentils, kidney beans, black beans, navy beans, lima beans, pinto beans, soybeans, mung beans, adzuki beans, fava beans, black-eyed peas, green peas, snow peas, sugar snap peas, and/or split peas;
  nuts: almonds, walnuts, pistachios, cashews, brazil nuts, hazelnuts, macadamia nuts, pecans, pine nuts, peanuts, chestnuts and/or coconuts;
  seeds: sunflower, pumpkin, chia, flax, sesame, hemp, poppy, quinoa, cumin, fennel, coriander, mustard, caraway, cardamom, fenugreek, ajwain, anise, and/or nigella;
  cereals: wheat, rice, corn/maize, oats, barley, rye, millet, sorghum, quinoa, buckwheat, spelt, triticale, amaranth, teff, farro, kamut, freekeh, emmer, and/or fonio; and
  tubers: potatoes, sweet potatoes, yams, cassava, taro, jicama, jerusalem artichoke, water chestnut, chinese yam, malanga, arrowroot, ginger, turmeric, turnips and/or beets.

In some embodiments, the polypeptides are derived from legumes which include, but are not limited to: anasazi beans, cannellini beans, cocoa beans, coffee beans, cranberry beans, edamame, fayot (flageolet) beans, french green bean, gigante beans, great northern beans, long beans, marrowfat peas, fava beans (faba beans, broad beans), and purple string beans.

In some embodiments, the polypeptides are animal polypeptides, wherein the term 'animal' includes, but is not limited to, mammals, marsupials, birds, fish, cephalopods, crustaceans and insects. Examples of such animal sources include, but are not limited to:

mammals: cattle, sheep, pig, horse, goat, deer, reindeer, bison, moose, elk, camel, wild boar, wildebeest, and/or guinea pig;
marsupials: kangaroo, koala, wombat;
birds: chicken, turkey, duck, goose, quail, pheasant, guineafowl, ostrich, emu, pigeon, partridge, grouse, snipe, and/or woodcock;
fish: salmon, tuna, cod, trout, sardines, haddock, tilapia, catfish, mackerel, swordfish, halibut, dolphinfish, grouper, snapper, sea bass, anchovy, carp, perch, pike, flounder, sole, eel, herring, whitefish, and/or crawfish;
cephalopods: squid, octopus, cuttlefish, and/or nautilus;
crustaceans: shrimp, crab, lobster, crawfish, prawn, krill, crayfish, mussel, oyster, clam, scallop, and/or cockle;
reptiles: snakes, turtles, alligators, crocodiles, iguanas, and/or lizards; and
insects: grasshopper, cricket, mealworm, beetle, ant, termite, cicada, caterpillar, silkworm, locust, waxworm, hornworm, bamboo worm, scorpion, and/or centipede.

Examples of bacteria include, but are not limited to, *Escherichia coli*, *Bacillus subtilis*, and *Pseudomonas fluorescens*.

In some embodiments, the polypeptides are algae polypeptides, wherein the term "algae" includes, but is not limited to, Euglenophyta, Chrysophyta, Pyrrophyta, Chlorophyta, Rhodophyta, Paeophyta, and Xanthophyta.

Examples of algal sources of polypeptides include, but are not limited to: *Euglena gracilis*, *Diatoms*, *Dinoflagellates pyrocystis*, *Netrium desmid*, *Chlamydomonas*, *Spirogyra*, *Volvox*, *Ulva*, *Chlorella*, *Chara*, *Corallina*, *Gelidium*, *Gracilaria*, *Laminaria*, *Fucus*, *Sargassum*, and *Vaucheria*.

In some embodiments, the polypeptides are archaea polypeptides, wherein the term "archaea" includes, but is not limited to, Euryarchaeota, Crenarchaeota and Korarchaeota.

Examples of archaea sources of polypeptides include, but are not limited to: *Thermoproteus neutrophillus*, *Thermoproteus uzoniensis*, *Vulcanisaeta distributa*, *Vulcanisaeta moutnovskia*, *Metallosphaera cuprina*, *Metallosphaera sedula*, *Staphylothermus hellenicus*, *Staphylothermus marinus*, *Thermosphaera aggregans*, *Sulfolobus acidocaldarius*, *Sulfolobus islandicus*, *Desulfurococcus kamchatkensis*, *Hyperthermus butylicus*, *Thermus aqaticus*, *Archaeoglobus fulgidus*, and *Archaeoglobus veneficus*

In some embodiments, the polypeptides are fungi polypeptides, wherein the term "fungi" includes, but is not limited to, Ascomycota, Basidiomycota, Zygomycota, Chytridiomycota, Glomeromycota, and Deuteromycota.

Examples of fungi sources of polypeptides include, but are not limited to mushrooms, truffle, yeast, *Penicillium*, *aspergillus*, ergot, chanterelle, morel, bracket fungi, coral fungus, stinkhorn, puffball, bird's nest fungi, and jelly fungi. Other examples include *Saccharomyces cerevisiae* and *Pichia pastoris*.

An extract or isolate may, for example, be an aqueous extract from a plant, animal, bacteria, algae, archaea, or fungi. This may be obtained, for example, by dissolving all or part of the organic source in an aqueous buffer (e.g., phosphate-buffered saline (PBS)), acid or alkali solution, optionally together with a surfactant, optionally with suitable mixing and/or homogenisation; and then isolating the aqueous extract or isolate from the undissolved material.

Solid protein may be recovered from the isolated sample through precipitation by adjusting the pH of the aqueous protein solution to the isoelectric point of the extracted protein through the addition of acid or alkali. The solid protein precipitate may then be recovered through centrifugation, and subsequently washed with water and heated to sterilise the protein extract. Finally, the extracted protein may be spray dried (9).

Proteins

In some embodiments, the extract or isolate from a plant, animal, bacteria, algae, archaea, or fungi is a protein extract or isolate.

Protein extracts can be obtained, inter alia, during the production of defatted beans, seeds or nut flakes. Suitable plant materials first undergo a process of cleaning, drying, conditioning, cracking, dehulling, solvent oil extraction and flash solvent removal, and the resulting proteins are then purified via alcohol washing, acid leaching and/or water leaching (9).

Additionally, bacteria, algae, archaea, or fungi may be genetically-modified to produce or excrete recombinant proteins. The recombinant protein may be purified through precipitation of the protein at its isoelectric point. Examples of proteins produced in this way include casein, lactoglobulin, and lactalbumin, which are extracted from recombinant proteins derived from bacteria such as *Escherichia coli*; yeasts such as *Saccharomyces cerevisiae* and *P. pastoris*; and fungi such as *Rhizopus* (10).

Examples of proteins that may be used in the compositions and/or methods provided herein include, but are not limited to, soy proteins such as glycinin and beta-conglycinin;
wheat proteins, such as gliadin and glutenin;
mung bean proteins, such as vignins, phaseolins, and globulins;
maize proteins, such as zein;
milk proteins, such as whey;
egg proteins, such as albumin;
epidermal proteins, such as keratin, gelatin and collagen; and insect proteins, such as resilin.

Examples of polypeptides derived from bacteria include, but are not limited to, casein, lactoglobulin and lactalbumin, which are extracted from the recombinant proteins derived from *Escherichia coli*. For example, chicken or cattle genes encoding casein, lactoglobulin or lactalbumin polypeptides may be expressed in *E. coli* (10).

Examples of proteins derived from yeasts include, but are not limited to, casein, lactoglobulin and lactalbumin, which are extracted from recombinant proteins derived from *Saccharomyces cerevisiae* and *P. pastoris*. For example, chicken or cow genes encoding casein, lactoglobulin or lactalbumin polypeptides may be expressed in *Saccharomyces cerevisiae* or *P. pastoris* (10).

Examples of proteins derived from other fungi include, but are not limited to, casein, lactoglobulin and lactalbumin, which are extracted from the recombinant proteins derived from the filamentous fungus *Rhizopus*. For example, chicken or cow genes encoding casein, lactoglobulin or lactalbumin polypeptides may be expressed in *Rhizopus* (10).

In some embodiments, the polypeptides are used in a purified form or in combination with one or more other polypeptides and/or other materials.

Polysaccharides

The first composition may additionally comprise one or more polysaccharide(s).

In some embodiments, the first composition additionally comprises one or more polysaccharide(s).

In some embodiments, the first composition does not comprise polysaccharide(s).

In some embodiments, the first composition may additionally comprise one or more polysaccharide(s). In certain other embodiments the first composition does not include polysaccharide(s).

In some embodiments, the extract or isolate from a plant, animal, bacteria, algae, archaea, and/or fungi may additionally comprise one or more polysaccharide(s).

Polysaccharides are polymers of monosaccharides (simple sugars) linked with glycosidic bonds.

There are many methods for extracting or isolating polysaccharides from biological materials that may be used in the compositions and/or methods provided herein. In one such example, polysaccharide extracts may be obtained during the production of defatted beans, seeds or nut flakes. Suitable plant materials first undergo a process of cleaning, drying, conditioning, cracking, dehulling, solvent oil extraction and flash solvent removal. Polysaccharides are subsequently obtained by removing the proteins via alcohol washing, acid leaching and/or water leaching (9).

Examples of polysaccharides that could be used in addition to the polypeptides in the first composition include, but are not limited to, chitin, chitosan, starches derived from wheat, rice, potato or corn, alginate, agar, hyaluronic acid, dextran, chondroitin sulphate, carrageenan, carrageenan-kappa, carrageenan-iota, pullulan, xanthan gum, gellan gum, and/or pectin.

In some embodiments, the first composition may additionally comprise one or more salt derivatives of polysaccharide(s). Examples of salt derivatives of polysaccharide that could be used in addition to the polypeptides in the first composition include, but are not limited to, sodium alginate, potassium alginate, sodium carrageenan, and/or potassium carrageenan.

The polysaccharide may be used in a purified form or in combination with one or more other polypeptides, polysaccharide(s), lipid(s), and/or other materials.

Lipids

The first composition may additionally comprise one or more lipid(s).

In some embodiments, the first composition additionally comprises one or more lipid(s).

In some embodiments, the first composition does not comprise lipids.

In some embodiments, the first composition may additionally comprise one or more lipid(s).

In some embodiments, the extract or isolate from a plant, animal, bacteria, algae, archaea, and/or fungi may additionally comprise one or more lipid(s).

Lipids are class of molecule that are highly diverse in their structure and function. Lipids are typically composed of fatty acids and glycerol, as well as other hydrocarbon chains.

Examples of lipids that could be used in addition to the polypeptides include, but are not limited to:
- plant oils: almond, avocado, canola, coconut, corn, flaxseed, grape seed, hemp seed, jojoba, mustard, olive, palm, peanut, pumpkin seed, rice bran, safflower, sesame, soybean, sunflower, walnut
- animal fats (including milks, butters, lards, and tallows): cattle, sheep, pig, horse, goat, deer, reindeer, bison, moose, elk, camel, wild boar, guinea pig, kangaroo, chicken, turkey, duck, goose, quail, pheasant, guineafowl, ostrich, emu, pigeon, partridge, grouse, snipe, woodcock, salmon, tuna, cod, trout, sardines, haddock, tilapia, catfish, mackerel, swordfish, halibut, dolphinfish, grouper, snapper, sea bass, anchovy, carp, perch, pike, flounder, sole, eel, herring, whitefish, and/or crawfish;
- fatty acids: butyric acid (C4:0), caproic acid (C6:0), caprylic acid (C8:0), capric acid (C10:0), lauric acid (C12:0), myristic acid (C14:0), pentadecanoic acid (C15:0), palmitic acid (C16:0), stearic acid (C18:0), oleic acid (C18:1), linoleic acid (C18:2), alpha-linolenic acid (C18:3), arachidonic acid (C20:4), eicosapentaenoic acid (C20:5) and/or docosahexaenoic acid (C22:6).
- salts of fatty acids;
- phospholipids;
- omega-3 oils;
- algal oils.

The lipids may be used in a purified form or in combination with one or more other polypeptide(s), polysaccharide(s), lipid(s), and/or other material(s).

Polyols

The first composition may additionally comprise one or more polyol(s) and/or polymers of polyols.

In some embodiments, the first composition additionally comprises one or more polyol(s) and/or polymers of polyols.

In some embodiments, the first composition does not comprise polyols and/or polymers of polyols.

Polyols are organic compounds characterised in having multiple hydroxyl (—OH) groups, commonly bonded to carbon atoms, in their molecular structure.

Examples of polyols may include, but are not limited to: Ethylene glycol, Glycerol, Erythritol, Threitol, Arabitol, Xylitol, Ribitol Mannitol, Sorbitol, Galactitol, Fucitol, Iditol, Inositol, Volemitol, Isomalt, Maltitol, Lactitol, Maltotriitol, Maltotetraitol, Polyglycitol, monoacylglycerols, diacylglycerols and/or triacylglycerols.

In some embodiments the first composition additionally comprises polymers of polyols, such as, but not limited to, polyethylene glycol.

In some embodiments the first composition does not comprise polymers of polyols, such as, but not limited to, polyethylene glycol.

In some preferred embodiments, commercially-available forms of protein extracts or isolates, polypeptides, polysaccharides, lipids, and/or polyols are used for the production of the semi-permeable, porous hollow fibres, for example as to avoid additional costs. However, extracts or isolates may also be derived from previous processing steps.

In another preferred embodiment, soy protein isolate (SPI), as obtained from soybeans, are used for the production of the semi-permeable, porous hollow fibres. SPI is the most highly-refined soy protein product commercially available, with some commercial products comprising more than 90% protein (by mass). Soy protein extract is produced from defatted soybean flakes wherein the majority of fat, sugars and fibre have been removed to leave protein as the prominent remaining component. SPI may in some embodiments be produced through the extraction of protein in a mild alkali solution. The extract is then isolated through centrifugation and subsequently acidified to produce protein curd. The curd is washed to remove soluble sugars, neutralised and finally spray-dried (9). Other plant protein isolates may be produced and used in a similar manner.

Hence in one particularly-preferred embodiment, the polypeptides of the compositions and/or methods provided herein comprise soybean polypeptides. In certain embodiments the polypeptides consist essentially of soybean polypeptides.

In some embodiments, the first composition comprises, or consists essentially of, polypeptides, wherein at least 60%, preferably at least 75%, of the polypeptides are soybean polypeptides (e.g., extracted from soybeans).

1.7 STEP (A) DISSOLVING IN A FIRST SOLVENT

In Step (a), the first composition comprising polypeptides is combined with a second composition comprising a solvent and one or more denaturing agents and/or reducing agents, to produce a third composition.

The first composition may additionally comprise one or more polysaccharide(s), lipid(s), polyol(s), polymer(s) of polyol, and/or any combination thereof.

In some embodiments, the first composition additionally comprises one or more polysaccharide(s).

In some embodiments, the first composition additionally comprises one or more lipid(s).

In some embodiments, the first composition additionally comprises one or more polyol(s) and/or polymers of polyols.

In some embodiments, the first composition additionally comprises one or more polysaccharide(s) and lipid(s).

In some embodiments, the first composition additionally comprises one or more lipid(s), and polyol(s) and/or polymers of polyols.

In some embodiments, 5% to 35% (weight per volume) of the first composition is added to the second composition.

In some embodiments, the first composition is added to the second composition to a final concentration of 5% to 35% (w/v of the second composition).

In some embodiments, the percentage of polypeptide in the third composition ranges from 5% to 10%, 10% to 20%, or 20% to 35% (weight per volume).

In some embodiments, the first composition is added to the second composition to a final concentration of 5% to 60% (w/v of the second composition).

In some embodiments, the percentage of polypeptide in the third composition ranges from 35% to 45%, 45% to 55%, or 55% to 60% (weight per volume).

In some embodiments, polysaccharide(s) are added to the first composition in a ratio that is within the range of 1% to 10000% (weight per weight of polypeptide).

In some embodiments, lipid(s) are added to the first composition (i) in a ratio that is within the range of 1% to 10000% (weight per weight of polypeptide).

In some embodiments, polyol(s) and/or polymer(s) of polyols are added to the first composition (i) in a ratio that is within the range of 1% to 10000% (weight per weight of polypeptide).

The second composition comprises one or more solvents and one or more denaturing agents.

In some embodiments, the second composition also comprises one or more reducing agents.

In some embodiments, the second composition is capable of dissolving some or most of the polypeptides in the first composition.

In some embodiments, the second composition is capable of dissolving all or substantially all of the polypeptides in the first composition.

In some embodiments, the second composition is capable of achieving the complete dissolution of the polypeptides (and other components, e.g., polysaccharides, lipids, polyols, polymers of polyols, and/or salts) in the first composition.

The aim of some embodiments is to produce a fourth composition which is a viscous, and extrudable or spinnable composition.

Complete dissolution refers to a process wherein a substance, sometimes referred to as a solute, is completely dissolved into another substance, sometimes referred to as a solvent.

Complete dissolution can be experimentally verified via visible light spectroscopy absorbance measurements. An absorbance measurement can be taken for several samples, complete dissolution can be verified if all of measurements are uniform.

Herein, the terms 'dissolving' and 'solubilising' are used interchangeably.

A person of skill in the art will readily be able to test the solubility of the polypeptides (and other components, e.g., polysaccharides, lipids, salts, when present) in the first composition in various second compositions in order to determine the suitability of the use of that second composition.

In one embodiment, the second composition is one which is capable of breaking disulphide bonds and/or hydrogen bonds in at least one polypeptide in the first composition.

Examples of solvents which may be used in the second composition include aqueous solutions and/or organic solutions.

Examples of aqueous solutions include, aqueous acids, aqueous alkalis and/or aqueous salt solutions.

Examples of organic solutions include, but are not limited to, alcohols.

In some embodiments, solvents used in the second composition may include water, ethanol, acetic acid, propanol and/or formaldehyde, and/or mixtures thereof.

In other embodiments, a solvent used in the second composition is used either alone or in combination with other solvents.

In some preferred embodiments, the solvent used in the second composition is water.

In some embodiments, one or more salts are added to the second composition in order to aid dissolution of the polypeptides (and other components, e.g., polysaccharides, lipids, when present) in the first composition. Examples of salts include, but are not limited to, sodium chloride, potassium chloride, zinc chloride, sodium carbonate, potassium carbonate, sodium bicarbonate, and/or zinc sulphate.

In some embodiments, one or more salts are added to the second composition in order to aid dissolution of the polypeptides (and other components, e.g., polysaccharides, lipids, when present) in the first composition. Examples of salts include, but are not limited to, lithium sulphate, sodium malonate, sodium maleate, potassium sodium tartrate, triammonium citrate, trilithium citrate, trisodium citrate, tripotassium citrate, disodium hydrogen phosphite, sodium hypophosphite, monosodium phosphate, dipotassium phosphate, sodium sulphate, sodium bisulphate, potassium sulphate, ammonium sulphate, or sodium sulphite.

In some embodiments, one or more salts are added to the second composition in order to aid dissolution of the polypeptides (and other components, e.g., polysaccharides, lipids, when present) in the first composition. Examples of salts include, but are not limited to, sodium chloride, potassium chloride, zinc chloride, sodium carbonate, potassium carbonate, sodium bicarbonate, zinc sulphate, lithium sulphate, sodium malonate, sodium maleate, potassium sodium tartrate, triammonium citrate, trilithium citrate, trisodium citrate, tripotassium citrate, disodium hydrogen phosphate, sodium hypophosphite, monosodium phosphate, dipotassium phosphate, sodium sulphate, sodium bisulphate, potassium sulphate, ammonium sulphate, or sodium sulphite.

In some embodiments, one or more salts are added to the second composition are hydrous and/or anhydrous.

In some embodiments, the concentration of each salt which is added to the second composition is within the range of 0.1% to 70% (weight by weight of the polypeptides and other components, e.g., polysaccharides, lipids, when present); preferably, 0.1% to 50%; more preferably, 0.5% to 10%; even more preferably, 1% to 7%; and most preferably 1% to 2%.

In some embodiments, concentration of each salt which is added to the second composition is within the range of 0.1 to 1%, 1% to 10%, 10% to 25%, 25% to 50% or 50% to 70%.

Denaturing and Reducing Agents

The second composition may also comprise one or more denaturing agents and/or one or more reducing agents to solubilise and denature the polypeptides.

In some embodiments, the second composition also comprises one or more denaturing agents to denature the polypeptides of the first composition.

In some embodiments, the second composition also comprises one or more reducing agents to reduce the polypeptides of the first composition.

In some embodiments, the second composition also comprises one or more denaturing agents and/or one or more reducing agents to solubilise and denature the polypeptides of the first composition.

In some embodiments, the second composition does not comprise reducing agents.

In some embodiments, the second composition does not comprise denaturing agents.

In some embodiments, the second composition does not comprise denaturing agents or reducing agents.

The structure of a protein may be referred to in terms of its primary, secondary, and tertiary structures. The primary structure of a protein is the linear sequence of amino acids linked together via peptide bonds to form a polypeptide backbone. The secondary structure of a protein refers to the local folding of the polypeptide backbone into specific shapes and patterns that are stabilized by hydrogen bonding between amino acids which are close to each other in a three-dimensional space. The tertiary structure of a protein refers to three-dimensional shape of a protein which develops due to the interaction of distant amino acids in a three-dimensional space (11).

Secondary structures of proteins include alpha-helices, beta-sheets, beta-helices, and amorphous structures. Alpha-helices are spiral structures held together by hydrogen bonds between the amino acids in the polypeptide backbone. Beta-sheets are flat structures in which hydrogen bonds between adjacent protein chains result in the formation of pleated or accordion-like structures. Beta-helices are helical structures held together by hydrogen bonding between adjacent proteins. Amorphous, disordered, or denatured, used interchangeably herein, are protein structures which lack a well-defined or ordered secondary structure (11).

The primary, secondary and tertiary structures of polypeptides may be disrupted by applying appropriate agents to denature and/or reduce those polypeptides. However, in the production of the covalently-crosslinked, semi-permeable, porous hollow fibres of this disclosure, it is, in some embodiments, desirable to leave the primary structure intact, in order to maximise polypeptide chain entanglement. Alkali and acid solvents have traditionally been used to solubilise and denature polypeptides, but these solvents may also disrupt the primary structure, in addition to the secondary and tertiary structures. By contrast, aqueous urea may solubilise polypeptides, and when used together with reducing agents may denature the secondary and tertiary structures, without disrupting the primary structure (12).

The disruption of the secondary and tertiary structures may enable the solvation and stabilisation of the polypeptide backbone structures. The linear nature of the unfolded molecular backbones may facilitate the lamination of the molecules in solution, which decreases the viscosity of the solution. On extrusion, the linear nature of the molecules in solutions may ensure chain entanglement and alignment to enable the realisation of appropriate mechanical properties. By maximising polypeptide chain length, the degree of polypeptide chain entanglement may be maximised (12). Hence, in some embodiments, solubilisation of polypeptides with acids and alkalis is non-preferred, while solubilisation and denaturation with reducing agents is preferred.

The denaturation and reduction of polypeptides may be achieved by treatment with a number of chemical agents.

Urea is widely used to denature polypeptides for proteomic and metabolomic research, as the secondary and tertiary structures may be disrupted without the destruction of the molecular backbone. Urea may solubilise polypeptides through the interaction of hydrophobic motifs on the surface of the polypeptide tertiary structure to expose and solvate hydrophilic motifs in the protein structure (13).

In some embodiments, urea is used in the second composition in order to solubilise the polypeptides of the first composition in a concentration that is within the range of 0 mol/L to 8, mol/L; 1 mol/L to 8 mol/L; preferably, within the range of 4 mol/L to 8 mol/L or 6 mol/L to 8 mol/L; and most preferably, the concentration is about 8 mol/L.

In some embodiments, the concentration of urea is within the range of 0 mol/L to 1 mol/L, 1 mol/L to 2 mol/L, 2 mol/L to 4 mol/L, 4 mol/L to 6 mol/L or 6 mol/L to 8 mol/L.

Treatment with acid or alkali may also be used to denature and solubilise polypeptides, such as those in the solvent of the second composition in Step (a). However, the use of acid and alkali chemical treatments may disrupt the primary structure of the treated polypeptides (14).

Examples of acids which may be used as denaturing agents include, but are not limited to, oxalic acid, malic acid, succinic acid, adipic acid, tartaric acid, citric acid, malonic acid, acetic acid, formic acid, sulphuric acid, nitric acid, and/or hydrochloric acid.

Examples of alkalis which may be used as denaturing agents include, but are not limited to, sodium hydroxide, potassium hydroxide, calcium hydroxide, and/or magnesium hydroxide.

Examples of other suitable denaturing agents which may be used include, but are not limited to, guanidine hydrochloride, sodium dodecyl sulphate (SDS), Triton X-100, ethanol, acetone, dimethyl sulfoxide (DMSO) sophorolipids, chaotropic salts (e.g., ammonium sulphate) and enzymes. Heat may also be used.

Reducing agents may disrupt disulphide bonds in the polypeptides of the first composition and prevent their reformation by inhibiting their oxidation, thereby aiding the disruption of the secondary and tertiary structures and the formation of a linear molecular backbone.

Examples of suitable reducing agents which may be used include, but are not limited to, N-acetyl-cysteine, L-cysteine, glutathione, ascorbic acid, citric acid, tartaric acid, malic acid, sodium borohydride, sodium sulphite, sodium bisulphite, sodium metabisulphite, sodium hypophosphite, sodium hydrosulphite, mercaptoethanol and dithiothreitol.

In some embodiments, one or more denaturing agents, reducing agents, and/or combinations thereof, are included with the solvent in the second composition in order to aid the solvation of the polypeptides of the first composition to form the third composition.

In some embodiments, the concentration of each denaturing and/or reducing agent are within the range of 0.01 to 50% (by mass) of the polypeptides in the first composition and are included with the solvent of the second composition.

In some embodiments, the concentration of the denaturing and/or reducing agents in the second composition is within the range of 0.01 to 0.1%, 0.1 to 1%, 1% to 10%, 10% to 25%, or 25% to 50% (by mass) of the polypeptides in the first composition.

In some embodiments, the concentration of each denaturing and/or reducing agent are within the range of 0.01 to 1500% (by mass) of the polypeptides in the first composition and are included with the solvent of the second composition.

In some embodiments, the concentration of the denaturing and/or reducing agents in the second composition is within the range of 50 to 75%, 75 to 100%, 100% to 200%, 200% to 300%, 300% to 400%, 400% to 500%, 500% to 600%, 600% to 700%, 700% to 800%, 800% to 900%, 900% to 1000%, or 1000% to 1500%, (by mass) of the polypeptides in the first composition.

In some embodiments, the pH of the second composition is within the range of 5.01 to 9.99; preferably, within the range of 6.0 to 9.0; and most preferably, within the range of 6.5 to 8.5.

In some embodiments, the pH of the second composition is within the range of 5.01 to 6.0; 6.0 to 7.0, 7.0 to 8.0, 8.0 to 9.0, or 9.0 to 9.99.

In some embodiments, the pH of the second composition is within the range of 9.0 to 9.99, 9.1 to 9.8, 9.2 to 9.7, or 9.3 to 9.4.

In some embodiments, in Step (a), the first composition comprises, consists essentially of, or consists of, soybean polypeptides.

In some embodiments, in Step (a), the solvent in the second composition is water.

In some embodiments, in Step (a), the denaturing agents and/or reducing agents in the second composition comprise urea, N-acetyl-cysteine and/or sodium sulphite.

In some embodiments, the pH of the second composition is within the range of 8.0 to 8.5;

In some embodiments, the pH of the second composition is within the range of 9.0 to 9.5;

In some embodiments, Step (a) comprises combining:
(i) a first composition comprising, consisting essentially of, or consisting of, soybean polypeptides with,
(ii) a second composition comprising water, and one or more denaturing and/or reducing agents selected from urea, N-acetyl-cysteine and sodium sulphite, at a pH that is within the range of 8.0 to 8.5;
to produce a third composition.

In some embodiments, Step (a) comprises combining:
(i) a first composition comprising, consisting essentially of, or consisting of, soybean polypeptides with,
(ii) a second composition comprising water, and one or more denaturing and/or reducing agents selected from urea, N-acetyl-cysteine and sodium sulphite, at a pH that is within the range of 8.5 to 9.5;
to produce a third composition.

In some embodiments, Step (a) comprises combining:
(i) a first composition comprising, consisting essentially of, or consisting of, soybean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.0 to 8.5;
to produce a third composition.

In some embodiments, Step (a) comprises combining:
(i) a first composition comprising, consisting essentially of, or consisting of, soybean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.5 to 9.5;
to produce a third composition.

In some embodiments, Step (a) comprises combining:
(i) a first composition comprising, consisting essentially of, or consisting of, mung bean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.0 to 8.5;
to produce a third composition.

In some embodiments, Step (a) comprises combining:
(i) a first composition comprising, consisting essentially of, or consisting of, mung bean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.5 to 9.5;
to produce a third composition.

In some embodiments, Step (a) comprises combining:
(i) a first composition comprising, consisting essentially of, or consisting of, chickpea polypeptides with,
(ii) a second composition comprising water, and one or more salts, denaturing and/or reducing agents selected from urea, sodium bicarbonate, N-acetyl-cysteine and sodium sulphite, at a pH that is within the range of 8.0 to 8.5;
to produce a third composition.

In some embodiments, Step (a) comprises combining:
(i) a first composition comprising, consisting essentially of, or consisting of, chickpea polypeptides with,
(ii) a second composition comprising water, and one or more salts, denaturing and/or reducing agents selected from urea, sodium bicarbonate, N-acetyl-cysteine and sodium sulphite, at a pH that is within the range of 8.5 to 9.5;
to produce a third composition.

In some embodiments, Step (a) comprises combining:
(i) a first composition comprising, consisting essentially of, or consisting of, sunflower seed polypeptides with,
(ii) a second composition comprising water, and one or more salts, denaturing and/or reducing agents selected from urea, sodium bicarbonate, N-acetyl-cysteine and sodium sulphite, at a pH that is within the range of 8.0 to 8.5;

In some embodiments, Step (a) comprises combining:
(i) a first composition comprising, consisting essentially of, or consisting of, sunflower seed polypeptides with,
(ii) a second composition comprising water, and one or more salts, denaturing and/or reducing agents selected from urea, sodium bicarbonate, N-acetyl-cysteine and sodium sulphite, at a pH that is within the range of 8.5 to 9.5;

In some embodiments, Step (a) comprises combining:
(i) a first composition comprising, consisting essentially of, or consisting of, faba bean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.0 to 8.5;

In some embodiments, Step (a) comprises combining:
(i) a first composition comprising, consisting essentially of, or consisting of, faba bean polypeptides with,
(ii) a second composition comprising water, and one or more salts, denaturing and/or reducing agents selected from urea, sodium bicarbonate, N-acetyl-cysteine and sodium sulphite, at a pH that is within the range of 8.5 to 9.5;

In some embodiments, the first composition of any embodiments of this disclosure can be used in the production of Prokitein and/or hollow fibres of this disclosure.

In some embodiments, the second composition of any embodiments of this disclosure can be used in the production of Prokitein and/or hollow fibres of this disclosure.

In some embodiments, the third composition of any embodiments of this disclosure can be used in the production of Prokitein and/or hollow fibres of this disclosure.

1.8 STEP (B) INCUBATING/AGEING THE THIRD COMPOSITION

In Step (b), the third composition is incubated under conditions that may be sufficient to solubilise, and denature and/or reduce at least a fraction of the polypeptides of the first composition, to form the fourth composition. In doing this, the viscosity of the third composition may be decreased, and the secondary and tertiary structures of the polypeptides of the first composition may be disrupted.

In some embodiments, in Step (b), the third composition is incubated under conditions that are sufficient to solubilise, and denature and/or reduce at least a fraction of the polypeptides of the first composition, to form the fourth composition.

In some embodiments, the third composition is incubated for a duration that is within the range of 0 minutes to 7 days; preferably, 10 minutes to 4 days; more preferably, 15 minutes to 1 days; most preferably, 20 minutes to 6 hours.

In some embodiments, the third composition is incubated for a period of time that is within the range of 0 minutes to 5 minutes, 5 minutes to 10 minutes, 10 minutes to 20 minutes, 20 min to 1 hour, 1 hour to 3 hours, 3 hours to 6 hours, 6 hours to 12 hours, 12 hours to 1 day, 1 day to 2 days, 2 days to 3 days, 3 days to 4 days, 4 days to 5 days, 5 days to 6 days, or 6 days to 7 days.

In some embodiments, the third composition is incubated at a temperature that is within the range of −25° C. to 150° C.; or within the range of 15° C. to 90° C.; or within the range of 20° C. to 90° C.

In some embodiments, the third composition is incubated at a temperature that is within the range of −25° C. to 0° C., 0° C. to 25° C., 25° C. to 50° C., 50° C. to 75° C., 75° C. to 100° C., 100° C. to 125° C., or 125° C. to 150° C.

In some embodiments, the third composition is incubated at room temperature.

In some embodiments, the pH of the third composition is within the range of 5.01 to 9.99; preferably, within the range of 6.0 to 9.0; and most preferably, within the range of 6.5 to 8.5.

In some embodiments, the pH of the third composition is within the range of 5.01 to 6.0; 6.0 to 7.0, 7.0 to 8.0, 8.0 to 9.0, or 9.0 to 9.99.

Mixing is herein defined as a mechanical process used to combine different substances or components, typically in a liquid or a homogeneous mixture. Mixing involves the thorough blending of two or more substances to create a uniform composition, ensuring that the individual components are evenly distributed throughout the mixture.

During the incubation step, the third composition may additionally be mixed.

During the incubation step, the third composition may additionally be mixed with a helical ribbon impeller.

In some embodiments, the third composition is mixed during the incubation step.

In some embodiments, the third composition is mixed during the incubation step with a helical ribbon impeller.

In some embodiments, the third composition is not mixed during the incubation step.

In some embodiments, the third composition is mixed for a period of time that is within the range of 0 minutes to 5 minutes, 5 minutes to 10 minutes, 10 minutes to 20 minutes, 20 min to 1 hour, 1 hour to 3 hours, 3 hours to 6 hours, 6 hours to 12 hours, 12 hours to 1 day, 1 day to 2 days, 2 days to 3 days, 3 days to 4 days, 4 days to 5 days, 5 days to 6 days, or 6 days to 7 days.

In some other embodiments, the third composition is mixed throughout a portion of, the majority of, or the entirety of the incubation step.

In some embodiments, the third composition is mixed at a speed that is within the range of 0 rpm to 20,000 rpm; preferably 50 rpm to 10,000 rpm, more preferably 100 rpm to 5,000 rpm, even more preferably 200 rpm to 2,500 rpm, and most preferably 400 rpm to 1,000 rpm.

In some other embodiments, the third composition is mixed at a speed that is within the range of 0 rpm to 5 rpm, 5 rpm to 50 rpm, 50 rpm to 100 rpm, 100 rpm to 150 rpm, 150 rpm to 200 rpm, 200 rpm to 300 rpm, 300 rpm to 400 rpm, 400 rpm to 500 rpm, 500 rpm to 600 rpm, 600 rpm to 700 rpm, 700 rpm to 800 rpm, 800 rpm to 900 rpm, 900 rpm to 1,000 rpm, 1,000 rpm to 1,100 rpm, 1,100 rpm to 1,200 rpm, 1,200 rpm to 1,300 rpm, 1,300 rpm to 1,400 rpm, 1,400 rpm to 1,500 rpm, 1,500 rpm to 1,600 rpm, 1,600 rpm to 1,700 rpm, 1,700 rpm to 1,800 rpm, 1,800 rpm to 1,900 rpm, 1,900 rpm to 2,000 rpm, 2,000 rpm to 2,100 rpm, 2,100 rpm to 2,200 rpm, 2,200 rpm to 2,300 rpm, 2,300 rpm to 2,400 rpm, 2,400 rpm to 2,500 rpm, 2,500 rpm to 2,600 rpm, 2,600 rpm to 2,700 rpm, 2,700 rpm to 2,800 rpm, 2,800 rpm to 2,900 rpm, 2,900 rpm to 3,000 rpm, 3,000 rpm to 3,100 rpm, 3,100 rpm to 3,200 rpm, 3,200 rpm to 3,300 rpm, 3,300 rpm to 3,400 rpm, 3,400 rpm to 3,500 rpm, 3,500 rpm to 3,600 rpm, 3,600 rpm to 3,700 rpm, 3,700 rpm to 3,800 rpm, 3,800 rpm to 3,900 rpm, 3,900 rpm to 4,000 rpm, 4,000 rpm to 4,500 rpm, 4,500 rpm to 5,000 rpm, 5,000 rpm to 5,500 rpm, 5,500 rpm to 6,000 rpm, 6,000 rpm to 6,500 rpm, 6,500 rpm to 7,000 rpm, 7,000 rpm to 7,500 rpm, 7,500 rpm to 8,000 rpm, 8,000 rpm to 8,500 rpm, 8,500 rpm to 9,000 rpm, 9,000 rpm to 9,500 rpm, 9,500 rpm to 10,000 rpm, 10,000 rpm to 10,500 rpm, 10,500 rpm to 11,000 rpm, 11,000 rpm to 11,500 rpm, 11,500 rpm to 12,000 rpm, 12,000 rpm to 12,500 rpm, 12,500 rpm to 13,000 rpm, 13,000 rpm to 13,500 rpm, 13,500 rpm to 14,000 rpm, 14,000 rpm to 14,500 rpm, 14,500 rpm to 15,000 rpm, 15,000 rpm to 15,500 rpm, 15,500 rpm to 16,000 rpm, 16,000 rpm to 16,500 rpm, 16,500 rpm to 17,000 rpm, 17,000 rpm to 17,500 rpm, 17,500 rpm to 18,000 rpm, 18,000 rpm to 18,500 rpm, 18,500 rpm to 19,000 rpm, 19,000 rpm to 19,500 rpm, or 19,500 rpm to 20,000 rpm.

In some preferred embodiments, during incubation, the third composition is mixed at a speed that is within the range of 100 rpm to 400 rpm.

Room temperature may be a temperature within the range of 15° C. to 30° C.

In some embodiments, room temperature is a temperature within the range of 15° C. to 30° C., preferably 18° C. to 25° C., more preferably 19° C. to 22° C. and most preferably 20° C.

In some other preferred embodiments, during incubation at room temperature, the third composition is mixed a speed that is within the range of 400 rpm for 20 minutes with a helical ribbon impeller.

The viscosity of the fourth composition (i.e., after the incubation step) in some embodiments is within the range of 100 cP to 200,000 cP, preferably 100 cP to 1000 cP, 1000 cP to 5,000 cP, 5,000 cP to 10,000 cP, 10,000 cP to 50,000 cP, 50,000 cP to 100,000 cP or 100,000 cP to 200,000 cP, 200,000 cP to 300,000 cP, 300,000 cP to 400,000 cP, 400,000 cP to 500,000 cP, 500,000 cP to 600,000 cP, 600,000 cP to 700,000 cP, 700,000 cP to 800,000 cP, 800,000 cP to 900,000 cP, 900,000 cP to 1,000,000 cP, 1,000,000 cP to 1,100,000 cP, 1,100,000 cP to 1,200,000 cP, 1,200,000 cP to 1,300,000 cP, 1,300,000 cP to 1,400,000 cP, 1,400,000 cP to 1,500,000 cP, 1,500,000 cP to 1,600,000 cP, 1,600,000 cP to 1,700,000 cP, 1,700,000 cP to 1,800,000 cP, 1,800,000 cP to 1,900,000 cP, 1,900,000 cP to 2,000,000 cP at 25° C. and a shear rate of 2 $s^{-1}$.

Brookfield rotational viscometers are the most common device used in the evaluation of sample viscosities. Brookfield rotational viscometers measure the torque required to rotate a spindle in a fluid. For a Newtonian fluid, as the rate of spindle rotation or the surface area of the spindle used increases, the torque required will increase linearly. By evaluating the viscosity of a fluid at a given shear rate and temperature, a characteristic apparent viscosity may be measured. How the relationship between viscosity and shear rate develops determines the rheological characteristic of a fluid. Fluids may be Newtonian, in which shear rate and viscosity are linearly proportional; shear thinning, where the apparent viscosity decreases with an increase in shear rate; shear thickening, where the apparent viscosity increases with an increase in shear rate; a Bingham plastic fluid, which requires a finite yield stress before they begin to flow but then exhibit a linear shear rate and apparent viscosity profile; or a Bingham pseudoplastic fluid, which require a finite yield stress before they flow and exhibit a non-linear shear rate and apparent viscosity profile (15).

Rotational viscometers produced by other manufacturers may be used to evaluate viscosity.

In some embodiments, a fraction of the polypeptides in the third composition is denatured and/or reduced; preferably, this fraction is higher than 50%; more preferably, this fraction is higher than 65%; and most preferably, this fraction is higher than 80%.

In some embodiments, the fraction of the polypeptides in the third composition which are denatured and/or reduced is within the range of 50% to 60%, 60% to 70%, 70% to 80%, 80% to 90%, or 90% to 99.99%.

In some embodiments, the fraction of the polypeptides in the third composition which are denatured and/or reduced is within the range of 0% to 10%, 10% to 20%, 20% to 30%, 30% to 40%, or 40% to 50%.

The denaturation and reduction of the polypeptides in the third composition may be quantified through the use of Fourier transform infrared (FTIR) spectroscopy, circular dichroism, wide-angle X-ray scattering (WAXS) or Raman spectroscopy. By recording representative spectra of the starting organic species, changes in band intensity associated with disulphide bonds may be used to evaluate the degree of reduction. Similarly, changes in band intensity associated with alpha-helices and beta-sheets may be used to determine changes in protein secondary structure.

Other Additives

Void Fraction Components

One or more void fraction components may be introduced into the first, second, third or fourth compositions to aid in the controlled formation of pores in extruded or spun hollow fibres. Void fraction components may impart porosity by acting as pore templates. This may occur as the dope solution undergoes phase inversion and solidifies around particles of the void fraction component. Upon the removal of the void fraction component, the extruded or spun hollow fibres may be left with a microstructure that consists of a pore morphology that is a negative cast of the original particles of the void fraction component. The void inclusion elements may be in the form of a solid, liquid and/or gas.

The pore volume of a material may refer to the total available volume of open space or pores within the material. The porosity of a material may refer to the portion of total material volume occupied by open space or pores, and may be characterised using methods such as mercury porosimetry.

The pore volume and/or porosity of a material may also be determined by image analysis. Images which may be used to determine the porosity of materials include those produced through scanning electron microscopy. By considering the ratio of black and white pixels in a binarized image, the porosity may be determined by one skilled in the art.

In some embodiments, one or more void fraction components are introduced into the first, second, third or fourth compositions to aid in the controlled formation of pores in extruded or spun hollow fibres.

In some embodiments, void inclusion elements include, but are not limited, to powdered, or ground calcium carbonate.

In some embodiments, void inclusion elements include, crushed or ground ice.

In some embodiments, void inclusion elements include, gases such as, but are not limited, air, nitrogen, oxygen, carbon dioxide, helium, neon, argon, xenon, argon, and/or mixtures thereof.

In some embodiments, void inclusion elements include salts such as, but are not limited to, sodium chloride, and potassium chloride.

In some embodiments, void inclusion elements include lipids such as, but are not limited to, plant oils (e.g., almond, avocado, canola, coconut, corn, flaxseed, grape seed, hemp seed, jojoba, mustard, olive, palm, peanut, pumpkin seed, rice bran, safflower, sesame, soybean, sunflower, walnut).

In some embodiments, wherein lipids are used as void inclusion elements, the lipids have secondary process functions that include, but are not limited to, acting as flavour enhancers and as plasticisers.

In some embodiments, void inclusion elements include one or more polyols and/or polymers of polyols.

In some embodiments, void inclusion elements include water soluble polymers such as, but are not limited to polyvinyl alcohol.

For example, solid powdered calcium carbonate may be introduced into the second composition and/or third composition and/or fourth composition. The fourth composition may then be extruded or spun into a coagulation bath. Hydrogen ions in the coagulation bath, donated by a dissolved acidic species (e.g., citric acid), may then react with the calcium carbonate to form calcium salts and carbon dioxide. Following the release of carbon dioxide and dissolution of the salts, voids may be left behind where the calcium carbonate particles were previously.

In another example, salts, such as sodium chloride, may be introduced into the second composition and/or third composition and/or fourth composition. The fourth composition may then be extruded into an aqueous coagulation bath. The excess aqueous solvent in the coagulation bath may then dissolve the salts and may leave voids in place of the salt particles.

In yet another example, a gas, such as air, may be introduced into the third composition, either before or after incubation, by appropriate mixing, mechanical agitation and/or injection of the third composition. The fourth composition may then be extruded into an aqueous coagulation bath. During the coagulation process gas bubbles trapped in the third composition may then result in the formation of void space and pores.

In yet a further example, pores may be formed via a process referred to as 'emulsion templating'. Here, a lipid, such as sunflower oil, may be introduced to the first composition and/or second composition and/or third composition and/or fourth composition. By appropriate mixing or mechanical agitation of the third composition and/or fourth composition, an oil-in-water emulsion or mixture may be formed, in which oil droplets are dispersed within an aqueous phase. The polypeptides of the first composition may act as a surfactant to stabilise the emulsion. The fourth composition may then be extruded or spun into a coagulation bath. Upon removal of the oil droplets from the resulting extruded or spun hollow fibres void spaces may be formed, which may act as pores.

In some embodiments, the void fraction components are added to the first composition in Step (a).

In other embodiments, the void fraction components are added to the second composition in Step (a).

In other embodiments, the void fraction components are added to the third composition before or during the incubation step in Step (b).

In other embodiments, the void fraction components are added to the third composition after the incubation step in Step (b), and then mixed.

In other embodiments, the void fraction components are added to the fourth composition in Step (b).

In a preferred embodiment, the void fraction components are added to the fourth composition in Step (b).

In one embodiment, void inclusion elements are added to the compositions in Step (a) or Step (b), such that the void inclusion elements comprise 1% to 80% of the fourth composition; preferably 20% to 75%; more preferably 30% to 70%; and most preferably 35% to 65% of the fourth composition.

In some embodiments, void inclusion elements are added to the compositions in Step (a) or Step (b), such that the void inclusion elements comprise 1% to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, 65% to 70%, 70% to 75%, and/or 75% to 80% of the fourth composition.

Plasticizers

In some embodiments, one or more other components are added to the compositions in Step (a) or Step (b) to improve the flexibility and ductile properties of the semi-permeable, porous hollow fibres.

In some preferred embodiments, one or more plasticizers are added to the compositions in Step (a) and/or Step (b) to improve the flexibility and ductile properties of the semi-permeable, porous hollow fibres.

Examples of plasticizers may include lipids, polyols and/or polymers of polyols.

In some embodiments, one or more lipid(s), polyol(s) and/or polymer(s) of polyols are added to the compositions of Step (a) and/or Step (b) as plasticisers.

In some embodiments, one or more lipid(s) are added to the compositions of Step (a) and/or Step (b) as plasticisers.

In some embodiments, one or more polyol(s) and/or polymer(s) of polyols are added to the compositions of Step (a) and/or Step (b) as plasticisers.

In one embodiment, one or more plasticizer is added to any of the compositions in Step (a) or Step (b) at any stage.

In a preferred embodiment, one or more plasticizer is added to the fourth composition in Step (b).

In some embodiments plasticisers are not added to the compositions of Step (a) and/or Step (b).

In some embodiments, the plasticizers have secondary process functions that include, but are not limited to, acting as flavour enhancers and as void fraction components.

In one embodiment, one or more plasticisers are added to the compositions in Step (a) and/or Step (b), such that they each comprise 1% to 80% of the fourth composition; preferably 20% to 75%; more preferably 30% to 70%; and most preferably 35% to 65% of the fourth composition.

In some embodiments, one or more plasticisers are added to the compositions in Step (a) or Step (b), such that they each comprise 1% to 5%, 5% to 10%, 10% to 15%, 15% to 20%, 20% to 25%, 25% to 30%, 30% to 35%, 35% to 40%, 40% to 45%, 45% to 50%, 50% to 55%, 55% to 60%, 60% to 65%, 65% to 70%, 70% to 75%, and/or 75% to 80% of the fourth composition.

Flavourings

One or more other components may be added to the compositions of Step (a) and/or Step (b) as flavouring agents which may improve the flavour of the extruded or spun, semi-permeable, porous hollow fibres, comprising covalent ester, thioester and/or amide crosslinked polypeptides.

In some embodiments, one or more other components are added to the compositions in Step (a) and/or Step (b) as flavouring agents to improve the flavour of the extruded or spun, semi-permeable, porous hollow fibres, comprising covalent ester, thioester and/or amide crosslinked polypeptides.

In some embodiments, the flavouring agent(s) added to the compositions in Step (a) and/or Step (b) include, but are not limited to, one or more lipid(s), polyol(s), and/or polymer(s) of polyols.

In some other embodiments, the flavouring agent(s) added to the compositions in Step (a) and/or Step (b) include, but are not limited to, those listed by the European Commission in (EC) No 1334/2008 established in 2012 with regulation EU 872/2012 and non-food sourced flavourings added in amendments in accordance with Regulation EU 2018/1259.

In some embodiments, flavouring agents are not added to the compositions in Step (a) and/or Step (b).

It is contemplated that in some embodiments, the compositions of Step (a) and/or Step (b) are mixed following the addition of at least one additive, including but not limited to, void inclusion elements, plasticisers, and/or flavourings.

Degassing

In some embodiments, the composition(s) of Step (a) and/or Step (b) are degassed.

Herein, degassing also known as degasification, is defined as the partial or complete removal of gas bubbles from any of the compositions.

Controlled degassing may enable the removal of uncontrolled void space in the dope solution.

This may ensure that pore size of the hollow fibres are controlled and uniform, which may enable the cell size exclusion partitioning of the lumen and extra-capillary space of a hollow fibre bioreactor for use in long term cell culture.

In some embodiments, the third composition is degassed.

In some embodiments, the fourth composition is degassed.

Degassing may be achieved via one or more methods which may include, but are not limited to, pressure reduction, thermal regulation, membrane degasification, ultrasonic degassing, freeze-pump-thaw cycling, and/or centrifugation.

In some embodiments, degassing is achieved via centrifugation.

In some embodiments, degassing is achieved via pressure reduction under vacuum.

In some embodiments, degassing is achieved via ultrasonic degassing.

In some embodiments, in Step (b), the third composition is incubated for 2 days to 4 days.

In some embodiments, in Step (b), the third composition is incubated at a temperature between 18° C. and 25° C.

In some embodiments, in Step (b), the third composition is incubated at room temperature.

In some embodiments, in Step (b), the third composition is incubated for 2 days to 4 days at a temperature between 18° C. and 25° C.

In some embodiments, Step (b) additionally comprises the step of introducing one or more void fraction components, preferably powdered calcium carbonate, into the fourth composition.

In some preferred embodiments, Step (b) additionally comprises the step of introducing one or more void fraction components, preferably a lipid, into the fourth composition.

In some embodiments, Step (b) comprises: incubating the third composition for 3 days at a temperature between 18° C. and 25° C., to produce a fourth composition; and introducing lipids into the fourth composition.

In some embodiments, undissolved components of lower densities in the third composition may be removed prior to Step (c) by employing methods such as, but not limited to, centrifugal density-based separation (density gradient centrifugation) as performed via rotational centrifuge.

In another embodiment, by employing centrifugal density-based separation, gases and undissolved components of lower densities in the third composition arise to the surface of the third composition, which may then be mechanically removed.

In some preferred embodiments, the fourth composition is mixed.

In some preferred embodiments, the fourth composition is incubated for 20 minutes and is mixed.

In some preferred embodiments, the fourth composition is degassed.

In some preferred embodiments, one or more lipid is added to the third composition to act as void inclusion element(s). In the subsequent aging process, the third composition is mixed at 400 rpm and at room temperature with an overhead mixer equipped with a helical blade impeller for 20 minutes to form the fourth composition. The fourth composition is then degassed via centrifugation.

In some preferred embodiments, one or more lipid is added to the third composition to act as void inclusion element(s). In the subsequent ageing process, the third composition is mixed at 1000 rpm and at room temperature with an overhead mixer equipped with a helical blade impeller for 20 minutes to form the fourth composition. The fourth composition is then degassed via centrifugation.

In some preferred embodiments, one or more lipid is added to the third composition to act as void inclusion element(s). In the subsequent aging process, the third composition is mixed at 2000 rpm and at room temperature with an overhead mixer equipped with a helical blade impeller for 20 minutes to form the fourth composition. The fourth composition is then degassed via centrifugation.

In some embodiments, the fourth composition of any embodiments of this disclosure can be used in the production of Prokitein and/or hollow fibres of this disclosure.

1.9 STEP (C) EXTRUDING/SPINNING

Step (c) comprises extruding or spinning the fourth composition through a plurality of co-axial orifices, together with a bore solution to produce a plurality of hollow fibres.

A bore solution is herein defined as a solution which fills the lumen of an extruded hollow fibre.

A bore solution may comprise an aqueous solution.

A die, sometimes referred to as a spinneret and used interchangeably herein, consists of a one or more concentric cylinders fed by a corresponding number of inlet streams.

A die may be in the form of a spinneret or a plurality of co-axial orifices.

Extrusion may be used to create an extruded tubular cylindrical product which can be treated to produce hollow fibres of a fixed cross-sectional profile by pushing the fourth composition, together with a bore solution, through a plurality of co-axial orifices (e.g., a die) of the desired cross-section.

As used herein, a bore solution is a solution that is extruded in the inner hollow of the polymer solution, thereby filling and forming the lumen of hollow fibres of the disclosure.

A bore solution may be extruded together with the fourth composition to maintain the channel(s) in the hollow fibres.

In some embodiments, a bore solution is extruded together with the fourth composition to maintain the channel(s) in the hollow fibres.

As per the coagulation bath solution, a bore solution may be formulated to facilitate the polycarboxylic acid derived ester, thioester or amide covalent bond crosslink mediated gelation, precipitation of the covalently-crosslinked hollow fibres, and to facilitate the formation of the extruded or spun hollow fibres, comprising covalent ester, thioester and/or amide crosslinked polypeptides.

In some embodiments, the bore solution is a solution that fills the lumen of hollow fibres.

In some further embodiments, a bore solution is a solution that fills the lumen of hollow fibres and is formulated to facilitate the polycarboxylic acid derived ester, thioester or amide covalent bond crosslink mediated gelation, precipitation of the covalently-crosslinked hollow fibres, and to facilitate the formation of the extruded or spun hollow fibres, comprising covalent ester, thioester and/or amide crosslinked polypeptides.

In some embodiments, the bore solution has the same composition as the coagulation bath solution.

In some embodiments, the bore solution is drawn from the coagulation bath solution and has the same composition as the coagulation bath solution.

In some other embodiments, the bore solution does not have the same composition as the coagulation bath solution.

In some other embodiments, the bore solution comprises thickening agent(s) and/or viscosity modifier(s) to help maintain the channel(s) in the hollow fibres.

In some embodiments the thickening agent(s) and/or viscosity modifier(s) in the bore solution are polysaccharides, which include: chitin, chitosan, starches derived from wheat, rice, potato or corn, alginate, agar, hyaluronic acid, dextran, chondroitin sulphate, carrageenan, carrageenan-kappa, carrageenan-iota, pullulan, xanthan gum, gellan gum, and/or pectin.

In some embodiments, the bore solution is removed after Step (d).

In some embodiments, Step (c) comprises extruding and/or spinning the fourth composition together with a bore solution through a die comprising a plurality of co-axial orifices to produce a plurality of hollow fibres.

The hollow fibres may be tubular and/or cylindrical in shape.

In some embodiments, the hollow fibres are tubular and/or cylindrical in shape.

In some embodiments, the dimensions of the die are selected such as to produce hollow fibres having the dimensions specified herein.

In some embodiments, the fourth composition is extruded through the die at a rate that is within the range of 0.1 mL/hour to 10 mL/hour; more preferably, within the range of 0.5 mL/hour to 5 mL/hour; and most preferably at 1 mL/hour.

In some embodiments, the fourth composition is extruded through the die at a rate that is within the range of 0.1 mL/hour to 0.5 mL/hour, 0.5 mL/hour to 1 mL/hour, 1 mL/hour to 5 mL/hour, or 5 mL/hour to 10 mL/hour.

In some embodiments, the fourth composition is extruded through the die at a rate that is within the range of 0.1 mL/hour to 100 mL/hour; preferably, within the range of 5 mL/hour to 75 mL/hour; more preferably, within the range of 10 mL/hour to 50 mL/hour; and most preferably at 12 mL/hour.

In some embodiments, the fourth composition is extruded through the die at a rate that is within the range of 0.1 mL/hour to 10 mL/hour, 10 mL/hour to 20 mL/hour, 20 mL/hour to 50 mL/hour, 50 mL/hour to 75 mL/hour, or 75 mL/hour to 100 mL/hour.

In some embodiments, the bore solution is extruded through the die at a rate that is within the range of 0.001 mL/hour to 10 mL/hour; more preferably, within the range of 0.05 mL/hour to 5 mL/hour; and most preferably at 1 mL/hour.

In some embodiments, the bore solution is extruded through the die at a rate that is within the range of 10 mL/hour to 30 mL/hour; more preferably, within the range of 10 mL/hour to 20 mL/hour; and more preferably at 12 mL/hour.

In some embodiments, the bore solution is extruded through the die at a rate that is within the range of 0.001 mL/hour to 0.05 mL/hour, 0.05 mL/hour to 0.1 mL/hour, 0.1 mL/hour to 0.5 mL/hour, 0.5 mL/hour to 1 mL/hour, 1 mL/hour to 5 mL/hour, or 5 mL/hour to 10 mL/hour.

In some embodiments, the bore solution is extruded through the die at a rate that is within the range of 10 mL/hour to 15 mL/hour, 15 mL/hour to 20 mL/hour, 20 mL/hour to 25 mL/hour, or 25 mL/hour to 30 mL/hour.

In some embodiments, the plurality of co-axial orifices comprises 2 to 4 orifices; preferably, 2 to 3 orifices; and most preferably, 2 orifices.

In some embodiments, the plurality of co-axial orifices comprises 2 orifices, 3 orifices, or 4 orifices.

Each orifice of the plurality of co-axial orifices may have profiles that are circular, square, triangular, pentagonal, hexagonal and/or other polygons in shape.

In some embodiments, each orifice of the plurality of co-axial orifices has a profile that is circular, square, triangular, pentagonal, hexagonal and/or other polygons in shape.

Dry or wet spinning systems may also be used depending on the composition of the spinning solutions that form the fourth composition.

Spinning, wet spinning, and/or extrusion, are used interchangeably herein and refer to the production of a hollow fibre through a process in which a polymer solution may be passed through a die together with a bore solution, which may consist of a coagulation bath solution, into a coagulation bath in which the polymer solution may solidify into a hollow fibre. The process may be referred to as "wet" spinning as the polymer solution is extruded into a liquid bath. The terms spinning, wet spinning, and/or extrusion may therefore refer to a process which comprises: (i) the preparation of a polymer solution; (ii) die/spinneret assembly; (iii) extrusion of the polymer solution together with a bore solution; (iv) coagulation of the extruded polymer solution; (v) drawing in which the extruded solidified hollow fibres are stretched; (vi) washing, in which residual solvents are removed; and (vii) drying in which the hollow fibres produced are dried and wound onto a spool for storage and future application.

In some embodiments, the fourth composition, together with a bore solution, is extruded or spun into air and/or a gaseous atmosphere to produce hollow fibres. The extruded or spun hollow fibres are then directed either into a coagulation bath or into an atmosphere that coagulates, precipitates or dries the hollow fibres.

In some embodiments, the fourth composition, together with a bore solution, is extruded or spun into an atmosphere and then into a coagulation bath.

In one preferred embodiment, the fourth composition is extruded, together with the bore solution, through a die directly into a coagulation bath.

In some embodiments, Step (c) comprises extruding or spinning the fourth composition, together with a bore solution comprising the coagulation bath solution, through a plurality of co-axial orifices to form one or more hollow fibres with tubular cylindrical geometry directly into a coagulation bath.

In some embodiments the fourth composition is extruded through the outer orifice and a bore solution is extruded through the inner orifice of a die with two concentric cylindrical orifices to form a hollow fibre with a tubular cylindrical geometry.

In some other embodiments, the compositions of both the bore solution and coagulation bath solution include one or more crosslinking reagent(s), such as sodium citrate, and one or more salt(s), such as sodium hypophosphite.

In some further embodiments, the compositions of both the bore solution and coagulation bath solution include one or more crosslinking reagent(s), such as sodium malate, and one or more salt(s), such as sodium hypophosphite.

In some even further embodiments, the compositions of both the bore solution and coagulation bath solution include one or more crosslinking reagent(s), such as sodium citrate.

In yet even further embodiments, the compositions of both the bore solution and coagulation bath solution include one or more crosslinking reagent(s), such as sodium malate.

In some embodiments, the pH of both the bore solution and coagulation bath solutions are within the range of 7.01 to 9.99; preferably, within the range of 8.0 to 9.0; and most preferably, within the range of 8.0 to 8.5.

In some other embodiments, the pH of both the bore solution and coagulation bath solutions are within the range of 7.01 to 8.0, 8.0 to 9.0, or 9.0 to 9.99.

In some embodiments, Step (c) comprises extruding the fourth composition, together with a bore solution that has the same components of the coagulation bath solution, through a co-axial orifice, comprising two orifices of circular profile. The fourth composition is extruded through the outer orifice and the bore solution through the inner orifice. The fourth composition and the bore solution are both extruded directly into a coagulation bath filled with coagulation bath solution. The coagulation bath solution and bore solution both comprise sodium citrate and sodium hypophosphite in an aqueous solution at a pH between 8 and 8.5.

In some embodiments, Step (c) comprises extruding the fourth composition, together with a bore solution that has the same components of the coagulation bath solution, through a co-axial orifice, comprising two orifices of circular profile. The fourth composition is extruded through the outer orifice and the bore solution through the inner orifice. The fourth composition and the bore solution are both extruded directly into a coagulation bath filled with coagulation bath solution. The coagulation bath solution and bore solution both comprise sodium malate in an aqueous solution at a pH between 8 and 8.5.

1.10 STEP (D) COAGULATION AND CROSSLINKING

Step (d) comprises treating the plurality of hollow fibres, produced in Step (c), with a polycarboxylic acid crosslinking reagent which may form inter-polypeptide and/or intra-polypeptide polycarboxylic acid derived ester, thioester or amide covalent bond crosslinks within at least a fraction of the polypeptides comprising the hollow fibres, to produce a plurality of covalently-crosslinked, semi-permeable, porous hollow fibres;

In some embodiments, Step (d) comprises treating the plurality of hollow fibres with a polycarboxylic acid crosslinking reagent to form inter-polypeptide and/or intra-polypeptide polycarboxylic acid derived ester, thioester or amide covalent bond crosslinks within at least a fraction of the polypeptides comprising the hollow fibres, to produce a plurality of covalently-crosslinked, semi-permeable, porous hollow fibres;

Step (d) may be performed in a coagulation bath comprising a coagulation bath solution, as defined herein.

In some embodiments, Step (d) is performed in a coagulation bath comprising a coagulation bath solution.

Step (d) may be carried out using multiple and/or consecutive coagulation baths, comprising coagulation bath solutions of the same composition and/or of different compositions.

In some embodiments, Step (d) is carried out using multiple and/or consecutive coagulation baths, comprising coagulation bath solutions of the same composition and/or of different compositions.

During precipitation and coagulation, a thermodynamically-stable solution of the polypeptides may transform from a liquid state into a solid state in a controlled manner.

Immersing a polypeptide-rich solution (non-solvent), such as the extruded or spun fourth composition from Step (c), in a polypeptide-lean solution (solvent), such as the coagulation bath solution, may form a mixture that will begin to separate into different phases. The phase rich in polypeptides may start to solidify through processes such as gelation, crosslinking, vitrification and/or crystallisation. Separation may be induced in a number of ways, including: (i) immersion precipitation, whereby liquid-liquid interactions between the solvent and non-solvent may lead to the precipitation of the polypeptide; (ii) controlled evaporation of the solvent to potentially isolate the polypeptides; and (iii) gelation, in which bond formation between the polypeptide molecules may be induced during liquid-liquid transfer between the solvent and non-solvent by applying either crosslinking agents and sometimes a catalyst, or altering the isoelectric point with salts (16) or through salting out with Hoffmeister series salts (17).

Covalently crosslinking polypeptides with polycarboxylic acid derived ester, thioester or amide bonds may lead to the formation of larger polypeptide aggregates. The formation of larger polypeptide aggregates in the extruded or spun hollow fibres may decrease both the water solubility and elasticity of the hollow fibres and increase both their material stiffness and tensile strength (9). Hence, the structure and structural integrity of hollow fibres may be altered in Step (d) as to potentially enable the hollow fibres to be used as components within a bioreactor for a prolonged period, as may be required for the cultivation of cells for the production of cultured meat.

The precipitation of the solid phase in the coagulation bath may form porous structures in the solid phase. The principal parameters which may define the porosity of the precipitate are the concentration of the polymer in the polymer-rich phase (i.e., the concentration of the polypeptide in the fourth composition) and the rate at which the precipitate forms. In a process which may be referred to as non-solvent precipitation, the rapid de-mixing of a binary solvent and solute system, upon the addition of a miscible tertiary non-solvent liquid and under favourable thermodynamic conditions may lead to spinodal precipitation potentially resulting in pore formation. Typically, rapid de-mixing and precipitation of the solute into the solid phase yields a more porous precipitate. Such an occurrence may be characterised by a rapid colour change or onset of turbidity in the solute rich phase (16) (18).

Additionally, in a process that may be referred to as 'pore templating', void inclusion elements may be added to the polymer solution prior to extrusion, and subsequently removed from the precipitate to potentially increase the void fraction of the precipitate (19). If the void inclusion element is a lipid, such as sunflower oil, and is used to form an oil-in-water emulsion with the polymer solution to create controlled porous structures, the process may be referred to as 'emulsion templating'.

Covalent crosslinking may be carried out through the reaction of polycarboxylic acids with the reactive groups on the polypeptide backbone, including amine ($-NH_2$), hydroxide (—OH), carboxyl (—COOH) and thiol (—SH) groups, to potentially form ester, thioester or amide covalent bond crosslinks.

Covalent crosslinking may be carried out through the reaction of polycarboxylic acids with the reactive groups in polypeptides and polysaccharides, including amine (—NH$_2$) hydroxide (—OH), carboxyl (—COOH) and thiol (—SH) groups, to potentially form polypeptide-polypeptide, polypeptides-polysaccharide, polysaccharide-polysaccharide ester, thioester and/or amide covalent bond crosslinks.

As used herein, the term "covalent ester, thioester and/or amide bond crosslinked polypeptide" means a polypeptide having at least one or more ester, thioester and/or amide crosslinking bond. It is generally understood that any such ester, thioester and/or amide crosslinking bond would be derived from a polycarboxylic acid. As such, the term "polycarboxylic acid derived covalent ester, thioester and/or amide bond crosslinked polypeptides" encompasses any covalent ester, thioester and/or amide bond crosslinked polypeptide without the need for demonstrating that it was actually derived from a polycarboxylic acid. As such, the terms "covalent ester, thioester and/or amide bond crosslinked polypeptide" and "polycarboxylic acid derived covalent ester, thioester and/or amide bond crosslinked polypeptides" are used interchangeably herein.

In some preferred embodiments, the covalent crosslinking of the polypeptides in the hollow fibres produced in Step (c) is performed via non-specific esterification, thio-esterification or amidation reactions involving the use of polycarboxylic acid salts as non-harsh chemical crosslinking agents.

In some other embodiments, the covalent crosslinking of polypeptides and polysaccharides in the hollow fibres produced in Step (c) is performed via non-specific esterification, thio-esterification or amidation reactions involving the use of polycarboxylic acid salts as chemical crosslinking agents.

In some embodiments, the term "non-harsh chemical" refers to a chemical which is designated as GRAS.

In some other embodiments, the covalent crosslinking of polypeptides and polysaccharides in the hollow fibres produced in Step (c) is performed via non-specific esterification, thio-esterification or amidation reactions involving the use of polycarboxylic acid salts as non-harsh chemical crosslinking agents.

In some embodiments, the polycarboxylic acid salts used to form the covalently-crosslinks in the hollow fibres, produced in Step (c), include, but are not limited to, sodium oxalate, potassium oxalate, sodium malate, potassium malate, sodium succinate, potassium succinate, sodium adipate, potassium adipate, sodium tartrate, potassium tartrate, potassium citrate, sodium citrate, sodium malonate, potassium malonate, and/or combinations thereof; and preferably, sodium citrate.

In some other embodiments, covalent crosslinking with polycarboxylic salts with more than one carboxyl groups is carried out under alkaline conditions leading to the formation of non-specific ester, thioester or amide-bond covalent crosslinks (20).

The use of alkaline conditions may allow for the covalent crosslinking of polypeptides at low temperatures, which may increase the energy efficiency of the production process and negate the potential yellowing of materials seen when operating at higher temperatures (20).

In some further embodiments, polycarboxylic acid salts with more than one carboxyl group form crosslinks in a solution comprising other salts, including, but not limited to, sodium hypophosphite (22), in which sodium hypophosphite acts as a catalyst or is integrated into the crosslinks (22; 23).

One or more polycarboxylic acid salt crosslinking agents may be used.

In some embodiments, a single polycarboxylic acid salt crosslinking agents is used.

In other embodiments, one or more polycarboxylic acid salt crosslinking agents are used.

In further embodiments, multiple polycarboxylic acid salt crosslinking agents are used in combination.

In some embodiments, the concentration of each polycarboxylic acid salt crosslinking agent in the coagulation bath solution is within the range of 0.01% (w/v) to 50% (w/v); and preferably, within the range of 0.05% (w/v) to 35% (w/v); more preferably, within the range of 0.1% (w/v) to 30% (w/v); even more preferably, within the range of 1% (w/v) to 25% (w/v); and most preferably, within the range of 5% (w/v) to 15% (w/v), relative to the volume of the solution.

In some other embodiments, the concentration of each polycarboxylic acid salt crosslinking agent in the coagulation bath solution is within the range of 0.01% (w/v) to 1% (w/v), 1% (w/v) to 5% (w/v), 5% (w/v) to 10% (w/v), 10% (w/v) to 15% (w/v), 15% (w/v) to 20% (w/v), 20% (w/v) to 25% (w/v), 25% (w/v) to 30% (w/v), 30% (w/v) to 35% (w/v), 35% (w/v) to 40% (w/v), 40% (w/v) to 45% (w/v), or 45% (w/v) to 50% (w/v), relative to the volume of the solution.

In some embodiments, the temperature used in the covalently crosslinking step is room temperature, or at temperatures that are either higher or lower than room temperature; preferably, in the range of 5° C. to 95° C.; more preferably, in the range of 10° C. to 75° C.; even more preferably, in the range of 15° C. to 65° C.; yet even more preferably, in the range of 20° C. to 60° C.; and most preferably, in the range of 30° C. to 55° C.

In some other embodiments, the temperature used in the covalently crosslinking step is within the range of 5° C. to 10° C., 10° C. to 20° C., 20° C. to 30° C., 30° C. to 50° C., 50° C. to 75° C., or 75° C. to 95° C.

In some embodiments, the pressure used in the covalently crosslinking step could be atmospheric pressure, or at pressures that are either higher or lower than atmospheric pressure; preferably, in the range of 90000 Pa to 109000 Pa; more preferably, in the range of 96400 Pa to 108400 Pa; and most preferably, in the range of 100825 Pa to 101825 Pa.

In some other embodiments, the pressure used in the covalently crosslinking step is in the range of 90000 Pa to 109000 Pa, 95000 Pa to 105000 Pa, or 100000 Pa to 102000 Pa.

In some embodiments, the pH used in the covalently crosslinking step could be within the range of 7.01 to 9.99; preferably, within the range of 8.0 to 9.0; and most preferably, within the range of 8.0 and 8.5.

In some other embodiments, the pH used in the covalently crosslinking step is within the range of 7.01 to 7.5, 7.5 to 8.0, 8.0 to 8.5, 8.5 to 9.0, 9.0 to 9.5, and 9.5 to 9.99.

In some other embodiments, the duration of the covalent crosslinking step is within the range of 30 seconds and 6 hours; preferably, within the range of 10 minutes and 6 hours; more preferably, within the range of 20 minutes and 3 hours; even more preferably, within the range of 30 minutes and 2 hours; and most preferably, within the range of 45 minutes and 1 hour.

In some other embodiments, the duration of the covalently crosslinking step is within the range of 30 seconds to 60 seconds, 1 minute to 30 minutes, 30 minutes to 60 minutes, 1 hour to 2 hours, 2 hours to 3 hours, 3 hours to 4 hours, 4 hours to 5 hours, 5 hours to 6 hours.

In some other embodiments, the duration of the covalent crosslinking step is within the range of 6 hours and 7 days; preferably, within the range of 6 hours and 72 hours; and more preferably, within the range of 12 hours and 24 hours.

In some other embodiments, the duration of the covalently crosslinking step is within the range of 30 seconds to 7 days, 24 hours to 96 hours, 30 seconds to 6 hours, 6 hours to 12 hours, 12 hours to 24 hours, 24 hours to 48 hours, 48 hours to 72 hours, 72 hours to 96 hours, or 96 hours and/or 7 days.

Coagulation Bath A coagulation bath solution of Step (d) may comprise at least one polycarboxylic acid salt crosslinking agent dissolved in an aqueous solvent or in a mixture of multiple solvents.

In some embodiments, a coagulation bath solution of Step (d) comprises at least one polycarboxylic acid salt crosslinking agent dissolved in an aqueous solvent or in a mixture of multiple solvents.

In some embodiments, a coagulation bath solution of Step (d) contains aqueous solvents, such as water.

In some embodiments, a coagulation bath solution of Step (d) additionally comprises at least one, alkali, acid, alcohol, catalyst, organic solvent, salt, and/or any combination thereof.

In some embodiments, a coagulation bath solution of Step (d) contains one or more polycarboxylic acid salt crosslinking agents, including, sodium oxalate, potassium oxalate, sodium malate, potassium malate, sodium succinate, potassium succinate, sodium adipate, potassium adipate, sodium tartrate, potassium tartrate, potassium citrate, sodium citrate, sodium malonate, potassium malonate, and/or any combination thereof.

In some embodiments, the concentration of each polycarboxylic acid salt crosslinking agent within a coagulation bath solution of Step (d) is within the range of 0.1% (w/v) to 40% (w/v); preferably, within the range of 10% (w/v) to 30% (w/v); more preferably, within the range of 20% (w/v) to 28% (w/v); and most preferably at 25% (w/v), relative to the volume of the solution.

In some other embodiments, the concentration of each polycarboxylic acid salt crosslinking agent within a coagulation bath solution of Step (d) is within the range of 0.1% (w/v) to 1% (w/v), 1% (w/v) to 5% (w/v), 5% (w/v) to 10% (w/v), 10% (w/v) to 20% (w/v), and/or % (w/v) to 40% (w/v), relative to the volume of the solution.

In some embodiments, a coagulation bath solution of Step (d) contains catalysts which include zinc sulphate, sodium sulphite, sodium bisulphite, sodium meta-bisulphite, sodium hypophosphite and/or ammonium sulphate.

In some other embodiments, the concentration of each catalyst within a coagulation bath solution of Step (d) is within the range of 0.1% (w/v) to 40% (w/v); preferably, within the range of 5% (w/v) to 15% (w/v) more preferably, within the range of 10% (w/v) to 14% (w/v); and most preferably at 12.5% (w/v) relative to the volume of the solution.

In some embodiments, the concentration of each catalyst within a coagulation bath solution of Step (d) is within the range of 0.1% (w/v) to 1% (w/v), 1% (w/v) to 5% (w/v), 5% (w/v) to 10% (w/v), 10% (w/v) to 20% (w/v), and/or % (w/v) to 40% (w/v) relative to the volume of the solution.

In some embodiments, a coagulation bath solution of Step (d) contains alkalis which include, but are not limited to sodium hydroxide, potassium hydroxide, calcium hydroxide, magnesium hydroxide and/or sodium carbonate.

In some embodiments, a coagulation bath solution of Step (d) contains alkalis which include, but are not limited to, ammonium hydroxide, potassium carbonate, and/or sodium bicarbonate.

In some embodiments, a coagulation bath solution of Step (d) contains acids which include, but are not limited to, ascorbic acid, acetic acid, adipic acid, citric acid, formic acid, hydrochloric acid, lactic acid, malic acid, malonic acid, oxalic acid, succinic acid, sulphuric acid and/or tartaric acid.

In some embodiments, the pH of a coagulation bath solution of Step (d) is within the range of 7.01 to 9.99; preferably, within the range of 8.0 to 9.0; and most preferably, within the range of 8.0 and 8.5.

In some other embodiments, the pH of a coagulation bath solution of Step (d) is within the range of 7.01 to 7.5, 7.5 to 8.0, 8.0 to 8.5, 8.5 to 9.0, 9.0 to 9.5, and 9.5 to 9.99.

In some embodiments, a coagulation bath solution of Step (d) contains one or more alcohols which include, but are not limited to methanol, ethanol, propanol, iso-propanol, butanol and/or iso-butanol.

In some other embodiments, a coagulation bath solution of Step (d) contains alcohols with a concentration of 0.5% to 5% (v/v), 5% to 10% (v/v), 10% to 30% (v/v), 20% to 30% (v/v), 30% to 40% (v/v), 40% to 50% (v/v), 50% to 60% (v/v), 60% to 70% (v/v), 70% to 80% (v/v), 80% to 90% (v/v), or 90% to 99.99% (v/v), relative to the total coagulation bath solution volume.

In some embodiments, a coagulation bath solution of Step (d) contains one or more salts including, but not limited to, ammonium sulphate, disodium hydrogen phosphite, dipotassium phosphate, lithium sulphate, monosodium phosphate, potassium carbonate, potassium chloride, potassium sulphate, sodium bicarbonate, sodium bisulphate, sodium carbonate, sodium chloride, sodium hypophosphite, sodium malonate, sodium maleate, sodium meta-bisulphite, sodium sulphate, sodium sulphite, trilithium citrate, triammonium citrate, trisodium citrate, tripotassium citrate, zinc chloride, and/or zinc sulphate.

In some embodiments, a coagulation bath solution of Step (d) contains one or more salts including, but not limited to, disodium malate.

Herein, sodium malate, and disodium malate are used interchangeably.

In some embodiments, the concentration of each salt within a coagulation bath solution of Step (d) is within the range of 0.01% (w/v) to 40% (w/v); preferably, within the range of 0.1% (w/v) to 10% (w/v) more preferably, within the range of 0.5% (w/v) to 5% (w/v); and most preferably, at 1% (w/v), relative to the volume of the solution.

In some other embodiments, the concentration of each salt within a coagulation bath solution of Step (d) is within the range of 0.01% (w/v) to 0.1% (w/v), 0.1% (w/v) to 1% (w/v), 1% (w/v) to 5% (w/v), 5% (w/v) to 10% (w/v), 10% (w/v) to 20% (w/v), and/or % (w/v) to 40% (w/v) relative to the volume of the solution.

In some embodiments, the temperature of a coagulation bath solution of Step (d) is room temperature, or at temperatures that are either higher or lower than room temperature; preferably, in the range of 5° C. to 95° C.; more preferably, in the range of 10° C. to 75° C.; even more preferably, in the range of 15° C. to 65° C.; yet even more preferably, in the range of 20° C. to 60° C.; and most preferably, in the range of 20° C. to 35° C.

In some other embodiments, the temperature of a coagulation bath solution of Step (d) is within the range of 5° C. to 10° C., 10° C. to 20° C., 20° C. to 30° C., 30° C. to 50° C., 50° C. to 75° C., or 75° C. to 95° C.

Coagulation Bath Solution

In some preferred embodiments, a coagulation bath solution of Step (d) comprises water, which also contains sodium citrate 25% (w/v) and sodium hypophosphite 12.5% (w/v), relative to the volume of the coagulation bath solution, and is at a pH within the range of 7.01 to 9.99 at room temperature.

In other preferred embodiments, a coagulation bath solution of Step (d) comprises water which also contains sodium malate and is at a pH within the range of 7.01 to 9.99 at room temperature.

In some preferred embodiments, a coagulation bath solution of Step (d) does not have more than 5% (w/v) polypeptides prior to the immersion of the extruded or spun fibres.

In other preferred embodiments, a coagulation bath solution of Step (d) does not comprise more than 1% (w/v) polypeptides prior to the immersion of the extruded or spun hollow fibres.

For wet spinning, a suitable coagulation bath solution may comprise a solvent, or multiple solvents, together with one or more polycarboxylic acid salt crosslinking agent(s) in a mixture, that may also include a mixture of catalysts and/or salts, such as sodium hypophosphite. The coagulation bath solution may be formulated to facilitate the polycarboxylic acid derived ester, thioester or amide covalent bond crosslink mediated gelation, precipitation of the covalently-crosslinked hollow fibres. Consequently, this may facilitate the formation of the extruded or spun hollow fibres, comprising covalent ester, thioester and/or amide crosslinked polypeptides.

In some embodiments, the fraction of the polypeptides in the extruded or spun hollow fibres which are covalently-crosslinked is at least 10%, preferably, at least 20% more preferably, at least 40%, even more preferably, at least 60% and most preferably, at least 80%.

In some embodiments, the fraction of the polypeptides in the extruded or spun hollow fibres which are covalently-crosslinked ranges from 10% to 30%, 20% to 30%, 30% to 40%, 40% to 50%, 50 to 60%, 60 to 70%, 70 to 80%, 80 to 90% or 90% to 99.99%.

The extent by which crosslinking has occurred in the polypeptides of the extruded or spun hollow fibres may be readily determined by a person of skill in the art by methods that include Sodium dodecyl sulphate-polyacrylamide gel electrophoresis (SDS-PAGE), mass spectrometry, Fourier transform infrared (FTIR) spectroscopy and Raman spectroscopy.

To evaluate the degree of covalent-crosslinking with SDS-PAGE, a covalently-crosslinked sample is run through an SDS-PAGE gel alongside a non-crosslinked sample and a channel of proteins with known masses. The theoretical mass of emergent bands in the crosslinked sample and non-crosslinked sample channels may be calculated by comparing the distance of the bands along the channels relative to that of the bands in the channel with proteins of known mass. By evaluating the relative masses of the bands in the crosslinked and non-cross linked sample channels, the degree of crosslinking associated with each band may be calculated.

Structural changes associated with crosslinking may be evaluated by the change in band intensities associated with various functional groups as determined by FTIR or Raman spectroscopy.

In some preferred embodiments, Step (d) comprises treating the polypeptides of the hollow fibres produced in Step (c) in a coagulation bath filled with an aqueous coagulation bath solution, comprising sodium citrate, at a pH between 8.0 and 8.5, room temperature, and a pressure between 100825 Pa to 101825 Pa, for a duration of 1 hour.

In some other preferred embodiments, Step (d) comprises treating the polypeptides of the hollow fibres produced in Step (c) in a coagulation bath filled with an aqueous coagulation bath solution, comprising sodium succinate and sodium hypophosphite, at a pH between 8.0 and 8.5, room temperature, and a pressure between 100825 Pa to 101825 Pa, for 1 hour and 30 minutes.

In some further preferred embodiments, Step (d) comprises treating the polypeptides of the hollow fibres produced in Step (c) in a coagulation bath filled with an aqueous coagulation bath solution, comprising sodium malate and sodium hypophosphite, at a pH between 8.0 and 8.5, room temperature, and a pressure between 100825 Pa to 101825 Pa, for a duration of 30 minutes.

In some yet further preferred embodiments, Step (d) comprises treating the polypeptides of the hollow fibres produced in Step (c) in a coagulation bath filled with an aqueous coagulation bath solution, comprising sodium malate, at a pH between 8.0 and 8.5, room temperature, and a pressure between 100825 Pa to 101825 Pa, for a duration of 30 minutes.

In some particularly preferred embodiments, Step (d) comprises treating the polypeptides of the hollow fibres produced in Step (c) in a coagulation bath filled with an aqueous coagulation bath solution, comprising sodium citrate and sodium hypophosphite, at a pH between 8.0 and 8.5, room temperature, and a pressure between 100825 Pa to 101825 Pa, for a duration of 1 hour.

In some embodiments, the coagulation bath of any embodiments of this disclosure can be used in the production of Prokitein and/or hollow fibres of this disclosure.

In some embodiments, the polycarboxylic acid crosslinking reagent of any embodiments of this disclosure can be used in the production of Prokitein and/or hollow fibres of this disclosure.

In some embodiments, the covalently-crosslinked polypeptides of any embodiments of this disclosure can be used in the production of Prokitein and/or hollow fibres of this disclosure.

1.11 STEP (E) POST PRODUCTION MODIFICATIONS

Step (e) may comprise treating the covalently-crosslinked, semi-permeable, porous hollow fibres, produced in Step (d), with at least one post-production modification process.

In some embodiments, Step (e) comprises treating the covalently-crosslinked, semi-permeable, porous hollow fibres, produced in Step (d), with at least one post-production modification process.

The covalently-crosslinked, semi-permeable, porous hollow fibres may be further treated as part of their production, or as a post-production modification, in order to potentially enhance one or more of the mechanical properties, fluid transport, permeability and water stability of the hollow fibres.

In some embodiments, the covalently-crosslinked, semi-permeable, porous hollow fibres are further treated as part of their production, or as a post-production modification, to enhance one or more of the mechanical properties, fluid transport, permeability and water stability of the hollow fibres.

1.12 STEP (E.I) MACROMOLECULE SECONDARY STRUCTURE MODIFICATION

Step (e.i) may comprise treating the covalently-crosslinked, semi-permeable, porous hollow fibres with an organic solvent to increase the relative abundance of beta-sheets in the secondary structure of the polypeptides.

In some embodiments, Step (e.i) comprises treating the covalently-crosslinked, semi-permeable, porous hollow fibres with an organic solvent to increase the relative abundance of beta-sheets in the secondary structure of the polypeptides.

In particular, the covalently-crosslinked, semi-permeable, porous hollow fibres may be treated with organic solvents to dehydrate them and alter the secondary macromolecular structures of the constituent polypeptides.

In some embodiments, the covalently-crosslinked, semi-permeable, porous hollow fibres are treated with organic solvents to dehydrate them and alter the secondary macromolecular structures of the constituent polypeptides.

The aim of Step (e.i) is to potentially alter the secondary macromolecular structure of the polypeptides in the covalently-crosslinked, semi-permeable, porous hollow fibres, for the purpose of increasing the abundance of beta-sheets and beta-coils, relative to amorphous random coils and alpha-helices. This change in the secondary structure may result in an increase in water stability of the hollow fibres, such that their mechanical properties may remain relatively unaltered following continuous submersion in an aqueous solution for 3 or more days (24) (25) (27; 28).

In some embodiments, the alteration of the secondary macromolecular structure of the polypeptides in the covalently-crosslinked, semi-permeable, porous hollow fibres is achieved with organic solvents and, either through solution washes and/or vapour exposure.

In some embodiments, the alteration of the secondary macromolecular structure of the polypeptides in the covalently-crosslinked, semi-permeable, porous hollow fibres is achieved with organic solvents in an aqueous solution.

In some embodiments, the alteration of the secondary macromolecular structure of the polypeptides in the covalently-crosslinked, semi-permeable, porous hollow fibres is achieved with supercritical $CO_2$.

In some embodiments, the covalently-crosslinked, semi-permeable, porous hollow fibres are treated with one or more organic solvents that include, but are not limited to methanol, ethanol, propanol, iso-propanol, butanol, iso-butanol, dimethyl sulfoxide, dimethylformamide, dimethylacetamide, and/or mixtures thereof.

In some embodiments, the covalently-crosslinked, semi-permeable, porous hollow fibres are treated with one or more organic solvents that include acetone.

In some embodiments, the covalently-crosslinked, semi-permeable, porous hollow fibres are treated with one or more polyol(s) and/or polymer(s) of polyols.

In some embodiments, the alteration of the secondary macromolecular structure of the polypeptides in the covalently-crosslinked, semi-permeable, porous hollow fibres is achieved with polyol(s) and/or polymer(s) of polyols in an aqueous solution.

In some embodiments, the alteration of the secondary macromolecular structure of the polypeptides in the covalently-crosslinked, semi-permeable, porous hollow fibres is achieved a solution comprising water, organic solvents, polyol(s) and/or polymer(s) of polyols.

In some embodiments, the covalently-crosslinked, semi-permeable, porous hollow fibres are treated with one or more fluids including, but not limited to, supercritical $CO_2$.

Herein, supercritical $CO_2$ is considered to behave akin to an organic solvent, above the critical point of $CO_2$, and is referred to as such.

Similarly, the term 'organic solvent' is considered to include supercritical $CO_2$.

In some embodiments, the concentration of any singular component in the solvent mixture used in the formation of beta-sheets in the covalently-crosslinked, semi-permeable, porous hollow fibres is within the range of 0% (w/v) to 100% (w/v); preferably, within the range of 10% (w/v) to 75% (w/v); and most preferably, within the range of 20% (w/v) to 60% (w/v), relative to the total solvent mixture volume.

In some other embodiments, the concentration of any singular component in the solvent mixture used in the formation of beta-sheets in the covalently-crosslinked, semi-permeable, porous hollow fibres is within the range of 0% (w/v) to 5% (w/v), 5% (w/v) to 10% (w/v), 10% (w/v) to 15% (w/v), 15% (w/v) to 20% (w/v), 20% (w/v) to 25% (w/v), 25% (w/v) to 30% (w/v), 30% (w/v) to 35% (w/v), 35% (w/v) to 40% (w/v), 40% (w/v) to 45% (w/v), 45% (w/v) to 50% (w/v), 50% (w/v) to 55% (w/v), 55% (w/v) to 60% (w/v), 60% (w/v) to 65% (w/v), 65% (w/v) to 70% (w/v), 70% (w/v) to 75% (w/v), 75% (w/v) to 80% (w/v), 80% (w/v) to 85% (w/v), 85% (w/v) to 90% (w/v), 90% (w/v) to 95% (w/v), or 95% (w/v) to 100% (w/v), relative to the total solvent mixture volume.

In some embodiments, the treatment of the covalently-crosslinked, semi-permeable, porous hollow fibres with one or more organic solvents is carried out at a temperature that is within the range of 0° C. to 90° C.; preferably, within the range of 10° C. to 80° C.; more preferably, within the range of 20° C. to 70° C.; even more preferably, within the range of 30° C. to 60° C.; and most preferably, at room temperature.

In some other embodiments, the treatment of the covalently-crosslinked, semi-permeable, porous hollow fibres with one or more organic solvents is carried out at a temperature that is within the range of 10° C. to 20° C., 20° C. to 30° C., 30° C. to 40° C., 40° C. to 50° C., 50° C. to 60° C., 60° C. to 70° C., 70° C. to 80° C., or 80° C. to 90° C.

In some other embodiments, the treatment of the covalently-crosslinked, semi-permeable, porous hollow fibres with one or more solvent is carried out at a temperature that is within the range of 15 to 300° C., preferably, within the range of 100° C. to 250° C.; more preferably, within the range of 130° C. to 200° C.; even more preferably, within the range of 150° C. to 180° C.; and most preferably, at 175° C.

In some other embodiments, the treatment of the covalently-crosslinked, semi-permeable, porous hollow fibres with one or more solvent is carried out across a range of temperatures.

In some embodiments, the treatment of the covalently-crosslinked, semi-permeable, porous hollow fibres with one or more organic solvents is carried out at atmospheric pressure, or at pressures that are either higher or lower than atmospheric pressure; preferably, in the range of 90000 Pa to 109000 Pa; more preferably, in the range of 96400 Pa to 108400 Pa; and most preferably, in the range of 100825 Pa to 101825 Pa.

In some other embodiments, the pressure used in the organic solvent wash step is in the range of 90000 Pa to 109000 Pa, 95000 Pa to 105000 Pa, or 100000 Pa to 102000 Pa.

In some embodiments, the treatment of the covalently-crosslinked, semi-permeable, porous hollow fibres with one or more solvent is carried out at a pressure that is within the range of 0.1 MPa to 100 MPa; preferably, in the range of 7 MPa to 50 MPa; and more preferably, in the range of 10 MPa to 25 MPa.

In some embodiments, the treatment of the covalently-crosslinked, semi-permeable, porous hollow fibres with one or more solvent is carried out in a pressure vessel.

In some embodiments, the treatment of the covalently-crosslinked, semi-permeable, porous hollow fibres with one or more organic solvents is carried out over a duration that is within the range of 1 second to 10 days; preferably, within the range of 10 minutes and 3 hours; more preferably, within the range ranging from 40 and 90 minutes; and most preferably for 1 hour.

In some other embodiments, the treatment of the covalently-crosslinked, semi-permeable, porous hollow fibres with one or more organic solvents is carried out over a duration that is within the range of 10 minutes and 30 minutes, 30 minutes and 45 minutes, 45 minutes and 1 hour, 1 hour and 2 hours, 2 hours and 3 hours, 3 hours and 4 hours, 4 hours and 5 hours, 5 hours and 6 hours, 6 hours and 7 hours, 7 hours and 8 hours, 8 hours and 9 hours, 9 hours and 10 hours, 10 hours and 11 hours, 11 hours and 12 hours, 12 hours and 13 hours, 13 hours and 14 hours, 14 hours and 15 hours, 15 hours and 16 hours, 16 hours and 17 hours, 17 hours and 18 hours, 18 hours and 19 hours, 19 hours and 20 hours, 20 hours and 21 hours, 21 hours and 22 hours, 22 hours and 23 hours, 23 hours and 24 hours, 24 hours and 25 hours, 25 hours and 26 hours, 26 hours and 27 hours, 27 hours and 28 hours, 28 hours and 29 hours, 29 hours and 30 hours, 30 hours and 31 hours, 31 hours and 32 hours, 32 hours and 33 hours, 33 hours and 34 hours, 34 hours and 35 hours, 35 hours and 36 hours, 36 hours and 37 hours, 37 hours and 38 hours, 38 hours and 39 hours, 39 hours and 40 hours, 40 hours and 41 hours, 41 hours and 42 hours, 42 hours and 43 hours, 43 hours and 44 hours, 44 hours and 45 hours, 45 hours and 46 hours, 46 hours and 47 hours, 47 hours and 48 hours, 48 hours and 3 days, 3 day and 4 days, 4 days and 5 days, 5 days and 7 days, or 7 days and 10 days.

Changes in the secondary macromolecular structure of the polypeptides in the covalently-crosslinked hollow fibres may be determined by evaluating the changes in intensity of peaks associated with amorphous random coils, alpha-helices, beta-helices, beta-sheets and disordered structures. This type of analysis may be performed by a person of skill in the art using methods that include Fourier transform infrared (FTIR) spectroscopy, circular dichroism, wide-angle X-ray scattering (WAXS), and Raman spectroscopy.

In some particularly preferred embodiments, Step (e.i) comprises treating the covalently-crosslinked, semi-permeable, porous hollow fibres produced in Step (d) in a liquid solvent bath comprising at least 40% ethanol at room temperature and atmospheric pressure for one hour.

In some conceived embodiments, a coagulation bath solution of Step (d) comprises organic solvents, such that Step (d) is effectively combined with Step (e.i). In this embodiment, beta-sheet formation occurs concurrent to the coagulation, solidification, and cross-linking of the polypeptides.

In some embodiments, the organic solvents used in of any the embodiments of this disclosure can be used in the production of Prokitein and/or hollow fibres of this disclosure.

1.13 STEP (E.II) ANNEALING

Step (e.ii) may comprise annealing the covalently-crosslinked, semi-permeable, porous hollow fibres.

The annealing process typically allow crystalline structures to rearrange into more stable forms which may be used to decrease internal stresses in the covalently-crosslinked, semi-permeable, porous hollow fibres. More specifically, the annealing process may allow the beta-sheets formed in Step (e.i) to become the stable micro-structure state of the hollow fibres. Consequently, the beta-sheet micro-structure may remain intact upon rehydration of the hollow fibres and prevent the hydrolysis of the ester crosslinks formed in Step (d). Collectively, the consecutive covalent ester crosslinking, beta-sheet formation and annealing steps may grant the hollow fibres long-term water stability, enabling their use for long-term cell culture, as necessary in the production of cultivated meat products.

In some embodiments, the annealing process allows crystalline structures to rearrange into more stable forms to decrease internal stresses in the covalently-crosslinked, semi-permeable, porous hollow fibres. More specifically, the annealing process results in the beta-sheets formed in Step (e.i) to become the stable micro-structure state of the hollow fibres. Consequently, the beta-sheet micro-structure remains intact upon rehydration of the hollow fibres and prevents the hydrolysis of the ester crosslinks formed in Step (d). Collectively, the consecutive covalent ester crosslinking, beta-sheet formation and annealing steps grant the hollow fibres long-term water stability, enabling their use for long-term cell culture, as necessary in the production of cultivated meat products.

The treated covalently-crosslinked, semi-permeable, porous hollow fibres may be partially or completely dried prior to annealing, in a process herein referred to as "pre-drying".

In some embodiments, the treated covalently-crosslinked, semi-permeable, porous hollow fibres are partially dried prior to annealing, such that some water still remains within the microstructure of the hollow fibres.

In some embodiments, the treated covalently-crosslinked, semi-permeable, porous hollow fibres are completely dried prior to annealing, such that, ostensibly, all of the water is removed from the microstructure of the hollow fibres.

In some embodiments, the treated covalently-crosslinked, semi-permeable, porous hollow fibres are not dried prior to annealing.

In some embodiments, the pre-drying process is carried out at temperatures that range from 5 to 90° C.; preferably, within the range of 15° C. to 80° C.; more preferably, within the range of 40° C. to 70° C.; and most preferably, within the range of 50° C. to 70° C.

In some other embodiments, the pre-drying process is carried out at temperatures that range from 5° C. to 10° C., 10° C. to 15° C., 15° C. to 20° C., 20° C. to 25° C., 25° C. to 30° C., 30° C. to 35° C., 35° C. to 40° C., 40° C. to 45° C., 45° C. to 50° C., 50° C. to 55° C., 55° C. to 60° C., 60° C. to 65° C., 65° C. to 70° C., 70° C. to 75° C., 75° C. to 80° C., 80° C. to 85° C., and/or 85° C. to 90° C.

In some embodiments, the treated covalently-crosslinked, semi-permeable, porous hollow fibres are dried prior to annealing with freeze-drying.

In some embodiments, the treated covalently-crosslinked, semi-permeable, porous hollow fibres are not dried prior to annealing with freeze-drying.

In some embodiments, the pre-drying process is carried out at temperatures that range from 5 to −90° C.; preferably, within the range of −15° C. to −90° C.; more preferably, within the range of −40° C. to −90° C.; even more preferably, within the range of −60° C. to −90° C.; and most preferably, within the range of −80° C. to −86° C.

In some other embodiments, the pre-drying process is carried out at temperatures that range from 5° C. to 0° C., 0° C. to −10° C., −10° C. to −20° C., −20° C. to −30° C., −30° C. to −40° C., −40° C. to −50° C., −50° C. to −60° C., −60° C. to −70° C., −70° C. to −80° C., −80° C. to −86° C., or −80° C. to −90° C.

In some embodiments, the treated covalently-crosslinked, semi-permeable, porous hollow fibres are dried under conditions below the Triple point of water.

In some embodiments, the pre-drying process is carried out over a duration within the range of 0 minutes to 7 days; preferably, 20 minutes to 5 days; more preferably, 40 minutes to 3 days; even more preferably, 1 hour to 2 days; and most preferably, within the range of 2 hours to 1 day.

In some other embodiments, the pre-drying process is carried out over a duration within the range 0 minutes to 5 minutes, 5 minutes to 10 minutes, 10 minutes to 15 minutes, 15 minutes to 20 minutes, 20 minutes to 25 minutes, 25 minutes to 30 minutes, 30 minutes to 35 minutes, 35 minutes to 40 minutes, 40 minutes to 45 minutes, 45 minutes to 50 minutes, 50 minutes to 55 minutes, 55 minutes to 1 hour, 1 hour to 2 hours, 2 hours to 3 hours, 3 hours to 4 hours, 4 hours to 5 hours, 5 hours to 6 hours, 6 hours to 12 hours, 12 hours to 18 hours, 18 hours to 24 hours, 24 hours to 30 hours, 30 hours to 36 hours, 36 hours to 42 hours, 42 hours to 48 hours, 48 hours to 54 hours, 54 hours to 60 hours, 60 hours to 66 hours, 66 hours to 3 days, 3 days to 4 days, 4 days to 5 days, 5 days to 6 days, or 6 days to 7 days.

The pre-drying process may be performed with convection, an infra-red heat source, and/or on a heated surface.

In some embodiments, the pre-drying process is performed with convection, radiation, microwave, an infra-red heat source, and/or on a heated surface.

The annealing step may be performed in different atmospheres, liquids and/or mixtures thereof.

In some embodiments, the annealing step is performed in different atmospheres, liquids and/or mixtures thereof.

The atmospheres used in the annealing step may include, but are not limited to, air, carbon dioxide, steam, inert gases (such as nitrogen, helium, neon, argon, and xenon), vapours (such as ethanol, plant oils, water) and/or a mixture thereof.

In some embodiments, the atmospheres used in the annealing step include, but are not limited to, air, carbon dioxide, steam, inert gases (such as nitrogen, helium, neon, argon, and xenon), vapours (such as ethanol, plant oils, water) and/or a mixture thereof.

The liquids used in the annealing step may include, but are not limited to, ethanol, plant oils, and/or a mixture thereof.

The fluids used in the annealing step may include, but are not limited to, alcohols such as, methanol, ethanol, propanol, iso-propanol, butanol, and/or a mixture thereof.

The fluids used in the annealing step may include, but are not limited to, supercritical $CO_2$.

In some embodiments, the liquids used in the annealing step include, but are not limited to, ethanol, plant oils, and/or a mixture thereof.

In some embodiments, the fluids used in the annealing step include, but are not limited to, alcohols such as, methanol, ethanol, propanol, iso-propanol, butanol, and/or a mixture thereof.

In some embodiments, the fluids used in the annealing step include, but are not limited to, supercritical $CO_2$.

In some embodiments, the liquids used in the annealing step do not include polyols.

In some embodiments, the hollow fibres are annealed by baking them in a convection oven, steaming them in an autoclave or pressure cooker, and/or submerging them in a hot oil bath.

In some preferred embodiments, the annealing step is conducted in an atmosphere of air.

In some embodiments, the annealing step is carried out at a temperature that is within the range of 50° C. to 180° C.; preferably, within the range of 75° C. to 160° C.; more preferably, within the range of 110° C. to 140° C.; and most preferably, within the range of 120° C. to 130° C.

In some other embodiments, the annealing step is carried out at temperatures that range from 50° C. to 80° C., 80° C. to 100° C., 100° C. to 120° C., 120° C. to 140° C., 140° C. to 160° C., or 160° C. to 180° C.

In some embodiments, the annealing step is carried out at a temperature that is within the range of 180° C. to 300° C.; preferably, within the range of 200° C. to 280° C.; more preferably, within the range of 220° C. to 260° C.; and most preferably, within the range of 240° C. to 250° C.

In some other embodiments, the annealing step is carried out at temperatures that range from 180° C. to 200° C., 200° C. to 220° C., 220° C. to 240° C., 240° C. to 260° C., 260° C. to 280° C., or 280° C. to 300° C.

In some embodiments, the annealing step is performed over a duration that is within the range of 30 minutes to 6 hours; preferably, within the range of 10 minutes and 4 hours; more preferably, within the range of 30 minutes and 3 hours, even more preferably, within the range of 45 hours and 2 hours; and most preferably, within the range of 1 hours and 1.5 hours.

In some other embodiments the annealing step is performed over a duration that is within the range of 5 minutes to 15 minutes, 15 minutes to 30 minutes, 30 minutes to 45 minutes, 45 minutes to 1 hour, 1 hour to 1.25 hours, 1.25 hours to 1.5 hours, 1.5 hours to 1.75 hours, 1.75 hours to 2 hours, 2 hours to 2.25 hours, 2.25 hours to 2.5 hours, 2.5 hours to 2.75 hours, 2.75 hours to 3 hours, 3 hours to 3.25 hours, 3.25 hours to 3.5 hours, 3.5 hours to 3.75 hours, 3.75 hours to 4 hours, 4 hours to 4.25 hours, 4.25 hours to 4.5 hours, 4.5 hours to 4.75 hours, 4.75 hours to 5 hours, 5 hours to 5.25 hours, 5.25 hours to 5.5 hours, 5.5 hours to 5.75 hours, and/or 5.75 hours to 6 hours.

The annealed covalently-crosslinked, semi-permeable, porous hollow fibres may be rehydrated in water and/or an aqueous solution, in a process herein referred to as rehydration.

In some embodiments, the annealed covalently-crosslinked, semi-permeable, porous hollow fibres are rehydrated in water and/or an aqueous solution.

In some embodiments, the annealed covalently-crosslinked, semi-permeable, porous hollow fibres are not rehydrated in water and/or an aqueous solution.

In some embodiments, components in the aqueous solution for rehydration include, but are not limited to, water, alcohols, polyols, acids, alkalis, salts and/or combinations thereof.

In some preferred embodiments, the aqueous rehydration solution comprises polyols.

In some preferred embodiments, Step (e.ii) comprises annealing the covalently-crosslinked, semi-permeable, porous hollow fibres at 130° C. in air for two hours.

In some particularly preferred embodiments, Step (e.ii) comprises drying the covalently-crosslinked, semi-permeable, porous hollow fibres at 60° C. with convection for 2 hours, followed by annealing at 130° C. in air for 1 hour, and subsequent rehydration in an aqueous solution containing 20% glycerol (v/v).

In some embodiments, the pre-drying conditions used in any of the embodiments of this disclosure can be used in the production of Prokitein and/or hollow fibres of this disclosure.

In some embodiments, the annealing conditions used in any of the embodiments of this disclosure can be used in the production of Prokitein and/or hollow fibres of this disclosure.

In some embodiments, the process by which Prokitein is produced comprises protein annealing.

In some embodiments, Prokitein is annealed as to alter and/or tailor its material properties.

In some other embodiments, Prokitein is annealed as to alter and/or tailor its Youngs' modulus.

In some other embodiments, Prokitein is annealed as to alter and/or tailor its ultimate tensile stress.

In some other embodiments, Prokitein is annealed as to alter and/or tailor its ultimate tensile strain.

1.14 STEP (E.III) REMOVAL OF VOID INCLUSION ELEMENTS

Step (e.iii) may comprise treating the covalently-crosslinked, semi-permeable, porous hollow fibres with one or more solvents to remove void inclusion elements in the hollow fibres, and may impart porosity.

In some embodiments, Step (e.iii) comprises treating the covalently-crosslinked, semi-permeable, porous hollow fibres with one or more solvents to remove void inclusion elements in the hollow fibres, thereby, imparting porosity.

In some embodiments, solvents which are used to remove void inclusion elements include aqueous solutions and/or organic solutions.

In some embodiments supercritical fluids are used to remove void inclusion elements.

In some embodiments supercritical $CO_2$ is used to remove void inclusion elements.

In some embodiments, aqueous solutions comprise, water, acids, alkalis and/or salt solutions.

In some other embodiments, one of the solvents is water.

In some embodiments, one or more of the solvents is an aqueous solution comprising acids that include at least one of oxalic acid, malic acid, succinic acid, adipic acid, tartaric acid, citric acid, malonic acid, acetic acid, or formic acid; preferably citric acid and/or malic acid.

In some embodiments, in which the void inclusion element is powdered calcium carbonate, the plurality of covalently-crosslinked semi-permeable, porous hollow fibres are treated with an aqueous acid solution, such as citric acid. Hydrogen ions react with the calcium carbonate embedded in the walls of the hollow fibres, to form calcium salts and carbon dioxide. As the carbon dioxide is released and the salts dissolve, voids are created in the walls of the hollow fibres, in the spaces previously occupied by calcium carbonate; thereby, increasing the void fraction in the hollow fibres.

In some embodiments, the organic solution comprises at least one of ethanol, propanol, iso-propanol, butanol, iso-butanol, dimethyl sulfoxide, dimethylformamide, and/or dimethylacetamide; preferably ethanol.

In some embodiments, the organic solution comprises acetone.

In some embodiments, the organic solution comprises polyol(s) and/or polymer(s) of polyols.

In some embodiments, aqueous solutions and organic solutions may be used in combination to form a solvent mixture.

In some embodiments, in which the void inclusion element is a lipid, the plurality of hollow fibres is exposed to an organic solvent, such as ethanol. As the oil droplets become dissolved in the organic phase and subsequently removed, voids are created in the walls of the hollow fibres in the spaces previously occupied by the oil droplets; thereby, imparting porosity onto the hollow fibres.

In some embodiments, the concentration of any singular component in the solvent mixture used to remove the void inclusion elements from the covalently-crosslinked, semi-permeable, porous hollow fibres is within the range of 0% (w/v) to 100% (w/v); preferably, within the range of 10% (w/v) to 75% (w/v); and most preferably, within the range of 20% (w/v) to 60% (w/v), relative to the total solvent mixture volume.

In some other embodiments, the concentration of any singular component in the solvent mixture used to remove the void inclusion elements from the covalently-crosslinked, semi-permeable, porous hollow fibres is within the range of 0% (w/v) to 5% (w/v), 5% (w/v) to 10% (w/v), 10% (w/v) to 15% (w/v), 15% (w/v) to 20% (w/v), 20% (w/v) to 25% (w/v), 25% (w/v) to 30% (w/v), 30% (w/v) to 35% (w/v), 35% (w/v) to 40% (w/v), 40% (w/v) to 45% (w/v), 45% (w/v) to 50% (w/v), 50% (w/v) to 55% (w/v), 55% (w/v) to 60% (w/v), 60% (w/v) to 65% (w/v), 65% (w/v) to 70% (w/v), 70% (w/v) to 75% (w/v), 75% (w/v) to 80% (w/v), 80% (w/v) to 85% (w/v), 85% (w/v) to 90% (w/v), 90% (w/v) to 95% (w/v), or 95% (w/v) to 100% (w/v), relative to the total solvent mixture volume.

In some embodiments, Step (e.iii) does not comprise treating the covalently-crosslinked, semi-permeable, porous hollow fibres with any solvents.

In some embodiments, wherein a solvent is not used, Step (e.iii) comprises subjecting the covalently-crosslinked, semi-permeable, porous hollow fibres to pyrolysis-induced pore formation. Herein, the term "pyrolysis-induced pore formation" refers to a process of thermal decomposition of one or more void inclusion elements in the wall of the hollow fibre to remove said void inclusion elements, thereby, imparting porosity.

In some particularly preferred embodiments, Step (e.iii) comprises treating the covalently-crosslinked, semi-permeable, porous hollow fibres, comprising powdered calcium carbonate, with 25% (w/v) citric acid in an aqueous solvent at room temperature for 30 minutes.

In some other particularly preferred embodiments, Step (e.iii) comprises treating the covalently-crosslinked, semi-permeable, porous hollow fibres, comprising lipids, with a 40% ethanol solution at room temperature for 30 minutes.

In some other particularly preferred embodiments, Step (e.iii) comprises treating the covalently-crosslinked, semi-permeable, porous hollow fibres, comprising lipids, with iso-propanol at room temperature for 30 minutes.

In some other particularly preferred embodiments, Step (e.iii) comprises treating the covalently-crosslinked, semi-permeable, porous hollow fibres, comprising lipids, with supercritical $CO_2$.

It is also contemplated that one or more void inclusion elements may be removed from the hollow fibres in processing steps that are separate to Step (e.iii), including, but are not limited to, Step (d), Step (e.i), and/or Step (e.iv). For example, water-soluble void inclusion elements could dissolve in a coagulation bath solution of Step (d). In another example, alcohol-soluble void inclusion elements could dissolve in a coagulation bath solution of Step (d) comprising aqueous solvents and one or more alcohols.

In some contemplated embodiments, one or more void inclusion elements are removed from the hollow fibres in processing steps that are separate to Step (e.iii), including, but are not limited to, Step (d), Step (e.i), and/or Step (e.iv).

In some embodiments, the solvent used to remove void inclusion elements in any of the embodiments of this disclosure can be used in the production of Prokitein and/or hollow fibres of this disclosure.

1.15 STEP (E.IV) BUFFER WASH

Step (e.iv) may comprise washing the covalently-crosslinked, semi-permeable, porous hollow fibres with one or more acid(s), alkali(s) and/or buffer solution(s) to potentially decrease at least one of, the Young's modulus, ultimate tensile strength and/or ultimate tensile strain of the hollow fibres.

In some embodiments, Step (e.iv) comprises washing the covalently-crosslinked, semi-permeable, porous hollow fibres with one or more acid(s), alkali(s) and/or buffer solution(s) to decrease at least one of, the Young's modulus, ultimate tensile strength and/or ultimate tensile strain of the hollow fibres.

In some embodiments, the acids used in Step (e.iv) include, but are not limited to, ascorbic acid, acetic acid, adipic acid, citric acid, formic acid, hydrochloric acid, lactic acid, malic acid, malonic acid, oxalic acid, succinic acid, sulphuric acid and/or tartaric acid.

In some embodiments, the alkalis used in Step (e.iv) include, but are not limited to, sodium hydroxide, potassium hydroxide, calcium hydroxide, magnesium hydroxide and/or sodium carbonate.

In some embodiments, the covalently-crosslinked, semi-permeable, porous hollow fibres are washed in Step (e.iv) with a buffer solution, buffered to a pH of 10 or higher.

In some other embodiments, the covalently-crosslinked, semi-permeable, porous hollow fibres are washed in Step (e.iv) with a sodium carbonate buffer solution, buffered to a pH of 10 or higher.

In some embodiments, Step (e.iv) lasts for a duration that is within the range of, 10 minutes to 3 hours; preferably, 15 minutes and 2 hours; and most preferably, from 30 minutes to 1 hour.

In some other embodiments, Step (e.iv) lasts for a duration that is within the range of 10 minutes and 15 minutes, 15 minutes and 30 minutes, 30 minutes and 45 minutes, 45 minutes and 1 hour, 1 hour and 2 hours, or 2 hours and 3 hours.

In some embodiments, Step (e.iv) is performed at a temperature that is within the range of 10° C. to 80° C.; preferably, within the range of 20° C. and 60° C.; more preferably, within the range of 30° C. and 50° C.; and most preferably, at room temperature.

In some other embodiments, Step (e.iv) is performed at a temperature that is within the range of 10° C. to 20° C., 20° C. to 30° C., 30° C. to 40° C., 40° C. to 50° C., 50° C. to 60° C., 60° C. to 70° C., or 70° C. to 80° C.

In some particularly preferred embodiments, Step (e.iv) comprises washing the covalently-crosslinked, semi-permeable, porous hollow fibres with an aqueous solution of sodium carbonate buffer with a pH of 11.0 at 37° C. for 60 minutes.

1.16 STEP (E.V) COATINGS

Step (e.v) may comprise coating the covalently-crosslinked semi-permeable, porous hollow fibres.

In some embodiments, Step (e.v) comprises coating the covalently-crosslinked semi-permeable, porous hollow fibres.

Coatings are widely used in conjunction with traditional cell culture techniques to aid cell attachment and/or proliferation. The coatings which may be used include, but are not limited to, protein complexes, cell attachment peptide sequences (CAPs), and/or growth factors (30; 31).

Protein complexes may be used to enhance cell attachment to covalently-crosslinked, semi-permeable, porous hollow fibres. These, include, but are not limited to, collagen, gelatine, fibrinogen, fibronectin and laminin.

In some embodiments, protein complexes are used to enhance cell attachment to covalently-crosslinked, semi-permeable, porous hollow fibres.

In some embodiments, protein complexes are not used to enhance cell attachment to covalently-crosslinked, semi-permeable, porous hollow fibres.

CAPs are short sequences of amino acids that embody the minimum motif required for cell attachment (30).

CAPs which may be used to enhance cell attachment to covalently-crosslinked, semi-permeable, porous hollow fibres include, but are not limited to, AELDVP (SEQ ID NO: 1), CGGNGEPRGDTYRAY (SEQ ID NO: 2), CFALRGDNP (SEQ ID NO: 3), CKKQRFRHRNRKG (SEQ ID NO: 4), CNYYSNS (SEQ ID NO: 5), CSVTCG (SEQ ID NO: 6), DGEA (SEQ ID NO: 7), ELVTDFPTDL-PAT (SEQ ID NO: 8), FHRRIKA (SEQ ID NO: 9), FQGVLQNVRFVF (SEQ ID NO: 10), GACRGDCLGA (cyclic) (SEQ ID NO: 11), GFOGER (SEQ ID NO: 12), GFRGDGQ (SEQ ID NO: 13), GRGDS (SEQ ID NO: 14), GRGDAC (SEQ ID NO: 15), GTFALRGDNGQ (SEQ ID NO: 16), IDAPS (SEQ ID NO: 17), IKLLI (SEQ ID NO: 18), IKVAV (SEQ ID NO: 19), IWKHKGRD-VILKKDVRFYC (SEQ ID NO: 20), KAFDITYVRLKF (SEQ ID NO: 21), KLDAPT (FN5) (SEQ ID NO: 22), KQAGDV (SEQ ID NO: 23), KRSR (SEQ ID NO: 24), LIGRKK (SEQ ID NO: 25), LGTIPG (SEQ ID NO: 26), LRE, LRGDN (SEQ ID NO: 27), MNYYSNS (SEQ ID NO: 28), NPWHSIYITRFG (SEQ ID NO: 29), PDGSR (SEQ ID NO: 30), PHRSN (SEQ ID NO: 31), PKRGDL (SEQ ID NO: 32), PRARI (SEQ ID NO: 33), REDV (SEQ ID NO: 34), RGD, SIGFRGDGQTC (SEQ ID NO: 35), SIKVAV (SEQ ID NO: 36), SINNNR (SEQ ID NO: 37), SPPRRARV (SEQ ID NO: 38), SVVYGLR (SEQ ID NO: 39), TWYKI-AFQRNRK (SEQ ID NO: 40), VALDEP (SEQ ID NO: 41), VGVAPG (SEQ ID NO: 42), VPGIG (SEQ ID NO: 43), WQPPRARI (SEQ ID NO: 44), YIGSR (SEQ ID NO: 45).

In some embodiments, CAPs are used to enhance cell attachment to covalently-crosslinked, semi-permeable, porous hollow fibres.

In some embodiments, CAPs which are used to enhance cell attachment to covalently-crosslinked, semi-permeable, porous hollow fibres include, but are not limited to, AEL-DVP (SEQ ID NO: 1), CGGNGEPRGDTYRAY (SEQ ID NO: 2), CFALRGDNP (SEQ ID NO: 3), CKKQR-FRHRNRKG (SEQ ID NO: 4), CNYYSNS (SEQ ID NO:

5), CSVTCG (SEQ ID NO: 6), DGEA (SEQ ID NO: 7), ELVTDFPTDLPAT (SEQ ID NO: 8), FHRRIKA (SEQ ID NO: 9), FQGVLQNVRFVF (SEQ ID NO: 10), GACRGD-CLGA (cyclic) (SEQ ID NO: 11), GFOGER (SEQ ID NO: 12), GFRGDGQ (SEQ ID NO: 13), GRGDS (SEQ ID NO: 14), GRGDAC (SEQ ID NO: 15), GTFALRGDNGQ (SEQ ID NO: 16), IDAPS (SEQ ID NO: 17), IKLLI (SEQ ID NO: 18), IKVAV (SEQ ID NO: 19), IWKHKGRD-VILKKDVRFYC (SEQ ID NO: 20), KAFDITYVRLKF (SEQ ID NO: 21), KLDAPT (FN5) (SEQ ID NO: 22), KQAGDV (SEQ ID NO: 23), KRSR (SEQ ID NO: 24), LIGRKK (SEQ ID NO: 25), LGTIPG (SEQ ID NO: 26), LRE, LRGDN (SEQ ID NO: 27), MNYYSNS (SEQ ID NO: 28), NPWHSIYITRFG (SEQ ID NO: 29), PDGSR (SEQ ID NO: 30), PHRSN (SEQ ID NO: 31), PKRGDL (SEQ ID NO: 32), PRARI (SEQ ID NO: 33), REDV (SEQ ID NO: 34), RGD, SIGFRGDGQTC (SEQ ID NO: 35), SIKVAV (SEQ ID NO: 36), SINNNR (SEQ ID NO: 37), SPPRRARV (SEQ ID NO: 38), SVVYGLR (SEQ ID NO: 39), TWYKI-AFQRNRK (SEQ ID NO: 40), VALDEP (SEQ ID NO: 41), VGVAPG (SEQ ID NO: 42), VPGIG (SEQ ID NO: 43), WQPPRARI (SEQ ID NO: 44), YIGSR (SEQ ID NO: 45).

In some embodiments, CAPs are not used to enhance cell attachment to covalently-crosslinked, semi-permeable, porous hollow fibres.

Growth factors may be used to enhance cell attachment to covalently-crosslinked, semi-permeable, porous hollow fibres. These include, but are not limited to, basic fibroblast growth factor (bFGF), hepatocyte growth factor (HGF), insulin-like growth factor (IGF), epidermal growth factor (EGF), and/or vascular endothelial growth factor (VEGF).

In some embodiments, growth factors are used to enhance cell attachment to covalently-crosslinked, semi-permeable, porous hollow fibres.

In some embodiments, growth factors are used to enhance cell attachment to covalently-crosslinked, semi-permeable, porous hollow fibres. These include, but are not limited to, basic fibroblast growth factor (bFGF), hepatocyte growth factor (HGF), insulin-like growth factor (IGF), epidermal growth factor (EGF), and/or vascular endothelial growth factor (VEGF).

In some embodiments, growth factors are not used to enhance cell attachment to covalently-crosslinked, semi-permeable, porous hollow fibres.

In some embodiments, protein complexes, CAPs and/or growth factors are used to enhance cell attachment to covalently-crosslinked, semi-permeable, porous hollow fibres.

Chemical methods, such as grafting, may be used to coat the surface of the covalently-crosslinked, semi-permeable, porous hollow fibres with protein complexes, CAPS and/or growth factors to enhance cell attachment to the hollow fibres.

In some embodiments, chemical methods are used to coat the surface of the covalently-crosslinked, semi-permeable, porous hollow fibres with protein complexes, CAPS and/or growth factors to enhance cell attachment to the hollow fibres.

In some embodiments, chemical methods are not used to coat the surface of the covalently-crosslinked, semi-permeable, porous hollow fibres with protein complexes CAPS and/or growth factors to enhance cell attachment to the hollow fibres.

In one particularly preferred embodiment, Step (e.v) comprises leaving the covalently-crosslinked, semi-permeable, porous hollow fibres uncoated.

1.17 STEP (E.VI) SURFACE TOPOGRAPHIC MODIFICATION

Step (e.vi) may comprise modifying the surface topography of the covalently-crosslinked, semi-permeable, porous hollow fibres to aid cell attachment and/or cell alignment.

In some embodiments, Step (e.vi) comprises modifying the surface topography of the covalently-crosslinked, semi-permeable, porous hollow fibres to aid cell attachment and/or cell alignment.

Step (e.vi) may comprise stretching the covalently-crosslinked, semi-permeable, porous hollow fibres to create tears in the microstructure, forming porous structures.

In some embodiments, Step (e.vi) comprises stretching the covalently-crosslinked, semi-permeable, porous hollow fibres to create tears in the microstructure, forming porous structures.

The surface topography of the outer wall of the covalently-crosslinked, semi-permeable, porous hollow fibres may be modified.

In some embodiments, the surface topography of the outer wall of the covalently-crosslinked, semi-permeable, porous hollow fibres is modified.

In some embodiments, the surface topography of the outer wall of the covalently-crosslinked, semi-permeable, porous hollow fibres is not modified.

Methods which may be used to modify the surface include, but are not limited to, physical methods such as plasma treatment, physical vapour deposition, ultra-sonification and mechanical etching.

In some embodiments, methods which are used to modify the surface include, but are not limited to, physical methods such as plasma treatment, physical vapour deposition, ultra-sonification and mechanical etching.

Mechanical etching may be used to impart striations along the surface of the covalently-crosslinked, semi-permeable, porous hollow fibres.

In some embodiments, mechanical etching is used to impart striations along the surface of the covalently-crosslinked, semi-permeable, porous hollow fibres.

The die or spinneret orifice geometry, used in Step (c), may be used to impart striations along the surface of the covalently-crosslinked, semi-permeable, porous hollow fibres to aid the alignment of cells along the longitudinal axis of the hollow fibres.

In some embodiments, the die or spinneret orifice geometry, used in Step (c), is used to impart striations along the surface of the covalently-crosslinked, semi-permeable, porous hollow fibres to aid the alignment of cells along the longitudinal axis of the hollow fibres.

In one particularly preferred embodiment, Step (e.vi) comprises leaving the surface topography of the covalently-crosslinked, semi-permeable, porous hollow fibres unmodified.

The post-production modification processes of Step (e), described herein in Steps (e.i) to (e.vi), may be performed in any combination and in any sequence.

In some embodiments, Step (e.i) is performed.
In some embodiments, Step (e.i) is not performed.
In some embodiments, Step (e.ii) is performed.
In some embodiments, Step (e.ii) is not performed.
In some embodiments, Step (e.iii) is performed.
In some embodiments, Step (e.iii) is not performed
In some embodiments, Step (e.iv) is performed.
In some embodiments, Step (e.iv) is not performed.
In some embodiments, Step (e.v) is performed.
In some embodiments, Step (e.v) is not performed.

In some embodiments, Step (e.vi) is performed.

In some embodiments, Step (e.vi) is not performed.

In some embodiments, Step (e.i) and Step (e.ii) are performed sequentially in the order specified.

In some embodiments, Step (e.i), Step (e.ii) and Step (e.iii) are performed sequentially in the order specified.

In some embodiments, Step (e.i), Step (e.iii) and Step (e.ii) are performed sequentially in the order specified.

In some embodiments, one or more of any of Step (e.i), to Step (e.vi) are performed sequentially in the order specified.

In some embodiments, Step (e.i), Step (e.ii), Step (e.iii) and Step (e.iv) are performed sequentially in the order specified.

In some embodiments, Step (e.i), Step (e.ii), Step (e.iii), Step (e.iv) and Step (e.v) are performed sequentially in the order specified.

In some embodiments, Step (e.i), Step (e.ii), Step (e.iii), Step (e.iv), Step (e.v) and Step (e.vi) are performed sequentially in the order specified.

In some embodiments, Step (e.i), Step (e.ii), Step (e.iv), Step (e.v) and Step (e.vi) are performed sequentially in the order specified.

In some embodiments, Step (e.i), Step (e.ii), Step (e.iii), Step (e.v) and Step (e.vi) are performed sequentially in the order specified.

In some embodiments, Step (e.i), Step (e.ii), Step (e.iii), Step (e.iv), and Step (e.vi) are performed sequentially in the order specified.

In some embodiments, Step (e.i), Step (e.ii), Step (e.iii), Step (e.iv), and Step (e.v) are performed sequentially in the order specified.

In some embodiments, Step (e.i), Step (e.ii) and Step (e.iii) are performed sequentially in the order specified.

In some embodiments, Step (e.i), Step (e.ii), and Step (e.iv), are performed sequentially in the order specified.

In some embodiments, Step (e.i), Step (e.ii), and Step (e.v) are performed sequentially in the order specified.

In some embodiments, Step (e.i), Step (e.ii), and Step (e.vi) are performed sequentially in the order specified.

In some embodiments, Step (e.i), Step (e.ii) and Step (e.iii) are performed within a single process step.

1.18 STEP (F) STORAGE AND DRYING

Step (f) may comprise drying the treated covalently-crosslinked, semi-permeable, porous hollow fibres, to produce dried, treated covalently-crosslinked, semi-permeable, porous hollow fibres, and subsequently storing them in a low moisture atmosphere.

In some embodiments, Step (f) comprises drying the treated covalently-crosslinked, semi-permeable, porous hollow fibres, to produce dried, treated covalently-crosslinked, semi-permeable, porous hollow fibres, and subsequently storing them in a low moisture atmosphere.

In some embodiments, the treated covalently-crosslinked, semi-permeable, porous hollow fibres are partially dried; and preferably completely dried.

In some embodiments, the treated covalently-crosslinked, semi-permeable, porous hollow fibres are not dried.

In some embodiments, the drying process is performed with convection, radiation, freeze-drying, a microwave source, an infra-red heat source, and/or on a heated surface.

Freeze-drying may aid in the formation of pores and/or modify the microstructure of the covalently-crosslinked, semi-permeable, porous hollow fibres.

In some embodiments freeze-drying is used modify the porosity of the covalently-crosslinked, semi-permeable, porous hollow fibres.

In some embodiments, freeze-drying is additionally used modify the porosity of the covalently-crosslinked, semi-permeable, porous hollow fibres.

In some embodiments, freeze-drying is not used modify the porosity of the covalently-crosslinked, semi-permeable, porous hollow fibres.

In some embodiments, freeze-drying is used modify the porosity of the covalently-crosslinked, semi-permeable, porous hollow fibres; preferably, additionally used; and most preferably, not used.

In some embodiments, the covalently-crosslinked, semi-permeable, porous hollow fibres are partially or completely dried at temperatures that range from 5 to 90° C.; preferably, within the range of 15° C. to 80° C.; more preferably, within the range of 40° C. to 70° C.; and most preferably, within the range of 50° C. to 70° C.

In some other embodiments, the covalently-crosslinked, semi-permeable, porous hollow fibres are partially or completely dried at temperatures that range from 5° C. to 10° C., 10° C. to 15° C., 15° C. to 20° C., 20° C. to 25° C., 25° C. to 30° C., 30° C. to 35° C., 35° C. to 40° C., 40° C. to 45° C., 45° C. to 50° C., 50° C. to 55° C., 55° C. to 60° C., 60° C. to 65° C., 65° C. to 70° C., 70° C. to 75° C., 75° C. to 80° C., 80° C. to 85° C., and/or 85° C. to 90° C.

In some embodiments, the covalently-crosslinked, semi-permeable, porous hollow fibres are dried using conditions applicable to the pre-drying of Step (e.ii).

The dried treated covalently-crosslinked, semi-permeable, porous hollow fibres may be stored in air, inert gases (such as nitrogen, helium, neon, argon, and xenon), $CO_2$, under vacuum and/or in a PBS buffers solution, water, an aqueous solution, organic solution, and/or a mixture thereof.

In some embodiments, the dried treated covalently-crosslinked, semi-permeable, porous hollow fibres are stored under vacuum.

In some embodiments, the dried treated covalently-crosslinked, semi-permeable, porous hollow fibres are stored in PBS buffer solution.

In some embodiments, the dried treated covalently-crosslinked, semi-permeable, porous hollow fibres are stored in water and/or an aqueous solution.

Suitable components which are present within the aqueous solution could include, but are not limited to, water, alcohols, polyols, acids, alkalis, salts and/or combinations thereof.

In some preferred embodiments, the aqueous solution used to store the dried treated covalently-crosslinked, semi-permeable, porous hollow fibres comprises polyols.

In some embodiments, the dried treated covalently-crosslinked, semi-permeable, porous hollow fibres may be stored in an organic solvent.

In other embodiments, the dried treated covalently-crosslinked, semi-permeable, porous hollow fibres may be stored in a mixture of organic and aqueous solvents, such as, but not limited to, water and ethanol.

In some embodiments, the dried treated covalently-crosslinked, semi-permeable, porous hollow fibres may be stored in refrigerated conditions, at temperatures between 8 and 0° C.

In some embodiments, the dried treated covalently-crosslinked, semi-permeable, porous hollow fibres may be stored in frozen conditions, at temperatures between 0 and −90° C.

In some preferred embodiments, Step (f) comprises partially drying the treated covalently-crosslinked, semi-permeable, porous hollow fibres through exposure to heat, to produce partially dried, treated covalently-crosslinked, semi-permeable, porous hollow fibres, and subsequently storing them in air.

In some preferred embodiments, Step (f) comprises partially drying the treated covalently-crosslinked, semi-permeable, porous hollow fibres through exposure to heat, to produce partially dried, treated covalently-crosslinked, semi-permeable, porous hollow fibres, and subsequently storing them in an aqueous 40% ethanol (v/v) solution.

In some preferred embodiments, Step (f) comprises partially drying the treated covalently-crosslinked, semi-permeable, porous hollow fibres through exposure to heat, to produce partially dried, treated covalently-crosslinked, semi-permeable, porous hollow fibres, and subsequently rehydrating them in an aqueous 20% glycerol solution, and then storing them in air.

In some preferred embodiments, Step (f) comprises partially drying the treated covalently-crosslinked, semi-permeable, porous hollow fibres through exposure to heat, to produce partially dried, treated covalently-crosslinked, semi-permeable, porous hollow fibres, and subsequently storing them in an aqueous 20% glycerol (v/v) solution.

In a preferred embodiment, the process steps are carried out (one after the other) in the (a)-(f) order specified.

In some particularly preferred embodiments, the process for the production of a plurality of semi-permeable, porous hollow fibres, comprising covalent ester, thioester and/or amide bond crosslinked polypeptides comprises sequentially carrying out Step (a), Step (b), Step (c), Step (d), Step (e.i), Step (e.ii) and Step (e.iii) in the order specified.

In some particularly preferred embodiments, the process for the production of a plurality of semi-permeable, porous hollow fibres, comprising covalent ester, thioester and/or amide bond crosslinked polypeptides comprises sequentially carrying out Step (a), Step (b), Step (c), Step (d), Step (e.i), Step (e.iii) and Step (e.ii) in the order specified.

The Applicant also provides a plurality of semi-permeable, porous hollow fibres comprising covalent ester, thioester and/or amide crosslinked polypeptides, that are obtained or are obtainable by a process of the application.

In some embodiments, the drying conditions used in any of the embodiments of this disclosure can be used in the production of Prokitein and/or hollow fibres of this disclosure.

1.19 PHYSICAL STRUCTURES OF THE COVALENTLY-CROSSLINKED, POROUS, SEMI-PERMEABLE HOLLOW FIBRES

In yet a further embodiment, there is provided a semi-permeable, porous hollow fibre, comprising one more polycarboxylic acid derived covalent ester, thioester and/or amide bond crosslinked polypeptides, wherein:
(a) the external diameter of the hollow fibre is 50-6600 μM;
(b) the wall thickness of the hollow fibre is 20-800 μM;
(c) the lumen diameter of hollow fibre is 20-5000 μM; and
(d) the pore volume of the hollow fibre is 1-95%.

In yet a further embodiment, there is provided a semi-permeable, porous hollow fibre, comprising one more polycarboxylic acid derived covalent ester, thioester and/or amide bond crosslinked polypeptides, wherein:
(a) the external diameter of the hollow fibre is 50-6600 μm;
(b) the wall thickness of the hollow fibre is 20-800 μm;
(c) the lumen diameter of hollow fibre is 20-5000 μm; and
(d) the porosity of the hollow fibre is 1-95%.

The hollow fibres of this disclosure may comprise covalent ester, thioester and/or amide crosslinked polypeptides, and in general may each comprise a cylindrical tubular structure (e.g., a tube), having a wall, an outer surface, an inner surface, and a lumen. A schematic diagram illustrating one example of this geometry may be seen in FIG. 3. In FIG. 3, the lumen, inner wall and outer wall are labelled as 3006, 3005 and 3004, respectively.

In some embodiments, the hollow fibres of this disclosure comprise covalent ester, thioester and/or amide crosslinked polypeptides, will each comprise a cylindrical tubular structure (e.g., a tube), having a wall, an outer surface, an inner surface, and a lumen.

The cylindrical tubular structure of each hollow fibre of this disclosure may have a long axis, as labelled 3003 in FIG. 3.

In some embodiments, the cylindrical tubular structure of each hollow fibre of this disclosure has a long axis, as labelled 3003 in FIG. 3.

The cross-section of each fibre of this disclosure, may consist of a single tube that is preferably circular, although other shapes, such as, but not limited to, ovals, squares and rectangles may be used. A schematic diagram of one example of a plurality of fibres in a bundle may be seen in FIG. 4. One example of a single fibre with a circular cylindrical tubular structure is labelled 4001 in FIG. 4.

In some embodiments, the cross-section of each fibre of this disclosure, consists of a single tube that is preferably circular, although other shapes, such as, but not limited to, ovals, squares and rectangles can be used.

The cross-section of each fibre of this disclosure may comprise concentric shapes, such as, but not limited to, circles, ovals, squares and rectangles, or a combination thereof.

In some embodiments, the cross-section of each fibre of this disclosure comprises concentric shapes, such as, but not limited to, circles, ovals, squares and rectangles, or a combination thereof.

The hollow fibres of this disclosure may be in the form of a tubular cylinder, preferably a circular tubular cylinder.

In some embodiments, the hollow fibres of this disclosure are in the form of a tubular cylinder, preferably a circular tubular cylinder.

The hollow fibres of this disclosure may each have a lumen (i.e., an orifice) that runs along their long axis, such that fluid may flow through the lumen.

In some embodiments, the hollow fibres of this disclosure each have a lumen (i.e., an orifice) that runs along their long axis, such that fluid may flow through the lumen.

In some embodiments, the lumen of each fibre of this application is open at one or both ends.

In a preferred embodiment, the lumen of each fibre of this application is open at both ends.

The hollow fibres of this disclosure may be of any desired length.

In some embodiments, the hollow fibres of this disclosure are of any desired length.

In some embodiments, the length of the hollow fibres is within the range of, but not limited to, 2 mm and 2 m; preferably, within the range of 1 cm and 1 m; and most preferably, within the range of 2.5 cm and 10 cm.

In some embodiments, the length of the hollow fibres is within the range of, but not limited to, 2 mm and 5 m; preferably, within the range of 1 cm and 1 m; and most preferably, within the range of 2.5 cm and 10 cm.

In some other embodiments, the length of the hollow fibres of this disclosure are within the range of 2 mm and 1 cm, 1 cm and 5 cm, 5 cm and 10 cm, 10 cm and 50 cm, 50 cm and 1 m, or 1 m and 2 m.

In some other embodiments, the length of the hollow fibres of this disclosure are within the range of 2 mm and 1 cm, 1 cm and 5 cm, 5 cm and 10 cm, 10 cm and 50 cm, 50 cm and 1 m, 1 m and 2 m, 2 m and 3 m, 3 m and 4 m, or 4 m and 5 m.

The hollow fibres of this disclosure may be classified by their cross-sectional structure as being either: (i) symmetric (isotropic), in which the cross-sectional structure is constant; or (ii) asymmetric (non-symmetric) (anisotropic), in which the cross-sectional structure is not constant.

In some embodiments, the hollow fibres of this disclosure are symmetric.

In some embodiments, the hollow fibres of this disclosure are either symmetric, asymmetric, non-symmetric, or any combination thereof.

Each asymmetric fibre of this disclosure may comprise either: (i) a composite of two materials (asymmetric composite); or (ii) be of the same material (asymmetric integrally-skinned).

In one embodiment, the hollow fibres of this disclosure consist solely of asymmetric composites, wherein each fibre comprise a composite of two materials.

In a further embodiment, the hollow fibres of this disclosure are all asymmetric integrally-skinned, wherein each fibre consists of the same material.

In some embodiments, there is provided a plurality of fibres of this disclosure, which comprises a mixture or at least one of:
  (i) a plurality of fibres which are symmetric;
  (ii) a plurality of fibres which are asymmetric composites; and/or
  (iii) a plurality of fibres which are asymmetrically integrally skinned, to form a bundle of fibres.

In some embodiments, the external diameter of a hollow fibre of this disclosure is within the range of 50 µm and 6600 µm; preferably, within the range or 100 µm to 1500 µm; and most preferably, within the range of 200 µm to 900 µm.

In some other embodiments, the external diameter of hollow fibres of this disclosure is within the range of range 50 µm to 100 µm, 100 µm to 200 µm, 200 µm to 300 µm, 300 µm to 400 µm, 400 µm to 500 µm, 500 µm to 600 µm, 600 µm to 700 µm, 700 µm to 800 µm, 800 µm to 900 µm, 900 µm to 1000 µm, 1000 µm to 1100 µm, 1100 µm to 1200 µm, 1200 µm to 1300 µm, 1300 µm to 1400 µm, 1400 µm to 1500 µm, 1500 µm to 1600 µm, 1600 µm to 1700 µm, 1700 µm to 1800 µm, 1800 µm to 1900 µm, 1900 µm to 2000 µm, 2000 µm to 2100 µm, 2100 µm to 2200 µm, 2200 µm to 2300 µm, 2300 µm to 2400 µm, 2400 µm to 2500 µm, 2500 µm to 2600 µm, 2600 µm to 2700 µm, 2700 µm to 2800 µm, 2800 µm to 2900 µm, 2900 µm to 3000 µm, 3000 µm to 3100 µm, 3100 µm to 3200 µm, 3200 µm to 3300 µm, 3300 µm to 3400 µm, 3400 µm to 3500 µm, 3500 µm to 3600 µm, 3600 µm to 3700 µm, 3700 µm to 3800 µm, 3800 µm to 3900 µm, 3900 µm to 4000 µm, 4000 µm to 4100 µm, 4100 µm to 4200 µm, 4200 µm to 4300 µm, 4300 µm to 4400 µm, 4400 µm to 4500 µm, 4500 µm to 4600 µm, 4600 µm to 4700 µm, 4700 µm to 4800 µm, 4800 µm to 4900 µm, 4900 µm to 5000 µm, 5000 µm to 5100 µm, 5100 µm to 5200 µm, 5200 µm to 5300 µm, 5300 µm to 5400 µm, 5400 µm to 5500 µm, 5500 µm to 5600 µm, 5600 µm to 5700 µm, 5700 µm to 5800 µm, 5800 µm to 5900 µm, 5900 µm to 6000 µm, 6000 µm to 6100 µm, 6100 µm to 6200 µm, 6200 µm to 6300 µm, 6300 µm to 6400 µm, 6400 µm to 6500 µm, or 6500 µm to 6600 µm.

In some embodiments, the wall thickness of each fibre of this application is within the range of 1 µm to 800 µm; preferably, within the range of 50 µm to 800 µm; more preferably, within the range of 70 µm to 500 µm; and most preferably, within the range of 75 µm to 150 µm.

In some embodiments, the wall thickness of each fibre of this application is within the range of 20 µm to 50 µm, 50 µm to 100 µm, 100 µm to 200 µm, 200 µm to 500 µm, or 500 µm to 800 µm.

In some embodiments, the lumen diameter of hollow fibres of the disclosure is within the range of 20 µm to 5000 µm; preferably, within the range of 50 µm to 1000 µm; more preferably, within the range of 100 µm to 850 µm; and most preferably, within the range of 150 µm to 500 µm.

In some other embodiments, the lumen diameter of a hollow fibre of the disclosure is within the range of from 20 µm to 50 µm, 50 µm to 100 µm, 100 µm to 200 µm, 200 µm to 500 µm, 500 µm to 1000 µm, 1000 µm to 2500 µm, or 2500 µm to 5000 µm.

Scanning electron microscopy (SEM) may be used to produce images of a material with a wide range of magnifications from 10 to more than 500,000 times by scanning the surface of the material with a beam of electrons. SEM image analysis can be used by a person of skill in the art to quantify various structural characteristics of the hollow fibres of this disclosure, including lumen diameter, wall thickness, surface pore diameter, and inner structure (32; 33).

It is a feature of the application that the hollow fibres of this disclosure are semi-permeable.

In some embodiments, the hollow fibres of this disclosure are semi-permeable, such that fluids and some solutes, including, but not limited to, nutrients, can pass through, but soluble growth factors, proteins and cells cannot.

In some embodiments, the hollow fibres of this disclosure are semi-permeable, such that fluids and some solutes, including, but not limited to, nutrients, soluble growth factors and proteins can pass through, but cells cannot.

In some embodiments, the hollow fibres of this disclosure are permeable, such that fluids, nutrients, soluble growth factors, proteins and cells can pass through.

Soluble growth factors that may be of particular interest in cellular agriculture include, but are not limited to, basic fibroblast growth factor (bFGF), hepatocyte growth factor (HGF), insulin-like growth factor (IGF), epidermal growth factor (EGF), and vascular endothelial growth factor (VEGF) (34).

Soluble growth factors may vary in size. For example, bFGF ranges between 18-34 kDa, depending on its form. HGF is cleaved to form two active polypeptide chains, which are 69 kDa and 34 kDa in size. Whereas, IGF-1 is 7.6 kDa; EGF is 6 kDa; and VEGF, has 17 isoforms which range in size from 16-45 kDa.

In some embodiments, the hollow fibres of this disclosure are semi-permeable such that fluids and some solutes smaller than 7 kDa may pass through, but some solutes larger than 7 kDa may not.

In some embodiments, the hollow fibres of this disclosure are porous, semi-permeable such that fluids and solutes of sizes within the range 7 kDa to 12 kDa, 12 kDa to 17 kDa, 17 kDa to 22 kDa, 22 kDa to 27 kDa, 27 kDa to 32 kDa, 32 kDa to 37 kDa, 37 kDa to 42 kDa, 42 kDa to 47 kDa, 47 kDa to 52 kDa, 52 kDa to 57 kDa, 57 kDa to 62 kDa, 62 kDa to 67 kDa, 67 kDa to 72 kDa, 72 kDa to 77 kDa, or larger than 77 kDa can pass through.

In some embodiments, the hollow fibres of this disclosure are semi-permeable such that fluids and solutes of sizes within the range 7 kDa to 12 kDa, 12 kDa to 17 kDa, 17 kDa to 22 kDa, 22 kDa to 27 kDa, 27 kDa to 32 kDa, 32 kDa to 37 kDa, 37 kDa to 42 kDa, 42 kDa to 47 kDa, 47 kDa to 52 kDa, 52 kDa to 57 kDa, 57 kDa to 62 kDa, 62 kDa to 67 kDa, 67 kDa to 72 kDa, 72 kDa to 77 kDa, or larger than 77 kDa can pass through.

Materials may be classified as being macroporous (>50 nm), mesoporous (2-50 nm) or microporous (<2 nm) depending on the range of the pore sizes in the material. Microporous materials may also be referred to as nanoporous. A material is classified by the largest pore size present. For example, a porous material comprising pores which are smaller than 50 nm, as well as pores which are larger than 50 nm, would be classified as macroporous.

In some embodiments, the hollow fibres of this disclosure are macroporous, mesoporous, or microporous.

In some embodiments, the pore diameter of the pores in the walls of each hollow fibre of this disclosure is within the range of 1 nm to 100 µm; preferably, within the range of 5 nm to 15 µm; more preferably, within the range of 10 nm to 5 µm; even more preferably, within the range of 50 nm to 3 µm; and most preferably, within the range of 100 nm to 2 µm.

In some other embodiments, the pore diameter of each hollow fibre of this disclosure is within therange of1 nm to 10 nm, 10 nm to 50 nm, 50 nm to 100 nm, 100 nm to 500 nm, 500 nm to 1 µm, 1 µm to 5 µm, 5 µm to 10 µm, 10 µm to 50 µm, and/or 50 µm to 100 µm.

In some embodiments, there is provided a combination of hollow fibres of this disclosure, which comprises:
  (i) a plurality of fibres having pore sizes that are within the range of 1 µm to 15 µm; and
  (ii) a plurality of fibres having pore sizes that are within the range of 1 nm to 10 nm.

In some embodiments, the porosity of the walls of each hollow fibre of this disclosure is within the range of 1% to 95%; preferably, within the range of 50% to 90%; and most preferably, within the range of 60% to 80%.

In some other embodiments, the porosity of the walls of each hollow fibre of this disclosure, is within the range of 1% to 20%, 20% to 40%, 40% to 60%, 60% to 80%, or 80% to 90%.

In some other embodiments, the porosity of the walls of each hollow fibre of this disclosure, is below 1%.

Mercury porosimetry is the gold standard for the measurement of pore volume, porosity and pore size of semipermeable porous hollow fibres. Based on the capillary law for small pores, porosity may be determined by the total penetrating volume of a non-wetting fluid per unit volume of sample. Pore size may be calculated from the Washburn equation. Modern mercury porosimetry may measure pore diameters ranging between 900 µm to 0.005 µm (35). Additionally, surface pore diameter may be measured through SEM image analysis (32; 33). Such analytical methods may be applied to the hollow fibres of this disclosure, by someone of skill in the art.

The molecular cut-off weight (MWCO) is defined as the lowest molecular weight at which more than 90% of the solute with a known molecular weight is retained by hollow fibre. Typically, polyethylene glycols, poly(ethylene oxide) or bovine serum albumin are used as marker molecules to determine the MWCO (36). The change in abundance of these marker molecules in the feed and permeate streams, can be measured with refractive index signal intensity separated by size exclusion chromatography with a high-performance liquid chromatography analyser. This method may be used by someone skilled in the art to determine the molecular cut off weight of the hollow fibres of this disclosure.

In some embodiments, the MWCO of each hollow fibre of this disclosure is within the range of 5 kDa to 100 kDa; preferably, 5 kDa to 7 kDa; more preferably, 7 kDa and 10 kDa; even more preferably, 10 kDa and 20 kDa; and most preferably, 20 kDa and 30 kDa.

In some other embodiments, the MWCO of each hollow fibre of this disclosure is within the range of 5 kDa to 10 kDa, 10 kDa to 15 kDa, 15 kDa to 20 kDa, 20 kDa to 25 kDa, 25 kDa to 30 kDa, 30 kDa to 35 kDa, 35 kDa to 40 kDa, 40 kDa to 45 kDa, 45 kDa to 50 kDa, 50 kDa to 55 kDa, 55 kDa to 60 kDa, 60 kDa to 65 kDa, 65 kDa to 70 kDa, 70 kDa to 75 kDa, 75 kDa to 80 kDa, 80 kDa to 85 kDa, 85 kDa to 90 kDa, 90 kDa to 95 kDa, or 95 kDa to 100 kDa.

In some embodiments, the trans-wall pure water permeability (PWP) of a hollow fibre of the disclosure, is within the range of 10 L/($m^2$ h bar) and 1,000 L/($m^2$ h bar); preferably, 10 L/($m^2$ h bar) to 200 L/($m^2$ h bar); and most preferably, 0.5 L/($m^2$ h bar) to 30 L/($m^2$ h bar).

The PWP of the hollow fibres of the disclosure is defined as the volume (L) of pure water that passes through the fibre walls per unit area ($m^2$) of the hollow fibre, per unit of time (h), and per unit of trans-wall pressure (bar).

A person of skill in the art may be able to determine the PWP of the hollow fibres of this disclosure using a hydraulic filtration system, such as that illustrated in FIG. 7. In such an apparatus, pressure gauges located at the inlet and outlet of cartridge continuously measure the upstream and downstream pressures. Pure water is pumped from a reservoir through the lumen of the hollow fibres in the cartridge, via a positive displacement pump. Alternatively, a gear pump could be used. Pure water may either permeate through the walls of the hollow fibres into the extra capillary space on the shell side or flow through the lumen. The outlet on the shell side of the hollow fibres, transfers liquid into a permeate reservoir. The mass of the reservoirs of feed water and shell side permeate are continuously recorded.

The PWP may be determined by measuring the change in mass of water collected on the permeate side of the wall throughout the operation (37; 36).

For the hollow fibres of this disclosure to be suitable for use in a bioreactor, it is preferred that the PWP remains within a suitable range over a typical culture period. Such a period may last at least 3 days.

The particle rejection size (PRS) is defined as being the smallest particle size at which more than 90% of particles in a standard test slurry of a given uniform particle size is retained by a separation device, such as the hollow fibres of this disclosure, (36).

In some embodiments, the PRS rejection size of each fibre of this disclosure is within the range of 0.1 to 100 µm; preferably, at least 100 µm; more preferably, at least 50 µm; even more preferably, at least 25 µm; yet more preferably, at least 10 µm; yet even more preferably, at least 5 µm; more preferably still, at least 2.5 µm; even more preferably still, at least 1 µm; yet even more preferably still, at least 0.5 µm; and most preferably, at least 0.1 µm.

In some other embodiments, the PRS of each fibre of this disclosure is within the range of 0.1 µm to 1 µm, 1 µm to 5 µm, 5 µm to 10 µm, 10 µm to 15 µm, 15 µm to 20 µm, 20 µm to 25 µm, 25 µm to 30 µm, 30 µm to 35 µm, 35 µm to 40 µm, 40 µm to 45 µm, 45 µm to 50 µm, 50 µm to 55 µm, 55 µm to 60 µm, 60 µm to 65 µm, 65 µm to 70 µm, 70 µm to 75 µm, 75 µm to 80 µm, 80 µm to 85 µm, 85 µm to 90 µm, 90 µm to 95 µm, or 95 µm to 100 µm A person of skill in the art may be able to determine the PRS of the hollow fibres of this disclosure using a multi-sizer that evaluates the size of particles in slurries comprising a suspension of different-sized polystyrene balls. Once a test slurry is passed through the hollow fibre, the difference in abundance of polystyrene ball sizes in the test slurry and the permeate may then used to calculate the PRS of the hollow fibres of this disclosure (6).

1.20 COMPOSITION OF THE COVALENTLY-CROSSLINKED, POROUS, SEMI-PERMEABLE HOLLOW FIBRES

In certain aspects and embodiments, the hollow fibres of this disclosure comprise one or more covalent ester, thioester and/or amide crosslinked polypeptides.

In some embodiments, Prokitein is used for the production of hollow fibres.

In some embodiments, the hollow fibres comprise Prokitein.

In one embodiment, the covalent ester, thioester and/or amide crosslinked polypeptides may be multimers, such that they comprise multiple chains of those polypeptides.

In some embodiments, the polypeptides in the hollow fibres of this disclosure are partially covalently-crosslinked, substantially covalently-crosslinked or entirely covalently-crosslinked.

In some embodiments, the hollow fibres of this disclosure comprise at least 50% (by weight) covalently-crosslinked polypeptides.

In some embodiments, the hollow fibres of this disclosure comprise at least 1%, 5%, 10%, 20%, 30%, 40%, 50%, 60%, 70%, 80%, 90%, 95%, 99% or 99.99% (by weight) covalently-crosslinked polypeptides.

In other embodiments, the hollow fibres of this disclosure comprise between 1% to 5%, 5% to 10%, 10% to 20%, 20% to 30%, 30% to 40%, 40% to 50%, 50% to 60%, 60% to 70%, 70% to 80%, 80% to 90%, or 90% to 99.99% (by weight) covalently-crosslinked polypeptides.

In some embodiments, the hollow fibres of this disclosure additionally comprise polysaccharides, that are each present in a mass ratio that is within the range of 1% to 10000% (weight per weight of polypeptide).

In some other embodiments, the hollow fibres of this disclosure additionally comprise lipids, that are each present in a mass ratio that is within the range of 1% to 10000% (weight per weight of polypeptide).

In some other embodiments, the hollow fibres of this disclosure additionally comprise polyols, that are each present in a mass ratio that is within the range of 1% to 10000% (weight per weight of polypeptide).

In some further embodiments, the hollow fibres of this disclosure additionally comprise at least one of polysaccharides and lipids, that are each present in a mass ratio that is within the range of 1% to 10000% (weight per weight of polypeptide).

In some further embodiments, the hollow fibres of this disclosure additionally comprise at least one of polysaccharides, lipids, and polyols, that are each present in a mass ratio that is within the range of 1% to 10000% (weight per weight of polypeptide).

In some embodiments, the polypeptides in the hollow fibres of this disclosure are crosslinked with a combination of intramolecular (within individual polypeptides) and intermolecular (between multiple polypeptides) covalent ester, thioester or amide bonds.

In other embodiments, polypeptides and polysaccharides in the hollow fibres of this disclosure are crosslinked with a combination of intramolecular and intermolecular to form polypeptide-polypeptide, polypeptides-polysaccharide, polysaccharide-polysaccharide ester, thioester and/or amide covalent bond crosslinks.

In some other embodiments, wherein the hollow fibres of this disclosure comprise only one type of polypeptide, the covalent crosslinking may be between all or substantially all of polypeptides of the hollow fibres.

In further embodiments, wherein the hollow fibres of this disclosure comprise more than one type of polypeptide, the covalent crosslinking may be between all or substantially all of the types of polypeptides of the hollow fibres.

In some other embodiments, wherein the hollow fibres of this disclosure additionally comprise one or more types of polysaccharides, the covalent crosslinking may be between all, or substantially all, of the types of polypeptides and/or polysaccharides of the hollow fibres.

In some embodiments, the polypeptides in the hollow fibres of this disclosure are at least 20% (by weight of polypeptide) covalently-crosslinked; preferably, at least 50% to 95%; more preferably, at least 55% to 90%; even more preferably, at least 65% to 85%; and most preferably, at least 70% to 80% crosslinked.

In other embodiments, the polypeptides in the hollow fibres of this disclosure are at least 20%, 30%, 40%, 50%, 60%, 70%, 80%, 90%, 95%, 99% or 99.99% (by weight of polypeptide) covalently-crosslinked.

In some other embodiments, the range of polypeptides in the hollow fibres of this disclosure that are covalently-crosslinked, is between 20% and 30%, 30% and 40%, 40% and 50%, 50% and 60%, 60% and 70%, 70% and 80%, 80% and 90%, or 90% and 99.99% (by weight of polypeptide).

In some embodiments, Prokitein comprises polypeptides obtained from a single source (e.g. soybeans or faba beans).

The disclosure is also based, at least in part, on the realization that Prokitein comprising polypeptides derived from multiple sources (e.g., soybeans and faba beans) may have different properties to Prokitein comprising polypeptides derived from just a single source.

As used herein, a "Prokitein alloy" refers to a Prokitein comprising polypeptides derived from multiple different sources.

In some embodiments, the polypeptides of Prokitein, Prokitein alloy, and/or methods of the disclosure are obtained or derived from plants, animals, bacteria, algae, archaea, and/or fungi.

A Prokitein alloy may comprise polypeptides derived from two, three, four, five, six or more than six sources.

In some embodiments, a Prokitein alloy comprises polypeptides derived from two sources; three sources; four sources; five sources; six sources; or more than six sources.

In some other embodiments, Prokitein comprises a Prokitein alloy.

Prokitein may additionally comprise polysaccharides, lipids, polyols, and/or any combination thereof.

In some embodiments, Prokitein comprises polysaccharides.

In some embodiments, Prokitein comprises lipids.

In some embodiments, Prokitein comprises polyols.

In some embodiments, Prokitein comprises polysaccharides and lipids.

In some embodiments, Prokitein comprises lipids and polyols.

In some embodiments, Prokitein comprises polysaccharides and polyols.

In some embodiments, Prokitein comprises polysaccharides, lipids and polyols.

Methods for producing ester, thioester and/or amide crosslinked polypeptides are discussed herein.

The polypeptides in the hollow fibres may be crosslinked through esterification, thioesterification and/or amidation reactions with polycarboxylic acids.

The polypeptides in the hollow fibres may be crosslinked through esterification, thioesterification and/or amidation reactions with polycarboxylic acid salts that include, but are not limited to, sodium oxalate, potassium oxalate, sodium malate, potassium malate, sodium succinate, potassium succinate, sodium adipate, potassium adipate, sodium tartrate, potassium tartrate, potassium citrate, sodium citrate, sodium malonate, and/or potassium malonate; and preferably, sodium citrate and/or sodium malate.

Polycarboxylic acids with more than one carboxyl groups may be used to form inter-polypeptide (i.e., in between two polypeptide chains) and/or intra-polypeptide (i.e., in between two locations along the one polypeptide chain) covalent ester, thioester or amide crosslinks (20).

In some embodiments polycarboxylic acids with more than one carboxyl groups are used to form inter-polypeptide and/or intra-polypeptide covalent ester, thioester or amide crosslinks.

Polycarboxylic acids with more than one carboxyl groups may be used to form inter-polypeptide and/or intra-polypeptide covalent ester crosslinks in the presence of a secondary catalyst, such as sodium hypophosphite. In such cases, the two carboxyl groups may initially form a cyclic anhydride at high temperatures (38; 39). The cyclic anhydride may then react with one of the amine (—NH$_2$), hydroxide (—OH), or thiol (—SH) functional groups present on the polypeptide chain to potentially form a polypeptide ester, thioester or amide. A secondary addition reaction between the polycarboxyl derivative and sodium hypophosphite may then form an intermediate which may react with a second polypeptide ester, thioester or amide thereby potentially creating a crosslink. Other reaction pathways with bi-functional polycarboxylic acids may be possible, and catalysts may also be used (23; 40).

In some embodiments, polycarboxylic acids with more than one carboxyl groups are used to form inter-polypeptide and/or intra-polypeptide covalent ester crosslinks in the presence of a secondary catalyst, such as sodium hypophosphite.

Polycarboxylic acids with more than two carboxyl groups may be used to form inter-polypeptide and/or intra-polypeptide covalent ester crosslinks. In such cases, initially two of the carboxyl groups on the polycarboxylic acid may be dehydrated to form a cyclic anhydride. The cyclic anhydride may then react with one of the amine (—NH$_2$), hydroxide (—OH) or thiol (—SH) functional groups present on the polypeptide chain to potentially form a polypeptide ester, thioester or amide with two or more carboxyl groups. Two of the carboxyl groups on the polypeptide ester, thioester or amide may then be dehydrated again to potentially form a cyclic anhydride. Finally, the polypeptide ester with a cyclic anhydride may then react with a functional group on a second polypeptide chain to potentially form a polycarboxylic acid derived ester, thioester or amide crosslinked polypeptide (20; 41).

In some embodiments, polycarboxylic acid salts with more than two carboxyl groups are used to form inter-polypeptide and/or intra-polypeptide covalent ester, thioester or amide crosslinks.

In some embodiments, polycarboxylic acid salts with more than two carboxyl groups are used to form inter-polypeptide and/or intra-polypeptide covalent ester, thioester or amide crosslinks in the presence of a catalyst.

Polycarboxylic acids with more than two carboxyl groups may be used to form inter-polypeptide and/or intra-polypeptide covalent ester crosslinks in the presence of a secondary catalyst, such as sodium hypophosphite. In such cases, the two carboxyl groups may initially be dehydrated to potentially form a cyclic anhydride. Subsequent acylation between the polycarboxylic acid derived anhydride and sodium hypophosphite may result in the formation of an intermediate. Nucleophilic substitution of the anhydride and sodium hypophosphite intermediate with one of the amine (—NH$_2$) hydroxide (—OH), and thiol (—SH) functional groups present on the polypeptide chain may then produce a polypeptide ester, thioester or amide with two or more carboxyl groups. Two of the carboxyl groups on the polypeptide polycarboxylic acid derived ester, thioester or amide may then be dehydrated again to potentially form a polypeptide ester, thioester or amide cyclic anhydride intermediate. Acylation of this intermediate with sodium hypophosphite potentially forms yet another intermediate, which may undergo nucleophilic substitution with another functional group present on a polypeptide chain to potentially form a polycarboxylic acids derived polypeptide ester, thioester or amide crosslink and the reformation of the sodium hypophosphite such that it acts as a catalyst and is not consumed (22).

In some embodiments, catalysts used to catalyse the formation of polycarboxylic acid derived inter-polypeptide and/or intra-polypeptide covalent ester, thioester or amide crosslinks include, but are not limited to, sodium sulphite, sodium bisulphite, sodium metabisulphite, and/or sodium hypophosphite.

A person of skill in the art may be able determine the chemical composition and structure of the polypeptides in the hollow fibres of this disclosure as well as the polypeptides from which they are derived. Methods which may be used include mass spectrometry (MS), SDS-PAGE, Fourier Transform Infrared (FTIR) Spectroscopy, circular dichroism, Wide-Angle X-ray Scattering (WAXS) and Raman Spectroscopy.

A person of skill in the art may be able determine the chemical composition and structure of the polypeptides in Prokitein as well as the polypeptides from which they are derived, using the same methods applicable to the hollow fibres of this disclosure. Methods which may be used include mass spectrometry (MS), SDS-PAGE, Fourier Transform Infrared (FTIR) Spectroscopy, circular dichroism, Wide-Angle X-ray Scattering (WAXS) and Raman Spectroscopy.

Mass spectrometry is commonly used to determine primary and higher-order protein structures. MS analysis is generally performed on protein samples that are either fully intact (top-down) or have been initially digested into fragments (bottom-up). In a typical form of this type of analysis, in both top down and bottom up, samples are initially converted into an ionised gas, through methods such as electrospray ionization or matrix-assisted laser desorption/ionization (MADLI). The mass(es) of the ionised sample or sample fragments may then be determined with a time of flight (TOF) detector. Peptide sequences may then be determined by comparison of recorded sample fragments and predicted peptide sequence masses. To avoid complex mixtures of proteins being evaluated at once, methods such as SDS-PAGE, high-performance liquid chromatography (HPLC), or gas chromatography (GC) may be used to separate protein mixtures prior to analysis (42).

Sodium dodecyl sulphate-polyacrylamide gel electrophoresis (SDS-PAGE) may be used to separate proteins on the basis of molecular weight through molecular sieving afforded by the variable pore size in the PAGE gel. SDS acts to denature and unfold most protein structures to eliminate differences in the secondary and tertiary structure of polypeptides, while minimising the effect of their surface charge differences. Consequently, since the 1970s, SDS-PAGE has been one of the most widely used techniques for protein separation and characterisation. Through the use of standards of known masses, the mass of unknown bands may be estimated. Cross-referencing these estimated masses with MS or western blot data from the literature may then be used for the identification of bands isolated in a sample (43). By comparing the masses of emergent bands from crosslinked polypeptide samples with the masses of bands of known polypeptides, the degree of crosslinking in the crosslinked polypeptide sample may be estimated by the multiplicity of mass of the known bands associated with the bands in the known polypeptide sample.

For example, SDS-PAGE has been used in the identification of polypeptides present in soy protein, which may be separated into four major groups designated as 2S, 7S, 11S, and 15S. Of the proteins identified in SPI, 7S globulin (beta-conglycinin) and 11S globulin (globulin) are the two most abundant. beta-conglycinin, with a molecular weight of ~180 kDa, is a trimer glycoprotein consisting of three subunits: alpha (~67 kDa), alpha'(~71 kDa), and beta (~50 kDa). Glycinin (~350 kDa) is a hexamer composed of five major subunits with two subunits being basic (~19.6 kDa) or acidic (~34.8 kDa) (44; 45). By comparing the estimated mass of bands identified in a crosslinked polypeptide sample derived from soy protein with multiplicities of these masses, the degree of cross linking in a soy polypeptide derived crosslinked sample may be estimated. Such methods may be used to analyse polypeptides of other origins.

By taking a representative sample of material used to produce the semi-permeable hollow fibres and evaluating the sample with SDS-PAGE, the mass of bands identified may be estimated. These bands can then be identified through comparison with known masses from the literature in order to determine the components in the starting organic material. Bands with masses which do not correlate with those in literature may be identified with mass spectrometry.

By taking a representative sample of Prokiteins and evaluating the sample with SDS-PAGE, the mass of bands identified may be estimated. These bands can then be identified through comparison with known masses from the literature in order to determine the components in the starting organic material. Bands with masses which do not correlate with those in literature may be identified with mass spectrometry.

Fourier Transform infrared (FTIR) spectroscopy is one of the most commonly used methods for determining the chemical structure of molecules due to its associated low instrument cost and breadth of molecular size applicability. The chemical structure of a molecule predominantly determines the vibrational frequencies recorded in response to the strength of vibrating bonds and the masses of the vibrating atoms. However, while chemical structure cannot be determined from FTIR data, changes in molecular structure can. One of the most common applications of FTIR is the analysis of protein secondary structures, which are predominately determined through the evaluation of the amide I, II and III bands as well as the near-infrared region. Secondary structure is commonly determined from these bands via one of two methods: (1) fitting component bands to the amide I band; or (2) decomposing the amide I band into basis spectra determined from calibration proteins (46). For example, FTIR has been used to evaluate the change in the secondary structure of silk proteins upon exposure to organic solvents. The components of the secondary structure of silk proteins were quantified from the peak areas of their assigned wavelengths: beta-sheets (1616-1637 $cm^{-1}$ and 1697-1703 $cm^{-1}$), random coils (1638-1655 $cm^{-1}$), alpha helices (1656-1662 $cm^{-1}$) and beta turns (1663-1696 $cm^{-1}$), (27; 28). Hence, FTIR may be used to evaluate changes in the secondary structure of the polypeptides of the hollow fibres of this disclosure.

Circular dichroism (CD) is an inexpensive and rapid method for the evaluation of protein secondary structures that is based on the differential adsorption of left- and right-handed polarized light. Various structural elements in polypeptide backbones interact with light such that while in specific conformations they yield a characteristic CD spectrum. Specifically, alpha-helical proteins have negative bands at 222 nm and 208 nm and a positive band at 193 nm. Proteins with beta-helices have negative bands at 218 nm and positive bands at 195 nm, while disordered polypeptides have very low ellipticity above 210 nm and negative bands near 195 nm. By evaluating the change in relative band intensity, the change in the prevalence of each of these secondary protein structures may be generally determined (47). Hence, CD may be used to evaluate changes in the secondary structure of the polypeptides of the hollow fibres of this disclosure.

X-ray diffraction (XRD) is a well-established technique used in the characterisation of the crystalline structure of materials, including polypeptides (48). Wide-angle X-ray scattering can be used in the determination of protein secondary structure, through the association of peaks at 9° and 20° being associated with changes in alpha-helices and beta-sheets respectively (49). Hence, XRD may be used to evaluate changes in the secondary structure of the polypeptides of the hollow fibres of this disclosure.

Raman spectroscopy may be used for the analysis of polypeptide structures through the use of several vibrational modes. By considering the vibrational bands associated with amides A, B, and I to VII, different polypeptide secondary structure conformations may be identified. The relative abundance of alpha-helix and beta-sheets in polypeptide samples may be determined from the positions of amides I and III. Specifically, the average wavelengths for alpha-helices are: 1662-1655 and 1272-1264 $cm^{-1}$, while for beta-sheet structures are 1674-1672 and 1242-1227 $cm^{-1}$, respectively, for amide I and amide III modes (50). Hence, Raman spectroscopy may be used to evaluate changes in the secondary structure of the polypeptides of the hollow fibres of this disclosure.

FTIR, CD, XRD and Raman spectroscopy may also be used to evaluate changes in the secondary structure of the polypeptides of Prokiteins.

Differential Scanning Calorimetry (DSC) may be used to characterise the thermal and conformational stability of proteins and other biopolymers. DSC measures heat capacity as a function of temperature to produce thermographs, which may contain three characteristic regions: (1) an annealing peak (determined from the enthalpy of crystallisation, $\Delta H_c$); (2) a melting peak (determined from the enthalpy of fusion, $\Delta H_f$); and (3) a melting point ($T_m$).

Annealing may be used to induce crystal formation in Prokitein and the hollow fibres of this disclosure. During annealing, samples are bought up to a temperature between the glass transition temperature and the melting point, which may enable molecular chains to rearrange into more stable forms with reduced internal stresses. Upon subsequent cooling, the molecular chains may be frozen in place.

Samples which have been annealed, when analysed with DSC, may exhibit an increase in melting temperature, an increase in crystallisation temperature, a sharper and more pronounced melting peak, and/or a reduction in the number of melting peaks. Depending on the conditions used, re-annealing a sample which has already been annealed may result in only limited changes to the thermal properties of the sample, as the crystal structure has already been stabilised to a degree (i.e., with reduced internal stresses). Therefore, one of ordinary skill in the art may be able to use DSC to assess if a polymer, such as Prokitein or a hollow fibre of this disclosure, has been annealed.

XRD can also be used by one of ordinary skill in the art to assess the degree of crystallinity of Prokitein and/or the hollow fibres of this disclosure. In XRD, crystalline regions typically produce sharp peaks, while amorphous regions usually contribute to a broad, diffuse background. The degree of crystallinity may be assessed by integrating the relative magnitude of the peaks in an XRD spectra. A semi-crystalline polymer, such as Prokitein, may yield an XRD spectra that comprises the peaks and broad, diffuse background associated with crystalline and amorphous regions, respectively. The internal stresses of Prokitein and hollow fibres of this disclosure may be assessed by analysis of XRD spectra using methods comprising Bragg's Law, Analysis of Peak shifts, $Sin^2 \psi$ method associated with tilt angles, and/or whole powder pattern fitting. Furthermore, the uniform distribution of crystal grain size and shapes may be determined through the analysis of peaks within a XRD spectra by one of ordinary skill in the art.

In some embodiments, the XRD spectra of Prokitein comprises sharp peaks and a broad diffuse background.

In some embodiments, Prokitein is almost entirely crystalline.

In some embodiments, Prokitein is almost entirely amorphous.

In some embodiments, the crystallinity of Prokitein is higher than 0%.

In some embodiments, the crystallinity of Prokitein is higher than 5%.

In some embodiments, the crystallinity of Prokitein is higher than 10%.

In some embodiments, the crystallinity of Prokitein is higher than 20%.

In some embodiments, the crystallinity of Prokitein is higher than 30%.

In some embodiments, the crystallinity of Prokitein is higher than 40%.

In some embodiments, the crystallinity of Prokitein is higher than 50%.

In some embodiments, the crystallinity of Prokitein is higher than 60%.

In some embodiments, the crystallinity of Prokitein is higher than 70%.

In some embodiments, the crystallinity of Prokitein is higher than 80%.

In some embodiments, the crystallinity of Prokitein is higher than 90%.

In some embodiments, the crystallinity of Prokitein is higher than 95%.

In some embodiments, the crystallinity of Prokitein is within the range of 0.01% to 10%, 10% to 20%, 20% to 30%, 30% to 40%, 40% to 50%, 50% to 60%, 60% to 70%, 70% to 80%, 80% to 90% or 99.99%.

The ratio of crystalline to amorphous regions within Prokitein may be altered such as to tailor its material properties. Crystalline materials typically are stiff, hard, and brittle, while amorphous are flexible. The ratio of crystalline to amorphous regions within Prokitein may be tailored by the temperature and duration by which it is annealed.

In some embodiments, the ratio of crystalline to amorphous regions within Prokitein is altered and/or tailored by protein annealing.

Functional Characteristics of the Covalently-Crosslinked, Porous, Semi-Permeable Hollow Fibres It is a feature of certain aspects and embodiments of this disclosure that the hollow fibres of the disclosure remain mechanically stable whilst submerged in an aqueous solution for at least a day, and preferably for at least 3 days.

It is a feature of certain aspects and embodiments of this disclosure, that one or more of the described process steps, particularly Step (d) and Step (e.i), promotes the formation of beta-sheet structures within the polypeptides of the hollow fibres of this disclosure. The formation of beta-sheets in the secondary structure of the polypeptides confers a degree of water stability of the hollow fibres produced in this disclosure.

It is a feature of certain aspects and embodiments of this disclosure, that one or more of the described process steps, particularly Step (d), Step (e.i), and Step (e.ii) be performed sequentially in the order specified. Step (e.i) may promote the formation of beta-sheets within the secondary protein structure of the crosslinked polypeptides of the hollow fibres of this disclosure, thereby potentially granting them a degree of water stability. Step (e.ii) anneals the covalently cross-linked hollow fibres, thereby potentially relaxing internal stresses in the crosslinked material, and may allow the beta-sheet configuration to remain intact upon submersion in aqueous solvents, which may prevent the hydrolytic hydrolysis of the covalent ester crosslinks.

The hollow fibres of this disclosure may maintain good mechanical properties after being continuously submerged in an aqueous solution.

In some embodiments, the hollow fibres of this disclosure maintain good mechanical properties after being continuously submerged in an aqueous solution. In particular, at least one of the Young's modulus, ultimate tensile strength, and/or ultimate tensile strain of the hollow fibres of this disclosure, as measured directly after removal from aqueous solutions, do not decrease by more than 60% after being submerged in an aqueous solution, such as PBS, at a temperature between 18° C. and 38° C. and with a pH between 7.0 and 8.0 for a period of 3 days; preferably after a period of 5 days; more preferably after a period of 10 days; even more preferably after a period of 15 days; and most preferably after a period of 30 days.

In another embodiment, the hollow fibres of this disclosure maintain good structural properties after being continuously submerged in an aqueous solution. In particular, the wall thickness, pore diameter, and pore void fraction, as measured with SEM and/or mercury porosimetry, of the hollow fibres produced in this disclosure, do not change by more than 30% after being submerged in an aqueous solution, such as PBS, at a temperature between 18° C. and 38° C. and with a pH between 7.0 and 8.0 for a period of 3 days; preferably after a period of 5 days; more preferably after a period of 10 days; even more preferably after a period of 15 days; and most preferably after a period of 30 days.

When evaluating the functional mechanical characteristics of a material, through the application of a tensile force applied to a sample, the resulting displacement may be recorded as a function of the force applied until sample failure with the use of universal uni-axial tensile testing. The mechanical characteristics of a material may be calculated from the measured relationship between the tensile force applied to the sample, and the resulting displacement. Knowing the cross-sectional area of the material tested, as measured with SEM, characteristics which may be calculated include the yield point, ultimate tensile strength, ultimate tensile strain, and the Young's modulus.

The ultimate tensile strength is the maximum force applied to the material before failure. The ultimate tensile strain is the material elongation at the point of failure. The Young's modulus is the ratio of the change in stress over the change in strain before the yield point. The yield point is the point at which the relationship between the stress and strain is no longer directly proportional. By evaluating these characteristics, a mechanical profile of the hollow fibres of this disclosure may be determined (51).

The yield point, ultimate tensile strength, ultimate tensile strain, and the Young's modulus of Prokiteins may also be evaluated by universal uni-axial tensile testing.

In yet another embodiment, the hollow fibres of this disclosure maintain good aqueous fluid transport characteristics after being submerged in aqueous solution. In particular, the PWP of the hollow fibres produced in this disclosure does not decrease by more than 60%, nor increase by more than 20%, after being submerged in an aqueous solution, such as phosphate buffer solution (PBS), at a temperature between 18° C. and 38° C. and with a pH between 7.0 and 8.0 for a period of 3 days; preferably for a period of 5 days; more preferably for a period of 10 days; even preferably after a period of 15 days; and most preferably after a period of 30 days.

In yet another further embodiment, the hollow fibres of this disclosure maintain good mass transport characteristics after being submerged in aqueous solution. In particular, both the molecular cut-off weight and particle retention size of the hollow fibres produced in this disclosure do not decrease by more than 60%, nor increase by more than 20% after being submerged in an aqueous solution, such as phosphate buffer solution (PBS), at a temperature between 18° C. and 38° C. and with a pH between 7.0 and 8.0 for a period of 3 days; preferably for a period of 5 days; more preferably for a period of 10 days; even preferably after a period of 15 days; and most preferably after a period of 30 days.

The treatment of the hollow fibres to alter their mechanical properties may be carried out either before and/or after the culture of cells on the hollow fibres.

In some embodiments, the treatment of the hollow fibres to alter their mechanical properties are carried out before the culture of cells on the hollow fibres.

In some embodiments, the treatment of the hollow fibres to alter their mechanical properties are carried out after the culture of cells on the hollow fibres.

In some embodiments, the treatment of the hollow fibres to alter their mechanical properties is not carried out.

In some embodiments, the hollow fibres of this disclosure are stable whilst submerged in an aqueous solution, such as phosphate buffer solution (PBS), at a temperature between 18° C. and 38° C. and with a pH between 7.0 and 8.0 for a period of 3 days, such that the hollow fibres maintain good mechanical properties, structural characteristics, aqueous fluid transport properties, and mass transport properties for a period of at least 3 days; preferably for a period of 5 days; more preferably for a period of 10 days; even preferably after a period of 15 days; and most preferably after a period of 30 days.

In some embodiments, Prokitein remains mechanically stable whilst submerged in an aqueous solution for at least a day, preferably for at least 3 days; more preferably, for at least 5 days; even more preferably, for at least 10 days; yet even more preferably, for at least 15 days; and most preferably for at least 30 days.

In some embodiments, Prokitein remains mechanically stable whilst submerged in an aqueous solution for at least 1 month, preferably for at least 3 months; and most preferably for at least 6 months.

In some embodiments, Prokitein maintains good mechanical properties after being continuously submerged in an aqueous solution. In particular, at least one of the Young's modulus, ultimate tensile strength, and/or ultimate tensile strain of Prokitein, as measured directly after removal from aqueous solutions, does not decrease by more than 60% after being submerged in an aqueous solution, such as PBS, at a temperature between 18° C. and 38° C. and with a pH between 7.0 and 8.0, for a period of 3 days; preferably after a period of 5 days; more preferably after a period of 10 days; even more preferably after a period of 15 days; and most preferably after a period of 30 days.

In one embodiment, the hollow fibres of this disclosure are edible.

In one embodiment, Prokitein of this disclosure is edible.

In some embodiments, the hollow fibres of this disclosure are suitable for human and/or animal ingestion.

In some embodiments, Prokitein of this disclosure is suitable for human and/or animal ingestion.

In some embodiments, the hollow fibres of this disclosure are GRAS.

In some embodiments, the hollow fibres of this disclosure are produced solely from components which are GRAS.

In some embodiments, the Prokitein of this disclosure is produced solely from components which are GRAS.

In some embodiments, the hollow fibres of this disclosure are produced in part from components which are GRAS.

In some embodiments, the Prokitein of this disclosure is produced in part from components which are GRAS.

In some embodiments, the hollow fibres of this disclosure are palatable.

In some embodiments, the Prokitein of this disclosure is palatable.

In some embodiments, the hollow fibres of this disclosure constitute a food product.

In some embodiments, the Prokitein of this disclosure constitute a food product.

In some embodiments, the hollow fibres of this disclosure are a food product.

In some embodiments, the Prokitein of this disclosure is a food product.

In some embodiments, the hollow fibres of this disclosure as an ingredient in a food product.

In some embodiments, the Prokitein of this disclosure as an ingredient in a food product.

In some embodiments, the hollow fibres of this disclosure are biodegradable.

In some embodiments, the Prokitein of this disclosure is biodegradable.

In some embodiments, the term "edible" is defined as a material which is fit for human and/or animal consumption.

In some other embodiments, the term "edible" refers to a material which is fit for human and/or animal consumption and is capable of being designated as food.

While it cannot be ensured that a particular item of food will never pose a risk to a consumer, various risk management frameworks exist to control the potential risks. This is embodied as pre-market authorisation decisions by food safety authorities.

In the European Union, this is translated into a pre-market authorisation decision as laid out by the European Food Safety Authority (EFSA) Novel Food Regulation (EU) 2015/2283. A particular food is considered to be "novel" if it falls within a number of defined categories, and was not significantly consumed within the EU prior to 15 May 1997. The defined categories include: food with a new or intentionally modified molecular structure, where that structure was not used as, or in, food within the EU before 15 May 1997. In some embodiments the term "edible" refers to material that qualifies as food according to the European Food Safety Authority. In some embodiments the term "edible" refers to material that qualifies as food according to the European Food Safety Authority as of 1 Jan. 2023.

Similarly, the United States Food and Drug Administration (FDA) designates foods or food additives as being 'Generally Recognised as Safe' (GRAS) for consumption based on consensus among qualified experts. There are two ways in which this designation is be given, either through: (i) long-standing use, in which the food has been widely consumed since before 1958 and there are no reports of harm; or (ii) a series of scientific safety studies and subsequent review of the generated data by the FDA. As used herein, the term "Generally Regarded as Safe" and "GRAS" are used interchangeably and mean a material which is fit for human or animal consumption. In some embodiments, "GRAS" means a material that qualifies as GRAS pursuant to the United States Food and Drug Administration. In some embodiments, "GRAS" means a material that qualifies as GRAS pursuant to the United States Food and Drug Administration as 1 Jan. 2023. In some embodiments, the term "edible" means a material that is GRAS.

In some embodiments, "edible" refers to a material that both qualifies as food according to the European Food Safety Authority and is GRAS.

The EFSA has published guidance for the assessment of food safety under the Novel Food Regulation (EU) 2015/2283. These regulations mandate scientific data on the kinetics and toxicity of the proposed novel food, and includes listings of the identity of the novel food, a detailed description of the production process, compositional information, stability data, absorption, distribution, metabolism and excretion (ADME) data, as well as nutritional, and toxicological information. Toxicological data should include detailing of the anticipated use, kinetic data, toxicological data of the constitutive materials, human studies data and available relevant information.

Petrochemical polymer and ceramic hollow fibres are not and have not been widely consumed in the EU since before 1997, nor have they been consumed in the US since before 1958. They lack special designation by the EFSA as novel foods or by the FDA as GRAS. These materials may not be safely ingested.

In some preferred embodiments, the hollow fibres of this disclosure are non-cytotoxic.

Edible extruded or spun, fibres of this disclosure may comprise covalent ester, thioester and/or amide crosslinked polypeptides, and may be used as a substrate for cell growth in cell culture or within a bioreactor. To ensure that the edible hollow fibres produced in this disclosure are suitable for cell culture, they are in certain embodiments non-cytotoxic.

The International Organization for Standardization (ISO) standard ISO 10993-1:2018 (Biological evaluation of medical devices) has been ratified for the selection of biological materials by specifying testing procedures to demonstrate carcinogenicity, genotoxicity, hemocompatibility, cytotoxicity, implantation, sensitization, irritation, acute, sub-acute, sub-chronic and chronic toxicity. Cytotoxic effects may be determined by either qualitative or quantitative methods.

However, quantitative methods are preferable and qualitative methods should be used for screening purposes only. Materials produced in this disclosure may, therefore, in some embodiments be classified as non-cytotoxic as quantified by one of the methods outlined in Annexes A-D in ISO 10993-5 (Biological evaluation of medical devices—Part 5: Tests for in vitro cytotoxicity).

In some preferred embodiments, the outer or inner surfaces of the hollow fibres of this disclosure are capable of acting as a substrate for the adherence and growth of cells.

In some embodiments, the hollow fibres of this disclosure are able to sustain a cell culture for at least one day; preferably, for at least 3 days; more preferably, for at least 5 days; more even preferably, for at least 10 days; even more preferably, for at least 15 days; and most preferably, for at least 30 days.

In some other embodiments, the hollow fibres of this disclosure are able to sustain a cell culture for a duration that is within the range of 1 second to 1 minute, 1 minute to 1 hour, 1 hour to 6 hours, 6 hours to 1 day, 1 day to 2 days, 2 days to 3 days, 3 days to 4 days, 4 days to 5 days, 5 days to 6 days, 6 days to 7 days, 7 days to 8 days, 8 days to 9 days, 9 days to 10 days, 10 days to 11 days, 11 days to 12 days, 12 days to 13 days, 13 days to 14 days, 14 days to 15 days, 15 days to 16 days, 16 days to 17 days, 17 days to 18 days, 18 days to 19 days, 19 days to 20 days, 20 days to 21 days, 21 days to 22 days, 22 days to 23 days, 23 days to 24 days, 24 days to 25 days, 25 days to 26 days, 26 days to 27 days, 27 days to 28 days, 28 days to 29 days, 29 days to 30 days, or more than 30 days.

Substrates may be appropriate for cell growth as characterised in terms of their cytotoxicity. ISO 10993 ratifies standardised methods for determining the cytotoxicity of materials and the means by which they should be tested according to their structure. Materials may only be considered non-cytotoxic if they satisfy the test protocols as dictated by ISO 10993 (52). Someone of skill in the art may evaluate the cytotoxicity of the extruded or spun, fibres of this disclosure comprising covalent ester, thioester and/or amide crosslinked polypeptides, using the methods outlined in ISO 10993.

In some embodiments, the hollow fibres of this disclosure are non-cytotoxic, as determined by methods described in ISO 10993.

Cell proliferation is defined as the increase in the number of cells as a result of cellular growth and division. The number of cells in a given sample may be directly and/or indirectly quantified by someone of skill in the art using a number of on-line and off-line methods. Direct cell counts are most commonly taken, performed under a microscope either manually or with a haemocytometer. Other direct methods may include flow cytometry, and spectrophotometry. Alternatively, indirect measures may be employed, such as recording the trends in concentrations of metabolites (e.g., biomass, glucose, ethanol, lactic acid, acetic acid, succinic acid, and citric acid) and dissolved gases (e.g., oxygen, carbon dioxide, and ammonia). Cell number may also be indirectly measured with metabolic assays such as Alamar blue or CellTiter Glo. Furthermore, samples may be frozen to get a snapshot into the culture performance at a given time point. These samples may then be imaged with techniques such as confocal microscopy, SEM, or histology. Such methods may be applied to assess the proliferation of cells grown on the hollow fibres of this disclosure.

Additionally, cell number may also be indirectly measured with metabolic assays utilising PrestoBlue, PrestoBlue High-Sensitivity and/or solutions comprising of resazurin salt.

1.21 BIOREACTORS

It is a feature of certain aspects and embodiments of this disclosure that the hollow fibres of this disclosure are suitable for use as components in a bioreactor that is intended for use in cell culture.

In some embodiments, the hollow fibres of this disclosure are suitable for use as components in a multimodal, mechanically dynamic bioreactor that is intended for use in cell culture.

In some embodiments, the hollow fibres of this disclosure are suitable for use as components in hydrostatic cell culture, such as in well plates or flasks.

The term 'multimodal' herein refers to the provision of chemical, electrical and/or mechanical stimuli to the cultured cells. The term 'mechanically dynamic' herein refers to the ability of the bioreactor to apply controlled mechanical forces to the cultured cells. Such a conceived multimodal, mechanically dynamic bioreactor may be used to under dynamic fluid conditions and/or mechanically dynamic conditions, in which the bioreactor platform and/or the cell substrate is either stretched or compressed.

It is a feature of certain aspects and embodiments of this disclosure that the hollow fibres of this disclosure are suitable for being consumed alone or in combination with a product intended for human and/or animal ingestion.

In some embodiments, the hollow fibres of this disclosure are non-cytotoxic and can be used to sustain cell growth for at least three days.

In some other embodiments, the hollow fibres of this disclosure are suitable for use in the production of one or more cultivated meat products intended for human and/or animal consumption.

In some embodiments, the fibres of this disclosure are suitable for use as components within a bioreactor.

In some other embodiments, one or more of the hollow fibres of this disclosure are used in a bioreactor.

In some embodiments, the disclosure provides a bioreactor comprising one or more of the hollow fibres of this disclosure.

In some other embodiments, a bioreactor comprising one or more of the hollow fibres of this disclosure is suitable for facilitating cell cultivation.

In yet further embodiments, a bioreactor comprising one or more of the hollow fibres of this disclosure is suitable for use in the production of one or more cultivated meat products intended for human and/or animal consumption.

1.22 CARTRIDGES

It is a feature of certain aspects and embodiments of this disclosure, that the hollow fibres of this disclosure are suitable for use as components in a bioreactor cartridge, wherein each cartridge comprises one or a plurality of the hollow fibres of this disclosure.

The cartridges of this disclosure may comprise one or a plurality of the hollow fibres of this disclosure aligned in parallel along the long axis of the hollow fibre, and bounded by an outer wall, with an inlet port and an outlet port. A schematic diagram of a quarter cut out of a section of such a cartridge may be seen in FIG. 5. In FIG. 5, typical components of a cartridge are labelled, including the inlet to the cartridge (5001), the cartridge cap media dissipation cut (5002), cap of the cartridge (5003), the hollow fibre potting layer (5004), a bundle of a hollow fibres (5005) and the outer shell of the cartridge (5006).

In the cartridges of this disclosure, an intra-capillary (IC) space may be present within the lumen of the hollow fibres of this disclosure, and an extra-capillary (EC) space may be present surrounding the hollow fibres and bounded by the outer shell of the cartridge.

In some embodiments, in the cartridges of this disclosure, an intra-capillary (IC) space is present within the lumen of the hollow fibres of this disclosure, and an extra-capillary (EC) space is present surrounding the hollow fibres and bounded by the outer shell of the cartridge.

The Krogh cylinder model is often used to model the distance between capillaries in vivo before oxygen concentrations limit cell growth (53). The Krogh cylinder model suggests that hollow fibres should bundled such that there is a distance of no more than 100 µm (54).

In some embodiments, the shortest distance between any two adjacent fibres of this disclosure in any particular cartridge bundle is within the range of 0 µm to 150 µm; preferably, within the range of 20 µm to 200 µm; more preferably, within the range of 50 µm and 130 µm; even more preferably; within the range of 80 µm and 120 µm; and most preferably, within the range of 50 µm and 130 µm;

In some embodiments, the shortest distance between any two adjacent fibres of this disclosure, in any particular cartridge bundle is within the range of 0 µm to 10 µm; 10 µm to 20 µm; 20 µm to 30 µm; 30 µm to 40 µm; 40 µm to 50 µm; 50 µm to 60 µm; 60 µm to 70 µm; 70 µm to 80 µm; 80 µm to 90 µm; 90 µm to 100 µm; 110 µm to 120 µm; 120 µm to 130 µm; 130 µm to 140 µm; 140 µm to 150 µm; 150 µm to 160 µm; 160 µm to 170 µm; 170 µm to 180 µm; 180 µm to 190 µm; and/or 190 µm to 200 µm;

In some other embodiments, the shortest distance between any two adjacent fibres of this disclosure, in any particular cartridge bundle is within the range of 200 µm to 250 µm; 250 µm to 300 µm; 300 µm to 350 µm; 350 µm to 400 µm; 400 µm to 450 µm; 450 µm to 500 µm; 500 µm to 550 µm; 550 µm to 600 µm; 600 µm to 650 µm; 650 µm to 700 µm; 700 µm to 750 µm; 750 µm to 800 µm; 800 µm to 850 µm; 850 µm to 900 µm; 900 µm to 950 µm; and/or 950 µm to 1000 µm.

In some embodiments, the cartridges of this disclosure comprise a plurality of the hollow fibres of this disclosure arranged into one or more bundles that have densities that are within the range of 1 hollow fibres/cm$^2$ to 1000 hollow fibres/cm$^2$; preferably, 60 hollow fibres/cm$^2$ to 500 hollow fibres/cm$^2$; and most preferably, 80 hollow fibres/cm$^2$ to 300 hollow fibres/cm$^2$.

In other some embodiments, the cartridges of this disclosure comprise a plurality of the hollow fibres of this disclosure arranged into one or more bundles that have densities that are within the range of 25 hollow fibres/cm$^2$ to 150 hollow fibres/cm$^2$; preferably, 50 hollow fibres/cm$^2$ to 125 hollow fibres/cm$^2$; more preferably, 75 hollow fibres/cm$^2$ to 105 hollow fibres/cm²; and most preferably, 70 hollow fibres/cm² to 95 hollow fibres/cm²;

In some other embodiments, the cartridges of this disclosure comprise a plurality of the hollow fibres of this disclosure, that are arranged into one or more bundles that have densities that are within the range of 40 hollow fibres/cm² to 60 hollow fibres/cm², 60 hollow fibres/cm² to 80 hollow fibres/cm², 80 hollow fibres/cm² to 100 hollow fibres/cm², 100 hollow fibres/cm² to 120 hollow fibres/cm², 120 hollow fibres/cm² to 180 hollow fibres/cm², 180 hollow fibres/cm² to 220 hollow fibres/cm², 220 hollow fibres/cm² to 250 hollow fibres/cm², 250 hollow fibres/cm² to 300 hollow fibres/cm², 300 hollow fibres/cm² to 350 hollow fibres/cm², 350 hollow fibres/cm² to 400 hollow fibres/cm², 400 hollow fibres/cm² to 450 hollow fibres/cm², 450 hollow fibres/cm² to 500 hollow fibres/cm², 500 hollow fibres/cm² to 600 hollow fibres/cm², 600 hollow fibres/cm² to 800 hollow fibres/cm², and/or 800 hollow fibres/cm² to 1000 hollow fibres/cm².

To ensure the integrity of the bundles and ensure fluid entering a cartridge flows through the inter-capillary space, rather than through the extra-capillary space of the hollow fibre cartridge, the hollow fibres may be secured within a non-cytotoxic matrix through a process referred to as potting. Potting agents which may be used to ensure bundle integrity include, but are not limited to, epoxy, plaster, gypsum plaster, silicon rubber, and polytetrafluoroethylene.

In some embodiments, potting agents which are used to ensure bundle integrity include crosslinked polypeptides and/or polysaccharides.

In some embodiments, potting agents which are used to ensure bundle integrity include crosslinked polypeptides and/or polysaccharides that include, covalent ester, thioester and/or amide crosslinks.

In some embodiments, the cartridges of this disclosure comprise hollow fibres of this disclosure which have been potted with a potting agent.

Potting is the process in which the ends of hollow fibres may be encapsulated in a matrix to create a tight fluid seal between the hollow fibres and the outer wall of the bounding capsule.

This process is typically required to prevent fluid from bypassing the hollow fibres and flowing into the extra-capillary space, but instead forces the fluid flow into the intra-capillary space.

Potting agents are the encapsulating matrix used in the potting process.

In some embodiments, cartridges of hollow fibres are assembled by reversibly encasing one or multiple bundles of the hollow fibres of this disclosure within an outer shell, and adding suitable end-caps.

In some other embodiments, the cartridges are able to be easily disassembled.

In further embodiments, individual, multiple and/or bundles of the hollow fibres of this disclosure are removable from a cartridge assembly.

In yet further embodiments, individual, multiple or bundles of the hollow fibres of this disclosure are not removable from a cartridge assembly.

In some embodiments, individual, multiple or bundles of the hollow fibres of this disclosure are removable from a cartridge assembly with cells attached.

In some embodiments, a cultivated meat product, which contains the hollow fibres of this disclosure, is removable from the cartridge assembly.

In some preferred embodiments, a cultivated meat product, which contains the hollow fibres of this disclosure can be further treated to improve, preserve and/or alter the palatability, mouthfeel, taste and/or texture of the cultivated meat product before being removed from the cartridge assembly.

The inner diameter of the outer shell of each bioreactor cartridge of this disclosure may be within the range of 1 cm and 5 m.

In some embodiments, the inner diameter of the outer shell of each bioreactor cartridge of this disclosure is within the range of 1 cm to 50 cm; preferably, the inner diameter is 10 cm; more preferably, the inner diameter is 3 cm; and most preferably, the inner diameter is 7.5 cm.

In other embodiments, the inner diameter of the outer shell of each bioreactor cartridge of this disclosure is 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 25 cm, 30 cm, 35 cm, 40 cm, 45 cm, 50 cm, or any integer and decimal value in between.

In some embodiments, the inner diameter of the outer shell of each bioreactor cartridge of this disclosure is within the range of 1 cm to 500 cm; preferably, 10 cm and 300 cm; more preferably, 30 cm; and 200 cm; and most preferably, 50 cm and 100 cm.

In some other embodiments, the inner diameter of the outer shell of each bioreactor cartridge of this disclosure is within the range of 1 cm to 5 cm, 5 cm to 10 cm, 10 cm to 15 cm, 15 cm to 20 cm, 20 cm to 25 cm, 25 cm to 30 cm, 30 cm to 35 cm, 35 cm to 40 cm, 40 cm to 45 cm, 45 cm to 50 cm, 50 cm to 55 cm, 55 cm to 60 cm, 60 cm to 65 cm, 65 cm to 70 cm, 70 cm to 75 cm, 75 cm to 80 cm, 80 cm to 85 cm, 85 cm to 90 cm, 90 cm to 95 cm, 95 cm to 100 cm, 100 cm to 105 cm, 105 cm to 110 cm, 110 cm to 115 cm, 115 cm to 120 cm, 120 cm to 125 cm, 125 cm to 130 cm, 130 cm to 135 cm, 135 cm to 140 cm, 140 cm to 145 cm, 145 cm to 150 cm, 150 cm to 155 cm, 155 cm to 160 cm, 160 cm to 165 cm, 165 cm to 170 cm, 170 cm to 175 cm, 175 cm to 180 cm, 180 cm to 185 cm, 185 cm to 190 cm, 190 cm to 195 cm, 195 cm to 200 cm, 200 cm to 205 cm, 205 cm to 210 cm, 210 cm to 215 cm, 215 cm to 220 cm, 220 cm to 225 cm, 225 cm to 230 cm, 230 cm to 235 cm, 235 cm to 240 cm, 240 cm to 245 cm, 245 cm to 250 cm, 250 cm to 255 cm, 255 cm to 260 cm, 260 cm to 265 cm, 265 cm to 270 cm, 270 cm to 275 cm, 275 cm to 280 cm, 280 cm to 285 cm, 285 cm to 290 cm, 290 cm to 295 cm, 295 cm to 300 cm, 300 cm to 305 cm, 305 cm to 310 cm, 310 cm to 315 cm, 315 cm to 320 cm, 320 cm to 325 cm, 325 cm to 330 cm, 330 cm to 335 cm, 335 cm to 340 cm, 340 cm to 345 cm, 345 cm to 350 cm, 350 cm to 355 cm, 355 cm to 360 cm, 360 cm to 365 cm, 365 cm to 370 cm, 370 cm to 375 cm, 375 cm to 380 cm, 380 cm to 385 cm, 385 cm to 390 cm, 390 cm to 395 cm, 395 cm to 400 cm, 400 cm to 405 cm, 405 cm to 410 cm, 410 cm to 415 cm, 415 cm to 420 cm, 420 cm to 425 cm, 425 cm to 430 cm, 430 cm to 435 cm, 435 cm to 440 cm, 440 cm to 445 cm, 445 cm to 450 cm, 450 cm to 455 cm, 455 cm to 460 cm, 460 cm to 465 cm, 465 cm to 470 cm, 470 cm to 475 cm, 475 cm to 480 cm, 480 cm to 485 cm, 485 cm to 490 cm, 490 cm to 495 cm, or 495 cm to 500 cm.

Cartridges of assemblies for petrochemical polymer hollow fibres are well known to the art as disclosed in U.S. Pat. No. 6,001,585,A and US 2012/0308531.

The hollow fibres of this disclosure or cartridges thereof, are not limited in their use to any specific bioreactor configuration. In a preferred bioreactor configuration, media supply and process control are adequate to enable confluent cell cultivation.

In some embodiments, cartridges of the hollow fibres of this disclosure can be used with existing commercial reactor platforms that include, but are not limited to the Terumo BCT Quantum®, FiberCell® Systems Duet Pump, Sartorius Sartoflow®, and systems by Cell Culture Company (HF Primer™, AlutovaxlD®, AcuSyst-Maximizer®, or AcuSyst-Xcellerator™) In some embodiments, cartridges of the hollow fibres of this disclosure can be used in a bioreactor platform that support a single cartridge.

In some embodiments cartridges of the hollow fibres of this disclosure can be used in a bioreactor platform that support multiple cartridges.

A bioreactor platform capable of supporting cell cultivation with the hollow fibres of this disclosure or cartridges made thereof, may have an enclosure of a size in which a single or multiple cartridges may be enclosed. The platform may regulate environmental conditions within the enclosure, such that the temperature, humidity, and gas composition of the enclosed atmosphere are controlled. The cartridges within the platform may be connected with an inlet feed of culture media. The inlet feed line may pass through a pump, such that the rate of the inlet feed may be regulated. The outlet of the cartridge may be connected to a waste reservoir. Alternatively, the outlet of the cartridge may be connected the inlet, such that a recycle of media is established. The platform may be fitted with sensors to detect and measure various cultivation process parameters including, but not limited to, temperature, pH, flow rates, system weights, and the concentration of dissolved metabolites (e.g., oxygen, carbon dioxide, glucose, lactic acid, etc.,). Furthermore, a control system may be fitted to automate the operation of the bioreactor platform and be connected to the sensor array. Such a control system may be controlled locally via the use of a human machine interface (HMI) and/or remotely by installation into a wider control and monitoring network (e.g, SCADA or DeltaV).

Additionally, the bioreactor platform may comprise one or more ports through materials may be inserted or withdrawn.

In some embodiments, a bioreactor platform capable of supporting cell cultivation with the hollow fibres of this disclosure, or cartridges made thereof, has an enclosure of a size in which a single or multiple cartridges may be enclosed.

In some embodiments the bioreactor platform regulates environmental conditions within the enclosure, such that the temperature, humidity, and gas composition of the enclosed atmosphere are controlled.

In some embodiments, each cartridge is connected to one or more inlet feeds of culture media. The inlet feed line(s) pass(es) through one or more pumps, such that the rate of the inlet feed may be regulated.

In some embodiments, each cartridge is connected to one or more inlets fed from one or more fresh culture media reservoirs.

In some embodiments, the outlet of each cartridge is connected to one or more waste reservoirs.

In some embodiments, the outlet of each cartridge is connected to the inlet of the same cartridge, such that a recycle of media is established.

In some embodiments, the outlet of each cartridge is connected one or more waste reservoirs and to the inlet of the same cartridge, such that a partial recycle of media is established.

In some embodiments, the outlet of each cartridge is connected to one or more waste reservoirs and intermediate reservoirs. The proportion of outlet flow from the cartridge to the intermediate reservoir(s) is dictated by a recycle ratio.

In some embodiments, the cartridges are connected to one or more inlets fed from one or more intermediate culture media reservoirs. Each inlet feed is fed with a mixture of fresh and recycled media, with proportions dictated by one or more recycle ratios.

In some embodiments the bioreactor platform is fitted with sensors to detect and measure temperature.

In some embodiments the bioreactor platform is fitted with sensors to detect and measure pH.

In some embodiments the bioreactor platform is fitted with sensors to detect and measure flow rates.

In some embodiments the bioreactor platform is fitted with sensors to detect and measure system weights.

In some embodiments the bioreactor platform is fitted with sensors to detect and measure the concentration(s) of dissolved metabolite(s) (e.g., oxygen, carbon dioxide, glucose, lactic acid, etc.,).

In some embodiments the bioreactor platform is fitted with a control system.

In some embodiments the bioreactor platform is fitted with a control system to partially automate the operation of the bioreactor platform.

In some embodiments the bioreactor platform is fitted with a control system to automate the operation of the bioreactor platform.

In some embodiments the bioreactor platform is fitted with a control system with a sensor array.

In some embodiments the bioreactor platform is fitted with a control system that can be controlled locally via the use of a human machine interface (HMI).

In some embodiments the bioreactor platform is fitted with a control system that can be controlled locally via the use of a human machine interface (HMI) and/or remotely by installation into a wider control and monitoring network (e.g, SCADA or DeltaV).

In some embodiments the bioreactor platform is connected to a cell retention device, such as, but not limited to, the XCell® ATF 6.

In some embodiments, the bioreactor platform comprises one or more ports through materials may be inserted or withdrawn.

In some embodiments, the inner and/or outer surfaces of hollow fibres of this disclosure are capable of acting as substrates for the adherence and growth of cells, particularly in the production of a cultured meat product.

In some embodiments, the type of cells cultivated on the hollow fibres of this disclosure either alone or in combination, include, but are not limited to, satellite cells, mesenchymal stem cells, induced pluripotent stem cells, myocytes, fibroblasts, adipocytes or engineered cells.

Other cultured cells which are suitable for use in the production of cultured meat products include, but are not limited to, satellite cells, mesenchymal stem cells, induced pluripotent stem cells, myocytes, fibroblasts, adipocytes or engineered cells derived from animal sources. Examples of such animal sources include, but is not limited to:
  mammals: cattle, sheep, pig, horse, goat, deer, reindeer, bison, alpaca, llama, moose, elk, camel, wild boar, buffalo, wildebeest, whale, dolphin and/or guinea pig;
  marsupials: kangaroo, koala, wombat;
  birds: chicken, turkey, duck, goose, quail, peacock, pheasant, guineafowl, ostrich, emu, pigeon, partridge, grouse, snipe, and/or woodcock;
  fish: salmon, tuna, cod, trout, sardines, haddock, tilapia, catfish, mackerel, swordfish, halibut, dolphinfish, grouper, snapper, sea bass, anchovy, carp, perch, pike, flounder, sole, eel, herring, whitefish, and/or crawfish;

cephalopods: squid, octopus, cuttlefish, and/or nautilus;

crustaceans: shrimp, crab, lobster, crawfish, prawn, krill, crayfish, mussel, oyster, clam, scallop, and/or cockle;

reptiles: snakes, turtles, alligators, crocodiles, iguanas, and/or lizards; and insects: grasshopper, cricket, mealworm, beetle, ant, termite, cicada, caterpillar, silkworm, locust, waxworm, hornworm, bamboo worm, scorpion, and/or centipede.

In some conceived embodiments, engineered cells derived from the DNA of animals which have since become extinct are cultivated on the hollow fibres of this disclosure. Examples of such animals include, but are not limited to, mammoths (*Mammuthus*), and/or dodos (*Raphus*).

In some embodiments, the cells cultivated on the hollow fibres of this disclosure are derived from mammals including, but not limited to, human, primate, canine, feline and/or murine sources.

In some embodiments, the cells cultivated on the hollow fibres of this disclosure are not for use in the production of cultured meat products.

In some embodiments, the type of cells cultivated on the hollow fibres of this disclosure are all the same, thereby constituting a homo-culture.

In some other embodiments, the type of cells cultivated on the hollow fibres of this disclosure are different, thereby constituting a co-culture.

A co-culture of cells is embodied by the concurrent culture of more than one cell type in a single bioreactor.

In some embodiments, cells cultivated on the hollow fibres of this disclosure are derived from multiple animal sources.

In some embodiments, cells cultivated on the hollow fibres of this disclosure are derived from multiple sources.

In some embodiments, the combinations of cell types that can be cultivated together on the hollow fibres of this disclosure in co-cultures include, but are not limited to: myocytes and fibroblasts, myocytes and engineered cells, adipocytes and fibroblasts, adipocytes and engineered cells, myocytes, fibroblasts and adipocytes, myocytes, fibroblasts and engineered cells, myocytes, adipocytes and engineered cells, fibroblasts, adipocytes and engineered cells, or myocytes, fibroblasts, adipocytes and engineered cells.

In some embodiments, cells derived from non-animal protein sources, such as, but not limited to, plants, bacteria, fungi, algae and/or archaea, may be suitably cultivated in bioreactors comprising the hollow fibres of this disclosure and/or cartridges thereof.

In some embodiments, cells cultivated on the hollow fibres of this disclosure are derived from multiple sources including animals, plants, bacteria, fungi, algae and/or archaea.

Edible cells, including satellite cells, myocytes and adipocytes, may be sensitive to fluid shear stress; the mechanical force brought about by the friction of fluids flow against the exterior of cell membranes. In CSTRs, fluid shear stresses may be high to ensure efficient mass transfer and uniform mixing. However, hollow fibre bioreactors may be able to maintain very low fluid shear stresses within the extra-capillary spaces, relative to CSTRs (55).

Edible cells, including satellite cells, myocytes and adipocytes, are typically adherent cell types by nature. During the cultivation of adherent edible cells in CSTRs, cells may be grown on either the surfaces of the bioreactor or upon micro-carriers present within the contained suspension. Alternatively, edible cells may be selectively bred such that they may be cultured in suspension (without microcarriers) or in spheroid aggregates. However, selective breeding programs are typically slow and expensive. Furthermore, the highest cell concentrations achieved in suspension are still usually lower than cell concentrations achieved in hollow fibre bioreactors (55) (4) (2; 3).

In some embodiments, this disclosure also provides semi-permeable, porous hollow fibres, comprising covalent ester, thioester and/or amide crosslinked polypeptides, to which cells are adhered.

In some embodiments, this disclosure also provides semi-permeable, porous hollow fibres, comprising covalent ester, thioester and/or amide crosslinked polypeptides, on which cells are adhered and cultured.

Food Products Comprising Covalently-Crosslinked, Porous, Semi-Permeable Hollow Fibres This disclosure may also provide a food product comprising:

(i) one or more fibres of this disclosure; and (ii) a plurality of cells.

In some embodiments, this disclosure provides a food product comprising:

(i) one or more fibres of this disclosure; and (ii) a plurality of cells.

In some embodiments, this disclosure provides a food product comprising one or more fibres of this disclosure.

In some embodiments, a plurality of cells is growing on a single hollow fibre of this disclosure.

In some other embodiments, a plurality of cells is growing on a plurality of the hollow fibres of this disclosure.

In some further embodiments, a plurality of cells is growing in suspension around a plurality of the hollow fibres of this disclosure.

The plurality of cells may be dead and/or alive.

In some embodiments, the plurality of cells on the hollow fibres of this disclosure are dead.

In other embodiments, the plurality of cells on the hollow fibres of this disclosure, are alive.

In some other embodiments, the cells cultivated on the hollow fibres of this disclosure, includes cells which are dead and cells which are alive.

In some embodiments, the food product is subjected to an optional heat-treatment step in a process such as cooking.

In some embodiments, the food product is subjected to one or multiple food preservation methods to inhibit microbial growth and extend the shelf life of the food product. Such food preservation methods include, but are not limited to canning, chemical preservation, chilling, dehydration, fermentation, freeze-drying, freezing, high-pressure processing, irradiation, modified atmosphere packing, pickling, salting, smoking, sugaring, and vacuum packing. These methods may overlap or be used in combination.

In some preferred embodiments, the food product is a cultured meat product.

In this disclosure, the term "cultured meat product" include, but is not limited to, whole pieces, slices, cuts, sections, minced, and/or reformed pieces of that meat product.

1.23 FORMATION OF A FOOD PRODUCT COMPRISING COVALENTLY-CROSSLINKED, POROUS, SEMI-PERMEABLE HOLLOW FIBRES

It is a feature of certain aspects and embodiments of this disclosure to provide a process to produce a food product that comprises the hollow fibres of this disclosure and a plurality of cells.

The process may comprise five steps including cell expansion, bioreactor seeding, cell cultivation, post food product production modification and harvesting.

In some embodiments, the process comprises five steps including cell expansion, bioreactor seeding, cell cultivation, post-food product production modification, and harvesting.

In some embodiments, the process comprises four steps including cell expansion, bioreactor seeding, cell cultivation, and harvesting.

Cells used in the seeding stage may be initially expanded (cultivated) in existing bioreactor platforms to enable a low number of starting cells to proliferate into a greater number, as required for seeding. Such existing bioreactor platforms may include, but are not limited to, traditional T-flasks, shake flasks, or plates, or bioreactors such as CSTRs, wave-bag reactors, or micro-carrier bioreactors.

The expanded cell population may then be seeded into bioreactors comprising the hollow fibres of this disclosure. To achieve this, cells may be placed in the extra-capillary space, in between the hollow fibres and bounded by the inner wall of the cartridge shell. Cells may then be injected as a slurry into each cartridge via a tertiary port in the outer shell. A second tertiary port in the outer shell may facilitate the displacement of gas or liquid during this seeding process.

Once seeded, bioreactors comprising the hollow fibres of this disclosure may then be used to generate the food product through a cultivation process. Throughout the cell cultivation process, a sufficient amount of cell growth media may be supplied to facilitate the proliferation of cells. Process parameters may be monitored to ensure cell proliferation is minimally inhibited until a desired cell density has been achieved, at which point the cultivation may be terminated.

In some embodiments of the bioreactor, a cartridge of the hollow fibres of this disclosure is supplied with media through one port of the cartridge into the lumen of each fibre. In this manner, nutrients and growth factors required for cell growth and differentiation are supplied to the cells in the extra-capillary space via the transfer of mass and fluid(s).

In some embodiments of the bioreactor, the hollow fibres of this disclosure, or cartridges thereof, are supplied with media before, during and/or after the cell seeding step.

In some embodiments of the bioreactor, media constitutes a co-current flow path through each cartridge of the hollow fibres of this disclosure. By considering the simplified shell and tube hollow fibre bioreactor port diagram seen in FIG. 6, the fluid flow path in this configuration can be understood. In this configuration, media enters through both the lumen inlet port (6001) which feeds media into the lumen of each fibre, as well as, a second tertiary port (6002) on the outer shell of the cartridge which flows into, the extra-capillary space. Fluid flowing into the bioreactor may flow through the lumen of each fibre and leave through the lumen exit port (6005), permeate through the hollow fibres, or exit through the auxiliary port on the outer shell (6004) at the same end as the lumen outlet.

In some embodiments of the bioreactor, media constitutes a counter-current flow path through each cartridge of the hollow fibres of this disclosure. By considering the simplified shell and tube hollow fibre bioreactor port diagram seen in FIG. 6 the fluid flow path in this configuration can be understood. In this configuration, media enters through both the lumen inlet port (6001) which feeds media into the lumen of each fibre, as well as a second tertiary port (6004) on the outer shell of the cartridge which flows into the extra-capillary space at the opposite end of the bioreactor cartridge. Fluid flowing into the bioreactor may flow through the lumen of each fibre and leave through the lumen exit port (6005), permeate through the fibres, or exit through the auxiliary port on the outer shell (6002) at the opposite end as the lumen outlet.

In other embodiments of the bioreactor, media constitutes a flow through path through each cartridge of the hollow fibres of this disclosure. By considering the simplified shell and tube hollow fibre bioreactor port diagram seen in FIG. 6, the fluid flow path in this configuration can be understood. In this configuration, media enters through both the lumen inlet port (6001) which feeds media into the lumen of the hollow fibres. The auxiliary ports (6002 and 6004) in the outer shell are closed off, such that media only exits through the lumen exit port (6005).

In some embodiments, cell densities achieved with bioreactors comprising cartridges of the hollow fibres of this disclosure are within the range of, but not limited to, 100,000 cells/cm$^3$ to 100,000,000 cells/cm$^3$.

In some embodiments, cell densities achieved with bioreactors comprising cartridges of the hollow fibres of this disclosure are within the range of, but not limited to, 100,000 cells/cm$^3$ to 200,000,000 cells/cm$^3$.

In some embodiments, cell densities achieved with bioreactors comprising cartridges of the hollow fibres of this disclosure are within the range of, but not limited to, 100,000 cells/cm$^3$ to 300,000,000 cells/cm$^3$.

In some embodiments, cell densities achieved with bioreactors comprising cartridges of the hollow fibres of this disclosure are within the range of, but not limited to, 100,000 cells/cm$^3$ to 150,000 cells/cm$^3$, 150,000 cells/cm$^3$ to 200,000 cells/cm$^3$, 200,000 cells/cm$^3$ to 500,000 cells/cm$^3$, 500,000 cells/cm$^3$ to 1,000,000 cells/cm$^3$, 1,000,000 cells/cm$^3$ to 10,000,000 cells/cm$^3$, 10,000,000 cells/cm$^3$ to 50,000,000 cells/cm$^3$, 50,000,000 cells/cm$^3$ to 75,000,000 cells/cm$^3$, 75,000,000 cells/cm$^3$ to 100,000,000 cells/cm$^3$.

In some embodiments, cell densities achieved with bioreactors comprising cartridges of the hollow fibres of this disclosure are within the range of, but not limited to, 100,000 cells/cm$^3$ to 150,000 cells/cm$^3$, 150,000 cells/cm$^3$ to 200,000 cells/cm$^3$, 200,000 cells/cm$^3$ to 500,000 cells/cm$^3$, 500,000 cells/cm$^3$ to 1,000,000 cells/cm$^3$, 1,000,000 cells/cm$^3$ to 10,000,000 cells/cm$^3$, 10,000,000 cells/cm$^3$ to 50,000,000 cells/cm$^3$, 50,000,000 cells/cm$^3$ to 75,000,000 cells/cm$^3$, 75,000,000 cells/cm$^3$ to 100,000,000 cells/cm$^3$, 100,000,000 cells/cm$^3$ to 125,000,000 cells/cm$^3$, 125,000,000 cells/cm$^3$ to 150,000,000 cells/cm$^3$, 150,000, cells/cm$^3$ to 175,000,000 cells/cm$^3$, 175,000,000 cells/cm$^3$ to 200,000,000 cells/cm$^3$, 200,000,000 cells/cm$^3$ to 225,000,000 cells/cm$^3$, 225,000,000 cells/cm$^3$ to 250,000,000 cells/cm$^3$, 250,000,000 cells/cm$^3$ to 275,000,000 cells/cm$^3$, and/or 275,000,000 cells/cm$^3$ to 300,000,000 cells/cm$^3$.

In some embodiments, cell cultivations performed in the bioreactor are run until the cells reach a confluency (percentage of a surface covered by adherent cells) which are within the range of 70% to 99%.

In some embodiments, cell cultivations performed in the bioreactor are run until the cells reach a confluency (percentage of a surface covered by adherent cells) which are within the range of 70% to 75%, 75% to 80%, 80% to 85%, 85% to 90%, or 90% to 99%.

In some embodiments, cell cultivations performed in the bioreactor are run until the cells reach a confluency (percentage of a surface covered by adherent cells) which are within the range of 10% to 70%.

In some embodiments, cell cultivations performed in the bioreactor are run until the cells reach a confluency (percentage of a surface covered by adherent cells) which are within the range of 10% to 20%, 20% to 30%, 30% to 40%, 40% to 50%, 50% to 60% or 60% to 70%.

Once the cultivated cells have reached the desired cell density and/or confluency, the hollow fibres of this disclosure and cultivated cell mass may undergo one or more treatments after the cell cultivation step to improve palatability, flavour, texture, smell, or appearance.

In some embodiments of the final harvesting step, the cartridge of the hollow fibres of this disclosure is removed from the supporting bioreactor platform. Subsequently, the edible cell mass and fibres are removed from the cartridge as a food product which may be further processed.

1.24 POST CELL-GROWTH TREATMENTS

The hollow fibres of this disclosure, and/or any food products derived therefrom, may be subjected to further treatment to modify their physical and/or chemical properties, for the purpose of improving the palatability of the hollow fibres and/or of the food products derived therefrom.

In some embodiments, the hollow fibres of this disclosure, and/or any food products derived therefrom, are subjected to further treatment to modify their physical and/or chemical properties.

In other embodiments, the hollow fibres of this disclosure, and/or any food products derived therefrom, are not subjected to further treatment to modify their physical and/or chemical properties.

In some other embodiments, there is provided a process for treating or improving the palatability of a composition comprising the hollow fibres of this disclosure, the process comprising the steps:
Step (A) providing a composition comprising fibres of this disclosure within a cartridge; and one or more of:
Step (B1) physio-chemically treating the hollow fibres in the composition to decrease their mechanical strength; and/or
Step (B2) flushing the lumen of the hollow fibres and/or the residual void spaces of the hollow fibres in the extra-capillary space of the cartridge; and
Step (C) removal of the composition comprising the hollow fibres of this disclosure from the cartridge; and one or more of
Step (D1) mechanically treating the composition comprising hollow fibres of this disclosure; and/or
Step (D2) physically reducing the lengths of the hollow fibres in the composition;

In some embodiments, in Step (B1), the hollow fibres in the composition are treated with an acid, alkali or buffer solution, with or without cells.

In some embodiments, in Step (B1), the hollow fibres in the composition are washed with an excess of water or aqueous buffer solution, with or without cells. The buffer solution may, for example, be a carbonate buffer solution with a pH of 10 to 13.

In some embodiments, in Step (B1), the hollow fibres in the composition are treated with an enzyme, with or without cells. Examples of enzymes include, but are not limited to, bromelain.

In some embodiments, compositions comprising the hollow fibres of this disclosure are treated with heat or infrared radiation in a process, such as cooking.

In other embodiments, the mechanical strength of compositions comprising the hollow fibres of this disclosure are decreased, as determined by uni-axial tensile testing.

In some embodiments, in Step (B2), the lumen of the hollow fibres in the composition, and the extra-capillary space of any cartridges comprising such compositions, are flushed with one or more fluids that include, but are not limited to, water, acids, alkalis, aqueous buffers, water-oil emulsions, animal fats, plant oils, aqueous salt solutions, solution(s) containing flavourings, emulsifiers, stabilisers, colouring agents, thickeners and/or gelling agents, or any combination thereof, and in any order.

In some embodiments, fats and oils which are used to flush the lumen of the hollow fibres in the composition, and the extra-capillary space of the cartridges, include, but are not limited to, vegetable oil, rape seed oil, sunflower oil, flax seed oil, sunflower oils, avocado oil, corn oil, lard, coconut oil, palm oil, sesame oil, soybean, canola oil, olive oil, peanut oil, nut oil, Omega-3 oils, oils from fish, animal milk, animal butter, processed animal fat, or cellular agriculture derived adipose tissue, or any combination thereof, and in any order.

In some embodiments, colouring agents, which are in the solution(s) used to flush the lumen of the hollow fibres in the composition, and the extra-capillary space of the cartridges, include, but are not limited to, Curcumin, Riboflavin, Riboflavin-5'-phosphate, Tartrazine, Quinoline yellow, Sunset Yellow FCF; Orange Yellow S, Cochineal; Carminic acid; Carmines, Azorubine; Carmoisine, Amaranth, Ponceau 4R; Cochineal Red A, Erythrosine, Allura Red AC, patent Blue V, Indigotine; Indigo Carmine, Brilliant Blue FCF, Chlorophylls and chlorophyllins, Copper complexes of chlorophyll and chlorophyllins, Green S, Plain caramel, Caustic sulphite caramel, ammonia caramel, sulphite ammonia caramel, brilliant Black BN; Black PN, or any combination thereof, and in any order.

In some embodiments, preservatives, which are in the solution(s) used to flush the lumen of the hollow fibres in the composition, and the extra-capillary space of the cartridges, include, but are not limited to, potassium sorbate, benzoic acid, sodium benzoate, potassium benzoate, calcium benzoate, ethyl P-hydroxybenzoate, sodium ethyl P-hydroxybenzoate, methyl P-hydroxybenzoate, sodium methyl P-hydroxybenzoate, sulphur dioxide, sodium sulphite, sodium hydrogen sulphite, sodium metabisulphite, potassium metabisulphite, calcium sulphite, calcium hydrogen sulphite, potassium hydrogen sulphite, nisin, natamycin, hexamethylene tetramine, dimethyl decarbonate, ethyl lauroyl arginate, potassium nitrite, sodium nitrite, sodium nitrate, potassium nitrate, propionic acid, sodium propionate, calcium propionate, potassium propionate, boric acid, sodium tetraborate, borax, or lysozyme, or any combination thereof.

In some embodiments, anti-oxidants, which are in the solution(s) used to flush the lumen of the hollow fibres in the composition, and the extra-capillary space of the cartridges, include, but are not limited to, at least one of, Ascorbic acid, Sodium ascorbate, Calcium ascorbate, Fatty acid esters of ascorbic acid, Tocopherols, Alpha-tocopherol, Gamma-tocopherol, Delta-tocopherol, Propyl gallate, Erythorbic acid, Sodium erythorbate, Tertiary-butyl hydroquinone (TBHQ), Butylated hydroxyanisole (BHA), Butylated hydroxytoluene (BHT), Extracts of rosemary, or 4-Hexylresorcinol, or any combination thereof.

In some embodiments, flavourings, which are in the solution(s) used to flush the lumen of the hollow fibres in the composition, and the extra-capillary space of the cartridges, include, but are not limited to, those in the European Union list of flavourings as seen in Annex I of Regulation EU 1334/2008 and non-food sourced flavourings added in amendments in accordance with Regulation EU 2018/1259.

In some embodiments, other additives, which are in the solution(s) used to flush the lumen of the hollow fibres in the composition, and the extra-capillary space of the cartridges, include, but are not limited to, potassium chloride, calcium chloride, magnesium chloride, monosodium glutamate, monosodium glutamate, monosodium glutamate, sodium citrate, potassium citrate, calcium citrate, sodium phosphate, potassium phosphate, calcium phosphate, magnesium phosphate, sodium carbonate, potassium carbonate, sodium sulphate, potassium sulphate, calcium sulphate, L-leucine, or L-cysteine In some embodiments, emulsifiers, stabilisers, thickeners and gelling agents, which are in the solution(s) used to flush the lumen of the hollow fibres in the composition, and the extra-capillary space of the cartridges, include, but are not limited to, at least one of, alginic acid, sodium alginate, potassium alginate, ammonium alginate, calcium alginate, propane-1,2-diol alginate, agar, carrageenan, processed eucheuma seaweed, locust bean gum; carob gum, guar gum, tragacanth, acacia gum; gum arabic, xanthan gum, karaya gum, tara gum, gellan gum, konjac, soybean hemicellulose, cassia gum, polyoxyethylene sorbitan monolaurate; polysorbate 20, polyoxyethylene sorbitan mono-oleate; polysorbate 80, polyoxyethylene sorbitan monopalmitate; polysorbate 40, polyoxyethylene sorbitan monostearate; polysorbate 60, polyoxyethylene sorbitan tristearate; polysorbate 65, pectins, ammonium phosphatides, sucrose acetate isobutyrate, glycerol esters of wood rosins, cellulose, methyl cellulose, ethyl cellulose, hydroxypropyl cellulose, hydroxypropyl methyl cellulose, ethyl methyl cellulose, carboxy methyl cellulose, crosslinked sodium carboxy methyl cellulose, enzymatically hydrolysed carboxy methyl cellulose, sodium stearoyl-2-lactylate, calcium stearoyl-2-lactylate, stearyl tartrate, sorbitan monostearate, sorbitan tristearate, sorbitan monolaurate, sorbitan monooleate, sorbitan monopalmitate, or invertase.

In some embodiments, additives, which are in the solution(s) used to flush the lumen of the hollow fibres in the composition, and the extra-capillary space of the cartridges, include, but are not limited to those listed in EU Regulation (EC) No 1333/2008 and Annexes thereof. These additives include sweeteners, colouring agents, preservatives, antioxidants, carriers, acids, acidity regulators, anti-caking agents, anti-foaming agents, bulking agents, emulsifiers, emulsifying salts, firming agents, flavour enhancers, foaming agents, gelling agents, glazing agents, modified starches, raising agents, sequestrants, stabilisers, and thickeners. These additives may be added in any combination and in any order.

In other embodiments, additives, which are in the solution(s) used to flush the lumen of the hollow fibres in the composition, and the extra-capillary space of the cartridges, include, but are not limited to those designated by the FDA as generally recognized as safe (GRAS), such as those on the GRAS Substances (SCOGS) Database. These additives include sweeteners, colouring agents, preservatives, antioxidants, carriers, acids, acidity regulators, anti-caking agents, anti-foaming agents, bulking agents, emulsifiers, emulsifying salts, firming agents, flavour enhancers, foaming agents, gelling agents, glazing agents, modified starches, raising agents, sequestrants, stabilisers, and thickeners. These additives may be added in any combination and in any order.

In some embodiments, in Step (D1), the composition comprising the hollow fibres are pounded, minced, macerated, ground, and/or treated with other mechanical-based food preparation methods, with or without cells.

In some embodiments, in Step (D2), the composition comprising the hollow fibres are cut to decrease the length of the hollow fibres.

The disclosure also extends to compositions obtained or obtainable by such processes.

1.25 A FOOD PRODUCT

It is a feature of certain aspects and embodiments of this disclosure to provide a food product, comprising polypeptides, which have been covalently-crosslinked with ester, thioester and/or amide bonds as derived from the hollow fibres of this disclosure, together with a plurality of cells.

The cells may be any of the cells disclosed herein.

In some embodiments, the food product is cylindrical and/or has a near circular cross section.

In some embodiments, the food product has a cross-section that is in the shape of, but not limited to, a circle, near-circle, oval, square, rectangle, triangle, pentagon, hexagon, or other polygon.

In some embodiments, the cross-section of the food product comprises a plurality of crosslinked polypeptide rings that are interlaced with a cellular mass.

In some embodiments, cross-sections of cuts of the food product comprise a plurality of rings derived from the hollow fibres of this disclosure that are interlaced with a cellular mass.

In some embodiments, the rings are filled with one or more of polypeptides, polysaccharides, lipids, polyols and/or any combination thereof.

In some embodiments, cross-sections of cuts of the food product comprise a plurality of striations derived from the hollow fibres of this disclosure that are interlaced with a cellular mass.

In some embodiments, the striations are filled with polypeptides, polysaccharides, lipids, polyols and/or any combination thereof.

In some embodiments, the food product is a pounded, minced, and/or grounded mixture of cellular mass and the hollow fibres of this disclosure.

In some embodiments, the food product(s) of this disclosure is a mechanically reformed mass comprised cellular mass and the hollow fibres of this disclosure.

In some embodiments, the food product(s) of this disclosure also contains supplementary polypeptides.

In some embodiments, the food product(s) of this disclosure also contains polysaccharides.

In other embodiments, the food product(s) of this disclosure also contains lipids.

In further embodiments, the food product(s) of this disclosure also contains polyols.

In some embodiments, the food product(s) of this disclosure also contain meat products derived from an animal.

In some embodiments, the food product(s) of this disclosure also contain proteins derived from non-animal sources that include, but are not limited to plants, bacteria, fungi, algae and/or archaea.

In some embodiments, the food product(s) of this disclosure contain additives which include, but are not limited to, those listed in EU Regulation (EC) No 1333/2008 and Annexes thereof. These additives include sweeteners, colouring agents, preservatives, antioxidants, carriers, acids, acidity regulators, anti-caking agents, anti-foaming agents, bulking agents, emulsifiers, emulsifying salts, firming agents, flavour enhancers, foaming agents, gelling agents, glazing agents, humectants, modified starches, packaging gases, propellants, raising agents, sequestrants, stabilisers, thickeners, and flour treatment agents. These additives may be present any combination.

In some embodiments, the food product(s) of this disclosure contain additives which include, but are not limited to, those designated by the FDA as generally recognized as safe (GRAS), such as those on the GRAS Substances (SCOGS) Database. These additives include sweeteners, colouring agents, preservatives, antioxidants, carriers, acids, acidity regulators, anti-caking agents, anti-foaming agents, bulking agents, emulsifiers, emulsifying salts, firming agents, flavour enhancers, foaming agents, gelling agents, glazing agents, modified starches, raising agents, sequestrants, stabilisers, and thickeners. These additives may be present any combination.

A person of skill in the art may be readily able to determine if a food product comprises the hollow fibres of this disclosure using techniques that may include Nuclear Magnetic Resonance (NMR) spectroscopy and mass spectroscopy.

NMR may be used to determine if a food product contains polypeptides which have been crosslinked with polycarboxylic acid derived ester, thioester or amide crosslinking covalent bonds. Specifically, $^1$H proton NMR may be used to determine the presence of carboxylic acid derivatives due to the presence of carbonyl groups. Carbonyl groups resonate in the 2.0-3.0 ppm region of a $^1$H NMR spectra. Protons of carbons attached to the alkoxide oxygen in esters resonate in the 3.5-4.5 ppm region. Whereas, protons on carbons attached to sulphur in thioesters resonate in the 2.0-3.0 ppm region (56). As these groups are not native in polypeptides, identification of these groups in a food product may therefore be used as evidence that fibres of this disclosure have been used in the preparation of the food product and therefore constitute a product of the process of this disclosure.

Similarly, $^{13}$C NMR may be used to determine the presence of carboxylic acid derivatives based on differences in the resonant frequencies of the carbonyl carbon in carboxylic acids (160-180 ppm) and derived esters (50-90 ppm), aldehydes and ketones (180-220 ppm). In carboxylic acids, the carbonyl carbon is strongly deshielded by the adjacent highly electronegative double-bounded oxygen. As the carboxyl carbon in derivatives of carboxylic acids experience different levels of deshielding, they exhibit varying resonance frequencies. The carbons in other functional groups also exhibit different resonant frequencies, such as the carbon bond to nitrogen in amides (20-65 ppm) and those bonded to sulphur in thioesters (20-45 ppm) (56). Similarly, as these groups are not native in polypeptides, identification of these groups in a food product may therefore be used as evidence that fibres of this disclosure have been used in the preparation of the food product and therefore constitute a product of the process of this disclosure.

Through the application of these NMR spectra analytical techniques, NMR spectra of food samples may enable the identification of polypeptides which have been specifically crosslinked with polycarboxylic acid derived ester, thioester or amide covalent bonds to be distinguished from polypeptides which have been crosslinked by other means, such as thermal physical crosslinking. Therefore, NMR analysis may be performed to distinguish food product samples containing polycarboxylic acid derived ester, thioester or amide covalent bond crosslinks from other food product samples as they may exhibit significantly higher peaks in $^1$H NMR or $^{13}$C NMR spectra in the ranges disclosed above.

Mass spectrometry may also be used to determine presence of carboxylic acid derivatives due to the presence of a peak associated with an acylium ion (R—CO$^+$). However, due to the variable mass of the body (R—) bonded to the acylium, ion the theoretical mass of these ions must be calculated on a case-by-case basis (56).

Due to the non-standard peak number associated with carboxylic acid derivatives measured with mass spectrometry, NMR should be used.

Once hollow fibres of this disclosure have been identified with NMR and/or mass spectroscopy, SDS-PAGE may be applied to determine if the hollow fibres have been subjected to treatment with an acid, alkali and/or buffer solution wash. Such washes breaks the polypeptide molecular backbone, shortening the molecule and lowering the molecular weight of each fragment. A comparison of the generated SDS-PAGE bands may show the difference in molecular weights caused by hydrolysis when compared to untreated samples. Similarly, mass spectrometry may be used to identify the decrease in fragment size to the same effect.

In some embodiments, the food products of this disclosure are subjected to an optional heat-treatment step in a process such as cooking.

In some embodiments, the food products of this disclosure are subjected to one or multiple food preservation methods to inhibit microbial growth and extend the shelf life of the food product. Such food preservation methods include, but are not limited to canning, chemical preservation, chilling, dehydration, fermentation, freeze-drying, freezing, high-pressure processing, irradiation, modified atmosphere packing, pickling, salting, smoking, sugaring, and vacuum packing. These methods may overlap or be used in combination.

The disclosure of each reference set forth herein is specifically incorporated herein by reference in its entirety.

2 EXEMPLARY EMBODIMENTS

In addition to aspects and embodiments disclosed elsewhere herein, the following are exemplary embodiments specifically contemplated by the disclosure.

2.1 Composition Embodiments

1. An edible, semi-permeable, porous hollow fibre, comprising one more polycarboxylic acid derived covalent ester, thioester and/or amide bond crosslinked polypeptides wherein:
   (a) the external diameter of the hollow fibre is 50-6600 μM;
   (b) the wall thickness of the hollow fibre is 20-800 μM;
   (c) the lumen diameter of hollow fibre is 20-5000 μM; and
   (d) the pore volume of the hollow fibre is 1-95%.
2. A semi-permeable, porous hollow fibre, comprising one more polycarboxylic acid derived covalent ester, thioester and/or amide bond crosslinked polypeptides wherein:
   (a) the external diameter of the hollow fibre is 50-6600 μM;
   (b) the wall thickness of the hollow fibre is 20-800 μM;
   (c) the lumen diameter of hollow fibre is 20-5000 μM; and
   (d) the pore volume of the hollow fibre is 1-95%.
3. An edible, semi-permeable, porous hollow fibre, comprising one more polycarboxylic acid derived covalent ester, thioester and/or amide bond crosslinked polypeptides wherein:
   (a) the external diameter of the hollow fibre is 50-6600 μm;
   (b) the wall thickness of the hollow fibre is 20-800 μm;

(c) the lumen diameter of hollow fibre is 20-5000 μm; and
(d) the porosity of the hollow fibre is 1-95%.
4. A semi-permeable, porous hollow fibre, comprising one more polycarboxylic acid derived covalent ester, thioester and/or amide bond crosslinked polypeptides wherein:
(a) the external diameter of the hollow fibre is 50-6600 μm;
(b) the wall thickness of the hollow fibre is 20-800 μm;
(c) the lumen diameter of hollow fibre is 20-5000 μm; and
(d) the porosity of the hollow fibre is 1-95%.
5. A semi-permeable porous hollow fibre, comprising one more polypeptides crosslinked with polycarboxylic acid derived ester, thioester or amide covalent bonds.
6. A semi-permeable porous hollow fibre, comprising one more polypeptides crosslinked with polycarboxylic acid derived ester, thioester or amide covalent bonds, wherein the materials of the hollow fibre are GRAS.
7. A regular semi-crystalline polymer comprising ester, thioester and/or amide crosslinked polypeptides with a beta-sheet secondary structure.
8. A Prokitein; a regular semi-crystalline polymer comprising ester, thioester and/or amide crosslinked polypeptides with a beta-sheet secondary structure.
9. A hollow fibre of any of the preceding composition embodiments, wherein the hollow fibre comprises Prokitein.
10. A hollow fibre of any of the preceding composition embodiments, wherein the hollow fibre comprises a regular semi-crystalline polymer comprising ester, thioester and/or amide crosslinked polypeptides with a beta-sheet secondary structure.
11. A hollow fibre of any of the preceding composition embodiments, wherein the cross-section of the hollow fibre is a circle, oval, square, rectangle or polygon.
12. A hollow fibre of any of the preceding composition embodiments, wherein the cross-section of the hollow fibre is a circle.
13. A hollow fibre of any of the preceding composition embodiments, wherein the cross-section of the hollow fibre is an oval.
14. A hollow fibre of any of the preceding composition embodiments, wherein the cross-section of the hollow fibre is a square.
15. A hollow fibre of any of the preceding composition embodiments, wherein the cross-section of the hollow fibre is a rectangle.
16. A hollow fibre of any of the preceding composition embodiments, wherein the cross-section of the hollow fibre is a polygon.
17. A hollow fibre of any of the preceding composition embodiments, wherein the hollow fibre is in the form of a tubular cylinder.
18. A hollow fibre of any of the preceding composition embodiments, wherein the hollow fibre has a lumen.
19. A hollow fibre of any of the preceding composition embodiments, wherein the lumen of the hollow fibre is open at one end.
20. A hollow fibre of any of the preceding composition embodiments, wherein the lumen of the hollow fibre is open at both ends.
21. A hollow fibre of any of the preceding composition embodiments, wherein the porosity is in the range of 15% to 25%.
22. A hollow fibre of any of the preceding composition embodiments, wherein the porosity is in the range of 30% to 45%.
23. A hollow fibre of any of the preceding composition embodiments, wherein the porosity is in the range of 40% to 65%.
24. A hollow fibre of any of the preceding composition embodiments, wherein the porosity is in the range of 70% to 95%.
25. A hollow fibre of any of the preceding composition embodiments, wherein the porosity is in the range of 5% to 10%.
26. A hollow fibre of any of the preceding composition embodiments, wherein the porosity is in the range of 60% to 85%.
27. A hollow fibre of any of the preceding composition embodiments, wherein the porosity is in the range of 30% to 35%.
28. A hollow fibre of any of the preceding composition embodiments, wherein the porosity is in the range of 45% to 70%.
29. A hollow fibre of any of the preceding composition embodiments, wherein the porosity is in the range of 5% to 30%.
30. A hollow fibre of any of the preceding composition embodiments, wherein the porosity is in the range of 5% to 75%.
31. A hollow fibre of any of the preceding composition embodiments, wherein the porosity is in the range of 65% to 70%.
32. A hollow fibre of any of the preceding composition embodiments, wherein the porosity is in the range of 65% to 95%.
33. A hollow fibre of any of the preceding composition embodiments, wherein the porosity is in the range of 30% to 75%.
34. A hollow fibre of any of the preceding composition embodiments, wherein the porosity is in the range of 25% to 85%.
35. A hollow fibre of any of the preceding composition embodiments, wherein the porosity is in the range of 30% to 70%.
36. A hollow fibre of any of the preceding composition embodiments, wherein the porosity is in the range of 60% to 70%.
37. A hollow fibre of any of the preceding composition embodiments, wherein the porosity is in the range of 50% to 75%.
38. A hollow fibre of any of the preceding composition embodiments, wherein the porosity is in the range of 20% to 45%.
39. A hollow fibre of any of the preceding composition embodiments, wherein the porosity is in the range of 10% to 65%, 40. A hollow fibre of any of the preceding composition embodiments, wherein the porosity is in the range of 60% to 75%.
41. A hollow fibre of any of the preceding composition embodiments, wherein the porosity is in the range of 60% to 65%.
42. A hollow fibre of any of the preceding composition embodiments, wherein the porosity is in the range of 55% to 75%.
43. A hollow fibre of any of the preceding composition embodiments, wherein the porosity is in the range of 10% to 85%.

44. A hollow fibre of any of the preceding composition embodiments, wherein the porosity is in the range of 30% to 55%.
45. A hollow fibre of any of the preceding composition embodiments, wherein the porosity is in the range of 35% to 65%.
46. A hollow fibre of any of the preceding composition embodiments, wherein the porosity is in the range of 40% to 55%.
47. A hollow fibre of any of the preceding composition embodiments, wherein the porosity is in the range of 25% to 40%.
48. A hollow fibre of any of the preceding composition embodiments, wherein the porosity is in the range of 35% to 95%.
49. A hollow fibre of any of the preceding composition embodiments, wherein the porosity is in the range of 25% to 75%.
50. A hollow fibre of any of the preceding composition embodiments, wherein the porosity is in the range of 5% to 90%.
51. A hollow fibre of any of the preceding composition embodiments, wherein the porosity is in the range of 15% to 30%.
52. A hollow fibre of any of the preceding composition embodiments, wherein the porosity is in the range of 25% to 70%.
53. A hollow fibre of any of the preceding composition embodiments, wherein the porosity is in the range of 10% to 80%.
54. A hollow fibre of any of the preceding composition embodiments, wherein the porosity is in the range of 75% to 80%.
55. A hollow fibre of any of the preceding composition embodiments, wherein the porosity is in the range of 45% to 65%.
56. A hollow fibre of any of the preceding composition embodiments, wherein the porosity is in the range of 45% to 90%.
57. A hollow fibre of any of the preceding composition embodiments, wherein the porosity is in the range of 10% to 70%.
58. A hollow fibre of any of the preceding composition embodiments, wherein the porosity is in the range of 55% to 70%.
59. A hollow fibre of any of the preceding composition embodiments, wherein the porosity is in the range of 10% to 60%.
60. A hollow fibre of any of the preceding composition embodiments, wherein the porosity is in the range of 15% to 55%.
61. A hollow fibre of any of the preceding composition embodiments, wherein the porosity is in the range of 50% to 70%.
62. A hollow fibre of any of the preceding composition embodiments, wherein the porosity is in the range of 15% to 80%.
63. A hollow fibre of any of the preceding composition embodiments, wherein the porosity is in the range of 45% to 55%.
64. A hollow fibre of any of the preceding composition embodiments, wherein the porosity is in the range of 25% to 95%.
65. A hollow fibre of any of the preceding composition embodiments, wherein the porosity is in the range of 50% to 90%.
66. A hollow fibre of any of the preceding composition embodiments, wherein the porosity is in the range of 80% to 85%.
67. A hollow fibre of any of the preceding composition embodiments, wherein the porosity is in the range of 80% to 95%.
68. A hollow fibre of any of the preceding composition embodiments, wherein the porosity is in the range of 15% to 35%.
69. A hollow fibre of any of the preceding composition embodiments, wherein the porosity is in the range of 75% to 85%.
70. A hollow fibre of any of the preceding composition embodiments, wherein the porosity is in the range of 35% to 85%.
71. A hollow fibre of any of the preceding composition embodiments, wherein the porosity is in the range of 10% to 90%.
72. A hollow fibre of any of the preceding composition embodiments, wherein the porosity is in the range of 35% to 90%.
73. A hollow fibre of any of the preceding composition embodiments, wherein the porosity is in the range of 20% to 90%.
74. A hollow fibre of any of the preceding composition embodiments, wherein the porosity is in the range of 85% to 90%.
75. A hollow fibre of any of the preceding composition embodiments, wherein the porosity is in the range of 35% to 60%.
76. A hollow fibre of any of the preceding composition embodiments, wherein the porosity is in the range of 40% to 70%.
77. A hollow fibre of any of the preceding composition embodiments, wherein the porosity is in the range of 35% to 45%.
78. A hollow fibre of any of the preceding composition embodiments, wherein the porosity is in the range of 20% to 65%.
79. A hollow fibre of any of the preceding composition embodiments, wherein the porosity is in the range of 10% to 50%.
80. A hollow fibre of any of the preceding composition embodiments, wherein the porosity is in the range of 20% to 85%.
81. A hollow fibre of any of the preceding composition embodiments, wherein the porosity is in the range of 50% to 65%.
82. A hollow fibre of any of the preceding composition embodiments, wherein the porosity is in the range of 60% to 90%.
83. A hollow fibre of any of the preceding composition embodiments, wherein the porosity is in the range of 10% to 45%.
84. A hollow fibre of any of the preceding composition embodiments, wherein the porosity is in the range of 80% to 90%.
85. A hollow fibre of any of the preceding composition embodiments, wherein the porosity is in the range of 10% to 55%.
86. A hollow fibre of any of the preceding composition embodiments, wherein the porosity is in the range of 15% to 20%.
87. A hollow fibre of any of the preceding composition embodiments, wherein the porosity is in the range of 15% to 70%.

88. A hollow fibre of any of the preceding composition embodiments, wherein the porosity is in the range of 10% to 40%.
89. A hollow fibre of any of the preceding composition embodiments, wherein the porosity is in the range of 20% to 25%.
90. A hollow fibre of any of the preceding composition embodiments, wherein the porosity is in the range of 5% to 80%.
91. A hollow fibre of any of the preceding composition embodiments, wherein the porosity is in the range of 35% to 55%.
92. A hollow fibre of any of the preceding composition embodiments, wherein the porosity is in the range of 35% to 75%.
93. A hollow fibre of any of the preceding composition embodiments, wherein the porosity is in the range of 5% to 65%.
94. A hollow fibre of any of the preceding composition embodiments, wherein the porosity is in the range of 15% to 85%.
95. A hollow fibre of any of the preceding composition embodiments, wherein the porosity is in the range of 40% to 75%.
96. A hollow fibre of any of the preceding composition embodiments, wherein the porosity is in the range of 20% to 70%.
97. A hollow fibre of any of the preceding composition embodiments, wherein the porosity is in the range of 5% to 40%.
98. A hollow fibre of any of the preceding composition embodiments, wherein the porosity is in the range of 85% to 95%.
99. A hollow fibre of any of the preceding composition embodiments, wherein the porosity is in the range of 30% to 60%.
100. A hollow fibre of any of the preceding composition embodiments, wherein the porosity is in the range of 20% to 55%.
101. A hollow fibre of any of the preceding composition embodiments, wherein the porosity is in the range of 25% to 55%.
102. A hollow fibre of any of the preceding composition embodiments, wherein the porosity is in the range of 45% to 50%.
103. A hollow fibre of any of the preceding composition embodiments, wherein the porosity is in the range of 65% to 85%.
104. A hollow fibre of any of the preceding composition embodiments, wherein the porosity is in the range of 30% to 90%.
105. A hollow fibre of any of the preceding composition embodiments, wherein the porosity is in the range of 70% to 85%.
106. A hollow fibre of any of the preceding composition embodiments, wherein the porosity is in the range of 60% to 80%.
107. A hollow fibre of any of the preceding composition embodiments, wherein the porosity is in the range of 25% to 65%.
108. A hollow fibre of any of the preceding composition embodiments, wherein the porosity is in the range of 20% to 60%.
109. A hollow fibre of any of the preceding composition embodiments, wherein the porosity is in the range of 5% to 20%.
110. A hollow fibre of any of the preceding composition embodiments, wherein the porosity is in the range of 65% to 80%.
111. A hollow fibre of any of the preceding composition embodiments, wherein the porosity is in the range of 30% to 50%.
112. A hollow fibre of any of the preceding composition embodiments, wherein the porosity is in the range of 35% to 80%.
113. A hollow fibre of any of the preceding composition embodiments, wherein the porosity is in the range of 10% to 95%.
114. A hollow fibre of any of the preceding composition embodiments, wherein the porosity is in the range of 55% to 85%.
115. A hollow fibre of any of the preceding composition embodiments, wherein the porosity is in the range of 5% to 60%.
116. A hollow fibre of any of the preceding composition embodiments, wherein the porosity is in the range of 40% to 60%.
117. A hollow fibre of any of the preceding composition embodiments, wherein the porosity is in the range of 75% to 90%.
118. A hollow fibre of any of the preceding composition embodiments, wherein the porosity is in the range of 40% to 50%.
119. A hollow fibre of any of the preceding composition embodiments, wherein the porosity is in the range of 25% to 50%.
120. A hollow fibre of any of the preceding composition embodiments, wherein the porosity is in the range of 5% to 15%.
121. A hollow fibre of any of the preceding composition embodiments, wherein the porosity is in the range of 15% to 75%.
122. A hollow fibre of any of the preceding composition embodiments, wherein the porosity is in the range of 5% to 45%.
123. A hollow fibre of any of the preceding composition embodiments, wherein the porosity is in the range of 25% to 60%.
124. A hollow fibre of any of the preceding composition embodiments, wherein the porosity is in the range of 10% to 25%.
125. A hollow fibre of any of the preceding composition embodiments, wherein the porosity is in the range of 5% to 50%.
126. A hollow fibre of any of the preceding composition embodiments, wherein the porosity is in the range of 15% to 65%.
127. A hollow fibre of any of the preceding composition embodiments, wherein the porosity is in the range of 20% to 40%.
128. A hollow fibre of any of the preceding composition embodiments, wherein the porosity is in the range of 60% to 95%.
129. A hollow fibre of any of the preceding composition embodiments, wherein the porosity is in the range of 55% to 90%.
130. A hollow fibre of any of the preceding composition embodiments, wherein the porosity is in the range of 40% to 85%.
131. A hollow fibre of any of the preceding composition embodiments, wherein the porosity is in the range of 20% to 50%.

132. A hollow fibre of any of the preceding composition embodiments, wherein the porosity is in the range of 40% to 45%.
133. A hollow fibre of any of the preceding composition embodiments, wherein the porosity is in the range of 15% to 50%.
134. A hollow fibre of any of the preceding composition embodiments, wherein the porosity is in the range of 35% to 70%.
135. A hollow fibre of any of the preceding composition embodiments, wherein the porosity is in the range of 20% to 30%.
136. A hollow fibre of any of the preceding composition embodiments, wherein the porosity is in the range of 25% to 35%.
137. A hollow fibre of any of the preceding composition embodiments, wherein the porosity is in the range of 15% to 45%.
138. A hollow fibre of any of the preceding composition embodiments, wherein the porosity is in the range of 55% to 65%.
139. A hollow fibre of any of the preceding composition embodiments, wherein the porosity is in the range of 15% to 95%.
140. A hollow fibre of any of the preceding composition embodiments, wherein the porosity is in the range of 5% to 55%.
141. A hollow fibre of any of the preceding composition embodiments, wherein the porosity is in the range of 90% to 95%.
142. A hollow fibre of any of the preceding composition embodiments, wherein the porosity is in the range of 45% to 95%.
143. A hollow fibre of any of the preceding composition embodiments, wherein the porosity is in the range of 5% to 95%.
144. A hollow fibre of any of the preceding composition embodiments, wherein the porosity is in the range of 40% to 95%.
145. A hollow fibre of any of the preceding composition embodiments, wherein the porosity is in the range of 40% to 80%.
146. A hollow fibre of any of the preceding composition embodiments, wherein the porosity is in the range of 55% to 60%.
147. A hollow fibre of any of the preceding composition embodiments, wherein the porosity is in the range of 15% to 90%.
148. A hollow fibre of any of the preceding composition embodiments, wherein the porosity is in the range of 5% to 70%.
149. A hollow fibre of any of the preceding composition embodiments, wherein the porosity is in the range of 20% to 75%.
150. A hollow fibre of any of the preceding composition embodiments, wherein the porosity is in the range of 20% to 35%.
151. A hollow fibre of any of the preceding composition embodiments, wherein the porosity is in the range of 50% to 95%.
152. A hollow fibre of any of the preceding composition embodiments, wherein the porosity is in the range of 25% to 80%.
153. A hollow fibre of any of the preceding composition embodiments, wherein the porosity is in the range of 30% to 65%.
154. A hollow fibre of any of the preceding composition embodiments, wherein the porosity is in the range of 5% to 25%.
155. A hollow fibre of any of the preceding composition embodiments, wherein the porosity is in the range of 25% to 30%.
156. A hollow fibre of any of the preceding composition embodiments, wherein the porosity is in the range of 30% to 95%.
157. A hollow fibre of any of the preceding composition embodiments, wherein the porosity is in the range of 75% to 95%.
158. A hollow fibre of any of the preceding composition embodiments, wherein the porosity is in the range of 50% to 80%.
159. A hollow fibre of any of the preceding composition embodiments, wherein the porosity is in the range of 15% to 40%.
160. A hollow fibre of any of the preceding composition embodiments, wherein the porosity is in the range of 65% to 90%.
161. A hollow fibre of any of the preceding composition embodiments, wherein the porosity is in the range of 10% to 20%.
162. A hollow fibre of any of the preceding composition embodiments, wherein the porosity is in the range of 45% to 75%.
163. A hollow fibre of any of the preceding composition embodiments, wherein the porosity is in the range of 45% to 60%.
164. A hollow fibre of any of the preceding composition embodiments, wherein the porosity is in the range of 30% to 80%.
165. A hollow fibre of any of the preceding composition embodiments, wherein the porosity is in the range of 50% to 85%.
166. A hollow fibre of any of the preceding composition embodiments, wherein the porosity is in the range of 55% to 80%.
167. A hollow fibre of any of the preceding composition embodiments, wherein the porosity is in the range of 25% to 90%.
168. A hollow fibre of any of the preceding composition embodiments, wherein the porosity is in the range of 20% to 80%.
169. A hollow fibre of any of the preceding composition embodiments, wherein the porosity is in the range of 30% to 85%.
170. A hollow fibre of any of the preceding composition embodiments, wherein the porosity is in the range of 50% to 60%.
171. A hollow fibre of any of the preceding composition embodiments, wherein the porosity is in the range of 20% to 95%.
172. A hollow fibre of any of the preceding composition embodiments, wherein the porosity is in the range of 30% to 40%.
173. A hollow fibre of any of the preceding composition embodiments, wherein the porosity is in the range of 10% to 35%.
174. A hollow fibre of any of the preceding composition embodiments, wherein the porosity is in the range of 10% to 15%.
175. A hollow fibre of any of the preceding composition embodiments, wherein the porosity is in the range of 70% to 75%.

176. A hollow fibre of any of the preceding composition embodiments, wherein the porosity is in the range of 5% to 35%.
177. A hollow fibre of any of the preceding composition embodiments, wherein the porosity is in the range of 35% to 50%.
178. A hollow fibre of any of the preceding composition embodiments, wherein the porosity is in the range of 10% to 75%.
179. A hollow fibre of any of the preceding composition embodiments, wherein the porosity is in the range of 45% to 80%.
180. A hollow fibre of any of the preceding composition embodiments, wherein the porosity is in the range of 15% to 60%.
181. A hollow fibre of any of the preceding composition embodiments, wherein the porosity is in the range of 55% to 95%.
182. A hollow fibre of any of the preceding composition embodiments, wherein the porosity is in the range of 5% to 85%.
183. A hollow fibre of any of the preceding composition embodiments, wherein the porosity is in the range of 65% to 75%.
184. A hollow fibre of any of the preceding composition embodiments, wherein the porosity is in the range of 70% to 80%.
185. A hollow fibre of any of the preceding composition embodiments, wherein the porosity is in the range of 25% to 45%.
186. A hollow fibre of any of the preceding composition embodiments, wherein the porosity is in the range of 70% to 90%.
187. A hollow fibre of any of the preceding composition embodiments, wherein the porosity is in the range of 10% to 30%.
188. A hollow fibre of any of the preceding composition embodiments, wherein the porosity is in the range of 40% to 90%.
189. A hollow fibre of any of the preceding composition embodiments, wherein the porosity is in the range of 35% to 40%.
190. A hollow fibre of any of the preceding composition embodiments, wherein the porosity is in the range of 50% to 55%.
191. A hollow fibre of any of the preceding composition embodiments, wherein the porosity is in the range of 45% to 85%.
192. A hollow fibre of any of the preceding composition embodiments, wherein the walls of the hollow fibre are porous, microporous or nanoporous.
193. A hollow fibre of any of the preceding composition embodiments, wherein the walls of the hollow fibre are porous.
194. A hollow fibre of any of the preceding composition embodiments, wherein the walls of the hollow fibre are microporous.
195. A hollow fibre of any of the preceding composition embodiments, wherein the walls of the hollow fibre are nanoporous.
196. A hollow fibre of any of the preceding composition embodiments, wherein the length of the hollow fibre is between 2 mm and 2 m.
197. A hollow fibre of any of the preceding composition embodiments, wherein the length of the hollow fibre is between 1 cm and 1 m.
198. A hollow fibre of any of the preceding composition embodiments, wherein the length of the hollow fibre is between 2.5 cm and 10 cm.
199. A hollow fibre of any of the preceding composition embodiments, wherein the length of the hollow fibre is between 2 mm and 1 cm.
200. A hollow fibre of any of the preceding composition embodiments, wherein the length of the hollow fibre is between 1 cm and 5 cm.
201. A hollow fibre of any of the preceding composition embodiments, wherein the length of the hollow fibre is between 5 cm and 10 cm.
202. A hollow fibre of any of the preceding composition embodiments, wherein the length of the hollow fibre is between 10 cm and 50 cm.
203. A hollow fibre of any of the preceding composition embodiments, wherein the length of the hollow fibre is between 50 cm and 1 m.
204. A hollow fibre of any of the preceding composition embodiments, wherein the length of the hollow fibre is between 1 m and 2 m.
205. A hollow fibre of any of the preceding composition embodiments, wherein the length of the hollow fibre is between 2 m and 3 m.
206. A hollow fibre of any of the preceding composition embodiments, wherein the length of the hollow fibre is between 3 m and 4 m.
207. A hollow fibre of any of the preceding composition embodiments, wherein the length of the hollow fibre is between 4 m and 5 m.
208. A hollow fibre of any of the preceding composition embodiments, wherein the external diameter of the hollow fibre is between 50 μm and 6600 μm.
209. A hollow fibre of any of the preceding composition embodiments, wherein the external diameter of the hollow fibre is between 100 μm to 1500 μm.
210. A hollow fibre of any of the preceding composition embodiments, wherein the external diameter of the hollow fibre is between 200 μm to 900 μm.
211. A hollow fibre of any of the preceding composition embodiments, wherein the external diameter of the hollow fibre is between 50 μm to 100 μm.
212. A hollow fibre of any of the preceding composition embodiments, wherein the external diameter of the hollow fibre is between 100 μm to 200 μm.
213. A hollow fibre of any of the preceding composition embodiments, wherein the external diameter of the hollow fibre is between 200 μm to 300 μm.
214. A hollow fibre of any of the preceding composition embodiments, wherein the external diameter of the hollow fibre is between 300 μm to 400 μm.
215. A hollow fibre of any of the preceding composition embodiments, wherein the external diameter of the hollow fibre is between 400 μm to 500 μm.
216. A hollow fibre of any of the preceding composition embodiments, wherein the external diameter of the hollow fibre is between 500 μm to 600 μm.
217. A hollow fibre of any of the preceding composition embodiments, wherein the external diameter of the hollow fibre is between 600 μm to 700 μm.
218. A hollow fibre of any of the preceding composition embodiments, wherein the external diameter of the hollow fibre is between 700 μm to 800 μm.
219. A hollow fibre of any of the preceding composition embodiments, wherein the external diameter of the hollow fibre is between 800 μm to 900 μm.

220. A hollow fibre of any of the preceding composition embodiments, wherein the external diameter of the hollow fibre is between 900 μm to 1000 μm.
221. A hollow fibre of any of the preceding composition embodiments, wherein the external diameter of the hollow fibre is between 1000 μm to 1100 μm.
222. A hollow fibre of any of the preceding composition embodiments, wherein the external diameter of the hollow fibre is between 1100 μm to 1200 μm
223. A hollow fibre of any of the preceding composition embodiments, wherein the external diameter of the hollow fibre is between 1200 μm to 1300 μm.
224. A hollow fibre of any of the preceding composition embodiments, wherein the external diameter of the hollow fibre is between 1300 μm to 1400 μm.
225. A hollow fibre of any of the preceding composition embodiments, wherein the external diameter of the hollow fibre is between 1400 μm to 1500 μm.
226. A hollow fibre of any of the preceding composition embodiments, wherein the external diameter of the hollow fibre is between 1500 μm to 1600 μm.
227. A hollow fibre of any of the preceding composition embodiments, wherein the external diameter of the hollow fibre is between 1600 μm to 1700 μm.
228. A hollow fibre of any of the preceding composition embodiments, wherein the external diameter of the hollow fibre is between 1700 μm to 1800 μm.
229. A hollow fibre of any of the preceding composition embodiments, wherein the external diameter of the hollow fibre is between 1800 μm to 1900 μm.
230. A hollow fibre of any of the preceding composition embodiments, wherein the external diameter of the hollow fibre is between 1900 μm to 2000 μm.
231. A hollow fibre of any of the preceding composition embodiments, wherein the wall thickness of the hollow fibre is between 50 μm to 800 μm.
232. A hollow fibre of any of the preceding composition embodiments, wherein the wall thickness of the hollow fibre is between 70 μm to 500 μm.
233. A hollow fibre of any of the preceding composition embodiments, wherein the wall thickness of the hollow fibre is between 75 μm to 150 μm.
234. A hollow fibre of any of the preceding composition embodiments, wherein the wall thickness of the hollow fibre is between 20 μm to 50 μm.
235. A hollow fibre of any of the preceding composition embodiments, wherein the wall thickness of the hollow fibre is between 50 μm to 100 μm.
236. A hollow fibre of any of the preceding composition embodiments, wherein the wall thickness of the hollow fibre is between 100 μm to 200 μm.
237. A hollow fibre of any of the preceding composition embodiments, wherein the wall thickness of the hollow fibre is between 200 μm to 500 μm.
238. A hollow fibre of any of the preceding composition embodiments, wherein the wall thickness of the hollow fibre is between 500 μm to 800 μm.
239. A hollow fibre of any of the preceding composition embodiments, wherein the wall thickness of the hollow fibre is between 800 μm to 1000 μm.
240. A hollow fibre of any of the preceding composition embodiments, wherein the lumen diameter of the hollow fibre is between 20 μm to 5000 μm.
241. A hollow fibre of any of the preceding composition embodiments, wherein the lumen diameter of the hollow fibre is between 200 μm to 1000 μm.
242. A hollow fibre of any of the preceding composition embodiments, wherein the lumen diameter of the hollow fibre is between 250 μm to 850 μm.
243. A hollow fibre of any of the preceding composition embodiments, wherein the lumen diameter of the hollow fibre is between 20 μm to 50 μm.
244. A hollow fibre of any of the preceding composition embodiments, wherein the lumen diameter of the hollow fibre is between 50 μm to 100 μm.
245. A hollow fibre of any of the preceding composition embodiments, wherein the lumen diameter of the hollow fibre is between 100 μm to 200 μm.
246. A hollow fibre of any of the preceding composition embodiments, wherein the lumen diameter of the hollow fibre is between 200 μm to 500 μm.
247. A hollow fibre of any of the preceding composition embodiments, wherein the lumen diameter of the hollow fibre is between 500 μm to 1000 μm.
248. A hollow fibre of any of the preceding composition embodiments, wherein the lumen diameter of the hollow fibre is between 1000 μm to 2500 μm.
249. A hollow fibre of any of the preceding composition embodiments, wherein the lumen diameter of the hollow fibre is between 2500 μm to 5000 μm.
250. A hollow fibre of any of the preceding composition embodiments, wherein the pore diameters in the walls of the hollow fibre are between 1 nm to 100 μm.
251. A hollow fibre of any of the preceding composition embodiments, wherein the pore diameters in the walls of the hollow fibre are between 501 nm to 751 nm.
252. A hollow fibre of any of the preceding composition embodiments, wherein the pore diameters in the walls of the hollow fibre are between 201 nm to 1001 nm.
253. A hollow fibre of any of the preceding composition embodiments, wherein the pore diameters in the walls of the hollow fibre are between 651 nm to 901 nm.
254. A hollow fibre of any of the preceding composition embodiments, wherein the pore diameters in the walls of the hollow fibre are between 301 nm to 651 nm.
255. A hollow fibre of any of the preceding composition embodiments, wherein the pore diameters in the walls of the hollow fibre are between 451 nm to 551 nm.
256. A hollow fibre of any of the preceding composition embodiments, wherein the pore diameters in the walls of the hollow fibre are between 951 nm to 1001 nm.
257. A hollow fibre of any of the preceding composition embodiments, wherein the pore diameters in the walls of the hollow fibre are between 701 nm to 901 nm.
258. A hollow fibre of any of the preceding composition embodiments, wherein the pore diameters in the walls of the hollow fibre are between 251 nm to 351 nm.
259. A hollow fibre of any of the preceding composition embodiments, wherein the pore diameters in the walls of the hollow fibre are between 251 nm to 901 nm.
260. A hollow fibre of any of the preceding composition embodiments, wherein the pore diameters in the walls of the hollow fibre are between 101 nm to 551 nm.
261. A hollow fibre of any of the preceding composition embodiments, wherein the pore diameters in the walls of the hollow fibre are between 501 nm to 651 nm.
262. A hollow fibre of any of the preceding composition embodiments, wherein the pore diameters in the walls of the hollow fibre are between 51 nm to 351 nm.
263. A hollow fibre of any of the preceding composition embodiments, wherein the pore diameters in the walls of the hollow fibre are between 451 nm to 751 nm.

264. A hollow fibre of any of the preceding composition embodiments, wherein the pore diameters in the walls of the hollow fibre are between 1 nm to 1001 nm.
265. A hollow fibre of any of the preceding composition embodiments, wherein the pore diameters in the walls of the hollow fibre are between 101 nm to 501 nm.
266. A hollow fibre of any of the preceding composition embodiments, wherein the pore diameters in the walls of the hollow fibre are between 201 nm to 401 nm.
267. A hollow fibre of any of the preceding composition embodiments, wherein the pore diameters in the walls of the hollow fibre are between 101 nm to 301 nm.
268. A hollow fibre of any of the preceding composition embodiments, wherein the pore diameters in the walls of the hollow fibre are between 51 nm to 801 nm.
269. A hollow fibre of any of the preceding composition embodiments, wherein the pore diameters in the walls of the hollow fibre are between 301 nm to 1001 nm.
270. A hollow fibre of any of the preceding composition embodiments, wherein the pore diameters in the walls of the hollow fibre are between 1 nm to 401 nm.
271. A hollow fibre of any of the preceding composition embodiments, wherein the pore diameters in the walls of the hollow fibre are between 101 nm to 701 nm.
272. A hollow fibre of any of the preceding composition embodiments, wherein the pore diameters in the walls of the hollow fibre are between 251 nm to 301 nm.
273. A hollow fibre of any of the preceding composition embodiments, wherein the pore diameters in the walls of the hollow fibre are between 401 nm to 601 nm.
274. A hollow fibre of any of the preceding composition embodiments, wherein the pore diameters in the walls of the hollow fibre are between 551 nm to 851 nm.
275. A hollow fibre of any of the preceding composition embodiments, wherein the pore diameters in the walls of the hollow fibre are between 251 nm to 651 nm.
276. A hollow fibre of any of the preceding composition embodiments, wherein the pore diameters in the walls of the hollow fibre are between 501 nm to 851 nm.
277. A hollow fibre of any of the preceding composition embodiments, wherein the pore diameters in the walls of the hollow fibre are between 151 nm to 351 nm.
278. A hollow fibre of any of the preceding composition embodiments, wherein the pore diameters in the walls of the hollow fibre are between 251 nm to 801 nm.
279. A hollow fibre of any of the preceding composition embodiments, wherein the pore diameters in the walls of the hollow fibre are between 801 nm to 1001 nm.
280. A hollow fibre of any of the preceding composition embodiments, wherein the pore diameters in the walls of the hollow fibre are between 101 nm to 351 nm.
281. A hollow fibre of any of the preceding composition embodiments, wherein the pore diameters in the walls of the hollow fibre are between 351 nm to 901 nm.
282. A hollow fibre of any of the preceding composition embodiments, wherein the pore diameters in the walls of the hollow fibre are between 1 nm to 101 nm.
283. A hollow fibre of any of the preceding composition embodiments, wherein the pore diameters in the walls of the hollow fibre are between 501 nm to 601 nm.
284. A hollow fibre of any of the preceding composition embodiments, wherein the pore diameters in the walls of the hollow fibre are between 101 nm to 601 nm.
285. A hollow fibre of any of the preceding composition embodiments, wherein the pore diameters in the walls of the hollow fibre are between 401 nm to 701 nm.
286. A hollow fibre of any of the preceding composition embodiments, wherein the pore diameters in the walls of the hollow fibre are between 151 nm to 401 nm.
287. A hollow fibre of any of the preceding composition embodiments, wherein the pore diameters in the walls of the hollow fibre are between 601 nm to 701 nm.
288. A hollow fibre of any of the preceding composition embodiments, wherein the pore diameters in the walls of the hollow fibre are between 101 nm to 651 nm.
289. A hollow fibre of any of the preceding composition embodiments, wherein the pore diameters in the walls of the hollow fibre are between 351 nm to 751 nm.
290. A hollow fibre of any of the preceding composition embodiments, wherein the pore diameters in the walls of the hollow fibre are between 201 nm to 351 nm.
291. A hollow fibre of any of the preceding composition embodiments, wherein the pore diameters in the walls of the hollow fibre are between 501 nm to 901 nm.
292. A hollow fibre of any of the preceding composition embodiments, wherein the pore diameters in the walls of the hollow fibre are between 401 nm to 451 nm.
293. A hollow fibre of any of the preceding composition embodiments, wherein the pore diameters in the walls of the hollow fibre are between 301 nm to 951 nm.
294. A hollow fibre of any of the preceding composition embodiments, wherein the pore diameters in the walls of the hollow fibre are between 451 nm to 901 nm.
295. A hollow fibre of any of the preceding composition embodiments, wherein the pore diameters in the walls of the hollow fibre are between 101 nm to 201 nm.
296. A hollow fibre of any of the preceding composition embodiments, wherein the pore diameters in the walls of the hollow fibre are between 251 nm to 951 nm.
297. A hollow fibre of any of the preceding composition embodiments, wherein the pore diameters in the walls of the hollow fibre are between 151 nm to 651 nm.
298. A hollow fibre of any of the preceding composition embodiments, wherein the pore diameters in the walls of the hollow fibre are between 51 nm to 501 nm.
299. A hollow fibre of any of the preceding composition embodiments, wherein the pore diameters in the walls of the hollow fibre are between 351 nm to 951 nm.
300. A hollow fibre of any of the preceding composition embodiments, wherein the pore diameters in the walls of the hollow fibre are between 251 nm to 1001 nm.
301. A hollow fibre of any of the preceding composition embodiments, wherein the pore diameters in the walls of the hollow fibre are between 51 nm to 751 nm.
302. A hollow fibre of any of the preceding composition embodiments, wherein the pore diameters in the walls of the hollow fibre are between 451 nm to 601 nm.
303. A hollow fibre of any of the preceding composition embodiments, wherein the pore diameters in the walls of the hollow fibre are between 301 nm to 451 nm.
304. A hollow fibre of any of the preceding composition embodiments, wherein the pore diameters in the walls of the hollow fibre are between 1 nm to 601 nm.
305. A hollow fibre of any of the preceding composition embodiments, wherein the pore diameters in the walls of the hollow fibre are between 1 nm to 151 nm.
306. A hollow fibre of any of the preceding composition embodiments, wherein the pore diameters in the walls of the hollow fibre are between 1 nm to 451 nm.
307. A hollow fibre of any of the preceding composition embodiments, wherein the pore diameters in the walls of the hollow fibre are between 551 nm to 601 nm.

308. A hollow fibre of any of the preceding composition embodiments, wherein the pore diameters in the walls of the hollow fibre are between 351 nm to 651 nm.
309. A hollow fibre of any of the preceding composition embodiments, wherein the pore diameters in the walls of the hollow fibre are between 301 nm to 751 nm.
310. A hollow fibre of any of the preceding composition embodiments, wherein the pore diameters in the walls of the hollow fibre are between 101 nm to 451 nm.
311. A hollow fibre of any of the preceding composition embodiments, wherein the pore diameters in the walls of the hollow fibre are between 151 nm to 701 nm.
312. A hollow fibre of any of the preceding composition embodiments, wherein the pore diameters in the walls of the hollow fibre are between 501 nm to 951 nm.
313. A hollow fibre of any of the preceding composition embodiments, wherein the pore diameters in the walls of the hollow fibre are between 451 nm to 501 nm.
314. A hollow fibre of any of the preceding composition embodiments, wherein the pore diameters in the walls of the hollow fibre are between 151 nm to 901 nm.
315. A hollow fibre of any of the preceding composition embodiments, wherein the pore diameters in the walls of the hollow fibre are between 151 nm to 251 nm.
316. A hollow fibre of any of the preceding composition embodiments, wherein the pore diameters in the walls of the hollow fibre are between 301 nm to 551 nm.
317. A hollow fibre of any of the preceding composition embodiments, wherein the pore diameters in the walls of the hollow fibre are between 1 nm to 351 nm.
318. A hollow fibre of any of the preceding composition embodiments, wherein the pore diameters in the walls of the hollow fibre are between 501 nm to 801 nm.
319. A hollow fibre of any of the preceding composition embodiments, wherein the pore diameters in the walls of the hollow fibre are between 351 nm to 501 nm.
320. A hollow fibre of any of the preceding composition embodiments, wherein the pore diameters in the walls of the hollow fibre are between 51 nm to 901 nm.
321. A hollow fibre of any of the preceding composition embodiments, wherein the pore diameters in the walls of the hollow fibre are between 1 nm to 901 nm.
322. A hollow fibre of any of the preceding composition embodiments, wherein the pore diameters in the walls of the hollow fibre are between 251 nm to 401 nm.
323. A hollow fibre of any of the preceding composition embodiments, wherein the pore diameters in the walls of the hollow fibre are between 651 nm to 751 nm.
324. A hollow fibre of any of the preceding composition embodiments, wherein the pore diameters in the walls of the hollow fibre are between 1 nm to 851 nm.
325. A hollow fibre of any of the preceding composition embodiments, wherein the pore diameters in the walls of the hollow fibre are between 201 nm to 901 nm.
326. A hollow fibre of any of the preceding composition embodiments, wherein the pore diameters in the walls of the hollow fibre are between 701 nm to 951 nm.
327. A hollow fibre of any of the preceding composition embodiments, wherein the pore diameters in the walls of the hollow fibre are between 401 nm to 651 nm.
328. A hollow fibre of any of the preceding composition embodiments, wherein the pore diameters in the walls of the hollow fibre are between 151 nm to 751 nm.
329. A hollow fibre of any of the preceding composition embodiments, wherein the pore diameters in the walls of the hollow fibre are between 651 nm to 1001 nm.
330. A hollow fibre of any of the preceding composition embodiments, wherein the pore diameters in the walls of the hollow fibre are between 1 nm to 501 nm.
331. A hollow fibre of any of the preceding composition embodiments, wherein the pore diameters in the walls of the hollow fibre are between 51 nm to 551 nm.
332. A hollow fibre of any of the preceding composition embodiments, wherein the pore diameters in the walls of the hollow fibre are between 201 nm to 701 nm.
333. A hollow fibre of any of the preceding composition embodiments, wherein the pore diameters in the walls of the hollow fibre are between 451 nm to 1001 nm.
334. A hollow fibre of any of the preceding composition embodiments, wherein the pore diameters in the walls of the hollow fibre are between 251 nm to 501 nm.
335. A hollow fibre of any of the preceding composition embodiments, wherein the pore diameters in the walls of the hollow fibre are between 801 nm to 901 nm.
336. A hollow fibre of any of the preceding composition embodiments, wherein the pore diameters in the walls of the hollow fibre are between 401 nm to 751 nm.
337. A hollow fibre of any of the preceding composition embodiments, wherein the pore diameters in the walls of the hollow fibre are between 151 nm to 851 nm.
338. A hollow fibre of any of the preceding composition embodiments, wherein the pore diameters in the walls of the hollow fibre are between 601 nm to 651 nm.
339. A hollow fibre of any of the preceding composition embodiments, wherein the pore diameters in the walls of the hollow fibre are between 451 nm to 851 nm.
340. A hollow fibre of any of the preceding composition embodiments, wherein the pore diameters in the walls of the hollow fibre are between 451 nm to 801 nm.
341. A hollow fibre of any of the preceding composition embodiments, wherein the pore diameters in the walls of the hollow fibre are between 201 nm to 251 nm.
342. A hollow fibre of any of the preceding composition embodiments, wherein the pore diameters in the walls of the hollow fibre are between 551 nm to 951 nm.
343. A hollow fibre of any of the preceding composition embodiments, wherein the pore diameters in the walls of the hollow fibre are between 1 nm to 251 nm.
344. A hollow fibre of any of the preceding composition embodiments, wherein the pore diameters in the walls of the hollow fibre are between 51 nm to 201 nm.
345. A hollow fibre of any of the preceding composition embodiments, wherein the pore diameters in the walls of the hollow fibre are between 751 nm to 901 nm.
346. A hollow fibre of any of the preceding composition embodiments, wherein the pore diameters in the walls of the hollow fibre are between 501 nm to 701 nm.
347. A hollow fibre of any of the preceding composition embodiments, wherein the pore diameters in the walls of the hollow fibre are between 651 nm to 701 nm.
348. A hollow fibre of any of the preceding composition embodiments, wherein the pore diameters in the walls of the hollow fibre are between 1 nm to 751 nm.
349. A hollow fibre of any of the preceding composition embodiments, wherein the pore diameters in the walls of the hollow fibre are between 601 nm to 801 nm.
350. A hollow fibre of any of the preceding composition embodiments, wherein the pore diameters in the walls of the hollow fibre are between 751 nm to 951 nm.
351. A hollow fibre of any of the preceding composition embodiments, wherein the pore diameters in the walls of the hollow fibre are between 601 nm to 851 nm.

352. A hollow fibre of any of the preceding composition embodiments, wherein the pore diameters in the walls of the hollow fibre are between 51 nm to 101 nm.
353. A hollow fibre of any of the preceding composition embodiments, wherein the pore diameters in the walls of the hollow fibre are between 201 nm to 851 nm.
354. A hollow fibre of any of the preceding composition embodiments, wherein the pore diameters in the walls of the hollow fibre are between 201 nm to 551 nm.
355. A hollow fibre of any of the preceding composition embodiments, wherein the pore diameters in the walls of the hollow fibre are between 251 nm to 451 nm.
356. A hollow fibre of any of the preceding composition embodiments, wherein the pore diameters in the walls of the hollow fibre are between 101 nm to 251 nm.
357. A hollow fibre of any of the preceding composition embodiments, wherein the pore diameters in the walls of the hollow fibre are between 651 nm to 801 nm.
358. A hollow fibre of any of the preceding composition embodiments, wherein the pore diameters in the walls of the hollow fibre are between 1 nm to 701 nm.
359. A hollow fibre of any of the preceding composition embodiments, wherein the pore diameters in the walls of the hollow fibre are between 401 nm to 1001 nm.
360. A hollow fibre of any of the preceding composition embodiments, wherein the pore diameters in the walls of the hollow fibre are between 351 nm to 551 nm.
361. A hollow fibre of any of the preceding composition embodiments, wherein the pore diameters in the walls of the hollow fibre are between 451 nm to 701 nm.
362. A hollow fibre of any of the preceding composition embodiments, wherein the pore diameters in the walls of the hollow fibre are between 301 nm to 851 nm.
363. A hollow fibre of any of the preceding composition embodiments, wherein the pore diameters in the walls of the hollow fibre are between 401 nm to 501 nm.
364. A hollow fibre of any of the preceding composition embodiments, wherein the pore diameters in the walls of the hollow fibre are between 51 nm to 1001 nm.
365. A hollow fibre of any of the preceding composition embodiments, wherein the pore diameters in the walls of the hollow fibre are between 351 nm to 801 nm.
366. A hollow fibre of any of the preceding composition embodiments, wherein the pore diameters in the walls of the hollow fibre are between 1 nm to 951 nm.
367. A hollow fibre of any of the preceding composition embodiments, wherein the pore diameters in the walls of the hollow fibre are between 801 nm to 851 nm.
368. A hollow fibre of any of the preceding composition embodiments, wherein the pore diameters in the walls of the hollow fibre are between 451 nm to 651 nm.
369. A hollow fibre of any of the preceding composition embodiments, wherein the pore diameters in the walls of the hollow fibre are between 351 nm to 701 nm.
370. A hollow fibre of any of the preceding composition embodiments, wherein the pore diameters in the walls of the hollow fibre are between 201 nm to 801 nm.
371. A hollow fibre of any of the preceding composition embodiments, wherein the pore diameters in the walls of the hollow fibre are between 401 nm to 901 nm.
372. A hollow fibre of any of the preceding composition embodiments, wherein the pore diameters in the walls of the hollow fibre are between 1 nm to 651 nm.
373. A hollow fibre of any of the preceding composition embodiments, wherein the pore diameters in the walls of the hollow fibre are between 501 nm to 1001 nm.
374. A hollow fibre of any of the preceding composition embodiments, wherein the pore diameters in the walls of the hollow fibre are between 101 nm to 851 nm.
375. A hollow fibre of any of the preceding composition embodiments, wherein the pore diameters in the walls of the hollow fibre are between 901 nm to 1001 nm.
376. A hollow fibre of any of the preceding composition embodiments, wherein the pore diameters in the walls of the hollow fibre are between 751 nm to 1001 nm.
377. A hollow fibre of any of the preceding composition embodiments, wherein the pore diameters in the walls of the hollow fibre are between 901 nm to 951 nm.
378. A hollow fibre of any of the preceding composition embodiments, wherein the pore diameters in the walls of the hollow fibre are between 601 nm to 1001 nm.
379. A hollow fibre of any of the preceding composition embodiments, wherein the pore diameters in the walls of the hollow fibre are between 701 nm to 751 nm.
380. A hollow fibre of any of the preceding composition embodiments, wherein the pore diameters in the walls of the hollow fibre are between 251 nm to 851 nm.
381. A hollow fibre of any of the preceding composition embodiments, wherein the pore diameters in the walls of the hollow fibre are between 151 nm to 801 nm.
382. A hollow fibre of any of the preceding composition embodiments, wherein the pore diameters in the walls of the hollow fibre are between 851 nm to 1001 nm.
383. A hollow fibre of any of the preceding composition embodiments, wherein the pore diameters in the walls of the hollow fibre are between 301 nm to 351 nm.
384. A hollow fibre of any of the preceding composition embodiments, wherein the pore diameters in the walls of the hollow fibre are between 151 nm to 201 nm.
385. A hollow fibre of any of the preceding composition embodiments, wherein the pore diameters in the walls of the hollow fibre are between 151 nm to 951 nm.
386. A hollow fibre of any of the preceding composition embodiments, wherein the pore diameters in the walls of the hollow fibre are between 351 nm to 1001 nm.
387. A hollow fibre of any of the preceding composition embodiments, wherein the pore diameters in the walls of the hollow fibre are between 551 nm to 1001 nm.
388. A hollow fibre of any of the preceding composition embodiments, wherein the pore diameters in the walls of the hollow fibre are between 451 nm to 951 nm.
389. A hollow fibre of any of the preceding composition embodiments, wherein the pore diameters in the walls of the hollow fibre are between 1 nm to 201 nm.
390. A hollow fibre of any of the preceding composition embodiments, wherein the pore diameters in the walls of the hollow fibre are between 151 nm to 1001 nm.
391. A hollow fibre of any of the preceding composition embodiments, wherein the pore diameters in the walls of the hollow fibre are between 301 nm to 801 nm.
392. A hollow fibre of any of the preceding composition embodiments, wherein the pore diameters in the walls of the hollow fibre are between 151 nm to 501 nm.
393. A hollow fibre of any of the preceding composition embodiments, wherein the pore diameters in the walls of the hollow fibre are between 51 nm to 851 nm.
394. A hollow fibre of any of the preceding composition embodiments, wherein the pore diameters in the walls of the hollow fibre are between 201 nm to 601 nm.
395. A hollow fibre of any of the preceding composition embodiments, wherein the pore diameters in the walls of the hollow fibre are between 551 nm to 901 nm.

396. A hollow fibre of any of the preceding composition embodiments, wherein the pore diameters in the walls of the hollow fibre are between 251 nm to 601 nm.
397. A hollow fibre of any of the preceding composition embodiments, wherein the pore diameters in the walls of the hollow fibre are between 51 nm to 151 nm.
398. A hollow fibre of any of the preceding composition embodiments, wherein the pore diameters in the walls of the hollow fibre are between 851 nm to 901 nm.
399. A hollow fibre of any of the preceding composition embodiments, wherein the pore diameters in the walls of the hollow fibre are between 351 nm to 851 nm.
400. A hollow fibre of any of the preceding composition embodiments, wherein the pore diameters in the walls of the hollow fibre are between 501 nm to 551 nm.
401. A hollow fibre of any of the preceding composition embodiments, wherein the pore diameters in the walls of the hollow fibre are between 551 nm to 751 nm.
402. A hollow fibre of any of the preceding composition embodiments, wherein the pore diameters in the walls of the hollow fibre are between 751 nm to 851 nm.
403. A hollow fibre of any of the preceding composition embodiments, wherein the pore diameters in the walls of the hollow fibre are between 101 nm to 801 nm.
404. A hollow fibre of any of the preceding composition embodiments, wherein the pore diameters in the walls of the hollow fibre are between 101 nm to 951 nm.
405. A hollow fibre of any of the preceding composition embodiments, wherein the pore diameters in the walls of the hollow fibre are between 151 nm to 601 nm.
406. A hollow fibre of any of the preceding composition embodiments, wherein the pore diameters in the walls of the hollow fibre are between 101 nm to 751 nm.
407. A hollow fibre of any of the preceding composition embodiments, wherein the pore diameters in the walls of the hollow fibre are between 401 nm to 551 nm.
408. A hollow fibre of any of the preceding composition embodiments, wherein the pore diameters in the walls of the hollow fibre are between 601 nm to 951 nm.
409. A hollow fibre of any of the preceding composition embodiments, wherein the pore diameters in the walls of the hollow fibre are between 351 nm to 401 nm.
410. A hollow fibre of any of the preceding composition embodiments, wherein the pore diameters in the walls of the hollow fibre are between 351 nm to 601 nm.
411. A hollow fibre of any of the preceding composition embodiments, wherein the pore diameters in the walls of the hollow fibre are between 251 nm to 701 nm.
412. A hollow fibre of any of the preceding composition embodiments, wherein the pore diameters in the walls of the hollow fibre are between 151 nm to 451 nm.
413. A hollow fibre of any of the preceding composition embodiments, wherein the pore diameters in the walls of the hollow fibre are between 701 nm to 1001 nm.
414. A hollow fibre of any of the preceding composition embodiments, wherein the pore diameters in the walls of the hollow fibre are between 51 nm to 251 nm.
415. A hollow fibre of any of the preceding composition embodiments, wherein the pore diameters in the walls of the hollow fibre are between 651 nm to 951 nm.
416. A hollow fibre of any of the preceding composition embodiments, wherein the pore diameters in the walls of the hollow fibre are between 401 nm to 851 nm.
417. A hollow fibre of any of the preceding composition embodiments, wherein the pore diameters in the walls of the hollow fibre are between 201 nm to 501 nm.
418. A hollow fibre of any of the preceding composition embodiments, wherein the pore diameters in the walls of the hollow fibre are between 1 nm to 801 nm.
419. A hollow fibre of any of the preceding composition embodiments, wherein the pore diameters in the walls of the hollow fibre are between 551 nm to 801 nm.
420. A hollow fibre of any of the preceding composition embodiments, wherein the pore diameters in the walls of the hollow fibre are between 1 nm to 51 nm.
421. A hollow fibre of any of the preceding composition embodiments, wherein the pore diameters in the walls of the hollow fibre are between 701 nm to 851 nm.
422. A hollow fibre of any of the preceding composition embodiments, wherein the pore diameters in the walls of the hollow fibre are between 51 nm to 651 nm.
423. A hollow fibre of any of the preceding composition embodiments, wherein the pore diameters in the walls of the hollow fibre are between 51 nm to 451 nm.
424. A hollow fibre of any of the preceding composition embodiments, wherein the pore diameters in the walls of the hollow fibre are between 301 nm to 601 nm.
425. A hollow fibre of any of the preceding composition embodiments, wherein the pore diameters in the walls of the hollow fibre are between 51 nm to 601 nm.
426. A hollow fibre of any of the preceding composition embodiments, wherein the pore diameters in the walls of the hollow fibre are between 301 nm to 501 nm.
427. A hollow fibre of any of the preceding composition embodiments, wherein the pore diameters in the walls of the hollow fibre are between 601 nm to 751 nm.
428. A hollow fibre of any of the preceding composition embodiments, wherein the pore diameters in the walls of the hollow fibre are between 1 nm to 301 nm.
429. A hollow fibre of any of the preceding composition embodiments, wherein the pore diameters in the walls of the hollow fibre are between 751 nm to 801 nm.
430. A hollow fibre of any of the preceding composition embodiments, wherein the pore diameters in the walls of the hollow fibre are between 51 nm to 401 nm.
431. A hollow fibre of any of the preceding composition embodiments, wherein the pore diameters in the walls of the hollow fibre are between 201 nm to 651 nm.
432. A hollow fibre of any of the preceding composition embodiments, wherein the pore diameters in the walls of the hollow fibre are between 551 nm to 701 nm.
433. A hollow fibre of any of the preceding composition embodiments, wherein the pore diameters in the walls of the hollow fibre are between 851 nm to 951 nm.
434. A hollow fibre of any of the preceding composition embodiments, wherein the pore diameters in the walls of the hollow fibre are between 201 nm to 451 nm.
435. A hollow fibre of any of the preceding composition embodiments, wherein the pore diameters in the walls of the hollow fibre are between 251 nm to 751 nm.
436. A hollow fibre of any of the preceding composition embodiments, wherein the pore diameters in the walls of the hollow fibre are between 1 nm to 551 nm.
437. A hollow fibre of any of the preceding composition embodiments, wherein the pore diameters in the walls of the hollow fibre are between 101 nm to 901 nm.
438. A hollow fibre of any of the preceding composition embodiments, wherein the pore diameters in the walls of the hollow fibre are between 101 nm to 151 nm.
439. A hollow fibre of any of the preceding composition embodiments, wherein the pore diameters in the walls of the hollow fibre are between 801 nm to 951 nm.

440. A hollow fibre of any of the preceding composition embodiments, wherein the pore diameters in the walls of the hollow fibre are between 601 nm to 901 nm.
441. A hollow fibre of any of the preceding composition embodiments, wherein the pore diameters in the walls of the hollow fibre are between 401 nm to 801 nm.
442. A hollow fibre of any of the preceding composition embodiments, wherein the pore diameters in the walls of the hollow fibre are between 151 nm to 551 nm.
443. A hollow fibre of any of the preceding composition embodiments, wherein the pore diameters in the walls of the hollow fibre are between 101 nm to 1001 nm.
444. A hollow fibre of any of the preceding composition embodiments, wherein the pore diameters in the walls of the hollow fibre are between 151 nm to 301 nm.
445. A hollow fibre of any of the preceding composition embodiments, wherein the pore diameters in the walls of the hollow fibre are between 51 nm to 951 nm.
446. A hollow fibre of any of the preceding composition embodiments, wherein the pore diameters in the walls of the hollow fibre are between 201 nm to 751 nm.
447. A hollow fibre of any of the preceding composition embodiments, wherein the pore diameters in the walls of the hollow fibre are between 201 nm to 951 nm.
448. A hollow fibre of any of the preceding composition embodiments, wherein the pore diameters in the walls of the hollow fibre are between 301 nm to 701 nm.
449. A hollow fibre of any of the preceding composition embodiments, wherein the pore diameters in the walls of the hollow fibre are between 51 nm to 701 nm.
450. A hollow fibre of any of the preceding composition embodiments, wherein the pore diameters in the walls of the hollow fibre are between 251 nm to 551 nm.
451. A hollow fibre of any of the preceding composition embodiments, wherein the pore diameters in the walls of the hollow fibre are between 701 nm to 801 nm.
452. A hollow fibre of any of the preceding composition embodiments, wherein the pore diameters in the walls of the hollow fibre are between 301 nm to 901 nm.
453. A hollow fibre of any of the preceding composition embodiments, wherein the pore diameters in the walls of the hollow fibre are between 551 nm to 651 nm.
454. A hollow fibre of any of the preceding composition embodiments, wherein the pore diameters in the walls of the hollow fibre are between 651 nm to 851 nm.
455. A hollow fibre of any of the preceding composition embodiments, wherein the pore diameters in the walls of the hollow fibre are between 201 nm to 301 nm.
456. A hollow fibre of any of the preceding composition embodiments, wherein the pore diameters in the walls of the hollow fibre are between 351 nm to 451 nm.
457. A hollow fibre of any of the preceding composition embodiments, wherein the pore diameters in the walls of the hollow fibre are between 301 nm to 401 nm.
458. A hollow fibre of any of the preceding composition embodiments, wherein the pore diameters in the walls of the hollow fibre are between 101 nm to 401 nm.
459. A hollow fibre of any of the preceding composition embodiments, wherein the pore diameters in the walls of the hollow fibre are between 51 nm to 301 nm.
460. A hollow fibre of any of the preceding composition embodiments, wherein the pore diameters in the walls of the hollow fibre are between 401 nm to 951 nm.
461. A hollow fibre of any of the preceding composition embodiments, wherein the pore diameters in the walls of the hollow fibre are between 16 µm to 96 µm.
462. A hollow fibre of any of the preceding composition embodiments, wherein the pore diameters in the walls of the hollow fibre are between 16 µm to 91 µm.
463. A hollow fibre of any of the preceding composition embodiments, wherein the pore diameters in the walls of the hollow fibre are between 1 µm to 66 µm.
464. A hollow fibre of any of the preceding composition embodiments, wherein the pore diameters in the walls of the hollow fibre are between 6 µm to 71 µm.
465. A hollow fibre of any of the preceding composition embodiments, wherein the pore diameters in the walls of the hollow fibre are between 51 µm to 86 µm.
466. A hollow fibre of any of the preceding composition embodiments, wherein the pore diameters in the walls of the hollow fibre are between 1 µm to 71 µm.
467. A hollow fibre of any of the preceding composition embodiments, wherein the pore diameters in the walls of the hollow fibre are between 11 µm to 46 µm.
468. A hollow fibre of any of the preceding composition embodiments, wherein the pore diameters in the walls of the hollow fibre are between 6 µm to 86 µm.
469. A hollow fibre of any of the preceding composition embodiments, wherein the pore diameters in the walls of the hollow fibre are between 56 µm to 71 µm.
470. A hollow fibre of any of the preceding composition embodiments, wherein the pore diameters in the walls of the hollow fibre are between 6 µm to 91 µm.
471. A hollow fibre of any of the preceding composition embodiments, wherein the pore diameters in the walls of the hollow fibre are between 56 µm to 81 µm.
472. A hollow fibre of any of the preceding composition embodiments, wherein the pore diameters in the walls of the hollow fibre are between 11 µm to 36 µm.
473. A hollow fibre of any of the preceding composition embodiments, wherein the pore diameters in the walls of the hollow fibre are between 21 µm to 31 µm.
474. A hollow fibre of any of the preceding composition embodiments, wherein the pore diameters in the walls of the hollow fibre are between 1 µm to 46 µm.
475. A hollow fibre of any of the preceding composition embodiments, wherein the pore diameters in the walls of the hollow fibre are between 66 µm to 76 µm.
476. A hollow fibre of any of the preceding composition embodiments, wherein the pore diameters in the walls of the hollow fibre are between 6 µm to 96 µm.
477. A hollow fibre of any of the preceding composition embodiments, wherein the pore diameters in the walls of the hollow fibre are between 41 µm to 71 µm.
478. A hollow fibre of any of the preceding composition embodiments, wherein the pore diameters in the walls of the hollow fibre are between 26 µm to 46 µm.
479. A hollow fibre of any of the preceding composition embodiments, wherein the pore diameters in the walls of the hollow fibre are between 16 µm to 71 µm.
480. A hollow fibre of any of the preceding composition embodiments, wherein the pore diameters in the walls of the hollow fibre are between 36 µm to 51 µm.
481. A hollow fibre of any of the preceding composition embodiments, wherein the pore diameters in the walls of the hollow fibre are between 11 µm to 66 µm.
482. A hollow fibre of any of the preceding composition embodiments, wherein the pore diameters in the walls of the hollow fibre are between 16 µm to 76 µm.
483. A hollow fibre of any of the preceding composition embodiments, wherein the pore diameters in the walls of the hollow fibre are between 11 µm to 51 µm.

484. A hollow fibre of any of the preceding composition embodiments, wherein the pore diameters in the walls of the hollow fibre are between 76 μm to 86 μm.

485. A hollow fibre of any of the preceding composition embodiments, wherein the pore diameters in the walls of the hollow fibre are between 41 μm to 46 μm.

486. A hollow fibre of any of the preceding composition embodiments, wherein the pore diameters in the walls of the hollow fibre are between 31 μm to 86 μm.

487. A hollow fibre of any of the preceding composition embodiments, wherein the pore diameters in the walls of the hollow fibre are between 26 μm to 36 μm.

488. A hollow fibre of any of the preceding composition embodiments, wherein the pore diameters in the walls of the hollow fibre are between 16 μm to 36 μm.

489. A hollow fibre of any of the preceding composition embodiments, wherein the pore diameters in the walls of the hollow fibre are between 1 μm to 31 μm.

490. A hollow fibre of any of the preceding composition embodiments, wherein the pore diameters in the walls of the hollow fibre are between 21 μm to 51 μm.

491. A hollow fibre of any of the preceding composition embodiments, wherein the pore diameters in the walls of the hollow fibre are between 66 μm to 86 μm.

492. A hollow fibre of any of the preceding composition embodiments, wherein the pore diameters in the walls of the hollow fibre are between 21 μm to 36 μm.

493. A hollow fibre of any of the preceding composition embodiments, wherein the pore diameters in the walls of the hollow fibre are between 51 μm to 71 μm.

494. A hollow fibre of any of the preceding composition embodiments, wherein the pore diameters in the walls of the hollow fibre are between 36 μm to 61 μm.

495. A hollow fibre of any of the preceding composition embodiments, wherein the pore diameters in the walls of the hollow fibre are between 21 μm to 26 μm.

496. A hollow fibre of any of the preceding composition embodiments, wherein the pore diameters in the walls of the hollow fibre are between 56 μm to 66 μm.

497. A hollow fibre of any of the preceding composition embodiments, wherein the pore diameters in the walls of the hollow fibre are between 81 μm to 86 μm.

498. A hollow fibre of any of the preceding composition embodiments, wherein the pore diameters in the walls of the hollow fibre are between 56 μm to 61 μm.

499. A hollow fibre of any of the preceding composition embodiments, wherein the pore diameters in the walls of the hollow fibre are between 6 μm to 31 μm.

500. A hollow fibre of any of the preceding composition embodiments, wherein the pore diameters in the walls of the hollow fibre are between 11 μm to 91 μm.

501. A hollow fibre of any of the preceding composition embodiments, wherein the pore diameters in the walls of the hollow fibre are between 46 μm to 91 μm.

502. A hollow fibre of any of the preceding composition embodiments, wherein the pore diameters in the walls of the hollow fibre are between 1 μm to 96 μm.

503. A hollow fibre of any of the preceding composition embodiments, wherein the pore diameters in the walls of the hollow fibre are between 81 μm to 96 μm.

504. A hollow fibre of any of the preceding composition embodiments, wherein the pore diameters in the walls of the hollow fibre are between 46 μm to 66 μm.

505. A hollow fibre of any of the preceding composition embodiments, wherein the pore diameters in the walls of the hollow fibre are between 6 μm to 21 μm.

506. A hollow fibre of any of the preceding composition embodiments, wherein the pore diameters in the walls of the hollow fibre are between 31 μm to 56 μm.

507. A hollow fibre of any of the preceding composition embodiments, wherein the pore diameters in the walls of the hollow fibre are between 21 μm to 91 μm.

508. A hollow fibre of any of the preceding composition embodiments, wherein the pore diameters in the walls of the hollow fibre are between 1 μm to 21 μm.

509. A hollow fibre of any of the preceding composition embodiments, wherein the pore diameters in the walls of the hollow fibre are between 11 μm to 86 μm.

510. A hollow fibre of any of the preceding composition embodiments, wherein the pore diameters in the walls of the hollow fibre are between 26 μm to 76 μm.

511. A hollow fibre of any of the preceding composition embodiments, wherein the pore diameters in the walls of the hollow fibre are between 36 μm to 86 μm.

512. A hollow fibre of any of the preceding composition embodiments, wherein the pore diameters in the walls of the hollow fibre are between 11 μm to 31 μm.

513. A hollow fibre of any of the preceding composition embodiments, wherein the pore diameters in the walls of the hollow fibre are between 36 μm to 76 μm.

514. A hollow fibre of any of the preceding composition embodiments, wherein the pore diameters in the walls of the hollow fibre are between 6 μm to 51 μm.

515. A hollow fibre of any of the preceding composition embodiments, wherein the pore diameters in the walls of the hollow fibre are between 31 μm to 51 μm.

516. A hollow fibre of any of the preceding composition embodiments, wherein the pore diameters in the walls of the hollow fibre are between 1 μm to 86 μm.

517. A hollow fibre of any of the preceding composition embodiments, wherein the pore diameters in the walls of the hollow fibre are between 26 μm to 91 μm.

518. A hollow fibre of any of the preceding composition embodiments, wherein the pore diameters in the walls of the hollow fibre are between 81 μm to 91 μm.

519. A hollow fibre of any of the preceding composition embodiments, wherein the pore diameters in the walls of the hollow fibre are between 1 μm to 76 μm.

520. A hollow fibre of any of the preceding composition embodiments, wherein the pore diameters in the walls of the hollow fibre are between 16 μm to 41 μm.

521. A hollow fibre of any of the preceding composition embodiments, wherein the pore diameters in the walls of the hollow fibre are between 21 μm to 66 μm.

522. A hollow fibre of any of the preceding composition embodiments, wherein the pore diameters in the walls of the hollow fibre are between 16 μm to 26 μm.

523. A hollow fibre of any of the preceding composition embodiments, wherein the pore diameters in the walls of the hollow fibre are between 41 μm to 61 μm.

524. A hollow fibre of any of the preceding composition embodiments, wherein the pore diameters in the walls of the hollow fibre are between 61 μm to 81 μm.

525. A hollow fibre of any of the preceding composition embodiments, wherein the pore diameters in the walls of the hollow fibre are between 1 μm to 91 μm.

526. A hollow fibre of any of the preceding composition embodiments, wherein the pore diameters in the walls of the hollow fibre are between 11 μm to 61 μm.

527. A hollow fibre of any of the preceding composition embodiments, wherein the pore diameters in the walls of the hollow fibre are between 11 μm to 101 μm.

528. A hollow fibre of any of the preceding composition embodiments, wherein the pore diameters in the walls of the hollow fibre are between 66 µm to 91 µm.
529. A hollow fibre of any of the preceding composition embodiments, wherein the pore diameters in the walls of the hollow fibre are between 6 µm to 36 µm.
530. A hollow fibre of any of the preceding composition embodiments, wherein the pore diameters in the walls of the hollow fibre are between 46 µm to 51 µm.
531. A hollow fibre of any of the preceding composition embodiments, wherein the pore diameters in the walls of the hollow fibre are between 61 µm to 71 µm.
532. A hollow fibre of any of the preceding composition embodiments, wherein the pore diameters in the walls of the hollow fibre are between 21 µm to 61 µm.
533. A hollow fibre of any of the preceding composition embodiments, wherein the pore diameters in the walls of the hollow fibre are between 6 µm to 11 µm.
534. A hollow fibre of any of the preceding composition embodiments, wherein the pore diameters in the walls of the hollow fibre are between 1 µm to 36 µm.
535. A hollow fibre of any of the preceding composition embodiments, wherein the pore diameters in the walls of the hollow fibre are between 1 µm to 26 µm.
536. A hollow fibre of any of the preceding composition embodiments, wherein the pore diameters in the walls of the hollow fibre are between 26 µm to 51 µm.
537. A hollow fibre of any of the preceding composition embodiments, wherein the pore diameters in the walls of the hollow fibre are between 61 µm to 66 µm.
538. A hollow fibre of any of the preceding composition embodiments, wherein the pore diameters in the walls of the hollow fibre are between 41 µm to 101 µm.
539. A hollow fibre of any of the preceding composition embodiments, wherein the pore diameters in the walls of the hollow fibre are between 21 µm to 86 µm.
540. A hollow fibre of any of the preceding composition embodiments, wherein the pore diameters in the walls of the hollow fibre are between 1 µm to 11 µm.
541. A hollow fibre of any of the preceding composition embodiments, wherein the pore diameters in the walls of the hollow fibre are between 41 µm to 66 µm.
542. A hollow fibre of any of the preceding composition embodiments, wherein the pore diameters in the walls of the hollow fibre are between 36 µm to 91 µm.
543. A hollow fibre of any of the preceding composition embodiments, wherein the pore diameters in the walls of the hollow fibre are between 76 µm to 101 µm.
544. A hollow fibre of any of the preceding composition embodiments, wherein the pore diameters in the walls of the hollow fibre are between 6 µm to 66 µm.
545. A hollow fibre of any of the preceding composition embodiments, wherein the pore diameters in the walls of the hollow fibre are between 56 µm to 91 µm.
546. A hollow fibre of any of the preceding composition embodiments, wherein the pore diameters in the walls of the hollow fibre are between 81 µm to 101 µm.
547. A hollow fibre of any of the preceding composition embodiments, wherein the pore diameters in the walls of the hollow fibre are between 26 µm to 86 µm.
548. A hollow fibre of any of the preceding composition embodiments, wherein the pore diameters in the walls of the hollow fibre are between 76 µm to 96 µm.
549. A hollow fibre of any of the preceding composition embodiments, wherein the pore diameters in the walls of the hollow fibre are between 1 µm to 61 µm.
550. A hollow fibre of any of the preceding composition embodiments, wherein the pore diameters in the walls of the hollow fibre are between 1 µm to 101 µm.
551. A hollow fibre of any of the preceding composition embodiments, wherein the pore diameters in the walls of the hollow fibre are between 21 µm to 56 µm.
552. A hollow fibre of any of the preceding composition embodiments, wherein the pore diameters in the walls of the hollow fibre are between 26 µm to 41 µm.
553. A hollow fibre of any of the preceding composition embodiments, wherein the pore diameters in the walls of the hollow fibre are between 76 µm to 81 µm.
554. A hollow fibre of any of the preceding composition embodiments, wherein the pore diameters in the walls of the hollow fibre are between 36 µm to 66 µm.
555. A hollow fibre of any of the preceding composition embodiments, wherein the pore diameters in the walls of the hollow fibre are between 56 µm to 76 µm.
556. A hollow fibre of any of the preceding composition embodiments, wherein the pore diameters in the walls of the hollow fibre are between 6 µm to 76 µm.
557. A hollow fibre of any of the preceding composition embodiments, wherein the pore diameters in the walls of the hollow fibre are between 11 µm to 16 µm.
558. A hollow fibre of any of the preceding composition embodiments, wherein the pore diameters in the walls of the hollow fibre are between 11 µm to 56 µm.
559. A hollow fibre of any of the preceding composition embodiments, wherein the pore diameters in the walls of the hollow fibre are between 31 µm to 101 µm.
560. A hollow fibre of any of the preceding composition embodiments, wherein the pore diameters in the walls of the hollow fibre are between 6 µm to 46 µm.
561. A hollow fibre of any of the preceding composition embodiments, wherein the pore diameters in the walls of the hollow fibre are between 36 µm to 101 µm.
562. A hollow fibre of any of the preceding composition embodiments, wherein the pore diameters in the walls of the hollow fibre are between 66 µm to 71 µm.
563. A hollow fibre of any of the preceding composition embodiments, wherein the pore diameters in the walls of the hollow fibre are between 1 µm to 81 µm.
564. A hollow fibre of any of the preceding composition embodiments, wherein the pore diameters in the walls of the hollow fibre are between 11 µm to 71 µm.
565. A hollow fibre of any of the preceding composition embodiments, wherein the pore diameters in the walls of the hollow fibre are between 1 µm to 56 µm.
566. A hollow fibre of any of the preceding composition embodiments, wherein the pore diameters in the walls of the hollow fibre are between 11 µm to 26 µm.
567. A hollow fibre of any of the preceding composition embodiments, wherein the pore diameters in the walls of the hollow fibre are between 31 µm to 61 µm.
568. A hollow fibre of any of the preceding composition embodiments, wherein the pore diameters in the walls of the hollow fibre are between 71 µm to 101 µm.
569. A hollow fibre of any of the preceding composition embodiments, wherein the pore diameters in the walls of the hollow fibre are between 1 µm to 41 µm.
570. A hollow fibre of any of the preceding composition embodiments, wherein the pore diameters in the walls of the hollow fibre are between 16 µm to 61 µm.
571. A hollow fibre of any of the preceding composition embodiments, wherein the pore diameters in the walls of the hollow fibre are between 26 µm to 61 µm.

572. A hollow fibre of any of the preceding composition embodiments, wherein the pore diameters in the walls of the hollow fibre are between 71 μm to 76 μm.
573. A hollow fibre of any of the preceding composition embodiments, wherein the pore diameters in the walls of the hollow fibre are between 56 μm to 96 μm.
574. A hollow fibre of any of the preceding composition embodiments, wherein the pore diameters in the walls of the hollow fibre are between 51 μm to 91 μm.
575. A hollow fibre of any of the preceding composition embodiments, wherein the pore diameters in the walls of the hollow fibre are between 61 μm to 91 μm.
576. A hollow fibre of any of the preceding composition embodiments, wherein the pore diameters in the walls of the hollow fibre are between 26 μm to 71 μm.
577. A hollow fibre of any of the preceding composition embodiments, wherein the pore diameters in the walls of the hollow fibre are between 16 μm to 81 μm.
578. A hollow fibre of any of the preceding composition embodiments, wherein the pore diameters in the walls of the hollow fibre are between 26 μm to 81 μm.
579. A hollow fibre of any of the preceding composition embodiments, wherein the pore diameters in the walls of the hollow fibre are between 21 μm to 101 μm.
580. A hollow fibre of any of the preceding composition embodiments, wherein the pore diameters in the walls of the hollow fibre are between 1 μm to 16 μm.
581. A hollow fibre of any of the preceding composition embodiments, wherein the pore diameters in the walls of the hollow fibre are between 41 μm to 81 μm.
582. A hollow fibre of any of the preceding composition embodiments, wherein the pore diameters in the walls of the hollow fibre are between 16 μm to 86 μm.
583. A hollow fibre of any of the preceding composition embodiments, wherein the pore diameters in the walls of the hollow fibre are between 61 μm to 101 μm.
584. A hollow fibre of any of the preceding composition embodiments, wherein the pore diameters in the walls of the hollow fibre are between 1 μm to 51 μm.
585. A hollow fibre of any of the preceding composition embodiments, wherein the pore diameters in the walls of the hollow fibre are between 11 μm to 41 μm.
586. A hollow fibre of any of the preceding composition embodiments, wherein the pore diameters in the walls of the hollow fibre are between 46 μm to 56 μm.
587. A hollow fibre of any of the preceding composition embodiments, wherein the pore diameters in the walls of the hollow fibre are between 51 μm to 56 μm.
588. A hollow fibre of any of the preceding composition embodiments, wherein the pore diameters in the walls of the hollow fibre are between 26 μm to 31 μm.
589. A hollow fibre of any of the preceding composition embodiments, wherein the pore diameters in the walls of the hollow fibre are between 51 μm to 81 μm.
590. A hollow fibre of any of the preceding composition embodiments, wherein the pore diameters in the walls of the hollow fibre are between 31 μm to 76 μm.
591. A hollow fibre of any of the preceding composition embodiments, wherein the pore diameters in the walls of the hollow fibre are between 51 μm to 66 μm.
592. A hollow fibre of any of the preceding composition embodiments, wherein the pore diameters in the walls of the hollow fibre are between 16 μm to 31 μm.
593. A hollow fibre of any of the preceding composition embodiments, wherein the pore diameters in the walls of the hollow fibre are between 46 μm to 81 μm.
594. A hollow fibre of any of the preceding composition embodiments, wherein the pore diameters in the walls of the hollow fibre are between 66 μm to 81 μm.
595. A hollow fibre of any of the preceding composition embodiments, wherein the pore diameters in the walls of the hollow fibre are between 46 μm to 86 μm.
596. A hollow fibre of any of the preceding composition embodiments, wherein the pore diameters in the walls of the hollow fibre are between 6 μm to 81 μm.
597. A hollow fibre of any of the preceding composition embodiments, wherein the pore diameters in the walls of the hollow fibre are between 31 μm to 66 μm.
598. A hollow fibre of any of the preceding composition embodiments, wherein the pore diameters in the walls of the hollow fibre are between 36 μm to 46 μm.
599. A hollow fibre of any of the preceding composition embodiments, wherein the pore diameters in the walls of the hollow fibre are between 16 μm to 56 μm.
600. A hollow fibre of any of the preceding composition embodiments, wherein the pore diameters in the walls of the hollow fibre are between 31 μm to 41 μm.
601. A hollow fibre of any of the preceding composition embodiments, wherein the pore diameters in the walls of the hollow fibre are between 11 μm to 96 μm.
602. A hollow fibre of any of the preceding composition embodiments, wherein the pore diameters in the walls of the hollow fibre are between 96 μm to 101 μm.
603. A hollow fibre of any of the preceding composition embodiments, wherein the pore diameters in the walls of the hollow fibre are between 6 μm to 41 μm.
604. A hollow fibre of any of the preceding composition embodiments, wherein the pore diameters in the walls of the hollow fibre are between 16 μm to 51 μm.
605. A hollow fibre of any of the preceding composition embodiments, wherein the pore diameters in the walls of the hollow fibre are between 91 μm to 96 μm.
606. A hollow fibre of any of the preceding composition embodiments, wherein the pore diameters in the walls of the hollow fibre are between 86 μm to 96 μm.
607. A hollow fibre of any of the preceding composition embodiments, wherein the pore diameters in the walls of the hollow fibre are between 56 μm to 86 μm.
608. A hollow fibre of any of the preceding composition embodiments, wherein the pore diameters in the walls of the hollow fibre are between 31 μm to 96 μm.
609. A hollow fibre of any of the preceding composition embodiments, wherein the pore diameters in the walls of the hollow fibre are between 6 μm to 26 μm.
610. A hollow fibre of any of the preceding composition embodiments, wherein the pore diameters in the walls of the hollow fibre are between 46 μm to 101 μm.
611. A hollow fibre of any of the preceding composition embodiments, wherein the pore diameters in the walls of the hollow fibre are between 31 μm to 46 μm.
612. A hollow fibre of any of the preceding composition embodiments, wherein the pore diameters in the walls of the hollow fibre are between 41 μm to 86 μm.
613. A hollow fibre of any of the preceding composition embodiments, wherein the pore diameters in the walls of the hollow fibre are between 41 μm to 56 μm.
614. A hollow fibre of any of the preceding composition embodiments, wherein the pore diameters in the walls of the hollow fibre are between 21 μm to 76 μm.
615. A hollow fibre of any of the preceding composition embodiments, wherein the pore diameters in the walls of the hollow fibre are between 46 μm to 76 μm.

616. A hollow fibre of any of the preceding composition embodiments, wherein the pore diameters in the walls of the hollow fibre are between 56 μm to 101 μm.
617. A hollow fibre of any of the preceding composition embodiments, wherein the pore diameters in the walls of the hollow fibre are between 36 μm to 56 μm.
618. A hollow fibre of any of the preceding composition embodiments, wherein the pore diameters in the walls of the hollow fibre are between 21 μm to 41 μm.
619. A hollow fibre of any of the preceding composition embodiments, wherein the pore diameters in the walls of the hollow fibre are between 21 μm to 46 μm.
620. A hollow fibre of any of the preceding composition embodiments, wherein the pore diameters in the walls of the hollow fibre are between 21 μm to 96 μm.
621. A hollow fibre of any of the preceding composition embodiments, wherein the pore diameters in the walls of the hollow fibre are between 21 μm to 81 μm.
622. A hollow fibre of any of the preceding composition embodiments, wherein the pore diameters in the walls of the hollow fibre are between 26 μm to 96 μm.
623. A hollow fibre of any of the preceding composition embodiments, wherein the pore diameters in the walls of the hollow fibre are between 61 μm to 86 μm.
624. A hollow fibre of any of the preceding composition embodiments, wherein the pore diameters in the walls of the hollow fibre are between 11 μm to 21 μm.
625. A hollow fibre of any of the preceding composition embodiments, wherein the pore diameters in the walls of the hollow fibre are between 86 μm to 101 μm.
626. A hollow fibre of any of the preceding composition embodiments, wherein the pore diameters in the walls of the hollow fibre are between 16 μm to 101 μm.
627. A hollow fibre of any of the preceding composition embodiments, wherein the pore diameters in the walls of the hollow fibre are between 36 μm to 41 μm.
628. A hollow fibre of any of the preceding composition embodiments, wherein the pore diameters in the walls of the hollow fibre are between 61 μm to 76 μm.
629. A hollow fibre of any of the preceding composition embodiments, wherein the pore diameters in the walls of the hollow fibre are between 26 μm to 101 μm.
630. A hollow fibre of any of the preceding composition embodiments, wherein the pore diameters in the walls of the hollow fibre are between 51 μm to 76 μm.
631. A hollow fibre of any of the preceding composition embodiments, wherein the pore diameters in the walls of the hollow fibre are between 41 μm to 76 μm.
632. A hollow fibre of any of the preceding composition embodiments, wherein the pore diameters in the walls of the hollow fibre are between 76 μm to 91 μm.
633. A hollow fibre of any of the preceding composition embodiments, wherein the pore diameters in the walls of the hollow fibre are between 11 μm to 81 μm.
634. A hollow fibre of any of the preceding composition embodiments, wherein the pore diameters in the walls of the hollow fibre are between 61 μm to 96 μm.
635. A hollow fibre of any of the preceding composition embodiments, wherein the pore diameters in the walls of the hollow fibre are between 11 μm to 76 μm.
636. A hollow fibre of any of the preceding composition embodiments, wherein the pore diameters in the walls of the hollow fibre are between 41 μm to 91 μm.
637. A hollow fibre of any of the preceding composition embodiments, wherein the pore diameters in the walls of the hollow fibre are between 51 μm to 61 μm.
638. A hollow fibre of any of the preceding composition embodiments, wherein the pore diameters in the walls of the hollow fibre are between 6 μm to 56 μm.
639. A hollow fibre of any of the preceding composition embodiments, wherein the pore diameters in the walls of the hollow fibre are between 46 μm to 61 μm.
640. A hollow fibre of any of the preceding composition embodiments, wherein the pore diameters in the walls of the hollow fibre are between 71 μm to 91 μm.
641. A hollow fibre of any of the preceding composition embodiments, wherein the pore diameters in the walls of the hollow fibre are between 36 μm to 81 μm.
642. A hollow fibre of any of the preceding composition embodiments, wherein the pore diameters in the walls of the hollow fibre are between 16 μm to 66 μm.
643. A hollow fibre of any of the preceding composition embodiments, wherein the pore diameters in the walls of the hollow fibre are between 91 μm to 101 μm.
644. A hollow fibre of any of the preceding composition embodiments, wherein the pore diameters in the walls of the hollow fibre are between 31 μm to 71 μm.
645. A hollow fibre of any of the preceding composition embodiments, wherein the pore diameters in the walls of the hollow fibre are between 31 μm to 81 μm.
646. A hollow fibre of any of the preceding composition embodiments, wherein the pore diameters in the walls of the hollow fibre are between 51 μm to 96 μm.
647. A hollow fibre of any of the preceding composition embodiments, wherein the pore diameters in the walls of the hollow fibre are between 31 μm to 91 μm.
648. A hollow fibre of any of the preceding composition embodiments, wherein the pore diameters in the walls of the hollow fibre are between 66 μm to 101 μm.
649. A hollow fibre of any of the preceding composition embodiments, wherein the pore diameters in the walls of the hollow fibre are between 51 μm to 101 μm.
650. A hollow fibre of any of the preceding composition embodiments, wherein the pore diameters in the walls of the hollow fibre are between 16 μm to 46 μm.
651. A hollow fibre of any of the preceding composition embodiments, wherein the pore diameters in the walls of the hollow fibre are between 6 μm to 61 μm.
652. A hollow fibre of any of the preceding composition embodiments, wherein the pore diameters in the walls of the hollow fibre are between 26 μm to 56 μm.
653. A hollow fibre of any of the preceding composition embodiments, wherein the pore diameters in the walls of the hollow fibre are between 46 μm to 96 μm.
654. A hollow fibre of any of the preceding composition embodiments, wherein the pore diameters in the walls of the hollow fibre are between 71 μm to 96 μm.
655. A hollow fibre of any of the preceding composition embodiments, wherein the pore diameters in the walls of the hollow fibre are between 1 μm to 6 μm.
656. A hollow fibre of any of the preceding composition embodiments, wherein the pore diameters in the walls of the hollow fibre are between 66 μm to 96 μm.
657. A hollow fibre of any of the preceding composition embodiments, wherein the pore diameters in the walls of the hollow fibre are between 31 μm to 36 μm.
658. A hollow fibre of any of the preceding composition embodiments, wherein the pore diameters in the walls of the hollow fibre are between 46 μm to 71 μm.
659. A hollow fibre of any of the preceding composition embodiments, wherein the pore diameters in the walls of the hollow fibre are between 16 μm to 21 μm.

660. A hollow fibre of any of the preceding composition embodiments, wherein the pore diameters in the walls of the hollow fibre are between 21 µm to 71 µm.
661. A hollow fibre of any of the preceding composition embodiments, wherein the pore diameters in the walls of the hollow fibre are between 6 µm to 16 µm.
662. A hollow fibre of any of the preceding composition embodiments, wherein the pore diameters in the walls of the hollow fibre are between 71 µm to 86 µm.
663. A hollow fibre of any of the preceding composition embodiments, wherein the pore diameters in the walls of the hollow fibre are between 6 µm to 101 µm.
664. A hollow fibre of any of the preceding composition embodiments, wherein the pore diameters in the walls of the hollow fibre are between 71 µm to 81 µm.
665. A hollow fibre of any of the preceding composition embodiments, wherein the pore diameters in the walls of the hollow fibre are between 41 µm to 51 µm.
666. A hollow fibre of any of the preceding composition embodiments, wherein the pore diameters in the walls of the hollow fibre are between 36 µm to 96 µm.
667. A hollow fibre of any of the preceding composition embodiments, wherein the pore diameters in the walls of the hollow fibre are between 86 µm to 91 µm.
668. A hollow fibre of any of the preceding composition embodiments, wherein the pore diameters in the walls of the hollow fibre are between 41 µm to 96 µm.
669. A hollow fibre of any of the preceding composition embodiments, wherein the pore diameters in the walls of the hollow fibre are between 36 µm to 71 µm.
670. A hollow fibre of any of the preceding composition embodiments, wherein the pore diameters in the walls of the hollow fibre are between 26 µm to 66 µm.
671. A hollow fibre of any of the preceding composition embodiments, wherein the MWCO of the hollow fibre is between 5 kDa to 100 kDa.
672. A hollow fibre of any of the preceding composition embodiments, wherein the MWCO of the hollow fibre is between 5 kDa to 7 kDa.
673. A hollow fibre of any of the preceding composition embodiments, wherein the MWCO of the hollow fibre is between 7 kDa and 10 kDa.
674. A hollow fibre of any of the preceding composition embodiments, wherein the MWCO of the hollow fibre is between 10 kDa and 20 kDa.
675. A hollow fibre of any of the preceding composition embodiments, wherein the MWCO of the hollow fibre is between 20 kDa and 30 kDa.
676. A hollow fibre of any of the preceding composition embodiments, wherein the trans-wall pure water permeability (PWP) of the hollow fibre is between 10 L/(m² h bar) and 1,000 L/(m² h bar).
677. A hollow fibre of any of the preceding composition embodiments, wherein the trans-wall pure water permeability (PWP) of the hollow fibre is between 10 L/(m² h bar) to 200 L/(m² h bar).
678. A hollow fibre of any of the preceding composition embodiments, wherein the trans-wall pure water permeability (PWP) of the hollow fibre is between 0.5 L/(m² h bar) to 30 L/(m² h bar).
679. A hollow fibre of any of the preceding composition embodiments, wherein the particle rejection size (PRS) of the hollow fibre is between 0.1 to 100 µm.
680. A hollow fibre of any of the preceding composition embodiments, wherein the particle rejection size (PRS) of the hollow fibre is at least 100 µm.
681. A hollow fibre of any of the preceding composition embodiments, wherein the particle rejection size (PRS) of the hollow fibre is at least 50 µm.
682. A hollow fibre of any of the preceding composition embodiments, wherein the particle rejection size (PRS) of the hollow fibre is at least 25 µm.
683. A hollow fibre of any of the preceding composition embodiments, wherein the particle rejection size (PRS) of the hollow fibre is at least 10 µm.
684. A hollow fibre of any of the preceding composition embodiments, wherein the particle rejection size (PRS) of the hollow fibre is at least 5 µm.
685. A hollow fibre of any of the preceding composition embodiments, wherein the particle rejection size (PRS) of the hollow fibre is at least 2.5 µm.
686. A hollow fibre of any of the preceding composition embodiments, wherein the particle rejection size (PRS) of the hollow fibre is at least 1 µm.
687. A hollow fibre of any of the preceding composition embodiments, wherein the particle rejection size (PRS) of the hollow fibre is at least 0.5 µm.
688. A hollow fibre of any of the preceding composition embodiments, wherein the particle rejection size (PRS) of the hollow fibre is at least 0.1 µm.
689. A hollow fibre of any of the preceding composition embodiments, wherein the particle rejection size (PRS) of the hollow fibre is 1 µm to 5 µm, 690. A hollow fibre of any of the preceding composition embodiments, wherein the particle rejection size (PRS) of the hollow fibre is 5 µm to 10 µm.
691. A hollow fibre of any of the preceding composition embodiments, wherein the particle rejection size (PRS) of the hollow fibre is 10 µm to 15 µm.
692. A hollow fibre of any of the preceding composition embodiments, wherein the particle rejection size (PRS) of the hollow fibre is 15 µm to 20 µm.
693. A hollow fibre of any of the preceding composition embodiments, wherein the particle rejection size (PRS) of the hollow fibre is 20 µm to 25 µm.
694. A hollow fibre of any of the preceding composition embodiments, wherein the particle rejection size (PRS) of the hollow fibre is 25 µm to 30 µm.
695. A hollow fibre of any of the preceding composition embodiments, wherein the particle rejection size (PRS) of the hollow fibre is 30 µm to 35 µm.
696. A hollow fibre of any of the preceding composition embodiments, wherein the particle rejection size (PRS) of the hollow fibre is 35 µm to 40 µm.
697. A hollow fibre of any of the preceding composition embodiments, wherein the particle rejection size (PRS) of the hollow fibre is 40 µm to 45 µm.
698. A hollow fibre of any of the preceding composition embodiments, wherein the particle rejection size (PRS) of the hollow fibre is 45 µm to 50 µm.
699. A hollow fibre of any of the preceding composition embodiments, wherein the particle rejection size (PRS) of the hollow fibre is 50 µm to 55 µm.
700. A hollow fibre of any of the preceding composition embodiments, wherein the particle rejection size (PRS) of the hollow fibre is 55 µm to 60 µm.
701. A hollow fibre of any of the preceding composition embodiments, wherein the particle rejection size (PRS) of the hollow fibre is 60 µm to 65 µm.
702. A hollow fibre of any of the preceding composition embodiments, wherein the particle rejection size (PRS) of the hollow fibre is 65 µm to 70 µm.

703. A hollow fibre of any of the preceding composition embodiments, wherein the particle rejection size (PRS) of the hollow fibre is 70 μm to 75 μm.
704. A hollow fibre of any of the preceding composition embodiments, wherein the particle rejection size (PRS) of the hollow fibre is 75 μm to 80 μm.
705. A hollow fibre of any of the preceding composition embodiments, wherein the particle rejection size (PRS) of the hollow fibre is 80 μm to 85 μm.
706. A hollow fibre of any of the preceding composition embodiments, wherein the particle rejection size (PRS) of the hollow fibre is 85 μm to 90 μm.
707. A hollow fibre of any of the preceding composition embodiments, wherein the particle rejection size (PRS) of the hollow fibre is 90 μm to 95 μm.
708. A hollow fibre of any of the preceding composition embodiments, wherein the particle rejection size (PRS) of the hollow fibre is 95 μm to 100 μm.
709. A hollow fibre of any of the preceding composition embodiments, wherein the hollow fibre comprises one type of polypeptide.
710. A hollow fibre of any of the preceding composition embodiments, wherein the hollow fibre comprises more than one type of polypeptide.
711. A regular semi-crystalline polymer comprising ester, thioester and/or amide crosslinked polypeptides with a beta-sheet secondary structure comprising polypeptides derived from a single source.
712. A regular semi-crystalline polymer comprising ester, thioester and/or amide crosslinked polypeptides with a beta-sheet secondary structure comprising polypeptides derived from multiple sources.
713. A Prokitein alloy, comprising, a regular semi-crystalline polymer comprising ester, thioester and/or amide crosslinked polypeptides with a beta-sheet secondary structure comprising polypeptides derived from multiple sources.
714. A Prokitein of the preceding composition embodiments, wherein the Prokitein comprises polypeptides derived from a single source.
715. A Prokitein of the preceding composition embodiments, wherein the Prokitein comprises polypeptides derived from multiple sources.
716. A Prokitein alloy of the preceding composition embodiments, wherein the Prokitein alloy comprises Prokitein.
717. A Prokitein of the preceding composition embodiments, wherein the Prokitein comprises Prokitein alloys.
718. A Prokitein of the preceding composition embodiments, wherein the Prokitein comprises polypeptides derived from one source.
719. A Prokitein of the preceding composition embodiments, wherein the Prokitein comprises polypeptides derived from two source.
720. A Prokitein of the preceding composition embodiments, wherein the Prokitein comprises polypeptides derived from three source.
721. A Prokitein of the preceding composition embodiments, wherein the Prokitein comprises polypeptides derived from four source.
722. A Prokitein of the preceding composition embodiments, wherein the Prokitein comprises polypeptides derived from five source.
723. A Prokitein of the preceding composition embodiments, wherein the Prokitein comprises polypeptides derived from six source.
724. A Prokitein of the preceding composition embodiments, wherein the Prokitein comprises polypeptides derived from more than six sources.
725. A hollow fibre of any of the preceding composition embodiments, wherein the polypeptides of the hollow fibre are partially covalently-crosslinked, substantially covalently-crosslinked or entirely covalently-crosslinked.
726. A hollow fibre of any of the preceding composition embodiments, wherein the polypeptides of the hollow fibre are partially covalently-crosslinked.
727. A hollow fibre of any of the preceding composition embodiments, wherein the polypeptides of the hollow fibre are substantially covalently-crosslinked.
728. A hollow fibre of any of the preceding composition embodiments, wherein the polypeptides of the hollow fibre are entirely covalently-crosslinked.
729. A hollow fibre of any of the preceding composition embodiments, wherein at least 10% (by weight) of the polypeptides of the hollow fibre are covalently-crosslinked.
730. A hollow fibre of any of the preceding composition embodiments, wherein at least 20% (by weight) of the polypeptides of the hollow fibre are covalently-crosslinked.
731. A hollow fibre of any of the preceding composition embodiments, wherein at least 30% (by weight) of the polypeptides of the hollow fibre are covalently-crosslinked.
732. A hollow fibre of any of the preceding composition embodiments, wherein at least 40% (by weight) of the polypeptides of the hollow fibre are covalently-crosslinked.
733. A hollow fibre of any of the preceding composition embodiments, wherein at least 50% (by weight) of the polypeptides of the hollow fibre are covalently-crosslinked.
734. A hollow fibre of any of the preceding composition embodiments, wherein at least 60% (by weight) of the polypeptides of the hollow fibre are covalently-crosslinked.
735. A hollow fibre of any of the preceding composition embodiments, wherein at least 70% (by weight) of the polypeptides of the hollow fibre are covalently-crosslinked.
736. A hollow fibre of any of the preceding composition embodiments, wherein at least 80% (by weight) of the polypeptides of the hollow fibre are covalently-crosslinked.
737. A hollow fibre of any of the preceding composition embodiments, wherein at least 90% (by weight) of the polypeptides of the hollow fibre are covalently-crosslinked.
738. A hollow fibre of any of the preceding composition embodiments, wherein at least 95% (by weight) of the polypeptides of the hollow fibre are covalently-crosslinked.
739. A hollow fibre of any of the preceding composition embodiments, wherein at least 99% (by weight) of the polypeptides of the hollow fibre are covalently-crosslinked.
740. A hollow fibre of any of the preceding composition embodiments, wherein at least 99.99% (by weight) of the polypeptides of the hollow fibre are covalently-crosslinked.

741. A Prokitein of the preceding composition embodiments, wherein the crystallinity of the Prokitein is higher than 0%.
742. A Prokitein of the preceding composition embodiments, wherein the crystallinity of the Prokitein is higher than 5%.
743. A Prokitein of the preceding composition embodiments, wherein the crystallinity of the Prokitein is higher than 10%.
744. A Prokitein of the preceding composition embodiments, wherein the crystallinity of the Prokitein is higher than 20%.
745. A Prokitein of the preceding composition embodiments, wherein the crystallinity of the Prokitein is higher than 30%.
746. A Prokitein of the preceding composition embodiments, wherein the crystallinity of the Prokitein is higher than 40%.
747. A Prokitein of the preceding composition embodiments, wherein the crystallinity of the Prokitein is higher than 50%.
748. A Prokitein of the preceding composition embodiments, wherein the crystallinity of the Prokitein is higher than 60%.
749. A Prokitein of the preceding composition embodiments, wherein the crystallinity of the Prokitein is higher than 70%.
750. A Prokitein of the preceding composition embodiments, wherein the crystallinity of the Prokitein is higher than 80%.
751. A Prokitein of the preceding composition embodiments, wherein the crystallinity of the Prokitein is higher than 90%.
752. A Prokitein of the preceding composition embodiments, wherein the crystallinity of the Prokitein is higher than 95%.
753. A hollow fibre of any of the preceding composition embodiments, wherein the hollow fibre comprises polysaccharides.
754. A hollow fibre of any of the preceding composition embodiments, wherein the hollow fibre comprises polysaccharides present in a mass ratio that is within the range of 1% to 10000% (weight per weight of polypeptide).
755. A hollow fibre of any of the preceding composition embodiments, wherein the hollow fibre comprises lipids.
756. A hollow fibre of any of the preceding composition embodiments, wherein the hollow fibre comprises lipids present in a mass ratio that is within the range of 1% to 10000% (weight per weight of polypeptide).
757. A hollow fibre of any of the preceding composition embodiments, wherein the hollow fibre comprises polyols.
758. A hollow fibre of any of the preceding composition embodiments, wherein the hollow fibre comprises polyols present in a mass ratio that is within the range of 1% to 10000% (weight per weight of polypeptide).
759. A hollow fibre of any of the preceding composition embodiments, wherein the hollow fibre comprises lipids and polyols.
760. A hollow fibre of any of the preceding composition embodiments, wherein the hollow fibre comprises lipids and polyols present in a mass ratio that is within the range of 1% to 10000% (weight per weight of polypeptide).
761. A hollow fibre of any of the preceding composition embodiments, wherein the hollow fibre comprises polysaccharides and polyols.
762. A hollow fibre of any of the preceding composition embodiments, wherein the hollow fibre comprises polysaccharides and polyols present in a mass ratio that is within the range of 1% to 10000% (weight per weight of polypeptide).
763. A hollow fibre of any of the preceding composition embodiments, wherein the hollow fibre comprises polysaccharides and lipids.
764. A hollow fibre of any of the preceding composition embodiments, wherein the hollow fibre comprises polysaccharides and lipids present in a mass ratio that is within the range of 1% to 10000% (weight per weight of polypeptide).
765. A hollow fibre of any of the preceding composition embodiments, wherein the hollow fibre comprises polysaccharides, lipids, and/or polyols.
766. A hollow fibre of any of the preceding composition embodiments, wherein the hollow fibre comprises polysaccharides, lipids, and/or polyols present in a mass ratio that is within the range of 1% to 10000% (weight per weight of polypeptide).
767. A Prokitein of the preceding composition embodiments, wherein the Prokitein comprises polysaccharides, lipids, polyols, and/or any combination thereof.
768. A Prokitein of the preceding composition embodiments, wherein the Prokitein comprises polysaccharides.
769. A Prokitein of the preceding composition embodiments, wherein the Prokitein comprises lipids.
770. A Prokitein of the preceding composition embodiments, wherein the Prokitein comprises polyols.
771. A Prokitein of the preceding composition embodiments, wherein the Prokitein comprises polysaccharides and lipids.
772. A Prokitein of the preceding composition embodiments, wherein the Prokitein comprises lipids and polyols.
773. A Prokitein of the preceding composition embodiments, wherein the Prokitein comprises polysaccharides and polyols.
774. A Prokitein of the preceding composition embodiments, wherein the Prokitein comprises polysaccharides, lipids, and polyols.
775. A hollow fibre of any of the preceding composition embodiments, wherein the polycarboxylic acids with more than one carboxyl groups form crosslinks in the hollow fibre.
776. A hollow fibre of any of the preceding composition embodiments, wherein the polycarboxylic acids with more than two carboxyl groups form crosslinks in the hollow fibre.
777. A hollow fibre of any of the preceding composition embodiments, wherein the polycarboxylic acids with more than two carboxyl groups form inter-polypeptide and/or intra-polypeptide covalent ester, thioester or amide crosslinks in the hollow fibre.
778. A hollow fibre of any of the preceding composition embodiments, wherein the hollow fibre remains mechanically stable whilst submerged in an aqueous solution for at least 24 hours.
779. A hollow fibre of any of the preceding composition embodiments, wherein the hollow fibre remains mechanically stable whilst submerged in an aqueous solution for at least 48 hours.

780. A hollow fibre of any of the preceding composition embodiments, wherein the hollow fibre remains mechanically stable whilst submerged in an aqueous solution for at least 72 hours.
781. A hollow fibre of any of the preceding composition embodiments, wherein the hollow fibre remains mechanically stable whilst submerged in an aqueous solution for at least 5 days.
782. A hollow fibre of any of the preceding composition embodiments, wherein the hollow fibre remains mechanically stable whilst submerged in an aqueous solution for at least 10 days.
783. A hollow fibre of any of the preceding composition embodiments, wherein the hollow fibre remains mechanically stable whilst submerged in an aqueous solution for at least 15 days.
784. A hollow fibre of any of the preceding composition embodiments, wherein the hollow fibre remains mechanically stable whilst submerged in an aqueous solution for at least 30 days.
785. A hollow fibre of any of the preceding composition embodiments, wherein the hollow fibre maintains good structural properties after being submerged in an aqueous solution for at least 24 hours.
786. A hollow fibre of any of the preceding composition embodiments, wherein the hollow fibre maintains good structural properties after being submerged in an aqueous solution for at least 48 hours.
787. A hollow fibre of any of the preceding composition embodiments, wherein the hollow fibre maintains good structural properties after being submerged in an aqueous solution for at least 72 hours.
788. A hollow fibre of any of the preceding composition embodiments, wherein the hollow fibre maintains good structural properties after being submerged in an aqueous solution for at least 5 days.
789. A hollow fibre of any of the preceding composition embodiments, wherein the hollow fibre maintains good structural properties after being submerged in an aqueous solution for at least 10 days.
790. A hollow fibre of any of the preceding composition embodiments, wherein the hollow fibre maintains good structural properties after being submerged in an aqueous solution for at least 15 days.
791. A hollow fibre of any of the preceding composition embodiments, wherein the hollow fibre maintains good structural properties after being submerged in an aqueous solution for at least 30 days.
792. A hollow fibre of any of the preceding composition embodiments, wherein the hollow fibre maintains good fluid transport properties after being submerged in an aqueous solution for at least 24 hours.
793. A hollow fibre of any of the preceding composition embodiments, wherein the hollow fibre maintains good mass transport properties after being submerged in an aqueous solution for at least 48 hours.
794. A hollow fibre of any of the preceding composition embodiments, wherein the hollow fibre maintains good fluid transport properties after being submerged in an aqueous solution for at least 72 hours.
795. A hollow fibre of any of the preceding composition embodiments, wherein the hollow fibre maintains good fluid transport properties after being submerged in an aqueous solution for at least 5 days.
796. A hollow fibre of any of the preceding composition embodiments, wherein the hollow fibre maintains good fluid transport properties after being submerged in an aqueous solution for at least 10 days.
797. A hollow fibre of any of the preceding composition embodiments, wherein the hollow fibre maintains good fluid transport properties after being submerged in an aqueous solution for at least 15 days.
798. A hollow fibre of any of the preceding composition embodiments, wherein the hollow fibre maintains good fluid transport properties after being submerged in an aqueous solution for at least 30 days.
799. A hollow fibre of any of the preceding composition embodiments, wherein the hollow fibre maintains good mass transport properties after being submerged in an aqueous solution for at least 24 hours.
800. A hollow fibre of any of the preceding composition embodiments, wherein the hollow fibre maintains good mass transport properties after being submerged in an aqueous solution for at least 48 hours.
801. A hollow fibre of any of the preceding composition embodiments, wherein the hollow fibre maintains good mass transport properties after being submerged in an aqueous solution for at least 72 hours.
802. A hollow fibre of any of the preceding composition embodiments, wherein the hollow fibre maintains good mass transport properties after being submerged in an aqueous solution for at least 5 days.
803. A hollow fibre of any of the preceding composition embodiments, wherein the hollow fibre maintains good mass transport properties after being submerged in an aqueous solution for at least 10 days.
804. A hollow fibre of any of the preceding composition embodiments, wherein the hollow fibre maintains good mass transport properties after being submerged in an aqueous solution for at least 15 days.
805. A hollow fibre of any of the preceding composition embodiments, wherein the hollow fibre maintains good mass transport properties after being submerged in an aqueous solution for at least 30 days.
806. A hollow fibre of any of the preceding composition embodiments, wherein the hollow fibre has a symmetric (isotropic) cross-sectional structure.
807. A hollow fibre of any of the preceding composition embodiments, wherein the hollow fibre has a (ii) asymmetric (non-symmetric) (anisotropic) cross-sectional structure.
808. A hollow fibre of any of the preceding composition embodiments, wherein the hollow fibre has a cross-sectional structure that is not constant.
809. A hollow fibre of any of the preceding composition embodiments, wherein the hollow fibre is symmetric, asymmetric or non-symmetric.
810. A hollow fibre of any of the preceding composition embodiments, wherein the hollow fibre is symmetric.
811. A hollow fibre of any of the preceding composition embodiments, wherein the hollow fibre is asymmetric.
812. A hollow fibre of any of the preceding composition embodiments, wherein the hollow fibre is non-symmetric.
813. A composition comprising a plurality of hollow fibres of any of the preceding composition embodiments, wherein said plurality of hollow fibres comprises (i) a plurality of fibres having pore sizes that are within the range of 1 μm to 15 μm; and (ii) a plurality of fibres having pore sizes that are within the range of 1 nm to 10 nm.
814. A composition comprising a plurality of hollow fibres of any of the preceding composition embodiments, wherein the hollow fibres are macroporous, mesoporous, nanoporous, or any combination thereof.
815. A composition comprising a plurality of hollow fibres of any of the preceding composition embodiments, wherein the hollow fibres are symmetric, asymmetric, non-symmetric, or any combination thereof.
816. A composition comprising a plurality of hollow fibres of any of the preceding composition embodiments, wherein the hollow fibres are symmetric.
817. A composition comprising a plurality of hollow fibres of any of the preceding composition embodiments, wherein the hollow fibres are asymmetric.
818. A composition comprising a plurality of hollow fibres of any of the preceding composition embodiments, wherein the hollow fibres are non-symmetric.
819. A composition comprising a plurality of hollow fibres of any of the preceding composition embodiments, wherein the composition comprises combination of symmetric, asymmetric, and/or non-symmetric hollow fibres.
820. A hollow fibre of any of the preceding composition embodiments, wherein the hollow fibre is an asymmetric hollow fibre and comprises either: (i) a composite of two materials (asymmetric composite); or (ii) is of the same material (asymmetric integrally-skinned).
821. A composition comprising a plurality of hollow fibres of any of the preceding composition embodiments wherein which comprises a mixture or at least one of:
  (i) a plurality of fibres which are symmetric;
  (ii) a plurality of fibres which are asymmetric composites; and/or
  (iii) a plurality of fibres which are asymmetrically integrally skinned, to form a bundle of fibres.
822. A hollow fibre of any of the preceding composition embodiments, wherein the hollow fibre is an asymmetric hollow fibre and comprises either: (i) a composite of two materials (asymmetric composite); or (ii) is of the same material (asymmetric integrally-skinned).
823. A composition and/or hollow fibre of any of the preceding composition embodiments, wherein the composition and/or hollow fibre are edible.
824. A composition and/or hollow fibre of the disclosed composition embodiments, wherein the composition and/or hollow fibre are suitable for human and/or animal ingestion.
825. A composition and/or hollow fibre of the disclosed composition embodiments, wherein the composition and/or hollow fibre are GRAS
826. A composition and/or hollow fibre of the disclosed composition embodiments, wherein the composition and/or hollow fibre are made from components that are GRAS.
827. A composition and/or hollow fibre of the disclosed composition embodiments, wherein the composition and/or hollow fibre are palatable.
828. A composition and/or hollow fibre of any of the preceding composition embodiments, wherein the composition and/or hollow fibre are part of a food product.
829. A composition and/or hollow fibre of any of the preceding composition embodiments, wherein the composition and/or hollow fibre are biodegradable.
830. A composition and/or hollow fibre of any of the preceding composition embodiments, wherein the composition and/or hollow fibre are non-cytotoxic.
831. The hollow fibre of any of the preceding composition embodiments, wherein the outer surface of the hollow fibre of this disclosure is capable of acting as a substrate for the adherence and growth of cells.
832. The hollow fibre of any of the preceding composition embodiments, wherein the inner surface of the hollow fibre of this disclosure is capable of acting as a substrate for the adherence and growth of cells.
833. The hollow fibre of any of the preceding composition embodiments, wherein the outer and inner surfaces of the hollow fibres of this disclosure are capable of acting as a substrate for the adherence and growth of cells.
834. The hollow fibre of any of the preceding composition embodiments, wherein the hollow fibre is able to sustain a cell culture for at least 1 day.
835. The hollow fibre of any of the preceding composition embodiments, wherein the hollow fibre is able to sustain a cell culture for at least 3 days.
836. The hollow fibre of any of the preceding composition embodiments, wherein the hollow fibre is able to sustain a cell culture for at least 5 days.
837. The hollow fibre of any of the preceding composition embodiments, wherein the hollow fibre is able to sustain a cell culture for at least 10 days.
838. The hollow fibre of any of the preceding composition embodiments, wherein the hollow fibre is able to sustain a cell culture for at least 15 days.
839. The hollow fibre of any of the preceding composition embodiments, wherein the hollow fibre is able to sustain a cell culture for at least 30 days.
840. A hollow fibre any of the preceding embodiments, wherein the fibres are suitable for use as components in a bioreactor for cell culture.
841. A hollow fibre any of the preceding embodiments, wherein the fibres are suitable for use as components in a multimodal mechanically dynamic bioreactor for cell culture.

2.2 Cartridge and Bioreactor Embodiments

1. A bioreactor comprising one or more hollow fibres any of the preceding embodiments.
2. A cartridge for use in a bioreactor comprising hollow fibre of any of the preceding composition embodiments.
3. A cartridge any of the preceding embodiments, wherein the shortest distance between two adjacent hollow fibres is between 1 µm to 171 µm.
4. A cartridge any of the preceding embodiments, wherein the shortest distance between two adjacent hollow fibres is between 31 µm to 61 µm.
5. A cartridge any of the preceding embodiments, wherein the shortest distance between two adjacent hollow fibres is between 51 µm to 71 µm.
6. A cartridge any of the preceding embodiments, wherein the shortest distance between two adjacent hollow fibres is between 81 µm to 141 µm.
7. A cartridge any of the preceding embodiments, wherein the shortest distance between two adjacent hollow fibres is between 141 µm to 201 µm.
8. A cartridge any of the preceding embodiments, wherein the shortest distance between two adjacent hollow fibres is between 11 µm to 51 µm.
9. A cartridge any of the preceding embodiments, wherein the shortest distance between two adjacent hollow fibres is between 111 µm to 141 µm.

10. A cartridge any of the preceding embodiments, wherein the shortest distance between two adjacent hollow fibres is between 1 μm to 131 μm.
11. A cartridge any of the preceding embodiments, wherein the shortest distance between two adjacent hollow fibres is between 41 μm to 201 μm.
12. A cartridge any of the preceding embodiments, wherein the shortest distance between two adjacent hollow fibres is between 81 μm to 151 μm.
13. A cartridge any of the preceding embodiments, wherein the shortest distance between two adjacent hollow fibres is between 61 μm to 201 μm.
14. A cartridge any of the preceding embodiments, wherein the shortest distance between two adjacent hollow fibres is between 1 μm to 101 μm.
15. A cartridge any of the preceding embodiments, wherein the shortest distance between two adjacent hollow fibres is between 41 μm to 171 μm.
16. A cartridge any of the preceding embodiments, wherein the shortest distance between two adjacent hollow fibres is between 61 μm to 121 μm.
17. A cartridge any of the preceding embodiments, wherein the shortest distance between two adjacent hollow fibres is between 21 μm to 111 μm.
18. A cartridge any of the preceding embodiments, wherein the shortest distance between two adjacent hollow fibres is between 71 μm to 151 μm.
19. A cartridge any of the preceding embodiments, wherein the shortest distance between two adjacent hollow fibres is between 101 μm to 201 μm.
20. A cartridge any of the preceding embodiments, wherein the shortest distance between two adjacent hollow fibres is between 11 μm to 41 μm.
21. A cartridge any of the preceding embodiments, wherein the shortest distance between two adjacent hollow fibres is between 71 μm to 141 μm.
22. A cartridge any of the preceding embodiments, wherein the shortest distance between two adjacent hollow fibres is between 81 μm to 111 μm.
23. A cartridge any of the preceding embodiments, wherein the shortest distance between two adjacent hollow fibres is between 21 μm to 141 μm.
24. A cartridge any of the preceding embodiments, wherein the shortest distance between two adjacent hollow fibres is between 151 μm to 191 μm.
25. A cartridge any of the preceding embodiments, wherein the shortest distance between two adjacent hollow fibres is between 81 μm to 161 μm.
26. A cartridge any of the preceding embodiments, wherein the shortest distance between two adjacent hollow fibres is between 151 μm to 171 μm.
27. A cartridge any of the preceding embodiments, wherein the shortest distance between two adjacent hollow fibres is between 61 μm to 101 μm.
28. A cartridge any of the preceding embodiments, wherein the shortest distance between two adjacent hollow fibres is between 81 μm to 101 μm.
29. A cartridge any of the preceding embodiments, wherein the shortest distance between two adjacent hollow fibres is between 81 μm to 121 μm.
30. A cartridge any of the preceding embodiments, wherein the shortest distance between two adjacent hollow fibres is between 21 μm to 171 μm.
31. A cartridge any of the preceding embodiments, wherein the shortest distance between two adjacent hollow fibres is between 1 μm to 111 μm.
32. A cartridge any of the preceding embodiments, wherein the shortest distance between two adjacent hollow fibres is between 1 μm to 61 μm.
33. A cartridge any of the preceding embodiments, wherein the shortest distance between two adjacent hollow fibres is between 41 μm to 131 μm.
34. A cartridge any of the preceding embodiments, wherein the shortest distance between two adjacent hollow fibres is between 41 μm to 181 μm.
35. A cartridge any of the preceding embodiments, wherein the shortest distance between two adjacent hollow fibres is between 101 μm to 171 μm.
36. A cartridge any of the preceding embodiments, wherein the shortest distance between two adjacent hollow fibres is between 31 μm to 41 μm.
37. A cartridge any of the preceding embodiments, wherein the shortest distance between two adjacent hollow fibres is between 71 μm to 81 μm.
38. A cartridge any of the preceding embodiments, wherein the shortest distance between two adjacent hollow fibres is between 21 μm to 31 μm.
39. A cartridge any of the preceding embodiments, wherein the shortest distance between two adjacent hollow fibres is between 71 μm to 101 μm.
40. A cartridge any of the preceding embodiments, wherein the shortest distance between two adjacent hollow fibres is between 51 μm to 191 μm.
41. A cartridge any of the preceding embodiments, wherein the shortest distance between two adjacent hollow fibres is between 11 μm to 81 μm.
42. A cartridge any of the preceding embodiments, wherein the shortest distance between two adjacent hollow fibres is between 1 μm to 51 μm.
43. A cartridge any of the preceding embodiments, wherein the shortest distance between two adjacent hollow fibres is between 11 μm to 61 μm.
44. A cartridge any of the preceding embodiments, wherein the shortest distance between two adjacent hollow fibres is between 1 μm to 181 μm.
45. A cartridge any of the preceding embodiments, wherein the shortest distance between two adjacent hollow fibres is between 41 μm to 51 μm.
46. A cartridge any of the preceding embodiments, wherein the shortest distance between two adjacent hollow fibres is between 121 μm to 131 μm.
47. A cartridge any of the preceding embodiments, wherein the shortest distance between two adjacent hollow fibres is between 41 μm to 81 μm.
48. A cartridge any of the preceding embodiments, wherein the shortest distance between two adjacent hollow fibres is between 1 μm to 11 μm.
49. A cartridge any of the preceding embodiments, wherein the shortest distance between two adjacent hollow fibres is between 1 μm to 71 μm.
50. A cartridge any of the preceding embodiments, wherein the shortest distance between two adjacent hollow fibres is between 141 μm to 161 μm.
51. A cartridge any of the preceding embodiments, wherein the shortest distance between two adjacent hollow fibres is between 41 μm to 161 μm.
52. A cartridge any of the preceding embodiments, wherein the shortest distance between two adjacent hollow fibres is between 91 μm to 191 μm.
53. A cartridge any of the preceding embodiments, wherein the shortest distance between two adjacent hollow fibres is between 11 μm to 171 μm.

54. A cartridge any of the preceding embodiments, wherein the shortest distance between two adjacent hollow fibres is between 101 μm to 151 μm.

55. A cartridge any of the preceding embodiments, wherein the shortest distance between two adjacent hollow fibres is between 51 μm to 81 μm.

56. A cartridge any of the preceding embodiments, wherein the shortest distance between two adjacent hollow fibres is between 31 μm to 81 μm.

57. A cartridge any of the preceding embodiments, wherein the shortest distance between two adjacent hollow fibres is between 131 μm to 181 μm.

58. A cartridge any of the preceding embodiments, wherein the shortest distance between two adjacent hollow fibres is between 31 μm to 171 μm.

59. A cartridge any of the preceding embodiments, wherein the shortest distance between two adjacent hollow fibres is between 31 μm to 121 μm.

60. A cartridge any of the preceding embodiments, wherein the shortest distance between two adjacent hollow fibres is between 41 μm to 191 μm.

61. A cartridge any of the preceding embodiments, wherein the shortest distance between two adjacent hollow fibres is between 61 μm to 71 μm.

62. A cartridge any of the preceding embodiments, wherein the shortest distance between two adjacent hollow fibres is between 1 μm to 151 μm.

63. A cartridge any of the preceding embodiments, wherein the shortest distance between two adjacent hollow fibres is between 1 μm to 201 μm.

64. A cartridge any of the preceding embodiments, wherein the shortest distance between two adjacent hollow fibres is between 21 μm to 181 μm.

65. A cartridge any of the preceding embodiments, wherein the shortest distance between two adjacent hollow fibres is between 161 μm to 171 μm.

66. A cartridge any of the preceding embodiments, wherein the shortest distance between two adjacent hollow fibres is between 121 μm to 191 μm.

67. A cartridge any of the preceding embodiments, wherein the shortest distance between two adjacent hollow fibres is between 61 μm to 111 μm.

68. A cartridge any of the preceding embodiments, wherein the shortest distance between two adjacent hollow fibres is between 91 μm to 161 μm.

69. A cartridge any of the preceding embodiments, wherein the shortest distance between two adjacent hollow fibres is between 11 μm to 141 μm.

70. A cartridge any of the preceding embodiments, wherein the shortest distance between two adjacent hollow fibres is between 71 μm to 91 μm.

71. A cartridge any of the preceding embodiments, wherein the shortest distance between two adjacent hollow fibres is between 101 μm to 141 μm.

72. A cartridge any of the preceding embodiments, wherein the shortest distance between two adjacent hollow fibres is between 171 μm to 201 μm.

73. A cartridge any of the preceding embodiments, wherein the shortest distance between two adjacent hollow fibres is between 11 μm to 31 μm.

74. A cartridge any of the preceding embodiments, wherein the shortest distance between two adjacent hollow fibres is between 11 μm to 91 μm.

75. A cartridge any of the preceding embodiments, wherein the shortest distance between two adjacent hollow fibres is between 131 μm to 201 μm.

76. A cartridge any of the preceding embodiments, wherein the shortest distance between two adjacent hollow fibres is between 71 μm to 111 μm.

77. A cartridge any of the preceding embodiments, wherein the shortest distance between two adjacent hollow fibres is between 21 μm to 81 μm.

78. A cartridge any of the preceding embodiments, wherein the shortest distance between two adjacent hollow fibres is between 161 μm to 191 μm.

79. A cartridge any of the preceding embodiments, wherein the shortest distance between two adjacent hollow fibres is between 121 μm to 201 μm.

80. A cartridge any of the preceding embodiments, wherein the shortest distance between two adjacent hollow fibres is between 91 μm to 121 μm.

81. A cartridge any of the preceding embodiments, wherein the shortest distance between two adjacent hollow fibres is between 181 μm to 201 μm.

82. A cartridge any of the preceding embodiments, wherein the shortest distance between two adjacent hollow fibres is between 91 μm to 101 μm.

83. A cartridge any of the preceding embodiments, wherein the shortest distance between two adjacent hollow fibres is between 81 μm to 191 μm.

84. A cartridge any of the preceding embodiments, wherein the shortest distance between two adjacent hollow fibres is between 91 μm to 131 μm.

85. A cartridge any of the preceding embodiments, wherein the shortest distance between two adjacent hollow fibres is between 21 μm to 201 μm.

86. A cartridge any of the preceding embodiments, wherein the shortest distance between two adjacent hollow fibres is between 41 μm to 121 μm.

87. A cartridge any of the preceding embodiments, wherein the shortest distance between two adjacent hollow fibres is between 51 μm to 151 μm.

88. A cartridge any of the preceding embodiments, wherein the shortest distance between two adjacent hollow fibres is between 51 μm to 131 μm.

89. A cartridge any of the preceding embodiments, wherein the shortest distance between two adjacent hollow fibres is between 81 μm to 201 μm.

90. A cartridge any of the preceding embodiments, wherein the shortest distance between two adjacent hollow fibres is between 51 μm to 61 μm.

91. A cartridge any of the preceding embodiments, wherein the shortest distance between two adjacent hollow fibres is between 21 μm to 131 μm.

92. A cartridge any of the preceding embodiments, wherein the shortest distance between two adjacent hollow fibres is between 21 μm to 41 μm.

93. A cartridge any of the preceding embodiments, wherein the shortest distance between two adjacent hollow fibres is between 71 μm to 161 μm.

94. A cartridge any of the preceding embodiments, wherein the shortest distance between two adjacent hollow fibres is between 101 μm to 191 μm.

95. A cartridge any of the preceding embodiments, wherein the shortest distance between two adjacent hollow fibres is between 61 μm to 181 μm.

96. A cartridge any of the preceding embodiments, wherein the shortest distance between two adjacent hollow fibres is between 31 μm to 181 μm.

97. A cartridge any of the preceding embodiments, wherein the shortest distance between two adjacent hollow fibres is between 141 μm to 181 μm.

98. A cartridge any of the preceding embodiments, wherein the shortest distance between two adjacent hollow fibres is between 1 μm to 81 μm.

99. A cartridge any of the preceding embodiments, wherein the shortest distance between two adjacent hollow fibres is between 91 μm to 181 μm.

100. A cartridge any of the preceding embodiments, wherein the shortest distance between two adjacent hollow fibres is between 1 μm to 121 μm.

101. A cartridge any of the preceding embodiments, wherein the shortest distance between two adjacent hollow fibres is between 1 μm to 141 μm.

102. A cartridge any of the preceding embodiments, wherein the shortest distance between two adjacent hollow fibres is between 191 μm to 201 μm.

103. A cartridge any of the preceding embodiments, wherein the shortest distance between two adjacent hollow fibres is between 11 μm to 131 μm.

104. A cartridge any of the preceding embodiments, wherein the shortest distance between two adjacent hollow fibres is between 121 μm to 171 μm.

105. A cartridge any of the preceding embodiments, wherein the shortest distance between two adjacent hollow fibres is between 91 μm to 201 μm.

106. A cartridge any of the preceding embodiments, wherein the shortest distance between two adjacent hollow fibres is between 111 μm to 191 μm.

107. A cartridge any of the preceding embodiments, wherein the shortest distance between two adjacent hollow fibres is between 11 μm to 161 μm.

108. A cartridge any of the preceding embodiments, wherein the shortest distance between two adjacent hollow fibres is between 21 μm to 191 μm.

109. A cartridge any of the preceding embodiments, wherein the shortest distance between two adjacent hollow fibres is between 21 μm to 161 μm.

110. A cartridge any of the preceding embodiments, wherein the shortest distance between two adjacent hollow fibres is between 141 μm to 191 μm.

111. A cartridge any of the preceding embodiments, wherein the shortest distance between two adjacent hollow fibres is between 91 μm to 111 μm.

112. A cartridge any of the preceding embodiments, wherein the shortest distance between two adjacent hollow fibres is between 71 μm to 201 μm.

113. A cartridge any of the preceding embodiments, wherein the shortest distance between two adjacent hollow fibres is between 41 μm to 111 μm.

114. A cartridge any of the preceding embodiments, wherein the shortest distance between two adjacent hollow fibres is between 131 μm to 141 μm.

115. A cartridge any of the preceding embodiments, wherein the shortest distance between two adjacent hollow fibres is between 21 μm to 121 μm.

116. A cartridge any of the preceding embodiments, wherein the shortest distance between two adjacent hollow fibres is between 21 μm to 91 μm.

117. A cartridge any of the preceding embodiments, wherein the shortest distance between two adjacent hollow fibres is between 111 μm to 181 μm.

118. A cartridge any of the preceding embodiments, wherein the shortest distance between two adjacent hollow fibres is between 131 μm to 151 μm.

119. A cartridge any of the preceding embodiments, wherein the shortest distance between two adjacent hollow fibres is between 101 μm to 111 μm.

120. A cartridge any of the preceding embodiments, wherein the shortest distance between two adjacent hollow fibres is between 51 μm to 161 μm.

121. A cartridge any of the preceding embodiments, wherein the shortest distance between two adjacent hollow fibres is between 101 μm to 131 μm.

122. A cartridge any of the preceding embodiments, wherein the shortest distance between two adjacent hollow fibres is between 41 μm to 141 μm.

123. A cartridge any of the preceding embodiments, wherein the shortest distance between two adjacent hollow fibres is between 71 μm to 121 μm.

124. A cartridge any of the preceding embodiments, wherein the shortest distance between two adjacent hollow fibres is between 41 μm to 91 μm.

125. A cartridge any of the preceding embodiments, wherein the shortest distance between two adjacent hollow fibres is between 161 μm to 181 μm.

126. A cartridge any of the preceding embodiments, wherein the shortest distance between two adjacent hollow fibres is between 51 μm to 141 μm.

127. A cartridge any of the preceding embodiments, wherein the shortest distance between two adjacent hollow fibres is between 151 μm to 201 μm.

128. A cartridge any of the preceding embodiments, wherein the shortest distance between two adjacent hollow fibres is between 21 μm to 61 μm.

129. A cartridge any of the preceding embodiments, wherein the shortest distance between two adjacent hollow fibres is between 131 μm to 171 μm.

130. A cartridge any of the preceding embodiments, wherein the shortest distance between two adjacent hollow fibres is between 101 μm to 181 μm.

131. A cartridge any of the preceding embodiments, wherein the shortest distance between two adjacent hollow fibres is between 61 μm to 151 μm.

132. A cartridge any of the preceding embodiments, wherein the shortest distance between two adjacent hollow fibres is between 81 μm to 181 μm.

133. A cartridge any of the preceding embodiments, wherein the shortest distance between two adjacent hollow fibres is between 31 μm to 91 μm.

134. A cartridge any of the preceding embodiments, wherein the shortest distance between two adjacent hollow fibres is between 71 μm to 171 μm.

135. A cartridge any of the preceding embodiments, wherein the shortest distance between two adjacent hollow fibres is between 51 μm to 181 μm.

136. A cartridge any of the preceding embodiments, wherein the shortest distance between two adjacent hollow fibres is between 31 μm to 111 μm.

137. A cartridge any of the preceding embodiments, wherein the shortest distance between two adjacent hollow fibres is between 91 μm to 141 μm.

138. A cartridge any of the preceding embodiments, wherein the shortest distance between two adjacent hollow fibres is between 1 μm to 21 μm.

139. A cartridge any of the preceding embodiments, wherein the shortest distance between two adjacent hollow fibres is between 131 μm to 161 μm.

140. A cartridge any of the preceding embodiments, wherein the shortest distance between two adjacent hollow fibres is between 11 μm to 201 μm.

141. A cartridge any of the preceding embodiments, wherein the shortest distance between two adjacent hollow fibres is between 111 μm to 201 μm.

142. A cartridge any of the preceding embodiments, wherein the shortest distance between two adjacent hollow fibres is between 181 μm to 191 μm.
143. A cartridge any of the preceding embodiments, wherein the shortest distance between two adjacent hollow fibres is between 61 μm to 191 μm.
144. A cartridge any of the preceding embodiments, wherein the shortest distance between two adjacent hollow fibres is between 111 μm to 121 μm.
145. A cartridge any of the preceding embodiments, wherein the shortest distance between two adjacent hollow fibres is between 91 μm to 171 μm.
146. A cartridge any of the preceding embodiments, wherein the shortest distance between two adjacent hollow fibres is between 71 μm to 191 μm.
147. A cartridge any of the preceding embodiments, wherein the shortest distance between two adjacent hollow fibres is between 1 μm to 91 μm.
148. A cartridge any of the preceding embodiments, wherein the shortest distance between two adjacent hollow fibres is between 61 μm to 91 μm.
149. A cartridge any of the preceding embodiments, wherein the shortest distance between two adjacent hollow fibres is between 11 μm to 111 μm.
150. A cartridge any of the preceding embodiments, wherein the shortest distance between two adjacent hollow fibres is between 81 μm to 91 μm.
151. A cartridge any of the preceding embodiments, wherein the shortest distance between two adjacent hollow fibres is between 1 μm to 41 μm.
152. A cartridge any of the preceding embodiments, wherein the shortest distance between two adjacent hollow fibres is between 11 μm to 151 μm.
153. A cartridge any of the preceding embodiments, wherein the shortest distance between two adjacent hollow fibres is between 61 μm to 141 μm.
154. A cartridge any of the preceding embodiments, wherein the shortest distance between two adjacent hollow fibres is between 31 μm to 151 μm.
155. A cartridge any of the preceding embodiments, wherein the shortest distance between two adjacent hollow fibres is between 101 μm to 121 μm.
156. A cartridge any of the preceding embodiments, wherein the shortest distance between two adjacent hollow fibres is between 51 μm to 111 μm.
157. A cartridge any of the preceding embodiments, wherein the shortest distance between two adjacent hollow fibres is between 141 μm to 171 μm.
158. A cartridge any of the preceding embodiments, wherein the shortest distance between two adjacent hollow fibres is between 11 μm to 181 μm.
159. A cartridge any of the preceding embodiments, wherein the shortest distance between two adjacent hollow fibres is between 21 μm to 101 μm.
160. A cartridge any of the preceding embodiments, wherein the shortest distance between two adjacent hollow fibres is between 171 μm to 181 μm.
161. A cartridge any of the preceding embodiments, wherein the shortest distance between two adjacent hollow fibres is between 151 μm to 181 μm.
162. A cartridge any of the preceding embodiments, wherein the shortest distance between two adjacent hollow fibres is between 31 μm to 71 μm.
163. A cartridge any of the preceding embodiments, wherein the shortest distance between two adjacent hollow fibres is between 71 μm to 131 μm.
164. A cartridge any of the preceding embodiments, wherein the shortest distance between two adjacent hollow fibres is between 101 μm to 161 μm.
165. A cartridge any of the preceding embodiments, wherein the shortest distance between two adjacent hollow fibres is between 11 μm to 191 μm.
166. A cartridge any of the preceding embodiments, wherein the shortest distance between two adjacent hollow fibres is between 111 μm to 161 μm.
167. A cartridge any of the preceding embodiments, wherein the shortest distance between two adjacent hollow fibres is between 41 μm to 71 μm.
168. A cartridge any of the preceding embodiments, wherein the shortest distance between two adjacent hollow fibres is between 21 μm to 71 μm.
169. A cartridge any of the preceding embodiments, wherein the shortest distance between two adjacent hollow fibres is between 121 μm to 141 μm.
170. A cartridge any of the preceding embodiments, wherein the shortest distance between two adjacent hollow fibres is between 41 μm to 61 μm.
171. A cartridge any of the preceding embodiments, wherein the shortest distance between two adjacent hollow fibres is between 111 μm to 171 μm.
172. A cartridge any of the preceding embodiments, wherein the shortest distance between two adjacent hollow fibres is between 171 μm to 191 μm.
173. A cartridge any of the preceding embodiments, wherein the shortest distance between two adjacent hollow fibres is between 61 μm to 161 μm.
174. A cartridge any of the preceding embodiments, wherein the shortest distance between two adjacent hollow fibres is between 11 μm to 101 μm.
175. A cartridge any of the preceding embodiments, wherein the shortest distance between two adjacent hollow fibres is between 11 μm to 71 μm.
176. A cartridge any of the preceding embodiments, wherein the shortest distance between two adjacent hollow fibres is between 31 μm to 201 μm.
177. A cartridge any of the preceding embodiments, wherein the shortest distance between two adjacent hollow fibres is between 61 μm to 81 μm.
178. A cartridge any of the preceding embodiments, wherein the shortest distance between two adjacent hollow fibres is between 61 μm to 131 μm.
179. A cartridge any of the preceding embodiments, wherein the shortest distance between two adjacent hollow fibres is between 1 μm to 31 μm.
180. A cartridge any of the preceding embodiments, wherein the shortest distance between two adjacent hollow fibres is between 51 μm to 101 μm.
181. A cartridge any of the preceding embodiments, wherein the shortest distance between two adjacent hollow fibres is between 31 μm to 161 μm.
182. A cartridge any of the preceding embodiments, wherein the shortest distance between two adjacent hollow fibres is between 21 μm to 51 μm.
183. A cartridge any of the preceding embodiments, wherein the shortest distance between two adjacent hollow fibres is between 31 μm to 141 μm.
184. A cartridge any of the preceding embodiments, wherein the shortest distance between two adjacent hollow fibres is between 121 μm to 181 μm.
185. A cartridge any of the preceding embodiments, wherein the shortest distance between two adjacent hollow fibres is between 161 μm to 201 μm.

186. A cartridge any of the preceding embodiments, wherein the shortest distance between two adjacent hollow fibres is between 81 μm to 171 μm.
187. A cartridge any of the preceding embodiments, wherein the shortest distance between two adjacent hollow fibres is between 31 μm to 51 μm.
188. A cartridge any of the preceding embodiments, wherein the shortest distance between two adjacent hollow fibres is between 121 μm to 151 μm.
189. A cartridge any of the preceding embodiments, wherein the shortest distance between two adjacent hollow fibres is between 151 μm to 161 μm.
190. A cartridge any of the preceding embodiments, wherein the shortest distance between two adjacent hollow fibres is between 41 μm to 151 μm.
191. A cartridge any of the preceding embodiments, wherein the shortest distance between two adjacent hollow fibres is between 51 μm to 201 μm.
192. A cartridge any of the preceding embodiments, wherein the shortest distance between two adjacent hollow fibres is between 41 μm to 101 μm.
193. A cartridge any of the preceding embodiments, wherein the shortest distance between two adjacent hollow fibres is between 1 μm to 191 μm.
194. A cartridge any of the preceding embodiments, wherein the shortest distance between two adjacent hollow fibres is between 11 μm to 121 μm.
195. A cartridge any of the preceding embodiments, wherein the shortest distance between two adjacent hollow fibres is between 1 μm to 161 μm.
196. A cartridge any of the preceding embodiments, wherein the shortest distance between two adjacent hollow fibres is between 91 μm to 151 μm.
197. A cartridge any of the preceding embodiments, wherein the shortest distance between two adjacent hollow fibres is between 131 μm to 191 μm.
198. A cartridge any of the preceding embodiments, wherein the shortest distance between two adjacent hollow fibres is between 141 μm to 151 μm.
199. A cartridge any of the preceding embodiments, wherein the shortest distance between two adjacent hollow fibres is between 111 μm to 151 μm.
200. A cartridge any of the preceding embodiments, wherein the shortest distance between two adjacent hollow fibres is between 31 μm to 191 μm.
201. A cartridge any of the preceding embodiments, wherein the shortest distance between two adjacent hollow fibres is between 51 μm to 121 μm.
202. A cartridge any of the preceding embodiments, wherein the shortest distance between two adjacent hollow fibres is between 81 μm to 131 μm.
203. A cartridge any of the preceding embodiments, wherein the shortest distance between two adjacent hollow fibres is between 121 μm to 161 μm.
204. A cartridge any of the preceding embodiments, wherein the shortest distance between two adjacent hollow fibres is between 111 μm to 131 μm.
205. A cartridge any of the preceding embodiments, wherein the shortest distance between two adjacent hollow fibres is between 21 μm to 151 μm.
206. A cartridge any of the preceding embodiments, wherein the shortest distance between two adjacent hollow fibres is between 31 μm to 131 μm.
207. A cartridge any of the preceding embodiments, wherein the shortest distance between two adjacent hollow fibres is between 61 μm to 171 μm.
208. A cartridge any of the preceding embodiments, wherein the shortest distance between two adjacent hollow fibres is between 51 μm to 171 μm.
209. A cartridge any of the preceding embodiments, wherein the shortest distance between two adjacent hollow fibres is between 31 μm to 101 μm.
210. A cartridge any of the preceding embodiments, wherein the shortest distance between two adjacent hollow fibres is between 51 μm to 91 μm.
211. A cartridge any of the preceding embodiments, wherein the shortest distance between two adjacent hollow fibres is between 71 μm to 181 μm.
212. A cartridge any of the preceding embodiments, wherein the shortest distance between two adjacent hollow fibres is between 11 μm to 21 μm.
213. A cartridge any of the preceding embodiments, wherein the packing density of each hollow fibre bundle is between 1 hollow fibres/cm$^2$ to 1000 hollow fibres/cm$^2$. A cartridge any of the preceding embodiments, wherein the packing density of each hollow fibre bundle is between 301 hollow fibres/cm$^2$ to 451 hollow fibres/cm$^2$.
214. A cartridge any of the preceding embodiments, wherein the packing density of each hollow fibre bundle is between 101 hollow fibres/cm$^2$ to 201 hollow fibres/cm$^2$.
215. A cartridge any of the preceding embodiments, wherein the packing density of each hollow fibre bundle is between 151 hollow fibres/cm$^2$ to 251 hollow fibres/cm$^2$.
216. A cartridge any of the preceding embodiments, wherein the packing density of each hollow fibre bundle is between 401 hollow fibres/cm$^2$ to 701 hollow fibres/cm$^2$.
217. A cartridge any of the preceding embodiments, wherein the packing density of each hollow fibre bundle is between 101 hollow fibres/cm$^2$ to 501 hollow fibres/cm$^2$.
218. A cartridge any of the preceding embodiments, wherein the packing density of each hollow fibre bundle is between 251 hollow fibres/cm$^2$ to 801 hollow fibres/cm$^2$.
219. A cartridge any of the preceding embodiments, wherein the packing density of each hollow fibre bundle is between 901 hollow fibres/cm$^2$ to 1001 hollow fibres/cm$^2$.
220. A cartridge any of the preceding embodiments, wherein the packing density of each hollow fibre bundle is between 1 hollow fibres/cm$^2$ to 401 hollow fibres/cm$^2$.
221. A cartridge any of the preceding embodiments, wherein the packing density of each hollow fibre bundle is between 51 hollow fibres/cm$^2$ to 151 hollow fibres/cm$^2$.
222. A cartridge any of the preceding embodiments, wherein the packing density of each hollow fibre bundle is between 1 hollow fibres/cm$^2$ to 601 hollow fibres/cm$^2$.
223. A cartridge any of the preceding embodiments, wherein the packing density of each hollow fibre bundle is between 51 hollow fibres/cm$^2$ to 1001 hollow fibres/cm$^2$.
224. A cartridge any of the preceding embodiments, wherein the packing density of each hollow fibre bundle is between 51 hollow fibres/cm$^2$ to 951 hollow fibres/cm$^2$.

225. A cartridge any of the preceding embodiments, wherein the packing density of each hollow fibre bundle is between 401 hollow fibres/cm$^2$ to 751 hollow fibres/cm$^2$.
226. A cartridge any of the preceding embodiments, wherein the packing density of each hollow fibre bundle is between 601 hollow fibres/cm$^2$ to 701 hollow fibres/cm$^2$.
227. A cartridge any of the preceding embodiments, wherein the packing density of each hollow fibre bundle is between 801 hollow fibres/cm$^2$ to 901 hollow fibres/cm$^2$.
228. A cartridge any of the preceding embodiments, wherein the packing density of each hollow fibre bundle is between 251 hollow fibres/cm$^2$ to 951 hollow fibres/cm$^2$.
229. A cartridge any of the preceding embodiments, wherein the packing density of each hollow fibre bundle is between 1 hollow fibres/cm$^2$ to 351 hollow fibres/cm$^2$.
230. A cartridge any of the preceding embodiments, wherein the packing density of each hollow fibre bundle is between 651 hollow fibres/cm$^2$ to 901 hollow fibres/cm$^2$.
231. A cartridge any of the preceding embodiments, wherein the packing density of each hollow fibre bundle is between 451 hollow fibres/cm$^2$ to 851 hollow fibres/cm$^2$.
232. A cartridge any of the preceding embodiments, wherein the packing density of each hollow fibre bundle is between 1 hollow fibres/cm$^2$ to 851 hollow fibres/cm$^2$.
233. A cartridge any of the preceding embodiments, wherein the packing density of each hollow fibre bundle is between 1 hollow fibres/cm$^2$ to 751 hollow fibres/cm$^2$.
234. A cartridge any of the preceding embodiments, wherein the packing density of each hollow fibre bundle is between 251 hollow fibres/cm$^2$ to 601 hollow fibres/cm$^2$.
235. A cartridge any of the preceding embodiments, wherein the packing density of each hollow fibre bundle is between 51 hollow fibres/cm$^2$ to 901 hollow fibres/cm$^2$.
236. A cartridge any of the preceding embodiments, wherein the packing density of each hollow fibre bundle is between 451 hollow fibres/cm$^2$ to 651 hollow fibres/cm$^2$.
237. A cartridge any of the preceding embodiments, wherein the packing density of each hollow fibre bundle is between 351 hollow fibres/cm$^2$ to 651 hollow fibres/cm$^2$.
238. A cartridge any of the preceding embodiments, wherein the packing density of each hollow fibre bundle is between 451 hollow fibres/cm$^2$ to 701 hollow fibres/cm$^2$.
239. A cartridge any of the preceding embodiments, wherein the packing density of each hollow fibre bundle is between 551 hollow fibres/cm$^2$ to 601 hollow fibres/cm$^2$.
240. A cartridge any of the preceding embodiments, wherein the packing density of each hollow fibre bundle is between 101 hollow fibres/cm$^2$ to 751 hollow fibres/cm$^2$.
241. A cartridge any of the preceding embodiments, wherein the packing density of each hollow fibre bundle is between 201 hollow fibres/cm$^2$ to 901 hollow fibres/cm$^2$.
242. A cartridge any of the preceding embodiments, wherein the packing density of each hollow fibre bundle is between 401 hollow fibres/cm$^2$ to 951 hollow fibres/cm$^2$.
243. A cartridge any of the preceding embodiments, wherein the packing density of each hollow fibre bundle is between 51 hollow fibres/cm$^2$ to 351 hollow fibres/cm$^2$.
244. A cartridge any of the preceding embodiments, wherein the packing density of each hollow fibre bundle is between 101 hollow fibres/cm$^2$ to 351 hollow fibres/cm$^2$.
245. A cartridge any of the preceding embodiments, wherein the packing density of each hollow fibre bundle is between 501 hollow fibres/cm$^2$ to 551 hollow fibres/cm$^2$.
246. A cartridge any of the preceding embodiments, wherein the packing density of each hollow fibre bundle is between 151 hollow fibres/cm$^2$ to 701 hollow fibres/cm$^2$.
247. A cartridge any of the preceding embodiments, wherein the packing density of each hollow fibre bundle is between 201 hollow fibres/cm$^2$ to 301 hollow fibres/cm$^2$.
248. A cartridge any of the preceding embodiments, wherein the packing density of each hollow fibre bundle is between 201 hollow fibres/cm$^2$ to 651 hollow fibres/cm$^2$.
249. A cartridge any of the preceding embodiments, wherein the packing density of each hollow fibre bundle is between 51 hollow fibres/cm$^2$ to 201 hollow fibres/cm$^2$.
250. A cartridge any of the preceding embodiments, wherein the packing density of each hollow fibre bundle is between 201 hollow fibres/cm$^2$ to 451 hollow fibres/cm$^2$.
251. A cartridge any of the preceding embodiments, wherein the packing density of each hollow fibre bundle is between 651 hollow fibres/cm$^2$ to 1001 hollow fibres/cm$^2$.
252. A cartridge any of the preceding embodiments, wherein the packing density of each hollow fibre bundle is between 1 hollow fibres/cm$^2$ to 201 hollow fibres/cm$^2$.
253. A cartridge any of the preceding embodiments, wherein the packing density of each hollow fibre bundle is between 401 hollow fibres/cm$^2$ to 851 hollow fibres/cm$^2$.
254. A cartridge any of the preceding embodiments, wherein the packing density of each hollow fibre bundle is between 251 hollow fibres/cm$^2$ to 751 hollow fibres/cm$^2$.
255. A cartridge any of the preceding embodiments, wherein the packing density of each hollow fibre bundle is between 301 hollow fibres/cm$^2$ to 651 hollow fibres/cm$^2$.
256. A cartridge any of the preceding embodiments, wherein the packing density of each hollow fibre bundle is between 951 hollow fibres/cm$^2$ to 1001 hollow fibres/cm$^2$.

257. A cartridge any of the preceding embodiments, wherein the packing density of each hollow fibre bundle is between 101 hollow fibres/cm² to 601 hollow fibres/cm².

258. A cartridge any of the preceding embodiments, wherein the packing density of each hollow fibre bundle is between 201 hollow fibres/cm² to 951 hollow fibres/cm².

259. A cartridge any of the preceding embodiments, wherein the packing density of each hollow fibre bundle is between 51 hollow fibres/cm² to 101 hollow fibres/cm².

260. A cartridge any of the preceding embodiments, wherein the packing density of each hollow fibre bundle is between 451 hollow fibres/cm² to 501 hollow fibres/cm².

261. A cartridge any of the preceding embodiments, wherein the packing density of each hollow fibre bundle is between 101 hollow fibres/cm² to 851 hollow fibres/cm².

262. A cartridge any of the preceding embodiments, wherein the packing density of each hollow fibre bundle is between 701 hollow fibres/cm² to 901 hollow fibres/cm².

263. A cartridge any of the preceding embodiments, wherein the packing density of each hollow fibre bundle is between 451 hollow fibres/cm² to 601 hollow fibres/cm².

264. A cartridge any of the preceding embodiments, wherein the packing density of each hollow fibre bundle is between 251 hollow fibres/cm² to 401 hollow fibres/cm².

265. A cartridge any of the preceding embodiments, wherein the packing density of each hollow fibre bundle is between 1 hollow fibres/cm² to 301 hollow fibres/cm².

266. A cartridge any of the preceding embodiments, wherein the packing density of each hollow fibre bundle is between 51 hollow fibres/cm² to 801 hollow fibres/cm².

267. A cartridge any of the preceding embodiments, wherein the packing density of each hollow fibre bundle is between 301 hollow fibres/cm² to 601 hollow fibres/cm².

268. A cartridge any of the preceding embodiments, wherein the packing density of each hollow fibre bundle is between 601 hollow fibres/cm² to 951 hollow fibres/cm².

269. A cartridge any of the preceding embodiments, wherein the packing density of each hollow fibre bundle is between 651 hollow fibres/cm² to 951 hollow fibres/cm².

270. A cartridge any of the preceding embodiments, wherein the packing density of each hollow fibre bundle is between 151 hollow fibres/cm² to 351 hollow fibres/cm².

271. A cartridge any of the preceding embodiments, wherein the packing density of each hollow fibre bundle is between 51 hollow fibres/cm² to 651 hollow fibres/cm².

272. A cartridge any of the preceding embodiments, wherein the packing density of each hollow fibre bundle is between 451 hollow fibres/cm² to 951 hollow fibres/cm².

273. A cartridge any of the preceding embodiments, wherein the packing density of each hollow fibre bundle is between 251 hollow fibres/cm² to 701 hollow fibres/cm².

274. A cartridge any of the preceding embodiments, wherein the packing density of each hollow fibre bundle is between 201 hollow fibres/cm² to 1001 hollow fibres/cm².

275. A cartridge any of the preceding embodiments, wherein the packing density of each hollow fibre bundle is between 51 hollow fibres/cm² to 851 hollow fibres/cm².

276. A cartridge any of the preceding embodiments, wherein the packing density of each hollow fibre bundle is between 301 hollow fibres/cm² to 801 hollow fibres/cm².

277. A cartridge any of the preceding embodiments, wherein the packing density of each hollow fibre bundle is between 351 hollow fibres/cm² to 1001 hollow fibres/cm².

278. A cartridge any of the preceding embodiments, wherein the packing density of each hollow fibre bundle is between 101 hollow fibres/cm² to 451 hollow fibres/cm².

279. A cartridge any of the preceding embodiments, wherein the packing density of each hollow fibre bundle is between 151 hollow fibres/cm² to 951 hollow fibres/cm².

280. A cartridge any of the preceding embodiments, wherein the packing density of each hollow fibre bundle is between 201 hollow fibres/cm² to 351 hollow fibres/cm².

281. A cartridge any of the preceding embodiments, wherein the packing density of each hollow fibre bundle is between 501 hollow fibres/cm² to 951 hollow fibres/cm².

282. A cartridge any of the preceding embodiments, wherein the packing density of each hollow fibre bundle is between 551 hollow fibres/cm² to 801 hollow fibres/cm².

283. A cartridge any of the preceding embodiments, wherein the packing density of each hollow fibre bundle is between 501 hollow fibres/cm² to 851 hollow fibres/cm².

284. A cartridge any of the preceding embodiments, wherein the packing density of each hollow fibre bundle is between 51 hollow fibres/cm² to 301 hollow fibres/cm².

285. A cartridge any of the preceding embodiments, wherein the packing density of each hollow fibre bundle is between 351 hollow fibres/cm² to 451 hollow fibres/cm².

286. A cartridge any of the preceding embodiments, wherein the packing density of each hollow fibre bundle is between 151 hollow fibres/cm² to 851 hollow fibres/cm².

287. A cartridge any of the preceding embodiments, wherein the packing density of each hollow fibre bundle is between 751 hollow fibres/cm² to 901 hollow fibres/cm².

288. A cartridge any of the preceding embodiments, wherein the packing density of each hollow fibre bundle is between 551 hollow fibres/cm² to 901 hollow fibres/cm².

289. A cartridge any of the preceding embodiments, wherein the packing density of each hollow fibre bundle is between 251 hollow fibres/cm$^2$ to 551 hollow fibres/cm$^2$.

290. A cartridge any of the preceding embodiments, wherein the packing density of each hollow fibre bundle is between 601 hollow fibres/cm$^2$ to 751 hollow fibres/cm$^2$.

291. A cartridge any of the preceding embodiments, wherein the packing density of each hollow fibre bundle is between 201 hollow fibres/cm$^2$ to 851 hollow fibres/cm$^2$.

292. A cartridge any of the preceding embodiments, wherein the packing density of each hollow fibre bundle is between 1 hollow fibres/cm$^2$ to 951 hollow fibres/cm$^2$.

293. A cartridge any of the preceding embodiments, wherein the packing density of each hollow fibre bundle is between 151 hollow fibres/cm$^2$ to 501 hollow fibres/cm$^2$.

294. A cartridge any of the preceding embodiments, wherein the packing density of each hollow fibre bundle is between 1 hollow fibres/cm$^2$ to 251 hollow fibres/cm$^2$.

295. A cartridge any of the preceding embodiments, wherein the packing density of each hollow fibre bundle is between 51 hollow fibres/cm$^2$ to 401 hollow fibres/cm$^2$.

296. A cartridge any of the preceding embodiments, wherein the packing density of each hollow fibre bundle is between 301 hollow fibres/cm$^2$ to 901 hollow fibres/cm$^2$.

297. A cartridge any of the preceding embodiments, wherein the packing density of each hollow fibre bundle is between 401 hollow fibres/cm$^2$ to 601 hollow fibres/cm$^2$.

298. A cartridge any of the preceding embodiments, wherein the packing density of each hollow fibre bundle is between 51 hollow fibres/cm$^2$ to 701 hollow fibres/cm$^2$.

299. A cartridge any of the preceding embodiments, wherein the packing density of each hollow fibre bundle is between 251 hollow fibres/cm$^2$ to 501 hollow fibres/cm$^2$.

300. A cartridge any of the preceding embodiments, wherein the packing density of each hollow fibre bundle is between 1 hollow fibres/cm$^2$ to 51 hollow fibres/cm$^2$.

301. A cartridge any of the preceding embodiments, wherein the packing density of each hollow fibre bundle is between 301 hollow fibres/cm$^2$ to 701 hollow fibres/cm$^2$.

302. A cartridge any of the preceding embodiments, wherein the packing density of each hollow fibre bundle is between 301 hollow fibres/cm$^2$ to 551 hollow fibres/cm$^2$.

303. A cartridge any of the preceding embodiments, wherein the packing density of each hollow fibre bundle is between 151 hollow fibres/cm$^2$ to 801 hollow fibres/cm$^2$.

304. A cartridge any of the preceding embodiments, wherein the packing density of each hollow fibre bundle is between 501 hollow fibres/cm$^2$ to 801 hollow fibres/cm$^2$.

305. A cartridge any of the preceding embodiments, wherein the packing density of each hollow fibre bundle is between 651 hollow fibres/cm$^2$ to 751 hollow fibres/cm$^2$.

306. A cartridge any of the preceding embodiments, wherein the packing density of each hollow fibre bundle is between 801 hollow fibres/cm$^2$ to 951 hollow fibres/cm$^2$.

307. A cartridge any of the preceding embodiments, wherein the packing density of each hollow fibre bundle is between 101 hollow fibres/cm$^2$ to 551 hollow fibres/cm$^2$.

308. A cartridge any of the preceding embodiments, wherein the packing density of each hollow fibre bundle is between 451 hollow fibres/cm$^2$ to 901 hollow fibres/cm$^2$.

309. A cartridge any of the preceding embodiments, wherein the packing density of each hollow fibre bundle is between 51 hollow fibres/cm$^2$ to 251 hollow fibres/cm$^2$.

310. A cartridge any of the preceding embodiments, wherein the packing density of each hollow fibre bundle is between 401 hollow fibres/cm$^2$ to 551 hollow fibres/cm$^2$.

311. A cartridge any of the preceding embodiments, wherein the packing density of each hollow fibre bundle is between 151 hollow fibres/cm$^2$ to 901 hollow fibres/cm$^2$.

312. A cartridge any of the preceding embodiments, wherein the packing density of each hollow fibre bundle is between 301 hollow fibres/cm$^2$ to 501 hollow fibres/cm$^2$.

313. A cartridge any of the preceding embodiments, wherein the packing density of each hollow fibre bundle is between 1 hollow fibres/cm$^2$ to 101 hollow fibres/cm$^2$.

314. A cartridge any of the preceding embodiments, wherein the packing density of each hollow fibre bundle is between 101 hollow fibres/cm$^2$ to 151 hollow fibres/cm$^2$.

315. A cartridge any of the preceding embodiments, wherein the packing density of each hollow fibre bundle is between 251 hollow fibres/cm$^2$ to 901 hollow fibres/cm$^2$.

316. A cartridge any of the preceding embodiments, wherein the packing density of each hollow fibre bundle is between 1 hollow fibres/cm$^2$ to 551 hollow fibres/cm$^2$.

317. A cartridge any of the preceding embodiments, wherein the packing density of each hollow fibre bundle is between 901 hollow fibres/cm$^2$ to 951 hollow fibres/cm$^2$.

318. A cartridge any of the preceding embodiments, wherein the packing density of each hollow fibre bundle is between 151 hollow fibres/cm$^2$ to 1001 hollow fibres/cm$^2$.

319. A cartridge any of the preceding embodiments, wherein the packing density of each hollow fibre bundle is between 201 hollow fibres/cm$^2$ to 251 hollow fibres/cm$^2$.

320. A cartridge any of the preceding embodiments, wherein the packing density of each hollow fibre bundle is between 151 hollow fibres/cm$^2$ to 551 hollow fibres/cm$^2$.

321. A cartridge any of the preceding embodiments, wherein the packing density of each hollow fibre bundle is between 301 hollow fibres/cm$^2$ to 851 hollow fibres/cm$^2$.
322. A cartridge any of the preceding embodiments, wherein the packing density of each hollow fibre bundle is between 701 hollow fibres/cm$^2$ to 1001 hollow fibres/cm$^2$.
323. A cartridge any of the preceding embodiments, wherein the packing density of each hollow fibre bundle is between 201 hollow fibres/cm$^2$ to 701 hollow fibres/cm$^2$.
324. A cartridge any of the preceding embodiments, wherein the packing density of each hollow fibre bundle is between 601 hollow fibres/cm$^2$ to 901 hollow fibres/cm$^2$.
325. A cartridge any of the preceding embodiments, wherein the packing density of each hollow fibre bundle is between 251 hollow fibres/cm$^2$ to 1001 hollow fibres/cm$^2$.
326. A cartridge any of the preceding embodiments, wherein the packing density of each hollow fibre bundle is between 301 hollow fibres/cm$^2$ to 401 hollow fibres/cm$^2$.
327. A cartridge any of the preceding embodiments, wherein the packing density of each hollow fibre bundle is between 351 hollow fibres/cm$^2$ to 401 hollow fibres/cm$^2$.
328. A cartridge any of the preceding embodiments, wherein the packing density of each hollow fibre bundle is between 601 hollow fibres/cm$^2$ to 851 hollow fibres/cm$^2$.
329. A cartridge any of the preceding embodiments, wherein the packing density of each hollow fibre bundle is between 1 hollow fibres/cm$^2$ to 151 hollow fibres/cm$^2$.
330. A cartridge any of the preceding embodiments, wherein the packing density of each hollow fibre bundle is between 101 hollow fibres/cm$^2$ to 901 hollow fibres/cm$^2$.
331. A cartridge any of the preceding embodiments, wherein the packing density of each hollow fibre bundle is between 301 hollow fibres/cm$^2$ to 351 hollow fibres/cm$^2$.
332. A cartridge any of the preceding embodiments, wherein the packing density of each hollow fibre bundle is between 251 hollow fibres/cm$^2$ to 451 hollow fibres/cm$^2$.
333. A cartridge any of the preceding embodiments, wherein the packing density of each hollow fibre bundle is between 651 hollow fibres/cm$^2$ to 851 hollow fibres/cm$^2$.
334. A cartridge any of the preceding embodiments, wherein the packing density of each hollow fibre bundle is between 1 hollow fibres/cm$^2$ to 701 hollow fibres/cm$^2$.
335. A cartridge any of the preceding embodiments, wherein the packing density of each hollow fibre bundle is between 201 hollow fibres/cm$^2$ to 801 hollow fibres/cm$^2$.
336. A cartridge any of the preceding embodiments, wherein the packing density of each hollow fibre bundle is between 1 hollow fibres/cm$^2$ to 1001 hollow fibres/cm$^2$.
337. A cartridge any of the preceding embodiments, wherein the packing density of each hollow fibre bundle is between 551 hollow fibres/cm$^2$ to 1001 hollow fibres/cm$^2$.
338. A cartridge any of the preceding embodiments, wherein the packing density of each hollow fibre bundle is between 51 hollow fibres/cm$^2$ to 601 hollow fibres/cm$^2$.
339. A cartridge any of the preceding embodiments, wherein the packing density of each hollow fibre bundle is between 101 hollow fibres/cm$^2$ to 301 hollow fibres/cm$^2$.
340. A cartridge any of the preceding embodiments, wherein the packing density of each hollow fibre bundle is between 801 hollow fibres/cm$^2$ to 1001 hollow fibres/cm$^2$.
341. A cartridge any of the preceding embodiments, wherein the packing density of each hollow fibre bundle is between 201 hollow fibres/cm$^2$ to 551 hollow fibres/cm$^2$.
342. A cartridge any of the preceding embodiments, wherein the packing density of each hollow fibre bundle is between 601 hollow fibres/cm$^2$ to 651 hollow fibres/cm$^2$.
343. A cartridge any of the preceding embodiments, wherein the packing density of each hollow fibre bundle is between 551 hollow fibres/cm$^2$ to 951 hollow fibres/cm$^2$.
344. A cartridge any of the preceding embodiments, wherein the packing density of each hollow fibre bundle is between 501 hollow fibres/cm$^2$ to 1001 hollow fibres/cm$^2$.
345. A cartridge any of the preceding embodiments, wherein the packing density of each hollow fibre bundle is between 851 hollow fibres/cm$^2$ to 901 hollow fibres/cm$^2$.
346. A cartridge any of the preceding embodiments, wherein the packing density of each hollow fibre bundle is between 101 hollow fibres/cm$^2$ to 251 hollow fibres/cm$^2$.
347. A cartridge any of the preceding embodiments, wherein the packing density of each hollow fibre bundle is between 351 hollow fibres/cm$^2$ to 901 hollow fibres/cm$^2$.
348. A cartridge any of the preceding embodiments, wherein the packing density of each hollow fibre bundle is between 501 hollow fibres/cm$^2$ to 751 hollow fibres/cm$^2$.
349. A cartridge any of the preceding embodiments, wherein the packing density of each hollow fibre bundle is between 551 hollow fibres/cm$^2$ to 851 hollow fibres/cm$^2$.
350. A cartridge any of the preceding embodiments, wherein the packing density of each hollow fibre bundle is between 51 hollow fibres/cm$^2$ to 551 hollow fibres/cm$^2$.
351. A cartridge any of the preceding embodiments, wherein the packing density of each hollow fibre bundle is between 551 hollow fibres/cm$^2$ to 701 hollow fibres/cm$^2$.
352. A cartridge any of the preceding embodiments, wherein the packing density of each hollow fibre bundle is between 401 hollow fibres/cm$^2$ to 901 hollow fibres/cm$^2$.

353. A cartridge any of the preceding embodiments, wherein the packing density of each hollow fibre bundle is between 1 hollow fibres/cm$^2$ to 801 hollow fibres/cm$^2$.
354. A cartridge any of the preceding embodiments, wherein the packing density of each hollow fibre bundle is between 401 hollow fibres/cm$^2$ to 451 hollow fibres/cm$^2$.
355. A cartridge any of the preceding embodiments, wherein the packing density of each hollow fibre bundle is between 151 hollow fibres/cm$^2$ to 301 hollow fibres/cm$^2$.
356. A cartridge any of the preceding embodiments, wherein the packing density of each hollow fibre bundle is between 501 hollow fibres/cm$^2$ to 701 hollow fibres/cm$^2$.
357. A cartridge any of the preceding embodiments, wherein the packing density of each hollow fibre bundle is between 251 hollow fibres/cm$^2$ to 351 hollow fibres/cm$^2$.
358. A cartridge any of the preceding embodiments, wherein the packing density of each hollow fibre bundle is between 51 hollow fibres/cm$^2$ to 451 hollow fibres/cm$^2$.
359. A cartridge any of the preceding embodiments, wherein the packing density of each hollow fibre bundle is between 201 hollow fibres/cm$^2$ to 601 hollow fibres/cm$^2$.
360. A cartridge any of the preceding embodiments, wherein the packing density of each hollow fibre bundle is between 51 hollow fibres/cm$^2$ to 751 hollow fibres/cm$^2$.
361. A cartridge any of the preceding embodiments, wherein the packing density of each hollow fibre bundle is between 801 hollow fibres/cm$^2$ to 851 hollow fibres/cm$^2$.
362. A cartridge any of the preceding embodiments, wherein the packing density of each hollow fibre bundle is between 151 hollow fibres/cm$^2$ to 651 hollow fibres/cm$^2$.
363. A cartridge any of the preceding embodiments, wherein the packing density of each hollow fibre bundle is between 351 hollow fibres/cm$^2$ to 701 hollow fibres/cm$^2$.
364. A cartridge any of the preceding embodiments, wherein the packing density of each hollow fibre bundle is between 301 hollow fibres/cm$^2$ to 1001 hollow fibres/cm$^2$.
365. A cartridge any of the preceding embodiments, wherein the packing density of each hollow fibre bundle is between 101 hollow fibres/cm$^2$ to 651 hollow fibres/cm$^2$.
366. A cartridge any of the preceding embodiments, wherein the packing density of each hollow fibre bundle is between 51 hollow fibres/cm$^2$ to 501 hollow fibres/cm$^2$.
367. A cartridge any of the preceding embodiments, wherein the packing density of each hollow fibre bundle is between 851 hollow fibres/cm$^2$ to 1001 hollow fibres/cm$^2$.
368. A cartridge any of the preceding embodiments, wherein the packing density of each hollow fibre bundle is between 501 hollow fibres/cm$^2$ to 651 hollow fibres/cm$^2$.
369. A cartridge any of the preceding embodiments, wherein the packing density of each hollow fibre bundle is between 751 hollow fibres/cm$^2$ to 1001 hollow fibres/cm$^2$.
370. A cartridge any of the preceding embodiments, wherein the packing density of each hollow fibre bundle is between 401 hollow fibres/cm$^2$ to 501 hollow fibres/cm$^2$.
371. A cartridge any of the preceding embodiments, wherein the packing density of each hollow fibre bundle is between 351 hollow fibres/cm$^2$ to 951 hollow fibres/cm$^2$.
372. A cartridge any of the preceding embodiments, wherein the packing density of each hollow fibre bundle is between 551 hollow fibres/cm$^2$ to 651 hollow fibres/cm$^2$.
373. A cartridge any of the preceding embodiments, wherein the packing density of each hollow fibre bundle is between 251 hollow fibres/cm$^2$ to 651 hollow fibres/cm$^2$.
374. A cartridge any of the preceding embodiments, wherein the packing density of each hollow fibre bundle is between 151 hollow fibres/cm$^2$ to 201 hollow fibres/cm$^2$.
375. A cartridge any of the preceding embodiments, wherein the packing density of each hollow fibre bundle is between 351 hollow fibres/cm$^2$ to 851 hollow fibres/cm$^2$.
376. A cartridge any of the preceding embodiments, wherein the packing density of each hollow fibre bundle is between 1 hollow fibres/cm$^2$ to 901 hollow fibres/cm$^2$.
377. A cartridge any of the preceding embodiments, wherein the packing density of each hollow fibre bundle is between 551 hollow fibres/cm$^2$ to 751 hollow fibres/cm$^2$.
378. A cartridge any of the preceding embodiments, wherein the packing density of each hollow fibre bundle is between 651 hollow fibres/cm$^2$ to 701 hollow fibres/cm$^2$.
379. A cartridge any of the preceding embodiments, wherein the packing density of each hollow fibre bundle is between 351 hollow fibres/cm$^2$ to 751 hollow fibres/cm$^2$.
380. A cartridge any of the preceding embodiments, wherein the packing density of each hollow fibre bundle is between 701 hollow fibres/cm$^2$ to 951 hollow fibres/cm$^2$.
381. A cartridge any of the preceding embodiments, wherein the packing density of each hollow fibre bundle is between 751 hollow fibres/cm$^2$ to 851 hollow fibres/cm$^2$.
382. A cartridge any of the preceding embodiments, wherein the packing density of each hollow fibre bundle is between 201 hollow fibres/cm$^2$ to 401 hollow fibres/cm$^2$.
383. A cartridge any of the preceding embodiments, wherein the packing density of each hollow fibre bundle is between 101 hollow fibres/cm$^2$ to 1001 hollow fibres/cm$^2$.
384. A cartridge any of the preceding embodiments, wherein the packing density of each hollow fibre bundle is between 601 hollow fibres/cm$^2$ to 1001 hollow fibres/cm$^2$.

385. A cartridge any of the preceding embodiments, wherein the packing density of each hollow fibre bundle is between 151 hollow fibres/cm$^2$ to 751 hollow fibres/cm$^2$.
386. A cartridge any of the preceding embodiments, wherein the packing density of each hollow fibre bundle is between 1 hollow fibres/cm$^2$ to 651 hollow fibres/cm$^2$.
387. A cartridge any of the preceding embodiments, wherein the packing density of each hollow fibre bundle is between 151 hollow fibres/cm$^2$ to 401 hollow fibres/cm$^2$.
388. A cartridge any of the preceding embodiments, wherein the packing density of each hollow fibre bundle is between 701 hollow fibres/cm$^2$ to 851 hollow fibres/cm$^2$.
389. A cartridge any of the preceding embodiments, wherein the packing density of each hollow fibre bundle is between 101 hollow fibres/cm$^2$ to 951 hollow fibres/cm$^2$.
390. A cartridge any of the preceding embodiments, wherein the packing density of each hollow fibre bundle is between 601 hollow fibres/cm$^2$ to 801 hollow fibres/cm$^2$.
391. A cartridge any of the preceding embodiments, wherein the packing density of each hollow fibre bundle is between 351 hollow fibres/cm$^2$ to 501 hollow fibres/cm$^2$.
392. A cartridge any of the preceding embodiments, wherein the packing density of each hollow fibre bundle is between 651 hollow fibres/cm$^2$ to 801 hollow fibres/cm$^2$.
393. A cartridge any of the preceding embodiments, wherein the packing density of each hollow fibre bundle is between 151 hollow fibres/cm$^2$ to 601 hollow fibres/cm$^2$.
394. A cartridge any of the preceding embodiments, wherein the packing density of each hollow fibre bundle is between 701 hollow fibres/cm$^2$ to 801 hollow fibres/cm$^2$.
395. A cartridge any of the preceding embodiments, wherein the packing density of each hollow fibre bundle is between 701 hollow fibres/cm$^2$ to 751 hollow fibres/cm$^2$.
396. A cartridge any of the preceding embodiments, wherein the packing density of each hollow fibre bundle is between 451 hollow fibres/cm$^2$ to 1001 hollow fibres/cm$^2$.
397. A cartridge any of the preceding embodiments, wherein the packing density of each hollow fibre bundle is between 201 hollow fibres/cm$^2$ to 751 hollow fibres/cm$^2$.
398. A cartridge any of the preceding embodiments, wherein the packing density of each hollow fibre bundle is between 401 hollow fibres/cm$^2$ to 1001 hollow fibres/cm$^2$.
399. A cartridge any of the preceding embodiments, wherein the packing density of each hollow fibre bundle is between 451 hollow fibres/cm$^2$ to 551 hollow fibres/cm$^2$.
400. A cartridge any of the preceding embodiments, wherein the packing density of each hollow fibre bundle is between 351 hollow fibres/cm$^2$ to 801 hollow fibres/cm$^2$.
401. A cartridge any of the preceding embodiments, wherein the packing density of each hollow fibre bundle is between 151 hollow fibres/cm$^2$ to 451 hollow fibres/cm$^2$.
402. A cartridge any of the preceding embodiments, wherein the packing density of each hollow fibre bundle is between 851 hollow fibres/cm$^2$ to 951 hollow fibres/cm$^2$.
403. A cartridge any of the preceding embodiments, wherein the packing density of each hollow fibre bundle is between 751 hollow fibres/cm$^2$ to 801 hollow fibres/cm$^2$.
404. A cartridge any of the preceding embodiments, wherein the packing density of each hollow fibre bundle is between 501 hollow fibres/cm$^2$ to 901 hollow fibres/cm$^2$.
405. A cartridge any of the preceding embodiments, wherein the packing density of each hollow fibre bundle is between 251 hollow fibres/cm$^2$ to 301 hollow fibres/cm$^2$.
406. A cartridge any of the preceding embodiments, wherein the packing density of each hollow fibre bundle is between 451 hollow fibres/cm$^2$ to 801 hollow fibres/cm$^2$.
407. A cartridge any of the preceding embodiments, wherein the packing density of each hollow fibre bundle is between 101 hollow fibres/cm$^2$ to 701 hollow fibres/cm$^2$.
408. A cartridge any of the preceding embodiments, wherein the packing density of each hollow fibre bundle is between 401 hollow fibres/cm$^2$ to 801 hollow fibres/cm$^2$.
409. A cartridge any of the preceding embodiments, wherein the packing density of each hollow fibre bundle is between 101 hollow fibres/cm$^2$ to 801 hollow fibres/cm$^2$.
410. A cartridge any of the preceding embodiments, wherein the packing density of each hollow fibre bundle is between 251 hollow fibres/cm$^2$ to 851 hollow fibres/cm$^2$.
411. A cartridge any of the preceding embodiments, wherein the packing density of each hollow fibre bundle is between 351 hollow fibres/cm$^2$ to 551 hollow fibres/cm$^2$.
412. A cartridge any of the preceding embodiments, wherein the packing density of each hollow fibre bundle is between 201 hollow fibres/cm$^2$ to 501 hollow fibres/cm$^2$.
413. A cartridge any of the preceding embodiments, wherein the packing density of each hollow fibre bundle is between 1 hollow fibres/cm$^2$ to 451 hollow fibres/cm$^2$.
414. A cartridge any of the preceding embodiments, wherein the packing density of each hollow fibre bundle is between 751 hollow fibres/cm$^2$ to 951 hollow fibres/cm$^2$.
415. A cartridge any of the preceding embodiments, wherein the packing density of each hollow fibre bundle is between 301 hollow fibres/cm$^2$ to 951 hollow fibres/cm$^2$.
416. A cartridge any of the preceding embodiments, wherein the packing density of each hollow fibre bundle is between 451 hollow fibres/cm$^2$ to 751 hollow fibres/cm$^2$.

417. A cartridge any of the preceding embodiments, wherein the packing density of each hollow fibre bundle is between 351 hollow fibres/cm² to 601 hollow fibres/cm².

418. A cartridge any of the preceding embodiments, wherein the packing density of each hollow fibre bundle is between 401 hollow fibres/cm² to 651 hollow fibres/cm².

419. A cartridge any of the preceding embodiments, wherein the packing density of each hollow fibre bundle is between 301 hollow fibres/cm² to 751 hollow fibres/cm².

420. A cartridge any of the preceding embodiments, wherein the packing density of each hollow fibre bundle is between 101 hollow fibres/cm² to 401 hollow fibres/cm².

421. A cartridge any of the preceding embodiments, wherein the packing density of each hollow fibre bundle is between 1 hollow fibres/cm² to 501 hollow fibres/cm².

422. A cartridge any of the preceding embodiments, wherein the packing density of each hollow fibre bundle is between 501 hollow fibres/cm² to 601 hollow fibres/cm².

423. A cartridge any of the preceding embodiments, wherein the packing density of each hollow fibre bundle is between 11 hollow fibres/cm² to 141 hollow fibres/cm².

424. A cartridge any of the preceding embodiments, wherein the packing density of each hollow fibre bundle is between 11 hollow fibres/cm² to 51 hollow fibres/cm².

425. A cartridge any of the preceding embodiments, wherein the packing density of each hollow fibre bundle is between 11 hollow fibres/cm² to 111 hollow fibres/cm².

426. A cartridge any of the preceding embodiments, wherein the packing density of each hollow fibre bundle is between 121 hollow fibres/cm² to 131 hollow fibres/cm².

427. A cartridge any of the preceding embodiments, wherein the packing density of each hollow fibre bundle is between 41 hollow fibres/cm² to 101 hollow fibres/cm².

428. A cartridge any of the preceding embodiments, wherein the packing density of each hollow fibre bundle is between 11 hollow fibres/cm² to 91 hollow fibres/cm².

429. A cartridge any of the preceding embodiments, wherein the packing density of each hollow fibre bundle is between 91 hollow fibres/cm² to 101 hollow fibres/cm².

430. A cartridge any of the preceding embodiments, wherein the packing density of each hollow fibre bundle is between 91 hollow fibres/cm² to 141 hollow fibres/cm².

431. A cartridge any of the preceding embodiments, wherein the packing density of each hollow fibre bundle is between 81 hollow fibres/cm² to 111 hollow fibres/cm².

432. A cartridge any of the preceding embodiments, wherein the packing density of each hollow fibre bundle is between 21 hollow fibres/cm² to 151 hollow fibres/cm².

433. A cartridge any of the preceding embodiments, wherein the packing density of each hollow fibre bundle is between 101 hollow fibres/cm² to 121 hollow fibres/cm².

434. A cartridge any of the preceding embodiments, wherein the packing density of each hollow fibre bundle is between 101 hollow fibres/cm² to 151 hollow fibres/cm².

435. A cartridge any of the preceding embodiments, wherein the packing density of each hollow fibre bundle is between 41 hollow fibres/cm² to 91 hollow fibres/cm².

436. A cartridge any of the preceding embodiments, wherein the packing density of each hollow fibre bundle is between 11 hollow fibres/cm² to 61 hollow fibres/cm².

437. A cartridge any of the preceding embodiments, wherein the packing density of each hollow fibre bundle is between 1 hollow fibres/cm² to 21 hollow fibres/cm².

438. A cartridge any of the preceding embodiments, wherein the packing density of each hollow fibre bundle is between 1 hollow fibres/cm² to 61 hollow fibres/cm².

439. A cartridge any of the preceding embodiments, wherein the packing density of each hollow fibre bundle is between 11 hollow fibres/cm² to 121 hollow fibres/cm².

440. A cartridge any of the preceding embodiments, wherein the packing density of each hollow fibre bundle is between 21 hollow fibres/cm² to 121 hollow fibres/cm².

441. A cartridge any of the preceding embodiments, wherein the packing density of each hollow fibre bundle is between 41 hollow fibres/cm² to 151 hollow fibres/cm².

442. A cartridge any of the preceding embodiments, wherein the packing density of each hollow fibre bundle is between 41 hollow fibres/cm² to 141 hollow fibres/cm².

443. A cartridge any of the preceding embodiments, wherein the packing density of each hollow fibre bundle is between 41 hollow fibres/cm² to 71 hollow fibres/cm².

444. A cartridge any of the preceding embodiments, wherein the packing density of each hollow fibre bundle is between 1 hollow fibres/cm² to 81 hollow fibres/cm².

445. A cartridge any of the preceding embodiments, wherein the packing density of each hollow fibre bundle is between 61 hollow fibres/cm² to 101 hollow fibres/cm².

446. A cartridge any of the preceding embodiments, wherein the packing density of each hollow fibre bundle is between 71 hollow fibres/cm² to 141 hollow fibres/cm².

447. A cartridge any of the preceding embodiments, wherein the packing density of each hollow fibre bundle is between 51 hollow fibres/cm² to 61 hollow fibres/cm².

448. A cartridge any of the preceding embodiments, wherein the packing density of each hollow fibre bundle is between 51 hollow fibres/cm² to 111 hollow fibres/cm².

449. A cartridge any of the preceding embodiments, wherein the packing density of each hollow fibre bundle is between 1 hollow fibres/cm$^2$ to 111 hollow fibres/cm$^2$.

450. A cartridge any of the preceding embodiments, wherein the packing density of each hollow fibre bundle is between 81 hollow fibres/cm$^2$ to 151 hollow fibres/cm$^2$.

451. A cartridge any of the preceding embodiments, wherein the packing density of each hollow fibre bundle is between 11 hollow fibres/cm$^2$ to 31 hollow fibres/cm$^2$.

452. A cartridge any of the preceding embodiments, wherein the packing density of each hollow fibre bundle is between 91 hollow fibres/cm$^2$ to 151 hollow fibres/cm$^2$.

453. A cartridge any of the preceding embodiments, wherein the packing density of each hollow fibre bundle is between 101 hollow fibres/cm$^2$ to 131 hollow fibres/cm$^2$.

454. A cartridge any of the preceding embodiments, wherein the packing density of each hollow fibre bundle is between 31 hollow fibres/cm$^2$ to 101 hollow fibres/cm$^2$.

455. A cartridge any of the preceding embodiments, wherein the packing density of each hollow fibre bundle is between 81 hollow fibres/cm$^2$ to 91 hollow fibres/cm$^2$.

456. A cartridge any of the preceding embodiments, wherein the packing density of each hollow fibre bundle is between 41 hollow fibres/cm$^2$ to 51 hollow fibres/cm$^2$.

457. A cartridge any of the preceding embodiments, wherein the packing density of each hollow fibre bundle is between 121 hollow fibres/cm$^2$ to 151 hollow fibres/cm$^2$.

458. A cartridge any of the preceding embodiments, wherein the packing density of each hollow fibre bundle is between 1 hollow fibres/cm$^2$ to 71 hollow fibres/cm$^2$.

459. A cartridge any of the preceding embodiments, wherein the packing density of each hollow fibre bundle is between 21 hollow fibres/cm$^2$ to 41 hollow fibres/cm$^2$.

460. A cartridge any of the preceding embodiments, wherein the packing density of each hollow fibre bundle is between 71 hollow fibres/cm$^2$ to 151 hollow fibres/cm$^2$.

461. A cartridge any of the preceding embodiments, wherein the packing density of each hollow fibre bundle is between 51 hollow fibres/cm$^2$ to 121 hollow fibres/cm$^2$.

462. A cartridge any of the preceding embodiments, wherein the packing density of each hollow fibre bundle is between 101 hollow fibres/cm$^2$ to 111 hollow fibres/cm$^2$.

463. A cartridge any of the preceding embodiments, wherein the packing density of each hollow fibre bundle is between 31 hollow fibres/cm$^2$ to 141 hollow fibres/cm$^2$.

464. A cartridge any of the preceding embodiments, wherein the packing density of each hollow fibre bundle is between 61 hollow fibres/cm$^2$ to 141 hollow fibres/cm$^2$.

465. A cartridge any of the preceding embodiments, wherein the packing density of each hollow fibre bundle is between 31 hollow fibres/cm$^2$ to 81 hollow fibres/cm$^2$.

466. A cartridge any of the preceding embodiments, wherein the packing density of each hollow fibre bundle is between 61 hollow fibres/cm$^2$ to 121 hollow fibres/cm$^2$.

467. A cartridge any of the preceding embodiments, wherein the packing density of each hollow fibre bundle is between 111 hollow fibres/cm$^2$ to 121 hollow fibres/cm$^2$.

468. A cartridge any of the preceding embodiments, wherein the packing density of each hollow fibre bundle is between 11 hollow fibres/cm$^2$ to 131 hollow fibres/cm$^2$.

469. A cartridge any of the preceding embodiments, wherein the packing density of each hollow fibre bundle is between 81 hollow fibres/cm$^2$ to 101 hollow fibres/cm$^2$.

470. A cartridge any of the preceding embodiments, wherein the packing density of each hollow fibre bundle is between 121 hollow fibres/cm$^2$ to 141 hollow fibres/cm$^2$.

471. A cartridge any of the preceding embodiments, wherein the packing density of each hollow fibre bundle is between 51 hollow fibres/cm$^2$ to 151 hollow fibres/cm$^2$.

472. A cartridge any of the preceding embodiments, wherein the packing density of each hollow fibre bundle is between 71 hollow fibres/cm$^2$ to 111 hollow fibres/cm$^2$.

473. A cartridge any of the preceding embodiments, wherein the packing density of each hollow fibre bundle is between 111 hollow fibres/cm$^2$ to 151 hollow fibres/cm$^2$.

474. A cartridge any of the preceding embodiments, wherein the packing density of each hollow fibre bundle is between 71 hollow fibres/cm$^2$ to 91 hollow fibres/cm$^2$.

475. A cartridge any of the preceding embodiments, wherein the packing density of each hollow fibre bundle is between 1 hollow fibres/cm$^2$ to 121 hollow fibres/cm$^2$.

476. A cartridge any of the preceding embodiments, wherein the packing density of each hollow fibre bundle is between 11 hollow fibres/cm$^2$ to 71 hollow fibres/cm$^2$.

477. A cartridge any of the preceding embodiments, wherein the packing density of each hollow fibre bundle is between 31 hollow fibres/cm$^2$ to 61 hollow fibres/cm$^2$.

478. A cartridge any of the preceding embodiments, wherein the packing density of each hollow fibre bundle is between 31 hollow fibres/cm$^2$ to 121 hollow fibres/cm$^2$.

479. A cartridge any of the preceding embodiments, wherein the packing density of each hollow fibre bundle is between 61 hollow fibres/cm$^2$ to 71 hollow fibres/cm$^2$.

480. A cartridge any of the preceding embodiments, wherein the packing density of each hollow fibre bundle is between 11 hollow fibres/cm$^2$ to 21 hollow fibres/cm$^2$.

481. A cartridge any of the preceding embodiments, wherein the packing density of each hollow fibre bundle is between 61 hollow fibres/cm² to 111 hollow fibres/cm².

482. A cartridge any of the preceding embodiments, wherein the packing density of each hollow fibre bundle is between 21 hollow fibres/cm² to 51 hollow fibres/cm².

483. A cartridge any of the preceding embodiments, wherein the packing density of each hollow fibre bundle is between 51 hollow fibres/cm² to 141 hollow fibres/cm².

484. A cartridge any of the preceding embodiments, wherein the packing density of each hollow fibre bundle is between 71 hollow fibres/cm² to 131 hollow fibres/cm².

485. A cartridge any of the preceding embodiments, wherein the packing density of each hollow fibre bundle is between 1 hollow fibres/cm² to 151 hollow fibres/cm².

486. A cartridge any of the preceding embodiments, wherein the packing density of each hollow fibre bundle is between 21 hollow fibres/cm² to 81 hollow fibres/cm².

487. A cartridge any of the preceding embodiments, wherein the packing density of each hollow fibre bundle is between 71 hollow fibres/cm² to 101 hollow fibres/cm².

488. A cartridge any of the preceding embodiments, wherein the packing density of each hollow fibre bundle is between 101 hollow fibres/cm² to 141 hollow fibres/cm².

489. A cartridge any of the preceding embodiments, wherein the packing density of each hollow fibre bundle is between 1 hollow fibres/cm² to 101 hollow fibres/cm².

490. A cartridge any of the preceding embodiments, wherein the packing density of each hollow fibre bundle is between 1 hollow fibres/cm² to 131 hollow fibres/cm².

491. A cartridge any of the preceding embodiments, wherein the packing density of each hollow fibre bundle is between 111 hollow fibres/cm² to 141 hollow fibres/cm².

492. A cartridge any of the preceding embodiments, wherein the packing density of each hollow fibre bundle is between 21 hollow fibres/cm² to 131 hollow fibres/cm².

493. A cartridge any of the preceding embodiments, wherein the packing density of each hollow fibre bundle is between 41 hollow fibres/cm² to 81 hollow fibres/cm².

494. A cartridge any of the preceding embodiments, wherein the packing density of each hollow fibre bundle is between 1 hollow fibres/cm² to 51 hollow fibres/cm².

495. A cartridge any of the preceding embodiments, wherein the packing density of each hollow fibre bundle is between 141 hollow fibres/cm² to 151 hollow fibres/cm².

496. A cartridge any of the preceding embodiments, wherein the packing density of each hollow fibre bundle is between 41 hollow fibres/cm² to 111 hollow fibres/cm².

497. A cartridge any of the preceding embodiments, wherein the packing density of each hollow fibre bundle is between 1 hollow fibres/cm² to 11 hollow fibres/cm².

498. A cartridge any of the preceding embodiments, wherein the packing density of each hollow fibre bundle is between 111 hollow fibres/cm² to 131 hollow fibres/cm².

499. A cartridge any of the preceding embodiments, wherein the packing density of each hollow fibre bundle is between 91 hollow fibres/cm² to 131 hollow fibres/cm².

500. A cartridge any of the preceding embodiments, wherein the packing density of each hollow fibre bundle is between 41 hollow fibres/cm² to 121 hollow fibres/cm².

501. A cartridge any of the preceding embodiments, wherein the packing density of each hollow fibre bundle is between 91 hollow fibres/cm² to 111 hollow fibres/cm².

502. A cartridge any of the preceding embodiments, wherein the packing density of each hollow fibre bundle is between 81 hollow fibres/cm² to 141 hollow fibres/cm².

503. A cartridge any of the preceding embodiments, wherein the packing density of each hollow fibre bundle is between 21 hollow fibres/cm² to 61 hollow fibres/cm².

504. A cartridge any of the preceding embodiments, wherein the packing density of each hollow fibre bundle is between 21 hollow fibres/cm² to 31 hollow fibres/cm².

505. A cartridge any of the preceding embodiments, wherein the packing density of each hollow fibre bundle is between 51 hollow fibres/cm² to 91 hollow fibres/cm².

506. A cartridge any of the preceding embodiments, wherein the packing density of each hollow fibre bundle is between 81 hollow fibres/cm² to 121 hollow fibres/cm².

507. A cartridge any of the preceding embodiments, wherein the packing density of each hollow fibre bundle is between 61 hollow fibres/cm² to 151 hollow fibres/cm².

508. A cartridge any of the preceding embodiments, wherein the packing density of each hollow fibre bundle is between 131 hollow fibres/cm² to 141 hollow fibres/cm².

509. A cartridge any of the preceding embodiments, wherein the packing density of each hollow fibre bundle is between 11 hollow fibres/cm² to 101 hollow fibres/cm².

510. A cartridge any of the preceding embodiments, wherein the packing density of each hollow fibre bundle is between 31 hollow fibres/cm² to 91 hollow fibres/cm².

511. A cartridge any of the preceding embodiments, wherein the packing density of each hollow fibre bundle is between 11 hollow fibres/cm² to 81 hollow fibres/cm².

512. A cartridge any of the preceding embodiments, wherein the packing density of each hollow fibre bundle is between 51 hollow fibres/cm² to 81 hollow fibres/cm².

513. A cartridge any of the preceding embodiments, wherein the packing density of each hollow fibre bundle is between 11 hollow fibres/cm$^2$ to 151 hollow fibres/cm$^2$.
514. A cartridge any of the preceding embodiments, wherein the packing density of each hollow fibre bundle is between 31 hollow fibres/cm$^2$ to 41 hollow fibres/cm$^2$.
515. A cartridge any of the preceding embodiments, wherein the packing density of each hollow fibre bundle is between 71 hollow fibres/cm$^2$ to 121 hollow fibres/cm$^2$.
516. A cartridge any of the preceding embodiments, wherein the packing density of each hollow fibre bundle is between 31 hollow fibres/cm$^2$ to 151 hollow fibres/cm$^2$.
517. A cartridge any of the preceding embodiments, wherein the packing density of each hollow fibre bundle is between 1 hollow fibres/cm$^2$ to 141 hollow fibres/cm$^2$.
518. A cartridge any of the preceding embodiments, wherein the packing density of each hollow fibre bundle is between 1 hollow fibres/cm$^2$ to 31 hollow fibres/cm$^2$.
519. A cartridge any of the preceding embodiments, wherein the packing density of each hollow fibre bundle is between 71 hollow fibres/cm$^2$ to 81 hollow fibres/cm$^2$.
520. A cartridge any of the preceding embodiments, wherein the packing density of each hollow fibre bundle is between 61 hollow fibres/cm$^2$ to 91 hollow fibres/cm$^2$.
521. A cartridge any of the preceding embodiments, wherein the packing density of each hollow fibre bundle is between 41 hollow fibres/cm$^2$ to 131 hollow fibres/cm$^2$.
522. A cartridge any of the preceding embodiments, wherein the packing density of each hollow fibre bundle is between 91 hollow fibres/cm$^2$ to 121 hollow fibres/cm$^2$.
523. A cartridge any of the preceding embodiments, wherein the packing density of each hollow fibre bundle is between 131 hollow fibres/cm$^2$ to 151 hollow fibres/cm$^2$.
524. A cartridge any of the preceding embodiments, wherein the packing density of each hollow fibre bundle is between 51 hollow fibres/cm$^2$ to 71 hollow fibres/cm$^2$.
525. A cartridge any of the preceding embodiments, wherein the packing density of each hollow fibre bundle is between 61 hollow fibres/cm$^2$ to 81 hollow fibres/cm$^2$.
526. A cartridge any of the preceding embodiments, wherein the packing density of each hollow fibre bundle is between 21 hollow fibres/cm$^2$ to 111 hollow fibres/cm$^2$.
527. A cartridge any of the preceding embodiments, wherein the packing density of each hollow fibre bundle is between 31 hollow fibres/cm$^2$ to 51 hollow fibres/cm$^2$.
528. A cartridge any of the preceding embodiments, wherein the packing density of each hollow fibre bundle is between 51 hollow fibres/cm$^2$ to 101 hollow fibres/cm$^2$.
529. A cartridge any of the preceding embodiments, wherein the packing density of each hollow fibre bundle is between 21 hollow fibres/cm$^2$ to 91 hollow fibres/cm$^2$.
530. A cartridge any of the preceding embodiments, wherein the packing density of each hollow fibre bundle is between 31 hollow fibres/cm$^2$ to 111 hollow fibres/cm$^2$.
531. A cartridge any of the preceding embodiments, wherein the packing density of each hollow fibre bundle is between 1 hollow fibres/cm$^2$ to 41 hollow fibres/cm$^2$.
532. A cartridge any of the preceding embodiments, wherein the packing density of each hollow fibre bundle is between 21 hollow fibres/cm$^2$ to 141 hollow fibres/cm$^2$.
533. A cartridge any of the preceding embodiments, wherein the packing density of each hollow fibre bundle is between 11 hollow fibres/cm$^2$ to 41 hollow fibres/cm$^2$.
534. A cartridge any of the preceding embodiments, wherein the packing density of each hollow fibre bundle is between 21 hollow fibres/cm$^2$ to 71 hollow fibres/cm$^2$.
535. A cartridge any of the preceding embodiments, wherein the packing density of each hollow fibre bundle is between 31 hollow fibres/cm$^2$ to 71 hollow fibres/cm$^2$.
536. A cartridge any of the preceding embodiments, wherein the packing density of each hollow fibre bundle is between 41 hollow fibres/cm$^2$ to 61 hollow fibres/cm$^2$.
537. A cartridge any of the preceding embodiments, wherein the packing density of each hollow fibre bundle is between 1 hollow fibres/cm$^2$ to 91 hollow fibres/cm$^2$.
538. A cartridge any of the preceding embodiments, wherein the packing density of each hollow fibre bundle is between 51 hollow fibres/cm$^2$ to 131 hollow fibres/cm$^2$.
539. A cartridge any of the preceding embodiments, wherein the packing density of each hollow fibre bundle is between 21 hollow fibres/cm$^2$ to 101 hollow fibres/cm$^2$.
540. A cartridge any of the preceding embodiments, wherein the packing density of each hollow fibre bundle is between 31 hollow fibres/cm$^2$ to 131 hollow fibres/cm$^2$.
541. A cartridge any of the preceding embodiments, wherein the packing density of each hollow fibre bundle is between 81 hollow fibres/cm$^2$ to 131 hollow fibres/cm$^2$.
542. A cartridge any of the preceding embodiments, wherein the packing density of each hollow fibre bundle is between 61 hollow fibres/cm$^2$ to 131 hollow fibres/cm$^2$.
543. A cartridge any of the preceding embodiments, wherein the hollow fibres have been potted with epoxy.
544. A cartridge any of the preceding embodiments, wherein the hollow fibres have been potted with plaster.
545. A cartridge any of the preceding embodiments, wherein the hollow fibres have been potted with gypsum plaster.
546. A cartridge any of the preceding embodiments, wherein the hollow fibres have been potted with silicon rubber.

547. A cartridge any of the preceding embodiments, wherein the hollow fibres have been potted with polytetrafluoroethylene.
548. A cartridge any of the preceding embodiments, wherein the hollow fibres have been potted with polydimethylsiloxane.
549. A cartridge any of the preceding embodiments, wherein the cartridge is assembled by reversibly encasing the potted hollow fibres within an outer shell and adding suitable end-caps.
550. A cartridge any of the preceding embodiments, wherein the cartridge is easily dismantled.
551. A cartridge any of the preceding embodiments, wherein the hollow fibres may be removed.
552. A cartridge any of the preceding embodiments, wherein the hollow fibres may not be removed.
553. A cartridge any of the preceding embodiments, wherein the hollow fibres may be removed with cells attached.
554. A cartridge any of the preceding embodiments, wherein a cultivated meat product may be removed.
555. A cartridge any of the preceding embodiments, wherein cultivated meat product may be further treated to improve, preserve and/or alter the palatability, mouthfeel, taste and/or texture of the cultivated meat product before being removed from the cartridge assembly.
556. A cartridge any of the preceding embodiments, wherein the inner diameter of the outer shell of the cartridge is between 1 cm to 500 cm.
557. A cartridge any of the preceding embodiments, wherein the inner diameter of the outer shell of the cartridge is between 6 cm to 11 cm.
558. A cartridge any of the preceding embodiments, wherein the inner diameter of the outer shell of the cartridge is between 1 cm to 16 cm.
559. A cartridge any of the preceding embodiments, wherein the inner diameter of the outer shell of the cartridge is between 1 cm to 11 cm.
560. A cartridge any of the preceding embodiments, wherein the inner diameter of the outer shell of the cartridge is between 11 cm to 51 cm.
561. A cartridge any of the preceding embodiments, wherein the inner diameter of the outer shell of the cartridge is between 21 cm to 41 cm.
562. A cartridge any of the preceding embodiments, wherein the inner diameter of the outer shell of the cartridge is between 6 cm to 41 cm.
563. A cartridge any of the preceding embodiments, wherein the inner diameter of the outer shell of the cartridge is between 11 cm to 21 cm.
564. A cartridge any of the preceding embodiments, wherein the inner diameter of the outer shell of the cartridge is between 16 cm to 36 cm.
565. A cartridge any of the preceding embodiments, wherein the inner diameter of the outer shell of the cartridge is between 6 cm to 36 cm.
566. A cartridge any of the preceding embodiments, wherein the inner diameter of the outer shell of the cartridge is between 21 cm to 46 cm.
567. A cartridge any of the preceding embodiments, wherein the inner diameter of the outer shell of the cartridge is between 31 cm to 51 cm.
568. A cartridge any of the preceding embodiments, wherein the inner diameter of the outer shell of the cartridge is between 11 cm to 31 cm.
569. A cartridge any of the preceding embodiments, wherein the inner diameter of the outer shell of the cartridge is between 26 cm to 36 cm.
570. A cartridge any of the preceding embodiments, wherein the inner diameter of the outer shell of the cartridge is between 36 cm to 51 cm.
571. A cartridge any of the preceding embodiments, wherein the inner diameter of the outer shell of the cartridge is between 26 cm to 31 cm.
572. A cartridge any of the preceding embodiments, wherein the inner diameter of the outer shell of the cartridge is between 21 cm to 36 cm.
573. A cartridge any of the preceding embodiments, wherein the inner diameter of the outer shell of the cartridge is between 36 cm to 46 cm.
574. A cartridge any of the preceding embodiments, wherein the inner diameter of the outer shell of the cartridge is between 31 cm to 36 cm.
575. A cartridge any of the preceding embodiments, wherein the inner diameter of the outer shell of the cartridge is between 11 cm to 41 cm.
576. A cartridge any of the preceding embodiments, wherein the inner diameter of the outer shell of the cartridge is between 6 cm to 51 cm.
577. A cartridge any of the preceding embodiments, wherein the inner diameter of the outer shell of the cartridge is between 46 cm to 51 cm.
578. A cartridge any of the preceding embodiments, wherein the inner diameter of the outer shell of the cartridge is between 1 cm to 26 cm.
579. A cartridge any of the preceding embodiments, wherein the inner diameter of the outer shell of the cartridge is between 26 cm to 41 cm.
580. A cartridge any of the preceding embodiments, wherein the inner diameter of the outer shell of the cartridge is between 11 cm to 36 cm.
581. A cartridge any of the preceding embodiments, wherein the inner diameter of the outer shell of the cartridge is between 1 cm to 21 cm.
582. A cartridge any of the preceding embodiments, wherein the inner diameter of the outer shell of the cartridge is between 21 cm to 26 cm.
583. A cartridge any of the preceding embodiments, wherein the inner diameter of the outer shell of the cartridge is between 6 cm to 26 cm.
584. A cartridge any of the preceding embodiments, wherein the inner diameter of the outer shell of the cartridge is between 31 cm to 41 cm.
585. A cartridge any of the preceding embodiments, wherein the inner diameter of the outer shell of the cartridge is between 1 cm to 46 cm.
586. A cartridge any of the preceding embodiments, wherein the inner diameter of the outer shell of the cartridge is between 1 cm to 6 cm.
587. A cartridge any of the preceding embodiments, wherein the inner diameter of the outer shell of the cartridge is between 1 cm to 51 cm.
588. A cartridge any of the preceding embodiments, wherein the inner diameter of the outer shell of the cartridge is between 1 cm to 36 cm.
589. A cartridge any of the preceding embodiments, wherein the inner diameter of the outer shell of the cartridge is between 16 cm to 41 cm.
590. A cartridge any of the preceding embodiments, wherein the inner diameter of the outer shell of the cartridge is between 16 cm to 21 cm.

591. A cartridge any of the preceding embodiments, wherein the inner diameter of the outer shell of the cartridge is between 6 cm to 31 cm.
592. A cartridge any of the preceding embodiments, wherein the inner diameter of the outer shell of the cartridge is between 16 cm to 51 cm.
593. A cartridge any of the preceding embodiments, wherein the inner diameter of the outer shell of the cartridge is between 16 cm to 46 cm.
594. A cartridge any of the preceding embodiments, wherein the inner diameter of the outer shell of the cartridge is between 41 cm to 46 cm.
595. A cartridge any of the preceding embodiments, wherein the inner diameter of the outer shell of the cartridge is between 16 cm to 31 cm.
596. A cartridge any of the preceding embodiments, wherein the inner diameter of the outer shell of the cartridge is between 1 cm to 41 cm.
597. A cartridge any of the preceding embodiments, wherein the inner diameter of the outer shell of the cartridge is between 21 cm to 31 cm.
598. A cartridge any of the preceding embodiments, wherein the inner diameter of the outer shell of the cartridge is between 11 cm to 16 cm.
599. A cartridge any of the preceding embodiments, wherein the inner diameter of the outer shell of the cartridge is between 11 cm to 26 cm.
600. A cartridge any of the preceding embodiments, wherein the inner diameter of the outer shell of the cartridge is between 6 cm to 16 cm.
601. A cartridge any of the preceding embodiments, wherein the inner diameter of the outer shell of the cartridge is between 41 cm to 51 cm.
602. A cartridge any of the preceding embodiments, wherein the inner diameter of the outer shell of the cartridge is between 16 cm to 26 cm.
603. A cartridge any of the preceding embodiments, wherein the inner diameter of the outer shell of the cartridge is between 6 cm to 46 cm.
604. A cartridge any of the preceding embodiments, wherein the inner diameter of the outer shell of the cartridge is between 26 cm to 51 cm.
605. A cartridge any of the preceding embodiments, wherein the inner diameter of the outer shell of the cartridge is between 1 cm to 31 cm.
606. A cartridge any of the preceding embodiments, wherein the inner diameter of the outer shell of the cartridge is between 36 cm to 41 cm.
607. A cartridge any of the preceding embodiments, wherein the inner diameter of the outer shell of the cartridge is between 6 cm to 21 cm.
608. A cartridge any of the preceding embodiments, wherein the inner diameter of the outer shell of the cartridge is between 31 cm to 46 cm.
609. A cartridge any of the preceding embodiments, wherein the inner diameter of the outer shell of the cartridge is between 21 cm to 51 cm.
610. A cartridge any of the preceding embodiments, wherein the inner diameter of the outer shell of the cartridge is between 11 cm to 46 cm.
611. A cartridge any of the preceding embodiments, wherein the inner diameter of the outer shell of the cartridge is between 26 cm to 46 cm.
612. A cartridge any of the preceding embodiments, wherein the inner diameter of the outer shell of the cartridge is between 130 cm to 490 cm.
613. A cartridge any of the preceding embodiments, wherein the inner diameter of the outer shell of the cartridge is between 270 cm to 490 cm.
614. A cartridge any of the preceding embodiments, wherein the inner diameter of the outer shell of the cartridge is between 70 cm to 90 cm.
615. A cartridge any of the preceding embodiments, wherein the inner diameter of the outer shell of the cartridge is between 310 cm to 350 cm.
616. A cartridge any of the preceding embodiments, wherein the inner diameter of the outer shell of the cartridge is between 190 cm to 410 cm.
617. A cartridge any of the preceding embodiments, wherein the inner diameter of the outer shell of the cartridge is between 50 cm to 470 cm.
618. A cartridge any of the preceding embodiments, wherein the inner diameter of the outer shell of the cartridge is between 150 cm to 510 cm.
619. A cartridge any of the preceding embodiments, wherein the inner diameter of the outer shell of the cartridge is between 170 cm to 230 cm.
620. A cartridge any of the preceding embodiments, wherein the inner diameter of the outer shell of the cartridge is between 90 cm to 410 cm.
621. A cartridge any of the preceding embodiments, wherein the inner diameter of the outer shell of the cartridge is between 130 cm to 330 cm.
622. A cartridge any of the preceding embodiments, wherein the inner diameter of the outer shell of the cartridge is between 330 cm to 430 cm.
623. A cartridge any of the preceding embodiments, wherein the inner diameter of the outer shell of the cartridge is between 190 cm to 310 cm.
624. A cartridge any of the preceding embodiments, wherein the inner diameter of the outer shell of the cartridge is between 270 cm to 450 cm.
625. A cartridge any of the preceding embodiments, wherein the inner diameter of the outer shell of the cartridge is between 290 cm to 370 cm.
626. A cartridge any of the preceding embodiments, wherein the inner diameter of the outer shell of the cartridge is between 250 cm to 330 cm.
627. A cartridge any of the preceding embodiments, wherein the inner diameter of the outer shell of the cartridge is between 310 cm to 390 cm.
628. A cartridge any of the preceding embodiments, wherein the inner diameter of the outer shell of the cartridge is between 390 cm to 490 cm.
629. A cartridge any of the preceding embodiments, wherein the inner diameter of the outer shell of the cartridge is between 90 cm to 350 cm.
630. A cartridge any of the preceding embodiments, wherein the inner diameter of the outer shell of the cartridge is between 170 cm to 470 cm.
631. A cartridge any of the preceding embodiments, wherein the inner diameter of the outer shell of the cartridge is between 390 cm to 430 cm.
632. A cartridge any of the preceding embodiments, wherein the inner diameter of the outer shell of the cartridge is between 50 cm to 390 cm.
633. A cartridge any of the preceding embodiments, wherein the inner diameter of the outer shell of the cartridge is between 90 cm to 290 cm.
634. A cartridge any of the preceding embodiments, wherein the inner diameter of the outer shell of the cartridge is between 70 cm to 310 cm.

635. A cartridge any of the preceding embodiments, wherein the inner diameter of the outer shell of the cartridge is between 290 cm to 490 cm.
636. A cartridge any of the preceding embodiments, wherein the inner diameter of the outer shell of the cartridge is between 130 cm to 310 cm.
637. A cartridge any of the preceding embodiments, wherein the inner diameter of the outer shell of the cartridge is between 170 cm to 430 cm.
638. A cartridge any of the preceding embodiments, wherein the inner diameter of the outer shell of the cartridge is between 250 cm to 290 cm.
639. A cartridge any of the preceding embodiments, wherein the inner diameter of the outer shell of the cartridge is between 110 cm to 410 cm.
640. A cartridge any of the preceding embodiments, wherein the inner diameter of the outer shell of the cartridge is between 110 cm to 390 cm.
641. A cartridge any of the preceding embodiments, wherein the inner diameter of the outer shell of the cartridge is between 130 cm to 370 cm.
642. A cartridge any of the preceding embodiments, wherein the inner diameter of the outer shell of the cartridge is between 170 cm to 410 cm.
643. A cartridge any of the preceding embodiments, wherein the inner diameter of the outer shell of the cartridge is between 410 cm to 470 cm.
644. A cartridge any of the preceding embodiments, wherein the inner diameter of the outer shell of the cartridge is between 170 cm to 310 cm.
645. A cartridge any of the preceding embodiments, wherein the inner diameter of the outer shell of the cartridge is between 70 cm to 110 cm.
646. A cartridge any of the preceding embodiments, wherein the inner diameter of the outer shell of the cartridge is between 210 cm to 330 cm.
647. A cartridge any of the preceding embodiments, wherein the inner diameter of the outer shell of the cartridge is between 350 cm to 450 cm.
648. A cartridge any of the preceding embodiments, wherein the inner diameter of the outer shell of the cartridge is between 230 cm to 290 cm.
649. A cartridge any of the preceding embodiments, wherein the inner diameter of the outer shell of the cartridge is between 110 cm to 250 cm.
650. A cartridge any of the preceding embodiments, wherein the inner diameter of the outer shell of the cartridge is between 150 cm to 190 cm.
651. A cartridge any of the preceding embodiments, wherein the inner diameter of the outer shell of the cartridge is between 50 cm to 450 cm.
652. A cartridge any of the preceding embodiments, wherein the inner diameter of the outer shell of the cartridge is between 90 cm to 190 cm.
653. A cartridge any of the preceding embodiments, wherein the inner diameter of the outer shell of the cartridge is between 50 cm to 490 cm.
654. A cartridge any of the preceding embodiments, wherein the inner diameter of the outer shell of the cartridge is between 230 cm to 250 cm.
655. A cartridge any of the preceding embodiments, wherein the inner diameter of the outer shell of the cartridge is between 50 cm to 510 cm.
656. A cartridge any of the preceding embodiments, wherein the inner diameter of the outer shell of the cartridge is between 190 cm to 270 cm.
657. A cartridge any of the preceding embodiments, wherein the inner diameter of the outer shell of the cartridge is between 250 cm to 350 cm.
658. A cartridge any of the preceding embodiments, wherein the inner diameter of the outer shell of the cartridge is between 190 cm to 490 cm.
659. A cartridge any of the preceding embodiments, wherein the inner diameter of the outer shell of the cartridge is between 150 cm to 310 cm.
660. A cartridge any of the preceding embodiments, wherein the inner diameter of the outer shell of the cartridge is between 310 cm to 470 cm.
661. A cartridge any of the preceding embodiments, wherein the inner diameter of the outer shell of the cartridge is between 130 cm to 430 cm.
662. A cartridge any of the preceding embodiments, wherein the inner diameter of the outer shell of the cartridge is between 110 cm to 470 cm.
663. A cartridge any of the preceding embodiments, wherein the inner diameter of the outer shell of the cartridge is between 290 cm to 390 cm.
664. A cartridge any of the preceding embodiments, wherein the inner diameter of the outer shell of the cartridge is between 130 cm to 230 cm.
665. A cartridge any of the preceding embodiments, wherein the inner diameter of the outer shell of the cartridge is between 210 cm to 510 cm.
666. A cartridge any of the preceding embodiments, wherein the inner diameter of the outer shell of the cartridge is between 290 cm to 510 cm.
667. A cartridge any of the preceding embodiments, wherein the inner diameter of the outer shell of the cartridge is between 150 cm to 250 cm.
668. A cartridge any of the preceding embodiments, wherein the inner diameter of the outer shell of the cartridge is between 150 cm to 390 cm.
669. A cartridge any of the preceding embodiments, wherein the inner diameter of the outer shell of the cartridge is between 310 cm to 370 cm.
670. A cartridge any of the preceding embodiments, wherein the inner diameter of the outer shell of the cartridge is between 470 cm to 510 cm.
671. A cartridge any of the preceding embodiments, wherein the inner diameter of the outer shell of the cartridge is between 210 cm to 310 cm.
672. A cartridge any of the preceding embodiments, wherein the inner diameter of the outer shell of the cartridge is between 230 cm to 390 cm.
673. A cartridge any of the preceding embodiments, wherein the inner diameter of the outer shell of the cartridge is between 170 cm to 450 cm.
674. A cartridge any of the preceding embodiments, wherein the inner diameter of the outer shell of the cartridge is between 230 cm to 310 cm.
675. A cartridge any of the preceding embodiments, wherein the inner diameter of the outer shell of the cartridge is between 70 cm to 330 cm.
676. A cartridge any of the preceding embodiments, wherein the inner diameter of the outer shell of the cartridge is between 50 cm to 110 cm.
677. A cartridge any of the preceding embodiments, wherein the inner diameter of the outer shell of the cartridge is between 90 cm to 150 cm.
678. A cartridge any of the preceding embodiments, wherein the inner diameter of the outer shell of the cartridge is between 150 cm to 470 cm.

679. A cartridge any of the preceding embodiments, wherein the inner diameter of the outer shell of the cartridge is between 210 cm to 350 cm.

680. A cartridge any of the preceding embodiments, wherein the inner diameter of the outer shell of the cartridge is between 170 cm to 350 cm.

681. A cartridge any of the preceding embodiments, wherein the inner diameter of the outer shell of the cartridge is between 70 cm to 350 cm.

682. A cartridge any of the preceding embodiments, wherein the inner diameter of the outer shell of the cartridge is between 70 cm to 230 cm.

683. A cartridge any of the preceding embodiments, wherein the inner diameter of the outer shell of the cartridge is between 310 cm to 490 cm.

684. A cartridge any of the preceding embodiments, wherein the inner diameter of the outer shell of the cartridge is between 330 cm to 390 cm.

685. A cartridge any of the preceding embodiments, wherein the inner diameter of the outer shell of the cartridge is between 110 cm to 130 cm.

686. A cartridge any of the preceding embodiments, wherein the inner diameter of the outer shell of the cartridge is between 230 cm to 510 cm.

687. A cartridge any of the preceding embodiments, wherein the inner diameter of the outer shell of the cartridge is between 50 cm to 370 cm.

688. A cartridge any of the preceding embodiments, wherein the inner diameter of the outer shell of the cartridge is between 70 cm to 210 cm.

689. A cartridge any of the preceding embodiments, wherein the inner diameter of the outer shell of the cartridge is between 70 cm to 430 cm.

690. A cartridge any of the preceding embodiments, wherein the inner diameter of the outer shell of the cartridge is between 230 cm to 370 cm.

691. A cartridge any of the preceding embodiments, wherein the inner diameter of the outer shell of the cartridge is between 230 cm to 430 cm.

692. A cartridge any of the preceding embodiments, wherein the inner diameter of the outer shell of the cartridge is between 370 cm to 510 cm.

693. A cartridge any of the preceding embodiments, wherein the inner diameter of the outer shell of the cartridge is between 130 cm to 210 cm.

694. A cartridge any of the preceding embodiments, wherein the inner diameter of the outer shell of the cartridge is between 110 cm to 270 cm.

695. A cartridge any of the preceding embodiments, wherein the inner diameter of the outer shell of the cartridge is between 210 cm to 490 cm.

696. A cartridge any of the preceding embodiments, wherein the inner diameter of the outer shell of the cartridge is between 210 cm to 270 cm.

697. A cartridge any of the preceding embodiments, wherein the inner diameter of the outer shell of the cartridge is between 430 cm to 490 cm.

698. A cartridge any of the preceding embodiments, wherein the inner diameter of the outer shell of the cartridge is between 250 cm to 510 cm.

699. A cartridge any of the preceding embodiments, wherein the inner diameter of the outer shell of the cartridge is between 250 cm to 370 cm.

700. A cartridge any of the preceding embodiments, wherein the inner diameter of the outer shell of the cartridge is between 90 cm to 130 cm.

701. A cartridge any of the preceding embodiments, wherein the inner diameter of the outer shell of the cartridge is between 390 cm to 450 cm.

702. A cartridge any of the preceding embodiments, wherein the inner diameter of the outer shell of the cartridge is between 90 cm to 170 cm.

703. A cartridge any of the preceding embodiments, wherein the inner diameter of the outer shell of the cartridge is between 70 cm to 410 cm.

704. A cartridge any of the preceding embodiments, wherein the inner diameter of the outer shell of the cartridge is between 170 cm to 290 cm.

705. A cartridge any of the preceding embodiments, wherein the inner diameter of the outer shell of the cartridge is between 330 cm to 490 cm.

706. A cartridge any of the preceding embodiments, wherein the inner diameter of the outer shell of the cartridge is between 190 cm to 230 cm.

707. A cartridge any of the preceding embodiments, wherein the inner diameter of the outer shell of the cartridge is between 430 cm to 470 cm.

708. A cartridge any of the preceding embodiments, wherein the inner diameter of the outer shell of the cartridge is between 310 cm to 430 cm.

709. A cartridge any of the preceding embodiments, wherein the inner diameter of the outer shell of the cartridge is between 230 cm to 470 cm.

710. A cartridge any of the preceding embodiments, wherein the inner diameter of the outer shell of the cartridge is between 70 cm to 490 cm.

711. A cartridge any of the preceding embodiments, wherein the inner diameter of the outer shell of the cartridge is between 270 cm to 510 cm.

712. A cartridge any of the preceding embodiments, wherein the inner diameter of the outer shell of the cartridge is between 70 cm to 250 cm.

713. A cartridge any of the preceding embodiments, wherein the inner diameter of the outer shell of the cartridge is between 150 cm to 410 cm.

714. A cartridge any of the preceding embodiments, wherein the inner diameter of the outer shell of the cartridge is between 150 cm to 490 cm.

715. A cartridge any of the preceding embodiments, wherein the inner diameter of the outer shell of the cartridge is between 350 cm to 410 cm.

716. A cartridge any of the preceding embodiments, wherein the inner diameter of the outer shell of the cartridge is between 130 cm to 250 cm.

717. A cartridge any of the preceding embodiments, wherein the inner diameter of the outer shell of the cartridge is between 370 cm to 470 cm.

718. A cartridge any of the preceding embodiments, wherein the inner diameter of the outer shell of the cartridge is between 170 cm to 330 cm.

719. A cartridge any of the preceding embodiments, wherein the inner diameter of the outer shell of the cartridge is between 150 cm to 290 cm.

720. A cartridge any of the preceding embodiments, wherein the inner diameter of the outer shell of the cartridge is between 170 cm to 390 cm.

721. A cartridge any of the preceding embodiments, wherein the inner diameter of the outer shell of the cartridge is between 330 cm to 350 cm.

722. A cartridge any of the preceding embodiments, wherein the inner diameter of the outer shell of the cartridge is between 210 cm to 250 cm.

723. A cartridge any of the preceding embodiments, wherein the inner diameter of the outer shell of the cartridge is between 350 cm to 510 cm.
724. A cartridge any of the preceding embodiments, wherein the inner diameter of the outer shell of the cartridge is between 190 cm to 350 cm.
725. A cartridge any of the preceding embodiments, wherein the inner diameter of the outer shell of the cartridge is between 170 cm to 270 cm.
726. A cartridge any of the preceding embodiments, wherein the inner diameter of the outer shell of the cartridge is between 250 cm to 470 cm.
727. A cartridge any of the preceding embodiments, wherein the inner diameter of the outer shell of the cartridge is between 150 cm to 430 cm.
728. A cartridge any of the preceding embodiments, wherein the inner diameter of the outer shell of the cartridge is between 170 cm to 210 cm.
729. A cartridge any of the preceding embodiments, wherein the inner diameter of the outer shell of the cartridge is between 110 cm to 190 cm.
730. A cartridge any of the preceding embodiments, wherein the inner diameter of the outer shell of the cartridge is between 290 cm to 430 cm.
731. A cartridge any of the preceding embodiments, wherein the inner diameter of the outer shell of the cartridge is between 450 cm to 510 cm.
732. A cartridge any of the preceding embodiments, wherein the inner diameter of the outer shell of the cartridge is between 150 cm to 210 cm.
733. A cartridge any of the preceding embodiments, wherein the inner diameter of the outer shell of the cartridge is between 230 cm to 410 cm.
734. A cartridge any of the preceding embodiments, wherein the inner diameter of the outer shell of the cartridge is between 70 cm to 510 cm.
735. A cartridge any of the preceding embodiments, wherein the inner diameter of the outer shell of the cartridge is between 330 cm to 370 cm.
736. A cartridge any of the preceding embodiments, wherein the inner diameter of the outer shell of the cartridge is between 50 cm to 290 cm.
737. A cartridge any of the preceding embodiments, wherein the inner diameter of the outer shell of the cartridge is between 290 cm to 330 cm.
738. A cartridge any of the preceding embodiments, wherein the inner diameter of the outer shell of the cartridge is between 450 cm to 490 cm.
739. A cartridge any of the preceding embodiments, wherein the inner diameter of the outer shell of the cartridge is between 150 cm to 450 cm.
740. A cartridge any of the preceding embodiments, wherein the inner diameter of the outer shell of the cartridge is between 150 cm to 270 cm.
741. A cartridge any of the preceding embodiments, wherein the inner diameter of the outer shell of the cartridge is between 190 cm to 330 cm.
742. A cartridge any of the preceding embodiments, wherein the inner diameter of the outer shell of the cartridge is between 410 cm to 450 cm.
743. A cartridge any of the preceding embodiments, wherein the inner diameter of the outer shell of the cartridge is between 190 cm to 470 cm.
744. A cartridge any of the preceding embodiments, wherein the inner diameter of the outer shell of the cartridge is between 90 cm to 450 cm.
745. A cartridge any of the preceding embodiments, wherein the inner diameter of the outer shell of the cartridge is between 70 cm to 270 cm.
746. A cartridge any of the preceding embodiments, wherein the inner diameter of the outer shell of the cartridge is between 50 cm to 350 cm.
747. A cartridge any of the preceding embodiments, wherein the inner diameter of the outer shell of the cartridge is between 190 cm to 250 cm.
748. A cartridge any of the preceding embodiments, wherein the inner diameter of the outer shell of the cartridge is between 90 cm to 330 cm.
749. A cartridge any of the preceding embodiments, wherein the inner diameter of the outer shell of the cartridge is between 50 cm to 150 cm.
750. A cartridge any of the preceding embodiments, wherein the inner diameter of the outer shell of the cartridge is between 90 cm to 110 cm.
751. A cartridge any of the preceding embodiments, wherein the inner diameter of the outer shell of the cartridge is between 150 cm to 370 cm.
752. A cartridge any of the preceding embodiments, wherein the inner diameter of the outer shell of the cartridge is between 290 cm to 410 cm.
753. A cartridge any of the preceding embodiments, wherein the inner diameter of the outer shell of the cartridge is between 50 cm to 170 cm.
754. A cartridge any of the preceding embodiments, wherein the inner diameter of the outer shell of the cartridge is between 130 cm to 290 cm.
755. A cartridge any of the preceding embodiments, wherein the inner diameter of the outer shell of the cartridge is between 470 cm to 490 cm.
756. A cartridge any of the preceding embodiments, wherein the inner diameter of the outer shell of the cartridge is between 110 cm to 210 cm.
757. A cartridge any of the preceding embodiments, wherein the inner diameter of the outer shell of the cartridge is between 310 cm to 330 cm.
758. A cartridge any of the preceding embodiments, wherein the inner diameter of the outer shell of the cartridge is between 70 cm to 170 cm.
759. A cartridge any of the preceding embodiments, wherein the inner diameter of the outer shell of the cartridge is between 110 cm to 450 cm.
760. A cartridge any of the preceding embodiments, wherein the inner diameter of the outer shell of the cartridge is between 70 cm to 150 cm.
761. A cartridge any of the preceding embodiments, wherein the inner diameter of the outer shell of the cartridge is between 50 cm to 230 cm.
762. A cartridge any of the preceding embodiments, wherein the inner diameter of the outer shell of the cartridge is between 110 cm to 290 cm.
763. A cartridge any of the preceding embodiments, wherein the inner diameter of the outer shell of the cartridge is between 130 cm to 190 cm.
764. A cartridge any of the preceding embodiments, wherein the inner diameter of the outer shell of the cartridge is between 70 cm to 190 cm.
765. A cartridge any of the preceding embodiments, wherein the inner diameter of the outer shell of the cartridge is between 130 cm to 410 cm.
766. A cartridge any of the preceding embodiments, wherein the inner diameter of the outer shell of the cartridge is between 90 cm to 510 cm.

767. A cartridge any of the preceding embodiments, wherein the inner diameter of the outer shell of the cartridge is between 230 cm to 270 cm.

768. A cartridge any of the preceding embodiments, wherein the inner diameter of the outer shell of the cartridge is between 170 cm to 250 cm.

769. A cartridge any of the preceding embodiments, wherein the inner diameter of the outer shell of the cartridge is between 110 cm to 150 cm.

770. A cartridge any of the preceding embodiments, wherein the inner diameter of the outer shell of the cartridge is between 270 cm to 470 cm.

771. A cartridge any of the preceding embodiments, wherein the inner diameter of the outer shell of the cartridge is between 250 cm to 310 cm.

772. A cartridge any of the preceding embodiments, wherein the inner diameter of the outer shell of the cartridge is between 90 cm to 490 cm.

773. A cartridge any of the preceding embodiments, wherein the inner diameter of the outer shell of the cartridge is between 250 cm to 490 cm.

774. A cartridge any of the preceding embodiments, wherein the inner diameter of the outer shell of the cartridge is between 250 cm to 390 cm.

775. A cartridge any of the preceding embodiments, wherein the inner diameter of the outer shell of the cartridge is between 150 cm to 230 cm.

776. A cartridge any of the preceding embodiments, wherein the inner diameter of the outer shell of the cartridge is between 190 cm to 370 cm.

777. A cartridge any of the preceding embodiments, wherein the inner diameter of the outer shell of the cartridge is between 130 cm to 450 cm.

778. A cartridge any of the preceding embodiments, wherein the inner diameter of the outer shell of the cartridge is between 310 cm to 410 cm.

779. A cartridge any of the preceding embodiments, wherein the inner diameter of the outer shell of the cartridge is between 230 cm to 350 cm.

780. A cartridge any of the preceding embodiments, wherein the inner diameter of the outer shell of the cartridge is between 70 cm to 290 cm.

781. A cartridge any of the preceding embodiments, wherein the inner diameter of the outer shell of the cartridge is between 50 cm to 330 cm.

782. A cartridge any of the preceding embodiments, wherein the inner diameter of the outer shell of the cartridge is between 90 cm to 470 cm.

783. A cartridge any of the preceding embodiments, wherein the inner diameter of the outer shell of the cartridge is between 110 cm to 330 cm.

784. A cartridge any of the preceding embodiments, wherein the inner diameter of the outer shell of the cartridge is between 350 cm to 470 cm.

785. A cartridge any of the preceding embodiments, wherein the inner diameter of the outer shell of the cartridge is between 110 cm to 170 cm.

786. A cartridge any of the preceding embodiments, wherein the inner diameter of the outer shell of the cartridge is between 150 cm to 350 cm.

787. A cartridge any of the preceding embodiments, wherein the inner diameter of the outer shell of the cartridge is between 110 cm to 370 cm.

788. A cartridge any of the preceding embodiments, wherein the inner diameter of the outer shell of the cartridge is between 390 cm to 470 cm.

789. A cartridge any of the preceding embodiments, wherein the inner diameter of the outer shell of the cartridge is between 130 cm to 390 cm.

790. A cartridge any of the preceding embodiments, wherein the inner diameter of the outer shell of the cartridge is between 210 cm to 470 cm.

791. A cartridge any of the preceding embodiments, wherein the inner diameter of the outer shell of the cartridge is between 90 cm to 230 cm.

792. A cartridge any of the preceding embodiments, wherein the inner diameter of the outer shell of the cartridge is between 310 cm to 510 cm.

793. A cartridge any of the preceding embodiments, wherein the inner diameter of the outer shell of the cartridge is between 110 cm to 310 cm.

794. A cartridge any of the preceding embodiments, wherein the inner diameter of the outer shell of the cartridge is between 90 cm to 310 cm.

795. A cartridge any of the preceding embodiments, wherein the inner diameter of the outer shell of the cartridge is between 330 cm to 510 cm.

796. A cartridge any of the preceding embodiments, wherein the inner diameter of the outer shell of the cartridge is between 250 cm to 450 cm.

797. A cartridge any of the preceding embodiments, wherein the inner diameter of the outer shell of the cartridge is between 170 cm to 490 cm.

798. A cartridge any of the preceding embodiments, wherein the inner diameter of the outer shell of the cartridge is between 490 cm to 510 cm.

799. A cartridge any of the preceding embodiments, wherein the inner diameter of the outer shell of the cartridge is between 390 cm to 510 cm.

800. A cartridge any of the preceding embodiments, wherein the inner diameter of the outer shell of the cartridge is between 270 cm to 430 cm.

801. A cartridge any of the preceding embodiments, wherein the inner diameter of the outer shell of the cartridge is between 130 cm to 270 cm.

802. A cartridge any of the preceding embodiments, wherein the inner diameter of the outer shell of the cartridge is between 210 cm to 450 cm.

803. A cartridge any of the preceding embodiments, wherein the inner diameter of the outer shell of the cartridge is between 270 cm to 410 cm.

804. A cartridge any of the preceding embodiments, wherein the inner diameter of the outer shell of the cartridge is between 210 cm to 410 cm.

805. A cartridge any of the preceding embodiments, wherein the inner diameter of the outer shell of the cartridge is between 50 cm to 190 cm.

806. A cartridge any of the preceding embodiments, wherein the inner diameter of the outer shell of the cartridge is between 250 cm to 410 cm.

807. A cartridge any of the preceding embodiments, wherein the inner diameter of the outer shell of the cartridge is between 150 cm to 170 cm.

808. A cartridge any of the preceding embodiments, wherein the inner diameter of the outer shell of the cartridge is between 190 cm to 450 cm.

809. A cartridge any of the preceding embodiments, wherein the inner diameter of the outer shell of the cartridge is between 330 cm to 450 cm.

810. A cartridge any of the preceding embodiments, wherein the inner diameter of the outer shell of the cartridge is between 110 cm to 430 cm.

811. A cartridge any of the preceding embodiments, wherein the inner diameter of the outer shell of the cartridge is between 370 cm to 430 cm.
812. A cartridge any of the preceding embodiments, wherein the inner diameter of the outer shell of the cartridge is between 70 cm to 130 cm.
813. A cartridge any of the preceding embodiments, wherein the inner diameter of the outer shell of the cartridge is between 170 cm to 510 cm.
814. A cartridge any of the preceding embodiments, wherein the inner diameter of the outer shell of the cartridge is between 130 cm to 150 cm.
815. A cartridge any of the preceding embodiments, wherein the inner diameter of the outer shell of the cartridge is between 270 cm to 310 cm.
816. A cartridge any of the preceding embodiments, wherein the inner diameter of the outer shell of the cartridge is between 230 cm to 450 cm.
817. A cartridge any of the preceding embodiments, wherein the inner diameter of the outer shell of the cartridge is between 290 cm to 350 cm.
818. A cartridge any of the preceding embodiments, wherein the inner diameter of the outer shell of the cartridge is between 130 cm to 170 cm.
819. A cartridge any of the preceding embodiments, wherein the inner diameter of the outer shell of the cartridge is between 430 cm to 450 cm.
820. A cartridge any of the preceding embodiments, wherein the inner diameter of the outer shell of the cartridge is between 170 cm to 190 cm.
821. A cartridge any of the preceding embodiments, wherein the inner diameter of the outer shell of the cartridge is between 70 cm to 470 cm.
822. A cartridge any of the preceding embodiments, wherein the inner diameter of the outer shell of the cartridge is between 430 cm to 510 cm.
823. A cartridge any of the preceding embodiments, wherein the inner diameter of the outer shell of the cartridge is between 50 cm to 90 cm.
824. A cartridge any of the preceding embodiments, wherein the inner diameter of the outer shell of the cartridge is between 190 cm to 430 cm.
825. A cartridge any of the preceding embodiments, wherein the inner diameter of the outer shell of the cartridge is between 50 cm to 310 cm.
826. A cartridge any of the preceding embodiments, wherein the inner diameter of the outer shell of the cartridge is between 270 cm to 330 cm.
827. A cartridge any of the preceding embodiments, wherein the inner diameter of the outer shell of the cartridge is between 350 cm to 430 cm.
828. A cartridge any of the preceding embodiments, wherein the inner diameter of the outer shell of the cartridge is between 290 cm to 310 cm.
829. A cartridge any of the preceding embodiments, wherein the inner diameter of the outer shell of the cartridge is between 50 cm to 410 cm.
830. A cartridge any of the preceding embodiments, wherein the inner diameter of the outer shell of the cartridge is between 70 cm to 390 cm.
831. A cartridge any of the preceding embodiments, wherein the inner diameter of the outer shell of the cartridge is between 70 cm to 370 cm.
832. A cartridge any of the preceding embodiments, wherein the inner diameter of the outer shell of the cartridge is between 50 cm to 270 cm.
833. A cartridge any of the preceding embodiments, wherein the inner diameter of the outer shell of the cartridge is between 190 cm to 510 cm.
834. A cartridge any of the preceding embodiments, wherein the inner diameter of the outer shell of the cartridge is between 370 cm to 490 cm.
835. A cartridge any of the preceding embodiments, wherein the inner diameter of the outer shell of the cartridge is between 270 cm to 390 cm.
836. A cartridge any of the preceding embodiments, wherein the inner diameter of the outer shell of the cartridge is between 110 cm to 490 cm.
837. A cartridge any of the preceding embodiments, wherein the inner diameter of the outer shell of the cartridge is between 110 cm to 230 cm.
838. A cartridge any of the preceding embodiments, wherein the inner diameter of the outer shell of the cartridge is between 130 cm to 350 cm.
839. A cartridge any of the preceding embodiments, wherein the inner diameter of the outer shell of the cartridge is between 110 cm to 350 cm.
840. A cartridge any of the preceding embodiments, wherein the inner diameter of the outer shell of the cartridge is between 350 cm to 390 cm.
841. A cartridge any of the preceding embodiments, wherein the inner diameter of the outer shell of the cartridge is between 310 cm to 450 cm.
842. A cartridge any of the preceding embodiments, wherein the inner diameter of the outer shell of the cartridge is between 190 cm to 210 cm.
843. A cartridge any of the preceding embodiments, wherein the inner diameter of the outer shell of the cartridge is between 230 cm to 330 cm.
844. A cartridge any of the preceding embodiments, wherein the inner diameter of the outer shell of the cartridge is between 210 cm to 390 cm.
845. A cartridge any of the preceding embodiments, wherein the inner diameter of the outer shell of the cartridge is between 90 cm to 250 cm.
846. A cartridge any of the preceding embodiments, wherein the inner diameter of the outer shell of the cartridge is between 210 cm to 230 cm.
847. A cartridge any of the preceding embodiments, wherein the inner diameter of the outer shell of the cartridge is between 450 cm to 470 cm.
848. A cartridge any of the preceding embodiments, wherein the inner diameter of the outer shell of the cartridge is between 50 cm to 70 cm.
849. A cartridge any of the preceding embodiments, wherein the inner diameter of the outer shell of the cartridge is between 270 cm to 350 cm.
850. A cartridge any of the preceding embodiments, wherein the inner diameter of the outer shell of the cartridge is between 290 cm to 470 cm.
851. A cartridge any of the preceding embodiments, wherein the inner diameter of the outer shell of the cartridge is between 330 cm to 410 cm.
852. A cartridge any of the preceding embodiments, wherein the inner diameter of the outer shell of the cartridge is between 130 cm to 470 cm.
853. A cartridge any of the preceding embodiments, wherein the inner diameter of the outer shell of the cartridge is between 50 cm to 130 cm.
854. A cartridge any of the preceding embodiments, wherein the inner diameter of the outer shell of the cartridge is between 90 cm to 210 cm.

855. A cartridge any of the preceding embodiments, wherein the inner diameter of the outer shell of the cartridge is between 410 cm to 490 cm.
856. A cartridge any of the preceding embodiments, wherein the inner diameter of the outer shell of the cartridge is between 330 cm to 470 cm.
857. A cartridge any of the preceding embodiments, wherein the inner diameter of the outer shell of the cartridge is between 230 cm to 490 cm.
858. A cartridge any of the preceding embodiments, wherein the inner diameter of the outer shell of the cartridge is between 90 cm to 270 cm.
859. A cartridge any of the preceding embodiments, wherein the inner diameter of the outer shell of the cartridge is between 190 cm to 290 cm.
860. A cartridge any of the preceding embodiments, wherein the inner diameter of the outer shell of the cartridge is between 250 cm to 270 cm.
861. A cartridge any of the preceding embodiments, wherein the inner diameter of the outer shell of the cartridge is between 370 cm to 390 cm.
862. A cartridge any of the preceding embodiments, wherein the inner diameter of the outer shell of the cartridge is between 50 cm to 250 cm.
863. A cartridge any of the preceding embodiments, wherein the inner diameter of the outer shell of the cartridge is between 110 cm to 510 cm.
864. A cartridge any of the preceding embodiments, wherein the inner diameter of the outer shell of the cartridge is between 410 cm to 430 cm.
865. A cartridge any of the preceding embodiments, wherein the inner diameter of the outer shell of the cartridge is between 210 cm to 370 cm.
866. A cartridge any of the preceding embodiments, wherein the inner diameter of the outer shell of the cartridge is between 410 cm to 510 cm.
867. A cartridge any of the preceding embodiments, wherein the inner diameter of the outer shell of the cartridge is between 390 cm to 410 cm.
868. A cartridge any of the preceding embodiments, wherein the inner diameter of the outer shell of the cartridge is between 190 cm to 390 cm.
869. A cartridge any of the preceding embodiments, wherein the inner diameter of the outer shell of the cartridge is between 350 cm to 370 cm.
870. A cartridge any of the preceding embodiments, wherein the inner diameter of the outer shell of the cartridge is between 270 cm to 370 cm.
871. A cartridge any of the preceding embodiments, wherein the inner diameter of the outer shell of the cartridge is between 130 cm to 510 cm.
872. A cartridge any of the preceding embodiments, wherein the inner diameter of the outer shell of the cartridge is between 150 cm to 330 cm.
873. A cartridge any of the preceding embodiments, wherein the inner diameter of the outer shell of the cartridge is between 90 cm to 370 cm.
874. A cartridge any of the preceding embodiments, wherein the inner diameter of the outer shell of the cartridge is between 90 cm to 430 cm.
875. A cartridge any of the preceding embodiments, wherein the inner diameter of the outer shell of the cartridge is between 90 cm to 390 cm.
876. A cartridge any of the preceding embodiments, wherein the inner diameter of the outer shell of the cartridge is between 290 cm to 450 cm.
877. A cartridge any of the preceding embodiments, wherein the inner diameter of the outer shell of the cartridge is between 370 cm to 450 cm.
878. A cartridge any of the preceding embodiments, wherein the inner diameter of the outer shell of the cartridge is between 50 cm to 430 cm.
879. A cartridge any of the preceding embodiments, wherein the inner diameter of the outer shell of the cartridge is between 50 cm to 210 cm.
880. A cartridge any of the preceding embodiments, wherein the inner diameter of the outer shell of the cartridge is between 370 cm to 410 cm.
881. A cartridge any of the preceding embodiments, wherein the inner diameter of the outer shell of the cartridge is between 210 cm to 430 cm.
882. A cartridge any of the preceding embodiments, wherein the inner diameter of the outer shell of the cartridge is between 350 cm to 490 cm.
883. A cartridge any of the preceding embodiments, wherein the inner diameter of the outer shell of the cartridge is between 270 cm to 290 cm.
884. A cartridge any of the preceding embodiments, wherein the inner diameter of the outer shell of the cartridge is between 210 cm to 290 cm.
885. A cartridge any of the preceding embodiments, wherein the inner diameter of the outer shell of the cartridge is between 70 cm to 450 cm.
886. A cartridge any of the preceding embodiments, wherein the inner diameter of the outer shell of the cartridge is between 170 cm to 370 cm.
887. A cartridge any of the preceding embodiments, wherein the inner diameter of the outer shell of the cartridge is between 250 cm to 430 cm.
888. A cartridge any of the preceding embodiments, wherein the cartridge is used in a bioreactor platform that support a single cartridge.
889. A cartridge any of the preceding embodiments, wherein the cartridge is used in a bioreactor platform that support multiple cartridges.
890. A bioreactor comprising a single cartridge any of the preceding embodiments.
891. A bioreactor comprising multiple cartridges any of the preceding embodiments.
892. A bioreactor any of the preceding embodiments, wherein satellite cells are cultivated.
893. A bioreactor any of the preceding embodiments, wherein mesenchymal stem cells are cultivated.
894. A bioreactor any of the preceding embodiments, wherein induced pluripotent stem cells are cultivated.
895. A bioreactor any of the preceding embodiments, wherein myocytes are cultivated.
896. A bioreactor any of the preceding embodiments, wherein fibroblasts are cultivated.
897. A bioreactor any of the preceding embodiments, wherein adipocytes are cultivated.
898. A bioreactor any of the preceding embodiments, wherein engineered cells. are cultivated.
899. A bioreactor any of the preceding embodiments, wherein a single type of cells is cultivated, thereby constituting a homo-culture.
900. A bioreactor any of the preceding embodiments, wherein a combination of cell types is cultivated, thereby constituting a co-culture.
901. A bioreactor any of the preceding embodiments, wherein cells derived from non-animal protein sources are cultivated.

2.3 Food Product Embodiments

1. A food product comprising one or more hollow fibres of any disclosed composition embodiments which is a cultured meat product.
2. A food product comprising one or more hollow fibres of any disclosed composition embodiments and a plurality of cells.
3. A food product comprising polypeptides, which have been covalently-crosslinked with ester, thioester and/or amide bonds as derived from one or more hollow fibres of any disclosed composition embodiments.
4. A food product of any of the preceding composition embodiments, wherein the food product additionally comprises supplementary polypeptides.
5. A food product of any of the preceding composition embodiments, wherein the food product additionally comprises polysaccharides.
6. A food product of any of the preceding composition embodiments, wherein the food product additionally comprises lipids.
7. A food product of any of the preceding composition embodiments, wherein the food product additionally comprises an animal-derived food product.
8. A food product of any of the preceding composition embodiments, wherein the food product additionally comprises proteins.
9. A food product of any of the preceding composition embodiments, wherein the food product additionally comprises non-animal proteins.
10. A food product of any of the preceding composition embodiments, wherein the food product additionally comprises sweeteners.
11. A food product of any of the preceding composition embodiments, wherein the food product additionally comprises colouring agents.
12. A food product of any of the preceding composition embodiments, wherein the food product additionally comprises preservatives.
13. A food product of any of the preceding composition embodiments, wherein the food product additionally comprises antioxidants.
14. A food product of any of the preceding composition embodiments, wherein the food product additionally comprises carriers.
15. A food product of any of the preceding composition embodiments, wherein the food product additionally comprises acidity regulators.
16. A food product of any of the preceding composition embodiments, wherein the food product additionally comprises anti-caking agents.
17. A food product of any of the preceding composition embodiments, wherein the food product additionally comprises anti-foaming agents.
18. A food product of any of the preceding composition embodiments, wherein the food product additionally comprises bulking agents.
19. A food product of any of the preceding composition embodiments, wherein the food product additionally comprises emulsifiers.
20. A food product of any of the preceding composition embodiments, wherein the food product additionally comprises emulsifying salts.
21. A food product of any of the preceding composition embodiments, wherein the food product additionally comprises firming agents.
22. A food product of any of the preceding composition embodiments, wherein the food product additionally comprises flavour enhancers.
23. A food product of any of the preceding composition embodiments, wherein the food product additionally comprises foaming agents.
24. A food product of any of the preceding composition embodiments, wherein the food product additionally comprises gelling agents.
25. A food product of any of the preceding composition embodiments, wherein the food product additionally comprises glazing agents.
26. A food product of any of the preceding composition embodiments, wherein the food product additionally comprises modified starches.
27. A food product of any of the preceding composition embodiments, wherein the food product additionally comprises raising agents.
28. A food product of any of the preceding composition embodiments, wherein the food product additionally comprises sequestrants.
29. A food product of any of the preceding composition embodiments, wherein the food product additionally comprises stabilisers.
30. A food product of any of the preceding composition embodiments, wherein the food product additionally comprises thickeners.
31. A plurality of cells growing on one or more hollow fibres of any disclosed composition embodiments.
32. A plurality of cells growing on a single hollow fibre of any disclosed composition embodiments.
33. A plurality of cells growing on a plurality of hollow fibres of any disclosed composition embodiments.
34. A plurality of cells growing in a suspension around a single hollow fibre of any disclosed composition embodiments.
35. A plurality of cells growing in a suspension around a plurality of hollow fibres of any disclosed composition embodiments.
36. A plurality of living and dead cells on a plurality of hollow fibres of any disclosed composition embodiments.
37. A plurality of living cells on a plurality of hollow fibres of any disclosed composition embodiments.
38. A plurality of dead cells on a plurality of hollow fibres of any disclosed composition embodiments.
39. A food product of any of the preceding composition embodiments, wherein the cross-section of the food product comprises a plurality of crosslinked polypeptide rings that are interlaced with a cellular mass.
40. A food product of any of the preceding composition embodiments, wherein the cross-section of the food product comprises a plurality of rings derived from the hollow fibres of this disclosure that are interlaced with a cellular mass.
41. A food product of any of the preceding composition embodiments, wherein the cross-section of the food product comprises a plurality of rings filled with lipids and polysaccharides.
42. A food product of any of the preceding composition embodiments, wherein the cross-section of the food product comprises a plurality of rings filled with lipids.
43. A food product of any of the preceding composition embodiments, wherein the cross-section of the food product comprises a plurality of rings filled with polysaccharides.

44. A food product of any of the preceding composition embodiments, wherein the cross-section of the food product comprises a plurality of crosslinked polypeptide striations that are interlaced with a cellular mass.
45. A food product of any of the preceding composition embodiments, wherein the cross-section of the food product comprises a plurality of striations derived from the hollow fibres of this disclosure that are interlaced with a cellular mass.
46. A food product of any of the preceding composition embodiments, wherein the cross-section of the food product comprises a plurality of striations filled with lipids and polysaccharides.
47. A food product of any of the preceding composition embodiments, wherein the cross-section of the food product comprises a plurality of striations filled with lipids.
48. A food product of any of the preceding composition embodiments, wherein the cross-section of the food product comprises a plurality of striations filled with polysaccharides.
49. A food product of any of the preceding composition embodiments, wherein the cross-section of the food product is cylindrical.
50. A food product of any of the preceding composition embodiments, wherein the cross-section of the food product is near circular.
51. A food product of any of the preceding composition embodiments, wherein the cross-section of the food product is an oval.
52. A food product of any of the preceding composition embodiments, wherein the cross-section of the food product is a square.
53. A food product of any of the preceding composition embodiments, wherein the cross-section of the food product is a rectangle.
54. A food product of any of the preceding composition embodiments, wherein the cross-section of the food product is a triangle.
55. A food product of any of the preceding composition embodiments, wherein the cross-section of the food product is a pentagon.
56. A food product of any of the preceding composition embodiments, wherein the cross-section of the food product is a hexagon.
57. A food product of any of the preceding composition embodiments, wherein the cross-section of the food product is a polygon.
58. A food product of any of the preceding composition embodiments, wherein the food product is whole.
59. A food product of any of the preceding composition embodiments, wherein the food product is sliced.
60. A food product of any of the preceding composition embodiments, wherein the food product is cut.
61. A food product of any of the preceding composition embodiments, wherein the food product is sectioned.
62. A food product of any of the preceding composition embodiments, wherein the food product is minced.
63. A food product of any of the preceding composition embodiments, wherein the food product is pounded.
64. A food product of any of the preceding composition embodiments, wherein the food product is ground.
65. A food product of any of the preceding composition embodiments, wherein the food product is reformed.
66. A food product of any of the preceding composition embodiments, wherein the food product has been heated treated.
67. A food product of any of the preceding composition embodiments, wherein the food product has been cooked.
68. A food product of any of the preceding composition embodiments, wherein the food product has been canned (tinned).
69. A food product of any of the preceding composition embodiments, wherein the food product has undergone chemical preservation.
70. A food product of any of the preceding composition embodiments, wherein the food product has been chilled.
71. A food product of any of the preceding composition embodiments, wherein the food product has been dehydrated.
72. A food product of any of the preceding composition embodiments, wherein the food product has undergone fermentation.
73. A food product of any of the preceding composition embodiments, wherein the food product has been freeze-dried.
74. A food product of any of the preceding composition embodiments, wherein the food product has been frozen.
75. A food product of any of the preceding composition embodiments, wherein the food product has undergone high-pressure processing.
76. A food product of any of the preceding composition embodiments, wherein the food product has been irradiated.
77. A food product of any of the preceding composition embodiments, wherein the food product has been packed in a modified atmosphere.
78. A food product of any of the preceding composition embodiments, wherein the food product has undergone pickling.
79. A food product of any of the preceding composition embodiments, wherein the food product has been salted.
80. A food product of any of the preceding composition embodiments, wherein the food product has been smoked.
81. A food product of any of the preceding composition embodiments, wherein the food product has been sugared.
82. A food product of any of the preceding composition embodiments, wherein the food product has been vacuum-packed.

2.4 Process Embodiments—Hollow Fibres

1. A process for the production of semi-permeable, porous hollow fibres, comprising covalently-crosslinked polypeptides, the process comprising the steps:
  a. combining:
    i. a first composition comprising polypeptides, with
    ii. a second composition comprising a solvent and one or more denaturing agents and/or reducing agents, to produce a third composition;
  b. incubating the third composition under conditions sufficient to solubilise, denature and/or reduce at least a fraction of the polypeptides, and to produce a fourth composition;
  c. extruding or spinning the fourth composition, together with a bore solution, through a plurality of co-axial orifices to produce hollow fibres;

d. treating the hollow fibres with a polycarboxylic acid crosslinking reagent in order to form inter-polypeptide and/or intra-polypeptide polycarboxylic acid derived ester, thioester or amide covalent bond crosslinks within at least a fraction of the polypeptides in the hollow fibres to produce covalently-crosslinked, semi-permeable, porous hollow fibres hollow fibres;

e. treating the covalently-crosslinked, semi-permeable, porous hollow fibres with one of more post-production modification processes selected from the group consisting of:
   i. treating the covalently-crosslinked, semi-permeable, porous hollow fibres with an organic solvent to increase the relative abundance of beta-sheets in the secondary structure of the polypeptides; and
   ii. annealing the covalently-crosslinked, semi-permeable, porous hollow fibres;
   iii. treating the covalently-crosslinked semi-permeable, porous hollow fibres to remove void inclusion elements in the hollow fibres;
   iv. washing the covalently-crosslinked semi-permeable, porous hollow fibres with one or more acid(s), alkali(s) and/or buffer solution(s) to decrease at least one of, the Young's modulus, ultimate tensile strength and/or ultimate tensile strain of the hollow fibres;
   v. coating the covalently-crosslinked semi-permeable, porous hollow fibres;
   vi. modifying the surface topography of the covalently-crosslinked, semi-permeable, porous hollow fibres to aid cell attachment and/or cell alignment;
   to produce a plurality of treated covalently-crosslinked, semi-permeable, porous hollow fibres hollow fibres; and
f. drying the treated covalently-crosslinked, semi-permeable, porous hollow fibres, to produce dried, treated covalently-crosslinked, semi-permeable, porous hollow fibres.

2. A process for the production of the hollow fibres of this disclosure, the process comprising the steps:
a. combining:
   i. a first composition comprising polypeptides, with
   ii. a second composition comprising a solvent and one or more denaturing agents and/or reducing agents, to produce a third composition;
b. incubating the third composition to produce a fourth composition;
c. extruding or spinning the fourth composition, together with a bore solution, through a plurality of co-axial orifices to produce hollow fibres;
d. treating the hollow fibres with a polycarboxylic acid crosslinking reagent to produce covalently-crosslinked, semi-permeable, porous hollow fibres hollow fibres;
e. treating the covalently-crosslinked, semi-permeable, porous hollow fibres with one of more post-production modification processes selected from the group consisting of:
   i. treating the covalently-crosslinked, semi-permeable, porous hollow fibres with an organic solvent;
   ii. annealing the covalently-crosslinked, semi-permeable, porous hollow fibres;
   iii. treating the covalently-crosslinked semi-permeable, porous hollow fibres to remove void inclusion elements in the hollow fibres;
   iv. washing the covalently-crosslinked semi-permeable, porous hollow fibres with one or more acid(s), alkali(s) and/or buffer solution(s);
   v. coating the covalently-crosslinked semi-permeable, porous hollow fibres;
   vi. modifying the surface topography of the covalently-crosslinked, semi-permeable, porous hollow fibres;
   to produce a plurality of treated covalently-crosslinked, semi-permeable, porous hollow fibres hollow fibres; and
f. drying the treated covalently-crosslinked, semi-permeable, porous hollow fibres, to produce dried, treated covalently-crosslinked, semi-permeable, porous hollow fibres.

3. A process for the production of semi-permeable, porous hollow fibres, comprising covalently-crosslinked polypeptides, the process comprising the steps:
a. combining:
   i. a first composition comprising polypeptides, with
   ii. a second composition comprising a solvent and one or more denaturing agents and/or reducing agents, to produce a third composition;
b. incubating the third composition under conditions sufficient to solubilise, denature and/or reduce at least a fraction of the polypeptides, and to produce a fourth composition;
c. extruding or spinning the fourth composition, together with a bore solution, through a plurality of co-axial orifices to produce hollow fibres;
d. treating the hollow fibres with a polycarboxylic acid crosslinking reagent in order to form inter-polypeptide and/or intra-polypeptide polycarboxylic acid derived ester, thioester or amide covalent bond crosslinks within at least a fraction of the polypeptides in the hollow fibres to produce covalently-crosslinked, semi-permeable, porous hollow fibres hollow fibres;
e. treating the covalently-crosslinked, semi-permeable, porous hollow fibres with one of more post-production modification processes selected from the group consisting of:
   i. treating the covalently-crosslinked, semi-permeable, porous hollow fibres with an organic solvent to increase the relative abundance of beta-sheets in the secondary structure of the polypeptides; and
   ii. annealing the covalently-crosslinked, semi-permeable, porous hollow fibres;
   iii. treating the covalently-crosslinked semi-permeable, porous hollow fibres with a solvent to remove void inclusion elements in the hollow fibres;
   iv. washing the covalently-crosslinked semi-permeable, porous hollow fibres with one or more acid(s), alkali(s) and/or buffer solution(s) to decrease at least one of, the Young's modulus, ultimate tensile strength and/or ultimate tensile strain of the hollow fibres;
   v. coating the covalently-crosslinked semi-permeable, porous hollow fibres;
   vi. modifying the surface topography of the covalently-crosslinked, semi-permeable, porous hollow fibres to aid cell attachment and/or cell alignment;
   to produce a plurality of treated covalently-crosslinked, semi-permeable, porous hollow fibres hollow fibres; and f. drying the treated covalently-crosslinked, semi-permeable, porous hollow fibres, to produce dried, treated covalently-crosslinked, semi-permeable, porous hollow fibres.

4. A process for the production of semi-permeable, porous hollow fibres, comprising covalently-crosslinked polypeptides, the process comprising the steps:
   a. combining:
      iii. a first composition comprising polypeptides, with
      iv. a second composition comprising a solvent and one or more denaturing agents and/or reducing agents, to produce a third composition;
   b. incubating the third composition under conditions sufficient to solubilise, denature and/or reduce at least a fraction of the polypeptides, and to produce a fourth composition;
   c. extruding or spinning the fourth composition, together with a bore solution, through a plurality of co-axial orifices to produce hollow fibres;
   d. treating the hollow fibres with a polycarboxylic acid crosslinking reagent in order to form inter-polypeptide and/or intra-polypeptide polycarboxylic acid derived ester, thioester or amide covalent bond crosslinks within at least a fraction of the polypeptides in the hollow fibres to produce covalently-crosslinked, semi-permeable, porous hollow fibres hollow fibres;
   e. treating the covalently-crosslinked, semi-permeable, porous hollow fibres with one of more post-production modification processes selected from the group consisting of:
      i. treating the covalently-crosslinked, semi-permeable, porous hollow fibres with an organic solvent to increase the relative abundance of beta-sheets in the secondary structure of the polypeptides; and
      ii. annealing the covalently-crosslinked, semi-permeable, porous hollow fibres;
      iii. treating the covalently-crosslinked semi-permeable, porous hollow fibres with pyrolysis-induced pore formation to remove void inclusion elements in the hollow fibres;
      iv. washing the covalently-crosslinked semi-permeable, porous hollow fibres with one or more acid(s), alkali(s) and/or buffer solution(s) to decrease at least one of, the Young's modulus, ultimate tensile strength and/or ultimate tensile strain of the hollow fibres;
      v. coating the covalently-crosslinked semi-permeable, porous hollow fibres;
      vi. modifying the surface topography of the covalently-crosslinked, semi-permeable, porous hollow fibres to aid cell attachment and/or cell alignment;
   to produce a plurality of treated covalently-crosslinked, semi-permeable, porous hollow fibres hollow fibres; and
   f. drying the treated covalently-crosslinked, semi-permeable, porous hollow fibres, to produce dried, treated covalently-crosslinked, semi-permeable, porous hollow fibres.

5. A process for the production of Prokitein, the process comprising the steps:
   a. combining:
      i. a first composition comprising polypeptides, with
      ii. a second composition comprising a solvent and one or more denaturing agents and/or reducing agents, to produce a third composition;
   b. incubating the third composition to produce a fourth composition;
   c. treating the fourth composition with a polycarboxylic acid crosslinking reagent to produce covalently-crosslinked polypeptides;
   d. treating the covalently-crosslinked polypeptides with an organic solvent;
   e. annealing the covalently-crosslinked polypeptides; and
   f. optionally, treating the covalently-crosslinked polypeptides with one of more post-production modification processes selected from the group consisting of:
      i. treating the covalently-crosslinked polypeptides with a solvent to remove void inclusion elements; and
      ii. drying the covalently-crosslinked polypeptides;
   to produce to produce Prokitein.

6. A process for the production of a regular semi-crystalline polymer comprising ester, thioester and/or amide crosslinked polypeptides with a beta-sheet secondary structure, the process comprising the steps:
   a. combining:
      i. a first composition comprising polypeptides, with
      ii. a second composition comprising a solvent and one or more denaturing agents and/or reducing agents, to produce a third composition;
   b. incubating the third composition to produce a fourth composition;
   c. treating the fourth composition with a polycarboxylic acid crosslinking reagent to produce covalently-crosslinked polypeptides;
   d. treating the covalently-crosslinked polypeptides with an organic solvent;
   e. annealing the covalently-crosslinked polypeptides; and
   f. optionally, treating the covalently-crosslinked polypeptides with one of more post-production modification processes selected from the group consisting of:
      i. treating the covalently-crosslinked polypeptides with a solvent to remove void inclusion elements; and
      ii. drying the covalently-crosslinked polypeptides;
   to produce to produce a regular semi-crystalline polymer comprising ester, thioester and/or amide crosslinked polypeptides with a beta-sheet secondary structure.

7. The process of any one of the preceding process embodiments, further providing that the first composition comprises polypeptides derived from legumes, nuts, seeds, cereals and tubers.

8. The process of any one of the preceding process embodiments, further providing that the first composition comprises polypeptides derived from chickpeas, lentils, kidney beans, black beans, navy beans, lima beans, pinto beans, soybeans, mung beans, adzuki beans, fava beans, black-eyed peas, green peas, snow peas, sugar snap peas, split peas, almonds, walnuts, pistachios, cashews, brazil nuts, hazelnuts, macadamia nuts, pecans, pine nuts, peanuts, chestnuts, coconuts, sunflower, pumpkin, chia, flax, sesame, hemp, poppy, quinoa, cumin, fennel, coriander, mustard, caraway, cardamom, fenugreek, ajwain, anise, nigella, wheat, rice, corn/maize, oats, barley, rye, millet, sorghum, quinoa, buckwheat, spelt, triticale, amaranth, teff, farro, kamut, freekeh, emmer, fonio, potatoes, sweet potatoes, yams, cassava, taro, jicama, jerusalem artichoke, water chestnut, chinese yam, malanga, arrowroot, ginger, turmeric, turnips and/or beets.

9. The process of any one of the preceding process embodiments, further providing that the first composition comprises polypeptides derived from chickpeas, lentils, kidney beans, black beans, navy beans, lima beans, pinto beans, soybeans, mung beans, adzuki beans, fava beans, black-eyed peas, green peas, snow peas, sugar snap peas, and/or split peas.

10. The process of any one of the preceding process embodiments, further providing that the first composition comprises polypeptides derived from anasazi beans, cannellini beans, cocoa beans, coffee beans, cranberry beans, edamame, fayot (flageolet) beans, french green bean, gigante beans, great northern beans, long beans, marrowfat peas, fava beans (faba beans, broad beans), and/or purple string beans.

11. The process of any one of the preceding process embodiments, further providing that the first composition comprises polypeptides derived from almonds, walnuts, pistachios, cashews, brazil nuts, hazelnuts, macadamia nuts, pecans, pine nuts, peanuts, chestnuts and/or coconuts.

12. The process of any one of the preceding process embodiments, further providing that the first composition comprises polypeptides derived from sunflower, pumpkin, chia, flax, sesame, hemp, poppy, quinoa, cumin, fennel, coriander, mustard, caraway, cardamom, fenugreek, ajwain, anise, nigella.

13. The process of any one of the preceding process embodiments, further providing that the first composition comprises polypeptides derived from wheat, rice, corn/maize, oats, barley, rye, millet, sorghum, quinoa, buckwheat, spelt, triticale, amaranth, teff, farro, kamut, freekeh, emmer, and/or fonio.

14. The process of any one of the preceding process embodiments, further providing that the first composition comprises polypeptides derived from potatoes, sweet potatoes, yams, cassava, taro, jicama, jerusalem artichoke, water chestnut, chinese yam, malanga, arrowroot, ginger, turmeric, turnips and/or beets.

15. The process of any one of the preceding process embodiments, further providing that the first composition comprises polypeptides derived from plants.

16. The process of any one of the preceding process embodiments, further providing that the first composition comprises polypeptides derived from hemp.

17. The process of any one of the preceding process embodiments, further providing that the first composition comprises polypeptides derived from mung beans.

18. The process of any one of the preceding process embodiments, further providing that the first composition comprises polypeptides derived from wheat.

19. The process of any one of the preceding process embodiments, further providing that the first composition comprises polypeptides derived from beets.

20. The process of any one of the preceding process embodiments, further providing that the first composition comprises polypeptides derived from pine nuts.

21. The process of any one of the preceding process embodiments, further providing that the first composition comprises polypeptides derived from snow peas.

22. The process of any one of the preceding process embodiments, further providing that the first composition comprises polypeptides derived from spelt.

23. The process of any one of the preceding process embodiments, further providing that the first composition comprises polypeptides derived from split peas.

24. The process of any one of the preceding process embodiments, further providing that the first composition comprises polypeptides derived from anasazi beans.

25. The process of any one of the preceding process embodiments, further providing that the first composition comprises polypeptides derived from cannellini beans.

26. The process of any one of the preceding process embodiments, further providing that the first composition comprises polypeptides derived from cocoa beans.

27. The process of any one of the preceding process embodiments, further providing that the first composition comprises polypeptides derived from coffee beans.

28. The process of any one of the preceding process embodiments, further providing that the first composition comprises polypeptides derived from cranberry beans.

29. The process of any one of the preceding process embodiments, further providing that the first composition comprises polypeptides derived from edamame beans, 30. The process of any one of the preceding process embodiments, further providing that the first composition comprises polypeptides derived from fayot (flageolet) beans.

31. The process of any one of the preceding process embodiments, further providing that the first composition comprises polypeptides derived from french green bean.

32. The process of any one of the preceding process embodiments, further providing that the first composition comprises polypeptides derived from gigante beans.

33. The process of any one of the preceding process embodiments, further providing that the first composition comprises polypeptides derived from great northern beans.

34. The process of any one of the preceding process embodiments, further providing that the first composition comprises polypeptides derived from long beans.

35. The process of any one of the preceding process embodiments, further providing that the first composition comprises polypeptides derived from marrowfat peas.

36. The process of any one of the preceding process embodiments, further providing that the first composition comprises polypeptides derived from purple string beans.

37. The process of any one of the preceding process embodiments, further providing that the first composition comprises polypeptides derived from malanga.

38. The process of any one of the preceding process embodiments, further providing that the first composition comprises polypeptides derived from water chestnut.

39. The process of any one of the preceding process embodiments, further providing that the first composition comprises polypeptides derived from black-eyed peas.

40. The process of any one of the preceding process embodiments, further providing that the first composition comprises polypeptides derived from jerusalem artichoke.

41. The process of any one of the preceding process embodiments, further providing that the first composition comprises polypeptides derived from peanuts.
42. The process of any one of the preceding process embodiments, further providing that the first composition comprises polypeptides derived from sugar snap peas.
43. The process of any one of the preceding process embodiments, further providing that the first composition comprises polypeptides derived from kamut.
44. The process of any one of the preceding process embodiments, further providing that the first composition comprises polypeptides derived from yams.
45. The process of any one of the preceding process embodiments, further providing that the first composition comprises polypeptides derived from lima beans.
46. The process of any one of the preceding process embodiments, further providing that the first composition comprises polypeptides derived from cassava.
47. The process of any one of the preceding process embodiments, further providing that the first composition comprises polypeptides derived from kidney beans.
48. The process of any one of the preceding process embodiments, further providing that the first composition comprises polypeptides derived from millet.
49. The process of any one of the preceding process embodiments, further providing that the first composition comprises polypeptides derived from chickpeas.
50. The process of any one of the preceding process embodiments, further providing that the first composition comprises polypeptides derived from triticale.
51. The process of any one of the preceding process embodiments, further providing that the first composition comprises polypeptides derived from rye.
52. The process of any one of the preceding process embodiments, further providing that the first composition comprises polypeptides derived from anise.
53. The process of any one of the preceding process embodiments, further providing that the first composition comprises polypeptides derived from hazelnuts.
54. The process of any one of the preceding process embodiments, further providing that the first composition comprises polypeptides derived from corn/maize.
55. The process of any one of the preceding process embodiments, further providing that the first composition comprises polypeptides derived from barley.
56. The process of any one of the preceding process embodiments, further providing that the first composition comprises polypeptides derived from macadamia nuts.
57. The process of any one of the preceding process embodiments, further providing that the first composition comprises polypeptides derived from soybeans.
58. The process of any one of the preceding process embodiments, further providing that the first composition comprises polypeptides derived from teff.
59. The process of any one of the preceding process embodiments, further providing that the first composition comprises polypeptides derived from potatoes.
60. The process of any one of the preceding process embodiments, further providing that the first composition comprises polypeptides derived from quinoa.
61. The process of any one of the preceding process embodiments, further providing that the first composition comprises polypeptides derived from chestnuts.
62. The process of any one of the preceding process embodiments, further providing that the first composition comprises polypeptides derived from jicama.
63. The process of any one of the preceding process embodiments, further providing that the first composition comprises polypeptides derived from arrowroot.
64. The process of any one of the preceding process embodiments, further providing that the first composition comprises polypeptides derived from black beans.
65. The process of any one of the preceding process embodiments, further providing that the first composition comprises polypeptides derived from fenugreek.
66. The process of any one of the preceding process embodiments, further providing that the first composition comprises polypeptides derived from green peas.
67. The process of any one of the preceding process embodiments, further providing that the first composition comprises polypeptides derived from emmer.
68. The process of any one of the preceding process embodiments, further providing that the first composition comprises polypeptides derived from nigella.
69. The process of any one of the preceding process embodiments, further providing that the first composition comprises polypeptides derived from sweet potatoes.
70. The process of any one of the preceding process embodiments, further providing that the first composition comprises polypeptides derived from turmeric.
71. The process of any one of the preceding process embodiments, further providing that the first composition comprises polypeptides derived from fonio.
72. The process of any one of the preceding process embodiments, further providing that the first composition comprises polypeptides derived from caraway.
73. The process of any one of the preceding process embodiments, further providing that the first composition comprises polypeptides derived from walnuts.
74. The process of any one of the preceding process embodiments, further providing that the first composition comprises polypeptides derived from adzuki beans.
75. The process of any one of the preceding process embodiments, further providing that the first composition comprises polypeptides derived from fava beans.
76. The process of any one of the preceding process embodiments, further providing that the first composition comprises polypeptides derived from mustard.
77. The process of any one of the preceding process embodiments, further providing that the first composition comprises polypeptides derived from amaranth.
78. The process of any one of the preceding process embodiments, further providing that the first composition comprises polypeptides derived from pumpkin.
79. The process of any one of the preceding process embodiments, further providing that the first composition comprises polypeptides derived from rice.
80. The process of any one of the preceding process embodiments, further providing that the first composition comprises polypeptides derived from almonds.
81. The process of any one of the preceding process embodiments, further providing that the first composition comprises polypeptides derived from coconuts.
82. The process of any one of the preceding process embodiments, further providing that the first composition comprises polypeptides derived from turnips.

83. The process of any one of the preceding process embodiments, further providing that the first composition comprises polypeptides derived from sunflower.
84. The process of any one of the preceding process embodiments, further providing that the first composition comprises polypeptides derived from navy beans.
85. The process of any one of the preceding process embodiments, further providing that the first composition comprises polypeptides derived from lentils.
86. The process of any one of the preceding process embodiments, further providing that the first composition comprises polypeptides derived from buckwheat.
87. The process of any one of the preceding process embodiments, further providing that the first composition comprises polypeptides derived from taro.
88. The process of any one of the preceding process embodiments, further providing that the first composition comprises polypeptides derived from farro.
89. The process of any one of the preceding process embodiments, further providing that the first composition comprises polypeptides derived from brazil nuts.
90. The process of any one of the preceding process embodiments, further providing that the first composition comprises polypeptides derived from cashews.
91. The process of any one of the preceding process embodiments, further providing that the first composition comprises polypeptides derived from pinto beans.
92. The process of any one of the preceding process embodiments, further providing that the first composition comprises polypeptides derived from sorghum.
93. The process of any one of the preceding process embodiments, further providing that the first composition comprises polypeptides derived from cardamom.
94. The process of any one of the preceding process embodiments, further providing that the first composition comprises polypeptides derived from sesame.
95. The process of any one of the preceding process embodiments, further providing that the first composition comprises polypeptides derived from freekeh.
96. The process of any one of the preceding process embodiments, further providing that the first composition comprises polypeptides derived from ajwain.
97. The process of any one of the preceding process embodiments, further providing that the first composition comprises polypeptides derived from fennel.
98. The process of any one of the preceding process embodiments, further providing that the first composition comprises polypeptides derived from oats.
99. The process of any one of the preceding process embodiments, further providing that the first composition comprises polypeptides derived from flax.
100. The process of any one of the preceding process embodiments, further providing that the first composition comprises polypeptides derived from ginger.
101. The process of any one of the preceding process embodiments, further providing that the first composition comprises polypeptides derived from coriander.
102. The process of any one of the preceding process embodiments, further providing that the first composition comprises polypeptides derived from chia.
103. The process of any one of the preceding process embodiments, further providing that the first composition comprises polypeptides derived from chinese yam.
104. The process of any one of the preceding process embodiments, further providing that the first composition comprises polypeptides derived from pistachios.
105. The process of any one of the preceding process embodiments, further providing that the first composition comprises polypeptides derived from quinoa.
106. The process of any one of the preceding process embodiments, further providing that the first composition comprises polypeptides derived from cumin.
107. The process of any one of the preceding process embodiments, further providing that the first composition comprises polypeptides derived from poppy.
108. The process of any one of the preceding process embodiments, further providing that the first composition comprises polypeptides derived from pecans.
109. The process of any one of the preceding process embodiments, further providing that the first composition comprises polypeptides derived from mammals, marsupials, birds, fish, cephalopods, crustaceans and insects.
110. The process of any one of the preceding process embodiments, further providing that the first composition comprises polypeptides derived from cattle, sheep, pig, horse, goat, deer, reindeer, bison, moose, elk, camel, wild boar, wildebeest, and/or guinea pig.
111. The process of any one of the preceding process embodiments, further providing that the first composition comprises polypeptides derived from kangaroo, koala, wombat.
112. The process of any one of the preceding process embodiments, further providing that the first composition comprises polypeptides derived from chicken, turkey, duck, goose, quail, pheasant, guineafowl, ostrich, emu, pigeon, partridge, grouse, snipe, and/or woodcock.
113. The process of any one of the preceding process embodiments, further providing that the first composition comprises polypeptides derived from salmon, tuna, cod, trout, sardines, haddock, tilapia, catfish, mackerel, swordfish, halibut, dolphinfish, grouper, snapper, sea bass, anchovy, carp, perch, pike, flounder, sole, eel, herring, whitefish, and/or crawfish.
114. The process of any one of the preceding process embodiments, further providing that the first composition comprises polypeptides derived from squid, octopus, cuttlefish, and/or nautilus.
115. T The process of any one of the preceding process embodiments, further providing that the first composition comprises polypeptides derived from shrimp, crab, lobster, crawfish, prawn, krill, crayfish, mussel, oyster, clam, scallop, and/or cockle.
116. The process of any one of the preceding process embodiments, further providing that the first composition comprises polypeptides derived from snakes, turtles, alligators, crocodiles, iguanas, and/or lizards.
117. The process of any one of the preceding process embodiments, further providing that the first composition comprises polypeptides derived from grasshopper, cricket, mealworm, beetle, ant, termite, cicada, caterpillar, silkworm, locust, waxworm, hornworm, bamboo worm, scorpion, and/or centipede.
118. The process of any one of the preceding process embodiments, further providing that the first composition comprises polypeptides derived from cattle, sheep, pig, horse, goat, deer, reindeer, bison, moose, elk, camel, wild boar, wildebeest, guinea pig, kangaroo, koala, wombat, chicken, turkey, duck, goose, quail, pheasant, guineafowl, ostrich, emu, pigeon, partridge, grouse, snipe, woodcock, salmon, tuna, cod, trout, sardines, haddock, tilapia, catfish, mackerel, swordfish, halibut, dolphinfish, grouper, snapper, sea bass, anchovy, carp, perch, pike, flounder, sole, eel, herring, whitefish, crawfish, squid, octopus, cuttlefish, nautilus, shrimp, crab, lobster, crawfish, prawn, krill, crayfish, mussel, oyster, clam, scallop, cockle, snakes, turtles, alligators, crocodiles, iguanas, lizards, grasshopper, cricket, mealworm, beetle, ant, termite, cicada, caterpillar, silkworm, locust, waxworm, hornworm, bamboo worm, scorpion, and/or centipede.

119. The process of any one of the preceding process embodiments, further providing that the first composition comprises polypeptides derived from animals.
120. The process of any one of the preceding process embodiments, further providing that the first composition comprises polypeptides derived from cuttlefish.
121. The process of any one of the preceding process embodiments, further providing that the first composition comprises polypeptides derived from elk.
122. The process of any one of the preceding process embodiments, further providing that the first composition comprises polypeptides derived from turtles.
123. The process of any one of the preceding process embodiments, further providing that the first composition comprises polypeptides derived from swordfish.
124. The process of any one of the preceding process embodiments, further providing that the first composition comprises polypeptides derived from eel.
125. The process of any one of the preceding process embodiments, further providing that the first composition comprises polypeptides derived from centipede.
126. The process of any one of the preceding process embodiments, further providing that the first composition comprises polypeptides derived from scorpion.
127. The process of any one of the preceding process embodiments, further providing that the first composition comprises polypeptides derived from wild boar.
128. The process of any one of the preceding process embodiments, further providing that the first composition comprises polypeptides derived from reindeer.
129. The process of any one of the preceding process embodiments, further providing that the first composition comprises polypeptides derived from kangaroo.
130. The process of any one of the preceding process embodiments, further providing that the first composition comprises polypeptides derived from turkey.
131. The process of any one of the preceding process embodiments, further providing that the first composition comprises polypeptides derived from mackerel.
132. The process of any one of the preceding process embodiments, further providing that the first composition comprises polypeptides derived from haddock.
133. The process of any one of the preceding process embodiments, further providing that the first composition comprises polypeptides derived from woodcock.
134. The process of any one of the preceding process embodiments, further providing that the first composition comprises polypeptides derived from bamboo worm.
135. The process of any one of the preceding process embodiments, further providing that the first composition comprises polypeptides derived from cattle.
136. The process of any one of the preceding process embodiments, further providing that the first composition comprises polypeptides derived from sole.
137. The process of any one of the preceding process embodiments, further providing that the first composition comprises polypeptides derived from trout.
138. The process of any one of the preceding process embodiments, further providing that the first composition comprises polypeptides derived from pigeon.
139. The process of any one of the preceding process embodiments, further providing that the first composition comprises polypeptides derived from silkworm.
140. The process of any one of the preceding process embodiments, further providing that the first composition comprises polypeptides derived from anchovy.
141. The process of any one of the preceding process embodiments, further providing that the first composition comprises polypeptides derived from scallop.
142. The process of any one of the preceding process embodiments, further providing that the first composition comprises polypeptides derived from flounder.
143. The process of any one of the preceding process embodiments, further providing that the first composition comprises polypeptides derived from bison.
144. The process of any one of the preceding process embodiments, further providing that the first composition comprises polypeptides derived from waxworm.
145. The process of any one of the preceding process embodiments, further providing that the first composition comprises polypeptides derived from duck.
146. The process of any one of the preceding process embodiments, further providing that the first composition comprises polypeptides derived from lizards.
147. The process of any one of the preceding process embodiments, further providing that the first composition comprises polypeptides derived from catfish.
148. The process of any one of the preceding process embodiments, further providing that the first composition comprises polypeptides derived from crawfish.
149. The process of any one of the preceding process embodiments, further providing that the first composition comprises polypeptides derived from whitefish.
150. The process of any one of the preceding process embodiments, further providing that the first composition comprises polypeptides derived from oyster.
151. The process of any one of the preceding process embodiments, further providing that the first composition comprises polypeptides derived from emu.
152. The process of any one of the preceding process embodiments, further providing that the first composition comprises polypeptides derived from beetle.
153. The process of any one of the preceding process embodiments, further providing that the first composition comprises polypeptides derived from snapper.
154. The process of any one of the preceding process embodiments, further providing that the first composition comprises polypeptides derived from sardines.
155. The process of any one of the preceding process embodiments, further providing that the first composition comprises polypeptides derived from caterpillar.
156. The process of any one of the preceding process embodiments, further providing that the first composition comprises polypeptides derived from squid.
157. The process of any one of the preceding process embodiments, further providing that the first composition comprises polypeptides derived from crab.
158. The process of any one of the preceding process embodiments, further providing that the first composition comprises polypeptides derived from cricket.
159. The process of any one of the preceding process embodiments, further providing that the first composition comprises polypeptides derived from nautilus.

160. The process of any one of the preceding process embodiments, further providing that the first composition comprises polypeptides derived from grasshopper.
161. The process of any one of the preceding process embodiments, further providing that the first composition comprises polypeptides derived from lobster.
162. The process of any one of the preceding process embodiments, further providing that the first composition comprises polypeptides derived from shrimp.
163. The process of any one of the preceding process embodiments, further providing that the first composition comprises polypeptides derived from ostrich.
164. The process of any one of the preceding process embodiments, further providing that the first composition comprises polypeptides derived from pike.
165. The process of any one of the preceding process embodiments, further providing that the first composition comprises polypeptides derived from mealworm.
166. The process of any one of the preceding process embodiments, further providing that the first composition comprises polypeptides derived from quail.
167. The process of any one of the preceding process embodiments, further providing that the first composition comprises polypeptides derived from snipe.
168. The process of any one of the preceding process embodiments, further providing that the first composition comprises polypeptides derived from salmon.
169. The process of any one of the preceding process embodiments, further providing that the first composition comprises polypeptides derived from cod.
170. The process of any one of the preceding process embodiments, further providing that the first composition comprises polypeptides derived from alligators.
171. The process of any one of the preceding process embodiments, further providing that the first composition comprises polypeptides derived from pig.
172. The process of any one of the preceding process embodiments, further providing that the first composition comprises polypeptides derived from snakes.
173. The process of any one of the preceding process embodiments, further providing that the first composition comprises polypeptides derived from cockle.
174. The process of any one of the preceding process embodiments, further providing that the first composition comprises polypeptides derived from tilapia.
175. The process of any one of the preceding process embodiments, further providing that the first composition comprises polypeptides derived from ant.
176. The process of any one of the preceding process embodiments, further providing that the first composition comprises polypeptides derived from pheasant.
177. The process of any one of the preceding process embodiments, further providing that the first composition comprises polypeptides derived from octopus.
178. The process of any one of the preceding process embodiments, further providing that the first composition comprises polypeptides derived from herring.
179. The process of any one of the preceding process embodiments, further providing that the first composition comprises polypeptides derived from prawn.
180. The process of any one of the preceding process embodiments, further providing that the first composition comprises polypeptides derived from clam.
181. The process of any one of the preceding process embodiments, further providing that the first composition comprises polypeptides derived from grouper.
182. The process of any one of the preceding process embodiments, further providing that the first composition comprises polypeptides derived from crocodiles.
183. The process of any one of the preceding process embodiments, further providing that the first composition comprises polypeptides derived from iguanas.
184. The process of any one of the preceding process embodiments, further providing that the first composition comprises polypeptides derived from halibut.
185. The process of any one of the preceding process embodiments, further providing that the first composition comprises polypeptides derived from krill.
186. The process of any one of the preceding process embodiments, further providing that the first composition comprises polypeptides derived from perch.
187. The process of any one of the preceding process embodiments, further providing that the first composition comprises polypeptides derived from koala.
188. The process of any one of the preceding process embodiments, further providing that the first composition comprises polypeptides derived from wombat.
189. The process of any one of the preceding process embodiments, further providing that the first composition comprises polypeptides derived from chicken.
190. The process of any one of the preceding process embodiments, further providing that the first composition comprises polypeptides derived from goose.
191. The process of any one of the preceding process embodiments, further providing that the first composition comprises polypeptides derived from moose.
192. The process of any one of the preceding process embodiments, further providing that the first composition comprises polypeptides derived from cicada.
193. The process of any one of the preceding process embodiments, further providing that the first composition comprises polypeptides derived from guinea pig.
194. The process of any one of the preceding process embodiments, further providing that the first composition comprises polypeptides derived from tuna.
195. The process of any one of the preceding process embodiments, further providing that the first composition comprises polypeptides derived from termite.
196. The process of any one of the preceding process embodiments, further providing that the first composition comprises polypeptides derived from deer.
197. The process of any one of the preceding process embodiments, further providing that the first composition comprises polypeptides derived from hornworm.
198. The process of any one of the preceding process embodiments, further providing that the first composition comprises polypeptides derived from carp.
199. The process of any one of the preceding process embodiments, further providing that the first composition comprises polypeptides derived from goat.
200. The process of any one of the preceding process embodiments, further providing that the first composition comprises polypeptides derived from sea bass.
201. The process of any one of the preceding process embodiments, further providing that the first composition comprises polypeptides derived from grouse.
202. The process of any one of the preceding process embodiments, further providing that the first composition comprises polypeptides derived from locust.
203. The process of any one of the preceding process embodiments, further providing that the first composition comprises polypeptides derived from sheep.

204. The process of any one of the preceding process embodiments, further providing that the first composition comprises polypeptides derived from horse.
205. The process of any one of the preceding process embodiments, further providing that the first composition comprises polypeptides derived from guineafowl.
206. The process of any one of the preceding process embodiments, further providing that the first composition comprises polypeptides derived from crayfish.
207. The process of any one of the preceding process embodiments, further providing that the first composition comprises polypeptides derived from crawfish.
208. The process of any one of the preceding process embodiments, further providing that the first composition comprises polypeptides derived from wildebeest.
209. The process of any one of the preceding process embodiments, further providing that the first composition comprises polypeptides derived from camel.
210. The process of any one of the preceding process embodiments, further providing that the first composition comprises polypeptides derived from dolphinfish.
211. The process of any one of the preceding process embodiments, further providing that the first composition comprises polypeptides derived from partridge.
212. The process of any one of the preceding process embodiments, further providing that the first composition comprises polypeptides derived from mussel.
213. The process of any one of the preceding process embodiments, further providing that polysaccharide is supplemented to the first composition of claim 3 Step (a) in a ratio that is within the range of 1% to 10000% (weight per weight of polypeptide).
214. The process of any one of the preceding process embodiments, further providing that polysaccharide is supplemented to the first composition including pectin.
215. The process of any one of the preceding process embodiments, further providing that polysaccharide is supplemented to the first composition including carrageenan-iota.
216. The process of any one of the preceding process embodiments, further providing that polysaccharide is supplemented to the first composition including gellan gum.
217. The process of any one of the preceding process embodiments, further providing that polysaccharide is supplemented to the first composition including alginate.
218. The process of any one of the preceding process embodiments, further providing that polysaccharide is supplemented to the first composition including rice.
219. The process of any one of the preceding process embodiments, further providing that polysaccharide is supplemented to the first composition including hyaluronic acid.
220. The process of any one of the preceding process embodiments, further providing that polysaccharide is supplemented to the first composition including starches derived from wheat.
221. The process of any one of the preceding process embodiments, further providing that polysaccharide is supplemented to the first composition including potato or corn.
222. The process of any one of the preceding process embodiments, further providing that polysaccharide is supplemented to the first composition including carrageenan.
223. The process of any one of the preceding process embodiments, further providing that polysaccharide is supplemented to the first composition including pullulan.
224. The process of any one of the preceding process embodiments, further providing that polysaccharide is supplemented to the first composition including xanthan gum.
225. The process of any one of the preceding process embodiments, further providing that polysaccharide is supplemented to the first composition including dextran.
226. The process of any one of the preceding process embodiments, further providing that polysaccharide is supplemented to the first composition including chitosan.
227. The process of any one of the preceding process embodiments, further providing that polysaccharide is supplemented to the first composition including agar.
228. The process of any one of the preceding process embodiments, further providing that polysaccharide is supplemented to the first composition including chondroitin sulphate.
229. The process of any one of the preceding process embodiments, further providing that polysaccharide is supplemented to the first composition including carrageenan-kappa.
230. The process of any one of the preceding process embodiments, further providing that polysaccharide is supplemented to the first composition including chitin.
231. The process of any of the preceding process embodiments, further providing that lipid is supplemented to the first composition of claim 3 Step (a) in a ratio that is within the range of 1% to 10000% (weight per weight of polypeptide).
232. The process of any of the preceding process embodiments, wherein said the second composition comprises one or more solvent(s) comprising, water, ethanol, oxalic acid, malic acid, succinic acid, adipic acid, tartaric acid, citric acid, malonic acid, acetic acid, formic acid, sodium hydroxide, and/or potassium hydroxide.
233. The process of any of the preceding process embodiments, wherein said the second composition comprises of one or more denaturing agent(s) of at least one of, oxalic acid, malic acid, succinic acid, adipic acid, tartaric acid, citric acid, malonic acid, acetic acid, formic acid, urea, sodium hydroxide, and/or potassium hydroxide.
234. The process of any of the preceding process embodiments, wherein said the second composition comprises of one or more reducing agent(s) including, N-acetylcysteine, L-cysteine, glutathione, ascorbic acid, citric acid, tartaric acid, malic acid, sodium borohydride, sodium sulphite, sodium bisulphite, sodium metabisulphite, sodium hypophosphite, sodium hydrosulphite, mercaptoethanol, and/or dithiothreitol.
235. The process of any of the preceding process embodiments, wherein said the second composition comprises of one or more reducing agent(s) including sodium metabisulphite.
236. The process of any of the preceding process embodiments, wherein said the second composition comprises of one or more reducing agent(s) including ascorbic acid.

237. The process of any of the preceding process embodiments, wherein said the second composition comprises of one or more reducing agent(s) including N-acetylcysteine.
238. The process of any of the preceding process embodiments, wherein said the second composition comprises of one or more reducing agent(s) including dithiothreitol.
239. The process of any of the preceding process embodiments, wherein said the second composition comprises of one or more reducing agent(s) including Sodium bisulphite.
240. The process of any of the preceding process embodiments, wherein said the second composition comprises of one or more reducing agent(s) including malic acid.
241. The process of any of the preceding process embodiments, wherein said the second composition comprises of one or more reducing agent(s) including glutathione.
242. The process of any of the preceding process embodiments, wherein said the second composition comprises sodium hypophosphite.
243. The process of any of the preceding process embodiments, wherein said the second composition comprises of one or more reducing agent(s) including sodium sulphite.
244. The process of any of the preceding process embodiments, wherein said the second composition comprises of one or more reducing agent(s) including sodium borohydride.
245. The process of any of the preceding process embodiments, wherein said the second composition comprises of one or more reducing agent(s) including citric acid.
246. The process of any of the preceding process embodiments, wherein said the second composition comprises of one or more reducing agent(s) including tartaric acid.
247. The process of any of the preceding process embodiments, wherein said the second composition comprises of one or more reducing agent(s) including mercaptoethanol.
248. The process of any of the preceding process embodiments, wherein said the second composition comprises of one or more reducing agent(s) including sodium hydrosulphite.
249. The process of any of the preceding process embodiments, wherein said the second composition comprises of one or more reducing agent(s) including L-cysteine.
250. The process of any of the preceding process embodiments, wherein the third composition of Step (b) is incubated for between 0 minutes and 1 week.
251. The process of any of the preceding process embodiments, wherein the third composition or fourth composition of Step (b) is incubated at temperatures between 0° C. minutes and 150° C.
252. The process of any of the preceding process embodiments, wherein the third composition or fourth composition of Step (b) is mixed during incubation.
253. The process of any of the preceding process embodiments, wherein the third composition or fourth composition of Step (b) is mixed.
254. The process of any of the preceding process embodiments, wherein the third composition or fourth composition of Step (b) is mixed at 0 rpm to 20,000 rpm.
255. The process of any of the preceding process embodiments, wherein the third composition or fourth composition of Step (b) is mixed at 50 rpm to 5,000 rpm.
256. The process of any of the preceding process embodiments, wherein the third composition or fourth composition of Step (b) is mixed at 100 rpm to 2,000 rpm.
257. The process of any of the preceding process embodiments, wherein the third composition or fourth composition of Step (b) is mixed at 400 rpm.
258. The process of any of the preceding process embodiments, wherein the third composition or fourth composition of Step (b) is mixed at 1,000 rpm.
259. The process of any of the preceding process embodiments, wherein the third composition or fourth composition of Step (b) is mixed at 2,000 rpm.
260. The process of any of the preceding process embodiments, wherein the third composition or fourth composition of Step (b) is mixed for 0 minutes to 7 days.
261. The process of any of the preceding process embodiments, wherein the third composition or fourth composition of Step (b) is mixed for 0 minutes to 5 minutes.
262. The process of any of the preceding process embodiments, wherein the third composition or fourth composition of Step (b) is mixed for 5 minutes to 10 minutes.
263. The process of any of the preceding process embodiments, wherein the third composition or fourth composition of Step (b) is mixed for 10 minutes to 20 minutes.
264. The process of any of the preceding process embodiments, wherein the third composition or fourth composition of Step (b) is mixed for 20 minutes to 1 hour.
265. The process of any of the preceding process embodiments, wherein the third composition or fourth composition of Step (b) is mixed for 1 hour to 3 hours.
266. The process of any of the preceding process embodiments, wherein the third composition or fourth composition of Step (b) is mixed for 3 hours to 6 hours.
267. The process of any of the preceding process embodiments, wherein the third composition or fourth composition of Step (b) is mixed for 6 hours to 12 hours.
268. The process of any of the preceding process embodiments, wherein the third composition or fourth composition of Step (b) is mixed for 12 hours to 1 day.
269. The process of any of the preceding process embodiments, wherein the third composition or fourth composition of Step (b) is mixed for 1 day to 2 days.
270. The process of any of the preceding process embodiments, wherein the third composition or fourth composition of Step (b) is mixed for 2 days to 3 days.
271. The process of any of the preceding process embodiments, wherein the third composition or fourth composition of Step (b) is mixed for 3 days to 4 days.
272. The process of any of the preceding process embodiments, wherein the third composition or fourth composition of Step (b) is mixed for 4 days to 5 days.
273. The process of any of the preceding process embodiments, wherein the third composition or fourth composition of Step (b) is mixed for 5 days to 6 days.
274. The process of any of the preceding process embodiments, wherein the third composition or fourth composition of Step (b) is mixed for 6 days to 7 days.
275. The process of any of the preceding process embodiments, wherein said the fourth composition comprises one or more void element(s) including calcium carbonate, ice, air, nitrogen, carbon dioxide, argon, sodium chloride, or potassium chloride, lipids, polyols, or any combination thereof.
276. The process of any of the preceding process embodiments, wherein said the fourth composition comprises one or more void element(s) including lipids such as, but are not limited to, plant oils (e.g., almond, avocado, canola, coconut, corn, flaxseed, grape seed, hemp seed, jojoba, mustard, olive, palm, peanut, pumpkin seed, rice bran, safflower, sesame, soybean, sunflower, walnut).

277. The process of any of the preceding process embodiments, wherein said the fourth composition comprises lipids, including, plant oils derived from corn.
278. The process of any of the preceding process embodiments, wherein said the fourth composition comprises lipids, including, plant oils derived from almond.
279. The process of any of the preceding process embodiments, wherein said the fourth composition comprises lipids, including, plant oils derived from palm.
280. The process of any of the preceding process embodiments, wherein said the fourth composition comprises lipids, including, plant oils derived from sesame.
281. The process of any of the preceding process embodiments, wherein said the fourth composition comprises lipids, including, plant oils derived from jojoba.
282. The process of any of the preceding process embodiments, wherein said the fourth composition comprises lipids, including, plant oils derived from avocado.
283. The process of any of the preceding process embodiments, wherein said the fourth composition comprises lipids, including, plant oils derived from rice bran.
284. The process of any of the preceding process embodiments, wherein said the fourth composition comprises lipids, including, plant oils derived from soybean.
285. The process of any of the preceding process embodiments, wherein said the fourth composition comprises lipids, including, plant oils derived from sunflower.
286. The process of any of the preceding process embodiments, wherein said the fourth composition comprises lipids, including, plant oils derived from grape seed.
287. The process of any of the preceding process embodiments, wherein said the fourth composition comprises lipids, including, plant oils derived from flaxseed.
288. The process of any of the preceding process embodiments, wherein said the fourth composition comprises lipids, including, plant oils derived from safflower.
289. The process of any of the preceding process embodiments, wherein said the fourth composition comprises lipids, including, plant oils derived from hemp seed.
290. The process of any of the preceding process embodiments, wherein said the fourth composition comprises lipids, including, plant oils derived from pumpkin seed.
291. The process of any of the preceding process embodiments, wherein said the fourth composition comprises lipids, including, plant oils derived from canola.
292. The process of any of the preceding process embodiments, wherein said the fourth composition comprises lipids, including, plant oils derived from peanut.
293. The process of any of the preceding process embodiments, wherein said the fourth composition comprises lipids, including, plant oils derived from coconut.
294. The process of any of the preceding process embodiments, wherein said the fourth composition comprises lipids, including, plant oils derived from olive.
295. The process of any of the preceding process embodiments, wherein said the fourth composition comprises lipids, including, plant oils derived from walnut.
296. The process of any of the preceding process embodiments, wherein said the fourth composition comprises lipids, including, plant oils derived from mustard.
297. The process of any of the preceding process embodiments, wherein said the fourth composition comprises lipids, including, animal fats (including milks, butters, lards, and tallows) derived from catfish.
298. The process of any of the preceding process embodiments, wherein said the fourth composition comprises lipids, including, animal fats (including milks, butters, lards, and tallows) derived from tilapia.
299. The process of any of the preceding process embodiments, wherein said the fourth composition comprises lipids, including, animal fats (including milks, butters, lards, and tallows) derived from bison.
300. The process of any of the preceding process embodiments, wherein said the fourth composition comprises lipids, including, animal fats (including milks, butters, lards, and tallows) derived from anchovy.
301. The process of any of the preceding process embodiments, wherein said the fourth composition comprises lipids, including, animal fats (including milks, butters, lards, and tallows) derived from sole.
302. The process of any of the preceding process embodiments, wherein said the fourth composition comprises lipids, including, animal fats (including milks, butters, lards, and tallows) derived from carp.
303. The process of any of the preceding process embodiments, wherein said the fourth composition comprises lipids, including, animal fats (including milks, butters, lards, and tallows) derived from sheep.
304. The process of any of the preceding process embodiments, wherein said the fourth composition comprises lipids, including, animal fats (including milks, butters, lards, and tallows) derived from quail.
305. The process of any of the preceding process embodiments, wherein said the fourth composition comprises lipids, including, animal fats (including milks, butters, lards, and tallows) derived from pheasant.
306. The process of any of the preceding process embodiments, wherein said the fourth composition comprises lipids, including, animal fats (including milks, butters, lards, and tallows) derived from reindeer.
307. The process of any of the preceding process embodiments, wherein said the fourth composition comprises lipids, including, animal fats (including milks, butters, lards, and tallows) derived from snipe.
308. The process of any of the preceding process embodiments, wherein said the fourth composition comprises lipids, including, animal fats (including milks, butters, lards, and tallows) derived from deer.
309. The process of any of the preceding process embodiments, wherein said the fourth composition comprises lipids, including, animal fats (including milks, butters, lards, and tallows) derived from snapper.
310. The process of any of the preceding process embodiments, wherein said the fourth composition comprises lipids, including, animal fats (including milks, butters, lards, and tallows) derived from mackerel.
311. The process of any of the preceding process embodiments, wherein said the fourth composition comprises lipids, including, animal fats (including milks, butters, lards, and tallows) derived from turkey.
312. The process of any of the preceding process embodiments, wherein said the fourth composition comprises lipids, including, animal fats (including milks, butters, lards, and tallows) derived from tuna.
313. The process of any of the preceding process embodiments, wherein said the fourth composition comprises lipids, including, animal fats (including milks, butters, lards, and tallows) derived from pig.
314. The process of any of the preceding process embodiments, wherein said the fourth composition comprises lipids, including, animal fats (including milks, butters, lards, and tallows) derived from duck.
315. The process of any of the preceding process embodiments, wherein said the fourth composition comprises lipids, including, animal fats (including milks, butters, lards, and tallows) derived from guineafowl.
316. The process of any of the preceding process embodiments, wherein said the fourth composition comprises lipids, including, animal fats (including milks, butters, lards, and tallows) derived from moose.
317. The process of any of the preceding process embodiments, wherein said the fourth composition comprises lipids, including, animal fats (including milks, butters, lards, and tallows) derived from partridge.
318. The process of any of the preceding process embodiments, wherein said the fourth composition comprises lipids, including, animal fats (including milks, butters, lards, and tallows) derived from kangaroo.
319. The process of any of the preceding process embodiments, wherein said the fourth composition comprises lipids, including, animal fats (including milks, butters, lards, and tallows) derived from grouper.
320. The process of any of the preceding process embodiments, wherein said the fourth composition comprises lipids, including, animal fats (including milks, butters, lards, and tallows) derived from camel.
321. The process of any of the preceding process embodiments, wherein said the fourth composition comprises lipids, including, animal fats (including milks, butters, lards, and tallows) derived from pike.
322. The process of any of the preceding process embodiments, wherein said the fourth composition comprises lipids, including, animal fats (including milks, butters, lards, and tallows) derived from pigeon.
323. The process of any of the preceding process embodiments, wherein said the fourth composition comprises lipids, including, animal fats (including milks, butters, lards, and tallows) derived from horse.
324. The process of any of the preceding process embodiments, wherein said the fourth composition comprises lipids, including, animal fats (including milks, butters, lards, and tallows) derived from swordfish.
325. The process of any of the preceding process embodiments, wherein said the fourth composition comprises lipids, including, animal fats (including milks, butters, lards, and tallows) derived from goat.
326. The process of any of the preceding process embodiments, wherein said the fourth composition comprises lipids, including, animal fats (including milks, butters, lards, and tallows) derived from guinea pig.
327. The process of any of the preceding process embodiments, wherein said the fourth composition comprises lipids, including, animal fats (including milks, butters, lards, and tallows) derived from woodcock.
328. The process of any of the preceding process embodiments, wherein said the fourth composition comprises lipids, including, animal fats (including milks, butters, lards, and tallows) derived from cod.
329. The process of any of the preceding process embodiments, wherein said the fourth composition comprises lipids, including, animal fats (including milks, butters, lards, and tallows) derived from sea bass.
330. The process of any of the preceding process embodiments, wherein said the fourth composition comprises lipids, including, animal fats (including milks, butters, lards, and tallows) derived from eel.
331. The process of any of the preceding process embodiments, wherein said the fourth composition comprises lipids, including, animal fats (including milks, butters, lards, and tallows) derived from halibut.
332. The process of any of the preceding process embodiments, wherein said the fourth composition comprises lipids, including, animal fats (including milks, butters, lards, and tallows) derived from goose.
333. The process of any of the preceding process embodiments, wherein said the fourth composition comprises lipids, including, animal fats (including milks, butters, lards, and tallows) derived from salmon.
334. The process of any of the preceding process embodiments, wherein said the fourth composition comprises lipids, including, animal fats (including milks, butters, lards, and tallows) derived from sardines.
335. The process of any of the preceding process embodiments, wherein said the fourth composition comprises lipids, including, animal fats (including milks, butters, lards, and tallows) derived from herring.
336. The process of any of the preceding process embodiments, wherein said the fourth composition comprises lipids, including, animal fats (including milks, butters, lards, and tallows) derived from wild boar.
337. The process of any of the preceding process embodiments, wherein said the fourth composition comprises lipids, including, animal fats (including milks, butters, lards, and tallows) derived from flounder.
338. The process of any of the preceding process embodiments, wherein said the fourth composition comprises lipids, including, animal fats (including milks, butters, lards, and tallows) derived from perch.
339. The process of any of the preceding process embodiments, wherein said the fourth composition comprises lipids, including, animal fats (including milks, butters, lards, and tallows) derived from crawfish.
340. The process of any of the preceding process embodiments, wherein said the fourth composition comprises lipids, including, animal fats (including milks, butters, lards, and tallows) derived from haddock.
341. The process of any of the preceding process embodiments, wherein said the fourth composition comprises lipids, including, animal fats (including milks, butters, lards, and tallows) derived from grouse.
342. The process of any of the preceding process embodiments, wherein said the fourth composition comprises lipids, including, animal fats (including milks, butters, lards, and tallows) derived from dolphinfish.
343. The process of any of the preceding process embodiments, wherein said the fourth composition comprises lipids, including, animal fats (including milks, butters, lards, and tallows) derived from whitefish.
344. The process of any of the preceding process embodiments, wherein said the fourth composition comprises lipids, including, animal fats (including milks, butters, lards, and tallows) derived from elk.
345. The process of any of the preceding process embodiments, wherein said the fourth composition comprises lipids, including, animal fats (including milks, butters, lards, and tallows) derived from ostrich.
346. The process of any of the preceding process embodiments, wherein said the fourth composition comprises lipids, including, animal fats (including milks, butters, lards, and tallows) derived from cattle.

347. The process of any of the preceding process embodiments, wherein said the fourth composition comprises lipids, including, animal fats (including milks, butters, lards, and tallows) derived from chicken.

348. The process of any of the preceding process embodiments, wherein said the fourth composition comprises lipids, including, animal fats (including milks, butters, lards, and tallows) derived from trout.

349. The process of any of the preceding process embodiments, wherein said the fourth composition comprises lipids, including, animal fats (including milks, butters, lards, and tallows) derived from emu.

350. The process of any of the preceding process embodiments, wherein said the fourth composition comprises lipids, including, fatty acids such as myristic acid (C14:0).

351. The process of any of the preceding process embodiments, wherein said the fourth composition comprises lipids, including, fatty acids such as stearic acid (C18:0).

352. The process of any of the preceding process embodiments, wherein said the fourth composition comprises lipids, including, fatty acids such as alpha-linolenic acid (C18:3).

353. The process of any of the preceding process embodiments, wherein said the fourth composition comprises lipids, including, fatty acids such as pentadecanoic acid (C15:0).

354. The process of any of the preceding process embodiments, wherein said the fourth composition comprises lipids, including, fatty acids such as caproic acid (C6:0).

355. The process of any of the preceding process embodiments, wherein said the fourth composition comprises lipids, including, fatty acids such as butyric acid (C4:0).

356. The process of any of the preceding process embodiments, wherein said the fourth composition comprises lipids, including, fatty acids such as linoleic acid (C18:2).

357. The process of any of the preceding process embodiments, wherein said the fourth composition comprises lipids, including, fatty acids such as arachidonic acid (C20:4).

358. The process of any of the preceding process embodiments, wherein said the fourth composition comprises lipids, including, fatty acids such as caprylic acid (C8:0).

359. The process of any of the preceding process embodiments, wherein said the fourth composition comprises lipids, including, fatty acids such as palmitic acid (C16:0).

360. The process of any of the preceding process embodiments, wherein said the fourth composition comprises lipids, including, fatty acids such as eicosapentaenoic acid (C20:5) and/or docosahexaenoic acid (C22:6).

361. The process of any of the preceding process embodiments, wherein said the fourth composition comprises lipids, including, fatty acids such as capric acid (C10:0).

362. The process of any of the preceding process embodiments, wherein said the fourth composition comprises lipids, including, fatty acids such as oleic acid (C18:1).

363. The process of any of the preceding process embodiments, wherein said the fourth composition comprises lipids, including, fatty acids such as lauric acid (C12:0).

364. The process of any of the preceding process embodiments, wherein said the fourth composition comprises Fucitol.

365. The process of any of the preceding process embodiments, wherein said the fourth composition comprises Threitol.

366. The process of any of the preceding process embodiments, wherein said the fourth composition comprises Ribitol Mannitol.

367. The process of any of the preceding process embodiments, wherein said the fourth composition comprises Maltotriitol.

368. The process of any of the preceding process embodiments, wherein said the fourth composition comprises Glycerol.

369. The process of any of the preceding process embodiments, wherein said the fourth composition comprises Erythritol.

370. The process of any of the preceding process embodiments, wherein said the fourth composition comprises Volemitol.

371. The process of any of the preceding process embodiments, wherein said the fourth composition comprises Isomalt.

372. The process of any of the preceding process embodiments, wherein said the fourth composition comprises Xylitol.

373. The process of any of the preceding process embodiments, wherein said the fourth composition comprises Lactitol.

374. The process of any of the preceding process embodiments, wherein said the fourth composition comprises Galactitol.

375. The process of any of the preceding process embodiments, wherein said the fourth composition comprises Polyglycitol.

376. The process of any of the preceding process embodiments, wherein said the fourth composition comprises Maltotetraitol.

377. The process of any of the preceding process embodiments, wherein said the fourth composition comprises triacylglycerols.

378. The process of any of the preceding process embodiments, wherein said the fourth composition comprises Ethylene glycol.

379. The process of any of the preceding process embodiments, wherein said the fourth composition comprises Arabitol.

380. The process of any of the preceding process embodiments, wherein said the fourth composition comprises monoacylglycerols.

381. The process of any of the preceding process embodiments, wherein said the fourth composition comprises Maltitol.

382. The process of any of the preceding process embodiments, wherein said the fourth composition comprises diacylglycerols.

383. The process of any of the preceding process embodiments, wherein said the fourth composition comprises Sorbitol.

384. The process of any of the preceding process embodiments, wherein said the fourth composition comprises Inositol.

385. The process of any of the preceding process embodiments, wherein said the fourth composition comprises Iditol.
386. The process of any of the preceding process embodiments, wherein said the fourth composition comprises one or more void element(s) including water soluble polymers such as, but are not limited to, polyvinyl alcohol.
387. The process of any of the preceding process embodiments, further providing that, void inclusion elements are added to the compositions in Step (a) or Step (b), such that the void inclusion elements comprise 1% to 80% of the fourth composition.
388. The process of any of the preceding process embodiments, further providing that, void inclusion elements are added to the compositions in Step (a) or Step (b), such that the void inclusion elements comprise 11% to 26% of the fourth composition.
389. The process of any of the preceding process embodiments, further providing that, void inclusion elements are added to the compositions in Step (a) or Step (b), such that the void inclusion elements comprise 46% to 76% of the fourth composition.
390. The process of any of the preceding process embodiments, further providing that, void inclusion elements are added to the compositions in Step (a) or Step (b), such that the void inclusion elements comprise 11% to 71% of the fourth composition.
391. The process of any of the preceding process embodiments, further providing that, void inclusion elements are added to the compositions in Step (a) or Step (b), such that the void inclusion elements comprise 56% to 71% of the fourth composition.
392. The process of any of the preceding process embodiments, further providing that, void inclusion elements are added to the compositions in Step (a) or Step (b), such that the void inclusion elements comprise 41% to 51% of the fourth composition.
393. The process of any of the preceding process embodiments, further providing that, void inclusion elements are added to the compositions in Step (a) or Step (b), such that the void inclusion elements comprise 71% to 81% of the fourth composition.
394. The process of any of the preceding process embodiments, further providing that, void inclusion elements are added to the compositions in Step (a) or Step (b), such that the void inclusion elements comprise 6% to 41% of the fourth composition.
395. The process of any of the preceding process embodiments, further providing that, void inclusion elements are added to the compositions in Step (a) or Step (b), such that the void inclusion elements comprise 31% to 56% of the fourth composition.
396. The process of any of the preceding process embodiments, further providing that, void inclusion elements are added to the compositions in Step (a) or Step (b), such that the void inclusion elements comprise 11% to 81% of the fourth composition.
397. The process of any of the preceding process embodiments, further providing that, void inclusion elements are added to the compositions in Step (a) or Step (b), such that the void inclusion elements comprise 11% to 66% of the fourth composition.
398. The process of any of the preceding process embodiments, further providing that, void inclusion elements are added to the compositions in Step (a) or Step (b), such that the void inclusion elements comprise 46% to 61% of the fourth composition.
399. The process of any of the preceding process embodiments, further providing that, void inclusion elements are added to the compositions in Step (a) or Step (b), such that the void inclusion elements comprise 6% to 31% of the fourth composition.
400. The process of any of the preceding process embodiments, further providing that, void inclusion elements are added to the compositions in Step (a) or Step (b), such that the void inclusion elements comprise 6% to 71% of the fourth composition.
401. The process of any of the preceding process embodiments, further providing that, void inclusion elements are added to the compositions in Step (a) or Step (b), such that the void inclusion elements comprise 61% to 81% of the fourth composition.
402. The process of any of the preceding process embodiments, further providing that, void inclusion elements are added to the compositions in Step (a) or Step (b), such that the void inclusion elements comprise 11% to 16% of the fourth composition.
403. The process of any of the preceding process embodiments, further providing that, void inclusion elements are added to the compositions in Step (a) or Step (b), such that the void inclusion elements comprise 31% to 46% of the fourth composition.
404. The process of any of the preceding process embodiments, further providing that, void inclusion elements are added to the compositions in Step (a) or Step (b), such that the void inclusion elements comprise 21% to 71% of the fourth composition.
405. The process of any of the preceding process embodiments, further providing that, void inclusion elements are added to the compositions in Step (a) or Step (b), such that the void inclusion elements comprise 31% to 36% of the fourth composition.
406. The process of any of the preceding process embodiments, further providing that, void inclusion elements are added to the compositions in Step (a) or Step (b), such that the void inclusion elements comprise 11% to 41% of the fourth composition.
407. The process of any of the preceding process embodiments, further providing that, void inclusion elements are added to the compositions in Step (a) or Step (b), such that the void inclusion elements comprise 61% to 76% of the fourth composition.
408. The process of any of the preceding process embodiments, further providing that, void inclusion elements are added to the compositions in Step (a) or Step (b), such that the void inclusion elements comprise 26% to 46% of the fourth composition.
409. The process of any of the preceding process embodiments, further providing that, void inclusion elements are added to the compositions in Step (a) or Step (b), such that the void inclusion elements comprise 26% to 56% of the fourth composition.
410. The process of any of the preceding process embodiments, further providing that, void inclusion elements are added to the compositions in Step (a) or Step (b), such that the void inclusion elements comprise 36% to 56% of the fourth composition.
411. The process of any of the preceding process embodiments, further providing that, void inclusion elements are added to the compositions in Step (a) or Step (b), such that the void inclusion elements comprise 46% to 66% of the fourth composition.

412. The process of any of the preceding process embodiments, further providing that, void inclusion elements are added to the compositions in Step (a) or Step (b), such that the void inclusion elements comprise 51% to 71% of the fourth composition.
413. The process of any of the preceding process embodiments, further providing that, void inclusion elements are added to the compositions in Step (a) or Step (b), such that the void inclusion elements comprise 6% to 26% of the fourth composition.
414. The process of any of the preceding process embodiments, further providing that, void inclusion elements are added to the compositions in Step (a) or Step (b), such that the void inclusion elements comprise 16% to 21% of the fourth composition.
415. The process of any of the preceding process embodiments, further providing that, void inclusion elements are added to the compositions in Step (a) or Step (b), such that the void inclusion elements comprise 61% to 71% of the fourth composition.
416. The process of any of the preceding process embodiments, further providing that, void inclusion elements are added to the compositions in Step (a) or Step (b), such that the void inclusion elements comprise 66% to 76% of the fourth composition.
417. The process of any of the preceding process embodiments, further providing that, void inclusion elements are added to the compositions in Step (a) or Step (b), such that the void inclusion elements comprise 31% to 76% of the fourth composition.
418. The process of any of the preceding process embodiments, further providing that, void inclusion elements are added to the compositions in Step (a) or Step (b), such that the void inclusion elements comprise 11% to 21% of the fourth composition.
419. The process of any of the preceding process embodiments, further providing that, void inclusion elements are added to the compositions in Step (a) or Step (b), such that the void inclusion elements comprise 41% to 56% of the fourth composition.
420. The process of any of the preceding process embodiments, further providing that, void inclusion elements are added to the compositions in Step (a) or Step (b), such that the void inclusion elements comprise 31% to 71% of the fourth composition.
421. The process of any of the preceding process embodiments, further providing that, void inclusion elements are added to the compositions in Step (a) or Step (b), such that the void inclusion elements comprise 36% to 81% of the fourth composition.
422. The process of any of the preceding process embodiments, further providing that, void inclusion elements are added to the compositions in Step (a) or Step (b), such that the void inclusion elements comprise 1% to 21% of the fourth composition.
423. The process of any of the preceding process embodiments, further providing that, void inclusion elements are added to the compositions in Step (a) or Step (b), such that the void inclusion elements comprise 61% to 66% of the fourth composition.
424. The process of any of the preceding process embodiments, further providing that, void inclusion elements are added to the compositions in Step (a) or Step (b), such that the void inclusion elements comprise 41% to 46% of the fourth composition.
425. The process of any of the preceding process embodiments, further providing that, void inclusion elements are added to the compositions in Step (a) or Step (b), such that the void inclusion elements comprise 31% to 61% of the fourth composition.
426. The process of any of the preceding process embodiments, further providing that, void inclusion elements are added to the compositions in Step (a) or Step (b), such that the void inclusion elements comprise 1% to 26% of the fourth composition.
427. The process of any of the preceding process embodiments, further providing that, void inclusion elements are added to the compositions in Step (a) or Step (b), such that the void inclusion elements comprise 1% to 71% of the fourth composition.
428. The process of any of the preceding process embodiments, further providing that, void inclusion elements are added to the compositions in Step (a) or Step (b), such that the void inclusion elements comprise 41% to 61% of the fourth composition.
429. The process of any of the preceding process embodiments, further providing that, void inclusion elements are added to the compositions in Step (a) or Step (b), such that the void inclusion elements comprise 16% to 51% of the fourth composition.
430. The process of any of the preceding process embodiments, further providing that, void inclusion elements are added to the compositions in Step (a) or Step (b), such that the void inclusion elements comprise 1% to 11% of the fourth composition.
431. The process of any of the preceding process embodiments, further providing that, void inclusion elements are added to the compositions in Step (a) or Step (b), such that the void inclusion elements comprise 1% to 36% of the fourth composition.
432. The process of any of the preceding process embodiments, further providing that, void inclusion elements are added to the compositions in Step (a) or Step (b), such that the void inclusion elements comprise 16% to 41% of the fourth composition.
433. The process of any of the preceding process embodiments, further providing that, void inclusion elements are added to the compositions in Step (a) or Step (b), such that the void inclusion elements comprise 36% to 66% of the fourth composition.
434. The process of any of the preceding process embodiments, further providing that, void inclusion elements are added to the compositions in Step (a) or Step (b), such that the void inclusion elements comprise 36% to 61% of the fourth composition.
435. The process of any of the preceding process embodiments, further providing that, void inclusion elements are added to the compositions in Step (a) or Step (b), such that the void inclusion elements comprise 56% to 66% of the fourth composition.
436. The process of any of the preceding process embodiments, further providing that, void inclusion elements are added to the compositions in Step (a) or Step (b), such that the void inclusion elements comprise 26% to 31% of the fourth composition.
437. The process of any of the preceding process embodiments, further providing that, void inclusion elements are added to the compositions in Step (a) or Step (b), such that the void inclusion elements comprise 16% to 31% of the fourth composition.
438. The process of any of the preceding process embodiments, further providing that, void inclusion elements are added to the compositions in Step (a) or Step (b), such that the void inclusion elements comprise 36% to 46% of the fourth composition.
439. The process of any of the preceding process embodiments, further providing that, void inclusion elements are added to the compositions in Step (a) or Step (b), such that the void inclusion elements comprise 1% to 56% of the fourth composition.
440. The process of any of the preceding process embodiments, further providing that, void inclusion elements are added to the compositions in Step (a) or Step (b), such that the void inclusion elements comprise 41% to 71% of the fourth composition.
441. The process of any of the preceding process embodiments, further providing that, void inclusion elements are added to the compositions in Step (a) or Step (b), such that the void inclusion elements comprise 21% to 46% of the fourth composition.
442. The process of any of the preceding process embodiments, further providing that, void inclusion elements are added to the compositions in Step (a) or Step (b), such that the void inclusion elements comprise 56% to 61% of the fourth composition.
443. The process of any of the preceding process embodiments, further providing that, void inclusion elements are added to the compositions in Step (a) or Step (b), such that the void inclusion elements comprise 21% to 61% of the fourth composition.
444. The process of any of the preceding process embodiments, further providing that, void inclusion elements are added to the compositions in Step (a) or Step (b), such that the void inclusion elements comprise 16% to 76% of the fourth composition.
445. The process of any of the preceding process embodiments, further providing that, void inclusion elements are added to the compositions in Step (a) or Step (b), such that the void inclusion elements comprise 41% to 81% of the fourth composition.
446. The process of any of the preceding process embodiments, further providing that, void inclusion elements are added to the compositions in Step (a) or Step (b), such that the void inclusion elements comprise 11% to 76% of the fourth composition.
447. The process of any of the preceding process embodiments, further providing that, void inclusion elements are added to the compositions in Step (a) or Step (b), such that the void inclusion elements comprise 11% to 56% of the fourth composition.
448. The process of any of the preceding process embodiments, further providing that, void inclusion elements are added to the compositions in Step (a) or Step (b), such that the void inclusion elements comprise 1% to 46% of the fourth composition.
449. The process of any of the preceding process embodiments, further providing that, void inclusion elements are added to the compositions in Step (a) or Step (b), such that the void inclusion elements comprise 46% to 51% of the fourth composition.
450. The process of any of the preceding process embodiments, further providing that, void inclusion elements are added to the compositions in Step (a) or Step (b), such that the void inclusion elements comprise 51% to 81% of the fourth composition.
451. The process of any of the preceding process embodiments, further providing that, void inclusion elements are added to the compositions in Step (a) or Step (b), such that the void inclusion elements comprise 6% to 21% of the fourth composition.
452. The process of any of the preceding process embodiments, further providing that, void inclusion elements are added to the compositions in Step (a) or Step (b), such that the void inclusion elements comprise 16% to 46% of the fourth composition.
453. The process of any of the preceding process embodiments, further providing that, void inclusion elements are added to the compositions in Step (a) or Step (b), such that the void inclusion elements comprise 51% to 56% of the fourth composition.
454. The process of any of the preceding process embodiments, further providing that, void inclusion elements are added to the compositions in Step (a) or Step (b), such that the void inclusion elements comprise 26% to 41% of the fourth composition.
455. The process of any of the preceding process embodiments, further providing that, void inclusion elements are added to the compositions in Step (a) or Step (b), such that the void inclusion elements comprise 6% to 51% of the fourth composition.
456. The process of any of the preceding process embodiments, further providing that, void inclusion elements are added to the compositions in Step (a) or Step (b), such that the void inclusion elements comprise 21% to 41% of the fourth composition.
457. The process of any of the preceding process embodiments, further providing that, void inclusion elements are added to the compositions in Step (a) or Step (b), such that the void inclusion elements comprise 1% to 41% of the fourth composition.
458. The process of any of the preceding process embodiments, further providing that, void inclusion elements are added to the compositions in Step (a) or Step (b), such that the void inclusion elements comprise 26% to 61% of the fourth composition.
459. The process of any of the preceding process embodiments, further providing that, void inclusion elements are added to the compositions in Step (a) or Step (b), such that the void inclusion elements comprise 46% to 81% of the fourth composition.
460. The process of any of the preceding process embodiments, further providing that, void inclusion elements are added to the compositions in Step (a) or Step (b), such that the void inclusion elements comprise 6% to 36% of the fourth composition.
461. The process of any of the preceding process embodiments, further providing that, void inclusion elements are added to the compositions in Step (a) or Step (b), such that the void inclusion elements comprise 36% to 76% of the fourth composition.
462. The process of any of the preceding process embodiments, further providing that, void inclusion elements are added to the compositions in Step (a) or Step (b), such that the void inclusion elements comprise 21% to 56% of the fourth composition.
463. The process of any of the preceding process embodiments, further providing that, void inclusion elements are added to the compositions in Step (a) or Step (b), such that the void inclusion elements comprise 26% to 81% of the fourth composition.
464. The process of any of the preceding process embodiments, further providing that, void inclusion elements are added to the compositions in Step (a) or Step (b), such that the void inclusion elements comprise 1% to 66% of the fourth composition.
465. The process of any of the preceding process embodiments, further providing that, void inclusion elements are added to the compositions in Step (a) or Step (b), such that the void inclusion elements comprise 6% to 46% of the fourth composition.

466. The process of any of the preceding process embodiments, further providing that, void inclusion elements are added to the compositions in Step (a) or Step (b), such that the void inclusion elements comprise 6% to 11% of the fourth composition.

467. The process of any of the preceding process embodiments, further providing that, void inclusion elements are added to the compositions in Step (a) or Step (b), such that the void inclusion elements comprise 16% to 81% of the fourth composition.

468. The process of any of the preceding process embodiments, further providing that, void inclusion elements are added to the compositions in Step (a) or Step (b), such that the void inclusion elements comprise 26% to 71% of the fourth composition.

469. The process of any of the preceding process embodiments, further providing that, void inclusion elements are added to the compositions in Step (a) or Step (b), such that the void inclusion elements comprise 41% to 76% of the fourth composition.

470. The process of any of the preceding process embodiments, further providing that, void inclusion elements are added to the compositions in Step (a) or Step (b), such that the void inclusion elements comprise 21% to 31% of the fourth composition.

471. The process of any of the preceding process embodiments, further providing that, void inclusion elements are added to the compositions in Step (a) or Step (b), such that the void inclusion elements comprise 51% to 76% of the fourth composition.

472. The process of any of the preceding process embodiments, further providing that, void inclusion elements are added to the compositions in Step (a) or Step (b), such that the void inclusion elements comprise 11% to 61% of the fourth composition.

473. The process of any of the preceding process embodiments, further providing that, void inclusion elements are added to the compositions in Step (a) or Step (b), such that the void inclusion elements comprise 21% to 36% of the fourth composition.

474. The process of any of the preceding process embodiments, further providing that, void inclusion elements are added to the compositions in Step (a) or Step (b), such that the void inclusion elements comprise 16% to 61% of the fourth composition.

475. The process of any of the preceding process embodiments, further providing that, void inclusion elements are added to the compositions in Step (a) or Step (b), such that the void inclusion elements comprise 1% to 76% of the fourth composition.

476. The process of any of the preceding process embodiments, further providing that, void inclusion elements are added to the compositions in Step (a) or Step (b), such that the void inclusion elements comprise 21% to 66% of the fourth composition.

477. The process of any of the preceding process embodiments, further providing that, void inclusion elements are added to the compositions in Step (a) or Step (b), such that the void inclusion elements comprise 31% to 41% of the fourth composition.

478. The process of any of the preceding process embodiments, further providing that, void inclusion elements are added to the compositions in Step (a) or Step (b), such that the void inclusion elements comprise 6% to 66% of the fourth composition.

479. The process of any of the preceding process embodiments, further providing that, void inclusion elements are added to the compositions in Step (a) or Step (b), such that the void inclusion elements comprise 21% to 51% of the fourth composition.

480. The process of any of the preceding process embodiments, further providing that, void inclusion elements are added to the compositions in Step (a) or Step (b), such that the void inclusion elements comprise 1% to 6% of the fourth composition.

481. The process of any of the preceding process embodiments, further providing that, void inclusion elements are added to the compositions in Step (a) or Step (b), such that the void inclusion elements comprise 21% to 26% of the fourth composition.

482. The process of any of the preceding process embodiments, further providing that, void inclusion elements are added to the compositions in Step (a) or Step (b), such that the void inclusion elements comprise 11% to 31% of the fourth composition.

483. The process of any of the preceding process embodiments, further providing that, void inclusion elements are added to the compositions in Step (a) or Step (b), such that the void inclusion elements comprise 16% to 36% of the fourth composition.

484. The process of any of the preceding process embodiments, further providing that, void inclusion elements are added to the compositions in Step (a) or Step (b), such that the void inclusion elements comprise 46% to 56% of the fourth composition.

485. The process of any of the preceding process embodiments, further providing that, void inclusion elements are added to the compositions in Step (a) or Step (b), such that the void inclusion elements comprise 6% to 81% of the fourth composition.

486. The process of any of the preceding process embodiments, further providing that, void inclusion elements are added to the compositions in Step (a) or Step (b), such that the void inclusion elements comprise 6% to 76% of the fourth composition.

487. The process of any of the preceding process embodiments, further providing that, void inclusion elements are added to the compositions in Step (a) or Step (b), such that the void inclusion elements comprise 26% to 66% of the fourth composition.

488. The process of any of the preceding process embodiments, further providing that, void inclusion elements are added to the compositions in Step (a) or Step (b), such that the void inclusion elements comprise 71% to 76% of the fourth composition.

489. The process of any of the preceding process embodiments, further providing that, void inclusion elements are added to the compositions in Step (a) or Step (b), such that the void inclusion elements comprise 66% to 71% of the fourth composition.

490. The process of any of the preceding process embodiments, further providing that, void inclusion elements are added to the compositions in Step (a) or Step (b), such that the void inclusion elements comprise 21% to 81% of the fourth composition.

491. The process of any of the preceding process embodiments, further providing that, void inclusion elements are added to the compositions in Step (a) or Step (b), such that the void inclusion elements comprise 56% to 76% of the fourth composition.

492. The process of any of the preceding process embodiments, further providing that, void inclusion elements are added to the compositions in Step (a) or Step (b), such that the void inclusion elements comprise 26% to 36% of the fourth composition.
493. The process of any of the preceding process embodiments, further providing that, void inclusion elements are added to the compositions in Step (a) or Step (b), such that the void inclusion elements comprise 1% to 31% of the fourth composition.
494. The process of any of the preceding process embodiments, further providing that, void inclusion elements are added to the compositions in Step (a) or Step (b), such that the void inclusion elements comprise 51% to 61% of the fourth composition.
495. The process of any of the preceding process embodiments, further providing that, void inclusion elements are added to the compositions in Step (a) or Step (b), such that the void inclusion elements comprise 41% to 66% of the fourth composition.
496. The process of any of the preceding process embodiments, further providing that, void inclusion elements are added to the compositions in Step (a) or Step (b), such that the void inclusion elements comprise 16% to 56% of the fourth composition.
497. The process of any of the preceding process embodiments, further providing that, void inclusion elements are added to the compositions in Step (a) or Step (b), such that the void inclusion elements comprise 36% to 71% of the fourth composition.
498. The process of any of the preceding process embodiments, further providing that, void inclusion elements are added to the compositions in Step (a) or Step (b), such that the void inclusion elements comprise 11% to 51% of the fourth composition.
499. The process of any of the preceding process embodiments, further providing that, void inclusion elements are added to the compositions in Step (a) or Step (b), such that the void inclusion elements comprise 31% to 66% of the fourth composition.
500. The process of any of the preceding process embodiments, further providing that, void inclusion elements are added to the compositions in Step (a) or Step (b), such that the void inclusion elements comprise 56% to 81% of the fourth composition.
501. The process of any of the preceding process embodiments, further providing that, void inclusion elements are added to the compositions in Step (a) or Step (b), such that the void inclusion elements comprise 76% to 81% of the fourth composition.
502. The process of any of the preceding process embodiments, further providing that, void inclusion elements are added to the compositions in Step (a) or Step (b), such that the void inclusion elements comprise 26% to 51% of the fourth composition.
503. The process of any of the preceding process embodiments, further providing that, void inclusion elements are added to the compositions in Step (a) or Step (b), such that the void inclusion elements comprise 1% to 61% of the fourth composition.
504. The process of any of the preceding process embodiments, further providing that, void inclusion elements are added to the compositions in Step (a) or Step (b), such that the void inclusion elements comprise 16% to 66% of the fourth composition.
505. The process of any of the preceding process embodiments, further providing that, void inclusion elements are added to the compositions in Step (a) or Step (b), such that the void inclusion elements comprise 21% to 76% of the fourth composition.
506. The process of any of the preceding process embodiments, further providing that, void inclusion elements are added to the compositions in Step (a) or Step (b), such that the void inclusion elements comprise 36% to 51% of the fourth composition.
507. The process of any of the preceding process embodiments, further providing that, void inclusion elements are added to the compositions in Step (a) or Step (b), such that the void inclusion elements comprise 16% to 71% of the fourth composition.
508. The process of any of the preceding process embodiments, further providing that, void inclusion elements are added to the compositions in Step (a) or Step (b), such that the void inclusion elements comprise 36% to 41% of the fourth composition.
509. The process of any of the preceding process embodiments, further providing that, void inclusion elements are added to the compositions in Step (a) or Step (b), such that the void inclusion elements comprise 31% to 51% of the fourth composition.
510. The process of any of the preceding process embodiments, further providing that, void inclusion elements are added to the compositions in Step (a) or Step (b), such that the void inclusion elements comprise 46% to 71% of the fourth composition.
511. The process of any of the preceding process embodiments, further providing that, void inclusion elements are added to the compositions in Step (a) or Step (b), such that the void inclusion elements comprise 1% to 16% of the fourth composition.
512. The process of any of the preceding process embodiments, further providing that, void inclusion elements are added to the compositions in Step (a) or Step (b), such that the void inclusion elements comprise 51% to 66% of the fourth composition.
513. The process of any of the preceding process embodiments, further providing that, void inclusion elements are added to the compositions in Step (a) or Step (b), such that the void inclusion elements comprise 11% to 46% of the fourth composition.
514. The process of any of the preceding process embodiments, further providing that, void inclusion elements are added to the compositions in Step (a) or Step (b), such that the void inclusion elements comprise 31% to 81% of the fourth composition.
515. The process of any of the preceding process embodiments, further providing that, void inclusion elements are added to the compositions in Step (a) or Step (b), such that the void inclusion elements comprise 66% to 81% of the fourth composition.
516. The process of any of the preceding process embodiments, further providing that, void inclusion elements are added to the compositions in Step (a) or Step (b), such that the void inclusion elements comprise 1% to 81% of the fourth composition.
517. The process of any of the preceding process embodiments, further providing that, void inclusion elements are added to the compositions in Step (a) or Step (b), such that the void inclusion elements comprise 1% to 51% of the fourth composition.
518. The process of any of the preceding process embodiments, further providing that, void inclusion elements are added to the compositions in Step (a) or Step (b), 518. (cont.) such that the void inclusion elements comprise 6% to 61% of the fourth composition.
519. The process of any of the preceding process embodiments, further providing that, void inclusion elements are added to the compositions in Step (a) or Step (b), such that the void inclusion elements comprise 11% to 36% of the fourth composition.
520. The process of any of the preceding process embodiments, further providing that, void inclusion elements are added to the compositions in Step (a) or Step (b), such that the void inclusion elements comprise 6% to 56% of the fourth composition.
521. The process of any of the preceding process embodiments, further providing that, void inclusion elements are added to the compositions in Step (a) or Step (b), such that the void inclusion elements comprise 6% to 16% of the fourth composition.
522. The process of any of the preceding process embodiments, further providing that, void inclusion elements are added to the compositions in Step (a) or Step (b), such that the void inclusion elements comprise 16% to 26% of the fourth composition.
523. The process of any of the preceding process embodiments, further providing that, void inclusion elements are added to the compositions in Step (a) or Step (b), such that the void inclusion elements comprise 26% to 76% of the fourth composition.
524. The process of any of the preceding process embodiments, further providing that the solutions of Step (a) and Step (b) is degassed.
525. The process of any of the preceding process embodiments, further providing that the solutions of Step (a) and Step (b) is degassed via one or more methods which may include, but are not limited to, pressure reduction, thermal regulation, membrane degasification, ultrasonic degassing, freeze-pump-thaw cycling, and/or centrifugation.
526. The process of any of the preceding process embodiments, further providing that the solutions of Step (a) and Step (b) is degassed via centrifugation.
527. The process of any of the preceding process embodiments, further providing that the solutions of Step (a) and Step (b) is degassed via pressure reduction under vacuum.
528. The process of any of the preceding process embodiments, wherein said the coagulation bath solution comprises one or more polycarboxylic acid salts including sodium citrate, sodium malate, potassium malate and/or potassium citrate.
529. The process of any of the preceding process embodiments, wherein said the coagulation bath solution comprises one or more polycarboxylic acid salts including sodium malate and/or potassium malate.
530. The process of any of the preceding process embodiments, wherein said the coagulation bath solution comprises one or more polycarboxylic acid salts including sodium malate.
531. The process of any of the preceding process embodiments, wherein said the coagulation bath solution comprises one or more polycarboxylic acid salts including potassium malate.
532. The process of any of the preceding process embodiments, wherein said the coagulation bath solution comprises one or more polycarboxylic acid salts including sodium citrate and/or potassium citrate.
533. The process of any of the preceding process embodiments, wherein said the coagulation bath solution comprises one or more polycarboxylic acid salts including sodium citrate.
534. The process of any of the preceding process embodiments, wherein said the coagulation bath solution comprises one or more polycarboxylic acid salts including potassium citrate.
535. The process of any of the preceding process embodiments, further providing that one or more salts is added to the composition of the coagulation bath solution including, but not limited to, ammonium sulphate, calcium carbonate, disodium hydrogen phosphite, dipotassium phosphate, lithium sulphate, monosodium phosphate, potassium carbonate, potassium chloride, potassium sulphate, sodium bicarbonate, sodium bisulphate, sodium bisulphite, sodium carbonate, sodium chloride, sodium hypophosphite, sodium malonate, sodium maleate, sodium meta-bisulphite, sodium sulphate, sodium sulphite, sodium sulphite, trilithium citrate, triammonium citrate, trisodium citrate, tripotassium citrate, zinc chloride, and/or zinc sulphate.
536. The process of any of the preceding process embodiments, further providing that one or more salts is added to the composition of the coagulation bath solution including, but not limited to sodium bicarbonate.
537. The process of any of the preceding process embodiments, further providing that one or more salts is added to the composition of the coagulation bath solution including, but not limited to triammonium citrate.
538. The process of any of the preceding process embodiments, further providing that one or more salts is added to the composition of the coagulation bath solution including, but not limited to dipotassium phosphate.
539. The process of any of the preceding process embodiments, further providing that one or more salts is added to the composition of the coagulation bath solution including, but not limited to calcium carbonate.
540. The process of any of the preceding process embodiments, further providing that one or more salts is added to the composition of the coagulation bath solution including, but not limited to sodium bisulphate.
541. The process of any of the preceding process embodiments, further providing that one or more salts is added to the composition of the coagulation bath solution including, but not limited to zinc sulphate.
542. The process of any of the preceding process embodiments, further providing that one or more salts is added to the composition of the coagulation bath solution including, but not limited to sodium sulphite.
543. The process of any of the preceding process embodiments, further providing that one or more salts is added to the composition of the coagulation bath solution including, but not limited to sodium meta-bisulphite.
544. The process of any of the preceding process embodiments, further providing that one or more salts is added to the composition of the coagulation bath solution including, but not limited to sodium bisulphite.
545. The process of any of the preceding process embodiments, further providing that one or more salts is added to the composition of the coagulation bath solution including, but not limited to sodium carbonate.
546. The process of any of the preceding process embodiments, further providing that one or more salts is added to the composition of the coagulation bath solution including, but not limited to tripotassium citrate.

547. The process of any of the preceding process embodiments, further providing that one or more salts is added to the composition of the coagulation bath solution including, but not limited to trilithium citrate.
548. The process of any of the preceding process embodiments, further providing that one or more salts is added to the composition of the coagulation bath solution including, but not limited to lithium sulphate.
549. The process of any of the preceding process embodiments, further providing that one or more salts is added to the composition of the coagulation bath solution including, but not limited to sodium malonate.
550. The process of any of the preceding process embodiments, further providing that one or more salts is added to the composition of the coagulation bath solution including, but not limited to trisodium citrate.
551. The process of any of the preceding process embodiments, further providing that one or more salts is added to the composition of the coagulation bath solution including, but not limited to sodium hypophosphite.
552. The process of any of the preceding process embodiments, further providing that one or more salts is added to the composition of the coagulation bath solution including, but not limited to potassium chloride.
553. The process of any of the preceding process embodiments, further providing that one or more salts is added to the composition of the coagulation bath solution including, but not limited to potassium sulphate.
554. The process of any of the preceding process embodiments, further providing that one or more salts is added to the composition of the coagulation bath solution including, but not limited to ammonium sulphate.
555. The process of any of the preceding process embodiments, further providing that one or more salts is added to the composition of the coagulation bath solution including, but not limited to disodium hydrogen phosphite.
556. The process of any of the preceding process embodiments, further providing that one or more salts is added to the composition of the coagulation bath solution including, but not limited to sodium maleate.
557. The process of any of the preceding process embodiments, further providing that one or more salts is added to the composition of the coagulation bath solution including, but not limited to potassium carbonate.
558. The process of any of the preceding process embodiments, further providing that one or more salts is added to the composition of the coagulation bath solution including, but not limited to monosodium phosphate.
559. The process of any of the preceding process embodiments, further providing that one or more salts is added to the composition of the coagulation bath solution including, but not limited to zinc chloride.
560. The process of any of the preceding process embodiments, further providing that one or more salts is added to the composition of the coagulation bath solution including, but not limited to sodium sulphite.
561. The process of any of the preceding process embodiments, further providing that one or more salts is added to the composition of the coagulation bath solution including, but not limited to sodium chloride.
562. The process of any of the preceding process embodiments, further providing that one or more salts is added to the composition of the coagulation bath solution including, but not limited to sodium sulphate.
563. The process of any of the preceding process embodiments, wherein said the coagulation bath solution comprises one or more polycarboxylic acid salts including sodium oxalate, potassium oxalate, sodium malate, potassium malate, sodium succinate, potassium succinate, sodium adipate, potassium adipate, sodium tartrate, potassium tartrate, sodium malonate, and/or potassium malonate.
564. The process of any of the preceding process embodiments, wherein said the coagulation bath solution comprises one or more polycarboxylic acid salts including sodium oxalate, potassium oxalate, sodium malate, potassium malate, sodium succinate, potassium succinate, sodium adipate, potassium adipate, sodium tartrate, potassium tartrate, sodium malonate, and/or potassium malonate and is supplemented with a catalytic salt including zinc sulphate, sodium sulphite, sodium bisulphite, sodium meta-bisulphite, sodium hypophosphite and/or ammonium sulphate.
565. The process of any of the preceding process embodiments, wherein the pH of the coagulation bath solution is above 7.0 and less than 10.0.
566. The process of any of the preceding process embodiments, wherein the pH of the coagulation bath solution is between 7.5 and 9.5.
567. The process of any of the preceding process embodiments, wherein the pH of the coagulation bath solution is between 7.75 and 9.25.
568. The process of any of the preceding process embodiments, wherein the pH of the coagulation bath solution is between 8.0 and 9.0.
569. The process of any of the preceding process embodiments, wherein the pH of the coagulation bath solution is between 8.1 and 8.5.
570. The process of any of the preceding process embodiments, wherein the temperature of the coagulation bath solution is between 41° C. to 51° C.
571. The process of any of the preceding process embodiments, wherein the temperature of the coagulation bath solution is between 21° C. to 91° C.
572. The process of any of the preceding process embodiments, wherein the temperature of the coagulation bath solution is between 41° C. to 91° C.
573. The process of any of the preceding process embodiments, wherein the temperature of the coagulation bath solution is between 61° C. to 81° C.
574. The process of any of the preceding process embodiments, wherein the temperature of the coagulation bath solution is between 1° C. to 11° C.
575. The process of any of the preceding process embodiments, wherein the temperature of the coagulation bath solution is between 1° C. to 31° C.
576. The process of any of the preceding process embodiments, wherein the temperature of the coagulation bath solution is between 31° C. to 91° C.
577. The process of any of the preceding process embodiments, wherein the temperature of the coagulation bath solution is between 21° C. to 81° C.
578. The process of any of the preceding process embodiments, wherein the temperature of the coagulation bath solution is between 1° C. to 71° C.
579. The process of any of the preceding process embodiments, wherein the temperature of the coagulation bath solution is between 31° C. to 61° C.
580. The process of any of the preceding process embodiments, wherein the temperature of the coagulation bath solution is between 11° C. to 81° C.

581. The process of any of the preceding process embodiments, wherein the temperature of the coagulation bath solution is between 1° C. to 51° C.
582. The process of any of the preceding process embodiments, wherein the temperature of the coagulation bath solution is between 71° C. to 91° C.
583. The process of any of the preceding process embodiments, wherein the temperature of the coagulation bath solution is between 11° C. to 21° C.
584. The process of any of the preceding process embodiments, wherein the temperature of the coagulation bath solution is between 21° C. to 31° C.
585. The process of any of the preceding process embodiments, wherein the temperature of the coagulation bath solution is between 41° C. to 61° C.
586. The process of any of the preceding process embodiments, wherein the temperature of the coagulation bath solution is between 51° C. to 81° C.
587. The process of any of the preceding process embodiments, wherein the temperature of the coagulation bath solution is between 41° C. to 81° C.
588. The process of any of the preceding process embodiments, wherein the temperature of the coagulation bath solution is between 71° C. to 81° C.
589. The process of any of the preceding process embodiments, wherein the temperature of the coagulation bath solution is between 11° C. to 71° C.
590. The process of any of the preceding process embodiments, wherein the temperature of the coagulation bath solution is between 51° C. to 71° C.
591. The process of any of the preceding process embodiments, wherein the temperature of the coagulation bath solution is between 11° C. to 41° C.
592. The process of any of the preceding process embodiments, wherein the temperature of the coagulation bath solution is between 21° C. to 51° C.
593. The process of any of the preceding process embodiments, wherein the temperature of the coagulation bath solution is between 41° C. to 71° C.
594. The process of any of the preceding process embodiments, wherein the temperature of the coagulation bath solution is between 1° C. to 91° C.
595. The process of any of the preceding process embodiments, wherein the temperature of the coagulation bath solution is between 31° C. to 81° C.
596. The process of any of the preceding process embodiments, wherein the temperature of the coagulation bath solution is between 31° C. to 41° C.
597. The process of any of the preceding process embodiments, wherein the temperature of the coagulation bath solution is between 11° C. to 61° C.
598. The process of any of the preceding process embodiments, wherein the temperature of the coagulation bath solution is between 1° C. to 81° C.
599. The process of any of the preceding process embodiments, wherein the temperature of the coagulation bath solution is between 81° C. to 91° C.
600. The process of any of the preceding process embodiments, wherein the temperature of the coagulation bath solution is between 1° C. to 61° C.
601. The process of any of the preceding process embodiments, wherein the temperature of the coagulation bath solution is between 21° C. to 41° C.
602. The process of any of the preceding process embodiments, wherein the temperature of the coagulation bath solution is between 1° C. to 21° C.
603. The process of any of the preceding process embodiments, wherein the temperature of the coagulation bath solution is between 1° C. to 41° C.
604. The process of any of the preceding process embodiments, wherein the temperature of the coagulation bath solution is between 31° C. to 71° C.
605. The process of any of the preceding process embodiments, wherein the temperature of the coagulation bath solution is between 11° C. to 51° C.
606. The process of any of the preceding process embodiments, wherein the temperature of the coagulation bath solution is between 51° C. to 61° C.
607. The process of any of the preceding process embodiments, wherein the temperature of the coagulation bath solution is between 21° C. to 71° C.
608. The process of any of the preceding process embodiments, wherein the temperature of the coagulation bath solution is between 61° C. to 91° C.
609. The process of any of the preceding process embodiments, wherein the temperature of the coagulation bath solution is between 21° C. to 61° C.
610. The process of any of the preceding process embodiments, wherein the temperature of the coagulation bath solution is between 51° C. to 91° C.
611. The process of any of the preceding process embodiments, wherein the temperature of the coagulation bath solution is between 61° C. to 71° C.
612. The process of any of the preceding process embodiments, wherein the temperature of the coagulation bath solution is between 11° C. to 31° C.
613. The process of any of the preceding process embodiments, wherein the temperature of the coagulation bath solution is between 11° C. to 91° C.
614. The process of any of the preceding process embodiments, wherein the temperature of the coagulation bath solution is between 31° C. to 51° C.
615. The process of any of the preceding process embodiments, wherein the temperature of the coagulation bath solution is at room temperature.
616. The process of any of the preceding process embodiments, where in the hollow fibre is washed in an excess of aqueous solvent with a pH between 7.0 and 8.0 after step (d).
617. The process of any of the preceding process embodiments, wherein the organic solvent used in Step (e.i) includes at least one of, methanol, ethanol, propanol, iso-propanol, butanol, iso-butanol, dimethyl sulfoxide, dimethylformamide, dimethylacetamide, polyol(s) and/or polymers of polyol(s).
618. The process of any of the preceding process embodiments, wherein the organic solvent used in Step (e.i) is acetone.
619. The process of any of the preceding process embodiments, wherein the organic solvent used in Step (e.i) is methanol.
620. The process of any of the preceding process embodiments, wherein the organic solvent used in Step (e.i) is ethanol.
621. The process of any of the preceding process embodiments, wherein the organic solvent used in Step (e.i) is propanol.
622. The process of any of the preceding process embodiments, wherein the organic solvent used in Step (e.i) is iso-propanol.
623. The process of any of the preceding process embodiments, wherein the organic solvent used in Step (e.i) is butanol.

624. The process of any of the preceding process embodiments, wherein the organic solvent used in Step (e.i) is iso-butanol.
625. The process of any of the preceding process embodiments, wherein the organic solvent used in Step (e.i) is dimethyl sulfoxide.
626. The process of any of the preceding process embodiments, wherein the organic solvent used in Step (e.i) is dimethylformamide.
627. The process of any of the preceding process embodiments, wherein the organic solvent used in Step (e.i) is dimethylacetamide.
628. The process of any of the preceding process embodiments, wherein the organic solvent used in Step (e.i) comprises polyol(s).
629. The process of any of the preceding process embodiments, wherein the organic solvent used in Step (e.i) comprises polymers of polymer(s).
630. The process of any of the preceding process embodiments, wherein the solvent used in Step (e.i) is supercritical $CO_2$.
631. The process of any of the preceding process embodiments, wherein the concentration of any singular component in the solvent mixture used Step (e.i) is 0% (w/v) to 90% (w/v).
632. The process of any of the preceding process embodiments, wherein the concentration of any singular component in the solvent mixture used Step (e.i) is 10% (w/v) to 90% (w/v).
633. The process of any of the preceding process embodiments, wherein the concentration of any singular component in the solvent mixture used Step (e.i) is 50% (w/v) to 80% (w/v).
634. The process of any of the preceding process embodiments, wherein the concentration of any singular component in the solvent mixture used Step (e.i) is 40% (w/v) to 100% (w/v).
635. The process of any of the preceding process embodiments, wherein the concentration of any singular component in the solvent mixture used Step (e.i) is 0% (w/v) to 80% (w/v).
636. The process of any of the preceding process embodiments, wherein the concentration of any singular component in the solvent mixture used Step (e.i) is 0% (w/v) to 70% (w/v).
637. The process of any of the preceding process embodiments, wherein the concentration of any singular component in the solvent mixture used Step (e.i) is 0% (w/v) to 10% (w/v).
638. The process of any of the preceding process embodiments, wherein the concentration of any singular component in the solvent mixture used Step (e.i) is 50% (w/v) to 70% (w/v).
639. The process of any of the preceding process embodiments, wherein the concentration of any singular component in the solvent mixture used Step (e.i) is 50% (w/v) to 100% (w/v).
640. The process of any of the preceding process embodiments, wherein the concentration of any singular component in the solvent mixture used Step (e.i) is 80% (w/v) to 100% (w/v).
641. The process of any of the preceding process embodiments, wherein the concentration of any singular component in the solvent mixture used Step (e.i) is 40% (w/v) to 50% (w/v).
642. The process of any of the preceding process embodiments, wherein the concentration of any singular component in the solvent mixture used Step (e.i) is 10% (w/v) to 50% (w/v).
643. The process of any of the preceding process embodiments, wherein the concentration of any singular component in the solvent mixture used Step (e.i) is 0% (w/v) to 30% (w/v).
644. The process of any of the preceding process embodiments, wherein the concentration of any singular component in the solvent mixture used Step (e.i) is 70% (w/v) to 90% (w/v).
645. The process of any of the preceding process embodiments, wherein the concentration of any singular component in the solvent mixture used Step (e.i) is 70% (w/v) to 100% (w/v).
646. The process of any of the preceding process embodiments, wherein the concentration of any singular component in the solvent mixture used Step (e.i) is 90% (w/v) to 100% (w/v).
647. The process of any of the preceding process embodiments, wherein the concentration of any singular component in the solvent mixture used Step (e.i) is 40% (w/v) to 60% (w/v).
648. The process of any of the preceding process embodiments, wherein the concentration of any singular component in the solvent mixture used Step (e.i) is 10% (w/v) to 20% (w/v).
649. The process of any of the preceding process embodiments, wherein the concentration of any singular component in the solvent mixture used Step (e.i) is 20% (w/v) to 40% (w/v).
650. The process of any of the preceding process embodiments, wherein the concentration of any singular component in the solvent mixture used Step (e.i) is 10% (w/v) to 80% (w/v).
651. The process of any of the preceding process embodiments, wherein the concentration of any singular component in the solvent mixture used Step (e.i) is 0% (w/v) to 60% (w/v).
652. The process of any of the preceding process embodiments, wherein the concentration of any singular component in the solvent mixture used Step (e.i) is 0% (w/v) to 50% (w/v).
653. The process of any of the preceding process embodiments, wherein the concentration of any singular component in the solvent mixture used Step (e.i) is 10% (w/v) to 40% (w/v).
654. The process of any of the preceding process embodiments, wherein the concentration of any singular component in the solvent mixture used Step (e.i) is 10% (w/v) to 30% (w/v).
655. The process of any of the preceding process embodiments, wherein the concentration of any singular component in the solvent mixture used Step (e.i) is 50% (w/v) to 60% (w/v).
656. The process of any of the preceding process embodiments, wherein the concentration of any singular component in the solvent mixture used Step (e.i) is 20% (w/v) to 60% (w/v).
657. The process of any of the preceding process embodiments, wherein the concentration of any singular component in the solvent mixture used Step (e.i) is 0% (w/v) to 20% (w/v).

658. The process of any of the preceding process embodiments, wherein the concentration of any singular component in the solvent mixture used Step (e.i) is 20% (w/v) to 30% (w/v).
659. The process of any of the preceding process embodiments, wherein the concentration of any singular component in the solvent mixture used Step (e.i) is 0% (w/v) to 40% (w/v).
660. The process of any of the preceding process embodiments, wherein the concentration of any singular component in the solvent mixture used Step (e.i) is 60% (w/v) to 70% (w/v).
661. The process of any of the preceding process embodiments, wherein the concentration of any singular component in the solvent mixture used Step (e.i) is 10% (w/v) to 70% (w/v).
662. The process of any of the preceding process embodiments, wherein the concentration of any singular component in the solvent mixture used Step (e.i) is 20% (w/v) to 90% (w/v).
663. The process of any of the preceding process embodiments, wherein the concentration of any singular component in the solvent mixture used Step (e.i) is 60% (w/v) to 100% (w/v).
664. The process of any of the preceding process embodiments, wherein the concentration of any singular component in the solvent mixture used Step (e.i) is 30% (w/v) to 100% (w/v).
665. The process of any of the preceding process embodiments, wherein the concentration of any singular component in the solvent mixture used Step (e.i) is 30% (w/v) to 50% (w/v).
666. The process of any of the preceding process embodiments, wherein the concentration of any singular component in the solvent mixture used Step (e.i) is 50% (w/v) to 90% (w/v).
667. The process of any of the preceding process embodiments, wherein the concentration of any singular component in the solvent mixture used Step (e.i) is 10% (w/v) to 100% (w/v).
668. The process of any of the preceding process embodiments, wherein the concentration of any singular component in the solvent mixture used Step (e.i) is 20% (w/v) to 100% (w/v).
669. The process of any of the preceding process embodiments, wherein the concentration of any singular component in the solvent mixture used Step (e.i) is 20% (w/v) to 70% (w/v).
670. The process of any of the preceding process embodiments, wherein the concentration of any singular component in the solvent mixture used Step (e.i) is 30% (w/v) to 80% (w/v).
671. The process of any of the preceding process embodiments, wherein the concentration of any singular component in the solvent mixture used Step (e.i) is 30% (w/v) to 60% (w/v).
672. The process of any of the preceding process embodiments, wherein the concentration of any singular component in the solvent mixture used Step (e.i) is 20% (w/v) to 50% (w/v).
673. The process of any of the preceding process embodiments, wherein the concentration of any singular component in the solvent mixture used Step (e.i) is 0% (w/v) to 100% (w/v).
674. The process of any of the preceding process embodiments, wherein the concentration of any singular component in the solvent mixture used Step (e.i) is 40% (w/v) to 70% (w/v).
675. The process of any of the preceding process embodiments, wherein the concentration of any singular component in the solvent mixture used Step (e.i) is 60% (w/v) to 90% (w/v).
676. The process of any of the preceding process embodiments, wherein the concentration of any singular component in the solvent mixture used Step (e.i) is 30% (w/v) to 90% (w/v).
677. The process of any of the preceding process embodiments, wherein the concentration of any singular component in the solvent mixture used Step (e.i) is 10% (w/v) to 60% (w/v).
678. The process of any of the preceding process embodiments, wherein the concentration of any singular component in the solvent mixture used Step (e.i) is 40% (w/v) to 90% (w/v).
679. The process of any of the preceding process embodiments, wherein the concentration of any singular component in the solvent mixture used Step (e.i) is 30% (w/v) to 70% (w/v).
680. The process of any of the preceding process embodiments, wherein the concentration of any singular component in the solvent mixture used Step (e.i) is 80% (w/v) to 90% (w/v).
681. The process of any of the preceding process embodiments, wherein the concentration of any singular component in the solvent mixture used Step (e.i) is 40% (w/v) to 80% (w/v).
682. The process of any of the preceding process embodiments, wherein the concentration of any singular component in the solvent mixture used Step (e.i) is 70% (w/v) to 80% (w/v).
683. The process of any of the preceding process embodiments, wherein the concentration of any singular component in the solvent mixture used Step (e.i) is 30% (w/v) to 40% (w/v).
684. The process of any of the preceding process embodiments, wherein the concentration of any singular component in the solvent mixture used Step (e.i) is 20% (w/v) to 80% (w/v).
685. The process of any of the preceding process embodiments, wherein the concentration of any singular component in the solvent mixture used Step (e.i) is 60% (w/v) to 80% (w/v).
686. The process of any of the preceding process embodiments, wherein the temperature used in Step (e.i) is within the range of 40° C. to 90° C.
687. The process of any of the preceding process embodiments, wherein the temperature used in Step (e.i) is within the range of 30° C. to 70° C.
688. The process of any of the preceding process embodiments, wherein the temperature used in Step (e.i) is within the range of 20° C. to 70° C.
689. The process of any of the preceding process embodiments, wherein the temperature used in Step (e.i) is within the range of 0° C. to 10° C.
690. The process of any of the preceding process embodiments, wherein the temperature used in Step (e.i) is within the range of 60° C. to 90° C.
691. The process of any of the preceding process embodiments, wherein the temperature used in Step (e.i) is within the range of 20° C. to 40° C.

692. The process of any of the preceding process embodiments, wherein the temperature used in Step (e.i) is within the range of 50° C. to 60° C.
693. The process of any of the preceding process embodiments, wherein the temperature used in Step (e.i) is within the range of 30° C. to 90° C.
694. The process of any of the preceding process embodiments, wherein the temperature used in Step (e.i) is within the range of 0° C. to 20° C.
695. The process of any of the preceding process embodiments, wherein the temperature used in Step (e.i) is within the range of 60° C. to 70° C.
696. The process of any of the preceding process embodiments, wherein the temperature used in Step (e.i) is within the range of 10° C. to 50° C.
697. The process of any of the preceding process embodiments, wherein the temperature used in Step (e.i) is within the range of 50° C. to 70° C.
698. The process of any of the preceding process embodiments, wherein the temperature used in Step (e.i) is within the range of 30° C. to 40° C.
699. The process of any of the preceding process embodiments, wherein the temperature used in Step (e.i) is within the range of 40° C. to 50° C.
700. The process of any of the preceding process embodiments, wherein the temperature used in Step (e.i) is within the range of 20° C. to 80° C.
701. The process of any of the preceding process embodiments, wherein the temperature used in Step (e.i) is within the range of 50° C. to 80° C.
702. The process of any of the preceding process embodiments, wherein the temperature used in Step (e.i) is within the range of 20° C. to 90° C.
703. The process of any of the preceding process embodiments, wherein the temperature used in Step (e.i) is within the range of 0° C. to 60° C.
704. The process of any of the preceding process embodiments, wherein the temperature used in Step (e.i) is within the range of 0° C. to 70° C.
705. The process of any of the preceding process embodiments, wherein the temperature used in Step (e.i) is within the range of 30° C. to 60° C.
706. The process of any of the preceding process embodiments, wherein the temperature used in Step (e.i) is within the range of 20° C. to 50° C.
707. The process of any of the preceding process embodiments, wherein the temperature used in Step (e.i) is within the range of 10° C. to 30° C.
708. The process of any of the preceding process embodiments, wherein the temperature used in Step (e.i) is within the range of 10° C. to 40° C.
709. The process of any of the preceding process embodiments, wherein the temperature used in Step (e.i) is within the range of 10° C. to 70° C.
710. The process of any of the preceding process embodiments, wherein the temperature used in Step (e.i) is within the range of 70° C. to 90° C.
711. The process of any of the preceding process embodiments, wherein the temperature used in Step (e.i) is within the range of 0° C. to 90° C.
712. The process of any of the preceding process embodiments, wherein the temperature used in Step (e.i) is within the range of 10° C. to 60° C.
713. The process of any of the preceding process embodiments, wherein the temperature used in Step (e.i) is within the range of 60° C. to 80° C.
714. The process of any of the preceding process embodiments, wherein the temperature used in Step (e.i) is within the range of 10° C. to 80° C.
715. The process of any of the preceding process embodiments, wherein the temperature used in Step (e.i) is within the range of 0° C. to 40° C.
716. The process of any of the preceding process embodiments, wherein the temperature used in Step (e.i) is within the range of 0° C. to 30° C.
717. The process of any of the preceding process embodiments, wherein the temperature used in Step (e.i) is within the range of 0° C. to 50° C.
718. The process of any of the preceding process embodiments, wherein the temperature used in Step (e.i) is within the range of 20° C. to 30° C.
719. The process of any of the preceding process embodiments, wherein the temperature used in Step (e.i) is within the range of 70° C. to 80° C.
720. The process of any of the preceding process embodiments, wherein the temperature used in Step (e.i) is within the range of 50° C. to 90° C.
721. The process of any of the preceding process embodiments, wherein the temperature used in Step (e.i) is within the range of 30° C. to 50° C.
722. The process of any of the preceding process embodiments, wherein the temperature used in Step (e.i) is within the range of 30° C. to 80° C.
723. The process of any of the preceding process embodiments, wherein the temperature used in Step (e.i) is within the range of 40° C. to 70° C.
724. The process of any of the preceding process embodiments, wherein the temperature used in Step (e.i) is within the range of 10° C. to 90° C.
725. The process of any of the preceding process embodiments, wherein the temperature used in Step (e.i) is within the range of 40° C. to 60° C.
726. The process of any of the preceding process embodiments, wherein the temperature used in Step (e.i) is within the range of 10° C. to 20° C.
727. The process of any of the preceding process embodiments, wherein the temperature used in Step (e.i) is within the range of 40° C. to 80° C.
728. The process of any of the preceding process embodiments, wherein the temperature used in Step (e.i) is within the range of 80° C. to 90° C.
729. The process of any of the preceding process embodiments, wherein the temperature used in Step (e.i) is within the range of 0° C. to 80° C.
730. The process of any of the preceding process embodiments, wherein the temperature used in Step (e.i) is within the range of 20° C. to 60° C.
731. The process of any of the preceding process embodiments, wherein the temperature used in Step (e.i) is room temperature.
732. The process of any of the preceding process embodiments, wherein the duration used in Step (e.i) is within the range of 70 minutes to 80 minutes.
733. The process of any of the preceding process embodiments, wherein the duration used in Step (e.i) is within the range of 10 minutes to 60 minutes.
734. The process of any of the preceding process embodiments, wherein the duration used in Step (e.i) is within the range of 30 minutes to 80 minutes.
735. The process of any of the preceding process embodiments, wherein the duration used in Step (e.i) is within the range of 60 minutes to 110 minutes.

736. The process of any of the preceding process embodiments, wherein the duration used in Step (e.i) is within the range of 50 minutes to 70 minutes.
737. The process of any of the preceding process embodiments, wherein the duration used in Step (e.i) is within the range of 80 minutes to 110 minutes.
738. The process of any of the preceding process embodiments, wherein the duration used in Step (e.i) is within the range of 100 minutes to 110 minutes.
739. The process of any of the preceding process embodiments, wherein the duration used in Step (e.i) is within the range of 90 minutes to 100 minutes.
740. The process of any of the preceding process embodiments, wherein the duration used in Step (e.i) is within the range of 20 minutes to 80 minutes.
741. The process of any of the preceding process embodiments, wherein the duration used in Step (e.i) is within the range of 40 minutes to 100 minutes.
742. The process of any of the preceding process embodiments, wherein the duration used in Step (e.i) is within the range of 0 minutes to 110 minutes.
743. The process of any of the preceding process embodiments, wherein the duration used in Step (e.i) is within the range of 20 minutes to 40 minutes.
744. The process of any of the preceding process embodiments, wherein the duration used in Step (e.i) is within the range of 50 minutes to 90 minutes.
745. The process of any of the preceding process embodiments, wherein the duration used in Step (e.i) is within the range of 10 minutes to 70 minutes.
746. The process of any of the preceding process embodiments, wherein the duration used in Step (e.i) is within the range of 40 minutes to 80 minutes.
747. The process of any of the preceding process embodiments, wherein the duration used in Step (e.i) is within the range of 60 minutes to 100 minutes.
748. The process of any of the preceding process embodiments, wherein the duration used in Step (e.i) is within the range of 40 minutes to 90 minutes.
749. The process of any of the preceding process embodiments, wherein the duration used in Step (e.i) is within the range of 80 minutes to 100 minutes.
750. The process of any of the preceding process embodiments, wherein the duration used in Step (e.i) is within the range of 40 minutes to 120 minutes.
751. The process of any of the preceding process embodiments, wherein the duration used in Step (e.i) is within the range of 10 minutes to 50 minutes.
752. The process of any of the preceding process embodiments, wherein the duration used in Step (e.i) is within the range of 10 minutes to 80 minutes.
753. The process of any of the preceding process embodiments, wherein the duration used in Step (e.i) is within the range of 60 minutes to 90 minutes.
754. The process of any of the preceding process embodiments, wherein the duration used in Step (e.i) is within the range of 30 minutes to 100 minutes.
755. The process of any of the preceding process embodiments, wherein the duration used in Step (e.i) is within the range of 10 minutes to 110 minutes.
756. The process of any of the preceding process embodiments, wherein the duration used in Step (e.i) is within the range of 30 minutes to 50 minutes.
757. The process of any of the preceding process embodiments, wherein the duration used in Step (e.i) is within the range of 50 minutes to 110 minutes.
758. The process of any of the preceding process embodiments, wherein the duration used in Step (e.i) is within the range of 80 minutes to 120 minutes.
759. The process of any of the preceding process embodiments, wherein the duration used in Step (e.i) is within the range of 70 minutes to 100 minutes.
760. The process of any of the preceding process embodiments, wherein the duration used in Step (e.i) is within the range of 60 minutes to 70 minutes.
761. The process of any of the preceding process embodiments, wherein the duration used in Step (e.i) is within the range of 30 minutes to 60 minutes.
762. The process of any of the preceding process embodiments, wherein the duration used in Step (e.i) is within the range of 20 minutes to 50 minutes.
763. The process of any of the preceding process embodiments, wherein the duration used in Step (e.i) is within the range of 10 minutes to 30 minutes.
764. The process of any of the preceding process embodiments, wherein the duration used in Step (e.i) is within the range of 10 minutes to 100 minutes.
765. The process of any of the preceding process embodiments, wherein the duration used in Step (e.i) is within the range of 90 minutes to 120 minutes.
766. The process of any of the preceding process embodiments, wherein the duration used in Step (e.i) is within the range of 70 minutes to 120 minutes.
767. The process of any of the preceding process embodiments, wherein the duration used in Step (e.i) is within the range of 20 minutes to 110 minutes.
768. The process of any of the preceding process embodiments, wherein the duration used in Step (e.i) is within the range of 20 minutes to 60 minutes.
769. The process of any of the preceding process embodiments, wherein the duration used in Step (e.i) is within the range of 30 minutes to 40 minutes.
770. The process of any of the preceding process embodiments, wherein the duration used in Step (e.i) is within the range of 20 minutes to 70 minutes.
771. The process of any of the preceding process embodiments, wherein the duration used in Step (e.i) is within the range of 80 minutes to 90 minutes.
772. The process of any of the preceding process embodiments, wherein the duration used in Step (e.i) is within the range of 40 minutes to 50 minutes.
773. The process of any of the preceding process embodiments, wherein the duration used in Step (e.i) is within the range of 0 minutes to 70 minutes.
774. The process of any of the preceding process embodiments, wherein the duration used in Step (e.i) is within the range of 90 minutes to 110 minutes.
775. The process of any of the preceding process embodiments, wherein the duration used in Step (e.i) is within the range of 10 minutes to 90 minutes.
776. The process of any of the preceding process embodiments, wherein the duration used in Step (e.i) is within the range of 110 minutes to 120 minutes.
777. The process of any of the preceding process embodiments, wherein the duration used in Step (e.i) is within the range of 0 minutes to 20 minutes.
778. The process of any of the preceding process embodiments, wherein the duration used in Step (e.i) is within the range of 0 minutes to 60 minutes.
779. The process of any of the preceding process embodiments, wherein the duration used in Step (e.i) is within the range of 0 minutes to 40 minutes.

780. The process of any of the preceding process embodiments, wherein the duration used in Step (e.i) is within the range of 50 minutes to 60 minutes.
781. The process of any of the preceding process embodiments, wherein the duration used in Step (e.i) is within the range of 0 minutes to 50 minutes.
782. The process of any of the preceding process embodiments, wherein the duration used in Step (e.i) is within the range of 20 minutes to 30 minutes.
783. The process of any of the preceding process embodiments, wherein the duration used in Step (e.i) is within the range of 100 minutes to 120 minutes.
784. The process of any of the preceding process embodiments, wherein the duration used in Step (e.i) is within the range of 40 minutes to 70 minutes.
785. The process of any of the preceding process embodiments, wherein the duration used in Step (e.i) is within the range of 70 minutes to 110 minutes.
786. The process of any of the preceding process embodiments, wherein the duration used in Step (e.i) is within the range of 50 minutes to 80 minutes.
787. The process of any of the preceding process embodiments, wherein the duration used in Step (e.i) is within the range of 20 minutes to 100 minutes.
788. The process of any of the preceding process embodiments, wherein the duration used in Step (e.i) is within the range of 0 minutes to 90 minutes.
789. The process of any of the preceding process embodiments, wherein the duration used in Step (e.i) is within the range of 20 minutes to 120 minutes.
790. The process of any of the preceding process embodiments, wherein the duration used in Step (e.i) is within the range of 40 minutes to 60 minutes.
791. The process of any of the preceding process embodiments, wherein the duration used in Step (e.i) is within the range of 10 minutes to 20 minutes.
792. The process of any of the preceding process embodiments, wherein the duration used in Step (e.i) is within the range of 0 minutes to 80 minutes.
793. The process of any of the preceding process embodiments, wherein the duration used in Step (e.i) is within the range of 0 minutes to 100 minutes.
794. The process of any of the preceding process embodiments, wherein the duration used in Step (e.i) is within the range of 50 minutes to 120 minutes.
795. The process of any of the preceding process embodiments, wherein the duration used in Step (e.i) is within the range of 0 minutes to 120 minutes.
796. The process of any of the preceding process embodiments, wherein the duration used in Step (e.i) is within the range of 10 minutes to 120 minutes.
797. The process of any of the preceding process embodiments, wherein the duration used in Step (e.i) is within the range of 50 minutes to 100 minutes.
798. The process of any of the preceding process embodiments, wherein the duration used in Step (e.i) is within the range of 30 minutes to 70 minutes.
799. The process of any of the preceding process embodiments, wherein the duration used in Step (e.i) is within the range of 60 minutes to 80 minutes.
800. The process of any of the preceding process embodiments, wherein the duration used in Step (e.i) is within the range of 60 minutes to 120 minutes.
801. The process of any of the preceding process embodiments, wherein the duration used in Step (e.i) is within the range of 10 minutes to 40 minutes.
802. The process of any of the preceding process embodiments, wherein the duration used in Step (e.i) is within the range of 20 minutes to 90 minutes.
803. The process of any of the preceding process embodiments, wherein the duration used in Step (e.i) is within the range of 30 minutes to 90 minutes.
804. The process of any of the preceding process embodiments, wherein the duration used in Step (e.i) is within the range of 0 minutes to 10 minutes.
805. The process of any of the preceding process embodiments, wherein the duration used in Step (e.i) is within the range of 30 minutes to 120 minutes.
806. The process of any of the preceding process embodiments, wherein the duration used in Step (e.i) is within the range of 40 minutes to 110 minutes.
807. The process of any of the preceding process embodiments, wherein the duration used in Step (e.i) is within the range of 30 minutes to 110 minutes.
808. The process of any of the preceding process embodiments, wherein the duration used in Step (e.i) is within the range of 70 minutes to 90 minutes.
809. The process of any of the preceding process embodiments, wherein the duration used in Step (e.i) is within the range of 0 minutes to 30 minutes.
810. The process of any of the preceding process embodiments, wherein the duration used in Step (e.i) is within the range of 14 hours to 20 hours.
811. The process of any of the preceding process embodiments, wherein the duration used in Step (e.i) is within the range of 4 hours to 16 hours.
812. The process of any of the preceding process embodiments, wherein the duration used in Step (e.i) is within the range of 10 hours to 12 hours.
813. The process of any of the preceding process embodiments, wherein the duration used in Step (e.i) is within the range of 6 hours to 24 hours.
814. The process of any of the preceding process embodiments, wherein the duration used in Step (e.i) is within the range of 4 hours to 6 hours.
815. The process of any of the preceding process embodiments, wherein the duration used in Step (e.i) is within the range of 2 hours to 22 hours.
816. The process of any of the preceding process embodiments, wherein the duration used in Step (e.i) is within the range of 10 hours to 24 hours.
817. The process of any of the preceding process embodiments, wherein the duration used in Step (e.i) is within the range of 12 hours to 22 hours.
818. The process of any of the preceding process embodiments, wherein the duration used in Step (e.i) is within the range of 8 hours to 22 hours.
819. The process of any of the preceding process embodiments, wherein the duration used in Step (e.i) is within the range of 2 hours to 16 hours.
820. The process of any of the preceding process embodiments, wherein the duration used in Step (e.i) is within the range of 14 hours to 16 hours.
821. The process of any of the preceding process embodiments, wherein the duration used in Step (e.i) is within the range of 2 hours to 4 hours.
822. The process of any of the preceding process embodiments, wherein the duration used in Step (e.i) is within the range of 10 hours to 22 hours.
823. The process of any of the preceding process embodiments, wherein the duration used in Step (e.i) is within the range of 12 hours to 14 hours.

824. The process of any of the preceding process embodiments, wherein the duration used in Step (e.i) is within the range of 14 hours to 24 hours.
825. The process of any of the preceding process embodiments, wherein the duration used in Step (e.i) is within the range of 6 hours to 10 hours.
826. The process of any of the preceding process embodiments, wherein the duration used in Step (e.i) is within the range of 16 hours to 24 hours.
827. The process of any of the preceding process embodiments, wherein the duration used in Step (e.i) is within the range of 8 hours to 10 hours.
828. The process of any of the preceding process embodiments, wherein the duration used in Step (e.i) is within the range of 12 hours to 20 hours.
829. The process of any of the preceding process embodiments, wherein the duration used in Step (e.i) is within the range of 2 hours to 24 hours.
830. The process of any of the preceding process embodiments, wherein the duration used in Step (e.i) is within the range of 10 hours to 16 hours.
831. The process of any of the preceding process embodiments, wherein the duration used in Step (e.i) is within the range of 12 hours to 24 hours.
832. The process of any of the preceding process embodiments, wherein the duration used in Step (e.i) is within the range of 16 hours to 20 hours.
833. The process of any of the preceding process embodiments, wherein the duration used in Step (e.i) is within the range of 20 hours to 24 hours.
834. The process of any of the preceding process embodiments, wherein the duration used in Step (e.i) is within the range of 14 hours to 18 hours.
835. The process of any of the preceding process embodiments, wherein the duration used in Step (e.i) is within the range of 20 hours to 22 hours.
836. The process of any of the preceding process embodiments, wherein the duration used in Step (e.i) is within the range of 6 hours to 18 hours.
837. The process of any of the preceding process embodiments, wherein the duration used in Step (e.i) is within the range of 4 hours to 12 hours.
838. The process of any of the preceding process embodiments, wherein the duration used in Step (e.i) is within the range of 12 hours to 18 hours.
839. The process of any of the preceding process embodiments, wherein the duration used in Step (e.i) is within the range of 16 hours to 22 hours.
840. The process of any of the preceding process embodiments, wherein the duration used in Step (e.i) is within the range of 2 hours to 6 hours.
841. The process of any of the preceding process embodiments, wherein the duration used in Step (e.i) is within the range of 8 hours to 20 hours.
842. The process of any of the preceding process embodiments, wherein the duration used in Step (e.i) is within the range of 2 hours to 20 hours.
843. The process of any of the preceding process embodiments, wherein the duration used in Step (e.i) is within the range of 16 hours to 18 hours.
844. The process of any of the preceding process embodiments, wherein the duration used in Step (e.i) is within the range of 4 hours to 24 hours.
845. The process of any of the preceding process embodiments, wherein the duration used in Step (e.i) is within the range of 4 hours to 10 hours.
846. The process of any of the preceding process embodiments, wherein the duration used in Step (e.i) is within the range of 6 hours to 12 hours.
847. The process of any of the preceding process embodiments, wherein the duration used in Step (e.i) is within the range of 2 hours to 12 hours.
848. The process of any of the preceding process embodiments, wherein the duration used in Step (e.i) is within the range of 4 hours to 8 hours.
849. The process of any of the preceding process embodiments, wherein the duration used in Step (e.i) is within the range of 10 hours to 20 hours.
850. The process of any of the preceding process embodiments, wherein the duration used in Step (e.i) is within the range of 4 hours to 14 hours.
851. The process of any of the preceding process embodiments, wherein the duration used in Step (e.i) is within the range of 8 hours to 16 hours.
852. The process of any of the preceding process embodiments, wherein the duration used in Step (e.i) is within the range of 18 hours to 20 hours.
853. The process of any of the preceding process embodiments, wherein the duration used in Step (e.i) is within the range of 12 hours to 16 hours.
854. The process of any of the preceding process embodiments, wherein the duration used in Step (e.i) is within the range of 2 hours to 18 hours.
855. The process of any of the preceding process embodiments, wherein the duration used in Step (e.i) is within the range of 8 hours to 18 hours.
856. The process of any of the preceding process embodiments, wherein the duration used in Step (e.i) is within the range of 6 hours to 14 hours.
857. The process of any of the preceding process embodiments, wherein the duration used in Step (e.i) is within the range of 2 hours to 14 hours.
858. The process of any of the preceding process embodiments, wherein the duration used in Step (e.i) is within the range of 4 hours to 22 hours.
859. The process of any of the preceding process embodiments, wherein the duration used in Step (e.i) is within the range of 2 hours to 8 hours.
860. The process of any of the preceding process embodiments, wherein the duration used in Step (e.i) is within the range of 6 hours to 20 hours.
861. The process of any of the preceding process embodiments, wherein the duration used in Step (e.i) is within the range of 2 hours to 10 hours.
862. The process of any of the preceding process embodiments, wherein the duration used in Step (e.i) is within the range of 4 hours to 20 hours.
863. The process of any of the preceding process embodiments, wherein the duration used in Step (e.i) is within the range of 6 hours to 22 hours.
864. The process of any of the preceding process embodiments, wherein the duration used in Step (e.i) is within the range of 14 hours to 22 hours.
865. The process of any of the preceding process embodiments, wherein the duration used in Step (e.i) is within the range of 10 hours to 14 hours.
866. The process of any of the preceding process embodiments, wherein the duration used in Step (e.i) is within the range of 8 hours to 12 hours.
867. The process of any of the preceding process embodiments, wherein the duration used in Step (e.i) is within the range of 8 hours to 14 hours.

868. The process of any of the preceding process embodiments, wherein the duration used in Step (e.i) is within the range of 6 hours to 8 hours.
869. The process of any of the preceding process embodiments, wherein the duration used in Step (e.i) is within the range of 18 hours to 24 hours.
870. The process of any of the preceding process embodiments, wherein the duration used in Step (e.i) is within the range of 8 hours to 24 hours.
871. The process of any of the preceding process embodiments, wherein the duration used in Step (e.i) is within the range of 18 hours to 22 hours.
872. The process of any of the preceding process embodiments, wherein the duration used in Step (e.i) is within the range of 10 hours to 18 hours.
873. The process of any of the preceding process embodiments, wherein the duration used in Step (e.i) is within the range of 6 hours to 16 hours.
874. The process of any of the preceding process embodiments, wherein the duration used in Step (e.i) is within the range of 4 hours to 18 hours.
875. The process of any of the preceding process embodiments, wherein the duration used in Step (e.i) is within the range of 22 hours to 24 hours.
876. The process of any of the preceding process embodiments, wherein the drying process of Step (e.ii), prior to annealing, is carried out at a temperature within the range of 5° C. to 90° C.
877. The process of any of the preceding process embodiments, wherein the drying process of Step (e.ii), prior to annealing, is carried out at a temperature within the range of 15° C. to 80° C.
878. The process of any of the preceding process embodiments, wherein the drying process of Step (e.ii), prior to annealing, is carried out at a temperature within the range of 40° C. to 70° C.
879. The process of any of the preceding process embodiments, wherein the drying process of Step (e.ii), prior to annealing, is carried out at a temperature within the range of 50° C. to 70° C.
880. The process of any of the preceding process embodiments, wherein the drying process of Step (e.ii), prior to annealing, is carried out at a temperature within the range of 50° C. to 60° C.
881. The process of any of the preceding process embodiments, wherein the drying process of Step (e.ii), prior to annealing, is carried out at a temperature within the range of 55° C. to 65° C.
882. The process of any of the preceding process embodiments, wherein the drying process of Step (e.ii), prior to annealing, is carried out at a temperature within the range of 60° C. to 70° C.
883. The process of any of the preceding process embodiments, wherein the drying process of Step (e.ii), prior to annealing, is carried out over duration of 0 minutes to 7 days.
884. The process of any of the preceding process embodiments, wherein the drying process of Step (e.ii), prior to annealing, is carried out over duration of 20 minutes to 5 days.
885. The process of any of the preceding process embodiments, wherein the drying process of Step (e.ii), prior to annealing, is carried out over duration of 40 minutes to 3 days.
886. The process of any of the preceding process embodiments, wherein the drying process of Step (e.ii), prior to annealing, is carried out over duration of 1 hour to 2 days.
887. The process of any of the preceding process embodiments, wherein the drying process of Step (e.ii), prior to annealing, is carried out over duration of 2 hour to 1 day.
888. The process of any of the preceding process embodiments, wherein the drying process of Step (e.ii), prior to annealing, is performed with convection, an infra-red heat source, and/or on a heated surface.
889. The process of any of the preceding process embodiments, wherein the annealing process of Step (e.ii) is carried out at a temperature that is within the range of 50° C. to 180° C.
890. The process of any of the preceding process embodiments, wherein the annealing step is carried out at a temperature that is within the range of 75° C. to 160° C.
891. The process of any of the preceding process embodiments, wherein the annealing process of Step (e.ii) is carried out at a temperature that is within the range of 110° C. to 140° C.
892. The process of any of the preceding process embodiments, wherein the annealing process of Step (e.ii) is carried out at a temperature that is within the range of 120° C. to 130° C.
893. The process of any of the preceding process embodiments, wherein the annealing process of Step (e.ii) is carried out at a temperature that is within the range of 180° C. to 200° C.
894. The process of any of the preceding process embodiments, wherein the annealing process of Step (e.ii) is carried out at a temperature that is within the range of 200° C. to 220° C.
895. The process of any of the preceding process embodiments, wherein the annealing process of Step (e.ii) is carried out at a temperature that is within the range of 220° C. to 250° C.
896. The process of any of the preceding process embodiments, wherein the annealing process of Step (e.ii) is carried out at a temperature that is within the range of 250° C. to 300° C.
897. The process of any of the preceding process embodiments, wherein the annealing process of Step (e.ii) is carried out at a temperature that is within the range of 130° C. to 140° C.
898. The process of any of the preceding process embodiments, wherein the annealing process of Step (e.ii) is carried out at a temperature that is within the range of 140° C. to 150° C.
899. The process of any of the preceding process embodiments, wherein the annealing process of Step (e.ii) is carried out at a temperature that is within the range of 150° C. to 160° C.
900. The process of any of the preceding process embodiments, wherein the annealing process of Step (e.ii) is carried out at a temperature that is within the range of 160° C. to 170° C.
901. The process of any of the preceding process embodiments, wherein the annealing process of Step (e.ii) is carried out at a temperature that is within the range of 170° C. to 180° C.
902. The process of any of the preceding process embodiments, wherein the annealing process of Step (e.ii) is carried out over duration of 10 minutes and 1 day.

903. The process of any of the preceding process embodiments, wherein the annealing in Step (e.ii) is carried out over a period that ranges between 10 minutes and 6 hours.
904. The process of any of the preceding process embodiments, wherein the annealing in Step (e.ii) is carried out over a period that ranges between 30 minutes and 3 hours.
905. The process of any of the preceding process embodiments, wherein the annealing in Step (e.ii) is carried out over a period that ranges between 45 hours and 2 hours.
906. The process of any of the preceding process embodiments, wherein the annealing in Step (e.ii) is carried out over a period that ranges between 1 hours and 1.5 hours.
907. The process of any of the preceding process embodiments, wherein the annealing process of Step (e.ii) is carried out in one or more fluids that include, methanol, ethanol, propanol, iso-propanol, butanol, acetone and supercritical $CO_2$.
908. The process of any of the preceding process embodiments, wherein the annealing process of Step (e.ii) is carried out in methanol.
909. The process of any of the preceding process embodiments, wherein the annealing process of Step (e.ii) is carried out in ethanol.
910. The process of any of the preceding process embodiments, wherein the annealing process of Step (e.ii) is carried out in propanol.
911. The process of any of the preceding process embodiments, wherein the annealing process of Step (e.ii) is carried out in iso-propanol.
912. The process of any of the preceding process embodiments, wherein the annealing process of Step (e.ii) is carried out in butanol.
913. The process of any of the preceding process embodiments, wherein the annealing process of Step (e.ii) is carried out in acetone.
914. The process of any of the preceding process embodiments, wherein the annealing process of Step (e.ii) is carried out in supercritical $CO_2$.
915. The process of any one of the preceding process embodiments, further providing that the material properties of a Prokitein of the preceding composition embodiments is altered and/or tailored by annealing.
916. The process of any one of the preceding process embodiments, further providing that the Youngs' modulus of a Prokitein of the preceding composition embodiments of the preceding composition embodiments is altered and/or tailored by annealing.
917. The process of any one of the preceding process embodiments, further providing that the ultimate tensile stress of a Prokitein of the preceding composition embodiments is altered and/or tailored by annealing.
918. The process of any one of the preceding process embodiments, further providing that the ultimate tensile strain of a Prokitein of the preceding composition embodiments is altered and/or tailored by annealing.
919. The process of any one of the preceding process embodiments, further providing that the material properties of a regular semi-crystalline polymer comprising ester, thioester and/or amide crosslinked polypeptides with a beta-sheet secondary structure of the preceding composition embodiments is altered and/or tailored by annealing.
920. The process of any one of the preceding process embodiments, further providing that the Youngs' modulus of a regular semi-crystalline polymer comprising ester, thioester and/or amide crosslinked polypeptides with a beta-sheet secondary structure of the preceding composition embodiments of the preceding composition embodiments is altered and/or tailored by annealing.
921. The process of any one of the preceding process embodiments, further providing that the ultimate tensile stress of a regular semi-crystalline polymer comprising ester, thioester and/or amide crosslinked polypeptides with a beta-sheet secondary structure of the preceding composition embodiments is altered and/or tailored by annealing.
922. The process of any one of the preceding process embodiments, further providing that the ultimate tensile strain of a regular semi-crystalline polymer comprising ester, thioester and/or amide crosslinked polypeptides with a beta-sheet secondary structure of the preceding composition embodiments is altered and/or tailored by annealing.
923. The process of any one of the preceding process embodiments, further providing that annealing is used to alter and/or tailor the ratio of crystalline to amorphous regions within a Prokitein of the preceding composition embodiments.
924. The process of any of the preceding process embodiments, wherein the rehydration process of Step (e.ii) is carried out water and/or an aqueous solution.
925. The process of any of the preceding process embodiments, wherein the aqueous solution used in the rehydration process of Step (e.ii) comprises at least one of water, alcohols (such as ethanol or isopropanol), polyols (such as glycerol, ethylene glycol, triethylene glycol or polyethylene glycol), acids, alkalis, salts and/or combinations thereof.
926. The process of any of the preceding process embodiments, wherein the aqueous solution used in the rehydration process of Step (e.ii) comprises water and polyols.
927. The process of any of the preceding process embodiments, wherein the aqueous solution used in the rehydration process of Step (e.ii) comprises water and glycerol.
928. The process of any of the preceding process embodiments, wherein a solvent is used in the void removal process of Step (e.iii), the solvent comprises aqueous solutions and/or organic solutions.
929. The process of any of the preceding process embodiments, wherein a solvent is used in the void removal process of Step (e.iii), the solvent comprises at least one of water, oxalic acid, malic acid, succinic acid, adipic acid, tartaric acid, citric acid, malonic acid, acetic acid, formic acid, ethanol, propanol, iso-propanol, butanol, iso-butanol, dimethyl sulfoxide, dimethylformamide, dimethylacetamide, and/or mixtures thereof.
930. The process of any of the preceding process embodiments, wherein a solvent is used in the void removal process of Step (e.iii), the solvent comprises polyol(s) and/or polymer(s) of polyols.
931. The process of any of the preceding process embodiments, wherein a solvent is used in the void removal process of Step (e.iii), the solvent comprises polyol(s).
932. The process of any of the preceding process embodiments, wherein a solvent is used in the void removal process of Step (e.iii), the solvent comprises polymer(s) of polyols.

933. The process of any of the preceding process embodiments, wherein a solvent is used in the void removal process of Step (e.iii), the solvent comprises water.
934. The process of any of the preceding process embodiments, wherein a solvent is used in the void removal process of Step (e.iii), the solvent comprises water and citric acid.
935. The process of any of the preceding process embodiments, wherein a solvent is used in the void removal process of Step (e.iii), the solvent comprises water and malic acid.
936. The process of any of the preceding process embodiments, wherein a solvent is used in the void removal process of Step (e.iii), the solvent comprises water, citric acid and malic acid.
937. The process of any of the preceding process embodiments, wherein a solvent is used in the void removal process of Step (e.iii), the solvent comprises water and ethanol.
938. The process of any of the preceding process embodiments, wherein a solvent is used in the void removal process of Step (e.iii), the solvent comprises water and propanol.
939. The process of any of the preceding process embodiments, wherein a solvent is used in the void removal process of Step (e.iii), the solvent comprises water and iso-propanol.
940. The process of any of the preceding process embodiments, wherein a solvent is used in the void removal process of Step (e.iii), the solvent comprises water and butanol.
941. The process of any of the preceding process embodiments, wherein a solvent is used in the void removal process of Step (e.iii), the solvent comprises water and iso-butanol.
942. The process of any of the preceding process embodiments, wherein a solvent is used in the void removal process of Step (e.iii), the solvent comprises supercritical $CO_2$.
943. The process of any of the preceding process embodiments, wherein a solvent is used in the void removal process of Step (e.iii), the concentration of any singular component in the solvent mixture is within the range of 0% (w/v) to 100% (w/v) relative to the total solvent mixture volume.
944. The process of any of the preceding process embodiments, wherein a solvent is used in the void removal process of Step (e.iii), the concentration of any singular component in the solvent mixture is within the range of 10% (w/v) to 75% (w/v) relative to the total solvent mixture volume.
945. The process of any of the preceding process embodiments, wherein a solvent is used in the void removal process of Step (e.iii), the concentration of any singular component in the solvent mixture is within the range of 20% (w/v) to 60% (w/v) relative to the total solvent mixture volume.
946. The process of any of the preceding process embodiments, wherein a solvent is used in the void removal process of Step (e.iii), the concentration of any singular component in the solvent mixture is within the range of 30% (w/v) to 50% (w/v) relative to the total solvent mixture volume.
947. The process of any of the preceding process embodiments, wherein a solvent is used in the void removal process of Step (e.iii), the concentration of any singular component in the solvent mixture is 40% (w/v) relative to the total solvent mixture volume.
948. The process of any of the preceding process embodiments, wherein the solvent used to lower, at least one of, the Young's modulus, ultimate tensile strength and/or ultimate tensile strain of the hollow fibres in Step (e.iv), is an aqueous solution comprising one or more acids, alkalis, buffer solutions and/or mixtures thereof.
949. The process of any of the preceding process embodiments, where in the solvent used to lower, at least one of, the Young's modulus, ultimate tensile strength and/or ultimate tensile strain of the hollow fibres in Step (e.iv), comprise at least one of water, ascorbic acid, acetic acid, adipic acid, citric acid, formic acid, hydrochloric acid, lactic acid, malic acid, malonic acid, oxalic acid, succinic acid, sulphuric acid, tartaric acid, sodium hydroxide, potassium hydroxide, calcium hydroxide, magnesium hydroxide or sodium carbonate.
950. The process of any of the preceding process embodiments, wherein the acids used in Step (e.iv) include at least one of ascorbic acid, acetic acid, adipic acid, citric acid, formic acid, hydrochloric acid, lactic acid, malic acid, malonic acid, oxalic acid, succinic acid, sulphuric acid tartaric acid, and/or mixtures thereof.
951. The process of any of the preceding process embodiments, wherein the alkalis used in Step (e.iv) include at least one of sodium hydroxide, potassium hydroxide, calcium hydroxide, magnesium hydroxide or sodium carbonate.
952. The process of any of the preceding process embodiments, wherein the duration of the buffer wash used in Step (e.iv) is within the range of 10 minutes to 3 hours.
953. The process of any of the preceding process embodiments, wherein the duration of the buffer wash used in Step (e.iv) is within the range of 15 minutes to 2 hours.
954. The process of any of the preceding process embodiments, wherein the duration of the buffer wash used in Step (e.iv) is within the range of 30 minutes to 1 hour.
955. The process of any of the preceding process embodiments, wherein the temperature of the buffer wash used in Step (e.iv) is within the range of 10° C. to 80° C.
956. The process of any of the preceding process embodiments, wherein the temperature of the buffer wash used in Step (e.iv) is within the range of 20° C. and 60° C.
957. The process of any of the preceding process embodiments, wherein the temperature of the buffer wash used in Step (e.iv) is within the range of 30° C. and 50° C.
958. The process of any of the preceding process embodiments, wherein the coating in Step (e(v)) comprises at least one of, collagen, gelatine, fibrinogen, fibronectin or laminin.
959. The process of any of the preceding process embodiments, wherein the coating in Step (e(v)) comprises at least one short peptide sequence embodying a cell attachment peptide sequence selected from, AELDVP (SEQ ID NO: 1), CGGNGEPRGDTYRAY (SEQ ID NO: 2), CFALRGDNP (SEQ ID NO: 3), CKKQRFRHRNRKG (SEQ ID NO: 4), CNYYSNS (SEQ ID NO: 5), CSVTCG (SEQ ID NO: 6), DGEA (SEQ ID NO: 7), ELVTDFPTDLPAT (SEQ ID NO: 8), FHRRIKA (SEQ ID NO: 9), FQGVLQNVRFVF (SEQ ID NO: 10), GACRGDCLGA (cyclic) (SEQ ID NO: 11), GFOGER (SEQ ID NO: 12), GFRGDGQ (SEQ ID NO: 13), GRGDS (SEQ ID NO: 14), GRGDAC (SEQ ID NO: 15), GTFALRGDNGQ (SEQ ID NO: 16), IDAPS (SEQ ID NO: 17), IKLLI (SEQ ID NO: 18), IKVAV (SEQ ID NO: 19), IWKHKGRD-VILKKDVRFYC (SEQ ID NO: 20), KAFDI-TYVRLKF (SEQ ID NO: 21), KLDAPT (FN5) (SEQ ID NO: 22), KQAGDV (SEQ ID NO: 23), KRSR (SEQ ID NO: 24), LIGRKK (SEQ ID NO: 25), LGTIPG (SEQ ID NO: 26), LRE, LRGDN (SEQ ID NO: 27), MNYYSNS (SEQ ID NO: 28), NPWHSIYITRFG (SEQ ID NO: 29), PDGSR (SEQ ID NO: 30), PHRSN (SEQ ID NO: 31), PKRGDL (SEQ ID NO: 32), PRARI (SEQ ID NO: 33), REDV (SEQ ID NO: 34), RGD, SIGFRGDGQTC (SEQ ID NO: 35), SIKVAV (SEQ ID NO: 36), SINNNR (SEQ ID NO: 37), SPPRRARV (SEQ ID NO: 38), SVVYGLR (SEQ ID NO: 39), TWYKIAFQRNRK (SEQ ID NO: 40), VALDEP (SEQ ID NO: 41), VGVAPG (SEQ ID NO: 42), VPGIG (SEQ ID NO: 43), WQPPRARI (SEQ ID NO: 44), YIGSR (SEQ ID NO: 45).

960. The process of any of the preceding process embodiments, wherein the surface is modified in Step (e(vi)) by a process of plasma treatment, physical vapour deposition, ultrasonification or mechanical etching.
961. The process of any of the preceding process embodiments, wherein the treated covalently-crosslinked, semi-permeable, porous hollow fibres are partially dried in Step (f).
962. The process of any of the preceding process embodiments, wherein the treated covalently-crosslinked, semi-permeable, porous hollow fibres are completely dried in Step (f).
963. The process of any of the preceding process embodiments, wherein the drying process of Step (f) process is performed with convection, an infra-red heat source, and/or on a heated surface.
964. The process of any of the preceding process embodiments, wherein the drying process of Step (f) process is performed at temperatures that range from 5 to 90° C.
965. The process of any of the preceding process embodiments, wherein the drying process of Step (f) process is performed at temperatures that range from 15° C. to 80° C.
966. The process of any of the preceding process embodiments, wherein the drying process of Step (f) process is performed at temperatures that range from 40° C. to 70° C.
967. The process of any of the preceding process embodiments, wherein the drying process of Step (f) process is performed at temperatures that range from 50° C. to 70° C.
968. The process of any of the preceding process embodiments, wherein the dried covalently-crosslinked, semi-permeable, porous hollow fibres are stored under a vacuum.
969. The process of any of the preceding process embodiments, wherein the dried covalently-crosslinked, semi-permeable, porous hollow fibres are stored in air.
970. The process of any of the preceding process embodiments, wherein the dried covalently-crosslinked, semi-permeable, porous hollow fibres are stored in PBS buffer solution.
971. The process of any of the preceding process embodiments, wherein the dried covalently-crosslinked, semi-permeable, porous hollow fibres are stored in water.
972. The process of any of the preceding process embodiments, wherein the dried covalently-crosslinked, semi-permeable, porous hollow fibres are stored in an aqueous solution that comprises water, alcohols (such as ethanol or isopropanol), polyalcohols (such as glycerol, ethylene glycol, triethylene glycol or polyethylene glycol), acids, alkalis, salts and/or combinations thereof.
973. The process of any of the preceding process embodiments, wherein the dried covalently-crosslinked, semi-permeable, porous hollow fibres are stored in an aqueous solution that comprises water and glycerol.
974. The process of any of the preceding process embodiments, wherein the dried covalently-crosslinked, semi-permeable, porous hollow fibres are stored in an aqueous solution that comprises water and ethanol.
975. The process of any of the preceding process embodiments, wherein the dried covalently-crosslinked, semi-permeable, porous hollow fibres are soaked in water, partially dried, and then stored in air.
976. The process of any of the preceding process embodiments, wherein the dried covalently-crosslinked, semi-permeable, porous hollow fibres are soaked in an aqueous solution that comprises water and glycerol, partially dried, and then stored in air.
977. The process of any of the preceding process embodiments, wherein the dried covalently-crosslinked, semi-permeable, porous hollow fibres are soaked in an aqueous solution that comprises water and ethanol, partially dried, and then stored in air.
978. The process of any of the preceding process embodiments, wherein the dried covalently-crosslinked, semi-permeable, porous hollow fibres are soaked in an aqueous solution that comprises water and iso-propanol, partially dried, and then stored in air.
979. The process of any of the preceding process embodiments, wherein the process steps are carried out (one after the other) in the (a)-(f) order specified.
980. A hollow fibre obtained or obtainable by a process of any one any of the preceding process embodiments.

2.5 Process Embodiments—Food Product

1. A process for treating or improving the palatability of a composition of any of the preceding composition embodiments, the process comprising the steps:
   (A) providing a composition comprising fibres of this disclosure within a cartridge; and one or more of:
   (B1) physio-chemically treating the hollow fibres in the composition to decrease their mechanical strength; and/or
   (B2) flushing the lumen of the hollow fibres and/or the residual void spaces of the hollow fibres in the extra-capillary space of the cartridge; and
   (C) removal of the composition comprising the hollow fibres of this disclosure from the cartridge; and one or more of
   (D1) mechanically treating the composition comprising hollow fibres of this disclosure; and/or
   (D2) physically reducing the lengths of the hollow fibres in the composition.
2. The process of any of the preceding process embodiments, wherein in Step (B1), the hollow fibres in the composition are treated with an acid.
3. The process of any of the preceding process embodiments, wherein in Step (B1), the hollow fibres in the composition are treated with an alkali.
4. The process of any of the preceding process embodiments, wherein in Step (B1), the hollow fibres in the composition are treated with a buffer solution.
5. The process of any of the preceding process embodiments, wherein in Step (B1), the buffer solution has a pH of 10 to 13.

6. The process of any of the preceding process embodiments, wherein in Step (B1), the hollow fibres in the composition are treated when cells are present.
7. The process of any of the preceding process embodiments, wherein in Step (B1), the hollow fibres in the composition are treated when cells are not present.
8. The process of any of the preceding process embodiments, wherein in Step (B1), the hollow fibres in the composition are treated with an enzyme.
9. The process of any of the preceding process embodiments, wherein in Step (B1), the hollow fibres in the composition are treated when cells are present.
10. The process of any of the preceding process embodiments, wherein in Step (B1), the hollow fibres in the composition are treated when cells are not present.
11. The process of any of the preceding process embodiments, wherein Step (B2), the lumen of the hollow fibres in the composition, and the extra-capillary space of any cartridges comprising such compositions, are flushed with liquids or fluids that include water, acids, alkalis, aqueous buffers, water-oil emulsions, animal fats, plant oils, aqueous salt solutions, solution(s) containing flavourings, emulsifiers, stabilisers, colouring agents, thickeners and/or gelling agents, or any combination thereof, and in any order.
12. The process of any of the preceding process embodiments, wherein Step (B2), the lumen of the hollow fibres in the composition, and the extra-capillary space of any cartridges comprising such compositions, are flushed with fats and oils that include vegetable oil, rape seed oil, sunflower oil, flax seed oil, sunflower oils, avocado oil, corn oil, lard, coconut oil, palm oil, sesame oil, soybean, canola oil, olive oil, peanut oil, nut oil, Omega-3 oils, oils from fish, animal milk, animal butter, processed animal fat, cellular agriculture derived adipose tissue, or any combination thereof, and in any order.
13. The process of any of the preceding process embodiments, wherein Step (B2), colouring agents, which are in the solution(s) used to flush the lumen of the hollow fibres in the composition, and the extra-capillary space of the cartridges, include Curcumin, Riboflavin, Riboflavin-5'-phosphate, Tartrazine, Quinoline yellow, Sunset Yellow FCF; Orange Yellow S, Cochineal; Carminic acid; Carmines, Azorubine; Carmoisine, Amaranth, Ponceau 4R; Cochineal Red A, Erythrosine, Allura Red AC, Patent Blue V, Indigotine; Indigo Carmine, Brilliant Blue FCF, Chlorophylls and chlorophyllins, Copper complexes of chlorophyll and chlorophyllins, Green S, Plain caramel, Caustic sulphite caramel, ammonia caramel, sulphite ammonia caramel, brilliant Black BN; Black PN, or any combination thereof, and in any order.
14. The process of any of the preceding process embodiments, wherein Step (B2), preservatives, which are in the solution(s) used to flush the lumen of the hollow fibres in the composition, and the extra-capillary space of the cartridges, include potassium sorbate, benzoic acid, sodium benzoate, potassium benzoate, calcium benzoate, ethyl P-hydroxybenzoate, sodium ethyl P-hydroxybenzoate, methyl P-hydroxybenzoate, sodium methyl P-hydroxybenzoate, sulphur dioxide, sodium sulphite, sodium hydrogen sulphite, sodium metabisulphite, potassium metabisulphite, calcium sulphite, calcium hydrogen sulphite, potassium hydrogen sulphite, nisin, natamycin, hexamethylene tetramine, dimethyl decarbonate, ethyl lauroyl arginate, potassium nitrite, sodium nitrite, sodium nitrate, potassium nitrate, propionic acid, sodium propionate, calcium propionate, potassium propionate, boric acid, sodium tetraborate, borax, lysozyme, or any combination thereof, and in any order.
15. The process of any of the preceding process embodiments, wherein Step (B2), anti-oxidants, which are in the solution(s) used to flush the lumen of the hollow fibres in the composition, and the extra-capillary space of the cartridges, include Ascorbic acid, Sodium ascorbate, Calcium ascorbate, Fatty acid esters of ascorbic acid, Tocopherols, Alpha-tocopherol, Gamma-tocopherol, Delta-tocopherol, Propyl gallate, Erythorbic acid, Sodium erythorbate, Tertiary-butyl hydroquinone (TBHQ), Butylated hydroxyanisole (BHA), Butylated hydroxytoluene (BHT), Extracts of rosemary, 4-Hexylresorcinol, or any combination thereof, and in any order.
16. The process of any of the preceding process embodiments, wherein Step (B2), flavourings, which are in the solution(s) used to flush the lumen of the hollow fibres in the composition, and the extra-capillary space of the cartridges, include those in the European Union list of flavourings as seen in Annex I of Regulation EU 1334/2008 and non-food sourced flavourings added in amendments in accordance with Regulation EU 2018/1259.
17. The process of any of the preceding process embodiments, wherein Step (B2), other additives, which are in the solution(s) used to flush the lumen of the hollow fibres in the composition, and the extra-capillary space of the cartridges, include potassium chloride, calcium chloride, magnesium chloride, monosodium glutamate, monosodium glutamate, monosodium glutamate, sodium citrate, potassium citrate, calcium citrate, sodium phosphate, potassium phosphate, calcium phosphate, magnesium phosphate, sodium carbonate, potassium carbonate, sodium sulphate, potassium sulphate, calcium sulphate, L-leucine, L-cysteine, or any combination thereof, and in any order.
18. The process of any of the preceding process embodiments, wherein Step (B2), emulsifiers, stabilisers, thickeners and gelling agents, which are in the solution(s) used to flush the lumen of the hollow fibres in the composition, and the extra-capillary space of the cartridges, include alginic acid, sodium alginate, potassium alginate, ammonium alginate, calcium alginate, propane-1,2-diol alginate, agar, carrageenan, processed eucheuma seaweed, locust bean gum; carob gum, guar gum, tragacanth, acacia gum; gum arabic, xanthan gum, karaya gum, tara gum, gellan gum, konjac, soybean hemicellulose, cassia gum, polyoxyethylene sorbitan monolaurate; polysorbate 20, polyoxyethylene sorbitan mono-oleate; polysorbate 80, polyoxyethylene sorbitan monopalmitate; polysorbate 40, polyoxyethylene sorbitan monostearate; polysorbate 60, polyoxyethylene sorbitan tristearate; polysorbate 65, pectins, ammonium phosphatides, sucrose acetate isobutyrate, glycerol esters of wood rosins, cellulose, methyl cellulose, ethyl cellulose, hydroxypropyl cellulose, hydroxypropyl methyl cellulose, ethyl methyl cellulose, carboxy methyl cellulose, crosslinked sodium carboxy methyl cellulose, enzymatically hydrolysed carboxy methyl cellulose, sodium stearoyl-2-lactylate, calcium stearoyl-2-lactylate, stearyl tartrate, sorbitan monostearate, sorbitan tristearate, sorbitan monolaurate, sorbitan monooleate, sorbitan monopalmitate, invertase, or any combination thereof, and in any order.

19. The process of any of the preceding process embodiments, wherein Step (D1), the composition comprising the hollow fibres are pounded.
20. The process of any of the preceding process embodiments, wherein Step (D1), the composition comprising the hollow fibres are minced.
21. The process of any of the preceding process embodiments, wherein Step (D1), the composition comprising the hollow fibres are macerated.
22. The process of any of the preceding process embodiments, wherein Step (D1), the composition comprising the hollow fibres are ground.
23. The process of any of the preceding process embodiments, wherein Step (D1), the composition comprising the hollow fibres are treated with other mechanical-based food preparation methods.
24. The process of any of the preceding process embodiments, wherein Step (D1), the composition comprising the hollow fibres are mechanically treated with cells present.
25. The process of any of the preceding process embodiments, wherein Step (D1), the composition comprising the hollow fibres are mechanically treated without cells present.
26. The process of any of the preceding process embodiments, wherein Step (D2), the composition comprising the hollow fibres are cut to decrease the length of the hollow fibres.
27. The disclosure also extends to compositions obtained or obtainable by such processes.

3 BRIEF DESCRIPTION OF THE FIGURES

FIG. 1 is a flow chart outlining one preferred method by which edible extruded or spun, semi-permeable, porous hollow fibres, comprising covalent ester, thioester and/or amide crosslinked polypeptides, may be produced with the optional steps of the addition of a plasticiser or void fraction elements denoted with dashed lines. In which, 1001 is Step (a), 1002 is the optional addition of plasticisers in Step (a) or Step (b), 1003 is Step (b), 1004 is the optional addition of void fraction elements in Steps (a) or (b), 1005 is Steps (c) and (d), and 1006 is Step (e).

FIG. 2 is a schematic diagram of one preferred embodiment of the wet spinning, extrusion and subsequent cross-linking and post-production modification process used in the production of the edible extruded or spun, semi-permeable, porous hollow fibres, comprising covalent ester, thioester and/or amide crosslinked polypeptides, of this disclosure. 2001 is the coagulation bath solution, 2002 is the die or spinneret, 2003 are pullies to guide the hollow fibres through the coagulation bath solution, 2004 is the coagulation bath, 2005 is the organic solvent bath, 2006 is the organic solvent, and 2007 is the winding spool.

FIG. 3 is a schematic diagram of the axial and radial profile of a half and quarter cross section of an edible extruded or spun, semi-permeable, porous hollow fibre, comprising covalent ester, thioester and/or amide cross-linked polypeptides, of this disclosure. 3001 is a pore, 3002 is the direction of fluid flow through the lumen of the hollow fibre, 3003 is the length of the long axis of the hollow fibre, 3004 is the outer wall of the hollow fibre, 3005 is the inner wall of the hollow fibre, and 3006 is the lumen the hollow fibre. FIG. 3 illustrates potential paths through the wall of a hollow fibre from the lumen to the extra-capillary space. Although FIG. 3 shows what looks like tunnels from the lumen to the extra-capillary space, the purpose of FIG. 3 is to illustrate the potential paths through the wall, and the actual pore structure may be more like a sponge containing interconnected cavities.

FIG. 4 is a schematic diagram of an exemplarily embodiment of a bundle of edible extruded or spun, semi-permeable, porous hollow fibres, comprising covalent ester, thioester and/or amide crosslinked polypeptides, of the disclosure aligned along the long axis of the hollow fibres. 4001 is a single hollow fibre, and 4002 is a of a bundle of hollow fibres.

FIG. 5 is a schematic diagram of an exemplarily embodiment of a quarter cut section of a cartridge of extruded or spun, semi-permeable, porous hollow fibres, comprising covalent ester, thioester and/or amide crosslinked polypeptides, of the disclosure. The schematic diagram shows the inlet (5001), media dissipater cut (5002), cartridge cap (5003), potting block (5004), hollow fibres aligned along their long axis (5005), and the outer shell of the cartridge (5006).

FIG. 6 is a schematic diagram of an exemplarily embodiment of a hollow fibre bioreactor inlet and outlet port configuration. The bioreactor ports are labelled 6001, 6002, 6004, and 6005. The bioreactor shell is labelled as 6003. During bioreactor operation different flow profiles are generated by altering which ports are inlets and outlets.

Figure 11:
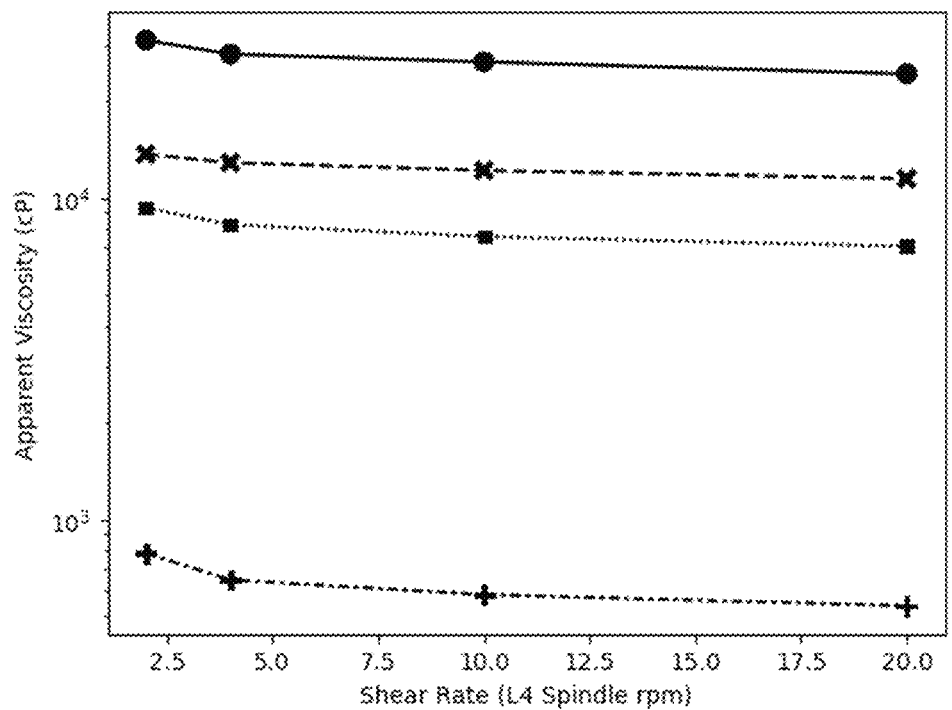

FIG. 11 shows the apparent viscosity of dope solutions comprising 15-23% SPI (w/v second composition) and 30% canola oil (w/v second composition), prepared as per Example 3.11. The symbols, circle, cross, square, and plus, each denote dope solutions with an SPI concentration of 23, 22, 21, and 15% (w/v of the second composition), respectively.

Figure 12:
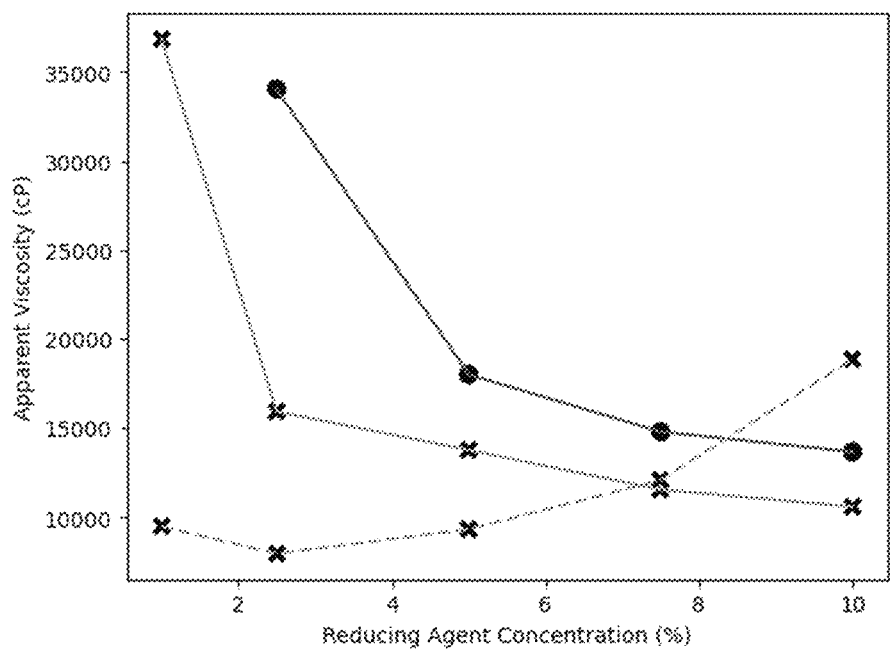

FIG. 12 shows the apparent viscosity, measured at 2 rpm with an LV-4 spindle, of dope solutions comprising 21% SPI (w/v second composition) and 30% canola oil (w/v second composition) with various reducing agents, including sodium sulphite at pH 9.3 (circle, solid line), NAC at pH 8.5 (cross, dashed lined), and NAC at pH 9.32 (circle, dashed line); prepared as per Examples 3.7, 3.8, and 3.10, respectively.

Figure 13:
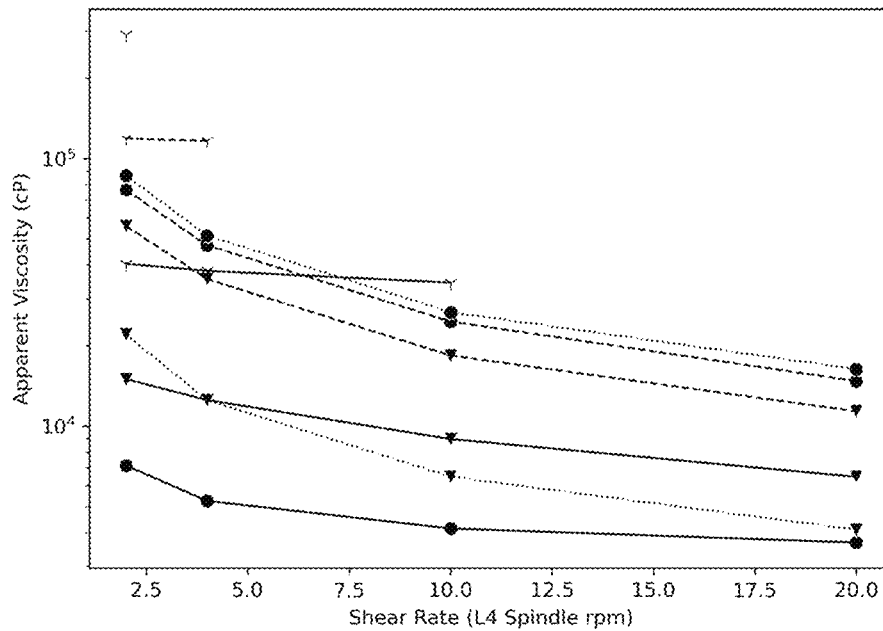

FIG. 13 shows the apparent viscosities of dope solutions comprising a single protein as produced in Examples 3.12-20% SPI (circle, solid line); 4.2.2-20% PP (circle, dashed line); 4.5.2-20% SFSP (circle, dotted line); 4.9.2-20% FBP (triangle, solid line); 4.1.2-20% CPP (triangle, dashed line); 4.1.3-16% CPP (triangle, dotted line); and 4.6.2-14% MBP (Y-shape, solid line), 15% MBP (Y-shape, dashed line), and 16% MBP (w/v second composition) (Y-shape, dotted line).

Figure 14:
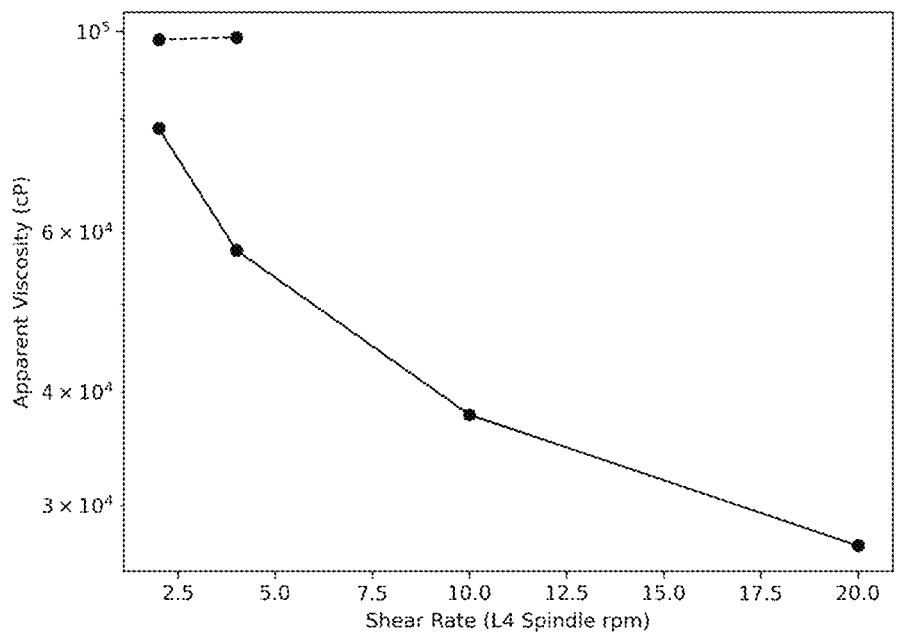

FIG. 14 shows the apparent viscosities of dope solutions comprising multiple proteins as produced in Examples 5.6.2-9% SFSP and 9% MBP (circle, solid line); and 5.4.2-8% SPI and 8% MBP (w/v second composition) (circle, dashed line).

Figure 15:
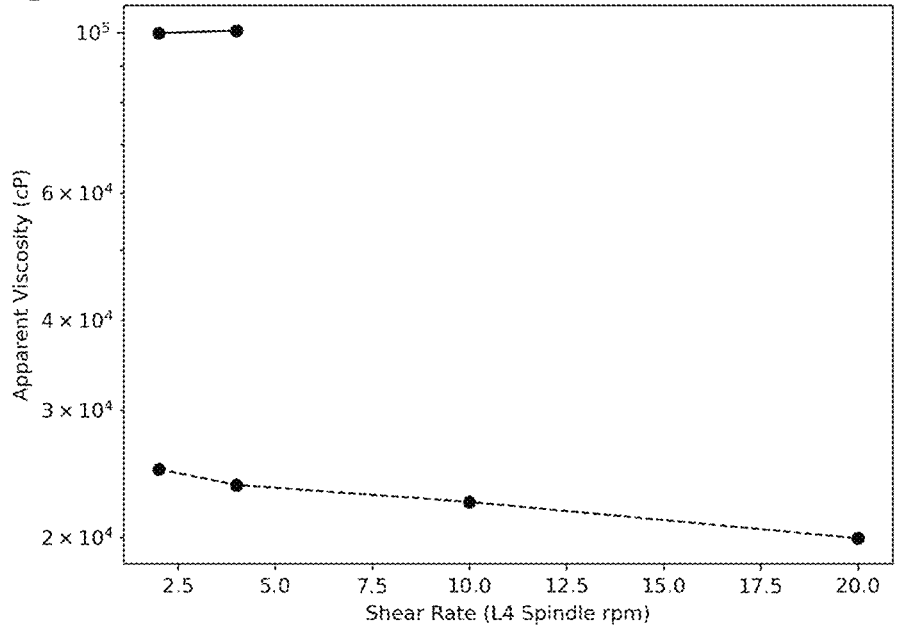

FIG. 15 shows the apparent viscosities of dope solutions comprising a protein and a polysaccharide as produced in Example 3.18.8-20% SPI and 2% SA (circle, solid line), and 20% SPI and 1% SA (w/v second composition) (circle, dashed line).

Figure 16:
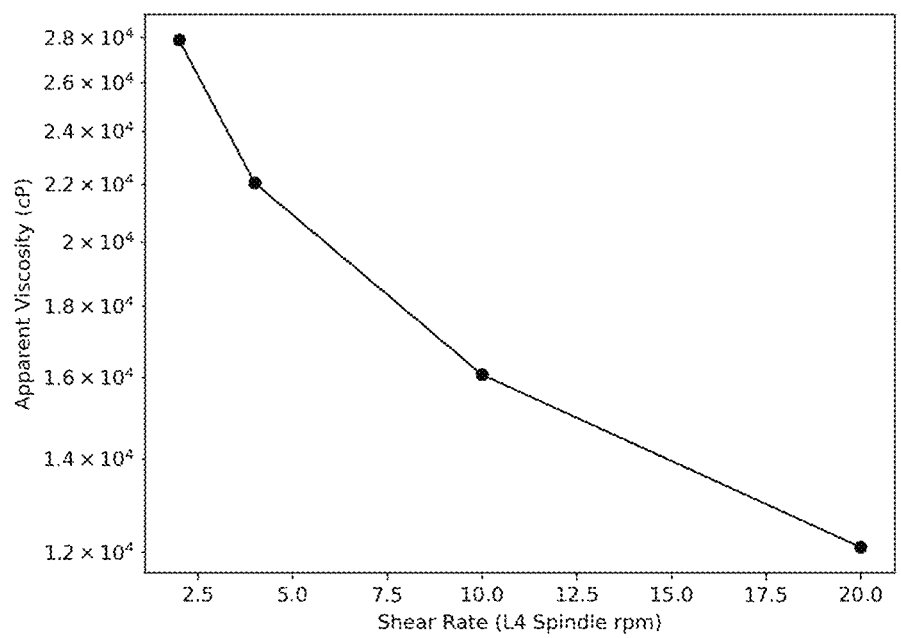

FIG. 16 shows the apparent viscosity of a dope solution comprising multiple proteins and a polysaccharide as produced in Example 5.5.3-8% SPI, 8% FBP and 2% SA (w/v second composition) (circle, solid line).

Figure 17:
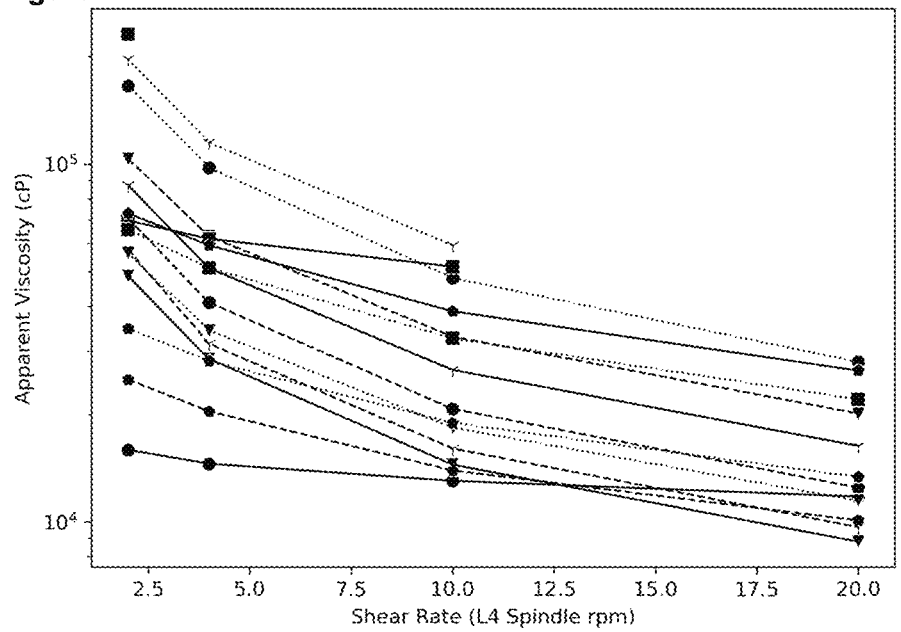

FIG. 17 shows the apparent viscosities of dope solutions comprising a protein and 30% oil (w/v second composition), as produced in Examples 3.10-21% SPI (circle, solid line); 4.1-21% CPP (circle, dashed line), 24% CPP (circle, dotted line), and 19% CPP (triangle, solid line); 4.2-21% PP (triangle, dashed line), and 19% PP (triangle, dotted line); 4.5-21% SFSP (Y-shape, solid line), 24% SFSP (Y-shape, dashed line), and 19% SFSP (Y-shape, dotted line); 4.6-15% MBP (square, solid line), and 16% MBP (square, dashed line); and 4.9-21% FBP (square, dotted line), 24% FBP (pentagon, solid line), 19% FBP (pentagon, dashed line), and 20% FBP (w/v second composition) (pentagon, dotted line).

Figure 18:
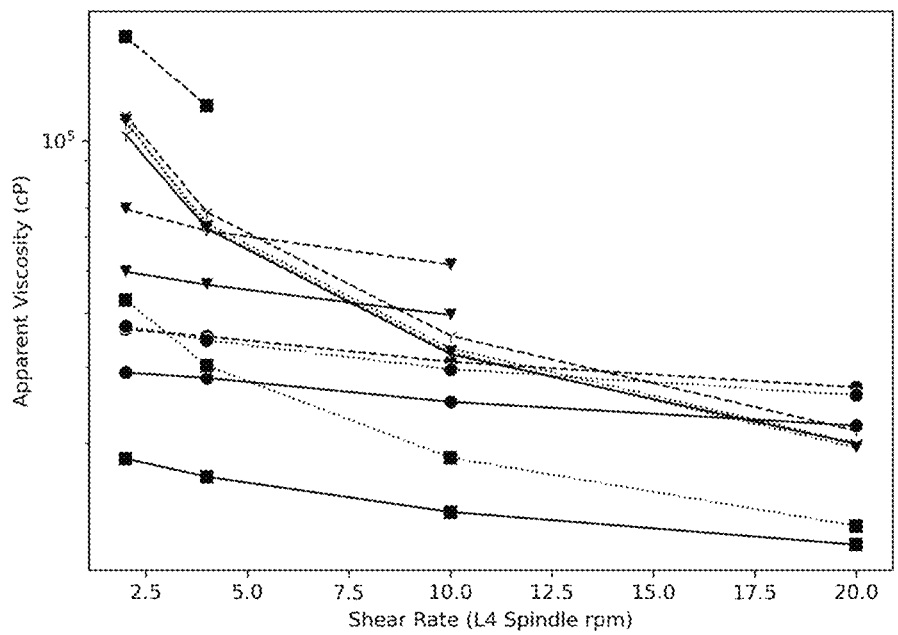

FIG. 18 shows the apparent viscosities of dope solutions comprising multiple proteins and 30% oil (w/v second composition), as produced in Examples 5.4.1-17.5% SPI and 2.5% MBP (circle, solid line), 14% SPI and 5% MBP (circle, dashed line), 10.5% SPI and 7.5% MBP (circle, dotted line), 7% SPI and 10% MBP (triangle, solid line), 3.5% SPI and 12.5% MBP (triangle, dashed line); 5.2.1-10.5% PP and 10.5% SFSP (triangle, dotted line), 18% PP and 3% SFSP (Y-shape, solid line), 15% PP and 6% SFSP (Y-shape, dashed line), and 12% PP and 19% SFSP (Y-shape, dotted line); 5.5.1-10.5% SPI and 10.5% FBP (square, solid line); and 5.6.1-9% SFSP and 9% MBP (square, dashed line), and 8% SFSP and 8% MBP (square, dotted line).

Figure 19:
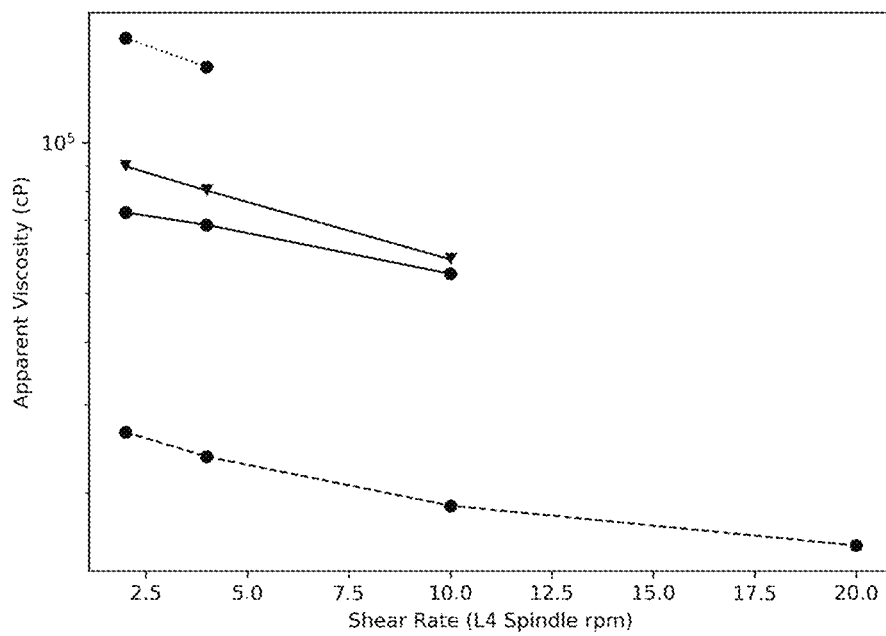

FIG. 19 shows the apparent viscosities of a dope solutions comprising protein, polysaccharide and 30% oil (w/v second composition), as produced in Examples 3.18.11-20% SPI, 1% SA (circle, solid line), and 18% SPI, 1% SA (circle, dashed line); and 3.18.12-18% SPI, 2% SA (circle, dashed line), and 16% SPI, 2% SA (triangle, solid line).

Figure 20:
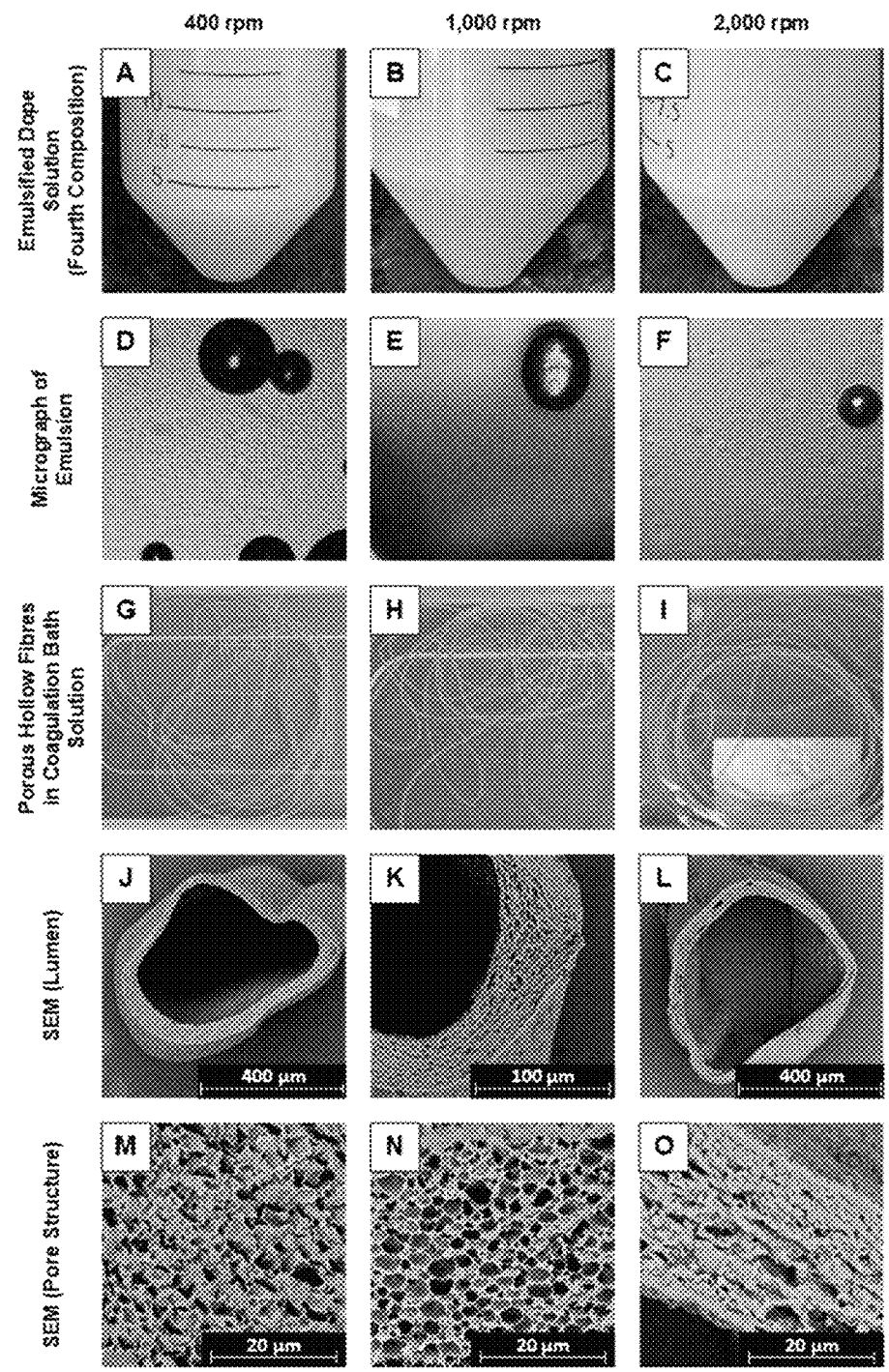

FIG. 20 (A-O) shows hollow fibres produced as described in Example 9.5. The first (A, D, G, J and M), second (B, E, H, K and N), and third (C, F, I, L and O) columns show samples in which the fourth composition was finally mixed at 400, 1,000 and 2,000 rpm, respectively. The first row (A-C) show the fourth composition. The second row (D-F) show micrographs of the emulsions wherein the small spheroids are oil droplets and the large spheroids are air bubbles trapped during sample preparation. The third row (G-I) show the porous hollow fibres in coagulation bath solution. The fourth (J-L) and fifth (M-O) rows show scanning electron micrographs (SEM) of the lumen and pore structure of the hollow fibres, respectively.

Figure 21:
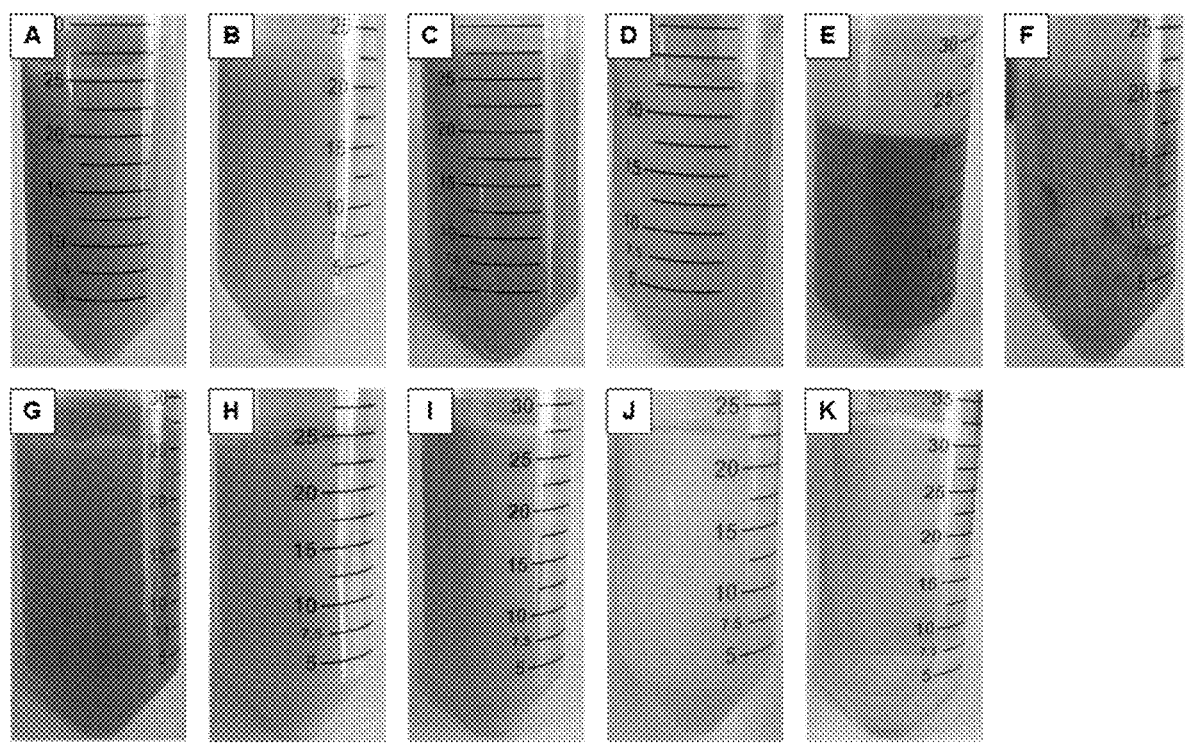

FIG. 21 (A-K) shows samples of emulsified dope solutions prepared with different protein sources, with varying protein and canola oil concentrations, prepared as described in Examples 4.1-4.7. 19% chickpea protein with 30% (A) and 150% (B) oil; 19% pea protein with 30% (C) and 150% oil (D); 24% pumpkin seed protein with 30% oil (E); 19% rice protein with 30% oil (F). 19% sunflower seed protein with 30% (G) and 150% oil (H). 15% mung bean protein with 30% (I) and 150% oil (J); and 30% whey protein with 30% oil (K).

Figure 22:
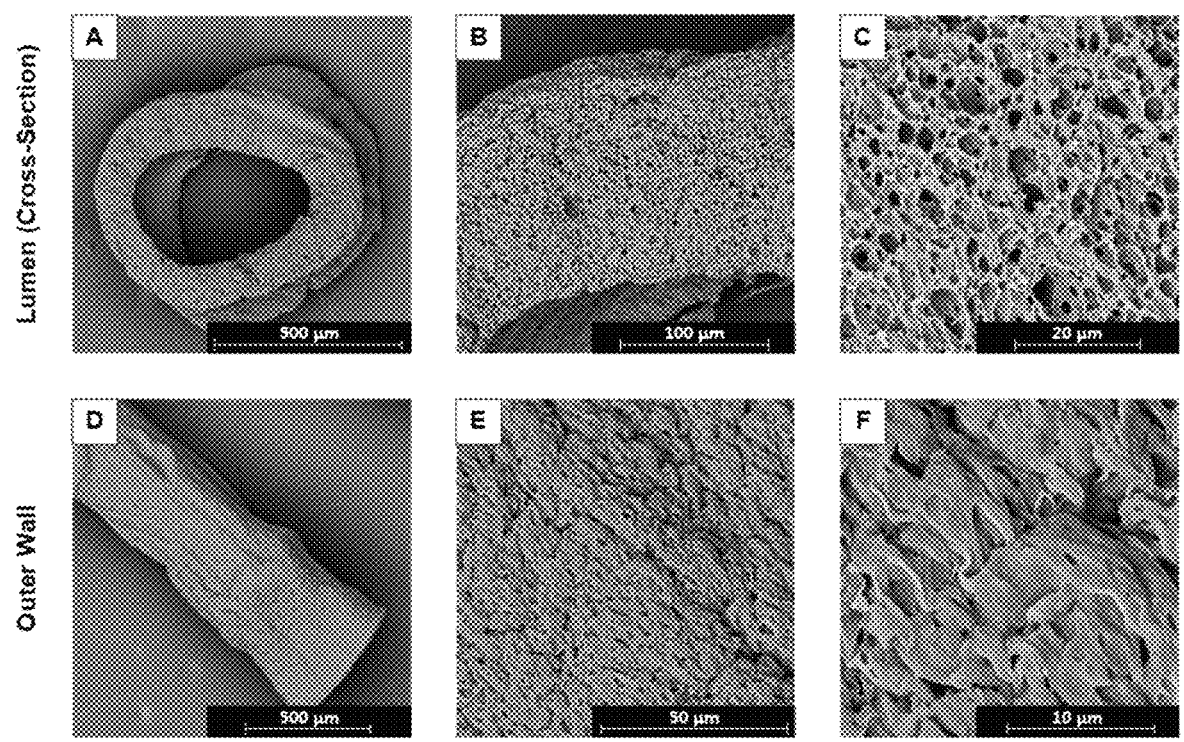

FIG. 22 (A-F) shows SEM micrographs of the porous structure of the hollow fibres produced as per Example 9.9.1.

Figure 23:
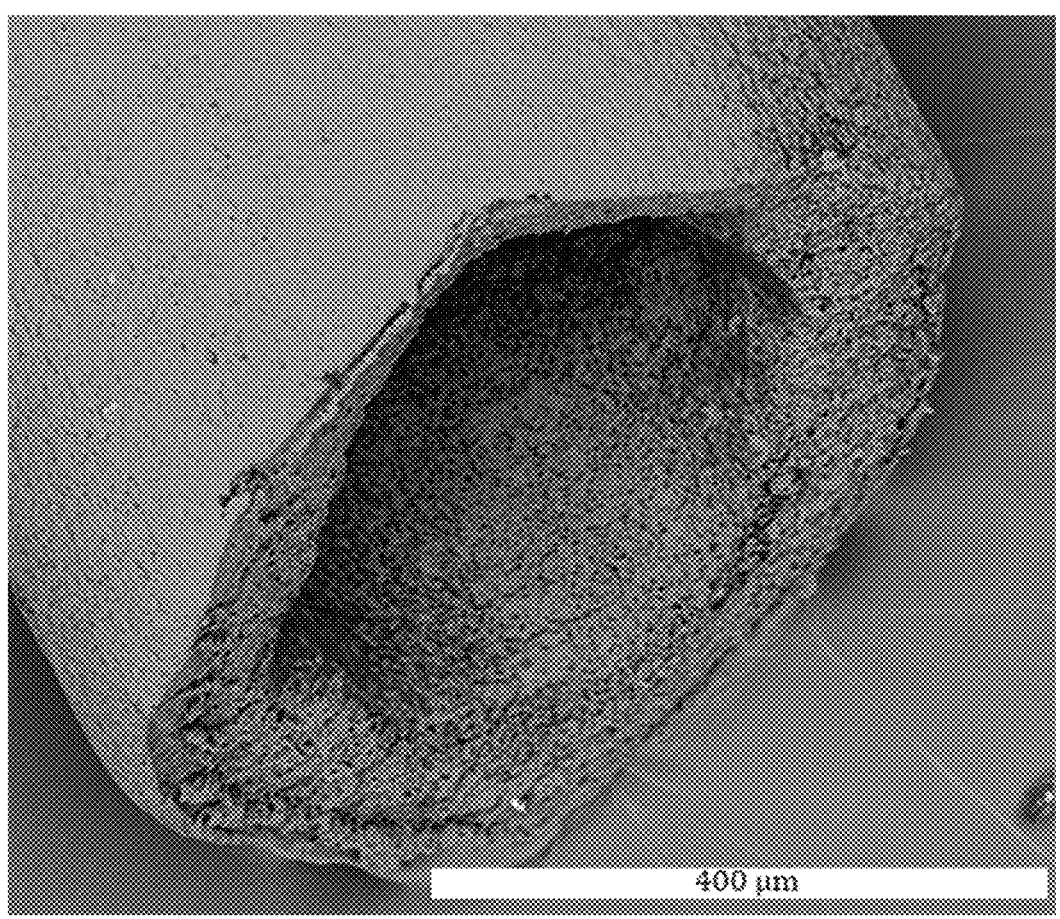

FIG. 23 shows a SEM micrograph of a porous hollow fibre produced as per Example 9.9.2.

Figure 24:
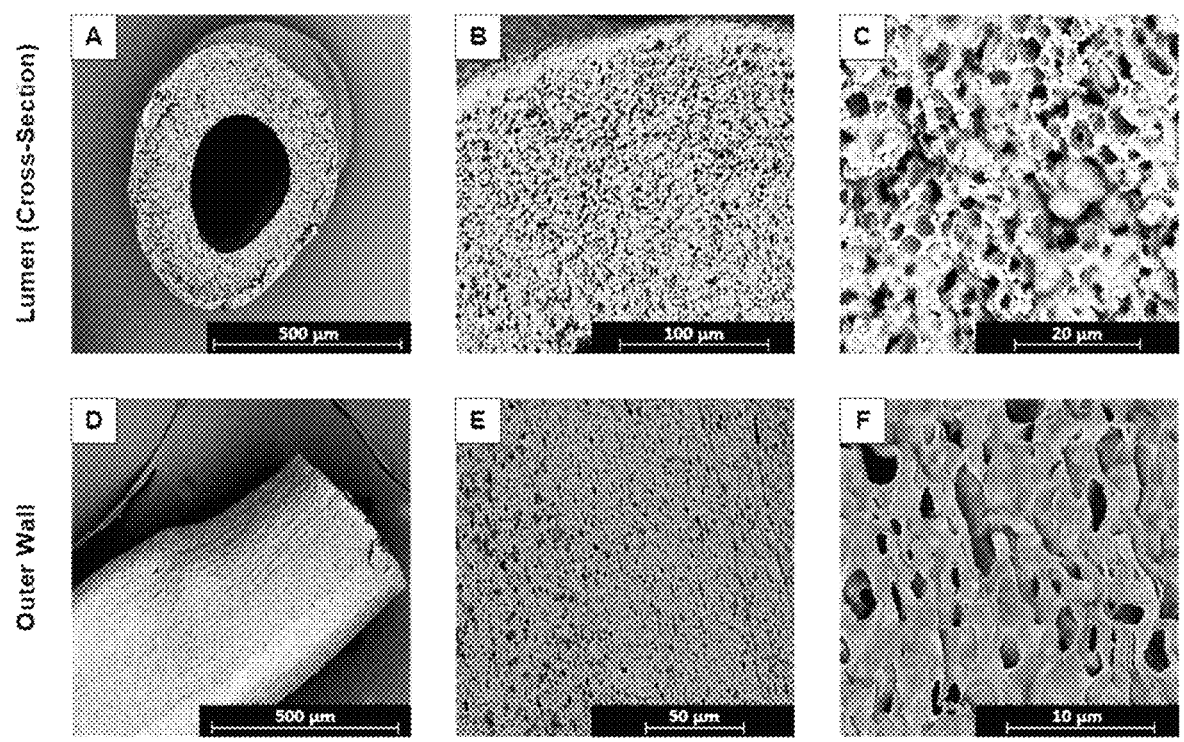

FIG. 24 (A-F) shows SEM micrographs of the porous structure of the hollow fibres produced as per Example 9.9.2.

Figure 25:
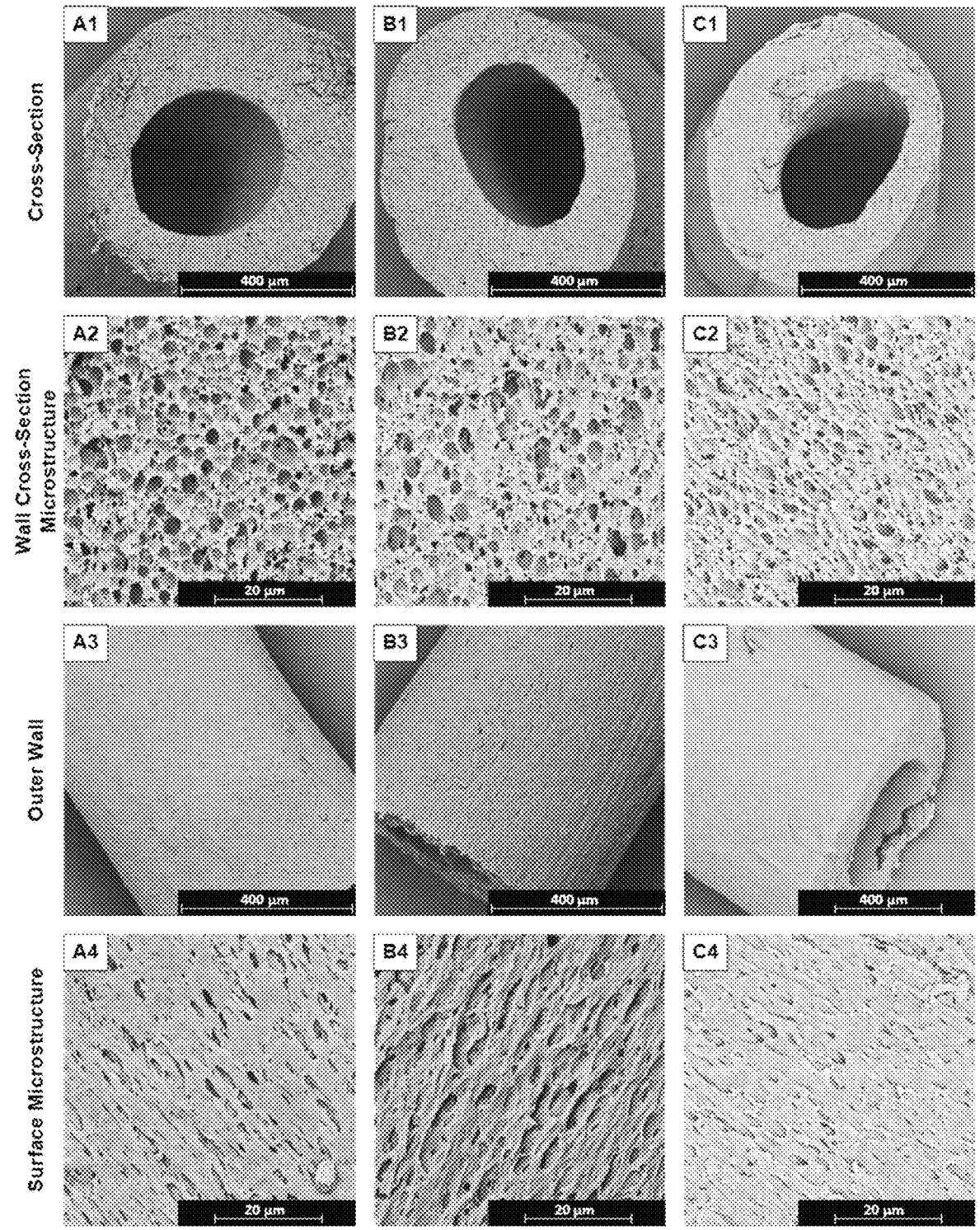

FIG. 25 shows SEM micrographs of the hollow fibres produced as per Example 10.5.20.1 (A1-A4); Example 10.5.21.1 (B1-B4); and Example 10.5.22.1 (C1-C4).

Figure 26:
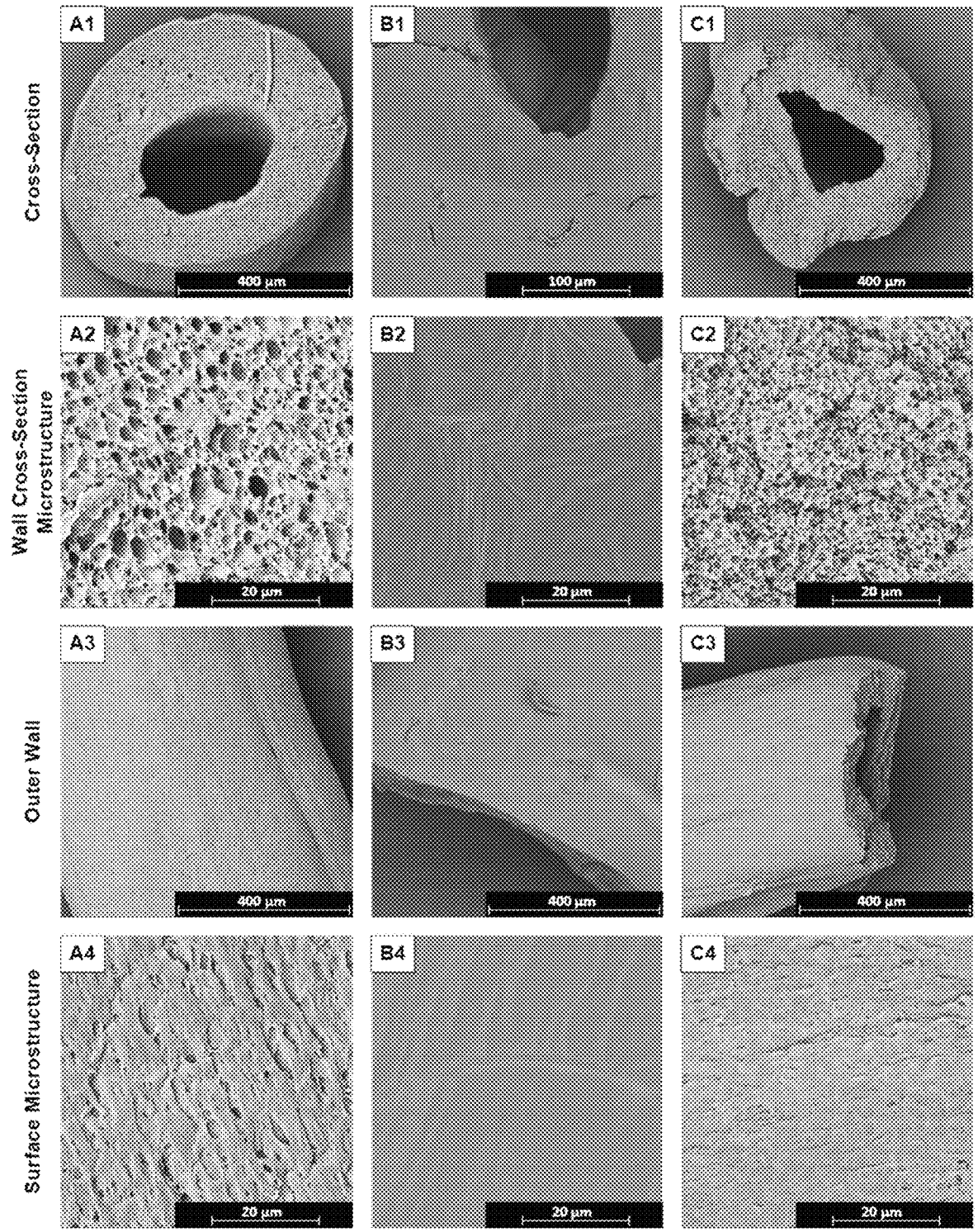

FIG. 26 shows SEM micrographs of the hollow fibres produced as per Example 10.5.23.1 (A1-A4); Example 10.5.23.2 (B1-B4); and Example 10.5.15 (C1-C4).

Figure 27:
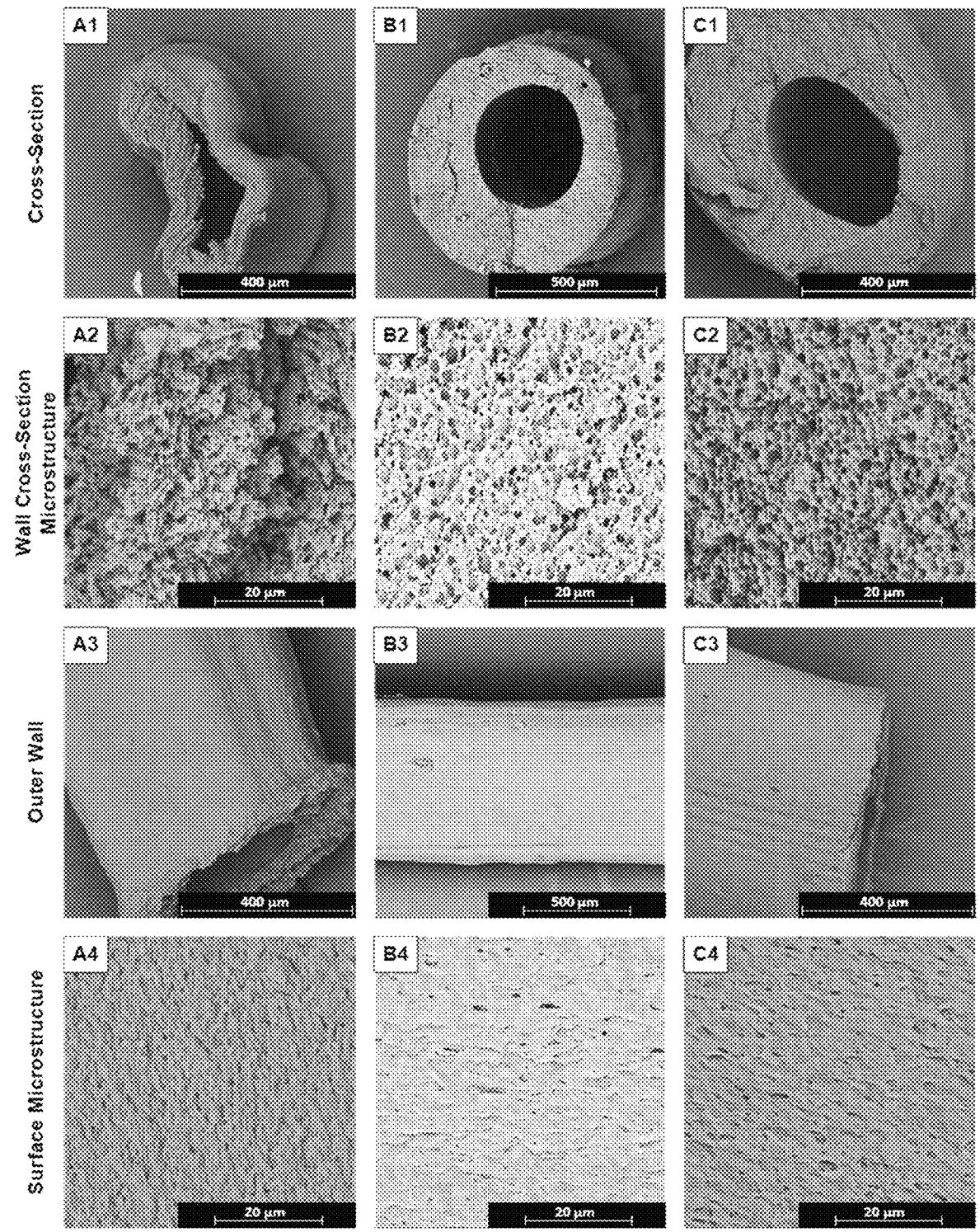

FIG. 27 shows SEM micrographs of the hollow fibres produced as per Example 10.5.16 (A1-A4); Example 10.5.27.3 (B1-B4); and Example 10.5.27.4 (C1-C4).

Figure 28:
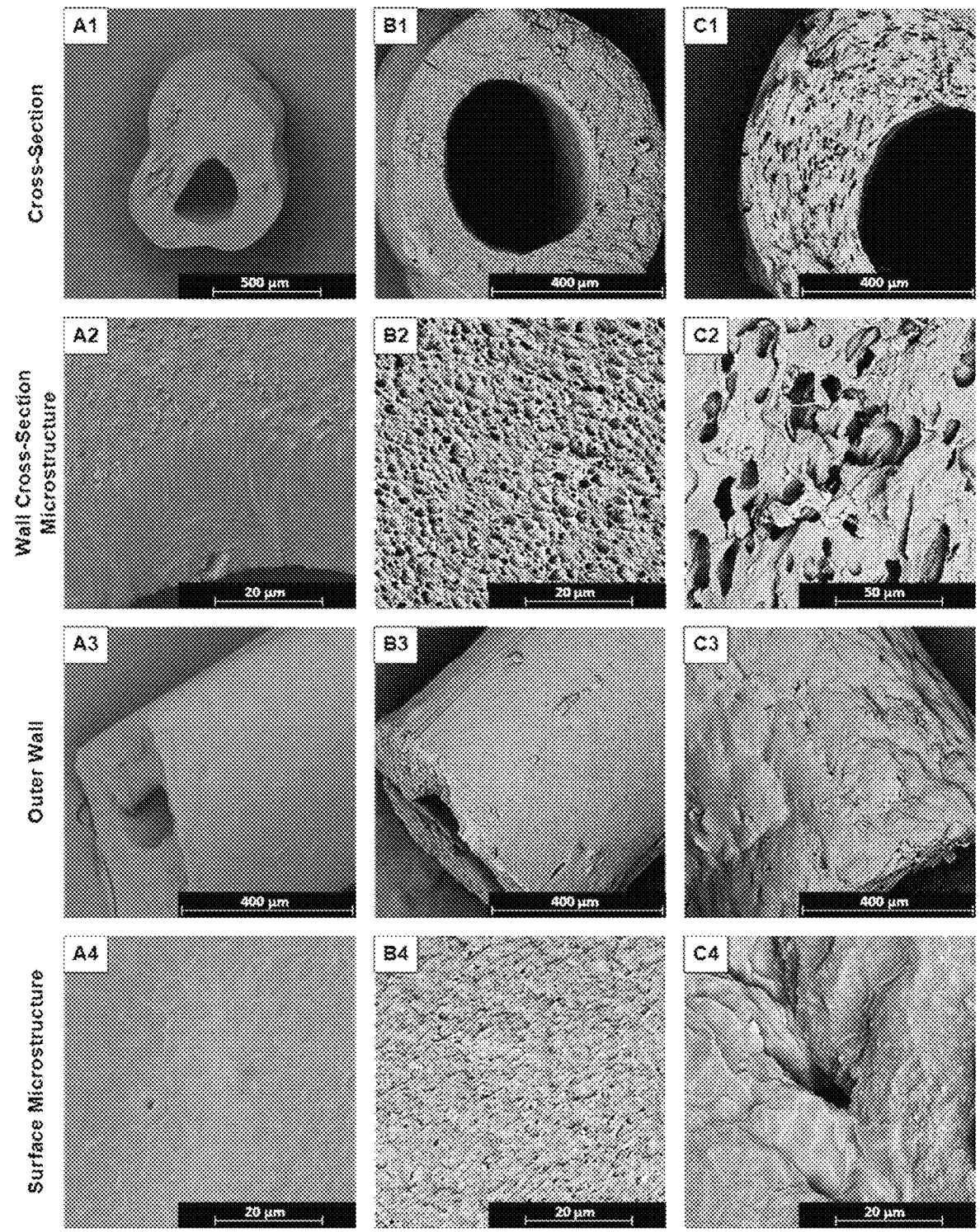

FIG. 28 shows SEM micrographs of the hollow fibres produced as per Example 10.5.27.1 (A1-A4); Example 10.5.27.5 (B1-B4); and Example 10.5.27.6 (C1-C4).

Figure 29:
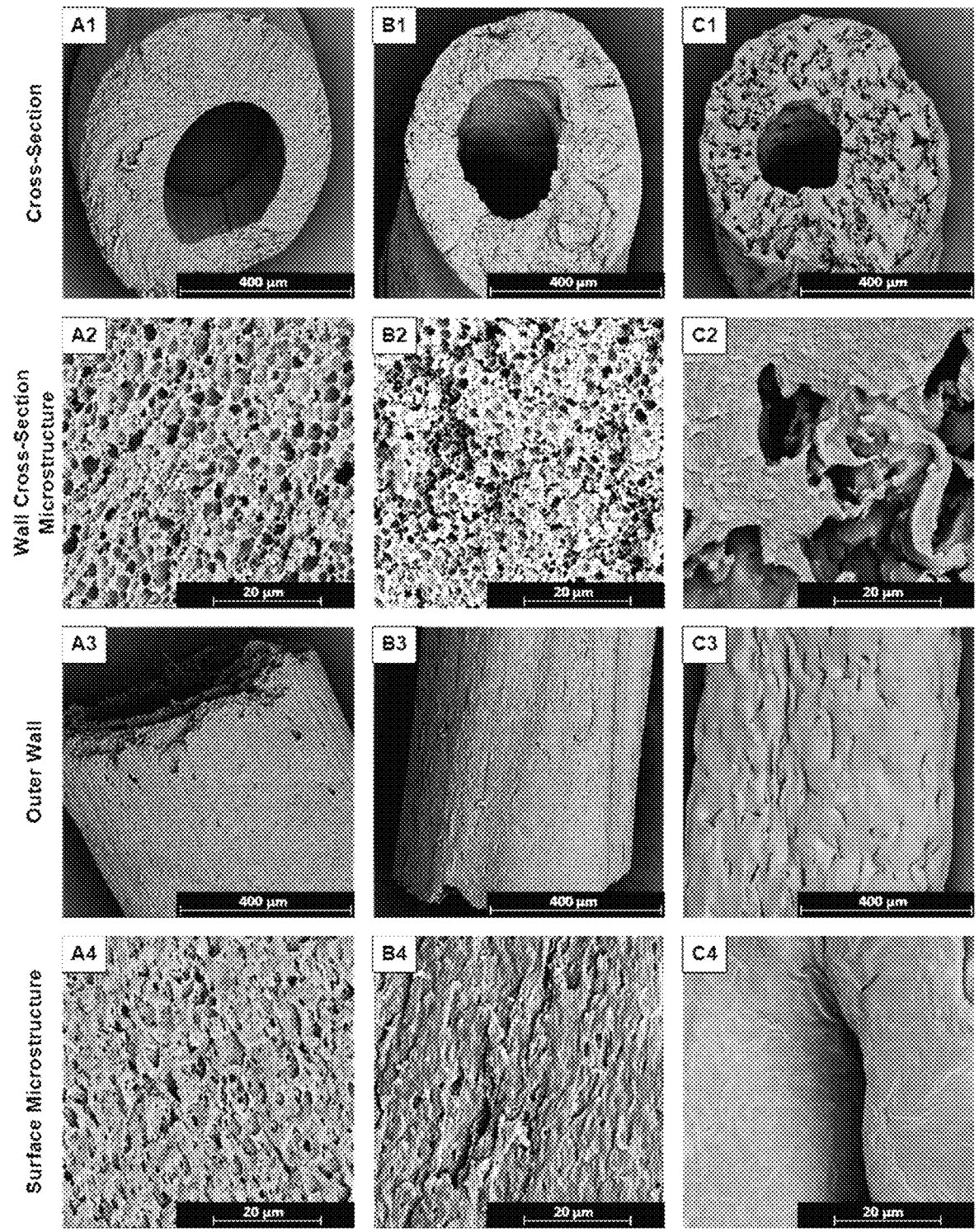

FIG. 29 shows SEM micrographs of the hollow fibres produced as per Example 10.5.25.1 (A1-A4); Example 10.5.28.3 (B1-B4); and Example 10.5.28.1 (C1-C4).

Figure 30:
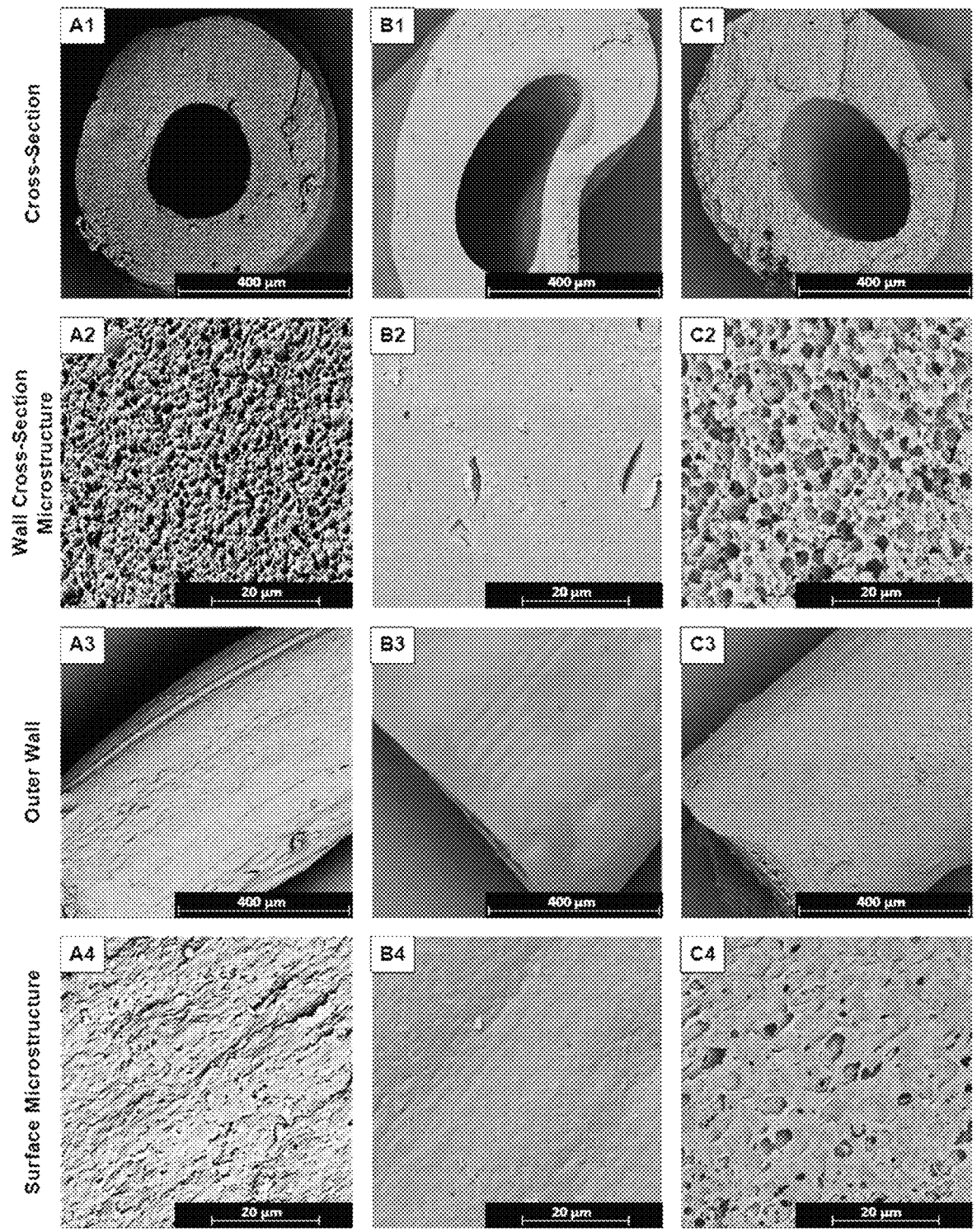

FIG. 30 shows SEM micrographs of the hollow fibres produced as per Example 10.5.28.4 (A1-A4); Example 10.5.29.1 (B1-B4); and Example 10.5.29.2 (C1-C4).

Figure 31:
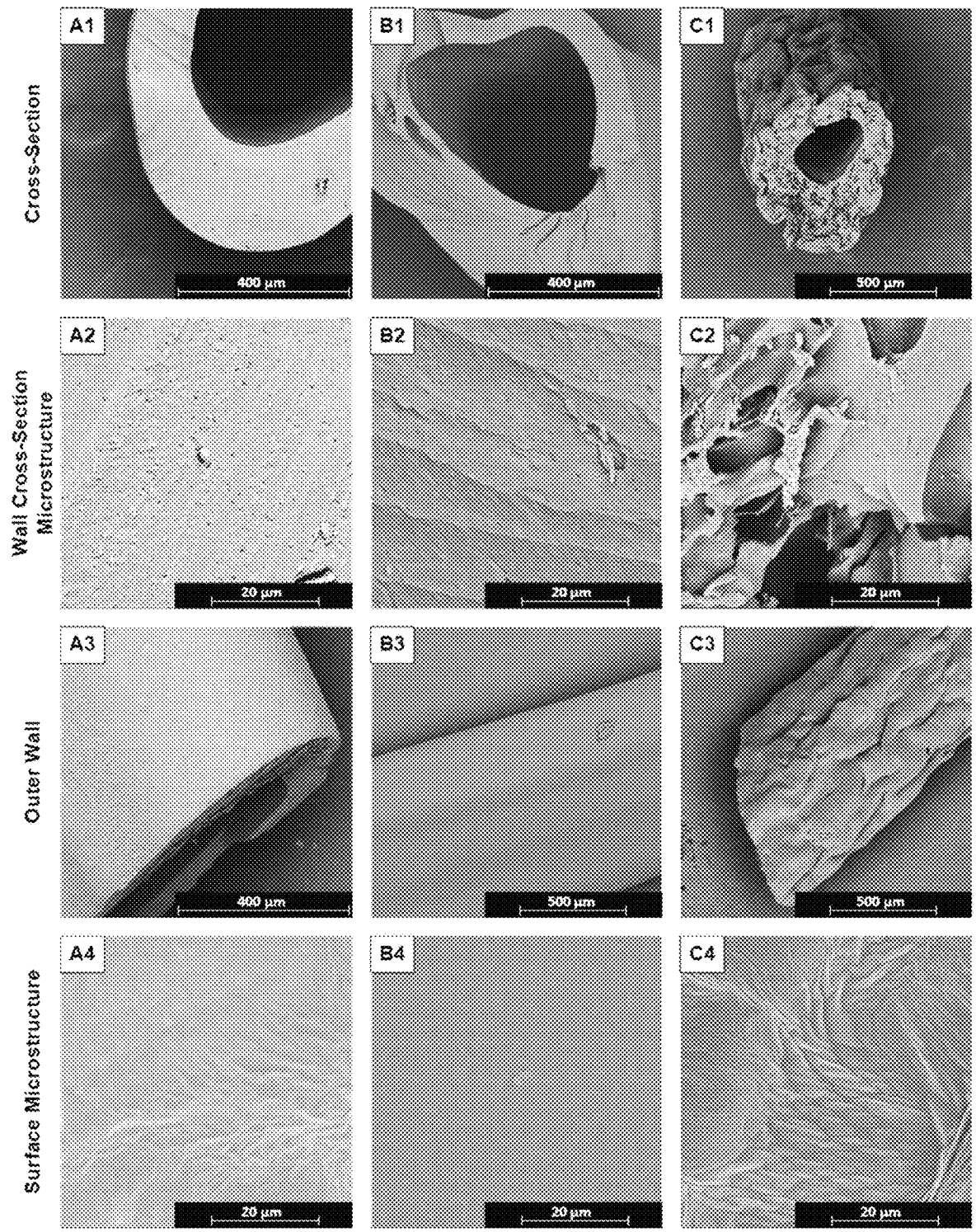

FIG. 31 shows SEM micrographs of the hollow fibres produced as per Example 9.12 (A1-A4); Example 9.12.1 (B1-B4); and Example 10.5.14 (C1-C4).

Figure 32:
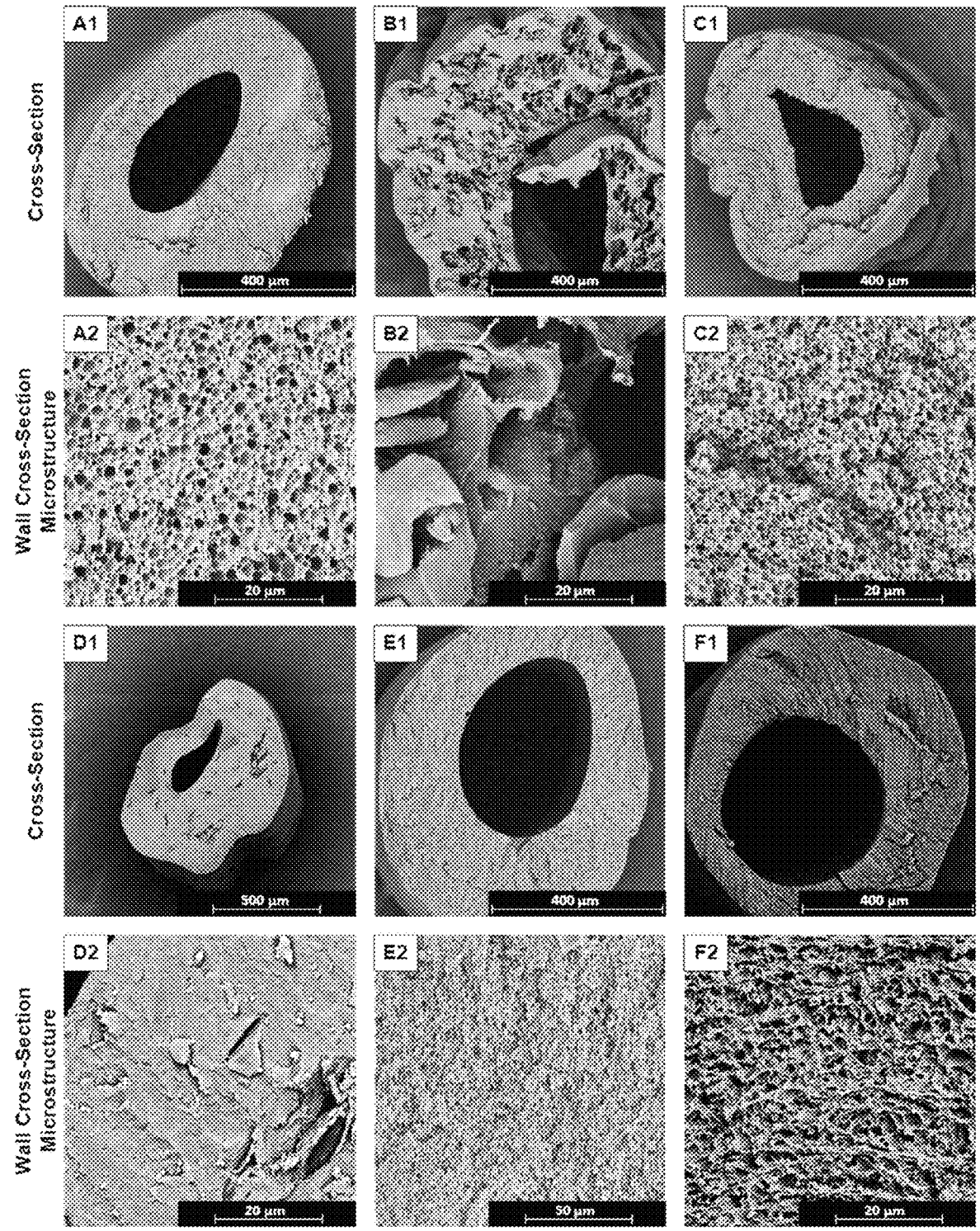

FIG. 32 shows SEM micrographs of the hollow fibres produced as per Example 10.5.3 (A1-A2); Example 10.5.14.1 (B1-B2); Example 10.5.15.1 (C1-C2); Example 10.5.27.2 (D1-D2); Example 10.5.7.1 (E1-E2); and Example 10.5.8.1 (F1-F2).

Figure 33:
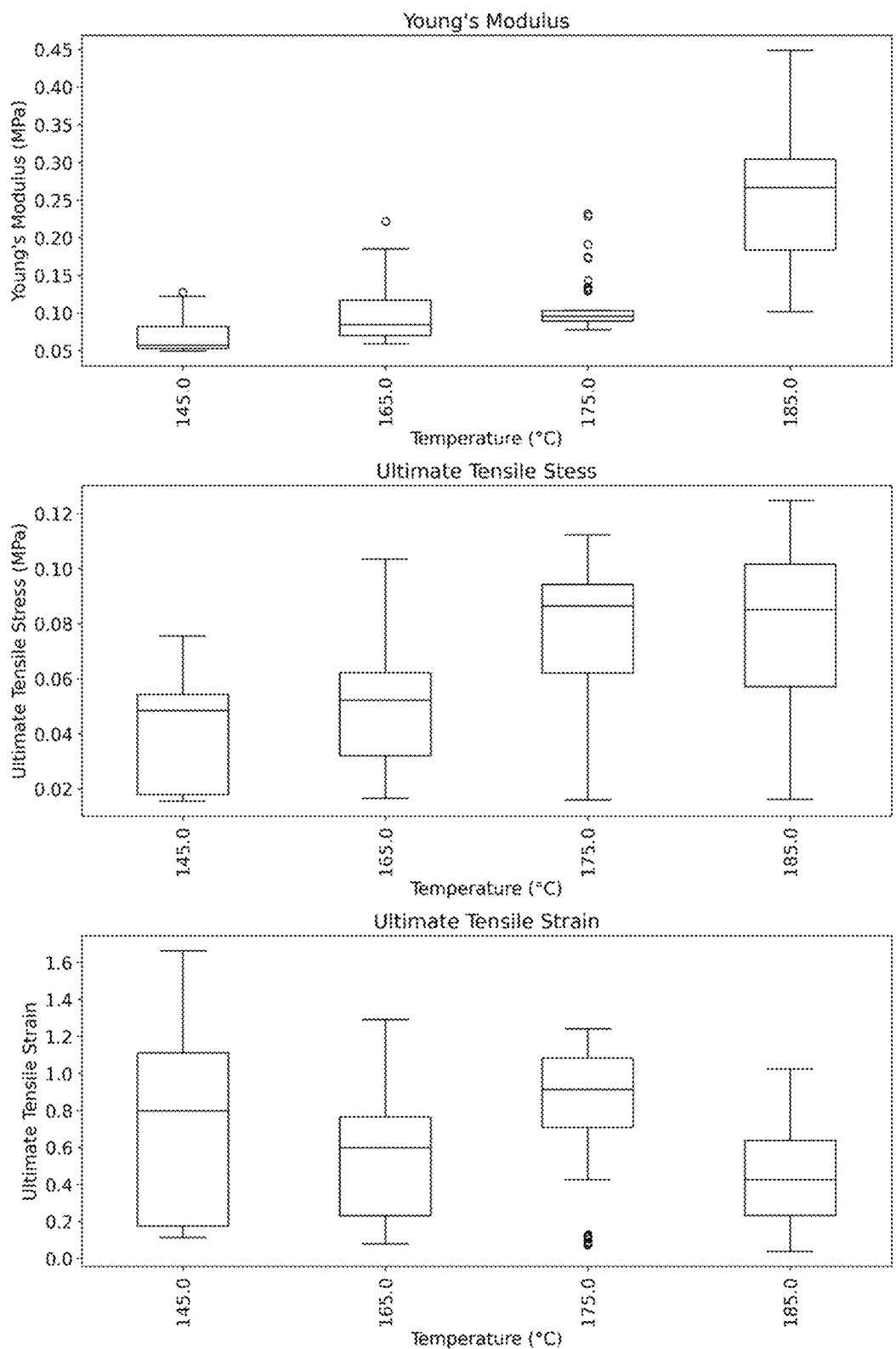

FIG. 33 shows the change in the Young's Modulus, Ultimate Tensile Stress and Ultimate Tensile Strain with annealing temperature of hollow fibres produced as per Example 10.5.4.1.

Figure 34:
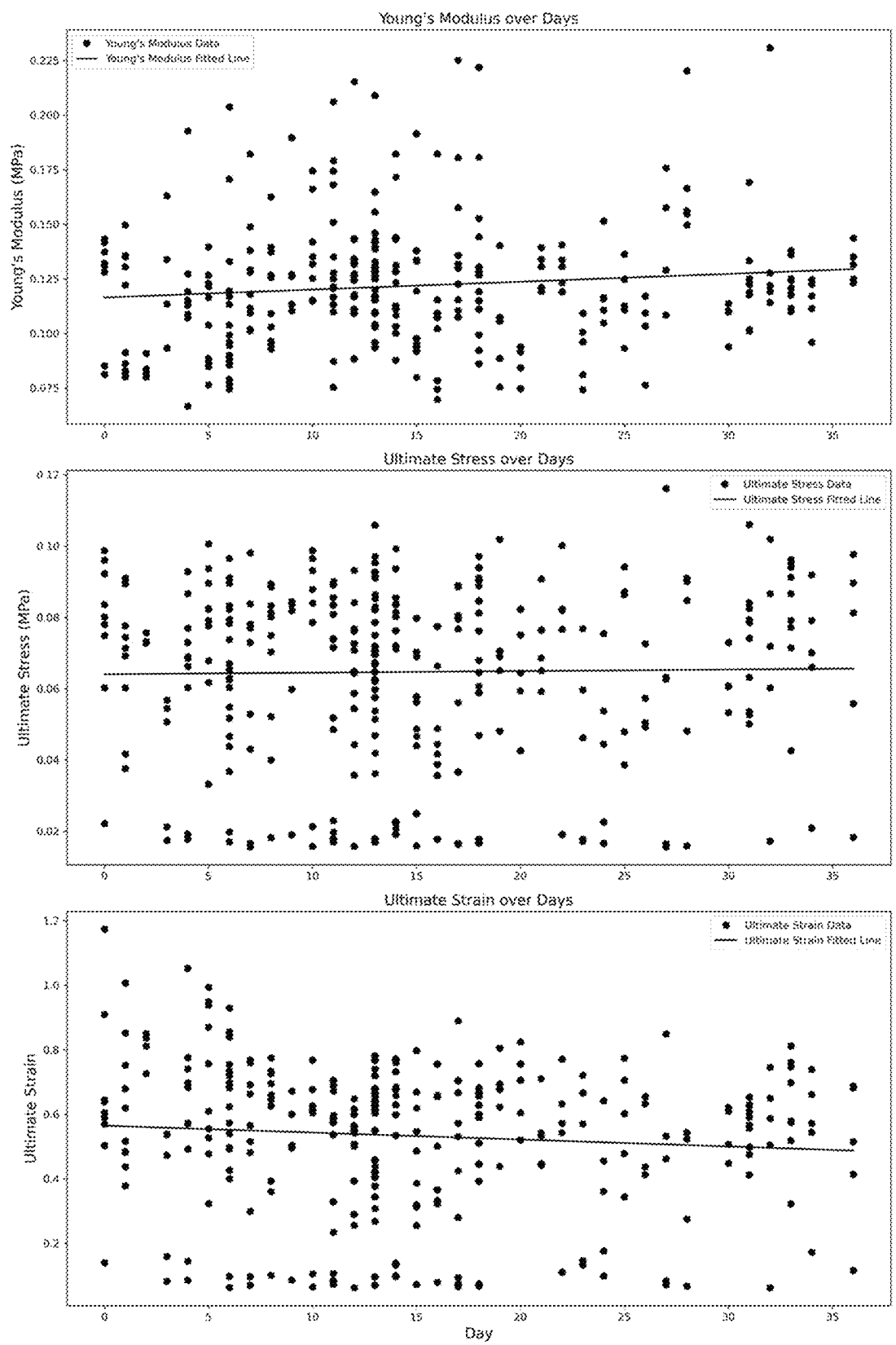

FIG. 34 shows the Young's Modulus, Ultimate Tensile Stress and Ultimate Tensile Strain of hollow fibres, produced as per Example 10.5.4.1, over a 36-day period while submerged in PBS and incubated at 37° C.

Figure 35:
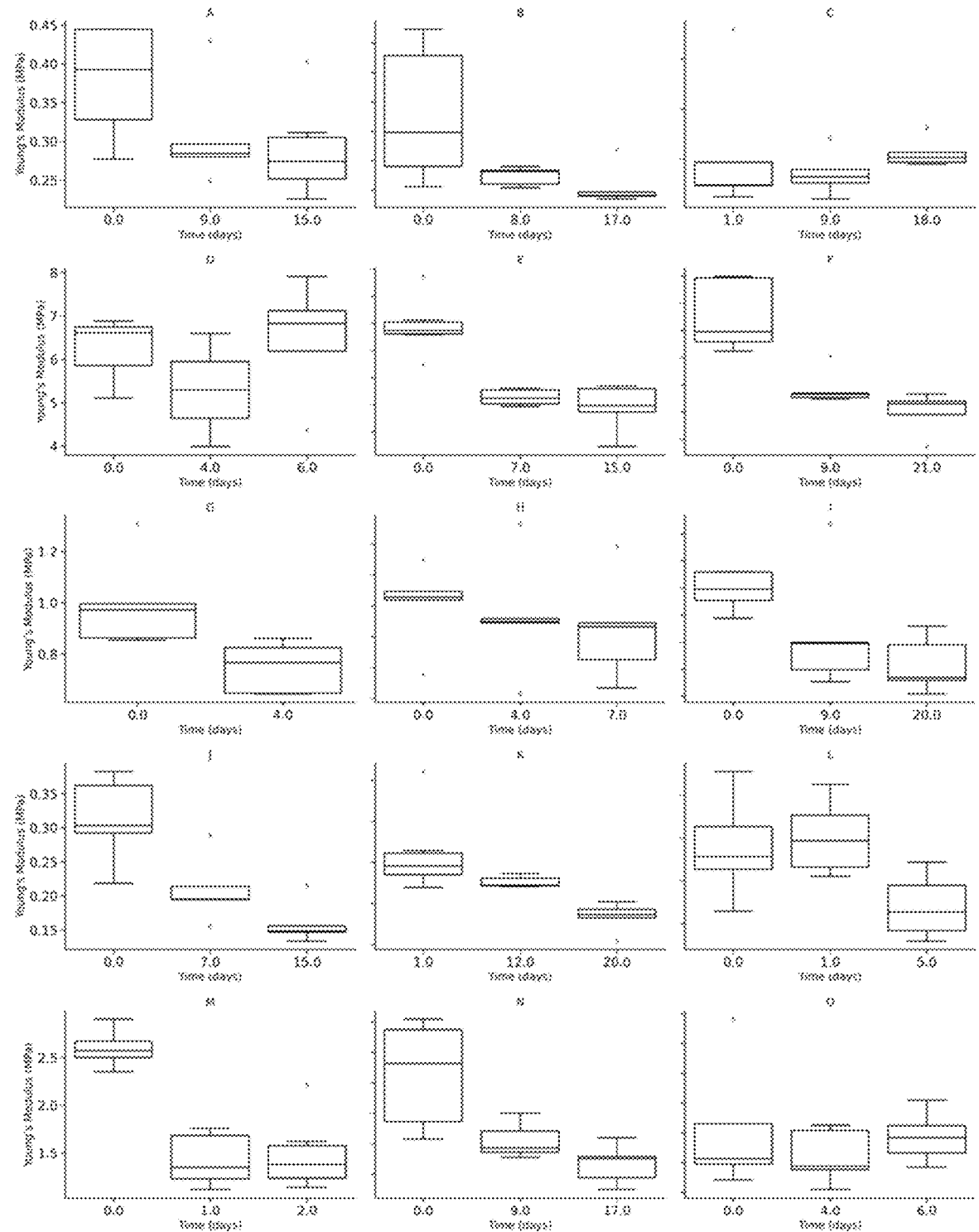

FIG. 35 shows the Young's Modulus of hollow fibres over a time while submerged in PBS with 1% (v/v) Antimycotic-Antibiotic and incubated at 37° C. The hollow fibres were produced as per Example 10.5.21.1 (A); Example 10.5.22.1 (B); Example 10.5.23.1 (C); Example 10.5.23.2 (D); Example 10.5.15 (E); Example 10.5.16 (F); Example 10.5.14 (G); Example 10.5.14.1 (H); Example 10.5.15.1 (I); Example 10.5.27.3 (J); Example 10.5.27.4 (K); Example 10.5.27.2 (L); Example 9.36.2 (M); Example 10.5.27.5 (N); and Example 10.5.27.6 (O).

Figure 36:
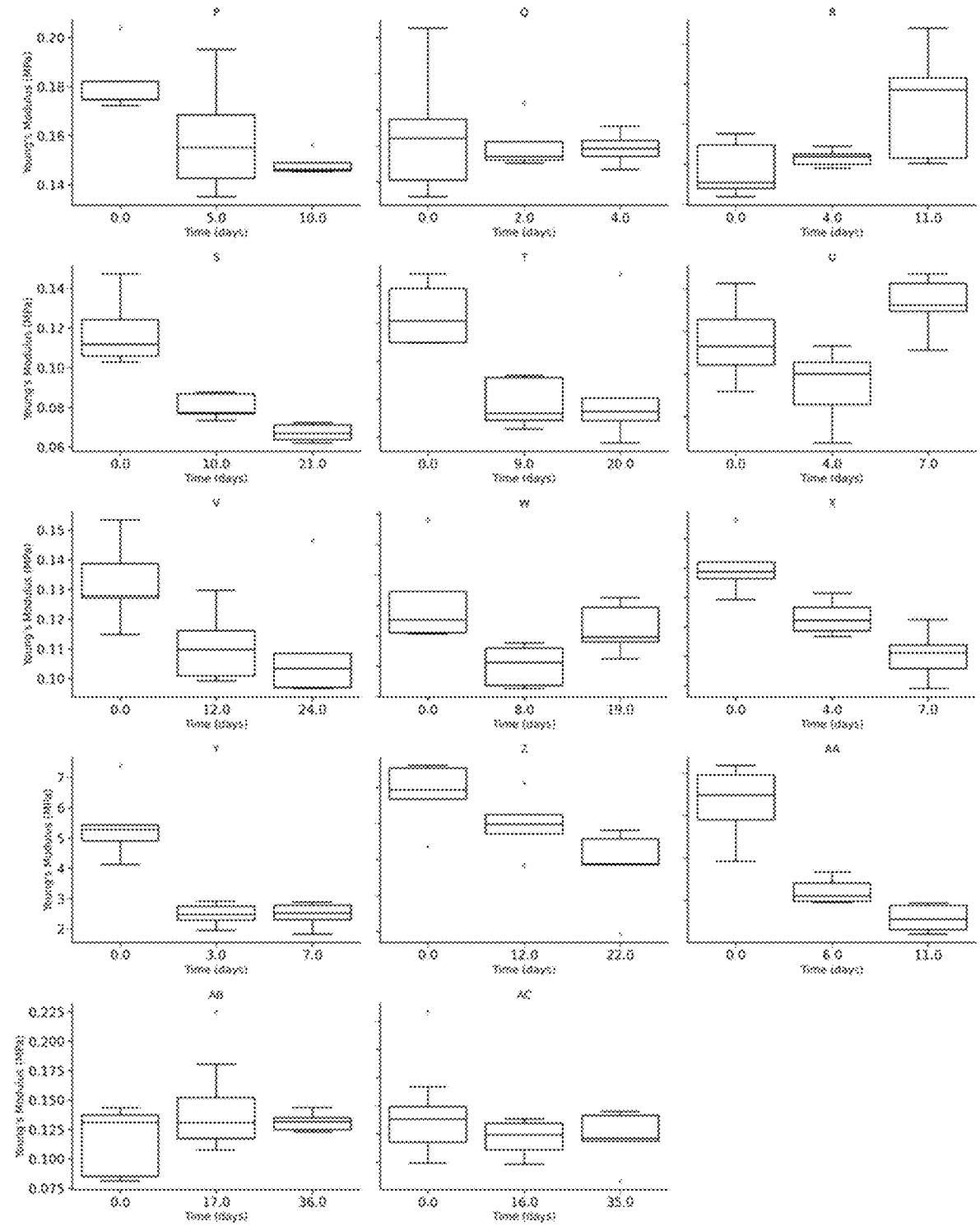

FIG. 36 shows the Young's Modulus of hollow fibres over a time while submerged in PBS and incubated at 37° C. The hollow fibres were produced as per Example 10.5.25.1 (P); Example 10.5.28.2 (Q); Example 10.5.28.1 (R); Example 10.5.28.3 (S); Example 10.5.28.4 (T); Example 10.5.29.1 (U); Example 10.5.29.2 (V); Example 10.5.7.1 (W); Example 9.12 (X); Example 9.12.1 (Y); Example 10.5.8.1 (Z); Example 10.5.3 (AA); Example 10.5.4.1 with a bore solution extrusion rate of 1.1 mL/h (AB); and Example 10.5.4.1 with a bore solution extrusion rate of 0.8 mL/h (AC).

Figure 37:
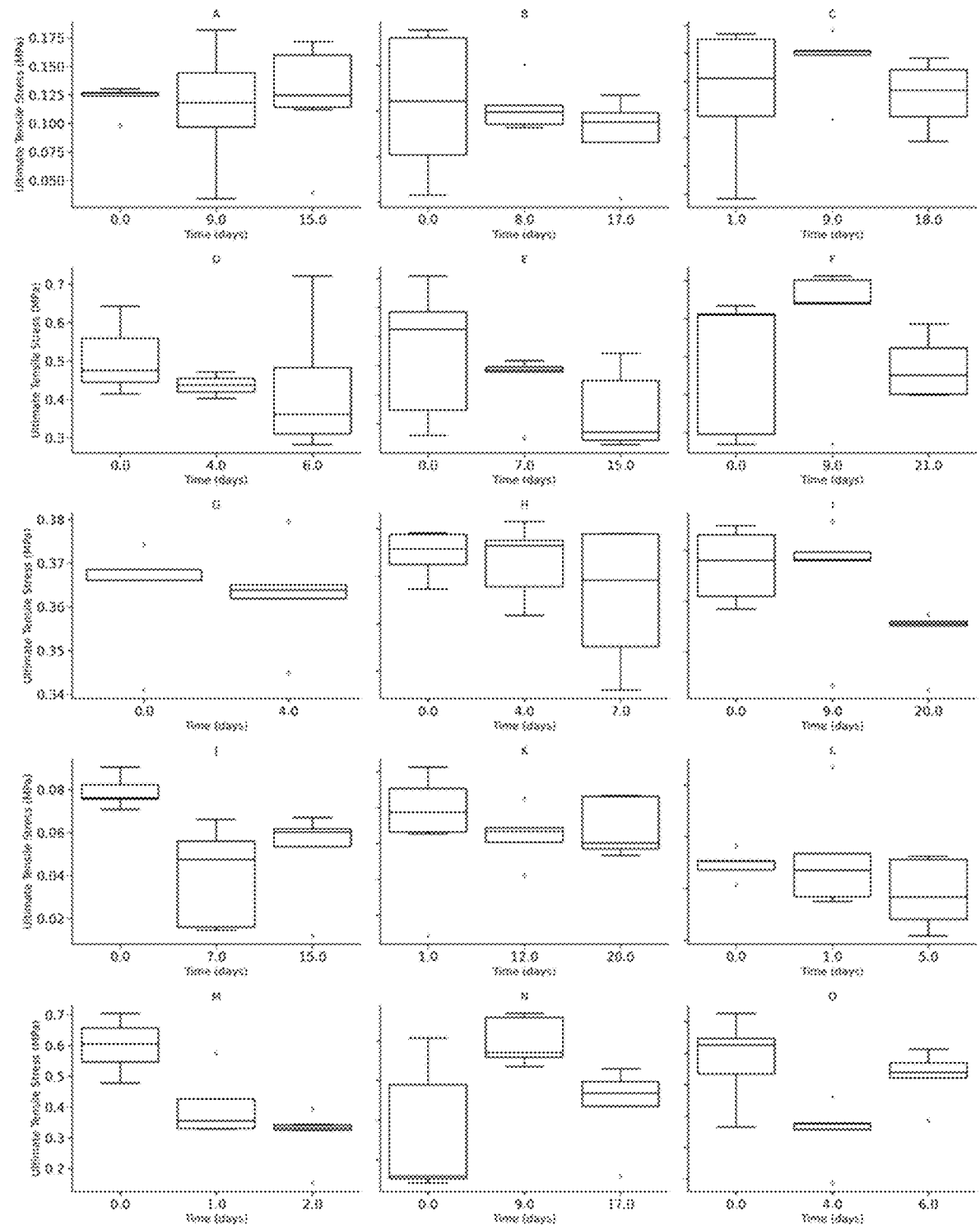

FIG. 37 shows the Ultimate Tensile Stress of hollow fibres over a time while submerged in PBS and incubated at 37° C.

The hollow fibres were produced as per Example 10.5.21.1 (A); Example 10.5.22.1 (B); Example 10.5.23.1 (C); Example 10.5.23.2 (D); Example 10.5.15 (E); Example 10.5.16 (F); Example 10.5.14 (G); Example 10.5.14.1 (H); Example 10.5.15.1 (1); Example 10.5.27.3 (J); Example 10.5.27.4 (K); Example 10.5.27.2 (L); Example 9.36.2 (M); Example 10.5.27.5 (N); and Example 10.5.27.6 (O).

Figure 38:
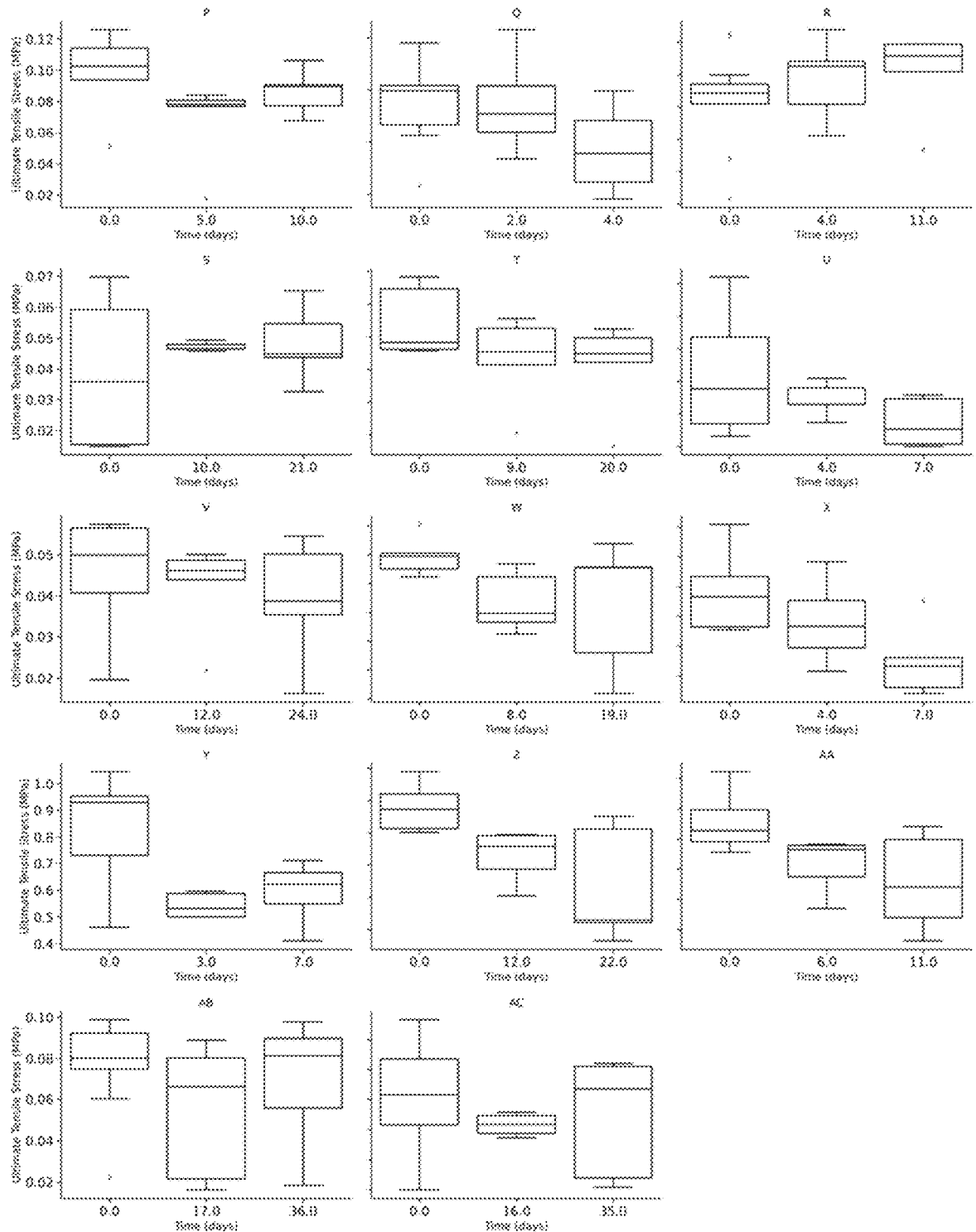

FIG. 38 shows the Ultimate Tensile Stress of hollow fibres over a time while submerged in PBS and incubated at 37° C. The hollow fibres were produced as per Example 10.5.25.1 (P); Example 10.5.28.2 (Q); Example 10.5.28.1 (R); Example 10.5.28.3 (S); Example 10.5.28.4 (T); Example 10.5.29.1 (U); Example 10.5.29.2 (V); Example 10.5.7.1 (W); Example 9.12 (X); Example 9.12.1 (Y); Example 10.5.8.1 (Z); Example 10.5.3 (AA); Example 10.5.4.1 with a bore solution extrusion rate of 1.1 mL/h (AB); and Example 10.5.4.1 with a bore solution extrusion rate of 0.8 mL/h (AC).

Figure 39:
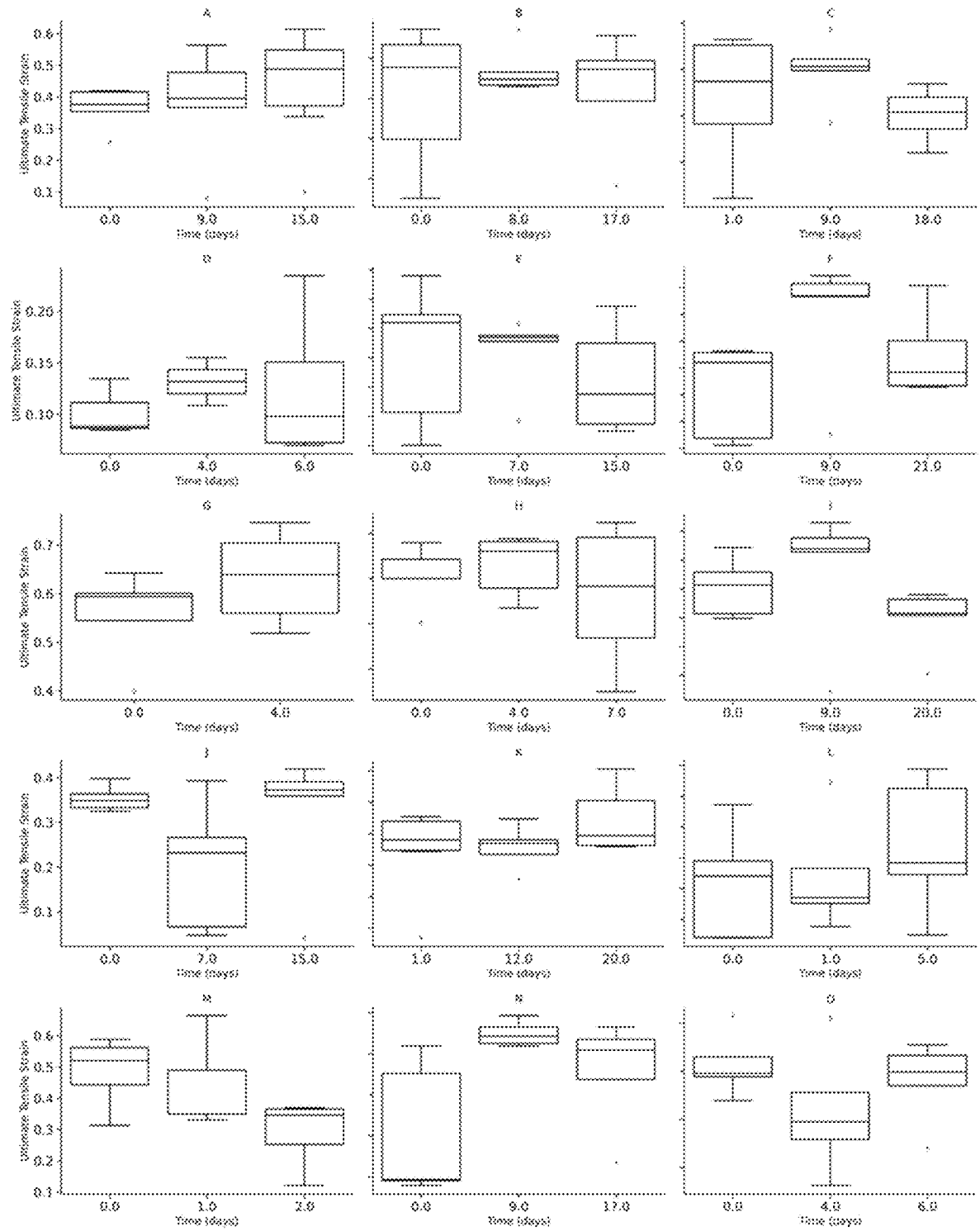

FIG. 39 shows the Ultimate Tensile Strain of hollow fibres over a time while submerged in PBS and incubated at 37° C. The hollow fibres were produced as per Example 10.5.21.1 (A); Example 10.5.22.1 (B); Example 10.5.23.1 (C); Example 10.5.23.2 (D); Example 10.5.15 (E); Example 10.5.16 (F); Example 10.5.14 (G); Example 10.5.14.1 (H); Example 10.5.15.1 (1); Example 10.5.27.3 (J); Example 10.5.27.4 (K); Example 10.5.27.2 (L); Example 9.36.2 (M); Example 10.5.27.5 (N); and Example 10.5.27.6 (O).

Figure 40:
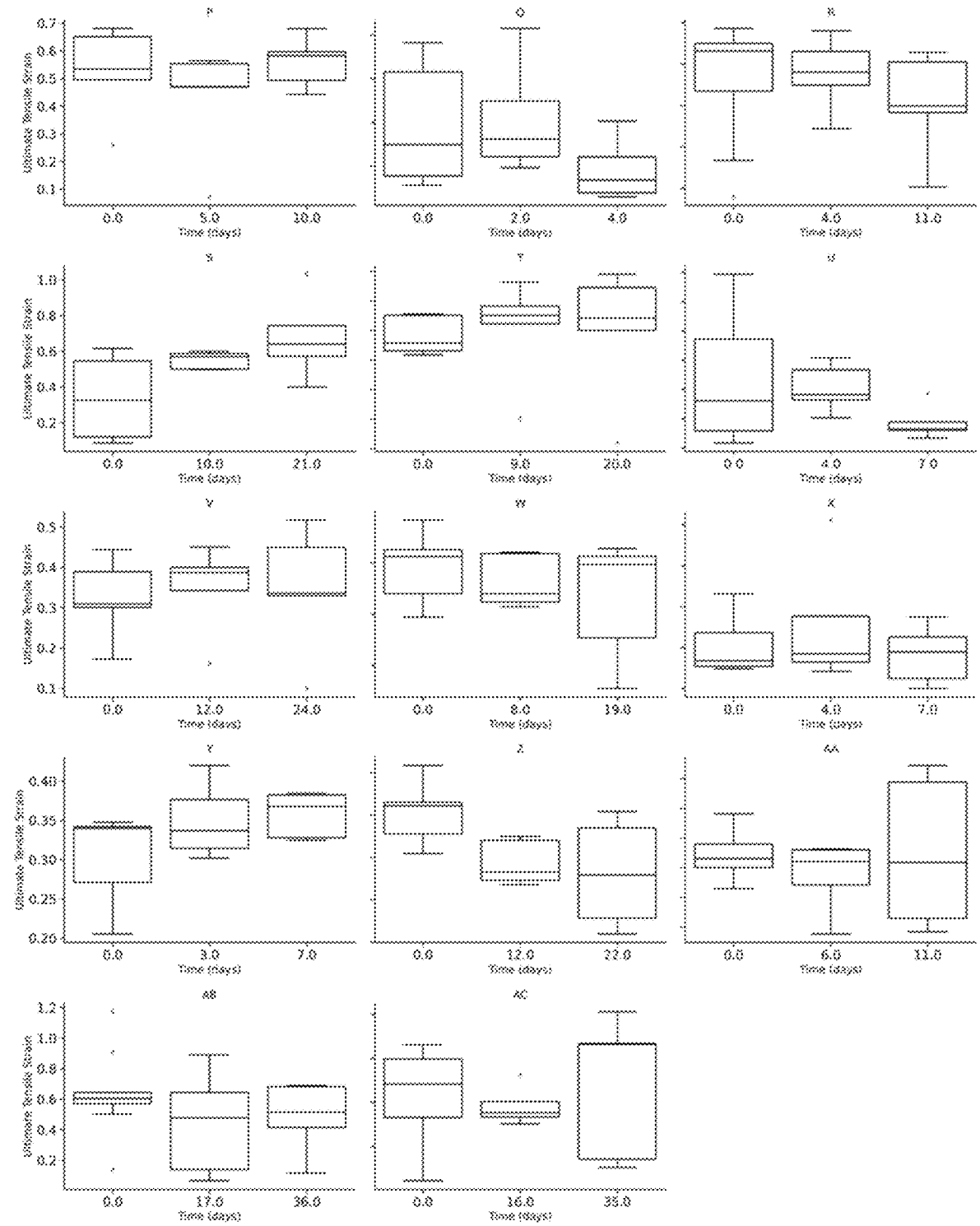

FIG. 40 shows the Ultimate Tensile Strain of hollow fibres over a time while submerged in PBS and incubated at 37° C. The hollow fibres were produced as per Example 10.5.25.1 (P); Example 10.5.28.2 (Q); Example 10.5.28.1 (R); Example 10.5.28.3 (S); Example 10.5.28.4 (T); Example 10.5.29.1 (U); Example 10.5.29.2 (V); Example 10.5.7.1 (W); Example 9.12 (X); Example 9.12.1 (Y); Example 10.5.8.1 (Z); Example 10.5.3 (AA); Example 10.5.4.1 with a bore solution extrusion rate of 1.1 mL/h (AB); and Example 10.5.4.1 with a bore solution extrusion rate of 0.8 mL/h (AC).

Figure 41:
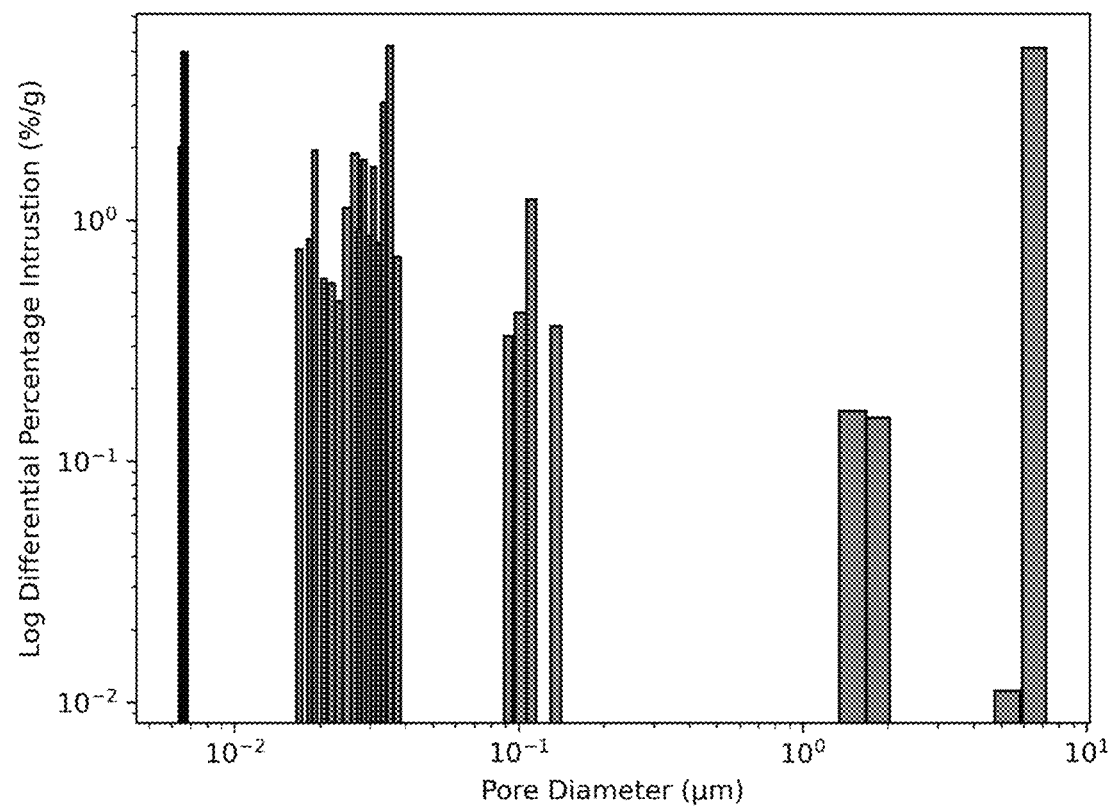

FIG. 41 shows the pore size distribution of hollow fibres produced as per Example 10.5.4.1, as measured with mercury porosimetry and reported as the log differential percentage intrusion per gram of sample.

Figure 42:
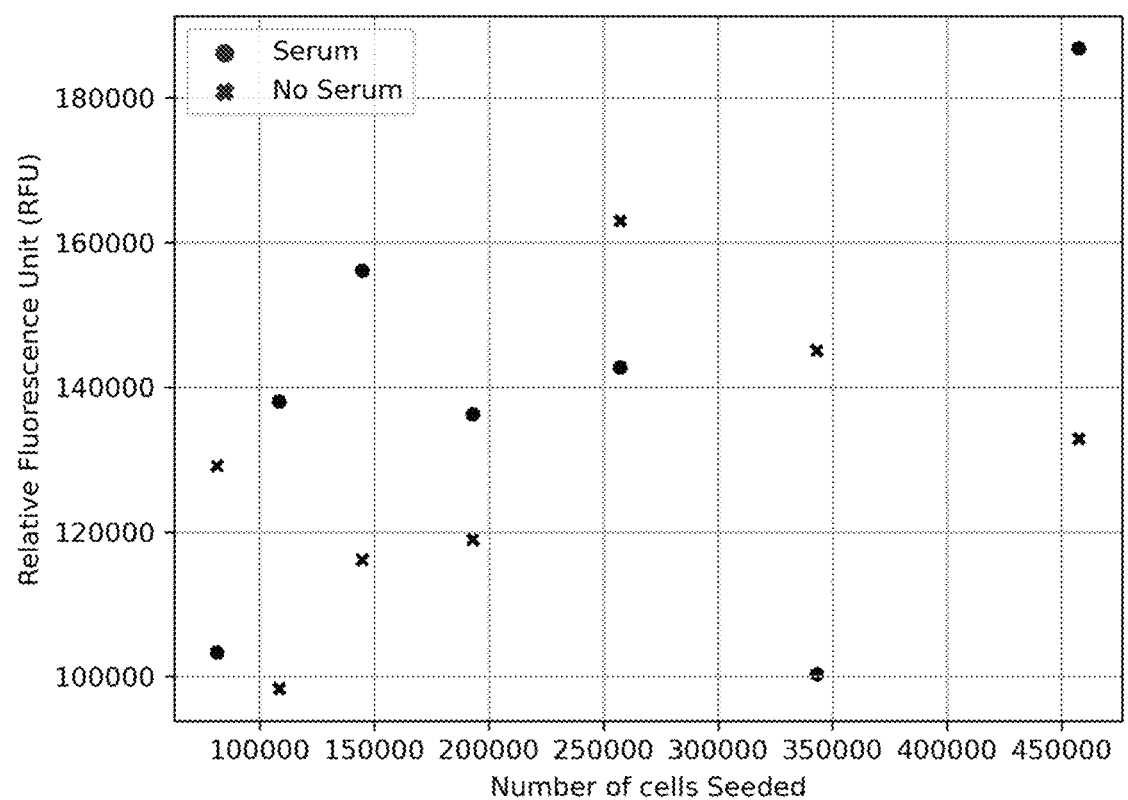

FIG. 42 shows the seeding efficiency of 1 cm hollow fibre section maintained in hydrostatic conditions at various cell seeding densities, as per Example 12.2.

Figure 43:
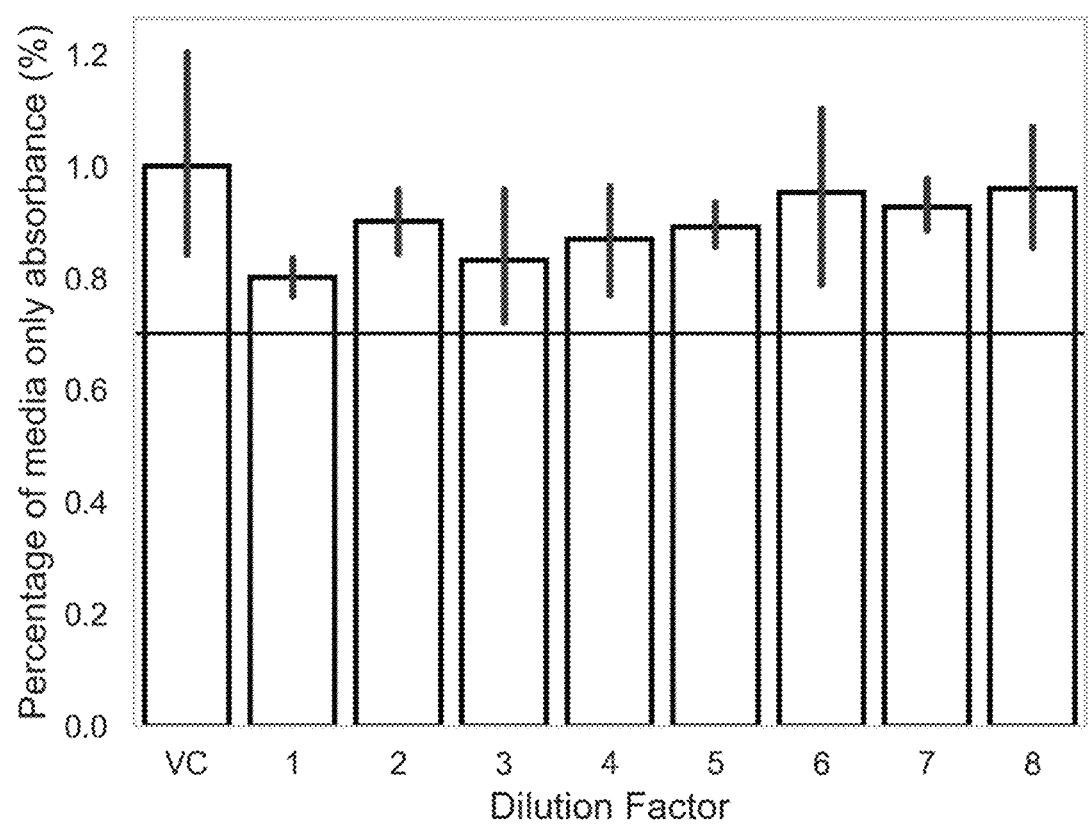

FIG. 43 shows Neutral Red cell viability data as a measure of hollow fibre cytotoxicity, as per Example 12.1.

Figure 44:
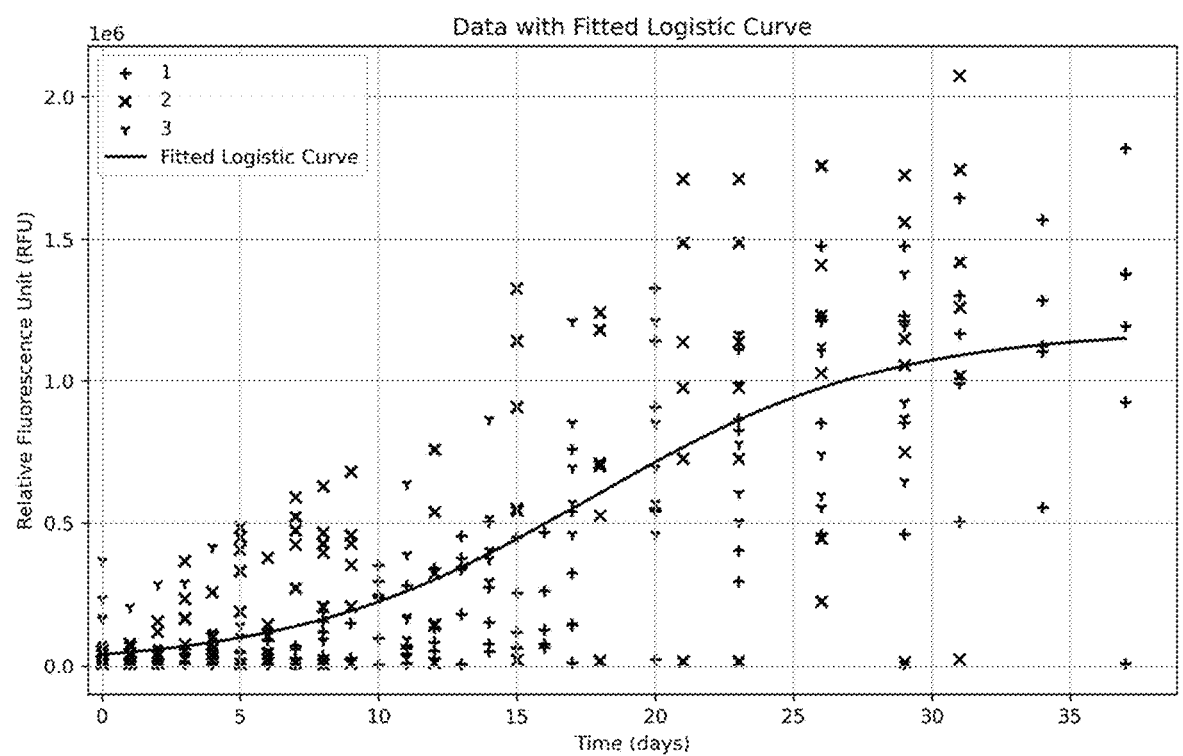

FIG. 44 shows a growth curve of C2C12 mouse myoblast cells cultured on hollow fibres for 36 days and measured with PrestoBlue High Sensitivity Assay relative fluorescence units, as per Example 12.3.

Figure 45:
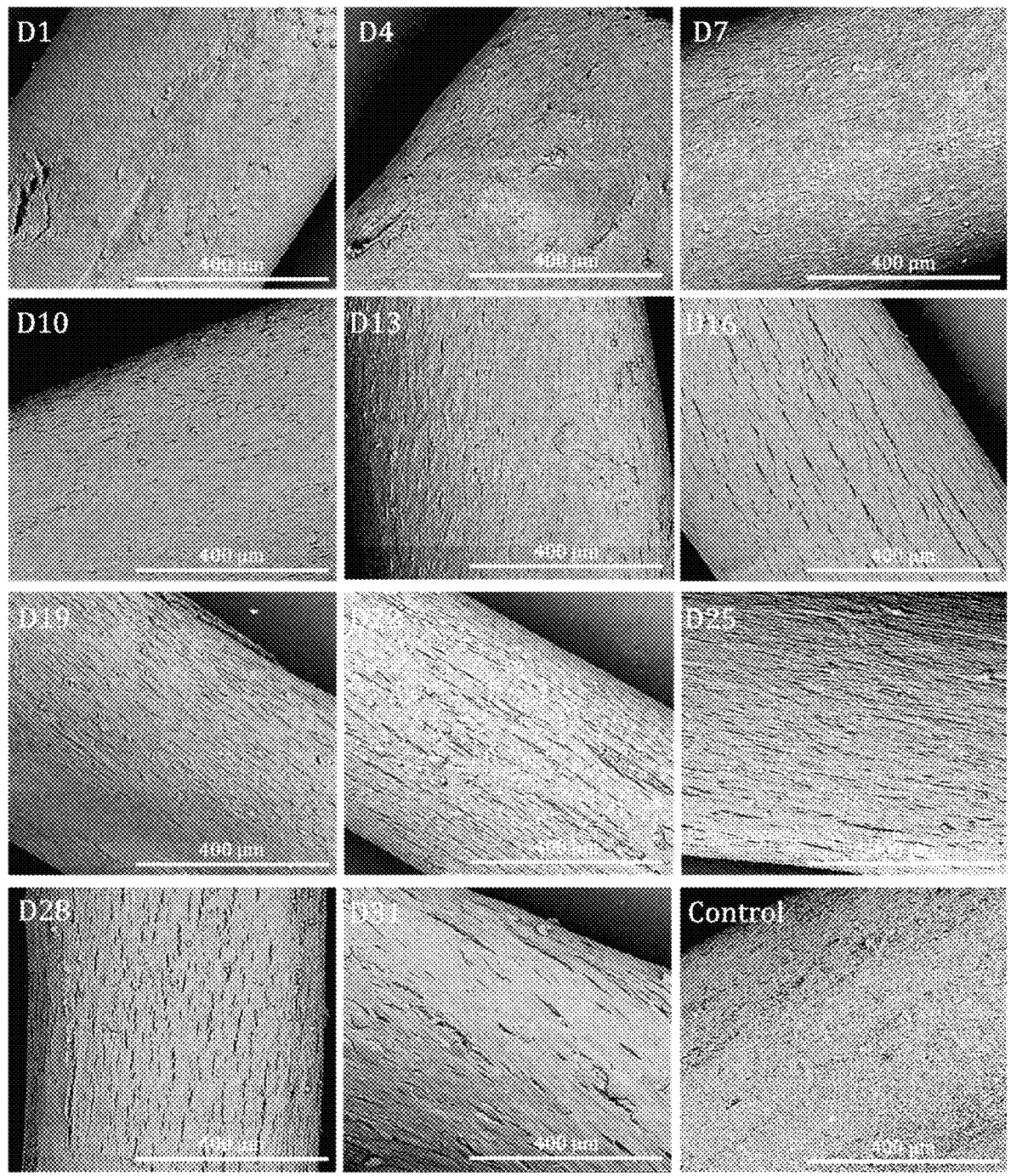

FIG. 45 shows SEM micrographs of C2C12 mouse myoblast cells cultured on hollow fibres and fixed at regular time intervals throughout the culture period, as per Example 12.3.

Figure 46:
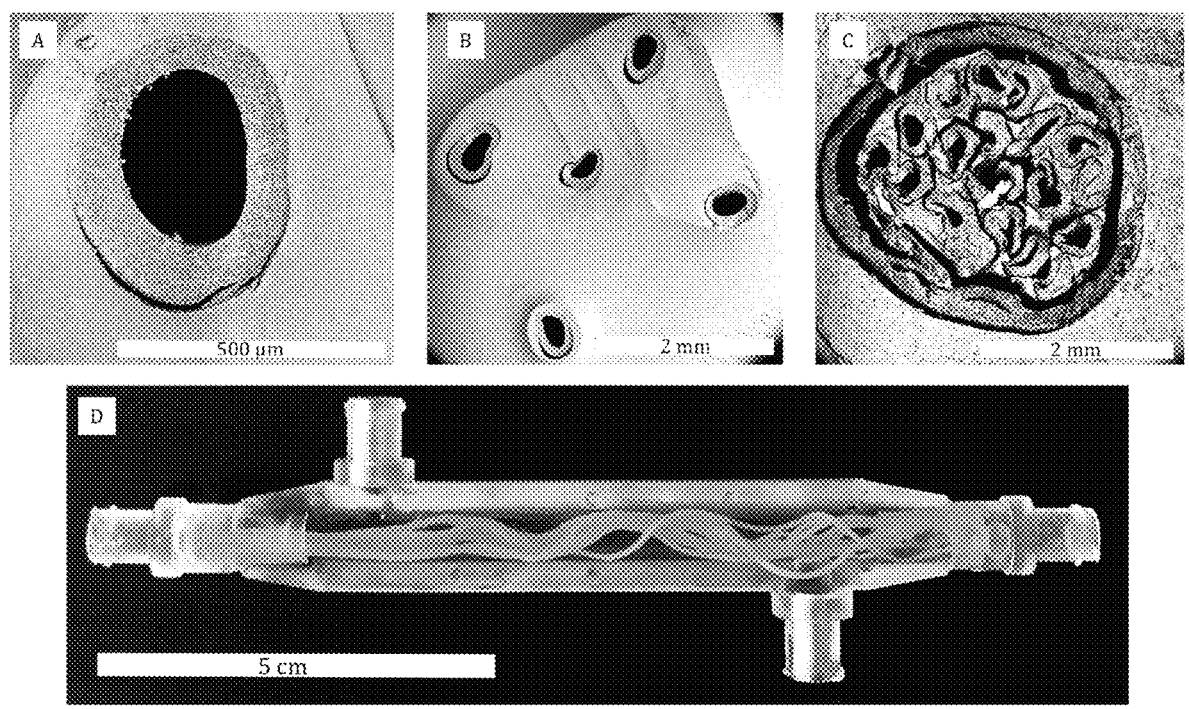

FIG. 46 shows SEM micrographs of a single hollow fibre (A) and multiple hollow fibres (B) potted as per Example 13.1.1, and a bundle of hollow fibres (C) potted per Example 13.4. Also shown is one side of a bioreactor shell with a bundle of hollow fibres (D) potted as per Example 13.5.

Figure 47:
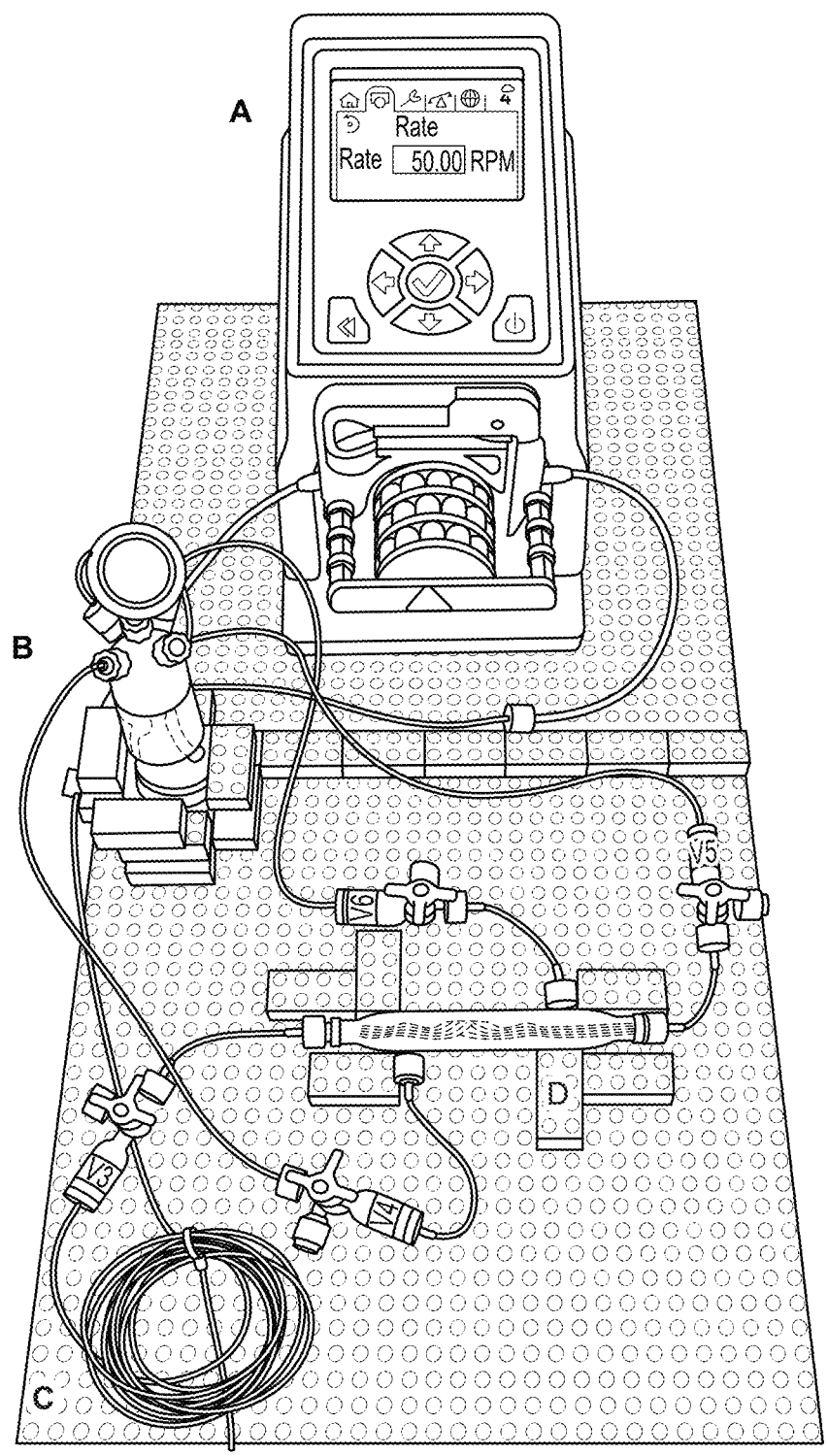

FIG. 47 shows a bioreactor configuration comprising: a peristaltic pump (A); a multi-port media reservoir with a gas exchange membrane (B); length of oxygen permeable tubing (C); and a hollow fibre cartridge of this disclosure (D).

4 EXEMPLIFICATION

The present disclosure is further illustrated by the following Examples, in which degrees are in Celsius, unless otherwise stated. It should be understood that these Examples, while indicating preferred embodiments of the disclosure, are given by way of illustration only. From the above discussion and these Examples, one skilled in the art can ascertain the essential characteristics of this disclosure, and without departing from the spirit and scope thereof, can make various changes and modifications of the disclosure to adapt it to various usages and conditions. Thus, various modifications of the disclosure in addition to those shown and described herein will be apparent to those skilled in the art from the foregoing description. Such modifications are also intended to fall within the scope of the appended claims.

1. General Materials and Methods

All materials and reagents are used as supplied unless otherwise stated. Soy protein isolate (SPI), whey protein (WP), and N-acetyl L-cysteine (NAC) are purchased from THG plc (Manchester, UK). Mung bean protein (MBP) is purchased from Nutraonly Nutritions Inc. (Xi'an, China). Chickpea protein (CPP), rice protein (RP), pea protein (PP), pumpkin seed protein (PSP) and sunflower seed protein (SFSP) are purchased from Natural Remedies 4U Ltd (Wendnesbury, UK). Faba Bean Protein (FBP) Isolate was purchased from Pulsin LTD (Gloucester, UK). Beef Protein Isolate 97 (BPI) is purchased from Sports Supplements Ltd (Colchester, UK). Carrageenan-Kappa (E407), Carrageenan-Iota (E407), Agar (E406) and sodium alginate (E401) are purchased from Special Ingredients Ltd (Chesterfield, UK). Sodium salt of carrageenan is available from MP Biomedicals (California, US). Canola oil, Sunflower oil, yeast extract, and margarine are purchased from Tesco PLC (Welwyn Garden City, UK). PrestoBlue High-Sensitivity Assay, Urea, sodium sulphite, sodium hydroxide, chitosan, calcium carbonate, citric acid, sodium citrate, sodium malate, sodium succinate, sodium hypophosphite, glycerol, and Polydimethylsiloxane (PDMS, SYLGARD™ 184 Silicone Elastomer Kit), Foetal Bovine Serum (FBS), Horse Serum (HS), Phosphate Buffer Solution (PBS), Trypsin, L-glutamine solution, Penicillin/Streptomycin (PS) solution, Antibiotic Antimycotic Solution, and Dulbecco's Modified Eagle Medium (DMEM) are purchased from Scientific Laboratory Supplies Ltd (Hull, UK). C2C12 mouse myoblast cells are purchased form ATCC (American type culture collection, Virginia, US). Epoxy (Araldite Rapid Liquid Adhesive) and silicone adhesive (DOWSIL™ 786 Silicone) are purchased from RS-Online (Corby, UK). Ethanol was purchased from Prima Industries Ltd (Rotherham, UK). Iso-propanol (IPA) and sodium bicarbonate were purchased from Atom Scientific Ltd (Hyde, UK). N-propanol, methanol and acetone are purchased from Atom Scientific Ltd (Hyde, UK). ANYCUBIC ABS-Like Resin Pro 2, ANYCUBIC ABS-Like Resin, and ANYCUBIC Water Washable was purchased from Shenzhen Anycubic Technology Co. Ltd. (Shenzhen, China). ELEGOO ABS-Like 2.0 and ELEGOO ABS-Like 2.0 was purchased from Elegoo, Inc. (Shenzhen, Guangdong, China). Liqcreate Bio-Med Clear is purchased from niceshops GmbH (Paldau, Austria). Siraya Tech Blu is purchased from Siraya Tech (California, US). Formlabs BioMed Clear Resin and Formlabs Biomed Amber Resin are purchased from Formlabs Inc. (Massachusetts, US).

1.1. Rheological Measurements

Rheological measurements, such as the apparent viscosity, were taken with a Fungilab Premium viscometer (Fungilab Global, New York, US) with an LV-4 spindle. Measurements of apparent viscosity were taken immediately after dope solution preparation to minimise thixotropic effects.

1.2. Mechanical Testing

Mechanical testing was carried out through uni-axial tensile testing. 20 cm samples (n 3) were removed from PBS after at least 20 minutes of submersion. The samples were evaluated using a HS-UT-5PC universal testing machine (Dongguan Hongjin Test Instrument Co., Guangdong, China) fitted with a 5N load cell. The samples were mounted such that 11 cm of sample were deformed between two mount posts. The samples were deformed at a set speed of 50 mm/s.

1.2.1. Sample Preparation

Unless otherwise stated, samples were prepared for mechanical testing by initially submerging them in 99.8% iso-propanol (v/v) for at least 12 hours. The hollow fibres were subsequently rehydrated, for a minimum of 20 minutes, and stored in PBS solution with 1% (v/v) Antimycotic-Antibiotic at 37° C. until testing. One hour prior to testing, samples were transferred into a 20% (v/v) aqueous glycerol solution.

1.3. Scanning Electron Microscopy

Prior to imaging, samples were washed with iso-propanol and air-dried. Samples were mounted on aluminium stubs and coated with 4 nm platinum with an K575X Peltier cooled sputter coater with turbo pump (Emitech SAS, Montigny-le-Bretonneux, France). The coated samples were imaged with a FEI Quanta 200 FEG-SEM (Field Electron and Ion Company, Oregon, US) under high vacuum.

1.4. Mercury Porosimetry

Prior to analysis, samples were washed with iso-propanol and air-dried. Samples (n 3) were weighed and transferred into the mercury intrusion pore size analyser (PoreMaster, Anton Paar GmbH, Austria) for analysis. The penetrometer was transferred into the low-pressure analysis port of the mercury porosimeter, and the low-pressure analysis was run for an intrusion and extrusion cycle. Once the low-pressure analysis was complete, the penetrometer was transferred to the high-pressure analysis port and the analysis run for an intrusion and extrusion cycle. The low- and high-pressure analyses were then stitched together with the Quantachrome Instruments Poremaster for Windows software (Anton Paar GmbH, Austria). Porosity, pore size distribution and permeability were calculated from these stitched data.

1.5. Computer Aided Design and 3D Printing

Various components were designed via computer aided design on SolidWorks (Dassault Systems SolidWorks Corporation, Waltham, USA).

Various components were fabricated via LCD 3D printing (Elegoo Saturn 3, Elegoo, Inc., Shenzhen, Guangdong, China) with UV-sensitive resins.

Various UV-sensitive resins can be used, including ANYCUBIC ABS-Like Resin Pro 2, ANYCUBIC ABS-Like Resin, ANYCUBIC Water, ELEGOO ABS-Like 2.0, ELEGOO ABS-Like 2.0, Siraya Tech Blu, Liqcreate Bio-Med Clear, Formlabs BioMed Clear Resin, and Formlabs Biomed Amber Resin.

Printed parts were washed with 99.8% (v/v) iso-propanol in a wash station (Elegoo Mercury X wash station, Elegoo, Inc., Shenzhen, Guangdong, China) for 10 minutes. Parts were cured under UV for 1 to 10 minutes in a UV curing station (Elegoo Mercury X wash station, Elegoo, Inc., Shenzhen, Guangdong, China).

Parts intended for use in cell culture were cured for 60 minutes at 60° C. in a heated UV oven (Form Cure, Formlabs Inc., Massachusetts, US).

1.6. Multilabel Plate Reader Assays

Any multilabel plate reader assays including, Luminescence, Fluorescence Intensity, Fluorescence Polarization, Visible Absorbance and UV Absorbance Readings were recorded with a PerkinElmer VICTORX3 Multilabel Plate Reader (PerkinElmer, Massachusetts, US).

Specifically, Neutral Red Visible Absorbance readings were measured through a 540 nm emission narrow band pass filter with a half bandwidth of 8 nm. Additionally, Presto-Blue High-Sensitivity Assay Fluorescence Intensity readings were recorded with a 550 nm OD6 narrow band pass excitation filter with a band half width of 8 nm and a 600 nm OD6 emission filter with a band half width of 8 nm.

1.7. General Cell Culture

Unless otherwise specified, C2C12 mouse myoblast cells were cultured according to supplier recommendations. A C2C12 serum-based culture media was used, comprising 10% (v/v) FBS, 1% (v/v) PS and 2 mM L-glutamine. Tissue culture flasks were seeded at a density of $2 \times 10^3$ cells/cm$^2$ and maintained at confluences below 70%. All incubation was at 37° C. with 5% $CO_2$. Cell detachment for passaging was achieved with 0.25% (w/v) Trypsin-0.53 mM EDTA solution. Cell counting was performed using a manual BRAND™ Blaubrand™ Neubauer Improved Counting Chamber with light microscope.

1.8. Statistical Analysis

Mean and Median values were calculated with Numpy. Error bars are calculated as standard error of the median. Functions were fitted to experimental data with Scipy.optimize. 95% Confidence and Prediction intervals were calculated with Scipy.Stat. Python version 3.12.2 was used for all quantitative data analyses.

2. Preparation of Covalently-Crosslinked, Semi-Permeable, Porous Hollow Fibres

2.1. Exemplary Process 1

Figure 1:
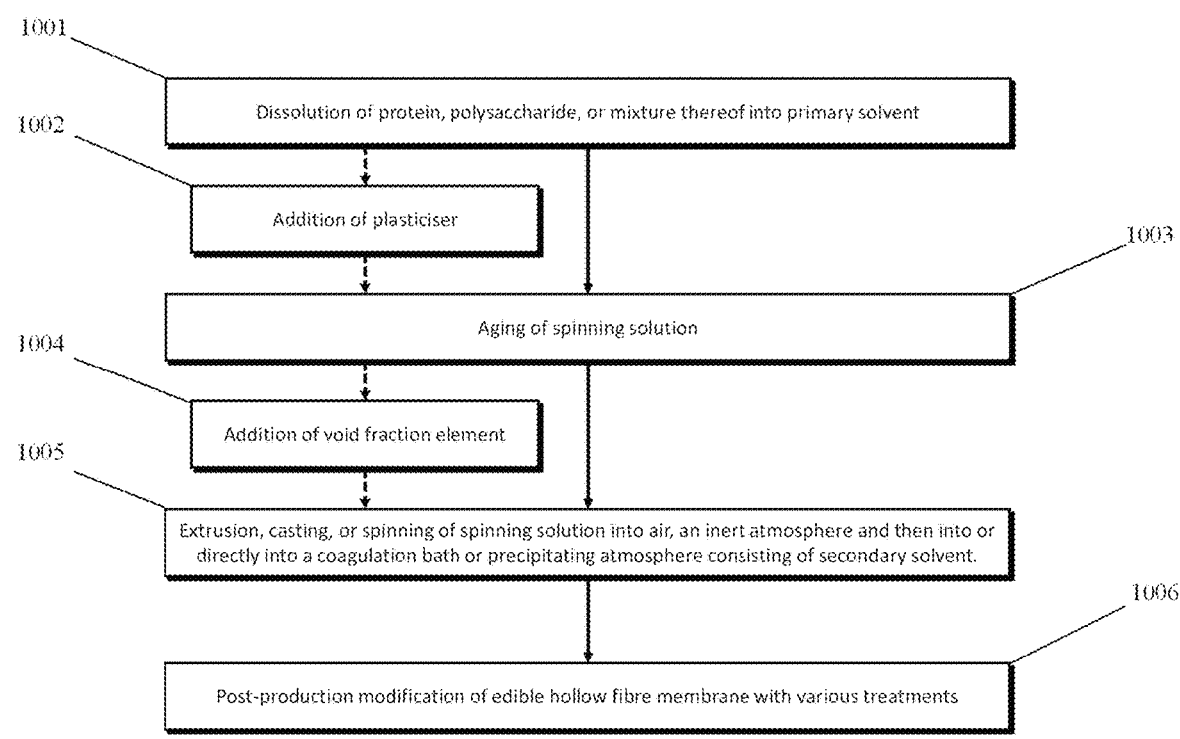
Figure 2:
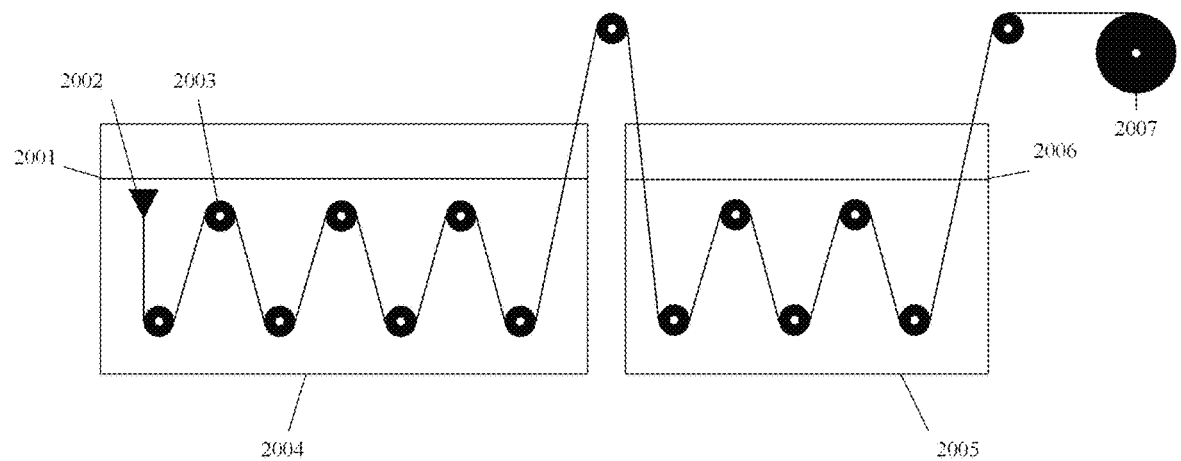
Figure 3:
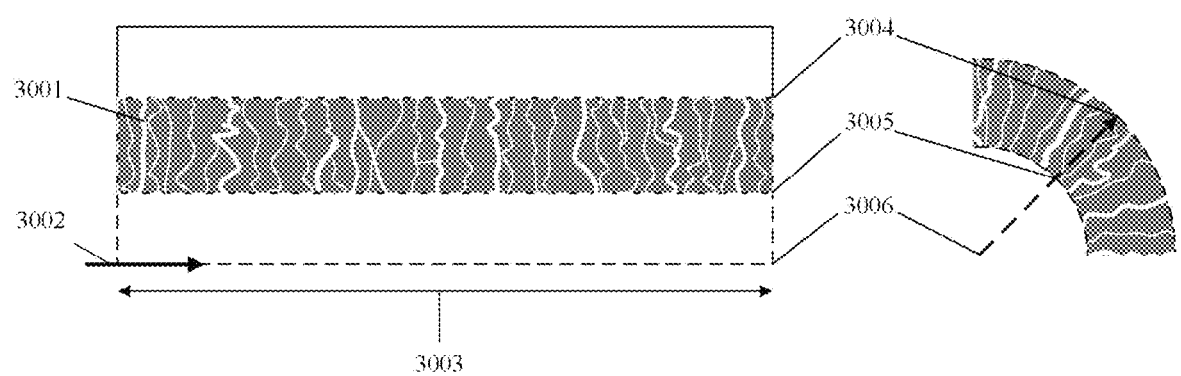
Figure 4:
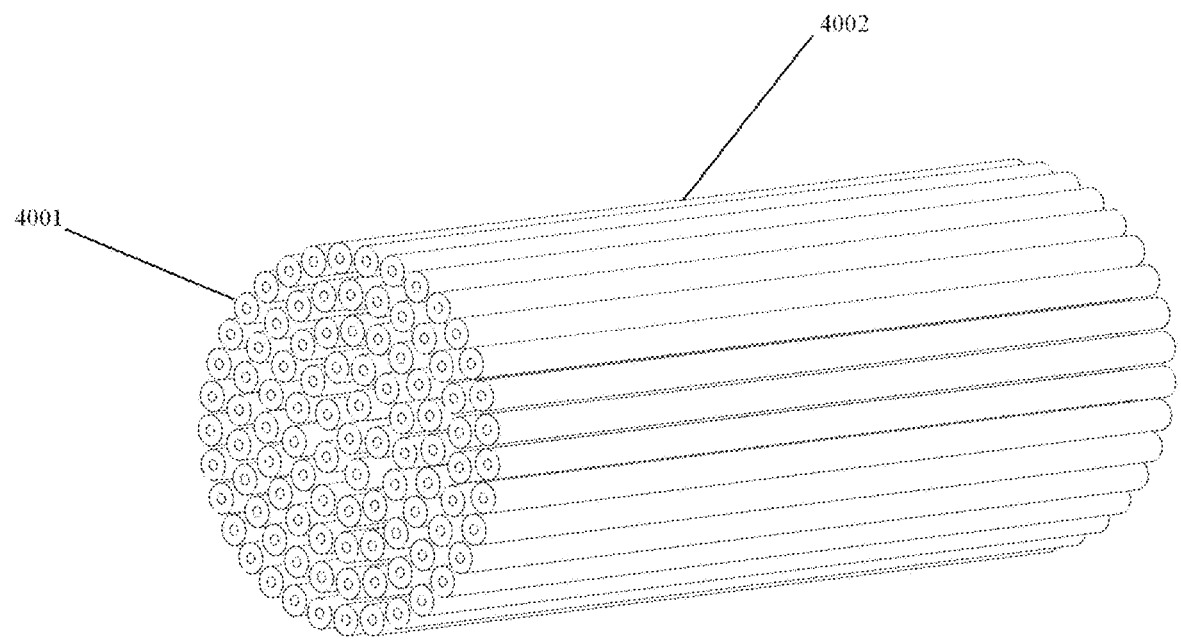
Figure 5:
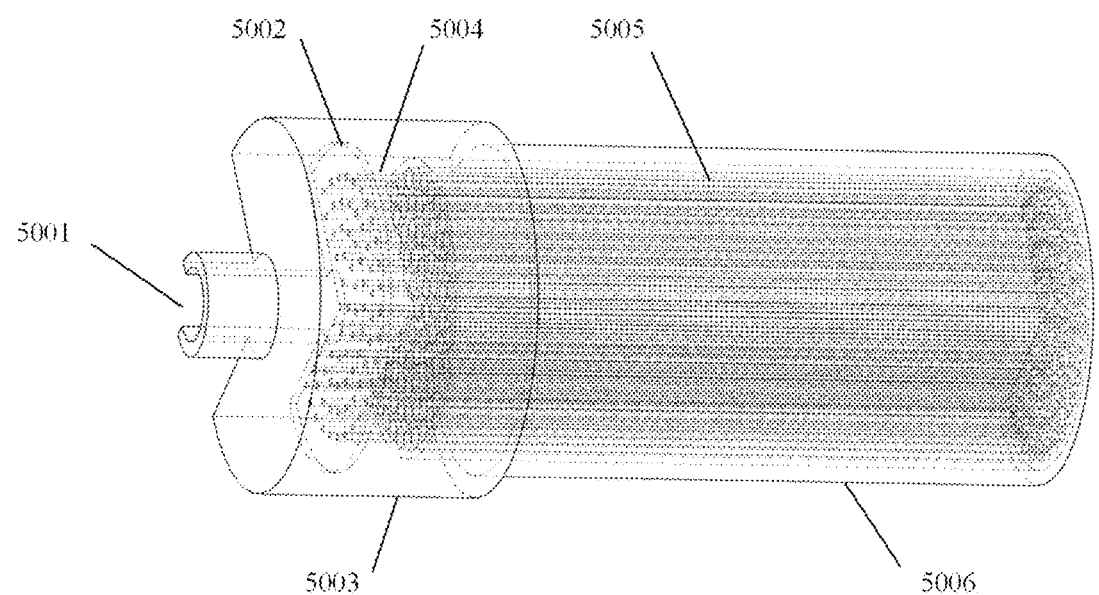
Figure 6:
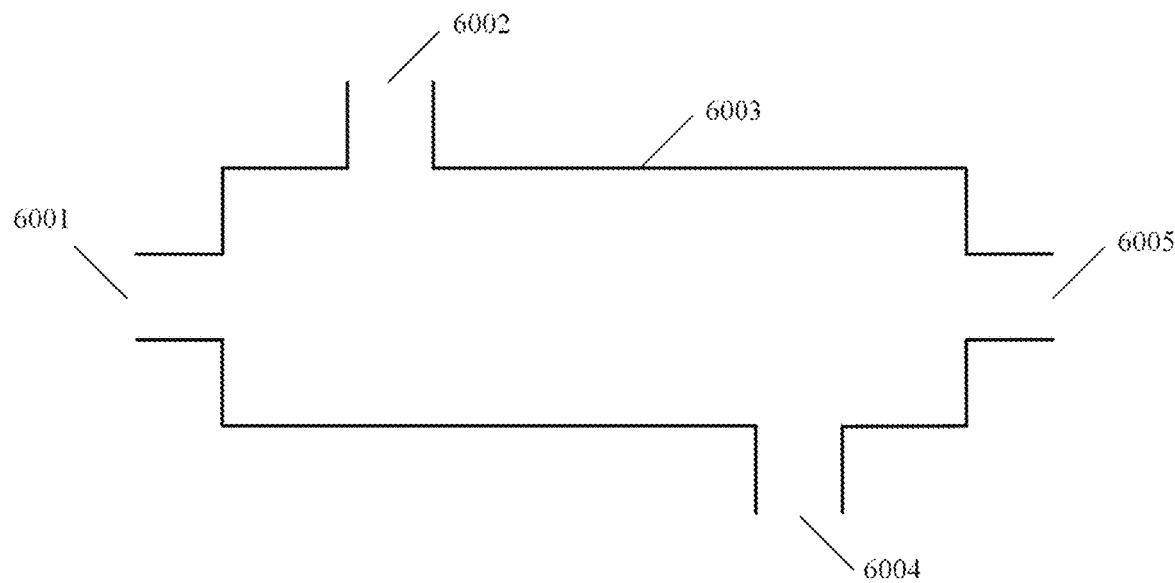
Figure 7:
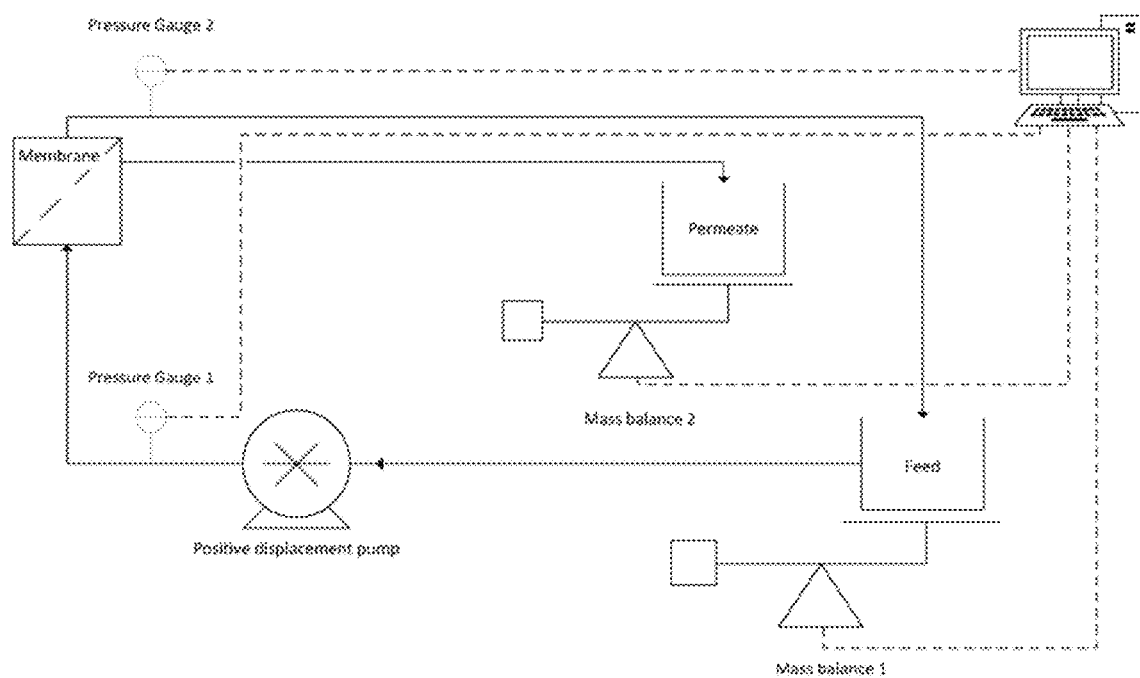
FIG. 7 is a process flow diagram of a platform which may be used to evaluate the pure water permeability of the hollow fibres of this disclosure.

FIG. 1 shows a schematic of an exemplary apparatus used in the production of covalently-crosslinked hollow fibres.

In Step (a), the first composition comprised micronized soy protein isolate (SPI).

The second composition comprised 8 mol/L urea and 1% sodium sulphite (w/w SPI), dissolved in deionized water with a pH of 9.3 at 25° C.

In a continuation of Step (a), the third composition was prepared in a 50 mL centrifuge tube by adding SPI to the second composition to a concentration to 15.25% (w/v second composition).

In Step (b), the third composition was mixed with an overhead stirrer, equipped with a helical ribbon impeller, at 1,000 rpm and room temperature for 10 minutes to produce the fourth composition. The fourth composition was subsequently degassed via centrifugation at 2,800 relative centrifugal force (rcf) for 5 minutes. The degassed solution was drawn into a syringe and recentrifuged at 913 rcf for 10 minutes to degas.

In Step (c), a coagulation bath (CB) solution comprising 1.127 mol/L trisodium citrate and 1.021 mol/L sodium hypophosphite in deionised water was prepared with a pH of 8.04 (at 25° C.). The CB was maintained at room temperature. A portion of the CB solution was drawn into a secondary syringe to form the bore solution (BS).

Each syringe was then loaded into a syringe pump and connected via tubing to a co-axial die submerged in the coagulation bath. The inner and outer diameters of the inner conduit of the co-axial die were 260 µm and 514 µm, respectively. The inner and outer diameters of the outer conduit of the co-axial die were 840 µm and 1270 µm, respectively. The fourth composition and the BS were then extruded together at a rate of 1 mL/hour and 0.605 mL/hour, respectively, through the co-axial die, directly into the coagulation bath.

In Step (d), the extruded fibres were left submerged in the CB for 30 minutes to form the covalently-crosslinked, semi-permeable, porous hollow fibres, which were subsequently collected on a rotating spool.

In Step (e.i), the covalently-crosslinked, semi-permeable, porous hollow fibres were submerged in an aqueous 96% (v/v) ethanol bath at room temperature for 1 hour.

In Step (e.ii), the treated fibres were pre-dried with a heated convection fan set at 50° C. for 3 hours, annealed at 130° C. for 2 hours in an electric convection oven, and then rehydrated in water at room temperature for 30 minutes.

In Step (f), the annealed fibres are dried in air overnight, collected on a spool, and subsequently transferred into plastic vacuum-seal bags containing bags of silica solution. The vacuum-seal bags are vacuumed, heat-sealed, and placed into storage.

2.2. Exemplary Process 2

FIG. 1 shows a schematic of an exemplary apparatus used in the production of covalently-crosslinked, semi-permeable, porous hollow fibres.

In Step (a), the first composition comprised micronized soy protein isolate (SPI).

The second composition comprised 8 mol/L urea, 0.3 mol/L sodium bicarbonate, and 0.013 mol/L N-acetyl-cysteine (NAC), dissolved in deionized water with a pH of 9.3 at 25° C.

In a continuation of Step (a), the third composition was prepared by adding SPI and canola oil to the second composition at concentrations of 21 and 70% (w/v second composition), respectively.

In Step (b) The third composition was mixed with an overhead stirrer, equipped with a helical ribbon impeller, at 400 rpm and room temperature for 10 minutes to produce the fourth composition. Canola oil was further added to the fourth composition, at a rate of 1 g/minutes under constant mixing at 400 rpm, to bring the total concentration of the emulsion up to 150% (w/v second composition). The fourth composition was mixed for a further 10 minutes.

The fourth composition was degassed via centrifugation at 2060 rcf for 10 minutes, drawn into a syringe, and recentrifuged at 1,430 rcf for 20 minutes.

In Step (c), a coagulation bath (CB) solution comprising 1.639 mol/L disodium malate in deionised water was prepared with a pH of 8.5 (at 25° C.). The CB was maintained at room temperature. A portion of the CB solution was drawn into a secondary syringe to form the bore solution (BS).

The syringes of dope solution and BS were each loaded into a syringe pump and connected via tubing to a co-axial die submerged in the coagulation bath. The inner and outer diameters of the inner conduit of the co-axial die were 260 μm and 514 μm, respectively. The inner and outer diameters of the outer conduit of the co-axial die were 1067 μm and 1473 μm, respectively. The fourth composition and the BS were then extruded together at a rate of 6 mL/hour and 0.606 mL/hour, respectively, through the co-axial die, directly into the coagulation bath.

In Step (d), the extruded fibres were left submerged in the CB for 45 minutes to form the covalently-crosslinked, semi-permeable, porous hollow fibres, which were subsequently collected on a rotating spool.

In Step (e.i), the covalently-crosslinked, semi-permeable, porous hollow fibres were submerged in aqueous 40% (v/v) ethanol bath at room temperature for 1 hour.

In Step (e.ii), the treated fibres were pre-dried with a heated convection fan at 40° C. for 2 hours, annealed at 175° C. for 1 hour in an electric convection oven, and then rehydrated in an aqueous 20% glycerol solution at room temperature for 20 minutes.

In Step (e.iii), the hydrated fibres were left submerged in 99.8% isopropanol (IPA) at room temperature for 12 hours. The IPA was subsequently removed, and the fibres hydrated in PBS solution.

In Step (f), the annealed fibres are partially dried in air, collected on a spool, and subsequently, sealed in an air-tight container.

2.3. Exemplary Process 3

FIG. 1 shows a schematic of an exemplary apparatus used in the production of covalently-crosslinked, semi-permeable, porous hollow fibres.

In Step (a), the first composition comprised micronized SPI, Mung Bean Protein Isolate (MBP) and Sodium Alginate (SA).

The second composition comprised 8 mol/L urea, 0.3 mol/L sodium bicarbonate, and 2.5% NAC (w/w SPI+MBP), dissolved in deionized water with a pH of 9.3 at 25° C.

In a continuation of Step (a), the third composition was prepared in a 50 mL centrifuge tube by adding the first composition to the second composition to bring the concentrations of SPI, MBP and SA to 9, 9 and 2% (w/v second composition), respectively.

In Step (b), the third composition was mixed with an overhead stirrer, equipped with a helical ribbon impeller, at 1,000 rpm and room temperature for 10 minutes to produce the fourth composition. The fourth composition was subsequently degassed via centrifugation at 2,060 rcf for 15 minutes.

The degassed solution was drawn into a syringe and recentrifuged at 1,430 rcf for 20 minutes to degas.

In Step (c), a coagulation bath (CB) solution comprising 1.641 mol/L disodium malate (DSM) and 1.401 mol/L sodium hypophosphite (SHP) in deionised water was prepared with a pH of 8.50 (at 25° C.). The CB was maintained at room temperature. A portion of the CB solution was drawn into a secondary syringe to form the bore solution (BS).

Each syringe was then loaded into a syringe pump and connected via tubing to a co-axial die submerged in the coagulation bath. The inner and outer diameters of the inner conduit of the co-axial die were 260 μm and 514 μm, respectively. The inner and outer diameters of the outer conduit of the co-axial die were 1067 μm and 1473 μm, respectively. The fourth composition and the BS were then extruded together at a rate of 6 mL/hour and 0.8 mL/hour, respectively, through the co-axial die, directly into the coagulation bath.

In Step (d), the extruded fibres were left submerged in the CB for 45 minutes to form the covalently-crosslinked, semi-permeable, porous hollow fibres, which were subsequently collected on a rotating spool.

In Step (e.i), the covalently-crosslinked, semi-permeable, porous hollow fibres were submerged in an aqueous 96% (v/v) ethanol bath at room temperature for 1 hour.

In Step (e.ii), the treated fibres were pre-dried with a heated convection fan set at 40° C. for 2 hours, annealed at 175° C. for 1 hour in an electric convection oven, and then rehydrated in water at room temperature for 30 minutes.

In Step (f), the hydrated fibres were submerged in sterile deionised water in a sealed container and placed into storage.

3. Preparation of SPI-Based Dope Solutions 3.1. 26% SPI with 1% NAC

In Step (a), the first composition comprised micronised SPI.

The second composition was then prepared as an aqueous solution, comprising 8 mol/L urea, 0.3 mol/L sodium bicarbonate, and 1% NAC (w/w SPI), by dissolving urea granules in deionized water at 25° C. and subsequently adding sodium bicarbonate and NAC. The pH of the resulting solution was 9.3 at 25° C.

In a continuation of Step (a), the first composition was added to the second composition at a concentration of 26% SPI (w/v) to form the third composition.

In Step (b), the third composition was incubated at room temperature for 72 hours to produce the fourth composition. The fourth composition, a pale-yellow solution with bubbles dispersed throughout, was subsequently degassed via centrifugation at 2,800 rcf for 5 minutes to produce a light-brown solution.

3.2. 26% SPI with 1% NAC, Mixed and Heated

The third composition is initially produced as per Example 3.1.

In Step (b), the third composition is transferred into a mixing vessel equipped with an overhead mechanical agitator and homogenised at 1,000 rpm and 50° C.-65° C. for 12 hours to produce the fourth composition.

The fourth composition, a pale-yellow solution with bubbles dispersed throughout, is subsequently degassed via centrifugation at 2,800 rcf for 5 minutes to produce a light-brown solution.

3.3. 26% SPI with 1% Sodium Sulphite

In Step (a), the first composition comprised micronised SPI.

The second composition was then prepared as an aqueous solution, comprising 8 mol/L urea, and 1% sodium sulphite (w/w SPI), by dissolving urea granules in deionized water at 25° C. and subsequently adding the sodium sulphite. The pH of the resulting solution was 9.3 at 25° C.

In a continuation of Step (a), the first composition was added to the second composition at a concentration of 26% SPI (w/v) to form the third composition.

In Step (b), the third composition was then incubated at room temperature for 72 hours to produce the fourth composition. The fourth composition, a pale-yellow solution with bubbles dispersed throughout, was subsequently degassed via centrifugation at 2,800 rcf for 5 minutes to produce a light-brown solution.

3.3.1. 26% SPI with 1% Sodium Sulphite, Mixed and Heated

The third composition is initially produced as per Example 3.3.

In Step (b), the third composition is transferred into a mixing vessel equipped with an overhead mechanical agitator and homogenised at 2,000 rpm and 50° C.-65° C. for 12 hours to produce the fourth composition.

The fourth composition is subsequently degassed via centrifugation at 2,800 rcf for 5.

3.3.2. 26% SPI with 1% Sodium Sulphite and 10% Sunflower Oil

The third composition was initially prepared as per Example 3.3.

In a continuation of Step (a), sunflower oil was uniformly mixed into the third composition to a concentration of 10% (v/v second composition) with in an overhead mechanical agitator at 2,000 rpm and room temperature for 5 minutes.

In Step (b), the homogenised solution was incubated at room temperature for 72 hours to form the fourth composition. The fourth composition, a pale cream-coloured solution with bubbles dispersed throughout, was then de-gassed via centrifugation at 2,800 rcf for 5 minutes to produce a yellow-white solution.

3.3.3. 26% SPI with 1% Sodium Sulphite and 7% Chitosan

In Step (a), the first composition comprises a homogenous mixture of micronised SPI and powdered chitosan.

The second composition is then prepared as an aqueous solution, comprising 8 mol/L urea, and 1% sodium sulphite (w/w SPI), by dissolving urea granules in deionized water at 25° C. and subsequently adding the sodium sulphite. The pH of the resulting solution is 9.3 at 25° C.

In a continuation of Step (a), the first composition is added to the second composition to form the third composition, which comprises 26% SPI (w/v second composition) and 7% chitosan (w/v second composition).

In Step (b), the third composition is incubated at room temperature for 72 hours to form the fourth composition. The fourth composition is subsequently de-gassed via centrifugation at 2,800 rcf for 5 minutes.

3.3.4. 26% SPI with 1% Sodium Sulphite, 10% Sunflower Oil and 7% Chitosan

The third composition is initially prepared as per Example 3.3.3.

In a continuation of Step (a), sunflower oil is uniformly mixed into the third composition to a concentration of 10% (v/v second composition) with an overhead mechanical agitator at 2000 rpm for 5 minutes.

In Step (b), the homogenised solution is incubated at room temperature for 72 hours to form the fourth composition. The fourth composition is then de-gassed via centrifugation at 2,800 rcf for 5 minutes.

3.4. 16% SPI with 1% Sodium Sulphite and 115% Canola Oil

The third composition was initially prepared as per Example 3.3.3, but with an SPI concentration of 16% (w/v second composition).

In a continuation of Step (a), canola oil was added to the third composition to a concentration of 75% (w/v second composition).

In Step (b), the third composition was mixed with an overhead stirrer, equipped with a helical ribbon impeller, at 400 rpm for 10 min, thereby producing the fourth composition. Additional canola oil was added, at a rate of 1 g/minute, under constant mixing at 400 rpm, to bring the total oil concentration of the emulsion up to 115% (w/v second composition). It was observed the emulsion becomes more viscous as the oil fraction increases. The fourth composition was then further mixed at 400 rpm for 10 minutes, and then degassed via centrifugation at 228 rcf for 10 minutes produce a cream-coloured solution.

3.5. 21% SPI with 2.5% Sodium Sulphite and 150% Canola Oil

In Step (a), the first composition comprised micronised SPI.

The second composition was then prepared as an aqueous solution, comprising 8 mol/L urea, and 2.5% sodium sulphite (w/w SPI), by dissolving urea granules in deionized water at 25° C. and subsequently adding the sodium sulphite. The pH of the resulting solution was 9.3 at 25° C.

In a continuation of Step (a), the first composition was added to the second composition at a concentration of 21% SPI (w/v) to form the third composition. Canola oil was also added to the third composition to a concentration of 70% (w/v second composition).

In Step (b), the third composition was mixed with an overhead stirrer, equipped with a helical ribbon impeller, at 400 rpm for 10 min, thereby producing the fourth composition. Additional canola oil was added, at a rate of 1 g/minute, under constant mixing at 400 rpm, to bring the total oil concentration of the emulsion up to 150% (w/v second composition). It was observed the emulsion becomes more viscous as the oil fraction increases. The fourth composition was then further mixed at 400 rpm for 10 minutes, and then degassed via centrifugation at 913 rcf for 10 minutes.

Two additional samples were prepared as just described, wherein the fourth composition was finally mixed at 1,000 and 2,000 rpm respectively. FIG. 20 (A-C) show the three samples of fourth compositions. FIG. 20 (D-F) show micrographs of the three emulsions.

3.6. 10 to 15% SPI with 2.5% Sodium Sulphite and 30% Canola Oil

The fourth composition was prepared as per Example 3.5, but with an 10% SPI (w/v second composition) and 30% canola oil (w/v second composition).

The fourth composition was degassed via centrifugation at 913 rcf for 10 minutes. Once degassed, the rheological profile of the solution was immediately measured, as seen in FIG. 12.

Figure 9:
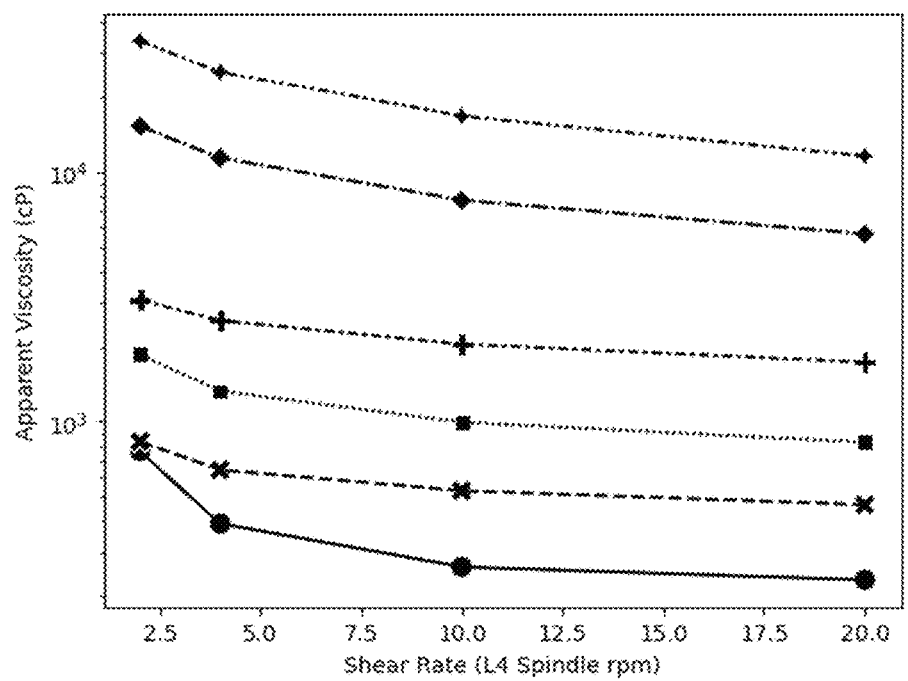
FIG. 9 shows the apparent viscosity of dope solutions comprising 10-15% SPI (w/v second composition), prepared as per Example 3.6. The symbols, circle, cross, square, plus, diamond, and star, each denote dope solutions with an SPI concentration of 10, 11, 12, 13, 14, and 15% (w/v), respectively.

Additional solutions were prepared as just described, but with SPI concentrations of 11, 12, 13, 14, and 15% (w/v second composition). The rheological profile for each may be seen in FIG. 9.

3.7. 21% SPI with 1 to 10% Sodium Sulphite and 30% Canola Oil

The fourth composition was prepared as per Example 3.5, but with 1% sodium sulphite (w/w SPI) and 30% canola oil (w/v second composition). The fourth composition was degassed via centrifugation at 913 rcf for 10 minutes. Once degassed, the rheological profile of the solution was immediately measured.

Additional solutions were prepared 21% SPI (w/v second composition) as just described, but with sodium sulphite concentrations of 2.5, 5, 7.5 and 10% (w/w SPI), as seen in FIG. 12.

3.8. 21% SPI with 1 to 10% NAC at pH 8.5 and 30% Canola Oil

In Step (a), the first composition comprised micronised SPI.

The second composition was then prepared as an aqueous solution, comprising 8 mol/L urea, 0.3 mol/L sodium bicarbonate, and 2.5% NAC (w/w SPI), by dissolving urea granules in deionized water at 25° C. and subsequently adding sodium bicarbonate and NAC. The pH of the resulting solution was 8.5 at 25° C.

In a continuation of Step (a), the first composition was added to the second composition at a concentration of 21% SPI (w/v) to form the third composition. Canola oil was also added to the third composition to a concentration of 30% (w/v second composition).

In Step (b), the third composition was mixed with an overhead stirrer, equipped with a helical ribbon impeller, at 400 rpm for 10 min, thereby producing the fourth composition. The fourth composition was then degassed via centrifugation at 913 rcf for 10 minutes. Once degassed, the rheological profile of the solution was immediately measured.

Additional solutions were prepared with 21% SPI (w/v second composition) as just described, but with NAC concentrations of 1, 5, 7.5 and 10% (w/w SPI). As seen in FIG. 12, the apparent viscosity decreased with an increase in NAC concentration. In comparison, the apparent viscosity of samples prepared with sodium sulphite, as prepared in Example 3.7, increased with an increase in sodium sulphite concentration above 2.5% (w/w SPI). At 10% (w/w SPI), the apparent viscosity of the NAC samples was lower than the samples prepared with same concentration of sodium sulphite.

3.9. 21% SPI with 2.5% NAC at pH 8.2 and 150% Canola Oil

The fourth composition was initially prepared as per Example 3.8.

A second dose of canola oil was added, at a rate of 1 g/minutes under constant mixing at 400 rpm, to bring the total concentration of the emulsion up to 150% (w/v second composition). It was observed that at the end of the mixing period that the emulsion had split.

3.10. 21% SPI with 1 to 10% NAC at pH 9.3 and 30% Canola Oil

The fourth composition comprising 21% SPI (w/v second composition), 2.5% NAC (w/w SPI) and 30% canola oil (w/v second composition) was prepared as per Example 3.8, but the second composition was initially prepared with a pH of 9.3 at 25° C. Additional solutions were prepared with NAC concentrations of 1, 5, 7.5 and 10% (w/w SPI), the viscosity profiles of which are seen in FIG. 12.

3.11. 15 to 23% SPI with 2.5% NAC at pH 9.3 and 30% Canola Oil

The fourth composition was initially prepared with 2.5% NAC (w/w SPI) as per Example 3.8, but the pH of the second composition was 9.3 at 25° C. The fourth composition was then degassed via centrifugation at 913 rcf for 10 minutes. Once degassed, the rheological profile of the solution was immediately measured, as seen in FIG. 12.

In comparison with a dope solution of the same composition, but prepared with a pH of 8.2, as per Example 3.8, the apparent viscosity was decreased and the solution exhibited a greater degree of shear-thinning.

As seen in FIG. 12, the apparent viscosity decreased with an increase in NAC concentration. In comparison, the apparent viscosity of samples prepared with sodium sulphite, as prepared in Example 3.7, increased with an increase in sodium sulphite concentration above 2.5% (w/w SPI). Above 7.5% (w/w SPI), the apparent viscosity of the NAC samples was lower than the samples prepared with same concentration of sodium sulphite.

Similar solutions were prepared as described but with differing SPI concentrations including, 15, 21, 22, and 23% (w/v second composition). The rheological profile for each may be seen in FIG. 11. Each of the protein solutions exhibited shear thinning characteristics. An increase in protein concentration was seen to confer an increase in the apparent viscosity for all shear rates measured.

3.12. 20% SPI with 2.5% NAC at pH 9.3

The third composition was initially prepared as per Example 3.10, but with 20% SPI and 2.5% NAC (w/v second composition) and without oil.

In Step (b), the third composition was mixed with an overhead stirrer, equipped with a helical ribbon impeller, at 400 rpm for 10 min, thereby producing the fourth composition. The fourth composition was then degassed via centrifugation at 2,060 rcf for 5 minutes. Once degassed, the rheological profile of the solution was immediately measured, as seen in FIG. 13.

3.13. 21% SPI with 2.5% NAC at pH 9.3

The fourth composition, comprising 21% SPI and 2.5% NAC (w/v second composition), was prepared as per Example 3.10, but without oil. The fourth composition was then degassed via centrifugation at 2,060 rcf for 15 minutes.

3.14. 21% SPI with 2.5% NAC at pH 9.3 and 150% Canola Oil

The fourth composition was initially prepared as per Example 3.11.

A second dose of canola oil was added, at a rate of 1 g/minutes under constant mixing at 400 rpm, to bring the total concentration of the emulsion up to 150% (w/v second composition). It was observed the emulsion becomes more viscous as the oil fraction increased. The fourth composition was then further mixed at 400 rpm for 10 minutes and then degassed via centrifugation at 913 rcf for 10 minutes.

To assess the stability of the emulsion, the sample was centrifuged at 3,000 rpm (2,060 rcf) for 5 minutes to promote accelerated phase separation. An emulsion was considered stable if the aqueous and organic phases did not separate during centrifugation. The solution comprised a stable emulsion.

Two additional samples were prepared as described, wherein the fourth composition was finally mixed at 1,000 and 2,000 rpm respectively.

3.14.1. Altered Mixing and Centrifugation Conditions

The third composition was initially prepared as per Example 3.10, but comprised 21% SPI and 2.5% NAC (w/v second composition). Canola oil was then added to the third composition to an initial concentration of 70% (w/v second composition).

In Step (b), the third composition was mixed with an overhead stirrer equipped with a helical ribbon impeller, at 400 rpm for 10 min, thereby producing the fourth composition. A second dose of canola oil was then added, at a rate of 1-2 g/minutes under constant mixing at 400 rpm, to bring the total oil concentration up to 150% (w/v second composition). The fourth composition was then further mixed at 1,000 rpm for 10 minutes and then degassed via centrifugation at 2,060 rcf for 15 minutes.

3.15. 21% SPI with 1% Sodium Sulphite and 270% Canola Oil

The fourth composition was initially prepared as per Example 3.11 but with 1% Sodium Sulphite (w/w SPI) and 270% canola oil (w/v second composition). The solution comprised a stable emulsion.

3.16. 15.25% SPI with 1% NAC and 1% Glycerol

The third composition is initially prepared as per Example 3.11 but with 1% NAC (w/w SPI) and without canola oil.

In a continuation of Step (a), glycerol is added to the third composition to a concentration of 1% (w/v second composition).

In Step (b), the third composition is mixed with an overhead stirrer, equipped with a helical ribbon impeller, at 400 rpm for 10 min, thereby producing the fourth composition.

3.17. 13% SPI with 1% Sodium Sulphite and 0.25-6 mol/L Urea

The fourth composition was initially prepared as per Example 2.1 but with 13% SPI (w/v second composition), 1% sodium sulphite (w/w SPI) and 0.25 mol/L urea.

Additional solutions were prepared as just described, but with 0.5, 0.75, 1, 2, 3, 4, and 6 mol/L urea. In general, the solutions became more translucent as the urea concentration increased, suggesting an increase in the fraction of polypeptides becoming solubilised. Samples prepared with 4 mol/L urea and below were seen to have an opaque straw-yellow appearance. With an increase in urea concentration the compositions were seen to slowly transition to a more translucent golden-brown appearance.

3.18. SPI and Polysaccharides 3.18.1. 21% SPI with 2.5% NAC and 3% Agar

In Step (a), the first composition comprises micronised SPI.

The second composition is then prepared as an aqueous solution, comprising 8 mol/L urea, 0.3 mol/L sodium bicarbonate, 2.5% NAC (w/w SPI) and 3% agar (w/v second composition), by initially dissolving urea granules in deionized water at 25° C. and subsequently adding sodium bicarbonate and NAC. The pH of the resulting solution is 9.3 at 25° C. Agar is then added to the solution, which is then brought to about 75° C. to ensure dissolution.

In a continuation of Step (a), the first composition is added to the second composition at a concentration of 21% SPI (w/v) to form the third composition.

In Step (b), the third composition is mixed with an overhead stirrer, equipped helical ribbon impeller, at 400 rpm for 10 min thereby producing the fourth composition. To prevent the solidification of the agar, the solution is maintained at about 50° C. during mixing.

3.18.2. 21% SPI with 2.5% NAC and 3% Agar and 150% Canola Oil

The third composition is initially produced as per Example 3.18.1. Canola oil is then added to the third composition to an initial concentration of 70% (w/v second composition).

In Step (b), the third composition is mixed with an overhead stirrer, equipped helical ribbon impeller, at 400 rpm for 10 min thereby producing the fourth composition. A second dose of canola oil is added, at a rate of 1 g/minutes under constant mixing at 400 rpm, to bring the total concentration of the emulsion up to 150% (w/v second composition). To prevent the solidification of the agar, the solution is maintained at about 50° C. during mixing. The fourth composition is then further mixed at 400 rpm for 10 minutes and then degassed via centrifugation at 913 rcf for 10 minutes. The solution comprises a stable emulsion.

3.18.3. 21% SPI with 2.5% NAC and 5% Carrageenan-Kappa

The fourth composition is produced as per Example 3.18.1 but with 5% (w/v second composition) Carrageenan-Kappa in place of agar.

3.18.4. 21% SPI with 2.5% NAC, 5% Carrageenan-Kappa and 150% Canola Oil

The fourth composition is produced as per Example 3.18.2 but with 5% (w/v second composition) Carrageenan-Kappa in place of agar.

3.18.5. 21% SPI with 2.5% NAC and 5% Carrageenan-Iota

The fourth composition is produced as per Example 3.18.2 but with 5% (w/v second composition) Carrageenan-Iota in place of agar.

3.18.6. 21% SPI with 2.5% NAC, 5% Carrageenan-Iota and 150% Canola Oil

The fourth composition is produced as per Example 3.18.2 but with 5% (w/v second composition) Carrageenan-Iota in place of agar.

3.18.7. 21% SPI with 2.5% NAC and 2% SA

In Step (a), the first composition comprises micronised SPI.

The second composition is then prepared as an aqueous solution, comprising 8 mol/L urea, 0.3 mol/L sodium bicarbonate, 2.5% NAC (w/w SPI) and 2% SA (w/v second composition), by initially dissolving urea granules in deionized water at 25° C. and subsequently adding sodium bicarbonate, SA and NAC. The pH of the resulting solution is 9.3 at 25° C.

In a continuation of Step (a), the first composition is added to the second composition at a concentration of 21% SPI (w/v) to form the third composition.

In Step (b), the third composition is mixed with an overhead stirrer, equipped helical ribbon impeller, at 400 rpm for 10 min thereby producing the fourth composition.

3.18.8. 20% SPI with 2.5% NAC and 1 to 4% Sodium Alginate

In Step (a), the first composition initially comprised a homogenous blend of micronised SPI and SA.

The second composition was then prepared as an aqueous solution, comprising 8 mol/L urea, 0.3 mol/L sodium bicarbonate and 2.5% NAC (w/w SPI), by initially dissolving urea granules in deionized water at 25° C. and subsequently adding sodium bicarbonate and NAC. The pH of the resulting solution was 9.3 at 25° C.

In a continuation of Step (a), the first composition was added to the second composition at a concentration of 20% SPI (w/v second composition) and 2% SA (w/v second composition) to form the third composition.

In Step (b), the third composition was mixed with an overhead stirrer equipped with a helical ribbon impeller, at 400 rpm for 30 min thereby producing the fourth composition. The fourth composition was then degassed via centrifugation at 2,060 rcf for 10 minutes.

Additional solutions were prepared 20% SPI (w/v second composition) as just described, but with SA concentrations of 1, and 4% (w/v second composition). The rheological profile for each may be seen in FIG. 15.

3.18.9. 16% SPI with 2.5% NAC and 2% SA

The third composition was initially prepared as per Example 3.18.8, but comprised 16% SPI (w/v second composition) and 2% SA (w/v second composition).

In Step (b), the third composition was mixed with an overhead stirrer equipped with a helical ribbon impeller, at 1,000 rpm for 30 min thereby producing the fourth composition. The fourth composition was then degassed via centrifugation at 2,060 rcf for 10 minutes.

3.18.10. 21% SPI with 2.5% NAC, 2% SA and 150% Canola Oil

The third composition is initially produced as per Example 3.18.7. Canola oil is then added to the third composition to an initial concentration of 70% (w/v second composition).

In Step (b), the third composition is mixed with an overhead stirrer, equipped helical ribbon impeller, at 400 rpm for 10 min thereby producing the fourth composition. A second dose of canola oil is added, at a rate of 1 g/minutes under constant mixing at 400 rpm, to bring the total concentration of the emulsion to 150% (w/v second composition). The fourth composition is then further mixed at 400 rpm for 10 minutes and degassed via centrifugation at 913 rcf for 10 minutes. The solution comprises a stable emulsion.

3.18.11. 18 to 20% SPI with 2.5% NAC, 1% SA and 30% Canola Oil

The third composition was initially prepared as per Example 3.18.8, but comprised 20% SPI (w/v second composition) and 1% SA (w/v second composition).

In Step (b), the third composition was mixed with an overhead stirrer equipped with a helical ribbon impeller, at 1,000 rpm for 10 min. Canola oil was then added to the third composition at a concentration of 30% (w/v second composition). The third composition was then further mixed, initially at 400 rpm for 10 min, and then at 1,000 rpm for 10 min, thereby producing the fourth composition. The fourth composition was then degassed via centrifugation at 2,060 rcf for 10 minutes. The solution formed a stable emulsion.

An additional solution was also prepared with 18% SPI (w/v second composition) as just described. The rheological profile for each solution may be seen in FIG. 19.

3.18.12. 16 to 18% SPI with 2.5% NAC, 2% SA and 30% Canola Oil

The fourth composition was produced as per Example 3.18.11, but comprised 18% SPI (w/v second composition) and 2% SA. An additional solution was also prepared with 16% SPI (w/v second composition) as just described. The rheological profile for both solutions may be seen in FIG. 19.

3.18.13. 16 SPI with 2.5% NAC, 2% SA and 150% Canola Oil

The fourth composition was initially prepared as per Example 3.18.9, but was mixed at 1,000 rpm for 10 minutes and then degassed via centrifugation at 2,060 rcf for 5 minutes.

In a continuation of Step (b), a canola oil was added at a rate of 1 g/min, under constant mixing with an overhead stirrer equipped, with a helical ribbon impeller, at 1,000 rpm to bring the total oil concentration up to 150% (w/v second composition). The fourth composition was then further mixed at 1,000 rpm for 10 minutes and then degassed via centrifugation at 2,060 rcf for 15 minutes. The solution comprised a stable emulsion.

3.18.14. 10 to 14% SPI with 2.5% NAC, 2% SA and 150% Canola Oil

The third composition was initially produced as per Example 3.18.8, but comprised 10% SPI (w/v second composition) and 2% SA.

In Step (b), the third composition was mixed with an overhead stirrer equipped with a helical ribbon impeller, at 1,000 rpm for 10 min. Canola oil was then added to the third composition at a rate of 1 g/min, under constant mixing with an overhead stirrer equipped, with a helical ribbon impeller, at 400 rpm to bring the total oil concentration up to 150% (w/v second composition). The third composition was then further mixed at 1,000 rpm for 10 minutes, thereby producing the fourth composition. The fourth composition was then degassed via centrifugation at 2,060 rcf for 10 minutes. The solution formed a stable emulsion.

Additional solutions comprising 12% and 14% SPI (w/v second composition) were also prepared as just described.

3.18.15. 12 to 24% SPI with 2.5% NAC and 5% Sodium Carrageenan

The fourth composition is produced as per Example 3.18.9 but with 5% (w/v second composition) Sodium Carrageenan in place of SA.

Additional samples are produced as just described, comprising 12, 14, 16, 18, 20 and 24% SPI (w/v second composition).

3.18.16. 12 to 24% SPI with 2.5% NAC, 5% Sodium Carrageenan and 150% Canola Oil

The fourth composition is produced as per Example 3.18.10 but with 5% (w/v second composition) Sodium Carrageenan in place of SA.

Additional samples are produced as just described, comprising 12, 14, 16, 18, 20 and 24% SPI (w/v second composition).

4. Preparation of Alternative Protein-Based Dope Solutions 4.1. Chickpea Protein In Step (a), the first composition comprised micronised chickpea protein (CPP).

The second composition was then prepared as an aqueous solution, comprising 8 mol/L urea, 0.3 mol/L sodium bicarbonate, and 2.5% NAC (w/w CPP), by dissolving urea granules in deionized water at 25° C. and subsequently adding sodium bicarbonate and NAC. The pH of the resulting solution was 9.3 at 25° C.

In a continuation of Step (a), the first composition was added to the second composition at a concentration of 12% CPP (w/v second composition) to form the third composition. Canola oil was also added to the third composition to a concentration of 30% (w/v second composition).

In Step (b), the third composition was mixed with an overhead stirrer, equipped with a helical ribbon impeller, at 400 rpm for 10 min, thereby producing the fourth composition.

To assess the stability of the emulsion, the sample was centrifuged at 3,000 rpm (2,060 rcf) for 5 minutes to promote accelerated phase separation. An emulsion was considered stable if the aqueous and organic phases did not separate.

Additional samples of the third composition were prepared with CPP concentrations that ranged between 12% and 24% (w/v second composition). It was seen that the samples became more viscous with an increase in CPP concentration. All samples with a CPP concentration of 19% (w/v second composition) or higher were able to form stable emulsions, whereas phase separation was observed in all samples with a CPP concentration of 18% or lower (w/v second composition).

Figure 10:
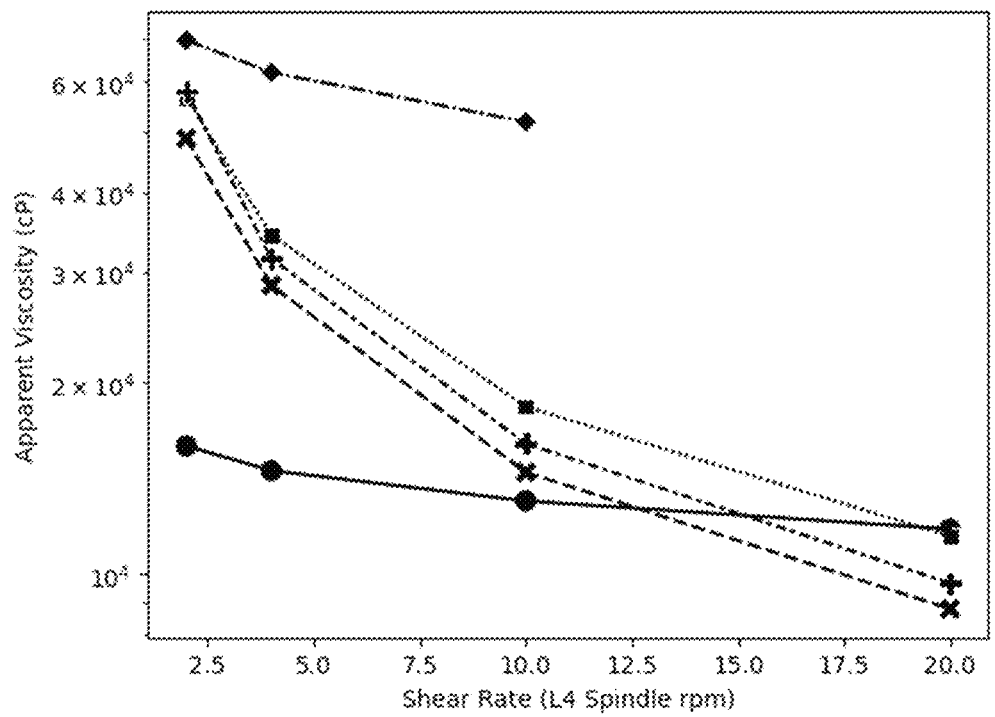
FIG. 10 shows the apparent viscosity of dope solutions comprising various protein sources, including soy (circle), chickpea (cross), pea (square), sunflower seed (plus), and mung bean (diamond); prepared as per Examples 3.11, 4.1, 4.2, 4.5 and 4.6, respectively.

FIG. 21(A) shows an emulsified dope solution comprised of 19% CPP (w/v second composition and 30% oil (w/v second composition). Viscosity measurements of the same sample, taken with a Fungilab Premium rotary viscometer, are shown in FIG. 10.

The emulsion remained stable when the oil concentration of the 19% (w/v second composition) CPP sample was increased to 150% (w/v second composition), as shown in FIG. 21(B).

The viscosity measurements of the 21, and 24% CPP (w/v second composition) solutions are seen in FIG. 17.

4.1.1. 21% CPP with 2.5% NAC and 150% Canola Oil

The third composition was initially produced as per Example 4.1, but comprised 21% CPP (w/v second composition). Canola oil was then added to the third composition to an initial concentration of 70% (w/v second composition).

In Step (b), the third composition was mixed with an overhead stirrer equipped with a helical ribbon impeller, at 400 rpm for 10 min, thereby producing the fourth composition. A second dose of canola oil was then added, at a rate of 1-2 g/minutes under constant mixing at 400 rpm, to bring the total oil concentration up to 150% (w/v second composition). The fourth composition was then further mixed at 1,000 rpm for 10 minutes and then degassed via centrifugation at 2,060 rcf for 15 minutes.

4.1.2. 20% CPP with 2.5% NAC at pH 9.3

The third composition was initially produced as per Example 4.1, but comprised 20% CPP (w/v second composition) without oil.

In Step (b), the third composition was mixed with an overhead stirrer, equipped with a helical ribbon impeller, at 400 rpm for 10 min, thereby producing the fourth composition. The fourth composition was then degassed via centrifugation at 2,060 rcf for 5 minutes. Once degassed, the rheological profile of the solution was immediately measured, as seen in FIG. 13.

4.1.3. 16% CPP with 2.5% NAC

The fourth composition was produced as per Example 4.1.2, but comprised 16% CPP (w/v second composition). Once degassed, the rheological profile of the solution was immediately measured, as seen in FIG. 13.

4.1.4. 20% CPP with 2.5% NAC at pH 11.0

The fourth composition was produced as per Example 4.1.2, but the second composition was initially prepared with a pH of 11.0 at 25° C.

4.2. Pea Protein

Example 4.1 was repeated with Pea Protein (PP) with similar results. All samples with a PP concentration of 19% (w/v second composition) or higher were able to form stable emulsions. In contrast, samples with a PP concentration of 18% (w/v second composition) or lower exhibited phase separation upon centrifugation.

FIG. 21(C) shows an emulsified dope solution comprised of 19% PP (w/v second composition) and 30% oil (w/v second composition). Viscosity measurements of the same sample, taken with a Fungilab Premium rotary viscometer, are shown in FIG. 10.

The emulsion remained stable when the oil concentration of the 19% PP (w/v second composition) sample was increased to 150% (w/v second composition), as shown in FIG. 21(D).

The viscosity measurement of the 21% PP (w/v second composition) solution is seen in FIG. 18.

4.2.1. 21% PP with 2.5% NAC and 150% Canola Oil

The fourth composition was produced as per Example 4.1.1, but comprised 21% PP (w/v second composition) instead of CPP.

4.2.2. 20% PP with 2.5% NAC

The fourth composition was produced as per Example 4.1.2, but comprised 20% PP (w/v second composition) instead of CPP. Once degassed, the rheological profile of the solution was immediately measured, as seen in FIG. 13.

4.3. Pumpkin Seed Protein

Example 4.1 was repeated with Pumpkin Seed Protein (PSP). However, stable emulsions could not be obtained with any PSP concentration (12%-24%, w/v second composition) tested. FIG. 21(E) shows a sample of dope solution comprising 24% PSP (w/v second composition), wherein the emulsion had split into an upper organic phase and lower aqueous phase.

4.3.1. 20% PSP with 2.5% NAC

The fourth composition was produced as per Example 4.1.2, but comprised 20% PSP (w/v second composition) instead of CPP. Upon centrifugation (at 2,060 rcf for 5 minutes), the solution separated into multiple layers.

4.4. Rice Protein

Example 4.1 was repeated with Rice Protein (RP). However, even in the absence of canola oil, RP was not solubilised in the second composition, at any RP concentration (12%-24%, w/v second composition) under the conditions evaluated. FIG. 21(F) shows a sample of dope solution comprising 19% RP (w/v second composition) without canola oil, following centrifugation at 2,060 rcf for 5 minutes.

4.5. Sunflower Seed Protein

Example 4.1 was repeated with Sunflower Seed Protein (SFSP). All samples with a SFSP concentration, of 19% (w/v second composition) or higher were able to form stable emulsions. In contrast, samples with a SFSP concentration of 18% or lower (w/v second composition) exhibited phase separation upon centrifugation.

FIG. 21(G) shows an emulsified dope solution comprised of 19% SFSP (w/v second composition) and 30% oil (w/v second composition). Viscosity measurements of the same sample, taken with a Fungilab Premium rotary viscometer, are shown in FIG. 10.

The emulsion remained stable when the oil concentration of the 19% SFSP (w/v second composition) sample was increased to 150% (w/v second composition), as shown in FIG. 21(H).

The viscosity measurements of the 21, and 24% SFSP (w/v second composition) solutions are seen in FIG. 17.

4.5.1. 21% SFSP with 2.5% NAC and 150% Canola Oil

The fourth composition was produced as per Example 4.1.1, but comprised 21% SFSP (w/v second composition) instead of CPP.

4.5.2. 20% SFSP with 2.5% NAC

The fourth composition was produced as per Example 4.1.2, but comprised 20% SFSP (w/v second composition) instead of CPP. Once degassed, the rheological profile of the solution was immediately measured, as seen in FIG. 13.

4.6. Mung Bean Protein

Example 4.1 was repeated with Mung Bean Protein (MBP). Stable emulsions were formed in samples with an MBP concentration of 15% (w/v second composition) or higher. This protein concentration threshold is lower than with samples prepared with other protein types, such as chickpea, pea and sunflower seed proteins, as per Examples 4.1, 4.2 and 4.5.

FIG. 21(I) shows an emulsified dope solution comprised of 15% MBP (w/v second composition) and 30% oil (w/v second composition). Viscosity measurements of the same sample, taken with a Fungilab Premium rotary viscometer, are shown in FIG. 10.

The emulsion remained stable when the oil concentration of the 15% MBP sample was increased to 150% (w/v second composition), as shown in FIG. 21(J).

The viscosity measurement for the 16% MBP (w/v second composition) solution is seen in FIG. 17.

4.6.1. 15% MBP with 2.5% NAC and 150% Canola Oil

The fourth composition was produced as per Example 4.1.1, but comprised 15% MBP (w/v second composition) instead of CPP.

4.6.2. 14 to 16% MBP with 2.5% NAC

The fourth composition was produced as per Example 4.1.2, but comprised 14% MBP (w/v second composition) instead of CPP. Additional solutions were also prepared with 15 and 16% MBP (w/v second composition). Once degassed, the rheological profile of the solutions were immediately measured, as seen in FIG. 13.

4.7. Whey Protein

Example 4.1 was repeated with Whey Protein (WP). However, as with Pumpkin Seed Protein (see Example 4.3), stable emulsions could not be obtained with any WP concentration (12%-30%, w/v second composition) evaluated. FIG. 21(K) shows a sample of dope solution comprising 30% WP (w/v second composition), wherein the emulsion had split into an upper organic phase and lower aqueous phase.

While PSP, RP and WP were found to not form stabile emulsions, it is conceived that concentrations outside of the ranges evaluated may be used to form a stable emulsion. Furthermore, combinations of proteins from multiple sources may be used. Similarly, additional components such as salts and/or surfactants may be used to enable the formation of stable emulsions.

4.7.1. 24% WP with 2.5% NAC and 2% SA

Example 3.18.7 is repeated with 24% WP (w/v second composition) in place of SPI.

4.8. Beef Protein

Example 4.1 is repeated with 12 to 21% Beef Protein Isolate (BPI) (w/v second composition) instead of chickpea protein.

4.8.1. 12 to 48% BPI with 2.5% NAC and 150% Canola Oil

Example 4.1 was repeated with 12 to 48% Beef Protein Isolate (BPI) (w/v second composition). However, as with PSP (see Example 4.3), stable emulsions could not be obtained with any BPI concentration evaluated.

While a stable emulsion was not obtained within the range of BPI concentrations evaluated, it is conceived that stable emulsions could potentially be obtained with concentrations above 48% (w/v second composition), when BPI is present together with one or more additional proteins (e.g., SPI), and/or when additional components such as salts and/or surfactants are used.

4.8.2. 20% BPI with 2.5% NAC

The fourth composition was produced as per Example 4.1.2, but comprised 20% BPI (w/v second composition) instead of CPP. Once degassed, the rheological profile of the solution was immediately measured, as seen in FIG. 13.

4.8.3. 24% WP with 2.5% NAC and 2% SA

Example 3.18.7 is repeated with 24% BPI (w/v second composition) in place of SPI.

4.9. Faba Bean Protein

Example 4.1 was repeated with Faba Bean Protein (FBP). All samples with a FBP concentration, of 20% (w/v second composition) or higher were able to form stable emulsions. In contrast, samples with a FBP concentration of 19% or lower (w/v second composition) exhibited some degree of phase separation upon centrifugation.

The viscosity measurements of the 19, 20, 21, and 24% FBP (w/v second composition) solutions are seen in FIG. 17. The emulsion remained stable when the oil concentration of the 21% FBP (w/v second composition) sample was increased to 150% (w/v second composition).

4.9.1. 21% FBP with 2.5% NAC and 150% Canola Oil

The fourth composition was produced as per Example 4.1.1, but comprised 21% FBP (w/v second composition) instead of CPP.

4.9.2. 20 and 21% FBP with 2.5% NAC

The fourth composition was produced as per Example 4.1.2, but comprised 20% FBP (w/v second composition) instead of CPP. Once degassed, the rheological profile of the solution was immediately measured, as seen in FIG. 13.

An additional sample comprising 21% FBP (w/v second composition) was produced as just described.

4.10. Hemp Seed Protein

Example 4.1 was repeated with 12% Hemp Seed Protein (HSP) (w/v second composition).

5. Preparation of Blended Protein-Based Dope Solutions 5.1. Soy Protein Isolate and Chickpea Protein In Step (a), the first composition comprises an equal blend of micronised SPI and CPP.

The second composition is then prepared as an aqueous solution, comprising 8 mol/L urea, 0.3 mol/L sodium bicarbonate, and 2.5% NAC (w/w first composition). The pH of the resulting solution is 9.3 at 25° C.

In a continuation of Step (a), the first composition is added to the second composition at a concentration of 12% (w/v second composition) to form the third composition. Canola oil is also added to the third composition to a concentration of 30% (w/v second composition).

In Step (b), the third composition is mixed with an overhead stirrer, equipped with a helical ribbon impeller, at 400 rpm for 10 min, thereby producing the fourth composition.

5.1.1. 10 to 20% SPI and 4 to 10% CPP with 2.5% NAC and 30% Canola Oil

The fourth composition was produced as per Example 5.1, but comprised 20% SPI and 0% CPP (w/v second composition). The fourth composition was then degassed via centrifugation at 2,060 rcf for 5 minutes.

Additional solutions were prepared as just described, with 16% SPI and 4% CPP (w/v second composition), 12% SPI and 8% CPP (w/v second composition), and 10% SPI and 10% CPP (w/v second composition). Once degassed, the rheological profile of each of these additional solutions were immediately measured, as seen in FIG. 19.

5.2. Pea Protein and Sunflower Seed Protein

Example 5.1 is repeated, but with a blend of micronised 70% PP and 30% SFSP (w/w first composition).

5.2.1. 10.5 to 18% PP and 3 to 10.5% SFSP with 2.5% NAC and 30% Canola Oil

The fourth composition was produced as per Example 5.2, but comprised 18% PP and 3% SFSP (w/v second composition). The fourth composition was then degassed via centrifugation at 2,060 rcf for 5 minutes.

Additional solutions were prepared as just described, with 15% PP and 6% SFSP (w/v second composition), 12% PP and 9% SFSP (w/v second composition), 10.5% PP and 10.5% SFSP (w/v second composition). Once degassed, the rheological profile of each solution was immediately measured, as seen in FIG. 18.

5.2.2. 10.5% PP and 10.5% SFSP with 2.5% NAC and 150% Canola Oil

The third composition was initially produced as per Example 5.2, but comprised 10.5% PP and 10.5% SFSP (w/v second composition). Canola oil was then added to the third composition to an initial concentration of 70% (w/v second composition).

In Step (b), the third composition was mixed with an overhead stirrer equipped with a helical ribbon impeller, at 400 rpm for 10 min, thereby producing the fourth composition. A second dose of canola oil was then added, at a rate of 1-2 g/minutes under constant mixing at 400 rpm, to bring the total oil concentration up to 150% (w/v second composition). The fourth composition was then further mixed at 1,000 rpm for 10 minutes and then degassed via centrifugation at 2,060 rcf for 15 minutes.

5.3. Mung Bean Protein and Beef Protein

Example 5.1 is repeated, but with a blend of micronised 60% MBP and 40% Beef Protein Isolate (BPI) (w/w first composition).

5.4. Soy Protein Isolate and Mung Bean Protein

Example 5.1 is repeated, but with an equal blend of micronised SPI and MBP (w/w first composition).

5.4.1. 3.5 to 17.5% SPI and 2.5 to 12.5% MBP with 2.5% NAC and 30% Canola Oil

The fourth composition was produced as per Example 5.4, but comprised 17.5% SPI and 2.5% MBP (w/v second composition). The fourth composition was then degassed via centrifugation at 2,060 rcf for 5 minutes.

Additional solutions were prepared as just described, with 14% SPI and 5% MBP (w/v second composition), 10.5% SPI and 7.5% MBP (w/v second composition), 7% SPI and 10% MBP (w/v second composition), and 3.5% SPI and 12.5% MBP (w/v second composition). Once degassed, the rheological profile of each of these additional solutions were immediately measured, as seen in FIG. 18.

5.4.2. 8 to 10% SPI and 8 to 10% MBP with 2.5% NAC

The third composition was initially produced as per Example 5.4, but comprised 8% SPI and 8% MBP (w/v second composition).

In Step (b), the third composition was mixed with an overhead stirrer equipped with a helical ribbon impeller, at 400 rpm for 10 min, thereby producing the fourth composition. The fourth composition was then degassed via centrifugation at 2,060 rcf for 15 minutes. The rheological profile this solution was solution was then immediately measured, as seen in FIG. 18.

Additional solutions were also prepared as just described, but comprised 9% SPI and 9% MBP (w/v second composition), and 10% SPI and 10% MBP (w/v second composition), respectively.

5.4.3. 9% SPI and 9% MBP with 2.5% NAC and 150% Canola Oil

The third composition was initially produced as per Example 5.4, but comprised 9% SPI and 9% MBP (w/v second composition). Canola oil was then added to the third composition to an initial concentration of 70% (w/v second composition).

In Step (b), the third composition was mixed with an overhead stirrer equipped with a helical ribbon impeller, at 400 rpm for 10 min, thereby producing the fourth composition. A second dose of canola oil was then added, at a rate of 1-2 g/minutes under constant mixing at 400 rpm, to bring the total oil concentration up to 150% (w/v second composition). The fourth composition was then further mixed at 1,000 rpm for 10 minutes and then degassed via centrifugation at 2,060 rcf for 15 minutes.

5.4.4. 9% SPI and 9% MBP with 2.5% NAC and 2% SA

In Step (a), the first composition initially comprised a homogenous blend of micronised SPI, MBP and SA.

The second composition was then prepared as per Example 5.1.

In a continuation of Step (a), the first composition was added to the second composition at a concentration of 9% SPI, 9% MBP and 2% SA (w/v second composition), to form the third composition.

In Step (b), the third composition was mixed with an overhead stirrer equipped with a helical ribbon impeller, at 1,000 rpm for 10 min, thereby producing the fourth composition. The fourth composition was then degassed via centrifugation at 2,060 rcf for 10 minutes.

5.4.5. 8 to 9% SPI and 8 to 9% MBP with 2.5% NAC, 2% SA and 150% Canola Oil

The third composition was initially produced as per Example 5.4.4, and comprised 9% SPI, 9% MBP and 2% SA (w/v second composition). The sample was then finalised as per Example 5.4.3, and now additionally comprised 150% (w/v second composition).

An additional sample was also prepared as just described but comprised 8% SPI and 8% MBP.

5.5. Soy Protein Isolate and Faba Bean Protein 5.5.1. 10.5% SPI and 10.5% FBP with 2.5% NAC and 30% Canola Oil The fourth composition was produced as per Example 5.1, but comprised 10.5% SPI and 10.5% FBP (w/v second composition). The fourth composition was then degassed via centrifugation at 2,060 rcf for 5 minutes. Once degassed, the rheological profile of each of these additional solutions were immediately measured, as seen in FIG. 18.

5.5.2. 10.5% SPI and 10.5% FBP with 2.5% NAC

The fourth composition was produced as per Example 5.4.2, but comprised 10.5% SPI and 10.5% FBP (w/v second composition). The fourth composition was then degassed via centrifugation at 2,060 rcf for 15 minutes.

5.5.3. 8% SPI and 8% FBP with 2.5% NAC and 2% SA

The fourth composition was produced as per Example 5.4.4, but comprised 8% SPI, 8% FBP and 2% SA (w/v second composition). The fourth composition was then degassed via centrifugation at 2,060 rcf for 15 minutes.

5.5.4. 8% SPI and 8% FBP with 2.5% NAC and 2% SA and 150% Canola Oil

The fourth composition was produced as per Example 5.4.5, but comprised 8% SPI, 8% FBP, 2% SA and 150% Canola Oil (w/v second composition). The fourth composition was then degassed via centrifugation at 2,060 rcf for 15 minutes.

5.6. Sunflower Seed Protein and Mung Bean Protein 5.6.1. 8 to 9% SFSP and 8 to 9% FBP with 2.5% NAC and 30% Canola Oil The fourth composition was produced as per Example 5.1, but comprised 8% SFSP and 8% FBP (w/v second composition). The fourth composition was then degassed via centrifugation at 2,060 rcf for 5 minutes.

An additional solution was also prepared as just described but comprised 9% SFSP and 9% MBP (w/v second composition). Once degassed, the rheological profile of each of these solutions were immediately measured, as seen in FIG. 18.

5.6.2. 9% SFSP and 9% FBP with 2.5% NAC

The fourth composition was produced as per Example 5.4.2, but comprised 10.5% SFSP and 10.5% FBP (w/v second composition). The fourth composition was then degassed via centrifugation at 2,060 rcf for 15 minutes. Once degassed, the rheological profile of this solution was immediately measured, as seen in FIG. 14.

5.6.3. 8% SFSP and 8% FBP with 2.5% NAC and 150% Canola Oil

The fourth composition was produced as per Example 5.4.3, but comprised 10.5% SFSP and 10.5% FBP (w/v second composition). The fourth composition was then degassed via centrifugation at 2,060 rcf for 15 minutes.

5.7. Soy Protein Isolate and Beef Protein Isolate

The fourth composition was produced as per Example 5.1, but comprised 21% SPI and 20% BPI (w/v second composition). The fourth composition was then centrifuged at 2,060 rcf for 25 minutes.

6. Dope Solution Additives

The following examples describe the addition of components to dope solutions comprising 26% SPI (w/v second composition) and 1% sodium sulphite (w/w first composition).

6.1. Addition of 10% Sunflower Oil

The fourth composition was initially prepared as per Example 3.3.

In a continuation of Step (b), sunflower oil was uniformly mixed into the fourth composition to a concentration of 10% (w/v second composition) with an overhead mixer at 2,000 rpm and room temperature for 60 seconds. The fourth composition was then de-gassed via centrifugation at 2,800 rcf for 5 minutes to produce a pale white solution.

6.2. Addition of 15% $CaCO_3$

The fourth composition, additionally comprising 10% sunflower oil (w/w fourth composition), was initially prepared as per Example 6.1.

In a continuation of Step (b), powdered calcium carbonate ($CaCO_3$) was mixed into the fourth composition to a concentration of 15% (w/w fourth composition) with an overhead mixer at 2,000 rpm for 3 minutes. The fourth composition was then de-gassed via centrifugation at 514 rcf for 5 minutes to produce a composition that has an opaque white appearance.

6.3. Addition of Air

The fourth composition, additionally comprising 10% sunflower oil (w/w fourth composition) and 15% $CaCO_3$ (w/w fourth composition), was initially prepared as per Example 6.2.

Air bubbles were reintroduced into fourth composition via mixing with an overhead mixer at 2,000 rpm for 5 minutes. The resulting composition was an opaque white solution.

6.4. Addition of Chitosan

The fourth composition, additionally comprising 10% sunflower oil (w/w fourth composition) and 15% $CaCO_3$ (w/w fourth composition), is initially prepared as per Example 6.2.

Separately, chitosan is dissolved in an aqueous solution of acetic acid (2%, v/v) to a concentration of 5% (w/v).

In a continuation of Step (b), the chitosan solution is mixed into the fourth composition to a concentration of 10% (w/w fourth composition), with an overhead mixer at 2,000 rpm for 10 minutes. The fourth composition is then degassed via centrifugation at 2,800 rcf for 5 minutes to produce an opaque white solution.

7. Fibre Production 7.1. 26% SPI with 1% NAC, Crosslinked with Trisodium Citrate and Sodium Hypophosphite The fourth composition was initially prepared as per Example 3.1, drawn into a syringe and centrifuged at 913 rcf for 10 minutes to degas.

In Step (c), a coagulation bath (CB) solution comprising 1.3 mol/L trisodium citrate and 0.88 mol/L sodium hypophosphite in deionised water was prepared with a pH of 8.04 (at 25° C.). The CB was maintained at 50° C. A portion of the CB solution was drawn into a secondary syringe (5 mL) to form the bore solution (BS).

Each syringe was then loaded into a syringe pump and connected via tubing to a co-axial die submerged in the coagulation bath. The inner and outer diameters of the inner conduit of the co-axial die were 260 µm and 514 µm, respectively. The inner and outer diameters of the outer conduit of the co-axial die were 840 µm and 1270 µm, respectively. The fourth composition and the BS were then extruded together at a rate of 1 mL/hour through the co-axial die, directly into the coagulation bath.

In Step (d), the extruded fibres were left submerged in the CB for 30 minutes to form the covalently-crosslinked, semi-permeable, porous hollow fibres, which were subsequently collected on a rotating spool.

7.2. 26% SPI with 1% Sodium Sulphite, Crosslinked with Trisodium Citrate and Sodium Hypophosphite The fourth composition was initially prepared as per Example 3.3, drawn into a syringe and centrifuged at 913 rcf for 10 minutes to degas.

In Step (c), a coagulation bath (CB) solution comprising 1.127 mol/L trisodium citrate and 1.021 mol/L sodium hypophosphite in deionised water was prepared with a pH of 8.04 (at 25° C.). The CB was maintained at room temperature. A portion of the CB solution was drawn into a secondary syringe to form the bore solution (BS).

Each syringe was then loaded into a syringe pump and connected via tubing to a co-axial die submerged in the coagulation bath. The inner and outer diameters of the inner conduit of the co-axial die were 260 µm and 514 µm, respectively. The inner and outer diameters of the outer conduit of the co-axial die were 838 µm and 1270 µm, respectively. The fourth composition and the BS were then extruded together at a rate of 1 mL/hour and 0.605 mL/hour, respectively, through the co-axial die, directly into the coagulation bath.

In Step (d), the extruded fibres were left submerged in the CB for 30 minutes to form the covalently-crosslinked, semi-permeable, porous hollow fibres, which were subsequently collected on a rotating spool.

7.2.1. Incubated at High Temperature with Mixing

Example 7.2.1 employs the same process as Example 7.2, but the fourth composition is initially prepared with additional heating and mixing as per Example 3.3.1.

7.2.2. Crosslinked with Trisodium Citrate

Example 7.2.2 employed the same process as Example 7.2, but the coagulation bath solution is prepared without sodium hypophosphite.

7.2.3. Crosslinked with Sodium Succinate and Sodium Hypophosphite

Example 7.2.3 employs the same process as Example 7.2, but the coagulation bath solution is prepared with 2.11 mol/L sodium succinate in place of the 1.127 mol/L trisodium citrate. Further, the pH of the coagulation bath is 8.26 (at 25° C.).

7.3. 26% SPI with 1% Sodium Sulphite and Additives, Crosslinked with Trisodium Citrate and Sodium Hypophosphite The following examples describe the production hollow fibres from dope solutions comprising 26% SPI (w/v second composition) with 1% sodium sulphite (w/w SPI) and additional components. In all cases, coagulation bath comprised 1.127 mol/L trisodium citrate and 1.021 mol/L sodium hypophosphite, as per Example 7.2.

7.3.1. 10% Sunflower Oil (Third Composition)

Example 7.3.1 employed the same process as Example 7.2, but the fourth composition was prepared by initially adding 10% sunflower oil to the third composition, as per Example 3.3.2.

7.3.2. 10% Sunflower Oil (Fourth Composition)

Example 7.3.2 employed the same process as Example 7.2, but the fourth composition was supplemented with 10% sunflower oil and subsequently mixed, as per Example 6.1.

7.3.3. 10% Sunflower Oil and 15% $CaCO_3$

Example 7.3.3 employed the same process as Example 7.2, but the fourth composition was supplemented with an additional 15% $CaCO_3$ and subsequently mixed, as per Example 6.2.

7.3.4. 10% Sunflower Oil and 15% $CaCO_3$ (Aerated)

Example 7.3.4 employed the same process as Example 7.2, but the fourth composition was subsequently aerated, as per Example 6.3.

7.3.5. 10% Sunflower Oil, 15% $CaCO_3$, and 7% Chitosan

Example 7.3.5 employs the same process as Example 7.2, but the fourth composition is supplemented with an additional 7% chitosan, as per Example 6.4.

7.4. 16% SPI with 1% Sodium Sulphite and 115% Canola Oil, Crosslinked with Trisodium Citrate and Sodium Hypophosphite in Ethanol The fourth composition was initially prepared as per Example 3.4, drawn into a syringe, and centrifuged at 913 rcf for 10 minutes to degas.

In Step (c), a coagulation bath (CB) solution comprising an 0.356 mol/L trisodium citrate and 43.1% (v/v) ethanol in deionised water was prepared with a pH of 9.1 (at 27° C.). The CB was maintained at room temperature. A portion of the CB solution was drawn into a secondary syringe to form the bore solution (BS).

Each syringe was then loaded into a syringe pump and connected via tubing to a co-axial die submerged in the coagulation bath. The inner and outer diameters of the inner conduit of the co-axial die were 260 μm and 520 μm, respectively. The inner and outer diameters of the outer conduit of the co-axial die were 840 μm and 1,270 μm, respectively. The fourth composition and the BS were then extruded together through the co-axial die, each at a rate of 1 mL/hour and 0.75 mL/hour, respectively, directly into the coagulation bath.

Figure 8:
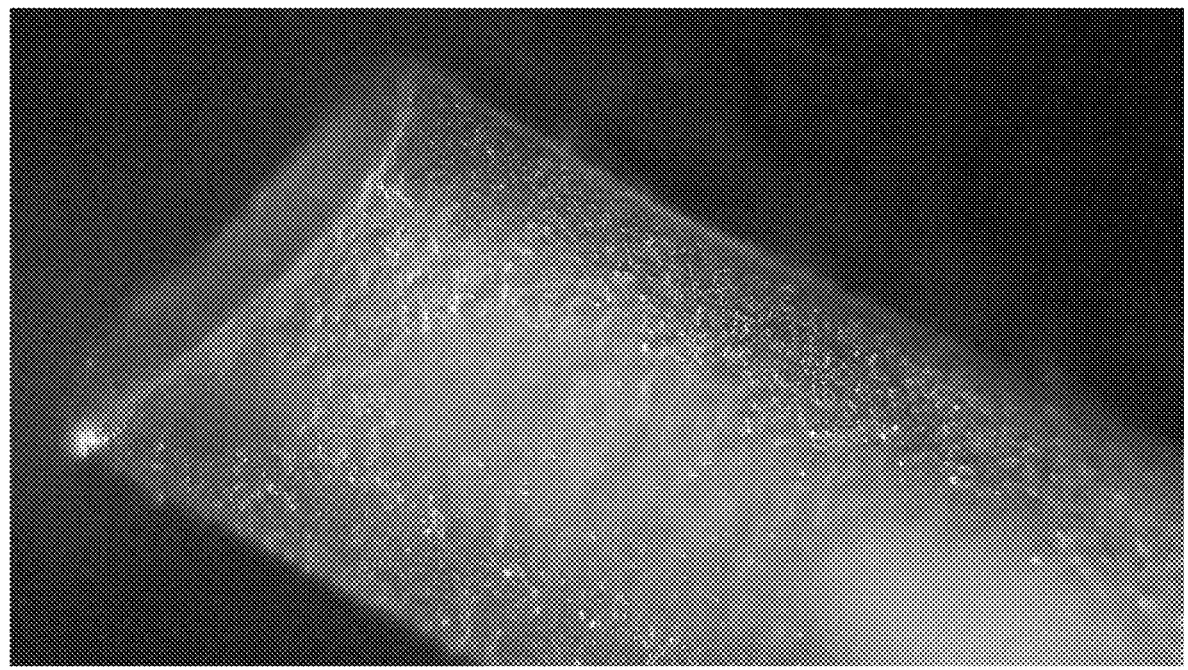
FIG. 8 is a micrograph of a hollow fibre of the disclosure in a hydrated state, made as described in Example 7.4. The hollow fibre comprises covalent ester, thioester and/or amide crosslinked polypeptides.

In a combination of Steps (d), (e.i) and (e.iii), the extruded fibres were left submerged in the CB at room temperature for 1 hour to form the covalently-crosslinked, semi-permeable, porous hollow fibres. The presence of ethanol in the CB solution served to aid SPI precipitation, form beta-sheets in the secondary protein structure, and extract the canola oil. FIG. 8 shows a micrograph of a sample of the porous, hollow fibres in a hydrated state.

7.5. 21% SPI with 2.5% Sodium Sulphite and 150% Canola Oil, Crosslinked with Trisodium Citrate and Sodium Hypophosphite Example 7.5 employed the same process as Example 7.2, but the fourth composition was prepared, as per Example 3.5.

Two additional hollow fibre samples were prepared as just described, wherein the fourth composition were mixed at 1,000 and 2,000 rpm respectively. FIG. 20 (G-I) shows each of the porous hollow fibre samples in coagulation bath solution.

7.6. 21% SPI with 2.5% NAC at pH 9.3 and 150% Canola Oil, Crosslinked with Trisodium Citrate The fourth composition was initially prepared as per Example 3.14.1, drawn into a syringe and centrifuged at 1,430 rcf (2,500 rpm) for 20 minutes to degas.

In Step (c), a CB solution, comprising 1.127 mol/L trisodium citrate in deionised water, was prepared with a pH of 8.20 (at 37.5° C.). The CB was maintained at room temperature. A portion of the CB solution was drawn into a secondary syringe to form the BS.

Each syringe was then loaded into a syringe pump and connected via tubing to a co-axial die submerged in the coagulation bath. The inner and outer diameters of the inner conduit of the co-axial die were 260 μm and 514 μm, respectively. The inner and outer diameters of the outer conduit of the co-axial die were 1,067 μm and 1,473 μm, respectively. The fourth composition and the BS were then extruded together at a rate of 6 mL/hour and 0.8 mL/hour, respectively, through the co-axial die, directly into the coagulation bath.

In Step (d), the extruded fibres were left submerged in the CB for 45 minutes to form the covalently-crosslinked, semi-permeable, porous hollow fibres, which were subsequently collected.

7.7. 21% SPI with 2.5% NAC at pH 9.3 and 150% Canola Oil, Crosslinked with Trisodium Citrate and Sodium Hypophosphite Example 7.7 employed the same process as Example 7.2, but the fourth composition was prepared, as per Example 3.14.

7.7.1. Faster Extrusion

This example employed the same process as Example 7.6, but the CB solution also comprised 1.021 mol/L sodium hypophosphite and had a pH of 8.22 at 38.0° C.

An additional set of fibres was produced, wherein the extrusion rate of the BS was 1.1 mL/hour.

7.8. 21% SPI with 1% Sodium Sulphite and 270% Canola Oil Crosslinked with Trisodium Citrate and Sodium Hypophosphite Example 7.8 employed the same process as Example 7.2, but the fourth composition was prepared, as per Example 3.15.

7.9. Different Fibre Thicknesses

The following Examples (7.9.1-7.9.3) employed the same process as Example 7.2, but with different co-axial dies, as well as with different extrusion rates of the bore and dope solutions. The dope solution comprised 21% SPI (w/v second composition), 2.5% NAC (w/w SPI) and 150% canola oil (w/v second composition) in an aqueous 8 mol/L urea solution with a pH of 9.2, as prepared in Example 3.14.

7.9.1. G17/G24

In Example 7.9.1, the co-axial die comprised a G17/G24 (outer/inner) co-axial needle. The inner and outer diameters of the inner conduit of the co-axial die were 311 µm and 565 µm, respectively. The inner and outer diameters of the outer conduit of the co-axial die were 1,067 µm and 1,473 µm, respectively. The dope solution (the fourth composition) and the bore solution were extruded together at a rate of 2 mL/hour and 0.781 mL/hour, respectively, through the co-axial die, directly into the coagulation bath.

7.9.2. G17/G25

In Example 7.9.2, the co-axial die comprised a G17/G25 (outer/inner) co-axial needle. The inner and outer diameters of the inner conduit of the co-axial die were 260 µm and 514 µm, respectively. The inner and outer diameters of the outer conduit of the co-axial die were 1,067 µm and 1,473 µm, respectively. The dope solution (the fourth composition) and the bore solution were extruded together at a rate of 2 mL/hour and 0.606 mL/hour, respectively, through the co-axial die, directly into the coagulation bath.

7.9.3. G17/G30

In Example 7.9.3, the co-axial die comprised a G17/G30 (outer/inner) co-axial needle. The inner and outer diameters of the inner conduit of the co-axial die were 159 µm and 311 µm, respectively. The inner and outer diameters of the outer conduit of the co-axial die were 1,067 µm and 1,473 µm, respectively. The dope solution (the fourth composition) and the bore solution were extruded together at a rate of 2 mL/hour and 0.186 mL/hour, respectively, through the co-axial die, directly into the coagulation bath.

7.10. 21% SPI with 2.5% NAC at pH 9.3 and 150% Canola Oil, Crosslinked with Disodium Malate The fourth composition was initially prepared as per Example 3.14.1, drawn into a syringe, and centrifuged at 1,430 rcf (2,500 rpm) for 20 minutes to degas.

In Step (c), a CB solution comprising 1.639 mol/L disodium malate in deionised water was prepared with a pH of 8.51 (at 39.7° C.). The CB was maintained at room temperature. A portion of the CB solution was drawn into a secondary syringe to form the BS.

Each syringe was then loaded into a syringe pump and connected via tubing to a co-axial die submerged in the CB. The inner and outer diameters of the inner conduit of the co-axial die were 260 µm and 514 µm, respectively. The inner and outer diameters of the outer conduit of the co-axial die were 1,067 µm and 1,473 µm, respectively. The fourth composition and the BS were then extruded together at a rate of 6 mL/hour and 0.8 mL/hour, respectively, through the co-axial die, directly into the CB.

In Step (d), the extruded fibres were left submerged in the CB for 45 minutes to form the covalently-crosslinked, semi-permeable, porous hollow fibres, which were subsequently collected.

7.10.1. Crosslinked with Disodium Malate and Sodium Hypophosphite

This example employed the same process as Example 7.10, but the CB solution additionally comprised 1.401 mol/L sodium hypophosphite and had a pH of 8.52 at 25.4° C.

7.11. 21% SPI with 2.5% NAC at pH 9.3, Crosslinked with Disodium Malate

This example employed the same process as Example 7.10, but the fourth composition was initially prepared as per Example 3.13.

7.11.1. Crosslinked with Disodium Malate and Sodium Hypophosphite

This example employed the same process as Example 7.10.1, but the fourth composition was initially prepared as per Example 3.13.

7.12. 15.25% SPI with 2.5% NAC and 1% Glycerol, Crosslinked with Trisodium Citrate and Sodium Hypophosphite Example 7.12 employs the same process as Example 7.2, but the fourth composition is prepared, as per Example 3.16.

7.13. 13% SPI with 1% Sodium Sulphite and 1-6 mol/L Urea, Crosslinked with Trisodium Citrate and Sodium Hypophosphite Example 7.13 employed the same process as Example 7.2, except multiple samples of the fourth composition were prepared for each urea concentration (1-6 mol/L) evaluated, as per Example 3.17.

7.13.1. 13% SPI with 1% Sodium Sulphite and 0.25-1 mol/L Urea, Crosslinked with Trisodium Citrate and Sodium Hypophosphite This example employs the same process as Example 7.13, except multiple samples of the fourth composition are prepared with urea concentrations of 0.25, 0.5 and 0.75 mol/L are prepared, as per Example 3.17.

7.14. 21% SPI with 2.5% NAC and 3% Agar, Crosslinked with Disodium Malate

This example employs the same process as Example 7.10, but the fourth composition is initially prepared, as per Example 3.18.1.

7.15. 21% SPI with 2.5% NAC, 3% Agar and 150% Canola Oil, Crosslinked with Disodium Malate This example employs the same process as Example 7.10, but the fourth composition is initially prepared, as per Example 3.18.2.

7.16. 21% SPI with 2.5% NAC and 5% Carrageenan-Kappa, Crosslinked with Disodium Malate This example employs the same process as Example 7.10, but the fourth composition is initially prepared, as per Example 3.18.3.

7.17. 21% SPI with 2.5% NAC, 5% Carrageenan-Kappa and 150% Canola Oil, Crosslinked with Disodium Malate This example employs the same process as Example 7.10, but the fourth composition is initially prepared, as per Example 3.18.4.

7.18. 21% SPI with 2.5% NAC and 5% Carrageenan-Iota, Crosslinked with Disodium Malate This example employs the same process as Example 7.10, but the fourth composition is initially prepared, as per Example 3.18.5.

7.19. 21% SPI with 2.5% NAC, 5% Carrageenan-Iota and 150% Canola Oil Crosslinked with Disodium Malate This example employs the same process as Example 7.10, but the fourth composition is initially prepared, as per Example 3.18.6.

7.20. 21% SPI with 2.5% NAC and 2% SA, Crosslinked with Disodium Malate

This example employs the same process as Example 7.10, but the fourth composition is initially prepared, as per Example 3.18.7.

7.21. 21% SPI with 2.5% NAC, 2% SA and 150% Canola Oil, Crosslinked with Disodium Malate This example employs the same process as Example 7.10, but the fourth composition is initially prepared, as per Example 3.18.10.

7.22. 16% SPI with 2.5% NAC and 2% SA, Crosslinked with Disodium Malate

This example employed the same process as Example 7.10, but the fourth composition was initially prepared as per Example 3.18.9.

7.22.1. Crosslinked with Disodium Malate and Sodium Hypophosphite

This example employed the same process as Example 7.10.1, but the fourth composition was initially prepared as per Example 3.18.9.

7.23. 16% SPI with 2.5% NAC, 2% SA, and 150% Canola Oil, Crosslinked with Disodium Malate This example employed the same process as Example 7.10, but the fourth composition was initially prepared as per Example 3.18.13.

7.23.1. Crosslinked with Disodium Malate and Sodium Hypophosphite

This example employed the same process as Example 7.10.1, but the fourth composition was initially prepared as per Example 3.18.13.

7.24. 12% SPI with 2.5% NAC, 2% SA, and 150% Canola Oil, Crosslinked with Disodium Malate This example employed the same process as Example 7.10, but the fourth composition was initially prepared as per Example 3.18.14, and comprised 12% SPI (w/v second composition).

7.25. 16% SPI with 2.5% NAC and 5% Sodium Carrageenan, Crosslinked with Disodium Malate This example employed the same process as Example 7.10, but the fourth composition, comprising 16% SPI (w/v second composition), was initially prepared as per Example 3.18.15.

7.26. 16% SPI with 2.5% NAC, 5% Sodium Carrageenan and 150% Canola Oil, Crosslinked with Disodium Malate This example employed the same process as Example 7.10, but the fourth composition, comprising 16% SPI (w/v second composition), was initially prepared as per Example 3.18.16.

7.27. Chickpea Protein

Example 7.27 employs the same process as Example 7.2, but the fourth composition, comprising 19% chickpea protein (CPP, w/v second composition), is prepared as per Example 4.1.

7.27.1. 21% CPP with 2.5% NAC and 150% Canola Oil, Crosslinked with Trisodium Citrate and Sodium Hypophosphite Covalently-crosslinked, semi-permeable, porous hollow fibres were produced as per Example 7.7.1 with a BS extrusion rate of 0.8 mL/h. However, the fourth composition, comprising 21% CPP (w/v second composition), was initially prepared as per Example 4.1.1, drawn into a syringe and centrifuged at 1,430 rcf for 20 minutes to degas.

7.28. Pea Protein

Example 7.28 employs the same process as Example 7.2, but the fourth composition, comprising 19% PP (w/v second composition), is prepared, as per Example 4.2.

7.28.1. 21% PP with 2.5% NAC and 150% Canola Oil, Crosslinked with Trisodium Citrate and Sodium Hypophosphite Covalently-crosslinked, semi-permeable, porous hollow fibres were produced as per Example 7.7.1 with a BS extrusion rate of 0.8 mL/h. However, the fourth composition, comprising 21% PP (w/v second composition), was initially prepared as per Example 4.2.1, drawn into a syringe and centrifuged at 1,430 rcf for 20 minutes to degas.

7.29. Sunflower Seed Protein

Example 7.29 employs the same process as Example 7.2, but the fourth composition, comprising 19% SFSP (w/v second composition) is prepared, as per Example 4.5.

7.29.1. 21% SFSP with 2.5% NAC and 150% Canola Oil, Crosslinked with Trisodium Citrate and Sodium Hypophosphite Covalently-crosslinked, semi-permeable, porous hollow fibres were produced as per Example 7.28.1, but the fourth composition, comprising 21% SFSP (w/v second composition), was initially prepared as per Example 4.5.1.

7.30. Mung Bean Protein

Example 7.30 employs the same process as Example 7.2, but the fourth composition, comprising 16% MBP (w/v second composition) is prepared, as per Example 4.6.

7.30.1. 15% MBP with 2.5% NAC and 150% Canola Oil, Crosslinked with Trisodium Citrate and Sodium Hypophosphite Covalently-crosslinked, semi-permeable, porous hollow fibres were produced as per Example 7.28.1, but the fourth composition, comprising 15% MBP (w/v second composition), was initially prepared as per Example 4.6.1.

7.31. Faba Been Protein 7.31.1. 21% FBP with 2.5% NAC and 150% Canola Oil, Crosslinked with Trisodium Citrate and Sodium Hypophosphite Covalently-crosslinked, semi-permeable, porous hollow fibres were produced as per Example 7.28.1, but the fourth composition, comprising 21% FBP (w/v second composition), was initially prepared as per Example 4.9.1.

7.31.2. 21% FBP with 2.5% NAC, Crosslinked with Trisodium Citrate

Covalently-crosslinked, semi-permeable, porous hollow fibres were produced as per Example 7.31.1, but the fourth composition, comprising 21% FBP (w/v second composition), was initially prepared as per Example 4.9.2 and the coagulation bath was prepared without sodium hypophosphite and had a pH of 9.11 at 30.0° C.

7.32. Soy Protein Isolate and Chickpea Protein

Example 7.32 employs the same process as Example 7.2, but the fourth composition, comprising SPI and CPP is prepared, as per Example 5.1.

7.33. Pea Protein and Sunflower Seed Protein

Example 7.33 employs the same process as Example 7.2, but the fourth composition, comprising PP and SFSP is prepared, as per Example 5.2.

7.33.1. 10.5% PP and 10.5% SFSP with 2.5% NAC and 150% Canola Oil, Crosslinked with Trisodium Citrate and Sodium Hypophosphite Covalently-crosslinked, semi-permeable, porous hollow fibres were produced as per Example 7.28.1, but the fourth composition, comprising 10.5% PP and 10.5% SFSP (w/v second composition), was initially prepared as per Example 5.2.2.

7.34. Mung Bean Protein and Beef Protein

Example 7.34 employs the same process as Example 7.2, but the fourth composition, comprising MBP and BP is prepared, as per Example 5.3.

7.35. Soy Protein Isolate and Mung Bean Protein

Example 7.35 employs the same process as Example 7.2, but the fourth composition, comprising SPI and MBP is prepared, as per Example 5.4.

7.35.1. 8% SPI and 8% MBP with 2.5% NAC, Crosslinked with Trisodium Citrate and Sodium Hypophosphite Covalently-crosslinked, semi-permeable, porous hollow fibres were produced as per Example 7.28.1, but the fourth composition, comprising 8% SPI and 8% MBP (w/v second composition), was initially prepared as per Example 5.4.2.

7.35.2. 9% SPI and 9% MBP with 2.5% NAC, Crosslinked with Disodium Malate and Sodium Hypophosphite Covalently-crosslinked, semi-permeable, porous hollow fibres were produced as per Example 7.10.1, but the fourth composition, comprising 9% SPI and 9% MBP (w/v second composition), was initially prepared as per Example 5.4.2.

7.35.3. 10% SPI and 10% MBP with 2.5% NAC, Crosslinked with Trisodium Citrate and Sodium Hypophosphite Covalently-crosslinked, semi-permeable, porous hollow fibres were produced as per Example 7.28.1, but the fourth composition, comprising 10% SPI and 10% MBP (w/v second composition), was initially prepared as per Example 5.4.2.

7.35.4. 9% SPI and 9% MBP with 2.5% NAC and 150% Canola Oil, Crosslinked with Trisodium Citrate and Sodium Hypophosphite Covalently-crosslinked, semi-permeable, porous hollow fibres were produced as per Example 7.28.1, but the fourth composition, comprising 9% SPI and 9% MBP (w/v second composition), was initially prepared as per Example 5.4.3.

7.35.5. 9% SPI and 9% MBP with 2.5% NAC and 150% Canola Oil, Crosslinked with Disodium Malate Covalently-crosslinked, semi-permeable, porous hollow fibres were produced as per Example 7.10, but the fourth composition, comprising 9% SPI and 9% MBP (w/v second composition), was initially prepared as per Example 5.4.3.

7.35.6. 9% SPI and 9% MBP with 2.5% NAC and 150% Canola Oil, Crosslinked with Disodium Malate and Sodium Hypophosphite Covalently-crosslinked, semi-permeable, porous hollow fibres were produced as per Example 7.10.1, but the fourth composition, comprising 9% SPI and 9% MBP (w/v second composition), was initially prepared as per Example 5.4.3.

7.35.7. 9% SPI and 9% MBP with 2.5% NAC and 2% SA, Crosslinked with Disodium Malate and Sodium Hypophosphite Covalently-crosslinked, semi-permeable, porous hollow fibres were produced as per Example 7.10.1, but the fourth composition, comprising 9% SPI, 9% MBP and 2% SA (w/v second composition), was initially prepared as per Example 5.4.4.

7.36. Soy Protein Isolate and Faba Bean Protein 7.36.1. 10.5% SPI and 10.5% FBP with 2.5% NAC, Crosslinked with Disodium Malate Covalently-crosslinked, semi-permeable, porous hollow fibres were produced as per Example 7.10, but the fourth composition, comprising 10.5% SPI and 10.5% FBP (w/v second composition), was initially prepared as per Example 5.5.2.

7.36.2. 8% SPI and 8% FBP with 2.5% NAC and 2% SA, Crosslinked with Disodium Malate Covalently-crosslinked, semi-permeable, porous hollow fibres were produced as per Example 7.10, but the fourth composition, comprising 8% SPI, 8% FBP and 2% SA (w/v second composition), was initially prepared as per Example 5.5.3.

7.36.3. 8% SPI and 8% FBP with 2.5% NAC, 2% SA and 150% Canola Oil, Crosslinked with Disodium Malate Covalently-crosslinked, semi-permeable, porous hollow fibres were produced as per Example 7.10, but the fourth composition, comprising 8% SPI, 8% FBP, 2% SA and 150% Canola Oil (w/v second composition), was initially prepared as per Example 5.5.4.

7.36.4. 8% SPI and 8% FBP with 2.5% NAC, 2% SA and 150% Canola Oil, Crosslinked with Disodium Malate and Sodium Hypophosphite Covalently-crosslinked, semi-permeable, porous hollow fibres were produced as per Example 7.10.1, but the fourth composition, comprising 8% SPI, 8% FBP, 2% SA and 150% Canola Oil (w/v second composition), was initially prepared as per Example 5.5.4.

7.37. Sunflower Seed Protein and Mung Bean Protein 7.37.1. 9% SFSP and 9% MBP with 2.5% NAC, Crosslinked with Trisodium Citrate Covalently-crosslinked, semi-permeable, porous hollow fibres were produced as per Example 7.31.2, but the fourth composition, comprising 9% SFSP and 9% MBP (w/v second composition), was initially prepared as per Example 5.6.2.

7.37.2. 8% SFSP and 8% MBP with 2.5% NAC and 150% Canola Oil, Crosslinked with Trisodium Citrate Covalently-crosslinked, semi-permeable, porous hollow fibres were produced as per Example 7.31.2, but the fourth composition, comprising 8% SFSP, 8% MBP and 150% Canola Oil (w/v second composition), was initially prepared as per Example 5.6.3.

8. Organic Solvent Wash 8.1. 26% SPI with 1% NAC, Crosslinked with Trisodium Citrate and Sodium Hypophosphite, Washed with Ethanol Initially, covalently-crosslinked, semi-permeable, porous hollow fibres were produced as per Example 7.1.

In Step (e.i), hollow fibres were drawn from a spool into an ethanol (60%, v/v) bath, left submerged for 1 hour at room temperature, and then collected on a secondary rotating spool.

8.2. 26% SPI with 1% Sodium Sulphite, Crosslinked with Trisodium Citrate and Sodium Hypophosphite, Washed with Ethanol Covalently-crosslinked, semi-permeable, porous hollow fibres, initially produced as per Example 7.2, were washed with 60% (v/v) ethanol for 1 hour as per Example 8.1.

8.2.1. Incubated at High Temperature with Mixing

Covalently-crosslinked, semi-permeable, porous hollow fibres are initially produced as per Example 7.2.1, and then washed with 60% (v/v) ethanol for 1 hour as per Example 8.1.

8.2.2. Crosslinked with Trisodium Citrate

Covalently-crosslinked, semi-permeable, porous hollow fibres, initially produced as per Example 7.2.2, are washed with 60% (v/v) ethanol for 1 hour as per Example 8.1.

8.2.3. Crosslinked with Sodium Succinate and Sodium Hypophosphite

Covalently-crosslinked, semi-permeable, porous hollow fibres are initially produced as per Example 7.2.3, and then washed with 60% (v/v) ethanol for 1 hour as per Example 8.1.

8.3. 26% SPI with Sodium Sulphite and Additives, Cross-linked with Trisodium Citrate and Sodium Hypophosphite, Washed with Ethanol Covalently-crosslinked, semi-permeable, porous hollow fibres, initially produced as per Example 7.3, were washed with 60% (v/v) ethanol for 1 hour as per Example 8.1.

8.3.1. 10% Sunflower Oil (Third Composition)

Covalently-crosslinked, semi-permeable, porous hollow fibres, initially produced as per Example 7.3.1, were washed with 60% (v/v) ethanol for 1 hour as per Example 8.1.

8.3.2. 10% Sunflower Oil (Fourth Composition)

Covalently-crosslinked, semi-permeable, porous hollow fibres, initially produced as per Example 7.3.2, were washed with 60% (v/v) ethanol for 1 hour as per Example 8.1.

8.3.3. 10% Sunflower Oil and 15% $CaCO_3$

Covalently-crosslinked, semi-permeable, porous hollow fibres, initially produced as per Example 7.3.3, were washed with 60% (v/v) ethanol for 1 hour as per Example 8.1.

8.3.4. 10% Sunflower Oil and 15% $CaCO_3$ (Aerated)

Covalently-crosslinked, semi-permeable, porous hollow fibres are initially produced as per Example 7.3.4, and then washed with 60% (v/v) ethanol for 1 hour as per Example 8.1

8.3.5. 10% Sunflower Oil, 15% $CaCO_3$, and 7% Chitosan

Covalently-crosslinked, semi-permeable, porous hollow fibres are initially produced as per Example 7.3.5, and then washed with 60% (v/v) ethanol for 1 hour as per Example 8.1.

8.4. 21% SPI with 2.5% Sodium Sulphite and 150% Canola Oil, Crosslinked with Trisodium Citrate and Sodium Hypophosphite Initially, covalently-crosslinked, semi-permeable, porous hollow fibres were produced as per Example 7.5.

In Step (e.i), the porous, hollow fibres were then left submerged 40% (v/v) ethanol for 1 hour at room temperature to form beta-sheets in the secondary protein structure.

A total of three hollow fibre samples were prepared as just described, wherein the fourth composition was finally mixed at 400, 1,000 and 2,000 rpm, respectively.

8.5. 21% SPI with 2.5% NAC at pH 9.3 and 150% Canola Oil, Crosslinked with Trisodium Citrate, Washed with Ethanol and Trisodium Citrate Initially, covalently-crosslinked, semi-permeable, porous hollow fibres were produced as per Example 7.6.

In Step (e.i), the porous, hollow fibres were then left submerged in an aqueous bath comprising 40% (v/v) ethanol and 0.448 mol/L trisodium citrate, for 1 hour at room temperature.

8.6. 21% SPI with 2.5% NAC at pH 9.3 and 150% Canola Oil, Crosslinked with Trisodium Citrate and Sodium Hypophosphite Covalently-crosslinked, semi-permeable, porous hollow fibres, initially produced as per Example 7.7, were washed with 40% (v/v) ethanol for 1 hour as per Example 8.4.

8.6.1. Washed with Ethanol and Trisodium Citrate

Covalently-crosslinked, semi-permeable, porous hollow fibres, initially produced as per Example 7.7.1, were washed as per Example 8.5.

8.7. 21% SPI with 1% Sodium Sulphite and 270% Canola Oil Crosslinked with Trisodium Citrate and Sodium Hypophosphite Covalently-crosslinked, semi-permeable, porous hollow fibres, initially produced as per Example 7.8, were washed with 40% (v/v) ethanol for 1 hour as per Example 8.4.

8.8. Different Fibre Thicknesses 8.8.1. G17/G24

Covalently-crosslinked, semi-permeable, porous hollow fibres, initially produced as per Example 7.9.1, were washed with 40% (v/v) ethanol for 1 hour as per Example 8.4.

8.8.2. G17/G25

Covalently-crosslinked, semi-permeable, porous hollow fibres, initially produced as per Example 7.9.2, were washed with 40% (v/v) ethanol for 1 hour as per Example 8.4.

8.8.3. G17/G30

Covalently-crosslinked, semi-permeable, porous hollow fibres, initially produced as per Example 7.9.3, were washed with 40% (v/v) ethanol for 1 hour as per Example 8.4.

8.9. 21% SPI with 2.5% NAC at pH 9.3 and 150% Canola Oil, Crosslinked with Disodium Malate Covalently-crosslinked, semi-permeable, porous hollow fibres, initially produced as per Example 7.10, were washed with 40% (v/v) ethanol for 1 hour, as per Example 8.4.

8.9.1. Crosslinked with Disodium Malate and Sodium Hypophosphite

Covalently-crosslinked, semi-permeable, porous hollow fibres, initially produced as per Example 7.10.1, were washed with 40% (v/v) ethanol for 1 hour, as per Example 8.4.

8.10. 21% SPI with 2.5% NAC at pH 9.3, Crosslinked with Disodium Malate

Covalently-crosslinked, semi-permeable, porous hollow fibres, initially produced as per Example 7.11, were washed with 40% (v/v) ethanol for 1 hour, as per Example 8.4.

8.10.1. Crosslinked with Disodium Malate and Sodium Hypophosphite

Covalently-crosslinked, semi-permeable, porous hollow fibres, initially produced as per Example 7.11.1, were washed with 40% (v/v) ethanol for 1 hour, as per Example 8.4.

8.11. 15.25% SPI, 2.5% NAC, 1% Glycerol Crosslinked with Trisodium Citrate and Sodium Hypophosphite Covalently-crosslinked, semi-permeable, porous hollow fibres, initially produced as per Example 7.12, are washed with 40% (v/v) ethanol for 1 hour as per Example 8.4.

8.12. 21% SPI with 2.5% NAC and 3% Agar, Crosslinked with Disodium Malate

Covalently-crosslinked, semi-permeable, porous hollow fibres, initially produced as per Example 7.13.1 are washed with 40% (v/v) ethanol for 1 hour as per Example 8.4.

8.13. 21% SPI with 2.5% NAC, 3% Agar and 150% Canola Oil, Crosslinked with Disodium Malate Covalently-crosslinked, semi-permeable, porous hollow fibres, initially produced as per Example 7.15 are washed with 40% (v/v) ethanol for 1 hour as per Example 8.4.

8.14. 21% SPI with 2.5% NAC and 5% Carrageenan-Kappa, Crosslinked with Disodium Malate Covalently-crosslinked, semi-permeable, porous hollow fibres, initially produced as per Example 7.16 are washed with 40% (v/v) ethanol for 1 hour as per Example 8.4.

8.15. 21% SPI with 2.5% NAC, 5% Carrageenan-Kappa and 150% Canola Oil, Crosslinked with Disodium Malate Covalently-crosslinked, semi-permeable, porous hollow fibres, initially produced as per Example 7.17 are washed with 40% (v/v) ethanol for 1 hour as per Example 8.4.

8.16. 21% SPI with 2.5% NAC and 5% Carrageenan-Iota, Crosslinked with Disodium Malate Covalently-crosslinked, semi-permeable, porous hollow fibres, initially produced as per Example 7.18 are washed with 40% (v/v) ethanol for 1 hour as per Example 8.4.

8.17. 21% SPI with 2.5% NAC, 5% Carrageenan-Iota and 150% Canola Oil, Crosslinked with Disodium Malate Covalently-crosslinked, semi-permeable, porous hollow fibres, initially produced as per Example 7.19 are washed with 40% (v/v) ethanol for 1 hour as per Example 8.4.

8.18. 21% SPI with 2.5% NAC and 2% SA, Crosslinked with Disodium Malate

Covalently-crosslinked, semi-permeable, porous hollow fibres, initially produced as per Example 7.20 are washed with 40% (v/v) ethanol for 1 hour as per Example 8.4.

8.19. 21% SPI with 2.5% NAC, 2% SA and 150% Canola Oil, Crosslinked with Disodium Malate Covalently-crosslinked, semi-permeable, porous hollow fibres, initially produced as per Example 7.21 are washed with 40% (v/v) ethanol for 1 hour as per Example 8.4.

8.20. 16% SPI with 2.5% NAC and 2% SA, Crosslinked with Disodium Malate

Covalently-crosslinked, semi-permeable, porous hollow fibres, initially produced as per Example 7.227.22, were washed with 40% (v/v) ethanol for 1 hour as per Example 8.4.

8.20.1. Crosslinked with Disodium Malate and Sodium Hypophosphite

Covalently-crosslinked, semi-permeable, porous hollow fibres, initially produced as per Example 7.22.1, were washed with 40% (v/v) ethanol for 1 hour as per Example 8.4.

8.21. 16% SPI with 2.5% NAC, 2% SA, and 150% Canola Oil, Crosslinked with Disodium Malate Covalently-crosslinked, semi-permeable, porous hollow fibres, initially produced as per Example 7.23, were washed with 40% (v/v) ethanol for 1 hour as per Example 8.4.

8.21.1. Crosslinked with Disodium Malate and Sodium Hypophosphite

Covalently-crosslinked, semi-permeable, porous hollow fibres, initially produced as per Example 7.23.1, were washed with 40% (v/v) ethanol for 1 hour as per Example 8.4.

8.22. 12% SPI with 2.5% NAC, 2% SA, and 150% Canola Oil, Crosslinked with Disodium Malate Covalently-crosslinked, semi-permeable, porous hollow fibres, initially produced as per Example 7.24, were washed with 40% (v/v) ethanol for 1 hour as per Example 8.4.

8.23. 13% SPI with 1% Sodium Sulphite and 0.25-6 mol/L Urea, Crosslinked with Trisodium Citrate and Sodium Hypophosphite Covalently-crosslinked, semi-permeable, porous hollow fibres, initially produced as per Example 7.13 and 7.13.1, are washed with 40% (v/v) ethanol for 1 hour as per Example 8.4.

8.24. 16% SPI with 2.5% NAC and 5% Sodium Carrageenan, Crosslinked with Disodium Malate Covalently-crosslinked, semi-permeable, porous hollow fibres, initially produced as per Example 7.25, are washed with 40% (v/v) ethanol for 1 hour as per Example 8.4.

8.25. 16% SPI with 2.5% NAC, 5% Sodium Carrageenan and 150% Canola Oil, Crosslinked with Disodium Malate Covalently-crosslinked, semi-permeable, porous hollow fibres, initially produced as per Example 7.26, are washed with 40% (v/v) ethanol for 1 hour as per Example 8.4.

8.26. Chickpea Protein

Covalently-crosslinked, semi-permeable, porous hollow fibres, initially produced as per Example 7.27, are washed with 40% (v/v) ethanol for 1 hour as per Example 8.4.

8.27. Pea Protein

Covalently-crosslinked, semi-permeable, porous hollow fibres, initially produced as per Example 7.28, are washed with 40% (v/v) ethanol for 1 hour as per Example 8.4.

8.27.1. 21% PP with 2.5% NAC and 150% Canola Oil, Crosslinked with Trisodium Citrate and Sodium Hypophosphite Covalently-crosslinked, semi-permeable, porous hollow fibres, initially produced as per Example 7.28.1, were left submerged in an aqueous solution, comprising 40% (v/v) ethanol and 0.448 mol/L trisodium citrate, for 1 hour as per Example 8.5.

8.28. Sunflower Seed Protein

Covalently-crosslinked, semi-permeable, porous hollow fibres, initially produced as per Example 7.29, are washed with 40% (v/v) ethanol for 1 hour as per Example 8.4.

8.28.1. 21% SFSP with 2.5% NAC and 150% Canola Oil, Crosslinked with Trisodium Citrate and Sodium Hypophosphite Covalently-crosslinked, semi-permeable, porous hollow fibres, initially produced as per Example 7.29.1, were left submerged in an aqueous solution, comprising 40% (v/v) ethanol and 0.448 mol/L trisodium citrate, for 1 hour as per Example 8.5.

8.29. Mung Bean Protein

Covalently-crosslinked, semi-permeable, porous hollow fibres, initially produced as per Example 7.30, are washed with 40% (v/v) ethanol for 1 hour as per Example 8.4.

8.29.1. 15% MBP with 2.5% NAC and 150% Canola Oil, Crosslinked with Trisodium Citrate and Sodium Hypophosphite Covalently-crosslinked, semi-permeable, porous hollow fibres, initially produced as per Example 7.30.1, were left submerged in an aqueous solution, comprising 40% (v/v) ethanol and 0.448 mol/L trisodium citrate, for 1 hour as per Example 8.5.

8.30. Faba Bean Protein 8.30.1. 21% FBP with 2.5% NAC and 150% Canola Oil, Crosslinked with Trisodium Citrate and Sodium Hypophosphite Covalently-crosslinked, semi-permeable, porous hollow fibres, initially produced as per Example 7.31.1, were left submerged in an aqueous solution, comprising 40% (v/v) ethanol and 0.448 mol/L trisodium citrate, for 1 hour as per Example 8.5.

8.30.2. 21% FBP with 2.5% NAC and 150% Canola Oil, Crosslinked with Trisodium Citrate Covalently-crosslinked, semi-permeable, porous hollow fibres, initially produced as per Example 7.31.2, were left submerged in an aqueous solution, comprising 40% (v/v) ethanol and 0.448 mol/L trisodium citrate, for 1 hour as per Example 8.5.

8.31. Soy Protein Isolate and Chickpea Protein

Covalently-crosslinked, semi-permeable, porous hollow fibres, initially produced as per Example 7.32, are washed with 40% (v/v) ethanol for 1 hour as per Example 8.4.

8.32. Pea Protein and Sunflower Seed Protein

Covalently-crosslinked, semi-permeable, porous hollow fibres, initially produced as per Example 7.33, are washed with 40% (v/v) ethanol for 1 hour as per Example 8.4.

8.32.1. 10.5% PP and 10.5% SFSP with 2.5% NAC and 150% Canola Oil, Crosslinked with Trisodium Citrate and Sodium Hypophosphite Covalently-crosslinked, semi-permeable, porous hollow fibres, initially produced as per Example 7.33.1, were left submerged in an aqueous solution, comprising 40% (v/v) ethanol and 0.448 mol/L trisodium citrate, for 1 hour as per Example 8.5.

8.33. Mung Bean Protein and Beef Protein

Covalently-crosslinked, semi-permeable, porous hollow fibres, initially produced as per Example 7.34, are washed with 40% (v/v) ethanol for 1 hour as per Example 8.4.

8.34. Soy Protein Isolate and Mung Bean Protein

Covalently-crosslinked, semi-permeable, porous hollow fibres, initially produced as per Example 7.35, are washed with 40% (v/v) ethanol for 1 hour as per Example 8.4.

8.34.1. 9% SPI and 9% MBP with 2.5% NAC, Crosslinked with Disodium Malate and Sodium Hypophosphite Covalently-crosslinked, semi-permeable, porous hollow fibres, initially produced as per Example 7.35.2, were left submerged in 40% (v/v) ethanol for 1 hour, as per Example 8.4.

8.34.2. 10% SPI and 10% MBP with 2.5% NAC, Crosslinked with Trisodium Citrate and Sodium Hypophosphite Covalently-crosslinked, semi-permeable, porous hollow fibres, initially produced as per Example 7.35.3, were left submerged in an aqueous solution, comprising 40% (v/v) ethanol and 0.448 mol/L trisodium citrate, for 1 hour as per Example 8.5.

8.34.3. 9% SPI and 9% MBP with 2.5% NAC and 150% Canola Oil, Crosslinked with Trisodium Citrate and Sodium Hypophosphite Covalently-crosslinked, semi-permeable, porous hollow fibres, initially produced as per Example 7.35.4, were left submerged in an aqueous solution, comprising 40% (v/v) ethanol and 0.448 mol/L trisodium citrate, for 1 hour as per Example 8.5.

8.34.4. 9% SPI and 9% MBP with 2.5% NAC and 150% Canola Oil, Crosslinked with Disodium Malate Covalently-crosslinked, semi-permeable, porous hollow fibres, initially produced as per Example 7.35.5, were left submerged in 40% (v/v) ethanol for 1 hour, as per Example 8.4.

8.34.5. 9% SPI and 9% MBP with 2.5% NAC and 150% Canola Oil, Crosslinked with Disodium Malate and Sodium Hypophosphite Covalently-crosslinked, semi-permeable, porous hollow fibres, initially produced as per Example 7.35.6, were left submerged in 40% (v/v) ethanol for 1 hour, as per Example 8.4.

8.34.6. 9% SPI and 9% MBP with 2.5% NAC and 2% SA, Crosslinked with Disodium Malate and Sodium Hypophosphite Covalently-crosslinked, semi-permeable, porous hollow fibres, initially produced as per Example 7.35.7, were left submerged in 40% (v/v) ethanol for 1 hour, as per Example 8.4.

8.35. Soy Protein Isolate and Faba Bean Protein 8.35.1. 10.5% SPI and 10.5% FBP with 2.5% NAC, Crosslinked with Disodium Malate Covalently-crosslinked, semi-permeable, porous hollow fibres, initially produced as per Example 7.36.1, were left submerged in 40% (v/v) ethanol for 1 hour, as per Example 8.4.

8.35.2. 8% SPI and 8% FBP with 2.5% NAC and 2% SA, Crosslinked with Disodium Malate Covalently-crosslinked, semi-permeable, porous hollow fibres, initially produced as per Example 7.36.2, were left submerged in 40% (v/v) ethanol for 1 hour, as per Example 8.4.

8.35.2.1. Washed with Iso-Propanol

Initially, covalently-crosslinked, semi-permeable, porous hollow fibres, are produced as per Example 7.36.2.

In Step (e.i), the porous, hollow fibres were then left submerged 40% (v/v) iso-propanol for 1 hour at room temperature.

8.35.2.2. Washed with n-Propanol

Initially, covalently-crosslinked, semi-permeable, porous hollow fibres, are produced as per Example 7.36.2.

In Step (e.i), the porous, hollow fibres were then left submerged 40% (v/v) n-propanol for 1 hour at room temperature.

8.35.2.3. Washed with Methanol

Initially, covalently-crosslinked, semi-permeable, porous hollow fibres, are produced as per Example 7.36.2.

In Step (e.i), the porous, hollow fibres were then left submerged 40% (v/v) methanol for 1 hour at room temperature.

8.35.2.4. Washed with Acetone

Initially, covalently-crosslinked, semi-permeable, porous hollow fibres, are produced as per Example 7.36.2.

In Step (e.i), the porous, hollow fibres were then left submerged 40% (v/v) acetone for 1 hour at room temperature.

8.35.3. 8% SPI and 8% FBP with 2.5% NAC, 2% SA and 150% Canola Oil, Crosslinked with Disodium Malate Covalently-crosslinked, semi-permeable, porous hollow fibres, initially produced as per Example 7.36.3, were left submerged in 40% (v/v) ethanol for 1 hour, as per Example 8.4.

8.35.4. 8% SPI and 8% FBP with 2.5% NAC, 2% SA and 150% Canola Oil, Crosslinked with Disodium Malate and Sodium Hypophosphite Covalently-crosslinked, semi-permeable, porous hollow fibres, initially produced as per Example 7.36.4, were left submerged in 40% (v/v) ethanol for 1 hour, as per Example 8.4.

8.36. Sunflower Seed Protein and Mung Bean Protein 8.36.1. 9% SFSP and 9% MBP with 2.5% NAC, Crosslinked with Trisodium Citrate Covalently-crosslinked, semi-permeable, porous hollow fibres, initially produced as per Example 7.37.1, were left submerged in an aqueous solution, comprising 40% (v/v) ethanol and 0.448 mol/L trisodium citrate, for 1 hour as per Example 8.5.

8.36.2. 8% SFSP and 8% MBP with 2.5% NAC and 150% Canola Oil, Crosslinked with Trisodium Citrate Covalently-crosslinked, semi-permeable, porous hollow fibres, initially produced as per Example 7.37.2, were left submerged in an aqueous solution, comprising 40% (v/v) ethanol and 0.448 mol/L trisodium citrate, for 1 hour as per Example 8.5.

9. Annealing 9.1. 26% SPI with NAC, Crosslinked with Trisodium Citrate and Sodium Hypophosphite, Washed with Ethanol Initially, covalently-crosslinked, semi-permeable, porous hollow fibres were produced as per Example 7.1, and then submerged in an ethanol bath as per Example 8.1.

In Step (e.ii), the covalently-crosslinked, semi-permeable, porous hollow fibres were pre-dried at 60° C. for 2 hours in a dehydrator, thermally annealed at 130° C. for 1 hour in an electric convection oven, and then rehydrated via submersion in deionised water at room temperature for 10 minutes.

The annealed fibres constituted a Prokitein.

9.1.1. Rehydrated in 20% Glycerol

This example employed the same hollow fibres and annealing process as Example 9.1, but the annealed hollow fibres were instead rehydrated in an aqueous solution comprising 20% glycerol (v/v) for 20 minutes.

9.2. 26% SPI with Sodium Sulphite, Crosslinked with Trisodium Citrate and Sodium Hypophosphite, Washed with Ethanol This example employed the same annealing process as Example 9.1, but the covalently-crosslinked, semi-permeable, porous hollow fibres were initially produced as per Example 7.2 and washed with ethanol as per Example 8.2.

The annealed fibres constituted a Prokitein.

9.2.1. Incubated at High Temperature with Mixing

This example employs the same annealing process as Example 9.1, but the covalently-crosslinked, semi-permeable, porous hollow fibres are initially produced as per Example 7.2.1 and washed with ethanol as per Example 8.2.1.

9.2.2. Crosslinked with Trisodium Citrate, Washed with Ethanol

This example employs the same annealing process as Example 9.1, but the covalently-crosslinked, semi-permeable, porous hollow fibres are initially produced as per Example 7.2.2 and washed with ethanol as per Example 8.2.2.

9.2.3. Crosslinked with Sodium Succinate and Sodium Hypophosphite, Washed with Ethanol This example employs the same annealing process as Example 9.1, but the covalently-crosslinked, semi-permeable, porous hollow fibres are initially produced as per Example 7.2.3 and washed with ethanol as per Example 8.2.3.

9.2.3.1. Rehydrated in 20% Glycerol

This example employs the same hollow fibres and annealing process as Example 9.2.3, but the annealed hollow fibres are instead rehydrated in an aqueous solution comprising 20% glycerol (v/v) for 20 minutes.

9.3. 26% SPI with Sodium Sulphite and Additives, Crosslinked with Trisodium Citrate and Sodium Hypophosphite, Washed with Ethanol This example employed the same annealing process as Example 9.1, but the covalently-crosslinked, semi-permeable, porous hollow fibres were initially produced as per Example 7.3 and washed with ethanol as per Example 8.3.

9.3.1. 10% Sunflower Oil (Third Composition)

This example employed the same annealing process as Example 9.1, but the covalently-crosslinked, semi-permeable, porous hollow fibres were initially produced as per Example 7.3.1 and washed with ethanol as per Example 8.3.1.

9.3.2. 10% Sunflower Oil (Fourth Composition)

This example employed the same annealing process as Example 9.1, but the covalently-crosslinked, semi-permeable, porous hollow fibres were initially produced as per Example 7.3.2 and washed with ethanol as per Example 8.3.2.

9.3.3. 10% Sunflower Oil and 15% $CaCO_3$

This example employed the same annealing process as Example 9.1, but the covalently-crosslinked, semi-permeable, porous hollow fibres were initially produced as per Example 7.3.3 and washed with ethanol as per Example 8.3.3.

9.3.4. 10% Sunflower Oil and 15% $CaCO_3$ (Aerated)

This example employed the same annealing process as Example 9.1, but the covalently-crosslinked, semi-permeable, porous hollow fibres were initially produced as per Example 7.3.4 and washed with ethanol as per Example 8.3.4.

9.3.5. 10% Sunflower Oil, 15% $CaCO_3$, and 7% Chitosan

This example employs the same annealing process as Example 9.1, but the covalently-crosslinked, semi-permeable, porous hollow fibres are initially produced as per Example 7.3.5 and washed with ethanol as per Example 8.3.5.

9.4. 16% SPI with Sodium Sulphite and 115% Canola Oil, Crosslinked with Trisodium Citrate and Sodium Hypophosphite in Ethanol This example employs the same annealing process as Example 9.1, but the covalently-crosslinked, semi-permeable, porous hollow fibres are initially produced as per Example 7.4.

9.4.1. Rehydrated in 20% Glycerol

This example employs the same hollow fibres and annealing process as Example 9.4. However, the annealed hollow fibres are additionally rehydrated in an aqueous solution comprising 20% glycerol (v/v) for 20 minutes.

9.5. 21% SPI with 2.5% Sodium Sulphite and 150% Canola Oil, Crosslinked with Trisodium Citrate and Sodium Hypophosphite, Washed with Ethanol Initially, covalently-crosslinked, semi-permeable, porous hollow fibres were produced as per Example 7.5 and washed with ethanol as per Example 8.4.

In Step (e.ii), the hollow fibres were annealed at 130° C. for 2 hours in an electric convection oven. The annealed hollow fibres were then washed in iso-propanol to dehydrate them and remove any residual oils in preparation for imaging with a scanning electron microscope (SEM).

A total of three hollow fibre samples were prepared as just described, wherein the fourth composition was finally mixed at 400, 1,000 and 2,000 rpm, respectively. FIG. 20 (J-O) show SEM images of the lumen and pore structure of the hollow fibres, respectively.

The annealed fibres constituted Prokiteins.

9.5.1. Rehydrated in 20% Glycerol

This example employed the same hollow fibres and annealing process as Example 9.5. However, rather than being washed with iso-propanol, the annealed hollow fibres were rehydrated in an aqueous solution comprising 20% glycerol (v/v) at room temperature for 10 minutes.

9.5.2. Rehydrated in Water

This example employed the same hollow fibres and annealing process as Example 9.5. However, rather than being washed with iso-propanol, the annealed hollow fibres were rehydrated in deionised water at room temperature for 20 minutes.

9.6. 21% SPI with 2.5% NAC pH 9.3, Crosslinked with Trisodium Citrate, Washed with Ethanol and Trisodium Citrate Covalently-crosslinked, semi-permeable, porous hollow fibres were initially produced as per Example 7.6, and washed with 40% (v/v) ethanol for 1 hour as per Example 8.5.

In Step (e.ii), the covalently-crosslinked, semi-permeable, porous hollow fibres were pre-dried at 40° C. for 2 hours in a dehydrator, thermally annealed at 175° C. for 1 hour in an electric convection oven, and then rehydrated via submersion in deionised water at room temperature for 30 minutes. The rehydrated fibres were then stored in an aqueous solution of 20% glycerol (v/v).

The annealed fibres constituted a Prokitein.

9.7. 21% SPI with 2.5% NAC pH 9.3 and 150% Canola Oil, Crosslinked with Trisodium Citrate and Sodium Hypophosphite, Washed with Ethanol This example employed the same annealing process as Example 9.1, but the covalently-crosslinked, semi-permeable, porous hollow fibres were initially produced as per Example 7.7 and washed with ethanol as per Example 8.6.

The annealed fibres constituted a Prokitein.

9.7.1. Rehydrated in 20% Glycerol

This example employed the same hollow fibres and annealing process as Example 9.7. However, the annealed hollow fibres were instead rehydrated in an aqueous solution comprising 20% glycerol (v/v) for 20 minutes.

9.7.2. Annealed in Oil

Covalently-crosslinked, semi-permeable, porous hollow fibres were initially produced as per Example 7.7 and washed with ethanol as per Example 8.6.

In Step (e.ii), the hollow fibres were annealed in a bath of canola oil at 130° C. for 30 minutes. The annealed fibres were removed from the oil, left to drip-dry, and then rehydrated via submersion in deionised water at room temperature for 10 minutes.

9.7.3. Different Annealing Temperatures

Covalently-crosslinked, semi-permeable, porous hollow fibres were initially produced as per Example 7.7.1 with a bore solution extrusion rate of 1.1 mL/h, and washed with 40% (v/v) ethanol for 1 hour as per Example 8.6.1.

In Step (e.ii), the covalently-crosslinked, semi-permeable, porous hollow fibres were pre-dried at 40° C. for 2 hours in a dehydrator, thermally annealed at 145° C. for 1 hour in an electric convection oven, and then rehydrated via submersion in deionised water at room temperature for 30 minutes. The rehydrated fibres were then stored in an aqueous solution of 20% glycerol (v/v).

Additional samples were annealed at 165, 175 and 185° C.

Further samples were initially produced as per Example 7.7.1 with a bore solution extrusion rate of 0.8 mL/h, washed with 40% (v/v) ethanol for 1 hour as per Example 8.6.1, and annealed at 175° C. as just described.

The annealed fibres constituted Prokiteins.

9.8. 21% SPI with 1% Sodium Sulphite and 270% Canola Oil, Crosslinked with Trisodium Citrate and Sodium Hypophosphite, Washed with Ethanol This example employed the same annealing process as Example 9.1, but the covalently-crosslinked, semi-permeable, porous hollow fibres were initially produced as per Example 7.8 and washed with ethanol as per Example 8.7.

9.8.1. Rehydrated in 20% Glycerol

This example employed the same hollow fibres and annealing process as Example 9.8. However, the annealed hollow fibres were instead rehydrated in an aqueous solution comprising 20% glycerol (v/v) for 20 minutes.

9.9. Different Fibre Thicknesses, Washed with Ethanol

9.9.1. G17/G24

This example employed the same annealing process as Example 9.5, but the covalently-crosslinked, semi-permeable, porous hollow fibres were initially produced as per Example 7.9.1 and washed with ethanol as per Example 8.8.1.

The annealed hollow fibres were then washed in iso-propanol to dehydrate them and remove any residual oils in preparation for imaging with a SEM. FIG. 22 (A-F) show SEM micrographs, in which, porous structures may be seen throughout.

9.9.1.1. Rehydrated in 20% Glycerol

This example employed the same hollow fibres and annealing process as Example 9.9.1. However, rather than being washed with iso-propanol, the annealed hollow fibres were rehydrated in an aqueous solution comprising 20% glycerol (v/v) at room temperature for 10 minutes.

9.9.1.2. Rehydrated in Water

This example employed the same hollow fibres and annealing process as Example 9.9.1. However, rather than being washed with iso-propanol, the annealed hollow fibres were rehydrated in deionised water at room temperature for 20 minutes.

9.9.2. G17/G25

This example employed the same annealing process as Example 9.5, but the covalently-crosslinked, semi-permeable, porous hollow fibres were initially produced as per Example 7.9.2 and washed with ethanol as per Example 8.8.2.

The annealed hollow fibres were then washed in iso-propanol to dehydrate them and remove any residual oils in preparation for imaging with a SEM. FIG. 23 and FIG. 24 (A-F) show SEM micrographs of the hollow fibres, in which, porous structures may be seen throughout. Analysis of these micrographs found that the median wall thickness of the hollow fibres was 156.55 µm.

9.9.2.1. Rehydrated in 20% Glycerol

This example employed the same hollow fibres and annealing process as Example 9.9.2. However, rather than being washed with iso-propanol, the annealed hollow fibres were rehydrated in an aqueous solution comprising 20% glycerol (v/v) at room temperature for 10 minutes.

9.9.2.2. Rehydrated in Water

This example employed the same hollow fibres and annealing process as Example 9.9.2. However, rather than being washed with iso-propanol, the annealed hollow fibres were rehydrated in deionised water at room temperature for 20 minutes.

9.9.3. G17/G30

This example employed the same annealing process as Example 9.1, but the covalently-crosslinked, semi-permeable, porous hollow fibres were initially produced as per Example 7.9.3 and washed with ethanol as per Example 8.8.3.

9.9.3.1. Rehydrated in 20% Glycerol

This example employed the same hollow fibres and annealing process as Example 9.9.3. However, the annealed hollow fibres were rehydrated in an aqueous solution comprising 20% glycerol (v/v) for 20 minutes.

9.10. 21% SPI with 2.5% NAC pH 9.3 and 150% Canola Oil, Crosslinked with Disodium Malate, Washed with Ethanol This example employs the same annealing process as Example 9.1, but the covalently-crosslinked, semi-permeable, porous hollow fibres are initially produced as per Example 7.10 and washed with ethanol as per Example 8.9.

9.10.1. Rehydrated in 20% Glycerol

This example employs the same hollow fibres and annealing process as Example 9.10. However, the annealed hollow fibres are rehydrated in rehydrated in an aqueous solution comprising 20% glycerol (v/v) for 20 minutes.

9.10.2. Annealed at 175° C.

Covalently-crosslinked, semi-permeable, porous hollow fibres were initially produced as per Example 7.10, and washed with 40% (v/v) ethanol for 1 hour as per Example 8.9. The fibres were then annealed and rehydrated as per Example 9.6.

The annealed fibres constituted a Prokitein.

9.11. 21% SPI with 2.5% NAC pH 9.3 and 150% Canola Oil Crosslinked with Disodium Malate and Sodium Hypophosphite, Washed with Ethanol This example employs the same annealing process as Example 9.1, but the covalently-crosslinked, semi-permeable, porous hollow fibres are initially produced as per Example 7.10.1 and washed with ethanol as per Example 8.9.1.

9.11.1. Rehydrated in 20% Glycerol

This example employs the same hollow fibres and annealing process as Example 9.11. However, the annealed hollow fibres are rehydrated in an aqueous solution comprising 20% glycerol (v/v) for 20 minutes.

9.11.2. Annealed at 175° C.

Covalently-crosslinked, semi-permeable, porous hollow fibres were initially produced as per Example 7.10.1, and washed with 40% (v/v) ethanol for 1 hour as per Example 8.9.1. The fibres were then annealed and rehydrated as per Example 9.6.

9.12. 21% SPI with 2.5% NAC pH 9.3, Crosslinked with Disodium Malate, Washed with Ethanol Covalently-crosslinked, semi-permeable, porous hollow fibres were initially produced as per Example 7.11, and washed with 40% (v/v) ethanol for 1 hour as per Example 8.10. The fibres were then annealed and rehydrated as per Example 9.6. SEM micrographs and the mechanical properties, including the Young's Modulus, Ultimate Tensile Stress and Ultimate Tensile Strain, of the fibres can be seen in FIG. 31(A1-A4) and FIG. 36X, FIG. 38X and FIG. 40X, respectively.

The annealed fibres constituted a Prokitein.

9.12.1. Crosslinked with Disodium Malate and Sodium Hypophosphite

Covalently-crosslinked, semi-permeable, porous hollow fibres were initially produced as per Example 7.11.1, and washed with 40% (v/v) ethanol for 1 hour as per Example 8.10.1. The fibres were then annealed and rehydrated as per Example 9.6. SEM micrographs and the mechanical properties, including the Young's Modulus, Ultimate Tensile Stress and Ultimate Tensile Strain, of the fibres can be seen in FIG. 31(B1-B4) and FIG. 36Y, FIG. 38Y and FIG. 40Y, respectively.

The annealed fibres constituted a Prokitein.

9.13. 15.25% SPI, 2.5% NAC, 1% Glycerol Crosslinked with Trisodium Citrate and Sodium Hypophosphite, Washed with Ethanol This example employs the same annealing process as Example 9.1, but the covalently-crosslinked, semi-permeable, porous hollow fibres are initially produced as per Example 7.12 and washed with ethanol as per Example 8.11.

9.13.1. Rehydrated in 20% Glycerol

This example employs the same hollow fibres and annealing process as Example 9.13. However, the annealed hollow fibres are rehydrated in an aqueous solution comprising 20% glycerol (v/v) for 20 minutes.

9.14. 21% SPI with 2.5% NAC and 3% Agar, Crosslinked with Disodium Malate, Washed with Ethanol This example employs the same annealing process as Example 9.1, but the covalently-crosslinked, semi-permeable, porous hollow fibres are initially produced as per Example 7.13.1 and washed with ethanol as per Example 8.12.

9.14.1. Rehydrated in 20% Glycerol

This example employs the same hollow fibres and annealing process as Example 9.14. However, the annealed hollow fibres are rehydrated in an aqueous solution comprising 20% glycerol (v/v) for 20 minutes.

9.15. 21% SPI with 2.5% NAC, 3% Agar and 150% Canola Oil, Crosslinked with Disodium Malate, Washed with Ethanol This example employs the same annealing process as Example 9.1, but the covalently-crosslinked, semi-permeable, porous hollow fibres are initially produced as per Example 7.15 and washed with ethanol as per Example 8.13.

9.15.1. Rehydrated in 20% Glycerol

This example employs the same hollow fibres and annealing process as Example 9.15. However, the annealed hollow fibres are rehydrated in an aqueous solution comprising 20% glycerol (v/v) for 20 minutes.

9.16. 21% SPI with 2.5% NAC and 5% Carrageenan-Kappa, Crosslinked with Disodium Malate, Washed with Ethanol This example employs the same annealing process as Example 9.1, but the covalently-crosslinked, semi-permeable, porous hollow fibres are initially produced as per Example 7.16 and washed with ethanol as per Example 8.14.

9.16.1. Rehydrated in 20% Glycerol

This example employs the same hollow fibres and annealing process as Example 9.16. However, the annealed hollow fibres are rehydrated in an aqueous solution comprising 20% glycerol (v/v) for 20 minutes.

9.17. 21% SPI with 2.5% NAC, 5% Carrageenan-Kappa and 150% Canola Oil Crosslinked with Disodium Malate, Washed with Ethanol This example employs the same annealing process as Example 9.1, but the covalently-crosslinked, semi-permeable, porous hollow fibres are initially produced as per Example 7.17 and washed with ethanol as per Example 8.15.

9.17.1. Rehydrated in 20% Glycerol

This example employs the same hollow fibres and annealing process as Example 9.17. However, the annealed hollow fibres are rehydrated in an aqueous solution comprising 20% glycerol (v/v) for 20 minutes.

9.18. 21% SPI with 2.5% NAC and 5% Carrageenan-Iota, Crosslinked with Disodium Malate, Washed with Ethanol This example employs the same annealing process as Example 9.1, but the covalently-crosslinked, semi-permeable, porous hollow fibres are initially produced as per Example 7.18 and washed with ethanol as per Example 8.16.

9.18.1. Rehydrated in 20% Glycerol

This example employs the same hollow fibres and annealing process as Example 9.18. However, the annealed hollow fibres are rehydrated in an aqueous solution comprising 20% glycerol (v/v) for 20 minutes.

9.19. 21% SPI with 2.5% NAC, 5% Carrageenan-Iota and 150% Canola Oil Crosslinked with Disodium Malate, Washed with Ethanol This example employs the same annealing process as Example 9.1, but the covalently-crosslinked, semi-permeable, porous hollow fibres are initially produced as per Example 7.19 and washed with ethanol as per Example 8.17.

9.19.1. Rehydrated in 20% Glycerol

This example employs the same hollow fibres and annealing process as Example 9.19. However, the annealed hollow fibres are rehydrated in an aqueous solution comprising 20% glycerol (v/v) for 20 minutes.

9.20. 21% SPI with 2.5% NAC and 2% SA, Crosslinked with Disodium Malate, Washed with Ethanol This example employs the same annealing process as Example 9.1, but the covalently-crosslinked, semi-permeable, porous hollow fibres are initially produced as per Example 7.20 and washed with ethanol as per Example 8.18.

9.20.1. Rehydrated in 20% Glycerol

This example employs the same hollow fibres and annealing process as Example 9.20. However, the annealed hollow fibres are rehydrated in an aqueous solution comprising 20% glycerol (v/v) for 20 minutes.

9.21. 21% SPI with 2.5% NAC, 2% SA and 150% Canola Oil Crosslinked with Disodium Malate, Washed with Ethanol This example employs the same annealing process as Example 9.1, but the covalently-crosslinked, semi-permeable, porous hollow fibres are initially produced as per Example 7.21 and washed with ethanol as per Example 8.19.

9.21.1. Rehydrated in 20% Glycerol

This example employs the same hollow fibres and annealing process as Example 9.21. However, the annealed hollow fibres are rehydrated in an aqueous solution comprising 20% glycerol (v/v) for 20 minutes.

9.22. 16% SPI with 2.5% NAC and 2% SA, Crosslinked with Disodium Malate, Washed with Ethanol Covalently-crosslinked, semi-permeable, porous hollow fibres were initially produced as per Example 7.10, and washed with 40% (v/v) ethanol for 1 hour as per Example 8.20. The fibres were then annealed and rehydrated as per Example 9.6.

The annealed fibres constituted a Prokitein.

9.22.1. Crosslinked with Disodium Malate and Sodium Hypophosphite

Covalently-crosslinked, semi-permeable, porous hollow fibres were initially produced as per Example 7.10.1, and washed with 40% (v/v) ethanol for 1 hour as per Example 8.20.1. The fibres were then annealed and rehydrated as per Example 9.6.

9.23. 16% SPI with 2.5% NAC, 2% SA, and 150% Canola Oil, Crosslinked with Disodium Malate, Washed with Ethanol Covalently-crosslinked, semi-permeable, porous hollow fibres were initially produced as per Example 7.23, and washed with 40% (v/v) ethanol for 1 hour as per Example 8.21. The fibres were then annealed and rehydrated as per Example 9.6.

9.23.1. Crosslinked with Disodium Malate and Sodium Hypophosphite

Covalently-crosslinked, semi-permeable, porous hollow fibres were initially produced as per Example 7.23.1, and washed with 40% (v/v) ethanol for 1 hour as per Example 8.21.1. The fibres were then annealed and rehydrated as per Example 9.6.

9.24. 12% SPI with 2.5% NAC, 2% SA, and 150% Canola Oil, Crosslinked with Disodium Malate, Washed with Ethanol Covalently-crosslinked, semi-permeable, porous hollow fibres were initially produced as per Example 7.24, and washed with 40% (v/v) ethanol for 1 hour as per Example 8.22. The fibres were then annealed and rehydrated as per Example 9.6.

9.25. 13% SPI with 1% Sodium Sulphite and 0.25-6 mol/L Urea, Crosslinked with Trisodium Citrate and Sodium Hypophosphite This example employs the same annealing process as Example 9.1, but the covalently-crosslinked, semi-permeable, porous hollow fibres are initially produced as per Example 8.23.

9.25.1. Rehydrated in 20% Glycerol

This example employs the same hollow fibres and annealing process as Example 9.25. However, the annealed hollow fibres are rehydrated in an aqueous solution comprising 20% glycerol (v/v) for 20 minutes.

9.26. 16% SPI with 2.5% NAC and 5% Sodium Carrageenan, Crosslinked with Disodium Malate Covalently-crosslinked, semi-permeable, porous hollow fibres are initially produced as per Example 7.25, and washed with 40% (v/v) ethanol for 1 hour as per Example 8.24. The fibres are then annealed and rehydrated as per Example 9.6.

9.27. 16% SPI with 2.5% NAC, 5% Sodium Carrageenan and 150% Canola Oil, Crosslinked with Disodium Malate Covalently-crosslinked, semi-permeable, porous hollow fibres are initially produced as per Example 7.26, and washed with 40% (v/v) ethanol for 1 hour as per Example 8.25. The fibres are then annealed and rehydrated as per Example 9.6.

9.28. Chickpea Protein

This example employs the same annealing process as Example 9.1, but the covalently-crosslinked, semi-permeable, porous hollow fibres are initially produced as per Example 7.27 and washed with ethanol as per Example 8.26.

9.28.1. Rehydrated in 20% Glycerol

This example employs the same hollow fibres and annealing process as Example 9.28. However, the annealed hollow fibres are instead rehydrated in an aqueous solution comprising 20% glycerol (v/v) for 20 minutes.

9.29. Pea Protein

This example employs the same annealing process as Example 9.1, but the covalently-crosslinked, semi-permeable, porous hollow fibres are initially produced as per Example 7.28 and washed with ethanol as per Example 8.27.

9.29.1. Rehydrated in 20% Glycerol

This example employs the same hollow fibres and annealing process as Example 9.29. However, the annealed hollow fibres are instead rehydrated in an aqueous solution comprising 20% glycerol (v/v) for 20 minutes.

9.29.2. 21% PP with 2.5% NAC and 150% Canola Oil, Crosslinked with Trisodium Citrate and Sodium Hypophosphite, Washed with Ethanol Covalently-crosslinked, semi-permeable, porous hollow fibres were initially produced as per Example 7.28.1, and washed with 40% (v/v) ethanol for 1 hour as per Example 8.27.1. The fibres were then annealed and rehydrated as per Example 9.6.

9.30. Sunflower Seed Protein

This example employs the same annealing process as Example 9.1, but the covalently-crosslinked, semi-permeable, porous hollow fibres are initially produced as per Example 7.29 and washed with ethanol as per Example 8.28.

9.30.1. Rehydrated in 20% Glycerol

This example employs the same hollow fibres and annealing process as Example 9.30. However, the annealed hollow fibres are instead rehydrated in an aqueous solution comprising 20% glycerol (v/v) for 20 minutes.

9.30.2. 21% SFSP with 2.5% NAC and 150% Canola Oil, Crosslinked with Trisodium Citrate and Sodium Hypophosphite, Washed with Ethanol Covalently-crosslinked, semi-permeable, porous hollow fibres were initially produced as per Example 7.29.1, and washed with 40% (v/v) ethanol for 1 hour as per Example 8.28.1. The fibres were then annealed and rehydrated as per Example 9.6.

The annealed fibres constituted a Prokitein.

9.31. Mung Bean Protein

This example employs the same annealing process as Example 9.1, but the covalently-crosslinked, semi-permeable, porous hollow fibres are initially produced as per Example 7.30 and washed with ethanol as per Example 8.29.

9.31.1. Rehydrated in 20% Glycerol

This example employs the same hollow fibres and annealing process as Example 9.31. However, the annealed hollow fibres are instead rehydrated in an aqueous solution comprising 20% glycerol (v/v) for 20 minutes.

9.31.2. 21% MBP with 2.5% NAC and 150% Canola Oil, Crosslinked with Trisodium Citrate and Sodium Hypophosphite, Washed with Ethanol Covalently-crosslinked, semi-permeable, porous hollow fibres were initially produced as per Example 7.30.1, and washed with 40% (v/v) ethanol for 1 hour as per Example 8.29.1. The fibres were then annealed and rehydrated as per Example 9.6.

The annealed fibres constituted a Prokitein.

9.32. Faba Bean Protein 9.32.1. 21% FBP with 2.5% NAC and 150% Canola Oil, Crosslinked with Trisodium Citrate and Sodium Hypophosphite, Washed with Ethanol Covalently-crosslinked, semi-permeable, porous hollow fibres were initially produced as per Example 7.31.1, and washed with 40% (v/v) ethanol for 1 hour as per Example 8.30.1. The fibres were then annealed and rehydrated as per Example 9.6.

The annealed fibres constituted a Prokitein.

9.32.2. 21% FBP with 2.5% NAC, Crosslinked with Trisodium Citrate, Washed with Ethanol Covalently-crosslinked, semi-permeable, porous hollow fibres were initially produced as per Example 7.31.2, and washed with 40% (v/v) ethanol for 1 hour as per Example 8.30.2. The fibres were then annealed and rehydrated as per Example 9.6.

The annealed fibres constituted a Prokitein.

9.33. Soy Protein Isolate and Chickpea Protein

This example employs the same annealing process as Example 9.1, but the covalently-crosslinked, semi-permeable, porous hollow fibres are initially produced as per Example 7.32 and washed with ethanol as per Example 8.31.

The annealed fibres constituted a Prokitein alloy.

9.33.1. Rehydrated in 20% Glycerol

This example employs the same hollow fibres and annealing process as Example 9.33. However, the annealed hollow fibres are instead rehydrated in an aqueous solution comprising 20% glycerol (v/v) for 20 minutes.

9.34. Pea Protein and Sunflower Seed Protein

This example employs the same annealing process as Example 9.1, but the covalently-crosslinked, semi-permeable, porous hollow fibres are initially produced as per Example 7.33 and washed with ethanol as per Example 8.32.

The annealed fibres constituted a Prokitein alloy.

9.34.1. Rehydrated in 20% Glycerol

This example employs the same hollow fibres and annealing process as Example 9.34. However, the annealed hollow fibres are instead rehydrated in an aqueous solution comprising 20% glycerol (v/v) for 20 minutes.

9.34.2. 10.5% PP and 10.5% SFSP with 2.5% NAC and 150% Canola Oil,

Crosslinked with Trisodium Citrate and Sodium Hypophosphite, Washed with Ethanol Covalently-crosslinked, semi-permeable, porous hollow fibres were initially produced as per Example 7.33.1, and washed with 40% (v/v) ethanol for 1 hour as per Example 8.32.1. The fibres were then annealed and rehydrated as per Example 9.6.

The annealed fibres constituted a Prokitein alloy.

9.35. Mung Bean Protein and Beef Protein

This example employs the same annealing process as Example 9.1, but the covalently-crosslinked, semi-permeable, porous hollow fibres are initially produced as per Example 7.34 and washed with ethanol as per Example 8.33.

The annealed fibres constitute a Prokitein alloy.

9.35.1. Rehydrated in 20% Glycerol

This example employs the same hollow fibres and annealing process as Example 9.35. However, the annealed hollow fibres are instead rehydrated in an aqueous solution comprising 20% glycerol (v/v) for 20 minutes.

9.36. Soy Protein Isolate and Mung Bean Protein

This example employs the same annealing process as Example 9.1, but the covalently-crosslinked, semi-permeable, porous hollow fibres are initially produced as per Example 7.35 and washed with ethanol as per Example 8.34.

The annealed fibres constituted a Prokitein alloy.

9.36.1. Rehydrated in 20% Glycerol

This example employs the same hollow fibres and annealing process as Example 9.36. However, the annealed hollow fibres are instead rehydrated in an aqueous solution comprising 20% glycerol (v/v) for 20 minutes.

9.36.2. 9% SPI and 9% MBP with 2.5% NAC, Crosslinked with Disodium Malate and Sodium Hypophosphite, Washed with Ethanol Covalently-crosslinked, semi-permeable, porous hollow fibres were initially produced as per Example 7.35.2, and washed with 40% (v/v) ethanol for 1 hour as per Example 8.34.1. The fibres were then annealed and rehydrated as per Example 9.6.

The annealed fibres constituted a Prokitein alloy.

9.36.3. 10% SPI and 10% MBP with 2.5% NAC, Crosslinked with Trisodium Citrate and Sodium Hypophosphite, Washed with Ethanol Covalently-crosslinked, semi-permeable, porous hollow fibres were initially produced as per Example 7.35.3, and washed with 40% (v/v) ethanol for 1 hour as per Example 8.34.2. The fibres were then annealed and rehydrated as per Example 9.6.

9.36.4. 9% SPI and 9% MBP with 2.5% NAC and 150% Canola Oil, Crosslinked with Trisodium Citrate and Sodium Hypophosphite, Washed with Ethanol Covalently-crosslinked, semi-permeable, porous hollow fibres were initially produced as per Example 7.35.4, and washed with 40% (v/v) ethanol for 1 hour as per Example 8.34.3. The fibres were then annealed and rehydrated as per Example 9.6.

9.36.5. 9% SPI and 9% MBP with 2.5% NAC and 150% Canola Oil, Crosslinked with Disodium Malate, Washed with Ethanol Covalently-crosslinked, semi-permeable, porous hollow fibres were initially produced as per Example 7.35.5, and washed with 40% (v/v) ethanol for 1 hour as per Example 8.34.4. The fibres were then annealed and rehydrated as per Example 9.6.

The annealed fibres constituted a Prokitein alloy.

9.36.6. 9% SPI and 9% MBP with 2.5% NAC and 150% Canola Oil, Crosslinked with Disodium Malate and Sodium Hypophosphite, Washed with Ethanol Covalently-crosslinked, semi-permeable, porous hollow fibres were initially produced as per Example 7.35.6, and washed with 40% (v/v) ethanol for 1 hour as per Example 8.34.5. The fibres were then annealed and rehydrated as per Example 9.6.

9.36.7. 9% SPI and 9% MBP with 2.5% NAC and 2% SA, Crosslinked with Disodium Malate and Sodium Hypophosphite, Washed with Ethanol Covalently-crosslinked, semi-permeable, porous hollow fibres were initially produced as per Example 7.35.7, and washed with 40% (v/v) ethanol for 1 hour as per Example 8.34.6. The fibres were then annealed and rehydrated as per Example 9.6.

9.37. Soy Protein Isolate and Faba Bean Protein 9.37.1. 10.5% SPI and 10.5% FBP with 2.5% NAC, Crosslinked with Disodium Malate, Washed with Ethanol Covalently-crosslinked, semi-permeable, porous hollow fibres were initially produced as per Example 7.36.1, and washed with 40% (v/v) ethanol for 1 hour as per Example 8.35.1. The fibres were then annealed and rehydrated as per Example 9.6.

The annealed fibres constituted a Prokitein alloy.

9.37.2. 8% SPI and 8% FBP with 2.5% NAC and 2% SA, Crosslinked with Disodium Malate, Washed with Ethanol Covalently-crosslinked, semi-permeable, porous hollow fibres were initially produced as per Example 7.36.2, and washed with 40% (v/v) ethanol for 1 hour as per Example 8.35.2. The fibres were then annealed and rehydrated as per Example 9.6.

9.37.2.1. Washed with Iso-Propanol

Initially, covalently-crosslinked, semi-permeable, porous hollow fibres, are produced as per Example 7.36.2 and washed with iso-propanol for 1 hour as per Example 8.35.2.1. The fibres were then annealed and rehydrated as per Example 9.6.

9.37.2.2. Washed with n-Propanol

Initially, covalently-crosslinked, semi-permeable, porous hollow fibres, are produced as per Example 7.36.2 and washed with n-propanol for 1 hour as per Example 8.35.2.2. The fibres were then annealed and rehydrated as per Example 9.6.

9.37.2.3. Washed with Methanol

Initially, covalently-crosslinked, semi-permeable, porous hollow fibres, are produced as per Example 7.36.2 and washed with methanol for 1 hour as per Example 8.35.2.3. The fibres were then annealed and rehydrated as per Example 9.6.

9.37.2.4. Washed with Acetone

Initially, covalently-crosslinked, semi-permeable, porous hollow fibres, are produced as per Example 7.36.2 and washed with acetone for 1 hour as per Example 8.35.2.4. The fibres were then annealed and rehydrated as per Example 9.6.

9.37.3. 8% SPI and 8% FBP with 2.5% NAC, 2% SA and 150% Canola Oil, Crosslinked with Disodium Malate, Washed with Ethanol Covalently-crosslinked, semi-permeable, porous hollow fibres were initially produced as per Example 7.36.3, and washed with 40% (v/v) ethanol for 1 hour as per Example 8.35.3. The fibres were then annealed and rehydrated as per Example 9.6.

9.37.4. 8% SPI and 8% FBP with 2.5% NAC, 2% SA and 150% Canola Oil, Crosslinked with Disodium Malate and Sodium Hypophosphite, Washed with Ethanol Covalently-crosslinked, semi-permeable, porous hollow fibres were initially produced as per Example 7.36.4, and washed with 40% (v/v) ethanol for 1 hour as per Example 8.35.4. The fibres were then annealed and rehydrated as per Example 9.6.

The annealed fibres constituted a Prokitein.

9.38. Sunflower Seed Protein and Mung Bean Protein 9.38.1. 9% SFSP and 9% MBP with 2.5% NAC, Crosslinked with Trisodium Citrate, Washed with Ethanol Covalently-crosslinked, semi-permeable, porous hollow fibres were initially produced as per Example 7.37.1, and washed with 40% (v/v) ethanol for 1 hour as per Example 8.36.1. The fibres were then annealed and rehydrated as per Example 9.6.

9.38.2. 8% SFSP and 8% MBP with 2.5% NAC and 150% Canola Oil, Crosslinked with Trisodium Citrate, Washed with Ethanol Covalently-crosslinked, semi-permeable, porous hollow fibres were initially produced as per Example 7.37.2, and washed with 40% (v/v) ethanol for 1 hour as per Example 8.36.2. The fibres were then annealed and rehydrated as per Example 9.6.

10. Removal of Void Fraction Elements 10.1. Removal of $CaCO_3$ with Citric Acid The covalently-crosslinked, semi-permeable, porous hollow fibres were initially produced as per Example 7.3.3, from an SPI-based dope solution that comprised 15% $CaCO_3$ (v/v fourth composition). However, Step (e.iii), described as follows, was carried out prior to Steps (e.i) and (e.ii).

In Step (e.iii), the hollow fibres were drawn from a spool into an aqueous bath comprising 1.041 mol/L citric acid and left submerged for 20 minutes at room temperature. The citric acid in the bath reacted with the $CaCO_3$ in a simple acid-base reaction, forming carbon dioxide and water, as observed in the form of gas bubbles emerging on the surface of the hollow fibres. The removal of $CaCO_3$ from the walls of the hollow fibres increased their porosity.

The hollow fibres were subsequently recollected on a secondary rotating spool and then subjected to an organic solvent wash and thermal annealing, as described in Example 7.3.3.

10.2. Removal of Sunflower Oil with Ethanol 10.2.1. 26% SPI with 1% Sodium Sulphite and 10% Sunflower Oil (Third Composition), Crosslinked with Trisodium Citrate and Sodium Hypophosphite, Washed with Ethanol, Annealed Covalently-crosslinked, semi-permeable, porous hollow fibres are initially produced as per Example 9.3.1.

In Step (e.iii), the hollow fibres are submerged in an aqueous solution comprising 50% (v/v) ethanol for 3 hours at room temperature to remove any residual sunflower oil and other lipids.

The hollow fibres are then subsequently rehydrated in an aqueous solution comprising 20% glycerol (v/v) for 20 minutes.

10.2.2. 26% SPI with 1% Sodium Sulphite and 10% Sunflower Oil (Fourth Composition), Crosslinked with Trisodium Citrate and Sodium Hypophosphite, Washed with Ethanol, Annealed Covalently-crosslinked, semi-permeable, porous hollow fibres are initially produced as per Example 9.3.2, and then washed with ethanol as per Example 10.2.1, but with an ethanol concentration of 60% (v/v) and for a duration of 2 hours.

10.2.3. 26% SPI with 1% Sodium Sulphite, 10% Sunflower Oil and 15% $CaCO_3$, Crosslinked with Trisodium Citrate and Sodium Hypophosphite, Washed with Ethanol, Annealed Covalently-crosslinked, semi-permeable, porous hollow fibres are initially produced as per Example 9.3.3, and then washed with 50% (v/v) ethanol for 3 hours as per Example 10.2.1.

10.2.4. 26% SPI with 1% Sodium Sulphite, 10% Sunflower Oil and 15% $CaCO_3$, (Aerated), Crosslinked with Trisodium Citrate and Sodium Hypophosphite, Washed with Ethanol, Annealed Covalently-crosslinked, semi-permeable, porous hollow fibres are initially produced as per Example 9.3.4, and then washed with ethanol for 1 hour as per Example 10.2.1, but with an ethanol concentration of 70% (v/v).

10.2.5. 26% SPI with 1% Sodium Sulphite, 10% Sunflower Oil, 15% $CaCO_3$, and 7% Chitosan, Crosslinked with Trisodium Citrate and Sodium Hypophosphite, Washed with Ethanol, Annealed Covalently-crosslinked, semi-permeable, porous hollow fibres are initially produced as per Example 9.3.5, and then washed with ethanol as per Example 10.2.1, but with an ethanol concentration of 55% (v/v) and a duration of 4 hours.

10.3. Removal of Sunflower Oil with Iso-Propanol 10.3.1. 26% SPI with 1% Sodium Sulphite and 10% Sunflower Oil (Third Composition), Crosslinked with Trisodium Citrate and Sodium Hypophosphite, Washed with Ethanol, Annealed Covalently-crosslinked, semi-permeable, porous hollow fibres are initially produced as per Example 9.3.1.

In Step (e.iii), the hollow fibres are then submerged in an aqueous solution of 95% (v/v) iso-propanol for 1 hour at room temperature to remove any residual sunflower oil and other lipids.

10.3.2. 26% SPI with 1% Sodium Sulphite and 10% Sunflower Oil (Fourth Composition), Crosslinked with Trisodium Citrate and Sodium Hypophosphite, Washed with Ethanol, Annealed Covalently-crosslinked, semi-permeable, porous hollow fibres are initially produced as per Example 9.3.2, and then washed with iso-propanol as per Example 10.3.1, but with an iso-propanol concentration of 60% (v/v) and for a duration of 2 hours.

10.3.3. 26% SPI with 1% Sodium Sulphite, 10% Sunflower Oil and 15% $CaCO_3$, Crosslinked with Trisodium Citrate and Sodium Hypophosphite, Washed with Ethanol, Annealed Covalently-crosslinked, semi-permeable, porous hollow fibres are initially produced as per Example 9.3.3, and then washed with iso-propanol as per Example 10.3.1, but with an iso-propanol concentration of 75% (v/v) and for a duration of 90 minutes 10.3.4. 26% SPI with 1% Sodium Sulphite, 10% Sunflower Oil and 15% $CaCO_3$, (Aerated), Crosslinked with Trisodium Citrate and Sodium Hypophosphite, Washed with Ethanol, Annealed Covalently-crosslinked, semi-permeable, porous hollow fibres are initially produced as per Example 9.3.4, and then washed with 95% (v/v) iso-propanol for 1 hour as per Example 10.3.1.

10.3.5. 26% SPI with 1% Sodium Sulphite, 10% Sunflower Oil, 15% $CaCO_3$, and 7% Chitosan, Crosslinked with Trisodium Citrate and Sodium Hypophosphite, Washed with Ethanol, Annealed Covalently-crosslinked, semi-permeable, porous hollow fibres are initially produced as per Example 9.3.5, and then washed with iso-propanol as per Example 10.2.1, but with an iso-propanol concentration of 60% (v/v) and a duration of 30 minutes.

10.4. Removal of Canola Oil with Ethanol 10.4.1. 16% SPI with Sodium Sulphite and 115% Canola Oil, Crosslinked with Trisodium Citrate and Sodium Hypophosphite in Ethanol, Annealed Covalently-crosslinked, semi-permeable, porous hollow fibres were initially produced as per Example 9.4.

In Step (e.iii), the hollow fibres were submerged in an aqueous ethanol (96%, v/v) for 30 minutes at room temperature to remove any residual canola oil and other lipids.

The hollow fibres were subsequently rehydrated in an aqueous solution comprising 20% glycerol (v/v) for 20 minutes.

10.4.2. 21% SPI with 2.5% Sodium Sulphite and 150% Canola Oil, Crosslinked with Trisodium Citrate and Sodium Hypophosphite, Washed with Ethanol, Annealed Covalently-crosslinked, semi-permeable, porous hollow fibres, initially produced as per Example 9.5, were washed with ethanol as per Example 10.4.1, but with an ethanol concentration of 80% (v/v) and a duration of 2 hours.

10.4.3. 21% SPI with 2.5% NAC at pH 9.3 and 150% Canola Oil, Crosslinked with Trisodium Citrate and Sodium Hypophosphite, Washed with Ethanol, Annealed Covalently-crosslinked, semi-permeable, porous hollow fibres, initially produced as per Example 9.7, were washed with ethanol as per Example 10.4.1, but with an ethanol concentration of 50% (v/v) and a duration of 2 hours.

10.4.4. 21% SPI with 1% Sodium Sulphite and 270% Canola Oil, Crosslinked with Trisodium Citrate and Sodium Hypophosphite, Washed with Ethanol, Annealed Covalently-crosslinked, semi-permeable, porous hollow fibres, initially produced as per Example 9.8, were washed with ethanol as per Example 10.4.1, but with an ethanol concentration of 65% (v/v) and a duration of 3 hours.

10.4.5. Different Fibre Thicknesses, Washed with Ethanol, Annealed 10.4.5.1. G17/G24

Covalently-crosslinked, semi-permeable, porous hollow fibres, initially produced as per Example 9.9.1, were washed with ethanol as per Example 10.4.1, but with an ethanol concentration of 90% (v/v) and a duration of 10 minutes.

10.4.5.2. G17/G25

Covalently-crosslinked, semi-permeable, porous hollow fibres, initially produced as per Example 9.9.2, were washed with ethanol as per Example 10.4.1, but with an ethanol concentration of 95% (v/v) and a duration of 45 minutes.

10.4.5.3. G17/G30

Covalently-crosslinked, semi-permeable, porous hollow fibres, initially produced as per Example 9.9.3, were washed with ethanol as per Example 10.4.1, but with an ethanol concentration of 70% (v/v) and a duration of 1 hour.

10.4.6. 21% SPI with 2.5% NAC at pH 9.3 and 150% Canola Oil, Crosslinked with Disodium Malate, Washed with Ethanol, Annealed Covalently-crosslinked, semi-permeable, porous hollow fibres, initially produced as per Example 9.10, are washed with ethanol as per Example 10.4.1, but with an ethanol concentration of 55% (v/v) and a duration of 1 hour.

10.4.7. 21% SPI with 2.5% NAC pH 9.3 and 150% Canola Oil, Crosslinked with Disodium Malate and Sodium Hypophosphite, Washed with Ethanol, Annealed Covalently-crosslinked, semi-permeable, porous hollow fibres, initially produced as per Example 9.11, are washed with ethanol as per Example 10.4.1, but with an ethanol concentration of 96% (v/v) and a duration of 30 minutes.

10.4.8. 15.25% SPI, 2.5% NAC, 1% Glycerol, Crosslinked with Trisodium Citrate and Sodium Hypophosphite, Washed with Ethanol, Annealed Covalently-crosslinked, semi-permeable, porous hollow fibres are initially produced as per Example 9.13, and washed with ethanol as per Example 10.4.1, but with an ethanol concentration of 75% (v/v) and a duration of 2 hours.

10.4.9. 21% SPI with 2.5% NAC, 3% Agar and 150% Canola Oil, Crosslinked with Disodium Malate, Washed with Ethanol, Annealed Covalently-crosslinked, semi-permeable, porous hollow fibres, initially produced as per Example 9.15, are washed with ethanol as per Example 10.4.1, but with an ethanol concentration of 75% (v/v) and a duration of 60 minutes.

10.4.10. 21% SPI with 2.5% NAC, 5% Carrageenan-Kappa and 150% Canola Oil, Crosslinked with Disodium Malate, Washed with Ethanol, Annealed Covalently-crosslinked, semi-permeable, porous hollow fibres, initially produced as per Example 9.17, are washed with ethanol as per Example 10.4.1, but with an ethanol concentration of 90% (v/v) and a duration of 110 minutes.

10.4.11. 21% SPI with 2.5% NAC, 5% Carrageenan-Iota and 150% Canola Oil, Crosslinked with Disodium Malate, Washed with Ethanol, Annealed Covalently-crosslinked, semi-permeable, porous hollow fibres, initially produced as per Example 9.19, are washed with ethanol as per Example 10.4.1, but with an ethanol concentration of 60% (v/v) and a duration of 90 minutes.

10.4.12. 21% SPI with 2.5% NAC, 2% SA and 150% Canola Oil, Crosslinked with Disodium Malate, Washed with Ethanol, Annealed Covalently-crosslinked, semi-permeable, porous hollow fibres, initially produced as per Example 9.21, are washed with ethanol as per Example 10.4.1, but with an ethanol concentration of 40% (v/v) and a duration of 20 minutes.

10.4.13. 13% SPI with 1% Sodium Sulphite and 0.25-6 mol/L Urea, Crosslinked with Trisodium Citrate and Sodium Hypophosphite, Washed with Ethanol, Annealed Covalently-crosslinked, semi-permeable, porous hollow fibres, initially produced as per Example 9.25, are washed with ethanol as per Example 10.4.1, but with an ethanol concentration of 95% (v/v) and a duration of 40 minutes.

10.4.14. 16% SPI with 2.5% NAC, 5% Sodium Carrageenan and 150% Canola Oil, Crosslinked with Disodium Malate, Washed with Ethanol, Annealed Covalently-crosslinked, semi-permeable, porous hollow fibres, initially produced as per Example 9.27 are washed with ethanol as per Example 10.4.1, but with an ethanol concentration of 95% (v/v) and a duration of 40 minutes.

10.4.15. Chickpea Protein

Covalently-crosslinked, semi-permeable, porous hollow fibres, initially produced as per Example 9.28, are washed with ethanol as per Example 10.4.1, but with an ethanol concentration of 85% (v/v) and a duration of 1 hour.

10.4.16. Pea Protein

Covalently-crosslinked, semi-permeable, porous hollow fibres, initially produced as per Example 9.29, are washed with ethanol as per Example 10.4.1, but with an ethanol concentration of 70% (v/v) and a duration of 3 hours.

10.4.17. Sunflower Seed Protein

Covalently-crosslinked, semi-permeable, porous hollow fibres, initially produced as per Example 9.30, are washed with ethanol as per Example 10.4.1, but with an ethanol concentration of 92% (v/v) and a duration of 5 minutes.

10.4.18. Mung Bean Protein

Covalently-crosslinked, semi-permeable, porous hollow fibres, initially produced as per Example 9.31, are washed with ethanol as per Example 10.4.1, but with an ethanol concentration of 80% (v/v) and a duration of 90 minutes.

10.4.19. Soy Protein Isolate and Chickpea Protein

Covalently-crosslinked, semi-permeable, porous hollow fibres, initially produced as per Example 9.33, are washed with ethanol as per Example 10.4.1, but with an ethanol concentration of 60% (v/v) and a duration of 30 minutes.

10.4.20. Pea Protein and Sunflower Seed Protein

Covalently-crosslinked, semi-permeable, porous hollow fibres, initially produced as per Example 9.34, are washed with ethanol as per Example 10.4.1, but with an ethanol concentration of 80% (v/v) and a duration of 90 minutes.

10.4.21. Mung Bean Protein and Beef Protein

Covalently-crosslinked, semi-permeable, porous hollow fibres, initially produced as per Example 9.35, are washed with ethanol as per Example 10.4.1, but with an ethanol concentration of 90% (v/v) and a duration of 45 minutes.

10.4.22. Soy Protein Isolate and Mung Bean Protein

Covalently-crosslinked, semi-permeable, porous hollow fibres, initially produced as per Example 9.36, are washed with ethanol as per Example 10.4.1, but with an ethanol concentration of 95% (v/v) and a duration of 60 minutes.

10.5. Removal of Canola Oil with Iso-Propanol 10.5.1. 16% SPI with Sodium Sulphite and 115% Canola Oil, Crosslinked with Trisodium Citrate and Sodium Hypophosphite in Ethanol, Annealed Covalently-crosslinked, semi-permeable, porous hollow fibres were initially produced as per Example 9.4.

In Step (e.iii), the hollow fibres were submerged in an aqueous iso-propanol (50%, v/v) for 3 hours at room temperature to remove any residual canola oil and other lipids.

The hollow fibres were subsequently rehydrated in an aqueous solution comprising 20% glycerol (v/v) for 1 hour.

10.5.2. 21% SPI with 2.5% Sodium Sulphite and 150% Canola Oil, Crosslinked with Trisodium Citrate and Sodium Hypophosphite, Washed with Ethanol, Annealed Covalently-crosslinked, semi-permeable, porous hollow fibres, initially produced as per Example 9.5, were washed with iso-propanol as per Example 10.5.1, but with an iso-propanol concentration of 80% (v/v) and a duration of 2 hours.

10.5.3. 21% SPI with 2.5% NAC, Crosslinked with Trisodium Citrate, Washed with Ethanol and Trisodium Citrate, Annealed Covalently-crosslinked, semi-permeable, porous hollow fibres, initially produced and annealed as per Example 9.6, were submerged in 99.8% iso-propanol (v/v) overnight.

A portion of the washed fibres were separated and prepared for imaging with a SEM (FIG. 32(A1-A2)) The remaining fibres were transferred into phosphate-buffered saline (PBS) solution with 1% Antibiotic Antimycotic Solution and incubated at 37° C. Samples were periodically withdrawn and the Young's Modulus (FIG. 36AA), Ultimate Tensile Stress (FIG. 38AA) and Ultimate Tensile Strain (FIG. 40AA) assessed with uniaxial tensile testing.

10.5.4. 21% SPI with 2.5% NAC at pH 9.3 and 150% Canola Oil, Crosslinked with Trisodium Citrate and Sodium Hypophosphite, Washed with Ethanol, Annealed Covalently-crosslinked, semi-permeable, porous hollow fibres, initially produced as per Example 9.7, were washed with iso-propanol as per Example 10.5.1, but with an iso-propanol concentration of 96% (v/v) and a duration of 1 hour.

10.5.4.1. Different Annealing Temperatures

Covalently-crosslinked, semi-permeable, porous hollow fibres, initially produced and annealed as per Example 9.7.3, were washed in iso-propanol and processed as per Example 10.5.3.

Samples, initially produced with a bore solution extrusion rate of 1.1 mL/h, were annealed at 145, 165, 175 and 185° C. As seen in FIG. 33, an increase in annealing temperature was found to increase the Young's Modulus and Ultimate Tensile Stress and decrease the Ultimate Tensile Strain.

The long-term water stability of the hollow fibres annealed at 175° C. was assessed by submerging the annealed fibres in PBS solution with 1% (v/v) Antimycotic-Antibiotic at 37° C. for 36 days. The full time profile of the Young's Modulus, Ultimate Tensile Stress and Ultimate Tensile Strain can be seen in FIG. 34, and is compared with other hollow fibres in FIG. 36AB, FIG. 38AB and FIG. 40AB, respectively.

The pore size distribution of the hollow fibres annealed at 175° C. was measured with mercury porosimetry. The pore size ranged between was 6.45 nm and 6.57 µm, with a volume weighted mean pore size of 1.89 µm. The pore size distribution can be seen in FIG. 41.

Additional hollow fibres were produced as just described, but with a bore solution extrusion rate of 0.8 mL/h and an annealing temperature of 175° C. The time profile of the Young's Modulus, Ultimate Tensile Stress and Ultimate Tensile Strain of these fibres can be seen in FIG. 36AB, FIG. 38AB and FIG. 40AB, respectively.

10.5.5. 21% SPI with 1% Sodium Sulphite and 270% Canola Oil, Crosslinked with Trisodium Citrate and Sodium Hypophosphite, Washed with Ethanol, Annealed Covalently-crosslinked, semi-permeable, porous hollow fibres, initially produced as per Example 9.8, were washed with iso-propanol as per Example 10.5.1, but with an iso-propanol concentration of 85% (v/v) and a duration of 1 hour and 20 minutes.

10.5.6. Different Fibre Thicknesses, Washed with Ethanol, Annealed 10.5.6.1. G17/G24

Covalently-crosslinked, semi-permeable, porous hollow fibres, initially produced as per Example 9.9.1, were washed with iso-propanol as per Example 10.5.1, but with an iso-propanol concentration of 70% (v/v) and a duration of 40 minutes.

10.5.6.2. G17/G25

Covalently-crosslinked, semi-permeable, porous hollow fibres, initially produced as per Example 9.9.2, were washed with iso-propanol as per Example 10.5.1, but with an iso-propanol concentration of 95% (v/v) and a duration of 2 hours.

10.5.6.3. G17/G30

Covalently-crosslinked, semi-permeable, porous hollow fibres, initially produced as per Example 9.9.3, were washed with iso-propanol as per Example 10.5.1, but with an iso-propanol concentration of 55% (v/v) and a duration of 2 hours 45 minutes.

10.5.7. 21% SPI with 2.5% NAC at pH 9.3 and 150% Canola Oil, Crosslinked with Disodium Malate, Washed with Ethanol, Annealed Covalently-crosslinked, semi-permeable, porous hollow fibres, initially produced as per Example 9.10, are washed with iso-propanol as per Example 10.5.1, but with an iso-propanol concentration of 95% (v/v) and a duration of 90 minutes.

10.5.7.1. Revisited

Covalently-crosslinked, semi-permeable, porous hollow fibres, initially produced and annealed as per Example 9.10.2, were washed in iso-propanol and processed as per Example 10.5.3.

SEM micrographs and the mechanical properties, including the Young's Modulus, Ultimate Tensile Stress and Ultimate Tensile Strain, of the fibres can be seen in FIG. 32(E1-E2) and FIG. 36W, FIG. 38W and FIG. 40W, respectively.

10.5.8. 21% SPI with 2.5% NAC pH 9.3 and 150% Canola Oil, Crosslinked with Disodium Malate and Sodium Hypophosphite, Washed with Ethanol, Annealed Covalently-crosslinked, semi-permeable, porous hollow fibres, initially produced as per Example 9.11, are washed with iso-propanol as per Example 10.5.1, but with an iso-propanol concentration of 85% (v/v) and a duration of 1 hour.

10.5.8.1. Revisited

Covalently-crosslinked, semi-permeable, porous hollow fibres, initially produced and annealed as per Example 9.11.2, were washed in iso-propanol and processed as per Example 10.5.3. SEM micrographs and the mechanical properties, including the Young's Modulus, Ultimate Tensile Stress and Ultimate Tensile Strain, of the fibres can be seen in FIG. 32(F1-F2) and FIG. 36Z, FIG. 38Z and FIG. 40Z, respectively.

10.5.9. 15.25% SPI, 2.5% NAC, 1% Glycerol, Crosslinked with Trisodium Citrate and Sodium Hypophosphite, Washed with Ethanol, Annealed Covalently-crosslinked, semi-permeable, porous hollow fibres are initially produced as per Example 9.13, and then washed with iso-propanol as per Example 10.5.1, but with an iso-propanol concentration of 80% (v/v) and a duration of 20 minutes.

10.5.10. 21% SPI with 2.5% NAC, 3% Agar and 150% Canola Oil, Crosslinked with Disodium Malate, Washed with Ethanol, Annealed Covalently-crosslinked, semi-permeable, porous hollow fibres, initially produced as per Example 9.15, are washed with iso-propanol as per Example 10.5.1, but with an iso-propanol concentration of 95% (v/v) and a duration of 60 minutes.

10.5.11. 21% SPI with 2.5% NAC, 5% Carrageenan-Kappa and 150% Canola Oil, Crosslinked with Disodium Malate, Washed with Ethanol, Annealed Covalently-crosslinked, semi-permeable, porous hollow fibres, initially produced as per Example 9.17, are washed with iso-propanol as per Example 10.5.1, but with an iso-propanol concentration of 60% (v/v) and a duration of 60 minutes.

10.5.12. 21% SPI with 2.5% NAC, 5% Carrageenan-Iota and 150% Canola Oil, Crosslinked with Disodium Malate, Washed with Ethanol, Annealed Covalently-crosslinked, semi-permeable, porous hollow fibres, initially produced as per Example 9.19, are washed with iso-propanol as per Example 10.5.1, but with an iso-propanol concentration of 80% (v/v) and a duration of 90 minutes.

10.5.13. 21% SPI with 2.5% NAC, 2% SA and 150% Canola Oil, Crosslinked with Disodium Malate, Washed with Ethanol, Annealed Covalently-crosslinked, semi-permeable, porous hollow fibres, initially produced as per Example 9.21, are washed with iso-propanol as per Example 10.5.1, but with an iso-propanol concentration of 40% (v/v) and a duration of 120 minutes.

10.5.14. 16% SPI with 2.5% NAC and 2% SA, Crosslinked with Disodium Malate, Washed with Ethanol, Annealed Covalently-crosslinked, semi-permeable, porous hollow fibres, initially produced and annealed as per Example 9.22, were washed in iso-propanol and processed as per Example 10.5.3. The mechanical properties, including the Young's Modulus, Ultimate Tensile Stress and Ultimate Tensile Strain, of the fibres can be seen in FIG. 35G, FIG. 37G and FIG. 39G, respectively.

SEM micrographs in FIG. 31(C1-C4) show a hollow fibre with an asymmetric integrally skinned structure.

10.5.14.1. Crosslinked with Disodium Malate and Sodium Hypophosphite

Covalently-crosslinked, semi-permeable, porous hollow fibres, initially produced and annealed as per Example 9.22.1, were washed in iso-propanol and processed as per Example 10.5.14. The mechanical properties, including the Young's Modulus, Ultimate Tensile Stress and Ultimate Tensile Strain, of the fibres can be seen in FIG. 35H, FIG. 37H and FIG. 39H, respectively.

SEM micrographs in FIG. 32(B1-B2) show a hollow fibre with an asymmetric integrally skinned structure.

10.5.15. 16% SPI with 2.5% NAC, 2% SA, and 150% Canola Oil, Crosslinked with Disodium Malate, Washed with Ethanol, Annealed Covalently-crosslinked, semi-permeable, porous hollow fibres, initially produced and annealed as per Example 9.23, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 26(C1-C4) and FIG. 35E, FIG. 37E and FIG. 39E, respectively.

10.5.15.1. Crosslinked with Disodium Malate and Sodium Hypophosphite

Covalently-crosslinked, semi-permeable, porous hollow fibres, initially produced and annealed as per Example 9.23.1, were washed in iso-propanol and processed as per Example 10.5.14.

SEM micrographs and the mechanical properties, including the Young's Modulus, Ultimate Tensile Stress and Ultimate Tensile Strain, of the fibres can be seen in FIG. 32(C1-C2) and FIG. 35I, FIG. 37I and FIG. 39I, respectively.

10.5.16. 12% SPI with 2.5% NAC, 2% SA, and 150% Canola Oil, Crosslinked with Disodium Malate, Washed with Ethanol, Annealed Covalently-crosslinked, semi-permeable, porous hollow fibres, initially produced and annealed as per Example 9.24, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 27(A1-A4) and FIG. 35F, FIG. 37F and FIG. 39F, respectively.

10.5.17. 13% SPI with 1% Sodium Sulphite and 0.25-6 mol/L Urea, Crosslinked with Trisodium Citrate and Sodium Hypophosphite, Washed with Ethanol, Annealed Covalently-crosslinked, semi-permeable, porous hollow fibres, initially produced as per Example 9.25, are washed with iso-propanol as per Example 10.5.1, but with an iso-propanol concentration of 55% (v/v) and a duration of 5 minutes.

10.5.18. 16% SPI with 2.5% NAC, 5% Sodium Carrageenan and 150% Canola Oil, Crosslinked with Disodium Malate, Washed with Ethanol, Annealed Covalently-crosslinked, semi-permeable, porous hollow fibres, initially produced and annealed as per Example 9.27, are washed in iso-propanol and processed as per Example 10.5.14.

10.5.19. Chickpea Protein

Covalently-crosslinked, semi-permeable, porous hollow fibres, initially produced as per Example 9.28, are washed with iso-propanol as per Example 10.5.1, but with an iso-propanol concentration of 75% (v/v) and a duration of 45 minutes.

10.5.20. Pea Protein

Covalently-crosslinked, semi-permeable, porous hollow fibres, initially produced as per Example 9.29, are washed with iso-propanol as per Example 10.5.1, but with an iso-propanol concentration of 90% (v/v) and a duration of 4 hours.

10.5.20.1. 21% PP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.29.2, were washed in iso-propanol and processed as per Example 10.5.14. SEM micrographs of the hollow fibres can be seen in FIG. 25 (A1-A4).

10.5.21. Sunflower Seed Protein

Covalently-crosslinked, semi-permeable, porous hollow fibres, initially produced as per Example 9.30, are washed with iso-propanol as per Example 10.5.1, but with an iso-propanol concentration of 60% (v/v) and a duration of 1 hour and 20 minutes.

10.5.21.1. 21% SFSP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.30.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 25(B1-B4) and FIG. 35A, FIG. 37A and FIG. 39A, respectively.

10.5.22. Mung Bean Protein

Covalently-crosslinked, semi-permeable, porous hollow fibres, initially produced as per Example 9.31, are washed with iso-propanol as per Example 10.5.1, but with an iso-propanol concentration of 80% (v/v) and a duration of 45 minutes.

10.5.22.1. 21% MBP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.31.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 25(C1-C4) and FIG. 35B, FIG. 37B and FIG. 39B, respectively.

10.5.23. Faba Bean Protein 10.5.23.1. 21% FBP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.32.1, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 26(A1-A4) and FIG. 35C, FIG. 37C and FIG. 39C, respectively.

10.5.23.2. 21% FBP with 2.5% NAC, Crosslinked with Trisodium Citrate, Washed with Ethanol, Annealed Covalently-crosslinked, semi-permeable, porous hollow fibres, initially produced and annealed as per Example 9.32.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 26(B1-B4) and FIG. 35D, FIG. 37D and FIG. 39D, respectively.

10.5.24. Soy Protein Isolate and Chickpea Protein

Covalently-crosslinked, semi-permeable, porous hollow fibres, initially produced as per Example 9.33, are washed with iso-propanol as per Example 10.4.1, but with an iso-propanol concentration of 60% (v/v) and a duration of 30 minutes.

10.5.25. Pea Protein and Sunflower Seed Protein

Covalently-crosslinked, semi-permeable, porous hollow fibres, initially produced as per Example 9.34, are washed with iso-propanol as per Example 10.4.1, but with an iso-propanol concentration of 80% (v/v) and a duration of 90 minutes.

10.5.25.1. 10.5% PP and 10.5% SFSP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.34.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 29(A1-A4) and FIG. 36P, FIG. 38P and FIG. 40P, respectively.

10.5.26. Mung Bean Protein and Beef Protein

Covalently-crosslinked, semi-permeable, porous hollow fibres, initially produced as per Example 9.35, are washed with iso-propanol as per Example 10.4.1, but with an iso-propanol concentration of 90% (v/v) and a duration of 45 minutes.

10.5.27. Soy Protein Isolate and Mung Bean Protein

Covalently-crosslinked, semi-permeable, porous hollow fibres, initially produced as per Example 9.36, are washed with iso-propanol as per Example 10.4.1, but with an iso-propanol concentration of 95% (v/v) and a duration of 60 minutes.

10.5.27.1. 9% SPI and 9% MBP with 2.5% NAC, Crosslinked with Disodium Malate and Sodium Hypophosphite, Washed with Ethanol, Annealed Covalently-crosslinked, semi-permeable, porous hollow fibres, initially produced and annealed as per Example 9.36.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 28(A1-A2) and FIG. 35M, FIG. 37M and FIG. 39M, respectively.

10.5.27.2. 10% SPI and 10% MBP with 2.5% NAC, Crosslinked with Trisodium Citrate and Sodium Hypophosphite, Washed with Ethanol, Annealed Covalently-crosslinked, semi-permeable, porous hollow fibres, initially produced and annealed as per Example 9.36.3, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 32(D1-D2) and FIG. 35L, FIG. 37L and FIG. 39L, respectively.

10.5.27.3. 9% SPI and 9% MBP with 2.5% NAC and 150% Canola Oil, Crosslinked with Trisodium Citrate and Sodium Hypophosphite, Washed with Ethanol, Annealed Covalently-crosslinked, semi-permeable, porous hollow fibres, initially produced and annealed as per Example 9.36.4, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 27(B1-B4) and FIG. 35J, FIG. 37J and FIG. 39J, respectively.

10.5.27.4. 9% SPI and 9% MBP with 2.5% NAC and 150% Canola Oil, Crosslinked with Disodium Malate, Washed with Ethanol, Annealed Covalently-crosslinked, semi-permeable, porous hollow fibres, initially produced and annealed as per Example 9.36.5, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 27(C1-C4) and FIG. 35K, FIG. 37K and FIG. 39K, respectively.

10.5.27.5. 9% SPI and 9% MBP with 2.5% NAC and 150% Canola Oil, Crosslinked with Disodium Malate and Sodium Hypophosphite, Washed with Ethanol, Annealed Covalently-crosslinked, semi-permeable, porous hollow fibres, initially produced and annealed as per Example 9.36.6, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 28(B1-B4) and FIG. 35N, FIG. 37N and FIG. 39N, respectively.

10.5.27.6. 9% SPI and 9% MBP with 2.5% NAC and 2% SA, Crosslinked with Disodium Malate and Sodium Hypophosphite, Washed with Ethanol, Annealed Covalently-crosslinked, semi-permeable, porous hollow fibres, initially produced and annealed as per Example 9.36.7, were washed in iso-propanol and processed as per Example 10.5.14. The mechanical properties, including the Young's Modulus, Ultimate Tensile Stress and Ultimate Tensile Strain, of the fibres can be seen in FIG. 35O, FIG. 37O and FIG. 39O, respectively.

SEM micrographs in FIG. 28(C1-C4) show a hollow fibre with an asymmetric integrally skinned structure.

10.5.28. Soy Protein Isolate and Faba Bean Protein

10.5.28.1. 10.5% SPI and 10.5% FBP with 2.5% NAC, Crosslinked with Disodium Malate, Washed with Ethanol, Annealed Covalently-crosslinked, semi-permeable, porous hollow fibres, initially produced and annealed as per Example 9.37.1, were washed in iso-propanol and processed as per Example 10.5.14. The mechanical properties, including the Young's Modulus, Ultimate Tensile Stress and Ultimate Tensile Strain, of the fibres can be seen in FIG. 36R, FIG. 38R and FIG. 40R, respectively.

SEM micrographs in FIG. 29(C1-C4) show a hollow fibre with an asymmetric integrally skinned structure.

10.5.28.2. 8% SPI and 8% FBP with 2.5% NAC and 2% SA, Crosslinked with Disodium Malate, Washed with Ethanol, Annealed Covalently-crosslinked, semi-permeable, porous hollow fibres, initially produced and annealed as per Example 9.37.2, were washed in iso-propanol and processed as per Example 10.5.14. The mechanical properties, including the Young's Modulus, Ultimate Tensile Stress and Ultimate Tensile Strain, of the fibres can be seen in FIG. 36Q, FIG. 38Q and FIG. 40Q, respectively.

10.5.28.3. 8% SPI and 8% FBP with 2.5% NAC, 2% SA and 150% Canola Oil, Crosslinked with Disodium Malate, Washed with Ethanol, Annealed Covalently-crosslinked, semi-permeable, porous hollow fibres, initially produced and annealed as per Example 9.37.3, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 29(B1-B4) and FIG. 36S, FIG. 38S and FIG. 40S, respectively.

10.5.28.4. 8% SPI and 8% FBP with 2.5% NAC, 2% SA and 150% Canola Oil, Crosslinked with Disodium Malate and Sodium Hypophosphite, Washed with Ethanol, Annealed Covalently-crosslinked, semi-permeable, porous hollow fibres, initially produced and annealed as per Example 9.37.4, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 30(A1-A4) and FIG. 36T, FIG. 38T and FIG. 40T, respectively.

10.5.29. Sunflower Seed Protein and Mung Bean Protein 10.5.29.1. 9% SFSP and 9% MBP with 2.5% NAC, Crosslinked with Trisodium Citrate, Washed with Ethanol, Annealed Covalently-crosslinked, semi-permeable, porous hollow fibres, initially produced and annealed as per Example 9.38.1, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 30(B1-B4) and FIG. 36U, FIG. 38U and FIG. 40U, respectively.

10.5.29.2. 8% SFSP and 8% MBP with 2.5% NAC and 150% Canola Oil, Crosslinked with Trisodium Citrate, Washed with Ethanol, Annealed Covalently-crosslinked, semi-permeable, porous hollow fibres, initially produced and annealed as per Example 9.38.2, were washed in iso-propanol and processed as per Example 10.5.14. SEM micrographs and the mechanical properties, including the Young's Modulus, Ultimate Tensile Stress and Ultimate Tensile Strain, of the fibres can be seen in FIG. 30(C1-C4) and FIG. 36V, FIG. 38V and FIG. 40V, respectively.

11. Other Post-Production Modification Processes 11.1. Washing with Sodium Carbonate Buffer Solution The covalently-crosslinked, semi-permeable, porous hollow fibres are initially produced as per Example 10.5.6.2.

In Step (e.iv), the hollow fibres are drawn from a spool into an aqueous bath comprising 1.041 mol/L sodium carbonate buffer with a pH of 11 (at 25° C.). The hollow fibres are then left submerged for 1 hour at room temperature, and collected on a separate rotating spool.

11.2. Coating with Collagen

The covalently-crosslinked, semi-permeable, porous hollow fibres are initially produced as per Example 10.5.6.2.

In Step (e.v), the hollow fibres are drawn from a spool into an aqueous bath comprising 2.5 mg/mL collagen in order to enhance cell attachment for subsequent cultivation. The hollow fibres are then left submerged for 90 minutes at room temperature, and collected on a rotating spool.

11.3. Surface Topographic Modification (Imprinted Grooves)

The covalently-crosslinked, semi-permeable, porous hollow fibres are initially produced as per Example 10.5.6.2.

In Step (e.vi), the hollow fibres are drawn from a spool and over a brush of fine stainless-steel wire to imprint grooves along the long-axis of the outer surface, and collected on a rotating spool.

11.4. Convection Drying and Vacuum Storage

The covalently-crosslinked, semi-permeable, porous hollow fibres are initially produced as per Example 10.5.6.2.

In Step (f), the hollow fibres are then drawn between two spools. A heated convection fan, set at 60° C., dries the hollow fibres for 10 minutes as they travelled between the spools.

The spool of dried hollow fibres is then removed and transferred into a vacuum-sealed bag, from which the air is evacuated. The fibres are then stored in the vacuum-sealed bag until further processing.

11.4.1. At 40° C.

The covalently-crosslinked, semi-permeable, porous hollow fibres were initially produced as per Example 10.5.4.1.

The hollow fibres were cut to desired lengths and dried with a heated convection fan, set at 40° C. for 5 hours.

12. Hydrostatic Cell Culture 12.1. Cytotoxicity

The cytotoxicity of the fibres of this disclosure was evaluated on the basis of ISO-10993-1:2018 but with the use of C2C12 mouse myoblast cells. Covalently-crosslinked, semi-permeable, porous hollow fibres were initially produced as per Example 10.5.4.1, cut into 1 cm sections, left submerged in 99.8% IPA (v/v) for 12 hours, and then aseptically dried.

The hydration volume of the fibres was initially determined by placing 0.1 g dried fibre sections into tubes (n≥3) containing 10 mL sterile deionised water and incubated at 37° C. After 24 hours, the water was removed and weighed. The hydration volume was determined as the volume of water lost during this process per mass of dried sample.

The dried fibre sections were then added (0.1 g) to 15 mL tubes containing C2C12 serum-based culture media (see Materials), the volume of which was equal to 5 mL/0.1 g dried fibre section plus the previously determined hydration volume. The samples were then incubated at 37° C. for 72 hours, under gentle agitation on an orbital shaker.

48 hours into the incubation period, the C2C12 cells (precultured as per supplier instructions) were separately seeded into 96-well plates, at a density of $1\times10^4$ cells/well, and then incubated at 37° C. with 5% $CO_2$.

After 24 hours, the cells were observed under a light microscope to ensure confluency in each well was below 70%. Media was removed from the samples containing the fibre sections and serially diluted eight times using a half log dilution factor, and then transferred into 96 well plates. The 96 well plates were configured such that a the outer most wells were blanks filled with 100 µL of unadulterated media. Columns 2 and 11 were seeded with cells and filled with 100 µL of unadulterated media controls. Columns 3 to 10 were seeded with cells and filled with six 100 µL replicates of sample media, with each column corresponding to each of the serial dilutions. The plates were then further incubated for 24 hours.

Separately, 40 mL of culture media comprising 0.1% neutral red dye (w/v) was prepared, incubated at 37° C. for 12 hours, and then centrifuged at 600 rcf for 10 minutes, in concurrence with the end of the culture period. The sample culture media was removed from each well, which were then washed three times with 100 µL of pre-warmed PBS. Subsequently, 100 µL of the neutral red media was added to each well and incubated for 3 hours.

In the final 15 minutes, a neutral red desorb solution was prepared, comprising 1% glacial acetic acid, 50% ethanol and 49% deionised water (v/v). Each well was then washed three times with 100 µL pre-warmed PBS. 150 µL of neutral red desorb was added to each well and the plate shaken on an orbital shaker for 10 minutes to ensure homogeneity. The plate was then transferred into a plate reader and the absorption for each well at 540 nm recorded.

The mean absorbance and the corresponding percentage of the unadulterated media well absorbance for each condition was calculated. As the mean absorbance for all samples was above 70% of the unadulterated media, the hollow fibres were determined to be non-cytotoxic. The percentage absorbance for each condition can be seen in FIG. 43.

12.2. Seeding of Hollow Fibres as Scaffolds

Covalently-crosslinked, semi-permeable, porous hollow fibres were initially produced as per Example 10.5.4.1, sterilised in 70% (v/v) iso-propanol, cut into 1 cm sections and then individually transferred into wells of 24 well plates.

Each of the wells was filled with either C2C12 serum-based culture media or foetal bovine serum (FBS), and then incubated at 37° C. with 5% $CO_2$ for one hour. Concurrently, C2C12 mouse myoblast cells (precultured as per supplier instructions) were recovered from flasks and used to prepare cell suspensions with concentrations of $3.05 \times 10^7$, $2.29 \times 10^7$, $1.72 \times 10^7$, $1.29 \times 10^7$, $9.65 \times 10^6$, $7.24 \times 10^6$, $5.43 \times 10^6$, $5.43 \times 10^6$, $4.07 \times 10^6$, $3.05 \times 10^6$, $2.29 \times 10^6$, $1.72 \times 10^6$, $1.29 \times 10^6$ and $9.66 \times 10^5$ cells/mL.

The media or FBS was completely removed from each well. To seed the fibres, 5 µL of a given cell suspension was pipetted directly onto the outer surface of the hollow fibres. Triplicate samples were prepared for each cell suspension concentration. The plates were incubated at 37° C. with 5% $CO_2$ for three hours to allow for cell attachment. 350 µL of C2C12 serum-based culture media was then added to each well, and the plates re-incubated at 37° C. with 5% CO2 for 24 hours.

PrestoBlue High-Sensitivity (HS) media was prepared with 10% (v/v) PrestoBlue High-Sensitivity assay in C2C12 serum-based culture media. Seeded scaffolds were transferred into new 24 well plates and 350 µL of the PrestoBlue HS media was transferred into each well, before incubating the plates for one hour. After the incubation period had elapsed, triplicate samples from each well were transferred to black 96 well plates, which were subsequently loaded into a plate reader. The PrestoBlue HS media was excited at 550 nm through an excitation filter with a band half width of 8 nm, while emission relative fluorescent unit readings were recorded at 600 nm through an excitation filter with a band half width of 8 nm. The change in the mean relative fluorescent unit readings with cell number can be seen in FIG. 42.

Surprisingly, at all cell suspension densities tested, good cell attachment was seen and there was no clear advantage to pre-soaking the hollow fibres in serum rather than in culture media. Having good cell attachment, the hollow fibres would therefore be well suited as a substrate for cell culture, making them particularly applicable for cultivated meat production.

12.3. Hydrostatic Cell Culture on Hollow Fibres as Scaffolds

Covalently-crosslinked, semi-permeable, porous hollow fibres were initially produced as per Example 10.5.4.1, sterilised in 70% (v/v) iso-propanol, cut into 1 cm sections and then individually transferred into wells of 24 well plates.

Each of the wells was filled with C2C12 serum-based culture media and then incubated at 37° C. with 5% $CO_2$ for one hour. Concurrently, a cell suspension comprising C2C12 mouse myoblast cells (precultured as per supplier instructions) was formulated. After complete media removal, each of the hollow fibre sections were seeded with 5 µL of cell suspension directly onto their outer surface to a density of $7.69 \times 10^4$ cells/cm$^2$. Plates of seeded hollow fibres were incubated at 37° C. with 5% $CO_2$ for three hours to allow for cell attachment. 350 µL of C2C12 serum-based culture media was then added to each well, and the plates re-incubated at 37° C. with 5% $CO_2$ for 24 hours.

Seeded hollow fibres were transferred to new 24 well plates. PrestoBlue HS media and assay reads were then prepared and measured as per Example 12.2. Hollow fibres were washed with 150 µL of C2C12 serum-based culture media, which was then discarded before each well was supplemented with 350 µL of fresh media. The plates were then incubated at 37° C. with 5% $CO_2$. The C2C12 cells were then cultured on the hollow fibres for 31 days.

On every third day throughout the culture period, PrestoBlue HS assay readings were taken. The change in relative fluorescence readings of the assay across the culture period may be seen in FIG. 44. PrestoBlue HS assay is a resazurin based assay, which is membrane permeable and upon reduction forms resorufin, which is a red fluorescent compound that can be quantitatively measured to determine the number of viable cells present. Consequently, it can be determined that C2C12 mouse myoblasts can be cultured on the hollow fibres for at least 31 days.

Additionally, for SEM imaging, hollow fibre samples with C2C12 cells cultured concurrently were transferred, on every third day, into 24 well plates with a fixing solution that comprised 2% (v/v) glutaraldehyde and 0.01% (w/v) sodium azide in PBS. Plates of hollow fibre samples in fixing solution were then refrigerated at 4° C. overnight. After replacing the fixing solution fresh PBS containing 0.01% (w/v) sodium azide, the plates were stored in a refrigerator at 4° C.

At the terminus of the culture period, the stored fixed hollow fibre samples were prepared for SEM. Initially, the fixed hollow fibre samples were chemically dehydrated with a concentration ladder of deionised water and iso-propanol. The hollow fibres were first transferred into a solution of 50% (v/v) iso-propanol (IPA) for 1 hour. The IPA was then replaced every hour with 60, 70, 80, 90, 95, and then 99.8% (v/v) IPA. The 99.8% (v/v) IPA was replaced again with fresh IPA and left over night. The IPA was then discarded, and the samples were left to air dry in the 24 well plates. The dried hollow fibre samples were then attached to aluminium stubs with adhesive carbon tabs and imaged with SEM.

SEM micrographs of the samples can be seen in FIG. 45. 24 hours after seeding (D1), it can be seen the C2C12 cells have attached to the hollow fibre and developed a flattened cell morphology. After four days (D4) the cells appear to have begun to spread out across the hollow fibre surface. By day 7 (D7), the C2C12 cells can be seen to cover most of the fibre surface and have elongated as to align with the long axis of the hollow fibre. At day 13 (D13), the C2C12 cells can be seen to cover almost all the hollow fibre surface. On day 16 (D16), the cells have developed a long thin morphology and have aligned along the long axis of the hollow fibres. Throughout the rest of the culture period the cells retain this morphology with the layer of cells appearing to thicken. An un-seeded control hollow fibre which was maintained in culture conditions for 31 days and processed as per the day 31 hollow fibre samples is also seen.

13. Cartridge Fabrication 13.1. Potting with Epoxy Resin

A cartridge comprising the covalently-crosslinked, semi-permeable, porous hollow fibres is produced through a multi-step process. Initially, the hollow fibres are produced as per Example 10.5.6.2, and subsequently dried, as per Example 11.4.

The dried hollow fibres are unwound from their storage spools, cut into appropriate lengths and then collected into a bundle that are held together at each end with Bemis™

Parafilm™. A small amount of epoxy resin is then prepared, and then brushed over both ends of the bundle prevent subsequent potting agents being drawn into the lumen of each hollow fibre via capillary action. The sealed bundle is inserted into a polytetrafluoroethylene (PTFE) threaded fitting.

A syringe of a rapid-setting epoxy resin mixture is then prepared and connected to the threaded fitting on one end of the hollow fibre bundle. The resin mixture is slowly discharged to fill the fitting with a plug of epoxy. Once the epoxy has fully set, the syringe and connector are removed, and a threaded collar is attached to the threaded fitting. The hollow fibre bundle is then pulled inside a PTFE tube and secured by screwing it into the marrying threads of the collar. This process is subsequently repeated for the other end the hollow fibre bundle.

At each end of hollow fibre bundles, 0.5 cm of the threaded fittings is sliced off to unseal the lumen of the hollow fibres. Each threaded collar is removed and then reattached to re-establish the threads. End caps are then screwed onto the ends of each cartridge to seal them, thereby producing the cartridges of covalently-crosslinked, semi-permeable, porous hollow fibres that are potted with epoxy resin.

13.1.1. Potting Fibres with Epoxy Resin

Fibres of this disclosure were potted with epoxy as per Example 13.1. SEM micrographs of a bundle of potted fibres may be seen in FIG. 46(C).

13.2. Potting with Silicone

Example 13.2 employs the same process as Example 13.1, but a silicon adhesive is used instead of the rapid-setting epoxy resin mixture as the potting material.

13.2.1. Potting Fibres with Silicone

Fibres of this disclosure were potted with silicone as per Example 13.2.

13.3. Potting with Polydimethylsiloxane

Example 13.3 employs the same process as Example 13.1, but polydimethylsiloxane (PDMS) is used instead of the rapid-setting epoxy resin mixture as the potting material.

13.3.1. Potting Fibres with Polydimethylsiloxane

Fibres of this disclosure were potted with Polydimethylsiloxane as per Example 13.3.

13.4. Potting with Prefabricated Mounts

Covalently-crosslinked, semi-permeable, porous hollow fibres were potted using prefabricated mounts.

Fibres were threaded through the channels of a prefabricated mount. The mount was initially fabricated with channels that had diameters close to that of the hollow fibres. The design of the mount was such that adhesive could be inserted through an orthogonally-positioned injection port and into a unifying central cut-out that connected to the channels.

Epoxy resin was injected into the injection port of the mount and left to cure. The process was repeated with a separate mount at the other end of the fibre to mount both ends of the fibres. Excess fibres were trimmed, and the potted assembly placed into the mounting slots of one side of a prefabricated bioreactor shell. After applying adhesive to the mounting slots and along the seams of the bioreactor shell, the second side of the shell was fitted. Consequently, a complete bioreactor cartridge with potted fibres of this disclosure was produced. SEM micrographs of a single potted fibre and multiple potted fibres in prefabricated mounts may be seen in FIGS. 46(A) and (B), respectively.

13.4.1. Potting with Prefabricated Mounts and UV-Sensitive Resin

Fibres were mounted with prefabricated mounts as in Example 13.4 but UV-sensitive resin (ANYCUBIC ABS-Like Resin Pro 2) was used in place of the epoxy resin.

To fix the fibres in place and to seal the bioreactor cartridge, the UV-sensitive resin was set by placing the assembly in a UV curing station and irradiated.

13.5. Potting with UV-Sensitive Resin

Cartridges, comprising covalently-crosslinked, semi-permeable, porous hollow fibres were produced via a multi-step process.

Fibres were initially collected into bundles that are held together at each end with Bemis™ Parafilm™. Each end was then dipped in UV-sensitive resin and the bundle was placed in a UV curing station and irradiated for 2 minutes to solidify the caps. The UV-sensitive resin was found to create a cap over the ends of the fibres without occluding more than the dipped length of fibre.

Each capped bundle was inserted into 3D printed bioreactor cartridges that incorporated Luer lock fittings. Pins were then inserted into each cartridge to secure the bundled fibres in place. UV-sensitive resin was injected into the Luer fitting, thereby submerging the fibres within the length of the Luer fitting. The assembly was irradiated in the UV curing station for 2.5 minutes. Upon removal, the resin was found to have set and the syringe was removed.

A handheld circular griding disk tool was used to cut the end of the fitting to expose the open hollow fibre channels. Secondary 3D printed fittings were pushed over the exposed sections to which further UV-sensitive was applied. The assembly was again placed in the UV curing station and irradiated for 2.5 minutes, thereby producing cartridges of covalently-crosslinked, semi-permeable, porous hollow fibres potted with UV-sensitive resin.

This process was repeated with reactor shells comprising removable sides. In this case, UV-sensitive resin was placed in the seams between the main body and the removable sides. The assembly was once again placed in the UV curing station and irradiated for 2.5 minutes to create a sealed unit. An example of a half bioreactor shell with a bundle of potted fibres may be seen in FIG. 46(D). Additionally, a fully assembled bioreactor cartridge potted as just described may be seen in FIG. 47(D).

14. Bioreactor Operation 14.1. Initial Set-Up

A cartridge comprising the covalently-crosslinked, semi-permeable, porous hollow fibres is initially produced as per Example 13.1, and then connected to a compatible bioreactor platform to form a closed operational loop.

The bioreactor platform configuration comprises peristaltic pumps, solution reservoirs (fresh media, operational media, buffer, sterilisation, waste), an oxygenator, and connection points for a hollow fibre bioreactor cartridge. Additionally, probes to monitor different parameters (temperature, pH, dissolved oxygen, glucose and lactic acid concentrations) are fitted and connected to a controller fitted with a human-machine interface (HMI).

14.1.1. Basic Configuration

A basic exemplary bioreactor configuration, comprising a peristaltic pump, a multi-port media reservoir with a gas exchange membrane, length of oxygen permeable tubing, and a hollow fibre cartridge of this disclosure, was set up as seen in FIG. 47.

The hollow fibre cartridge was potted as described in Example 13.5 using covalently-crosslinked, semi-permeable, porous hollow fibres that were initially produced as per Example 10.5.4.1 and sterilised in 70% (v/v) iso-propanol.

14.2. Sterilisation and Priming

A bioreactor comprising the hollow fibre cartridge of Example 13.1 is initially set-up as per Example 14.1.

To sterilise the bioreactor, ethanol from the sterilisation reservoir is pumped into the operational loop and circulated for 24 hours at room temperature. The ethanol is then subsequently pumped out of the operational loop into the waste reservoir.

To prime the bioreactor, a phosphate buffer solution (PBS) is pumped into the operational loop and circulated for 20 minutes to rinse any remaining ethanol. The PBS is subsequently pumped out of the operational loop into the waste reservoir. After repeating the PBS rinse cycle three times, the operational loop is filled with fresh growth media at 37° C., which is circulated for 24 hours.

14.3. Cell Seeding

A bioreactor comprising the hollow fibre cartridge of Example 13.1 is initially set-up as per Example 14.1, and then sterilised and primed as per Example 14.2.

Separately, a seed culture of C2C12 mouse myoblast cells is cultured in accordance with supplier specifications to expand them to an average cell density of $5 \times 10^3$ cells/cm$^2$. The seed culture is then formulated into a bolus solution.

After halting the circulation of growth media in the operational loop, the extra-capillary space of the cartridge is drained, and then aseptically refilled with the injected cell seed suspension. The cartridge is then rotated every 2 hours over a 12-hour period to uniformly distribute the cells through the extra-capillary space and to facilitate cell attachment onto the hollow fibres.

14.3.1. Cell Seeding with Single-Axis See-Saw Motion

A bioreactor comprising the hollow fibre cartridge of Example 13.1 is initially set-up as per Example 14.1, and then sterilised and primed as per Example 14.2.

A bolus seed solution comprising C2C12 mouse myoblast cells is prepared and drawn into a syringe. After halting the circulation of growth media in the operational loop, the extra-capillary space of the cartridge is drained, and then aseptically refilled with the injected cell seed suspension. The cartridge is then rocked in a see-saw motion along its long axis for 3 hours and rotated 180° in plane with its circular cross section every 30 minutes throughout this period, as to facilitate cell attachment.

14.3.2. Cell Seeding with Figure of Eight Rotation

A bioreactor comprising the hollow fibre cartridge of Example 13.1 is initially set-up as per Example 14.1, and then sterilised and primed as per Example 14.2.

A bolus seed solution comprising C2C12 mouse myoblast cells is prepared and drawn into a syringe. After halting the circulation of growth media in the operational loop, the extra-capillary space of the cartridge is drained, and then aseptically refilled with the injected cell seed suspension. The cartridge is then rocked in a figure-of-eight see-saw motion for 3 hours and rotated 180° in plane with its circular cross section every 30 minutes throughout this period, as to facilitate cell attachment.

14.3.3. Cell Seeding with Multi-Axis Rotation

This Example employs the same process as Example 14.3, except the cell attachment period is carried out over a three-hour period and the cartridge is rotated 180° in plane with its circular cross section and flipped 90° along its long axis, such that the cartridge alternates between standing upright and lying flat with each rotation. The bioreactor is rotated, in one movement in each plane, once every 30 minutes for 3 hours. At the end of the cell-attachment period the bioreactor is returned to a horizontal orientation.

14.3.4. Cell Seeding with Oscillatory Perfusion

A bioreactor comprising the hollow fibre cartridge of Example 13.1 is initially set-up as per Example 14.1, and then sterilised and primed as per Example 14.2.

A bolus seed solution comprising C2C12 mouse myoblast cells is prepared and drawn into a syringe, which is then loaded into a syringe pump.

A length of tubing connected to a gas exchange membrane is aseptically connected to an auxiliary port of the bioreactor shell, which leads to the extra-capillary space of the hollow fibre cartridge. After halting the circulation of growth media in the operational loop, the extra-capillary space is drained and then aseptically refilled with a portion of the bolus solution. As the extra-capillary space is filled, air is able to escape the system through the gas exchange membrane.

A further volume of the bolus solution is then added to partially fill the tubing to the gas exchange membrane and the syringe pump set to an oscillatory pump regimen, as to facilitate cell attachment. Under such conditions, the bolus solution is initially withdrawn from the length of tubing, into extra capillary space and then into the original syringe. Once the volume is withdrawn from the tubing, the flow then reversed to restart the cyclical oscillatory flow regime. At the end of the three-hour cell-attachment period, the syringe, syringe pump and tubing are removed.

14.3.5. Cell Seeding with Circulatory Perfusion

A bioreactor comprising the hollow fibre cartridge of Example 13.1 is initially set-up as per Example 14.1, and then sterilised and primed as per Example 14.2.

A bolus seed solution comprising C2C12 mouse myoblast cells, is prepared, and drawn into a syringe.

A length of tubing and two 3-way valves are connected between two ports on the bioreactor shell connected to the extra-capillary space of the bioreactor, creating a cell-seeding operational loop. The seed cell syringe and a gas exchange membrane are connected to the three-way valves.

As the cell seed solution is then injected into the extra-capillary space through the tubing, air is able to escape via the gas exchange membrane. The 3-way valves are then closed, and a section of the tubing loaded into a positive displacement pump, which slowly circulates cell suspension around the extra-capillary space and cell-seeding operational loop. The circulating system is incubated for four hours to facilitate cell attachment. The pumping is then stopped, the ports to the extra-capillary space sealed, and the tubing loop and pump removed.

14.4. Cell Culture, Perfusion and Media Exchange

A bioreactor comprising the hollow fibre cartridge of Example 13.1 is initially set-up as per Example 14.1 sterilised and primed as per Example 14.2, and then seeded as per Example 14.3. The cell culture is initiated by restarting the flow of growth media through the operational loop at 37° C. and pH 7.

A process control loop, based on the dissolved oxygen concentration in the effluent flow, is used to dynamically control the supply of fresh media and dissolved gases ($O_2$, $CO_2$, $N_2$, Air) into the hollow fibre cartridge.

The effluent flow stream from the hollow fibre cartridge splits into a waste stream and a recycle stream to prevent the accumulation of waste metabolites. A process control loop, based on the glucose and lactate concentrations in the effluent flow, is used to control the flow ratio between the waste and recycle streams.

Reservoirs of fresh and waste media are continuously refilled and drained, respectively, to ensure the continuous operation of the bioreactor over the culture period.

14.5. Cell Differentiation

A cultivation of C2C12 mouse myoblast cells is initially carried out in a hollow fibre bioreactor, as per Example 14.4.

The supply of growth media to the hollow fibre cartridge is replaced with a formulation of differentiation media, and then all effluent media is discharged as waste for the first 3 hours to facilitate a full media exchange. The regulation of recycle and waste streams is then returned to a dynamic regimen dictated by the concentrations of glucose and lactate in the effluent flow. For 6 days, the system is perfused with differentiation media to facilitate the differentiation of the cells and formation of myotubes.

The supply of media is stopped at the end of this period, and the hollow fibre cartridge is flushed with a PBS for 1 hour, with the effluent discharged to the waste reservoir. The end product is a food product comprising edible covalently-crosslinked, semi-permeable, porous hollow fibres enveloped by C2C12 mouse myoblast cells.

15. Harvesting and Post-Production Modification

C2C12 mouse myoblast cells are initially cultivated in a hollow fibre bioreactor, as per Example 14.4, and subsequently differentiated as per Example 14.5 to produce a food product comprising edible covalently-crosslinked, semi-permeable, porous hollow fibres enveloped by C2C12 mouse myoblast cells. The following examples illustrate some of the post-production methods which are used to alter the properties of the final food product.

15.1. Alkali Buffer Wash

A food product, produced as per Example 14.5, is washed with an alkaline solution to weaken the constituent hollow fibres. The alkaline solution, comprising 1.041 mol/L aqueous sodium carbonate at a pH of 11 at 37° C., is flushed through the lumen of each hollow fibre in a recycle loop for 12 hours.

The hollow fibres are then flushed with a PBS for 20 minutes to rinse any remaining alkaline buffer solution. The PBS is then pumped out of the operational loop into the waste reservoir. The PBS rinse cycle is repeated three times.

15.2. Margarine Flush

A food product, comprising the covalently-crosslinked, semi-permeable, porous hollow fibres enveloped by C2C12 mouse myoblast cells, is initially produced as per Example 14.5 and washed as per Example 15.1.

While connected to the bioreactor platform, the lumen of each hollow fibre is flushed with a warm mixture of margarine, salt, and yeast extract to fill the intra-luminal space.

15.3. Removal of final food product from bioreactor shell

A food product, comprising the covalently-crosslinked, semi-permeable, porous hollow fibres enveloped by C2C12 mouse myoblast cells, is initially produced as per Example 14.5 and treated as per Examples 15.1 and 15.2.

After disconnecting the cartridge from the bioreactor platform, the threaded end-caps and collars are removed from each end of the cartridge. A cutting implement is then used to cut the threaded fittings from the outer shell body at each end of the cartridge. A capped displacement rod (plunger) is subsequently used to displace the food product from the cartridge shell.

16. Treatment and Preservation of the Recovered Food Product

The following examples describe various methods which are used to further treat and preserve a food product comprising the covalently-crosslinked, semi-permeable, porous hollow fibres of this disclosure.

16.1. Mechanical Treatments

16.1.1. Pounding

A food product, produced as per Example 15.3, is mechanically pounded with a tenderiser to soften the final food product and improve its palatability.

16.1.2. Mincing

A food product, produced as per Example 15.3, is minced to produce a complex mixture.

16.1.3. Mechanical Reformation

A minced food product, produced as per Example 16.1.2, is mechanically-reformed.

16.1.4. Cutting Perpendicular to the Long-Axis

A food product, produced as per Example 15.3, is sliced orthogonally to its long-axis to produce polygonal slices. The resulting slices are observed to contain characteristic rings and dots comprising the covalently-crosslinked, semi-permeable, porous hollow fibres, interlaced with the cultivated cell mass.

16.1.5. Cutting Along to the Long-Axis

A food product, produced as per Example 15.3, is sliced along its long-axis to produce polygonal slices. The resulting slices are observed to contain characteristic striations comprising the covalently-crosslinked, semi-permeable, porous hollow fibres, interlaced with the cultivated cell mass.

16.2. Chemical Treatments

16.2.1. Bromelain Wash

A food product, produced as per Example 15.3, is washed with bromelain at 37° C. to enzymatically tenderise the food product. Excess bromelain is subsequently washed away with water.

16.2.2. Transglutaminase wash

A food product, produced as per Example 15.3, is completely coated with transglutaminase powder (as a binding agent and to improve its texture and appearance), and then wrapped in plastic film and refrigerated at 4° C. for 6 hours.

16.3. Cooking

16.3.1. Frying

A food product, produced as per Example 15.3, is cooked by frying it in oil.

16.3.2. Roasting

A food product, produced as per Example 15.3, is cooked by roasting it in an oven.

16.3.3. Boiled

A food product, produced as per Example 15.3, is cooked by boiling it in water.

16.4. Preservation

16.4.1. Smoking

A food product, produced as per Example 14.3, is placed in a smoker for 12 hours utilising burning wood in an oxygen-limited environment.

16.4.2. Dehydration

A food product, produced as per Example 15.3, is dehydrated by drying it by a fan over 12 days under refrigerated conditions at about 4° C.

16.4.3. Freeze-Drying

A food product, produced as per Example 14.3, is placed in a freeze-drier to simultaneously dehydrate and freeze it, and then packaged in a vacuum-sealed bag for long-term storage.

16.4.4. Freezing

A food product, produced as per Example 14.3, is placed on a rack in a storage freezer unit at about −20° C.

16.4.5. Irradiation

A food product, produced as per Example 14.3, is placed into a vacuum-sealed bag, from which the air had been evacuated, and subsequently sterilised via exposure to gamma-radiation.

16.4.6. Salting

A food product, produced as per Example 14.3, is covered with an excess of salt in a container and left to dehydrate in the salt for seven days.

16.5. Packaging 16.5.1. Vacuum Packing

A food product, such as one preserved using any of the methods applied in Examples 16.4.1 to 16.4.6, is packaged for long term storage in an appropriately-sized vacuum-sealed bag. After vacuuming the air from the bag, it is sealed with a heated crimp.

The vacuum bagged food product is then stored under refrigerated conditions at about 4° C.

16.5.2. Canning the final food product

A food product of appropriate size, such as one preserved using any of the methods applied in Examples 16.4.1 to 16.4.6, is inserted in a pre-sterilised tin that is subsequently hermetically-sealed. The sealed tin is then sterilised via heat-treatment at about 121° C. for 10 minutes in a steam-pressured vessel. After sterilisation, the sealed can is cooled in chilled water as to maintain the quality of the product and to avoid overcooking.

REFERENCES

1. *Scientific, sustainability and regulatory challenges of cultured meat*. Mark J. Post, Shulamit Levenberg, David L. Kaplan, Nicholas Genovese, Jianan Fu, Christopher J. Bryant, Nicole Negowetti, Karin Verzijden and Panagiota Moutsatsou. July 2020, s.l.: Nature, July 2020, Nature Food, Vol. 1, pp. 403-415.
2. *Perfusion mammalian cell culture for recombinant protein manufacturing—A critical review*. Jean-Marc Bielser, Moritz Wolf, Jonathan Souquet, Herve Broly, Massimo Morbidelli. 36, s.l.: Biotechnology Advances, 2018. https://doi.org/10.1016/j.biotechadv.2018.04.011.
3. *Bioprocess Design Considerations for Cultured Meat Production With a Focus on the Expansion Bioreactor*. Scott J. Allan, Paul A. De Bank and Marianne J. Ellis. s.l.: Frontiers in Sustainable Food Systems, 2019, Vol. 3.
4. *Hollow Fiber Bioreactors for In Vivo-like Mammalian Tissue Culture*. Michael P. Storm, Ian Sorrell, Rebecca Shipley, Sophie Regan, Kim A. Luetchford, Jean Sathish, Steven Webb, and Marianne J. Ellis. 111, s.l.: Journal of Visualized Experiments, 2016. 10.3791/53431.
5. *Dynamic human erythropoiesis in a three-dimensional perfusion bone marrow biomimicry*. Mark C. Allenby, Nicki Panoskaltsis, Asma Tahlawi, Susana Brito Dos Santos, Athanasios Mantalaris. 188, s.l.: Biomaterials, 2019, Biomaterials, pp. 24-37. https://doi.org/10.1016/j.biomaterials.2018.08.020.
6. Joaquim M. S. Cabral, Claudia Lobato da Silva. *Bioreactors for Stem Cell Expansion and Differentiation*. Boca Raton: CRC Press, 2018. 9780429453144.
7. *Opportunities for applying biomedical production and manufacturing methods to the development of the clean meat industry*. Elizabeth A. Specht, David R. Welch, Erin M. Rees Clayton, Christie D. Lagally. s.l.: Biochemical Engineering Journal, 2018, Vol. 132. https://doi.org/10.1016/j.bej.2018.01.015.
8. *Challenges and possibilities for bio-manufacturing cultured meat*. Guoqiang Zhang, Xinrui Zhaob, Xueliang Lib, Guocheng Dub, Jingwen Zhoua, Jian Chena. 97, s.l.: Trends in Food Science & Technology, 2020. https://doi.org/10.1016/j.tifs.2020.01.026.
9. Kaplan, David L. *Biopolymers from Renewable Resources*. Heidelberg: Springer Berlin, 2010. 978-3-642-08341-9.
10. *Can recombinant milk proteins replace those produced by animals?* Bijl, Kasper Hettinga and Etske. 75, s.l.: Current Opinions in Biotechnology, 2022. https://doi.org/10.1016/j.copbio.2022.102690.
11. Buxbaum, Engelbert. *Fundamentals of Protein Structure and Function*. s.l.: Springer Cham, 2019. 978-3-319-79290-3.
12. *Preparation and characterisation of bioplastics made from cottonseed protein*. H.-B. Yue, Y.-D. Cui, P. S. Shuttleworth and James H. Clark. 7, 2012. https://doi.org/10.1039/C2GC35509D.
13. *The molecular basis for the chemical denaturation of proteins by urea*. Daggett, Brian J. Bennion and Valerie. 9, s.l.: Proceedings of the National Academy of Sciences of the United States of America (PNAS), 17 Apr. 2003, Biophysics and Computational Biology, Vol. 100, pp. 5142-5147. https://doi.org/10.1073/pnas.0930122100.
14. *Spinnability and rheological properties of globular soy protein solution*. Bing nan Mua, Helan Xua, Wei Lia, Lan Xub, Yiqi Yang. s.l.: Food Hydrocolloids, 2019, Vol. 90. https://doi.org/10.1016/j.foodhyd.2018.12.049.
15. *More Solutions to Sticky Problems: A guide to getting more from your Brookfield Viscometer*. Brookfield. s.l.: Brookfield Engineering labs., Inc., 2005.
16. *Understanding and guiding the phase inversion process for synthesis of solvent resistant nanofiltration membranes*. Agnieszka K. Holda, Ivo F. J. Vankelecom. s.l.: Journal of Applied Polymer Science, 2015. DOI: 10.1002/app.42130.
17. *Hofmeister Series: Insights of Ion Specificity from Amphiphilic Assembly and Interface Property*. Beibei Kang, Huicheng Tang, Zengdian Zhao, and Shasha Song. 6229-6239, s.l.: ACS Omega, 2020, Vol. 5 (12). DOI: 10.1021/acsomega.0c00237.
18. Mulder, Marcel. *Basic Principles of Membrane Technology*. Dordrecht: Springer, 1996. 978-0-7923-4248-9.
19. *Rapid Production of a Porous Cellulose Acetate Membrane for Water Filtration using Readily Available Chemicals*. Adrian Kaiser, Wendelin J. Stark, and Robert N. Grass. 4, s.l.: ACS Publications, 2017, Journal of Chemical Education, Vol. 94, pp. 483-487. https://doi.org/10.1021/acs.jchemed.6b00776.
20. *Alkali-Catalyzed Low Temperature Wet Crosslinking of Plant Proteins Using Carboxylic Acids*. Narendra Reddy, Ying Li, Yiqi Yang. s.l.: American Institute of Chemical Engineers, 2009, Biotechnology Progress, pp. 139-146. https://doi.org/10.1002/btpr.86.
21. *Alkali-catalyzed low temperature wet crosslinking of plant proteins using carboxylic acids*. Narendra Reddy, Ying Li, Yiqi Yang. 1, s.l.: American Institute of Chemical Engineers, 2009, Biotechnology Progress, Vol. 25, pp. 139-146. https://doi.org/10.1002/btpr.86.
22. *Green and Sustainable Technology for High-Efficiency and Low-Damage Manipulation of Densely Crosslinked Proteins*. Helan Xu, Kaili Song, Bingnan Mu, and Yiqi Yang. 5, s.l. ACS Publications, 2 May 2017, ACS Omega, Vol. 2, pp. 1760-1768. https://doi.org/10.1021/acsomega.7b00154.
23. *Cross-Linking Cotton Cellulose by the Combination of Maleic Acid and Sodium Hypophosphite. 1. Fabric Wrinkle Resistance*. Charles Q. Yang, Dongzhong Chen, 24. *Influence of ethanol post-treatments on the properties of silk protein materials.* Melissa Puerta, Maria C. Arango, Natalia Jaramillo—Quiceno, Catalina Álvarez—López, Adriana Restrepo—Osorio. 1443, s.l.: SN Applied Sciences, 2019, Vol. 1. https://doi.org/10.1007/s42452-019-1486-0.
25. *Electrospun ultrafine fibrous wheat glutenin scaffolds with three-dimensionally random organization and water stability for soft tissue engineering.* Helan Xu, Shaobo Cai, Alexander Sellers, Yiqi Yang. s.l.: Journal of Biotechnology, 2014, Vol. 184, pp. 179-186. https://doi.org/10.1016/j.jbiotec.2014.05.011.
26. *Conformation Transition of Bombyx mori Silk Protein Monitored by Time-Dependent Fourier Transform Infrared (FT-IR) Spectroscopy: Effect of Organic Solvent.* XIN CHEN, HUIFEI CAI, SHENGJIE LING, ZHENGZHONG SHAO, and YUFANG HUANG. 6, s.l.: Applied Spectroscopy, 2012, Vol. 66, pp. 696-699. 10.1366/11-06551.
27.—.XIN CHEN, HUIFEI CAI, SHENGJIE LING, ZHENGZHONG SHAO, and YUFANG HUANG. 6, s.l.: Applied Spectroscopy, 1 Jun. 2012, Vol. 66, pp. 696-699. https://doi.org/10.1366/11-06551.
28. *Influence of alcohol treatments on properties of silk-fibroin-based films for highly optically transparent coating applications.* Boonsang, Supranee Kaewpiroma and Siridech. 15913, s.l. RSC Advances, 2020, Vol. 10. 10.1039/d0ra02634d.
29. *Heat-Induced Cross-Linking and Degradation of Wheat Gluten, Serum Albumin, and Mixtures Thereof.* Ine Rombouts, Bert Lagrain, and Jan A. Delcour. 40, s.l.: ACS Publications, 5 9 2012, Journal of agricultural and food chemistry, Vol. 60, pp. 10133-10140.
30. *Discovering Cell-Adhesion Peptides in Tissue Engineering: Beyond RGD.* Nick Huettner, Tim R. Dargaville, and Aurelien Forget. 4, s.l.: Cell Press—Trends in Biotechnology, 2018, Vol. 36. https://doi.org/10.1016/j.tibtech.2018.01.008.
31. *Recent advances in post-modification strategies of polymeric electrospun membranes.* P. Sagitha, C. R. Reshmi, Suja P. Sundaran, A. Sujith. s.l.: European Polymer Journal, 2018, Vol. 105. https://doi.org/10.1016/j.eurpolymj.2018.05.033.
32. Reimer, Ludwig. *Scanning Electron Microscopy.* Berlin: Springer Berlin, Heidelberg, 1998. 978-3-540-63976-3.
33. Ul-Hamid, Anwar. *A Beginners' Guide to Scanning Electron Microscopy.* s.l.: Springer Chem, 2018. 978-3-319-98481-0.
34. *Bioprocessing technology of muscle stem cells: Implications for cultured meat.* Xin Guan, Jingwen Zhou, Guocheng Du, and Jian Chen. 6, s.l.: Trends in Biotechnology, 2021, Vol. 40. https://doi.org/10.1016/j.tibtech.2021.11.004.
35. Webb, Paul A. *An Introduction To The Physical Characterization of Materials by Mercury Intrusion Porosimetry with Emphasis On Reduction And Presentation of Experimental Data.* Norcross, Georgia: Micromeritics Instrument Corp, 2001.
36. Bradley Ladewig, Muayad Nadhim Zemam Al-Shaeli. *Fundamentals of Membrane Bioreactors.* s.l.: Springer Singapore, 2016. 978-981-10-2013-1.
37. Nidal Hilal, Ahmad Ismail, Takeshi Matsuura, Darren Oatley-Radcliffe. *Membrane Characterization.* s.l.: Elsevier, 2017. 9780444637765.
38. *Infrared Spectroscopic Studies of the Nonformaldehyde Durable Press Finishing of Cotton Fabrics by Use of Polycarboxylic Acids.* ANDREWS, CHARLES Q. YANG and B. A. KOTTES. s.l.: Journal of Applied Polymer Science, 1991, Vol. 43. https://doi.org/10.1 002/app.1 991.070430904.
39. *Formation of Cyclic Anhydride Intermediates and Esterification of Cotton Cellulose by Multifunctional Carboxylic Acids: An Infrared Spectroscopy Study.* Wang, Charles Q. Yang and Xilie. 9, s.l.: Textile Research Journal, 1996, Vol. 66. https://doi.org/10.1177/004051759606600908.
40. *Effects of chemical structures of polycarboxylic acids on molecular and performance manipulation of hair keratin.* Kaili Song, Helan Xu, Kongliang Xiea and Yiqi Yang. 63, s.l.: RSC Advances, 2016. https://doi.org/10.1039/C6RA08797C.
41. *Low-Temperature Wet-Cross-linking of Silk with Citric Acid.* Narendra Reddy, Karlin Warner, and Yiqi Yang. 8, s.l.: Industrial Engineering Chemistry Research, 2011, Vol. 50. https://doi.org/10.1021/ie102226f.
42. *Mass Spectrometry-Based Protein Footprinting for Higher-Order Structure Analysis: Fundamentals and Applications.* Xiaoran Roger Liu, Mengru Mira Zhang, and Michael L. Gross. 10, s.l.: Chemical Reviews, 2020, Vol. 120. https://doi.org/10.1021/acs.chemrev.9b00815.
43. Biji T. Kurien, R. Hal Scofield. *Protein Electrophoresis.* s.l.: Humana Totowa, NJ, 2012. https://doi.org/10.1007/978-1-61779-821-4.
44. *Soy Protein: Molecular Structure Revisited and Recent Advances in Processing Technologies.* Xiaonan Sui, Tianyi Zhang, and Lianzhou Jiang. 1, s.l.: Annual Review of Food Science and Technology, 2021, Vol. 12, pp. 119-147. https://doi.org/10.1146/annurev-food-062220-104405.
45. *The structure, physical and chemical properties of the soy bean protein glycinin.* R. A. BADLEY, D. ATKINSON, H. HAUSER, D. OLDANI, J. P. GREEN and J. M. STUBBS. 2, s.l.: Biochimica et Biophysica Acta (BBA)—Protein Structure, 1975, Vol. 412. https://doi.org/10.1016/0005-2795(75)90036-7.
46. *Infrared spectroscopy of proteins.* Barth, Andreas. 9, s.l.: Biochimica et Biophysica Acta, 2007, Vol. 1767, pp. 1073-1101. https://doi.org/10.1016/j.bbabio.2007.06.004.
47. *Using circular dichroism spectra to estimate protein secondary structure.* Greenfield, Norma J. s.l.: Nature Protocol, 2006, Vol. 1, pp. 2876-2890. https://doi.org/10.1038/nprot.2006.202.
48. Sanjay K Sharma, Ackmez Mudhoo. *A Handbook of Applied Biopolymer Technology: Synthesis, Degradation and Applications.* s.l.: The Royal Society of Chemistry, 2011. 10.1039/9781849733458.
49. *Urea-cysteine based extraction of densely crosslinked proteins from T sorghum distillers grains with high yield and quality.* Wei Li, Bingnan Mu, Helan Xu, Lan Xu, Yiqi Yang. s.l. Industrial Crops & Products, 14 May 2018, Vol. 121, pp. 360-371. https://doi.org/10.1016/j.indcrop.2018.05.035.
50. *Raman spectroscopy of proteins: a review.* A. Rygula, K. Majzner, K. M. Marzec, A. Kaczor, M. Pilarczyka and M. Baranskaa. s.l.: Journal of Raman Spectroscopy, 10 May 2013, Vol. 44, pp. 1061-1076. https://doi.org/1 0.1002/jrs.4335.
51. Horst Czichos, Tetsuya Saito, Leslie Smith. *Springer Handbook of Materials Measurement Methods.* Berlin: Springer Berlin, Heidelberg, 2007. https://doi.org/10.1007/978-3-540-30300-8.

52. British Standards. *Biological Evaluation of Medical Devices*. s.l.: British Standards, 2009. 1080-9775.
53. *Axial oxygen diffusion in the Krogh model: modifications to account for myocardial oxygen tension in isolated perfused rat hearts measured by EPR oximetry*. Oleg Grinberg, Boris Novozhilov, Stalina Grinberg, Bruce Friedman, Harold M Swartz. Advances in Experimental Medicine and Biology: Advances in Experimental Medicine and Biology, 2005, Vol. 566. 10.1007/0-387-26206-7_18.
54. *A theoretical model for oxygen transport in skeletal muscle under conditions of high oxygen demand*. B. J. McGuire, and T. W. Secomb. 5, s.l.: Journal of applied physiology, 2001, Vol. 91. https://doi.org/10.1152/jappl.2001.91.5.2255.
55. *Bioprocess Design Considerations for Cultured Meat Production With a Focus on the Expansion Bioreactor*. Allan S J, De Bank P A and Ellis M J. 44, s.l.: Front. Sustain. Food Syst, 2019, Vol. 3. 10.3389/fsufs.2019.00044.
56. Dietmar Kennepohl, Jim Clark, Layne Morsch, Steven Farmer, and William Reusch. *Spectroscopy of Carboxylic Acid Derivatives*. s.l.: LibreTexts, 2019.
57. Reimer, Ludwig. Scanning Electron Microscopy. Berlin: Springer Berlin, Heidelberg, 1998. 9. 78-3-540-63976-3.

SEQUENCE LISTING

```
Sequence total quantity: 45
SEQ ID NO: 1            moltype = AA  length = 6
FEATURE                 Location/Qualifiers
source                  1..6
                        mol_type = protein
                        organism = synthetic construct
SEQUENCE: 1
AELDVP                                                                    6

SEQ ID NO: 2            moltype = AA  length = 15
FEATURE                 Location/Qualifiers
source                  1..15
                        mol_type = protein
                        organism = synthetic construct
SEQUENCE: 2
CGGNGEPRGD TYRAY                                                         15

SEQ ID NO: 3            moltype = AA  length = 9
FEATURE                 Location/Qualifiers
source                  1..9
                        mol_type = protein
                        organism = synthetic construct
SEQUENCE: 3
CFALRGDNP                                                                 9

SEQ ID NO: 4            moltype = AA  length = 13
FEATURE                 Location/Qualifiers
source                  1..13
                        mol_type = protein
                        organism = synthetic construct
SEQUENCE: 4
CKKQRFRHRN RKG                                                           13

SEQ ID NO: 5            moltype = AA  length = 7
FEATURE                 Location/Qualifiers
source                  1..7
                        mol_type = protein
                        organism = synthetic construct
SEQUENCE: 5
CNYYSNS                                                                   7

SEQ ID NO: 6            moltype = AA  length = 6
FEATURE                 Location/Qualifiers
source                  1..6
                        mol_type = protein
                        organism = synthetic construct
SEQUENCE: 6
CSVTCG                                                                    6

SEQ ID NO: 7            moltype = AA  length = 4
FEATURE                 Location/Qualifiers
source                  1..4
                        mol_type = protein
                        organism = synthetic construct
SEQUENCE: 7
DGEA                                                                      4

SEQ ID NO: 8            moltype = AA  length = 13
FEATURE                 Location/Qualifiers
source                  1..13
```

```
                              mol_type = protein
                              organism = synthetic construct
SEQUENCE: 8
ELVTDFPTDL PAT                                                          13

SEQ ID NO: 9                  moltype = AA  length = 7
FEATURE                       Location/Qualifiers
source                        1..7
                              mol_type = protein
                              organism = synthetic construct
SEQUENCE: 9
FHRRIKA                                                                  7

SEQ ID NO: 10                 moltype = AA  length = 12
FEATURE                       Location/Qualifiers
source                        1..12
                              mol_type = protein
                              organism = synthetic construct
SEQUENCE: 10
FQGVLQNVRF VF                                                           12

SEQ ID NO: 11                 moltype = AA  length = 10
FEATURE                       Location/Qualifiers
source                        1..10
                              mol_type = protein
                              organism = synthetic construct
SEQUENCE: 11
GACRGDCLGA                                                              10

SEQ ID NO: 12                 moltype = AA  length = 6
FEATURE                       Location/Qualifiers
source                        1..6
                              mol_type = protein
                              organism = synthetic construct
SEQUENCE: 12
GFOGER                                                                   6

SEQ ID NO: 13                 moltype = AA  length = 7
FEATURE                       Location/Qualifiers
source                        1..7
                              mol_type = protein
                              organism = synthetic construct
SEQUENCE: 13
GFRGDGQ                                                                  7

SEQ ID NO: 14                 moltype = AA  length = 5
FEATURE                       Location/Qualifiers
source                        1..5
                              mol_type = protein
                              organism = synthetic construct
SEQUENCE: 14
GRGDS                                                                    5

SEQ ID NO: 15                 moltype = AA  length = 6
FEATURE                       Location/Qualifiers
source                        1..6
                              mol_type = protein
                              organism = synthetic construct
SEQUENCE: 15
GRGDAC                                                                   6

SEQ ID NO: 16                 moltype = AA  length = 11
FEATURE                       Location/Qualifiers
source                        1..11
                              mol_type = protein
                              organism = synthetic construct
SEQUENCE: 16
GTFALRGDNG Q                                                            11

SEQ ID NO: 17                 moltype = AA  length = 5
FEATURE                       Location/Qualifiers
source                        1..5
                              mol_type = protein
                              organism = synthetic construct
SEQUENCE: 17
IDAPS                                                                    5

SEQ ID NO: 18                 moltype = AA  length = 5
FEATURE                       Location/Qualifiers
```

```
source              1..5
                    mol_type = protein
                    organism = synthetic construct
SEQUENCE: 18
IKLLI                                                               5

SEQ ID NO: 19       moltype = AA  length = 5
FEATURE             Location/Qualifiers
source              1..5
                    mol_type = protein
                    organism = synthetic construct
SEQUENCE: 19
IKVAV                                                               5

SEQ ID NO: 20       moltype = AA  length = 19
FEATURE             Location/Qualifiers
source              1..19
                    mol_type = protein
                    organism = synthetic construct
SEQUENCE: 20
IWKHKGRDVI LKKDVRFYC                                                19

SEQ ID NO: 21       moltype = AA  length = 12
FEATURE             Location/Qualifiers
source              1..12
                    mol_type = protein
                    organism = synthetic construct
SEQUENCE: 21
KAFDITYVRL KF                                                       12

SEQ ID NO: 22       moltype = AA  length = 6
FEATURE             Location/Qualifiers
source              1..6
                    mol_type = protein
                    organism = synthetic construct
SEQUENCE: 22
KLDAPT                                                              6

SEQ ID NO: 23       moltype = AA  length = 6
FEATURE             Location/Qualifiers
source              1..6
                    mol_type = protein
                    organism = synthetic construct
SEQUENCE: 23
KQAGDV                                                              6

SEQ ID NO: 24       moltype = AA  length = 4
FEATURE             Location/Qualifiers
source              1..4
                    mol_type = protein
                    organism = synthetic construct
SEQUENCE: 24
KRSR                                                                4

SEQ ID NO: 25       moltype = AA  length = 6
FEATURE             Location/Qualifiers
source              1..6
                    mol_type = protein
                    organism = synthetic construct
SEQUENCE: 25
LIGRKK                                                              6

SEQ ID NO: 26       moltype = AA  length = 6
FEATURE             Location/Qualifiers
source              1..6
                    mol_type = protein
                    organism = synthetic construct
SEQUENCE: 26
LGTIPG                                                              6

SEQ ID NO: 27       moltype = AA  length = 5
FEATURE             Location/Qualifiers
source              1..5
                    mol_type = protein
                    organism = synthetic construct
SEQUENCE: 27
LRGDN                                                               5

SEQ ID NO: 28       moltype = AA  length = 7
```

```
FEATURE                     Location/Qualifiers
source                      1..7
                            mol_type = protein
                            organism = synthetic construct
SEQUENCE: 28
MNYYSNS                                                                         7

SEQ ID NO: 29               moltype = AA   length = 12
FEATURE                     Location/Qualifiers
source                      1..12
                            mol_type = protein
                            organism = synthetic construct
SEQUENCE: 29
NPWHSIYITR FG                                                                  12

SEQ ID NO: 30               moltype = AA   length = 5
FEATURE                     Location/Qualifiers
source                      1..5
                            mol_type = protein
                            organism = synthetic construct
SEQUENCE: 30
PDGSR                                                                           5

SEQ ID NO: 31               moltype = AA   length = 5
FEATURE                     Location/Qualifiers
source                      1..5
                            mol_type = protein
                            organism = synthetic construct
SEQUENCE: 31
PHRSN                                                                           5

SEQ ID NO: 32               moltype = AA   length = 6
FEATURE                     Location/Qualifiers
source                      1..6
                            mol_type = protein
                            organism = synthetic construct
SEQUENCE: 32
PKRGDL                                                                          6

SEQ ID NO: 33               moltype = AA   length = 5
FEATURE                     Location/Qualifiers
source                      1..5
                            mol_type = protein
                            organism = synthetic construct
SEQUENCE: 33
PRARI                                                                           5

SEQ ID NO: 34               moltype = AA   length = 4
FEATURE                     Location/Qualifiers
source                      1..4
                            mol_type = protein
                            organism = synthetic construct
SEQUENCE: 34
REDV                                                                            4

SEQ ID NO: 35               moltype = AA   length = 11
FEATURE                     Location/Qualifiers
source                      1..11
                            mol_type = protein
                            organism = synthetic construct
SEQUENCE: 35
SIGFRGDGQT C                                                                   11

SEQ ID NO: 36               moltype = AA   length = 6
FEATURE                     Location/Qualifiers
source                      1..6
                            mol_type = protein
                            organism = synthetic construct
SEQUENCE: 36
SIKVAV                                                                          6

SEQ ID NO: 37               moltype = AA   length = 6
FEATURE                     Location/Qualifiers
source                      1..6
                            mol_type = protein
                            organism = synthetic construct
SEQUENCE: 37
SINNNR                                                                          6
```

| SEQ ID NO: 38 | moltype = AA  length = 8 | |
|---|---|---|
| FEATURE | Location/Qualifiers | |
| source | 1..8 | |
| | mol_type = protein | |
| | organism = synthetic construct | |
| SEQUENCE: 38 | | |
| SPPRRARV | | 8 |

| SEQ ID NO: 39 | moltype = AA  length = 7 | |
|---|---|---|
| FEATURE | Location/Qualifiers | |
| source | 1..7 | |
| | mol_type = protein | |
| | organism = synthetic construct | |
| SEQUENCE: 39 | | |
| SVVYGLR | | 7 |

| SEQ ID NO: 40 | moltype = AA  length = 12 | |
|---|---|---|
| FEATURE | Location/Qualifiers | |
| source | 1..12 | |
| | mol_type = protein | |
| | organism = synthetic construct | |
| SEQUENCE: 40 | | |
| TWYKIAFQRN RK | | 12 |

| SEQ ID NO: 41 | moltype = AA  length = 6 | |
|---|---|---|
| FEATURE | Location/Qualifiers | |
| source | 1..6 | |
| | mol_type = protein | |
| | organism = synthetic construct | |
| SEQUENCE: 41 | | |
| VALDEP | | 6 |

| SEQ ID NO: 42 | moltype = AA  length = 6 | |
|---|---|---|
| FEATURE | Location/Qualifiers | |
| source | 1..6 | |
| | mol_type = protein | |
| | organism = synthetic construct | |
| SEQUENCE: 42 | | |
| VGVAPG | | 6 |

| SEQ ID NO: 43 | moltype = AA  length = 5 | |
|---|---|---|
| FEATURE | Location/Qualifiers | |
| source | 1..5 | |
| | mol_type = protein | |
| | organism = synthetic construct | |
| SEQUENCE: 43 | | |
| VPGIG | | 5 |

| SEQ ID NO: 44 | moltype = AA  length = 8 | |
|---|---|---|
| FEATURE | Location/Qualifiers | |
| source | 1..8 | |
| | mol_type = protein | |
| | organism = synthetic construct | |
| SEQUENCE: 44 | | |
| WQPPRARI | | 8 |

| SEQ ID NO: 45 | moltype = AA  length = 5 | |
|---|---|---|
| FEATURE | Location/Qualifiers | |
| source | 1..5 | |
| | mol_type = protein | |
| | organism = synthetic construct | |
| SEQUENCE: 45 | | |
| YIGSR | | 5 |

The invention claimed is:

1. A composition comprising a food product comprising a semi-permeable, porous hollow fiber, comprising one or more polycarboxylic acid derived covalent ester, thioester and/or amide bond crosslinked polypeptides wherein:

(a) the external diameter of the hollow fiber is 500-1200 µm;
   (b) the wall thickness of the hollow fiber is 100-500 µm;
   (c) the lumen diameter of the hollow fiber is 100-500 µm; and
   (d) the porosity of the hollow fiber is 10-85%; and
   (e) the particle rejection size (PRS) of the hollow fiber is at least 10 µm.

2. The composition of claim 1, wherein the hollow fiber comprises a regular semi-crystalline polymer comprising ester, thioester and/or amide crosslinked polypeptides with a beta-sheet secondary structure.

3. The composition of claim 1, wherein the external diameter of the hollow fiber is between 1000 µm to 1100 µm.

4. The composition of claim 1, wherein the external diameter of the hollow fiber is between 500 µm to 800 µm.

5. The composition of claim 1, wherein the wall thickness of the hollow fiber is between 100 µm to 200 µm.

6. The composition of claim 1, wherein the wall thickness of the hollow fiber is between 200 µm to 500 µm.

7. The composition of claim 1, wherein the lumen diameter of the hollow fiber is between 100 µm to 200 µm.

8. The composition of claim 1, wherein the porosity of the hollow fiber is in the range of 60% to 85%.

9. The composition of claim 1, wherein the porosity of the hollow fiber is in the range of 55% to 75%.

10. The composition of claim 1, wherein the particle rejection size (PRS) of the hollow fiber is at least 1 µm.

11. The composition of claim 1, wherein the particle rejection size (PRS) of the hollow fiber is at least 0.1 µm.

12. The composition of claim 1, wherein the Young's modulus of the hollow fiber does not decrease by more than 60% after being submerged in PBS, at a temperature between 18° C. and 38° C. and with a pH between 7.0 and 8.0 for a period of 3 days.

13. A semi-permeable, porous hollow fiber comprising one or more polycarboxylic acid derived covalent ester, thioester and/or amide bond crosslinked polypeptides wherein said hollow fiber is intended to be edible, and wherein:
   (a) the external diameter of the hollow fiber is 500-1200 µm;
   (b) the wall thickness of the hollow fiber is 100-500 µm;
   (c) the lumen diameter of the hollow fiber is 100-500 µm; and
   (d) the porosity of the hollow fiber is 10-85%; and
   (e) the particle rejection size (PRS) of the hollow fiber is at least 10 µm.

14. The hollow fiber of claim 13, wherein the hollow fiber comprises a regular semi-crystalline polymer comprising ester, thioester and/or amide crosslinked polypeptides with a beta-sheet secondary structure.

15. The hollow fiber of claim 13, wherein the external diameter of the hollow fiber is between 1000 µm to 1100 µm.

16. The hollow fiber of claim 13, wherein the external diameter of the hollow fiber is between 500 µm to 800 µm.

17. The hollow fiber of claim 13, wherein the wall thickness of the hollow fiber is between 100 µm to 200 µm.

18. The hollow fiber of claim 13, wherein the wall thickness of the hollow fiber is between 200 µm to 500 µm.

19. The hollow fiber of claim 13, wherein the lumen diameter of the hollow fiber is between 100 µm to 200 µm.

20. The hollow fiber of claim 13, wherein the porosity of the hollow fiber is in the range of 60% to 85%.

21. The hollow fiber of claim 13, wherein the porosity of the hollow fiber is in the range of 55% to 75%.

22. The hollow fiber of claim 13, wherein the particle rejection size (PRS) of the hollow fiber is at least 1 µm.

23. The hollow fiber of claim 13, wherein the particle rejection size (PRS) of the hollow fiber is at least 0.1 µm.

24. The hollow fiber of claim 13, wherein the Young's modulus of the hollow fiber does not decrease by more than 60% after being submerged in PBS, at a temperature between 18° C. and 38° C. and with a pH between 7.0 and 8.0 for a period of 3 days.

25. A cartridge comprising the hollow fiber of claim 13.

26. A cartridge comprising a plurality of hollow fibers of claim 13, wherein the packing density of the plurality of hollow fibers in the cartridge is between 41 hollow fibers/cm$^2$ to 121 hollow fibers/cm$^2$.

27. A cartridge comprising a plurality of hollow fibers of claim 13, wherein the packing density of the plurality of hollow fibers in the cartridge is between 1 hollow fibers/cm$^2$ to 41 hollow fibers/cm$^2$.

28. A cartridge comprising a plurality of hollow fibers of claim 13, wherein the packing density of the plurality of hollow fibers in the cartridge is between 11 hollow fibers/cm$^2$ to 31 hollow fibers/cm$^2$.

29. A cartridge comprising the hollow fiber of claim 13, wherein the inner diameter of the cartridge is between 1 cm to 26 cm.

30. A cartridge comprising the hollow fiber of claim 13, wherein the inner diameter of the cartridge is between 26 cm to 51 cm.

31. A bioreactor comprising a cartridge, wherein the cartridge comprises the hollow fiber of claim 13.

32. A food product comprising the hollow fiber of claim 13.

33. The hollow fiber of claim 13, wherein the one or more polycarboxylic acid derived covalent ester, thioester and/or amide bond crosslinked polypeptides are produced from a polycarboxylic acid.

34. The hollow fiber of claim 13, wherein said one or more polycarboxylic acid derived covalent ester, thioester and/or amide bond crosslinked polypeptides are detectable by one or more techniques selected from the group consisting of nuclear magnetic resonance (NMR) spectroscopy and Fourier transform infrared (FTIR) spectroscopy.

* * * * *